US012749035B2

(12) United States Patent
Bodnick et al.

(10) Patent No.: US 12,749,035 B2
(45) Date of Patent: Sep. 29, 2026

(54) SYSTEMS, METHODS, AND MEDIA FOR PRESENTING INTERACTIVE CHECKLISTS

(71) Applicant: WebINTENSIVE Software, LLC, Miami, FL (US)

(72) Inventors: David Bodnick, New York, NY (US); Marlon Feld, Bronx, NY (US); Rachel J. Gild, Mountain View, CA (US)

(73) Assignee: WebINTENSIVE Software, LLC, New York, NY (US)

( * ) Notice: Subject to any disclaimer, the term of this patent is extended or adjusted under 35 U.S.C. 154(b) by 0 days.

(21) Appl. No.: 16/378,324

(22) Filed: Apr. 8, 2019

(65) Prior Publication Data

US 2019/0286462 A1 Sep. 19, 2019

Related U.S. Application Data

(63) Continuation-in-part of application No. 14/217,240, filed on Mar. 17, 2014, now Pat. No. 10,255,573.

(60) Provisional application No. 61/801,443, filed on Mar. 15, 2013.

(51) Int. Cl.

| | |
|---|---|
| ***G06Q 10/0631*** | (2023.01) |
| ***G06F 40/186*** | (2020.01) |
| ***G06Q 10/10*** | (2023.01) |
| *G06F 9/451* | (2018.01) |
| *G06F 16/958* | (2019.01) |

(52) U.S. Cl.

CPC ..... *G06Q 10/06316* (2013.01); *G06F 40/186* (2020.01); *G06Q 10/103* (2013.01); *G06F 9/453* (2018.02); *G06F 16/958* (2019.01)

(58) Field of Classification Search

CPC ........................... G06Q 10/06; G06Q 10/0633

USPC ........................................................ 705/7.26

See application file for complete search history.

(56) References Cited

U.S. PATENT DOCUMENTS

| | | | | |
|---|---|---|---|---|
| 7,159,206 | B1 * | 1/2007 | Sadhu | G06Q 10/06 717/101 |
| 7,966,369 | B1 * | 6/2011 | Briere | G06F 16/248 709/204 |
| 8,359,305 | B1 * | 1/2013 | Burke | G06F 16/2452 707/706 |

(Continued)

OTHER PUBLICATIONS

Paraiso, E. C., & Malucelli, A. (2011). Ontologies supporting intelligent agent-based assistance. Computing and Informatics, 30(4), 829-855. (Year: 2011).*

*Primary Examiner* — Rutao Wu
*Assistant Examiner* — Letoria G Knight
(74) *Attorney, Agent, or Firm* — Byrne Poh LLP

(57) ABSTRACT

Mechanisms for presenting interactive checklists comprising: at least one hardware processor that: receives an indication from a first user assigned to a first step that the first step has been completed; presents a description for a second step to users assigned to the second step in response to receiving the indication; receives at least one of: interactive checklist content describing how to perform the second step; and a new description for a new step, after the presenting of the description of the second step; and saves the at least one of the interactive checklist content and the new description, and an indicator that the at least one of the interactive checklist content and the new description is to be available for presentation to users after the receiving of the at least one of the interactive checklist content and the new description.

21 Claims, 309 Drawing Sheets

9202

(56) References Cited

U.S. PATENT DOCUMENTS

| | | | | | |
|---|---|---|---|---|---|
| 8,788,590 | B2 * | 7/2014 | Culver | G06F 16/95 709/205 |
| 9,026,577 | B1 * | 5/2015 | Johnston | G06Q 10/103 709/202 |
| 9,239,719 | B1 * | 1/2016 | Feinstein | G06F 8/70 |
| 10,210,574 | B2 * | 2/2019 | Marin | G06Q 40/08 |
| 2001/0047326 | A1 * | 11/2001 | Broadbent | G06Q 40/02 705/37 |
| 2005/0028073 | A1 * | 2/2005 | Henry | G06Q 10/10 715/255 |
| 2007/0169199 | A1 * | 7/2007 | Quinnell | G06F 21/577 726/25 |
| 2007/0192867 | A1 * | 8/2007 | Miliefsky | H04L 63/20 726/25 |
| 2007/0239504 | A1 * | 10/2007 | Austin | G06Q 10/063114 705/7.26 |
| 2008/0209416 | A1 * | 8/2008 | De Souza | G06Q 10/06 718/100 |
| 2009/0271863 | A1 * | 10/2009 | Govindavajhala | H04L 63/1433 726/23 |
| 2010/0070448 | A1 * | 3/2010 | Omoigui | H01L 27/14647 706/47 |
| 2010/0305997 | A1 * | 12/2010 | Ananian | G06Q 10/0633 715/843 |
| 2010/0332280 | A1 * | 12/2010 | Bradley | G06Q 10/06 705/9 |
| 2011/0010340 | A1 * | 1/2011 | Hung | H04L 51/046 709/204 |
| 2011/0209159 | A1 * | 8/2011 | Baratz | G06F 16/24575 707/E17.112 |
| 2011/0264611 | A1 * | 10/2011 | Graupner | G06Q 10/10 715/708 |
| 2011/0276396 | A1 * | 11/2011 | Rathod | H04L 51/48 707/706 |
| 2012/0030251 | A1 * | 2/2012 | Alfredson | G06Q 10/103 707/E17.005 |
| 2012/0060162 | A1 * | 3/2012 | Hunt | G06Q 10/06 718/102 |
| 2013/0080338 | A1 * | 3/2013 | Broekman | G06Q 10/06 705/300 |
| 2013/0090969 | A1 * | 4/2013 | Rivere | G06Q 10/06 705/7.19 |
| 2013/0179799 | A1 * | 7/2013 | Savage | G06F 3/0482 715/751 |
| 2013/0204673 | A1 * | 8/2013 | Gordon | G06Q 10/00 705/7.41 |
| 2014/0074526 | A1 * | 3/2014 | Caudron | G06Q 10/0633 705/7.13 |
| 2017/0262778 | A1 * | 9/2017 | Ganesan | H04L 9/3247 |
| 2018/0300304 | A1 * | 10/2018 | Mullins | G06Q 10/101 |

* cited by examiner

200

300

500

504

502

506

600

700

800

904

902

908

906

910

912

1000

1100

1202

1204

1206

1206

1208

1300

1302

1400

1600

1602

1700

1800

1804

1808

1810

1812

1904

2000

2002

2004

2102

2104

2106

2108

2122

2110

2124

2112

2114

2116

2118

2200

2400

2402

FIG. 25
Create Guides: Guide in progress
Data needed by service

2500

2600

2604

2606

2608

2610

2612

2702

2704

2706

2710

2712

FIG. 28
Create Guides: Guide Library
Create Guides

2800

3000

3102

3104

3106

3202

3204

3300

3400

3500

3600

3700

3802

3804

3808

3806

3900

4000

4102

4104

4200

4300

4400

4500

4600

4700

4800

4902

4904

5000

5002

5004

5006

5008

5100

5200

5300

FIG. 54
Administration: Reports

5400

5500

5600

5602

5700

5800

5900

6000

6102

FIG. 61B
Marketplace: Sell a new Guide

6104

6106

6200

6300

6400

6500

6600

6702

6704

6800

6900

7000

7100

7200

7202

7300

7400

7500

7600

7700

7800

7900

8000

8100

8200

8300

8400

8500

8600

8602

8700

8800

8900

9002

9004

9100

9202

9204

9300

9400

9500

9600

FIG. 96B
My Activities
Link to an activity
Cancel
SAVE

9602

9700

9702

9800

9900

10000

10100

10200

10300

10400

10500

10602

10606

10604

10702

10704

10802
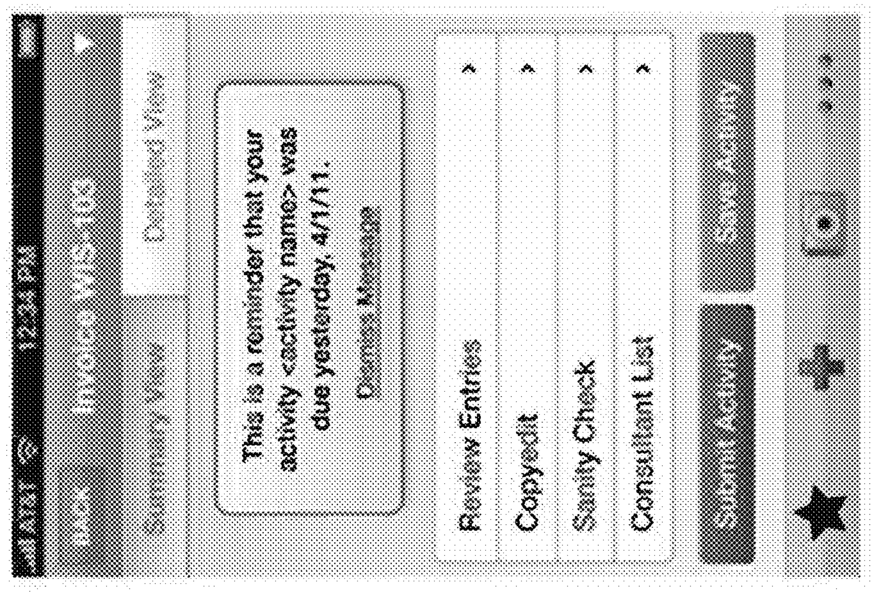
10804
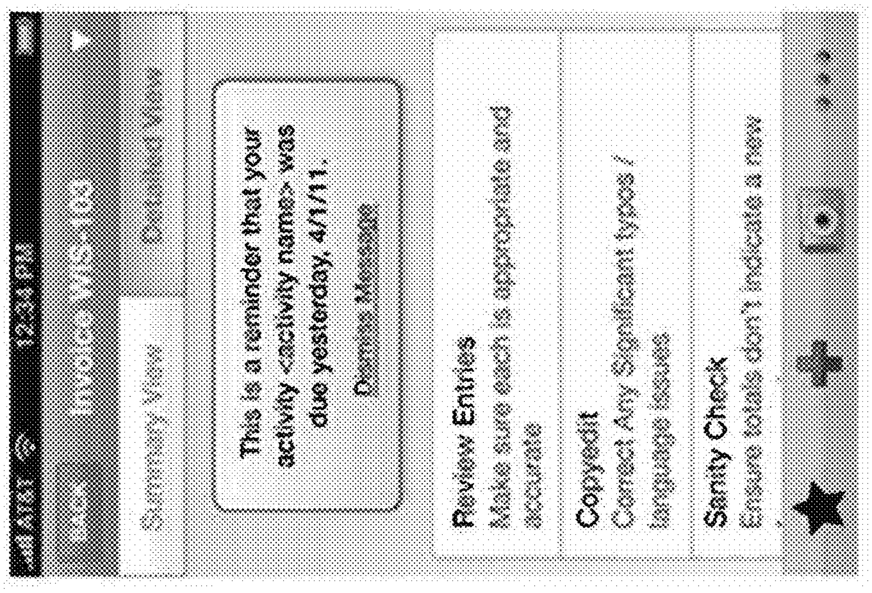
FIG. 108

10902

10904

11000

11102
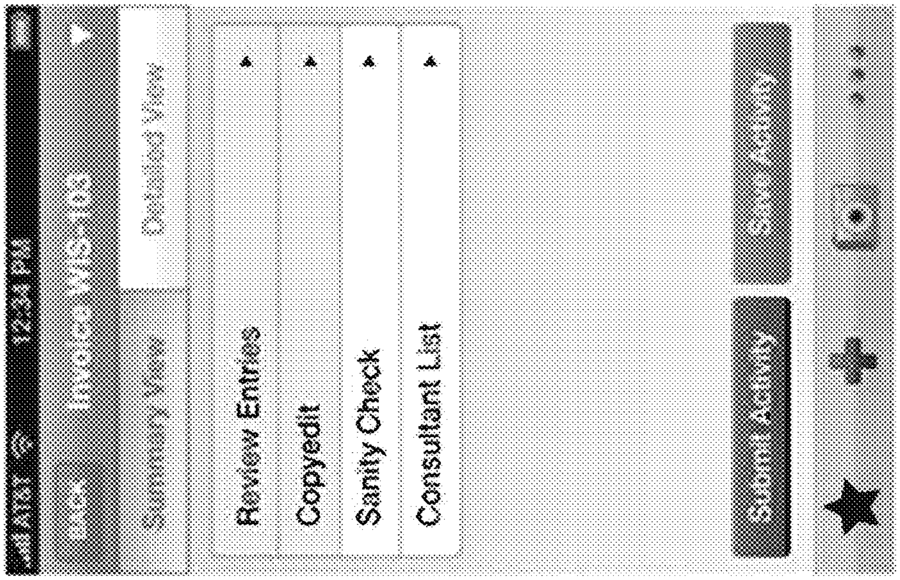
11104
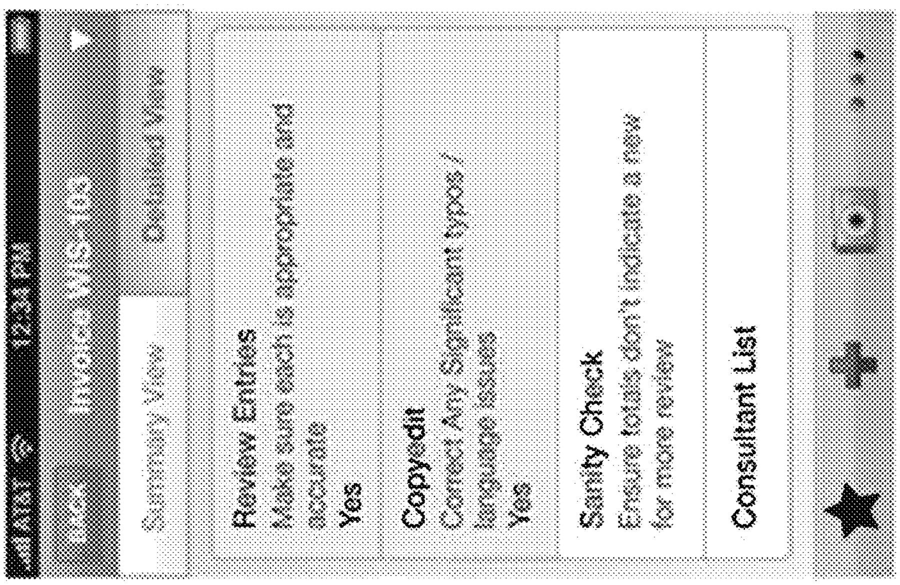
FIG. 111

11200

11302

11304

11402

11404

11502

11504

11602

11604

11606

11702

11704

11800

12004

12002

12102

12104

12200

12300

12400

12500

12600

12700

12800

12900

13000

13100

13200

FIG. 165
Agenda
Guides I'm using
Group Queues
Guides
Assign Guides
Create Guides
Jump to:
Schedule Guides
Communication
Approvals
Feedback
Messages
Settings
Administration
Marketplace
Create Guides: Guide Library
Here are the guides that you have released for others to use. Click on the title of a guide to view it.
Name
Location
Review Resumes
HR: Onboarding
ADP Training
HR: Training
Photoshop Level I Training
HR: Training
MS Project Training
HR: Training
Photoshop Level II Training
HR: Training
Phone Screens
HR: Onboarding
Offer Letters
HR: Onboarding
You can view the guides you have shared in your Guide Library.
Here you can see the guide that you just added. Great work!
Assign Guides

```
[
    {"jsonrpc": "2.0", "method": "file.open-document", "params": {"file-base64": "abc12345...", "file-name": "Report Template.docx"}
, "id": "1"},
    {"jsonrpc": "2.0", "method": "font.install-by-name", "params": {"font-name": "Lato-Regular"}, "id": "2"},
    {"jsonrpc": "2.0", "method": "font.install-from-file", "params": {"file-base64": "abc12345..."}, "id": "3"},

    {"jsonrpc": "2.0", "method": "text.replace-all", "params": {"find-text": "<<FIRSTNAME>>", "replace-with": "Susanne"}, "id": "4"}
,
    {"jsonrpc": "2.0", "method": "text.find", "params": {"find-text": "<<HEADSHOT/>>", "case-sensitive": "Yes"}, "id": "5"},
    {"jsonrpc": "2.0", "method": "image.insert-from-file", "params": {"file-base64": "abc12345..."}, "id": "6"},
    {"jsonrpc": "2.0", "method": "text.insert", "params": {"content": "-0.365\n\mTotals", "select": "yes"}, "id": "7"},
    {"jsonrpc": "2.0", "method": "formatting.set-text-color", "params": {"color": "red"}, "id": "8"},
    {"jsonrpc": "2.0", "method": "formatting.set-background-color", "params": {"color": "#3a3a2c"}, "id": "9"},
    {"jsonrpc": "2.0", "method": "navigation.right-arrow", "id": "10"},
    {"jsonrpc": "2.0", "method": "navigation.right-arrow", "params": {"count": "11"}, "id": "11"},
    {"jsonrpc": "2.0", "method": "text.insert-tab", "params": {"count": "5"}, "id": "12"},
    {"jsonrpc": "2.0", "method": "formatting.set-style", "params": {"style-name": "Heading 1"}, "id": "13"},
    {"jsonrpc": "2.0", "method": "formatting.toggle-bold", "params": {"on": "Yes"}, "id": "14"},
    {"jsonrpc": "2.0", "method": "formatting.toggle-italic", "params": {"on": "No"}, "id": "15"},
    {"jsonrpc": "2.0", "method": "formatting.toggle-bulleted-list", "params": {"on": "Yes"}, "id": "16"},
    {"jsonrpc": "2.0", "method": "formatting.toggle-numbered-list", "params": {"on": "Yes"}, "id": "17"},
    {"jsonrpc": "2.0", "method": "table.insert", "params": {
      "content": [ ['Name', 'Age', 'Favorite Color'],
                   ['Martha', '17.5', 'Orange'],
                   ['Travis', '23', 'Coral'],
                   ['Susanna', '12', 'Indigo']  ],
      "select": "yes"}, "id": "18"},
    {"jsonrpc": "2.0", "method": "formatting.set-style", "params": {"style-name": "Grid Table 4 - Accent 2"}, "id": "19"},
    {"jsonrpc": "2.0", "method": "clipboard.copy", "id": "20"},
    {"jsonrpc": "2.0", "method": "output.clipboard", "params": {"format": "RTF"}, "id": "21"},
    {"jsonrpc": "2.0", "method": "output.selection", "params": {"format": "Unformatted"}, "id": "22"},
    {"jsonrpc": "2.0", "method": "output.selection", "params": {"format": "Grid"}, "id": "23"},
    {"jsonrpc": "2.0", "method": "output.file", "params": {"format": "RTF"}, "id": "24"},
    {"jsonrpc": "2.0", "method": "output.pdf", "id": "25"},
    {"jsonrpc": "2.0", "method": "macro.run", "params": {"name": "The-Macro-Name"}, "id": "26"},
    {"jsonrpc": "2.0", "method": "macro.remove", "params": {"name": "The-Macro-Name"}, "id": "27"} ,
    {"jsonrpc": "2.0", "method": "macro.remove-all", "id": "28"},
]
```

FIG. 234

FIG. 244
Property: 500 Park Avenue
Activities
Overview & Roles
Enter basic property information
Conduct Marketplace assessment
Do special thing for review
View Activity
Edit Roles
Add an Activity

Configure your own automation
*(Based on an existing automation)*

Name of your automation: [ Choice/New ] Method name: ____________
Description: ________________

Inputs

| *Field name* | *Data type* | *Description* | *Mandatory?* |
|---|---|---|---|
| License ID | | | |
| Case ID | | | |
| ... | | | |

*add*

---

Use this automation: [ Microsoft Office ] [Word-Automation ]

Use this service: [ ________ ] *(optional)*

Send these inputs to this service:

- *Input Name (e.g. JSON-RPC-code):* [ ...... ]
- Input #1: "Dear <<$INPUT1>>, ..."
- Input #1: *{License ID}* // Ideally a visual interface to insert the desired input field from above as a tag
- Input #2: *{Case ID}*

---

Return These Outputs
(Ideally, allow visual insertion of the service we called's "output" tags, and perhaps original "input" tags as well.

| *Field name* | *Data type* | *Description* | *Value* |
|---|---|---|---|
| ... | | | *Output #2* |
| | | | Hi, *Output #1.* |

*add*

FIG. 251

SYSTEMS, METHODS, AND MEDIA FOR PRESENTING INTERACTIVE CHECKLISTS

CROSS REFERENCE TO RELATED APPLICATIONS

This application is a Continuation-In-Part of U.S. patent application Ser. No. 14/217,240, filed Mar. 17, 2014, which claims the benefit of U.S. Provisional Patent Application No. 61/801,443, filed Mar. 15, 2013, each of which is hereby incorporated by reference herein in its entirety.

TECHNICAL FIELD

The disclosed subject matter relates to systems, methods, and media for presenting interactive checklists.

BACKGROUND

Many complex tasks that are performed for personal or business purposes require a series of often nuanced steps to be performed or considered to complete the tasks. Frequently, there are one or two people who are "experts" at performing such a task because of the complexity of remembering how and when to perform the steps required, and the communication needed to become aware of improvements and changes to these tasks. This limited number of "experts" makes delegating performance of the task or steps therein a difficult matter. Often, even when delegation is possible, expert oversight is still required.

In the past, paper checklists have been used to document the steps that are needed to perform a task and guide a person when performing the task, but such paper checklists are limited in the information that they can convey and are difficult to update. For example, a paper checklist can only show what is recited on the checklist paper, and cannot be automatically linked to other information that may be useful in performing a task. As another example, when updating a paper checklist, prior copies of the paper checklist need to be gathered and thrown away and new copies of the paper checklist generated. And with paper checklists, oversight can be thwarted by delay, failure of coordination, or failure to document interim steps.

Accordingly, it is desirable to provide new systems, methods, and media for presenting interactive checklists.

SUMMARY

Systems, methods, and media for presenting interactive checklists are provided. In some embodiments, methods for presenting interactive checklists are provided, the methods comprising: identifying a plurality of steps to be performed by one or more users in connection with completing a task, wherein each of the plurality of steps is assigned to one or more of the plurality of users and has a description corresponding to the step; presenting the description for a first of the plurality of steps to the one or more of the plurality of users assigned to the first of the plurality of steps; receiving an indication from the one or more of the plurality of users assigned to the first of the plurality of steps that the first of the plurality of steps has been completed; presenting the description for a second of the plurality of steps to the one or more of the plurality of users assigned to the second of the plurality of steps in response to receiving the indication that the first of the plurality of steps has been completed; receiving from at least one of the plurality of users at least one of: interactive checklist content describing how to perform the second of the plurality of steps; and a new description for a new step to be added to the plurality of steps, after the presenting of the description of the second of the plurality of steps; and saving the at least one of the interactive checklist content and the new description for the new step, and an indicator that the at least one of the interactive checklist content and the new description of the new step is to be available for presentation to at least one of the plurality of users after the receiving of the at least one of the interactive checklist content and the new description for the new step.

In some embodiments, systems for presenting interactive checklists are provided, the systems comprising: at least one hardware processor that: identifies a plurality of steps to be performed by one or more users in connection with completing a task, wherein each of the plurality of steps is assigned to one or more of the plurality of users and has a description corresponding to the step; presents the description for a first of the plurality of steps to the one or more of the plurality of users assigned to the first of the plurality of steps; receives an indication from the one or more of the plurality of users assigned to the first of the plurality of steps that the first of the plurality of steps has been completed; presents the description for a second of the plurality of steps to the one or more of the plurality of users assigned to the second of the plurality of steps in response to receiving the indication that the first of the plurality of steps has been completed; receives from at least one of the plurality of users at least one of: interactive checklist content describing how to perform the second of the plurality of steps; and a new description for a new step to be added to the plurality of steps, after the presenting of the description of the second of the plurality of steps; and saves the at least one of the interactive checklist content and the new description for the new step, and an indicator that the at least one of the interactive checklist content and the new description of the new step is to be available for presentation to at least one of the plurality of users after the receiving of the at least one of the interactive checklist content and the new description for the new step.

In some embodiments, non-transitory computer-readable media containing computer-executable instructions that, when executed by a processor, cause the processor to perform a method for presenting interactive checklists s are provided, the method comprising: identifying a plurality of steps to be performed by one or more users in connection with completing a task, wherein each of the plurality of steps is assigned to one or more of the plurality of users and has a description corresponding to the step; presenting the description for a first of the plurality of steps to the one or more of the plurality of users assigned to the first of the plurality of steps; receiving an indication from the one or more of the plurality of users assigned to the first of the plurality of steps that the first of the plurality of steps has been completed; presenting the description for a second of the plurality of steps to the one or more of the plurality of users assigned to the second of the plurality of steps in response to receiving the indication that the first of the plurality of steps has been completed; receiving from at least one of the plurality of users at least one of: interactive checklist content describing how to perform the second of the plurality of steps; and a new description for a new step to be added to the plurality of steps, after the presenting of the description of the second of the plurality of steps; and saving the at least one of the interactive checklist content and the new description for the new step, and an indicator that the at least one of the interactive checklist content and the new description of the new step is to be available for presentation to at least one of the plurality of users after the receiving of the at least one of the interactive checklist content and the new description for the new step.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

FIGS. 107A, 107B, and 108 show examples of user interfaces displayed on a mobile device for presenting messages in accordance with some embodiments of the disclosed subject matter.

FIGS. 110, 111, and 112 show examples of user interfaces displayed on a mobile device for presenting a list of outstanding activities in accordance with some embodiments of the disclosed subject matter.

FIG. 234 shows an example of a sequence of commands that can be used for document transformation that can be used in accordance with some embodiments of the disclosed subject matter.

FIG. 251 shows an example of a user interface for configuring an automation in accordance with some embodiments of the disclosed subject matter.

DETAILED DESCRIPTION OF EMBODIMENTS

In accordance with some embodiments, mechanisms (which can be system, methods, and/or media) for interactive checklists are provided. In some embodiments, using these mechanisms, a user can create, complete, assign, and/or perform other actions on interactive checklists. In some embodiments, each interactive checklist can contain one or more steps which can assist a user in completing one or more tasks.

In some embodiments, interactive checklists can offer smart suggestions based on decision points, input fields, task items, and/or any other information associated with the interactive checklist. Interactive checklists can be tailored to one or more situations based on a user's responses (e.g., if the answer to Step 1 is "yes," then do not show user Step 7). Interactive checklists can be reviewed and approved. An electronic paper trail of the user's response can be provided to create accountability in some embodiments.

Turning to FIGS. 1-132 and 134-192, examples of user interfaces that can be generated in connection with these mechanisms in accordance with some embodiments are shown. In some embodiments, these user interfaces can be generated under the control of one or more hardware processor of a computing device and/or a server as described below in connection with FIGS. 133A and 133B.

Figure 1:
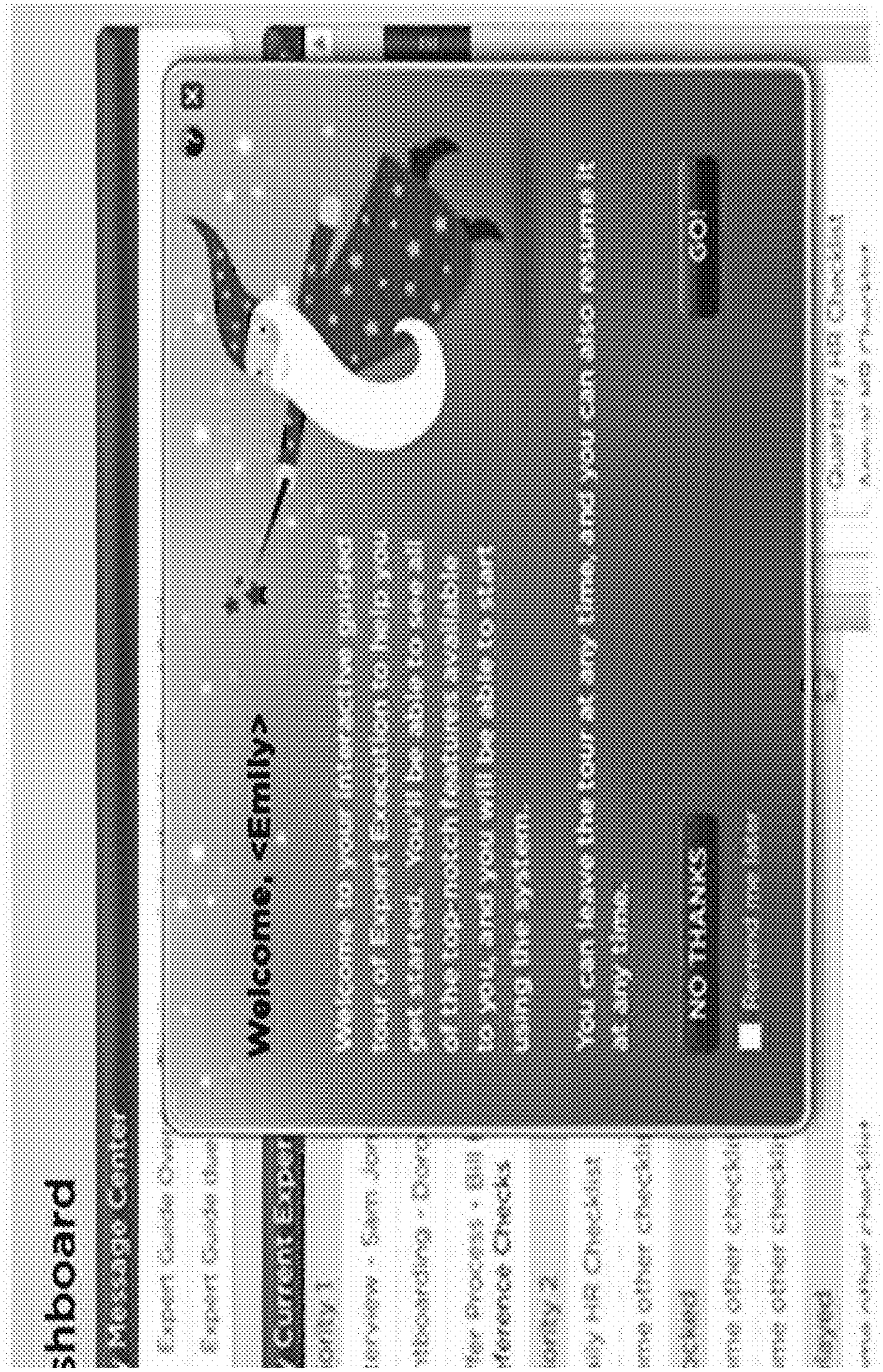
FIG. 1 shows an example of a user interface for presenting a tour wizard in accordance with some embodiments of the disclosed subject matter.

Referring to FIG. 1, an example 100 of a user interface for introducing a user to a tour of user interfaces of the mechanism in accordance with some embodiments of the invention is shown. In some embodiments, using interface 100 may be presented by a hardware processor of a computing device (e.g., as described in connection with FIG. 133). In some embodiment, a tour can be presented by a wizard graphic as shown in FIG. 1. A part of the tour may optionally be presented when the user encounters new functionality for which that part of the tour has not been previously presented. The wizard graphic can appear in a variety of poses and with a number of props.

Figure 2:
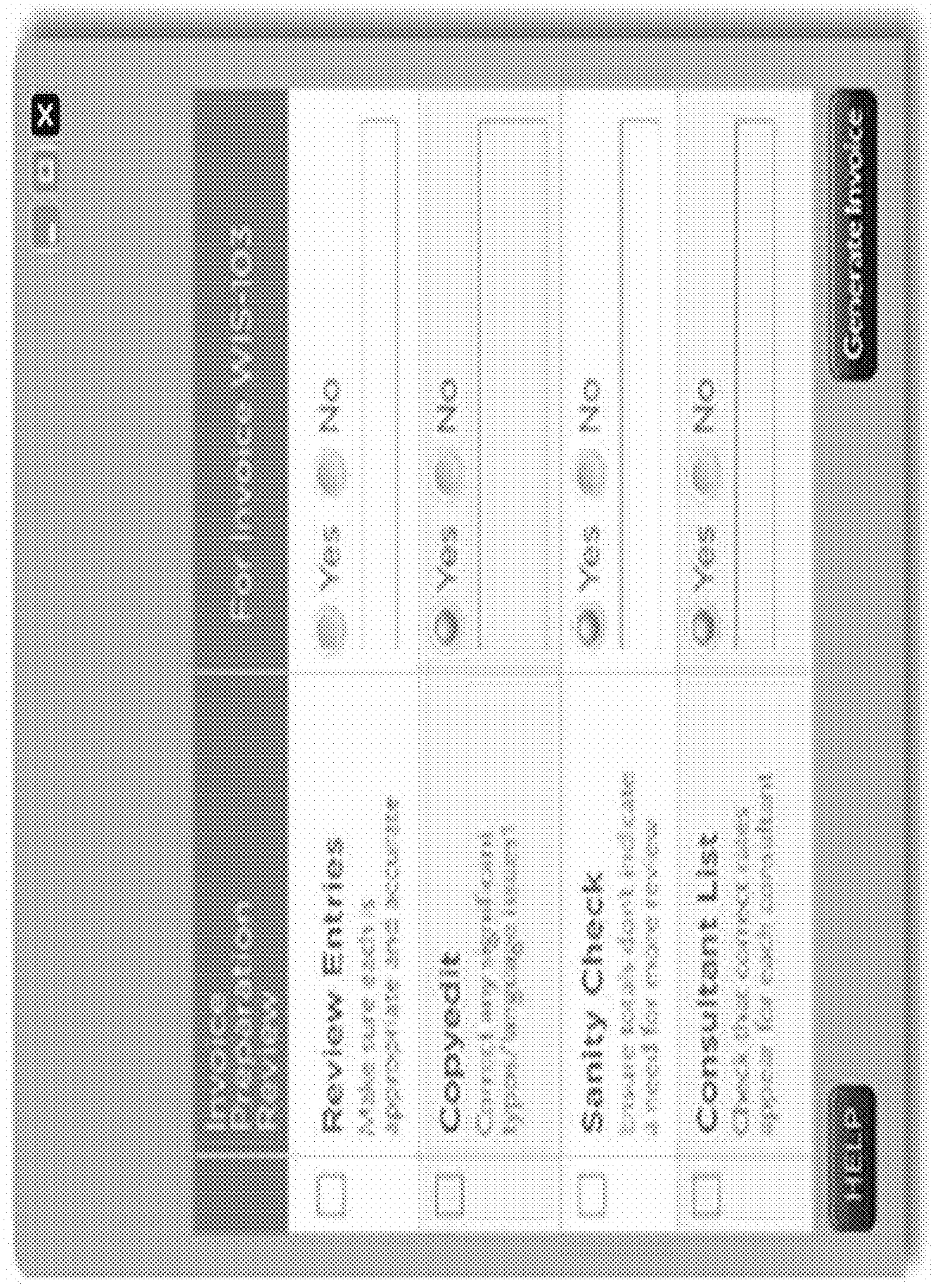
FIGS. 2 and 3 show examples of user interfaces for reviewing interactive checklists in accordance with some embodiments of the disclosed subject matter.
Figure 3:
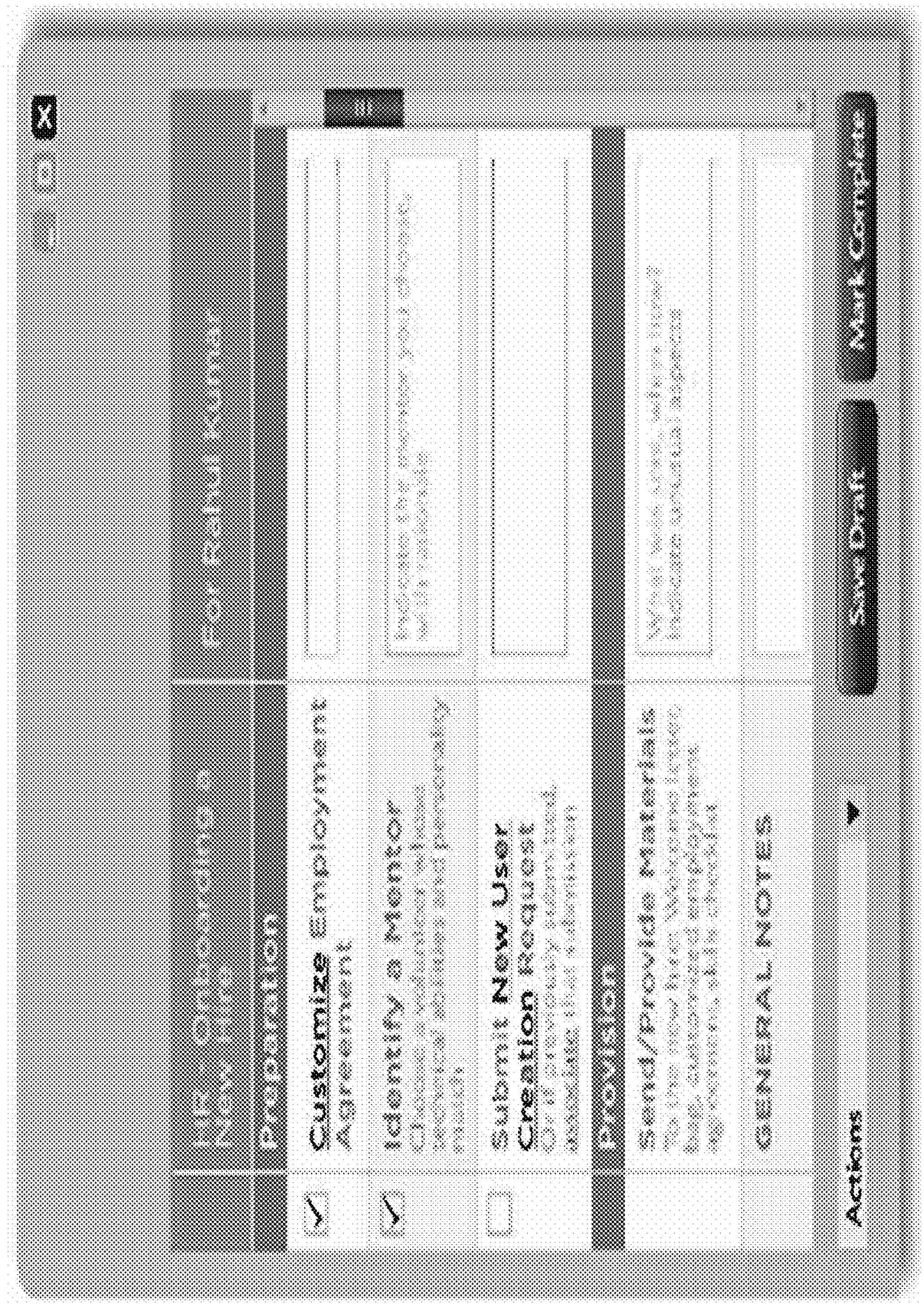

In some embodiments, interfaces 200 and 300 of FIGS. 2 and 3, respectively, are examples of interfaces which can be used in an interactive checklist. As shown in FIG. 2, an example of an interactive checklist can provide a procedure for invoice preparation review, and this procedure can include steps for reviewing entries, copy editing, performing a "sanity" check, and checking rates for consultants. When these steps are done, a user can select to generate an invoice. As shown in FIG. 2, an example of an interactive checklist can provide a procedure for human resources onboarding of a new hire, and this procedure can include steps for customizing an employment agreement, identifying a mentor, submitting a new user creation request, sending/providing materials, taking notes, saving a draft of the checklist, and marking the checklist complete.

Figure 4:
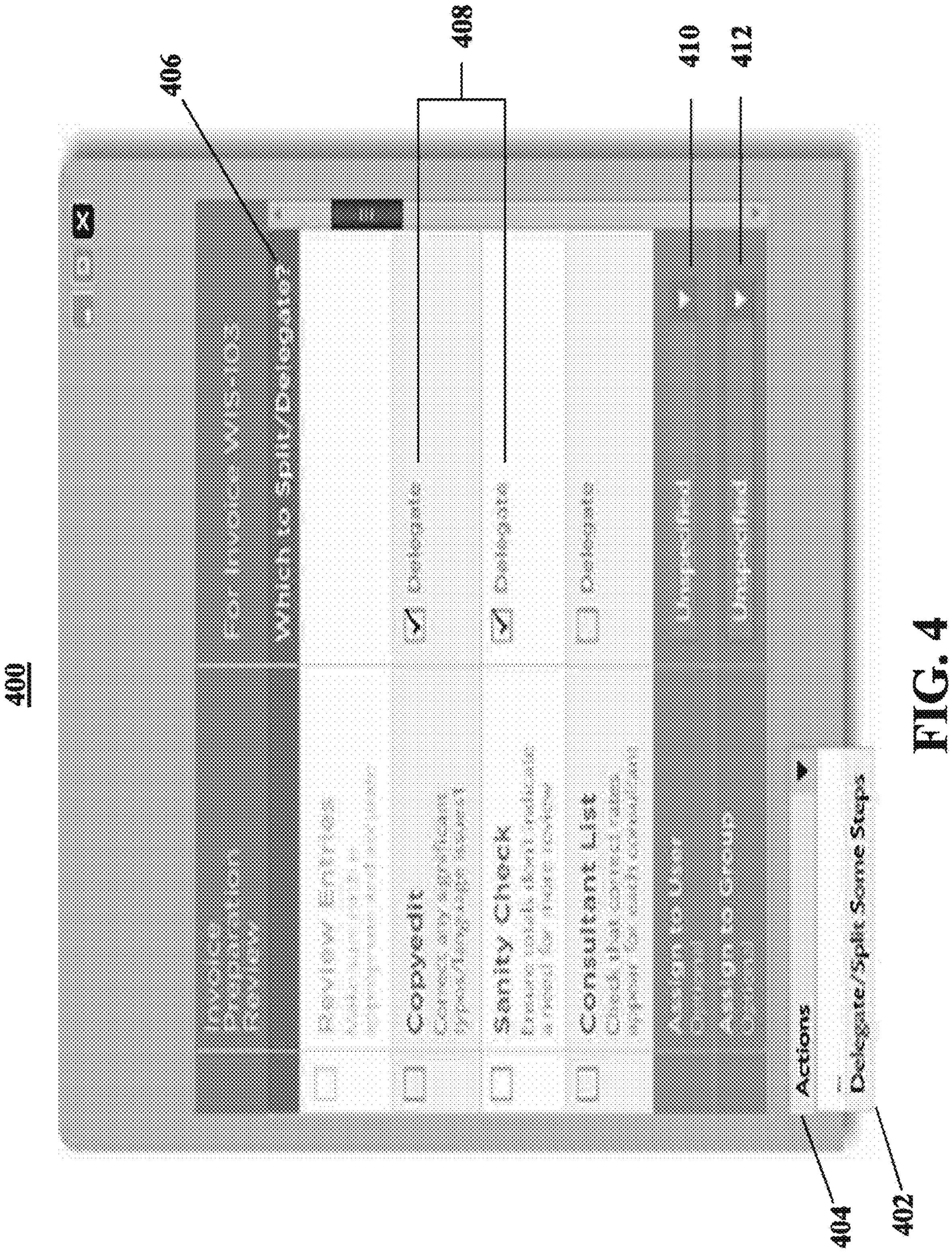
FIG. 4 shows an example of user interface for delegating steps to another user in accordance with some embodiments of the disclosed subject matter.

In accordance with some embodiments, a menu can also be provided with an interactive checklist in some embodiments. As shown in FIG. 4, a menu 404 can include an option 402 for delegating/splitting some steps of the interactive checklist. For example, one or more menu options can be provided to allow a user to select to split an interactive checklist into one or more sections or subsections and/or to reassign sections and/or individual steps to other users.

In some embodiment, after selecting option 403 (e.g., by the hardware processor receiving a user input (e.g., from a keyboard, a mouse, a touchscreen, and/or any other source of user input) of option 402), the hardware processor can receive a selection of which steps to split or delegate to another user as shown in column 406 (labelled "Which to Split/Delegate?") of FIG. 4. In some embodiments, a characteristic of the step can be evaluated to determine whether the step can be split and/or delegated, and the result of that determination can control whether options for splitting and/or delegating a step are shown (as illustrated, only options to delegate steps are shown in FIG. 4). Next, the hardware processor can receive a selection of one or more of any available incomplete steps using check boxes (e.g., check boxes 408). Upon receiving a selection of one or more of the incomplete steps to delegate (as shown in FIG. 4), the hardware processor can present menus 410 and/or 412 to the user to specify which user (using menu 410) or group of users (using menu 412) are to complete the step or steps selected.

Figure 5:
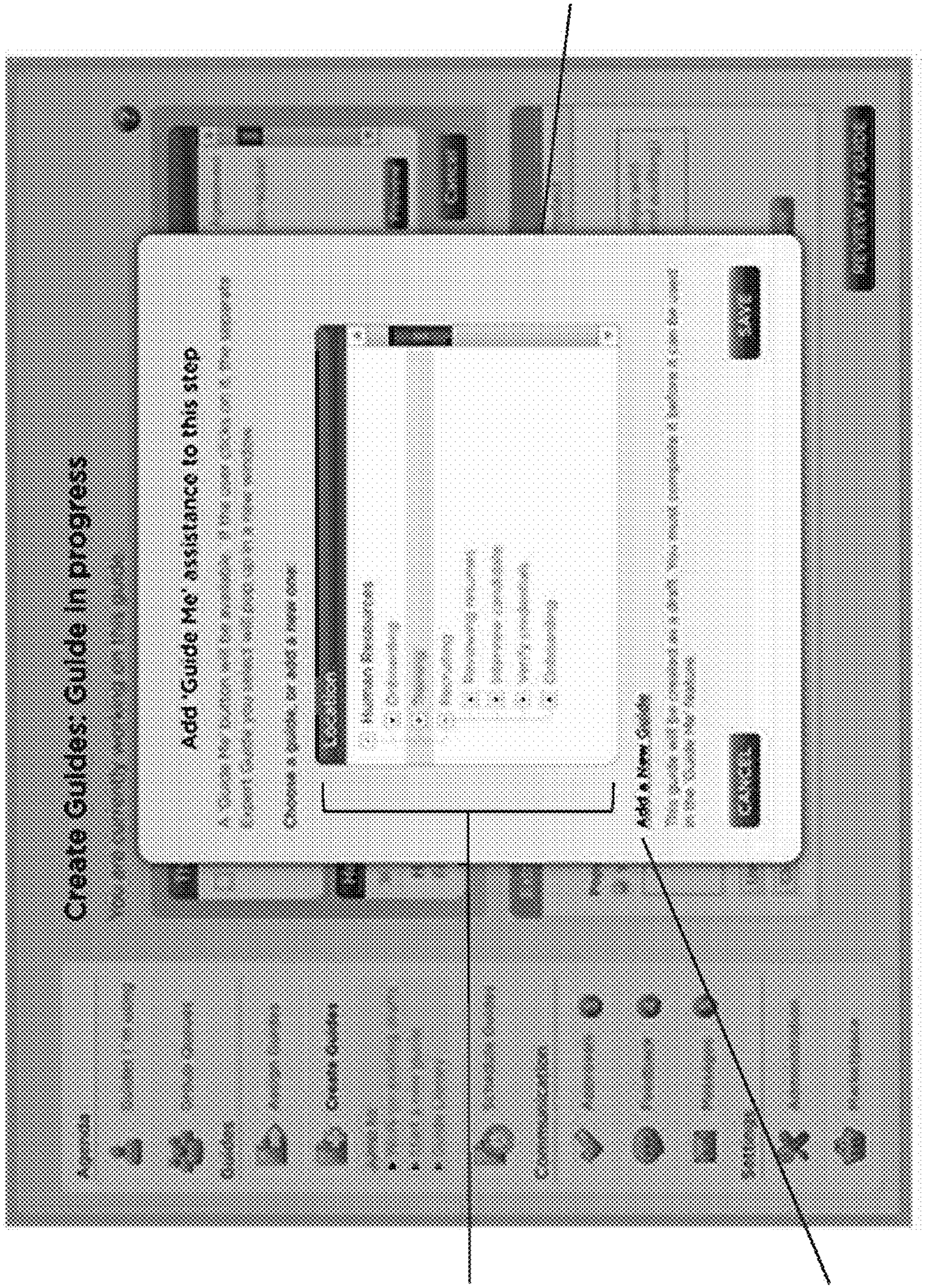
FIGS. 5, 6, and 7 show examples of user interfaces for suggesting interactive checklists to a user in accordance with some embodiments of the disclosed subject matter.

In accordance with some embodiments, an interactive checklist can be enhanced in any suitable manner. For example, as shown in FIG. 5, using an interface 500, a user can add "Guide Me" assistance to an interactive checklist that can guide the performance of one or more steps of the interactive checklist. In some embodiments, The "Guide Me" assistance can be one or more other interactive checklists that are presented. These one or more other interactive checklists can be selected from one or more existing interactive checklists or can be newly created. For example, as shown in interface 500 of FIG. 5, the hardware processor can receive a user selection of an existing interactive checklist using a location tree 502 in a popup window 504. If the user concludes that none of the existing options available cover the right material, the hardware processor can receive a user input to add a new interactive checklist by selecting a link 506 (labelled "Add a New Guide" in the example of FIG. 5). After a user selects link 506, the hardware processor can prompt the user for, and receive, instructions from the user to create a new interactive checklist and to use the new interactive checklist to provide "Guide Me" assistance. In some embodiments, when presenting an interface such as interface 500, the hardware processor can receive a request that another user create a new interactive checklist or update an existing interactive checklist. In such instances, the other user can be prompted by the hardware processor to create a new interactive checklist in response to the request.

Figure 6:
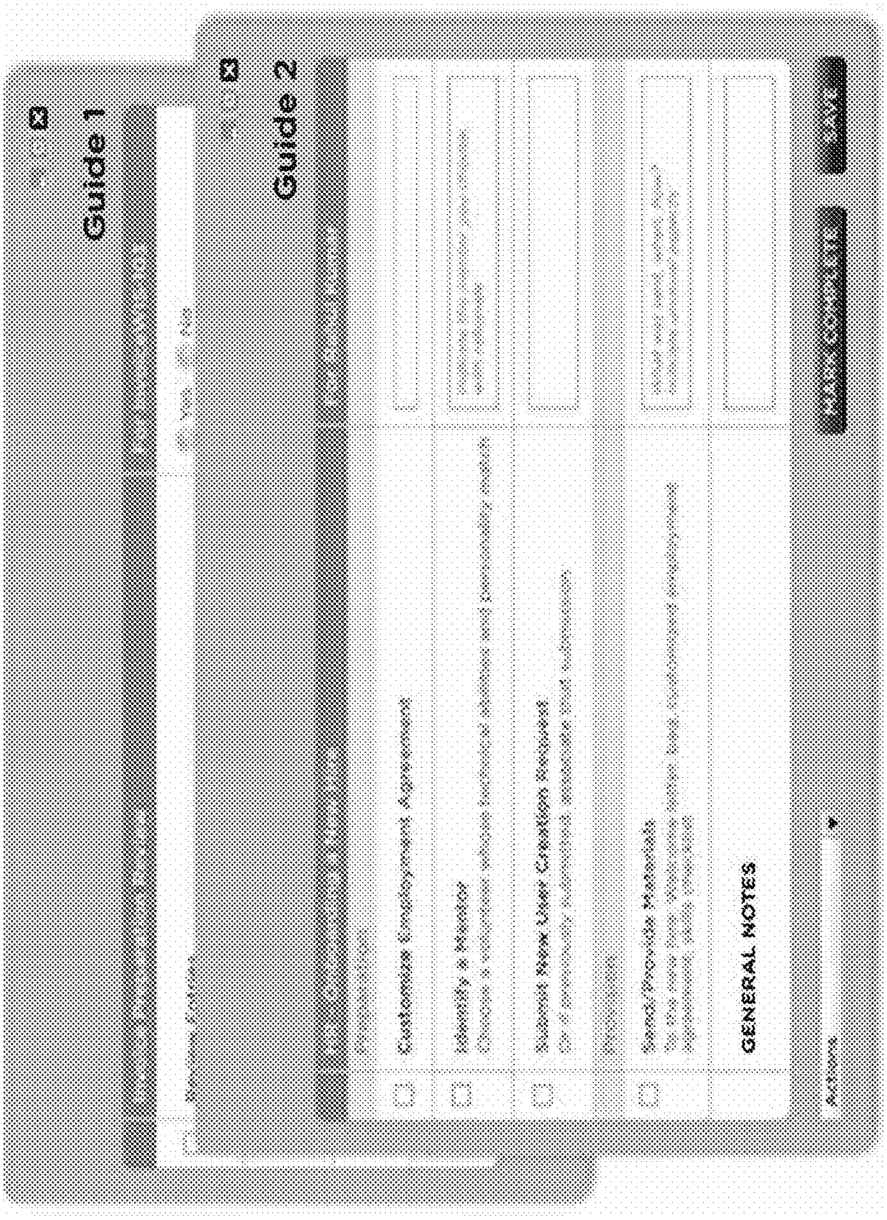
Figure 7:
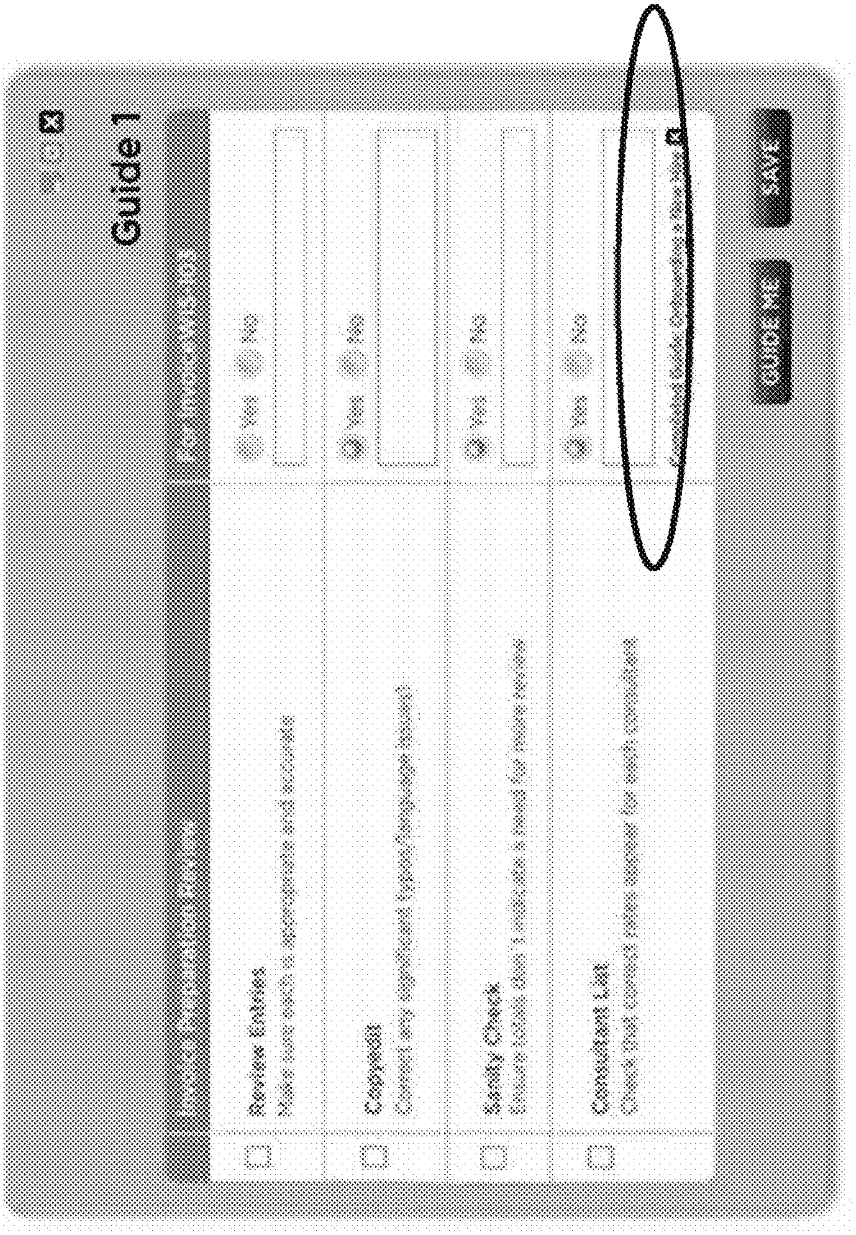

In accordance with some embodiments, as shown in FIG. 7, when using an interactive checklist, a "Guide Me" option can be presented by a hardware processor to a user. In response to a hardware processor receiving a selection of the "Guide Me" option, a second interactive checklist can be opened in a separate interface, for example interface 600 of FIG. 6, for the user to consult. The user can view or complete the interactive checklist. Afterwards, as shown in interface 700 of FIG. 7, the interactive checklist can indicate how the user has utilized the "Guide Me" feature. This can allow for another user, for example, a user auditing the user using the "Guide Me" feature, to see what guidance the user has used. It also can enable the user to return to the "Guide Me" interface. Note that, in some embodiments, each Guide or interactive checklist can be associated with an icon that can be selected by an author of the Guide or interactive checklist. In some such embodiments, the icon can be presented each time an indication of the particular Guide or interactive checklist is presented. In some embodiments, an icon can be selected from an existing library. Additionally or alternatively, in some embodiments, an icon can be uploaded by a user. Note that, in some embodiments, the system can suggest an icon that may be relevant for a particular Guide based on keywords in a title of a Guide, content in a Guide, a description of a Guide. In some such embodiments, any suitable semantic language taxonomy (e.g., WordNet, etc.) can be used to suggest an icon when there is no match between an icon in a group of potential icons and keywords associated with a Guide. For example, in an instance in which a Guide title includes a word such as "puppy," an icon that includes an image of a dog can be suggested.

Figure 8:
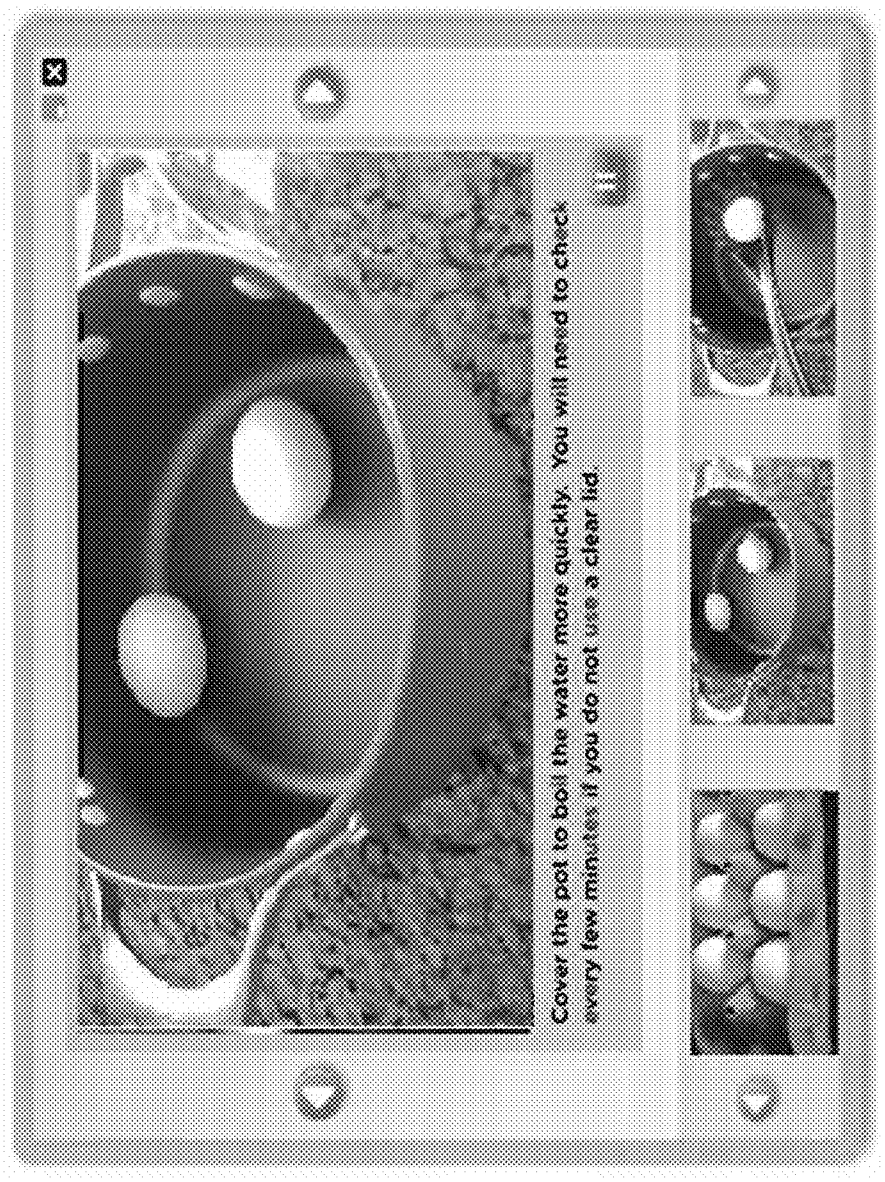
FIGS. 8, 9A, and 9B show examples of user interfaces for presenting a presentation in accordance with some embodiments of the disclosed subject matter.

In some embodiments, using an interface 800 that may be presented by a hardware processor of a computing device, the hardware processor can present a "Show Me" feature that can allow a user to add visual and/or multimedia guidance (e.g., a deck of slides or a video) to a specific step. In response to the hardware processor receiving a user input (e.g., by clicking on a "Show Me" button) in the interactive checklist, the hardware processor can present a video or a presentation of slides in a separate window, for example, the presentation shown in interface 800 of FIG. 8. The hardware processor can present the presentation at a fixed speed allow a user to control playback options (e.g., play, pause, stop, and/or any other suitable playback options), and/or allow a user to navigate to a particular slide in the presentation. Each slide can include one or more elements, for example, text, images, video, downloadable attachments, and/or any other element. The hardware processor can allow a user to add guidance (e.g., slides with texts, images, videos, and/or attachments) as well, that can be available personally, to others (groups, other individuals), and/or to all. Additionally or alternatively, the hardware processor can allow a user to edit existing slides to adjust what the user and/or other users can view depending on permission settings. The user's approval may be required for this to be available to others in some embodiments. For example, the user may choose to accept or not accept the additions and/or changes. In some embodiments, an import feature can retrieve multimedia and text content from a document. Upon importing, the multimedia and text content can be edited or modified.

Figure 9A:
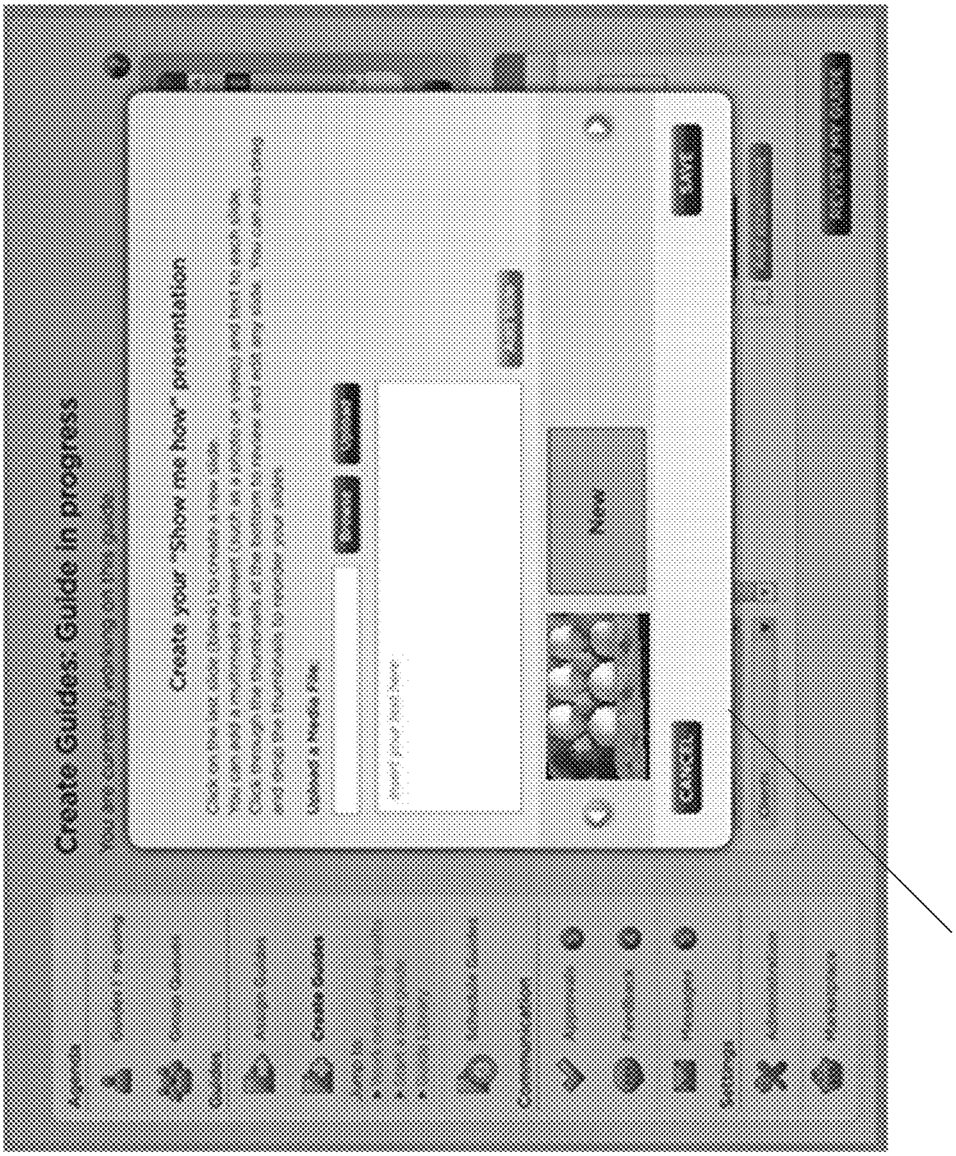
Figure 9B:
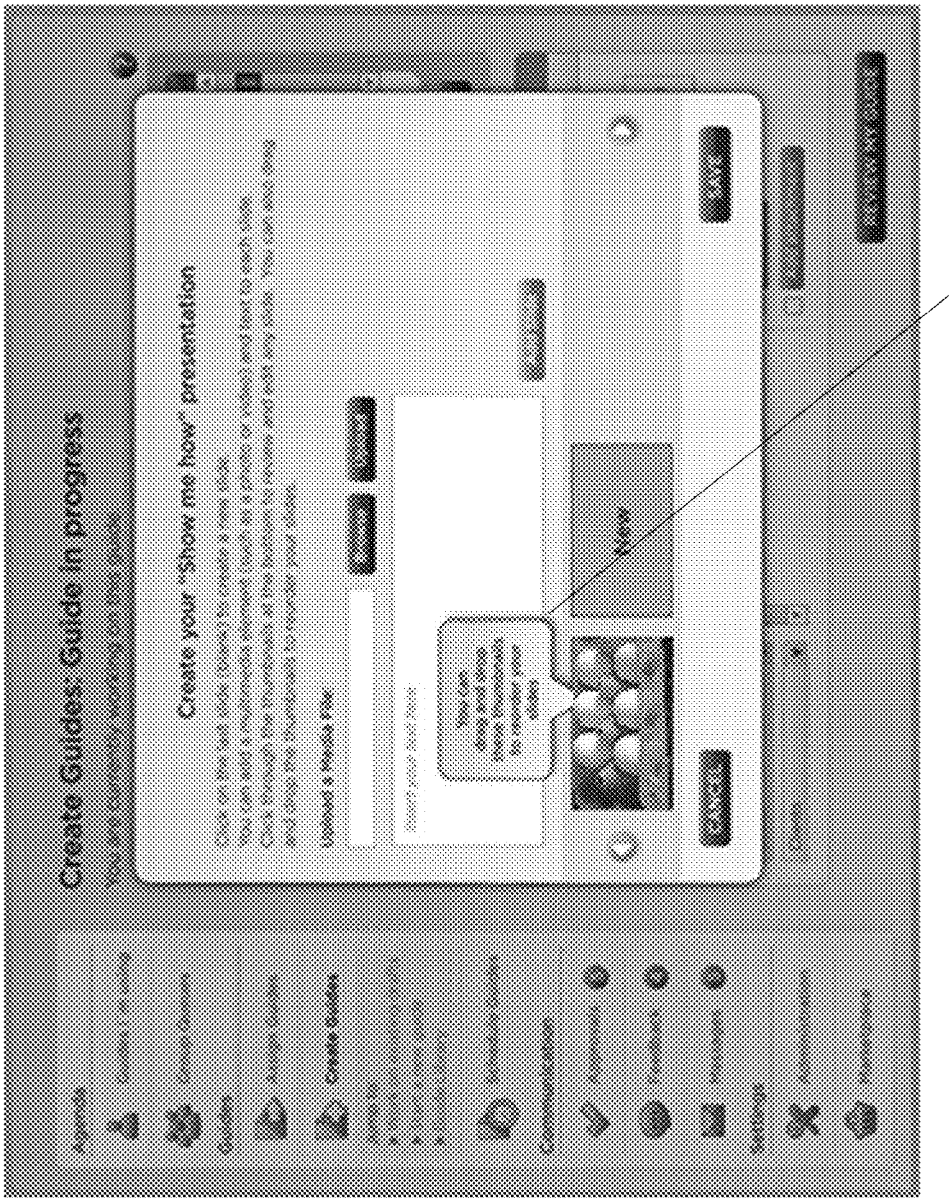

In accordance with some embodiments, when a user opts to include a "Show Me" presentation of slides, using an interface 904 that may be presented by a hardware processor of a computing device, the hardware processor can present a popup window 902, as shown in FIG. 9A. For each slide in the presentation, the hardware processor can receive a multimedia file and/or add text from a user. For example, the hardware processor can receive any suitable screenshot, such as a screenshot of a desktop, a screenshot of a browser window, a screenshot of an application window, and/or any other screenshot. Upon receiving the screenshot, the hardware processor can receive a user input to crop and/or annotate the screenshot (e.g., with text, arrows, and/or highlights) to illustrate an element. The hardware processor can allow the user to add one or more slides in the presentation. In some embodiments, the hardware processor can present a navigational strip having thumbnail previews of the slides at the bottom of popup window 902 that can allow the user to navigate through slides already created. Upon navigating through the thumbnail previews, the hardware processor can present a snippet 906 of entered text when the user hovers over that slide as shown in interface 908 of FIG. 9B. Alternately, the slides can progress automatically, as a slideshow. Optionally, the selection of slides, and optionally the order of slides, may be tailored based on automated determinations that can use any suitable factors, including responses previously given.

Figure 9C:
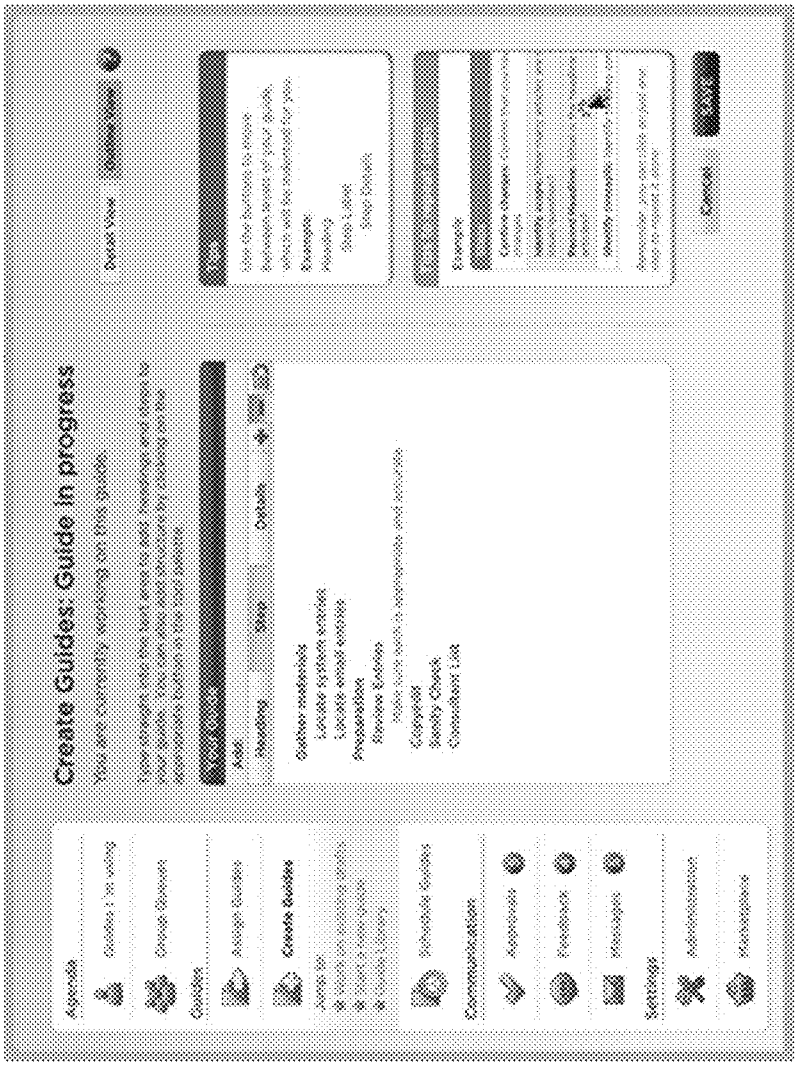
FIGS. 9C and 9D show examples of user interfaces for structuring interactive checklists in accordance with some embodiments of the disclosed subject matter.
Figure 9D:
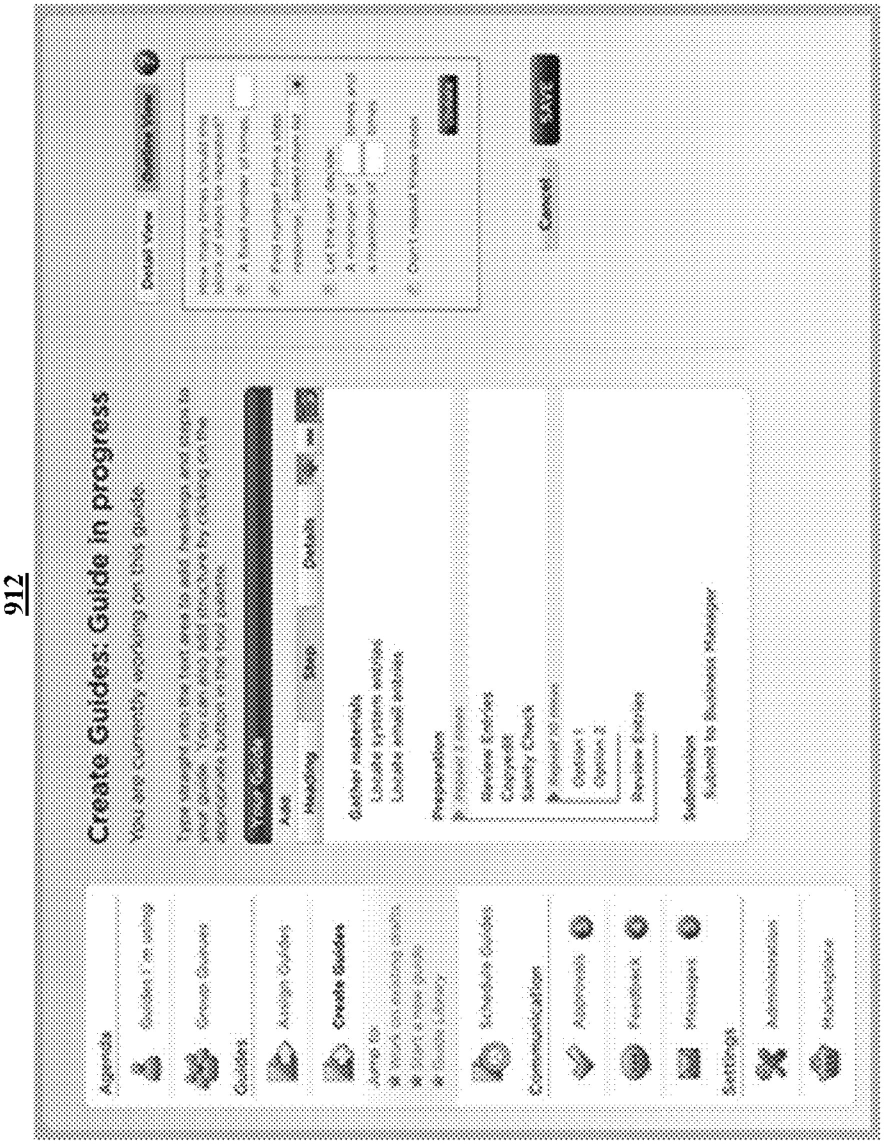

In accordance with some embodiments, the hardware processor can present a guide structure allowing a user to better organize and/or customize an interactive checklist structure, as shown in FIG. 9C. The hardware processor can receive structural elements through a "Create Guide." Additionally or alternatively, the hardware processor can receive structural elements through an outline view. Structural elements can include items such as section (e.g., blocks of steps) and/or as subsections (e.g., nested steps). Note that, in some embodiments, steps and/or sections can be permuted by a user in any suitable manner. In some embodiments, other features can be applied to guides structures. For example, the hardware processor can receive a selection of steps and rules to repeat the steps and/or nested set of steps, as shown in interface 912 of FIG. 9D. For example, a Guide can prompt for entry of a number of people, and for each person, the Guide can prompt for entry of a number of phone numbers. The hardware processor can repeat the steps a fixed numbers of time, a number of times based on another response in the guide, a minimum number of times, a maximum numbers of times, as many times as desired by a user, and/or any other suitable numbers of times.

Figure 206:
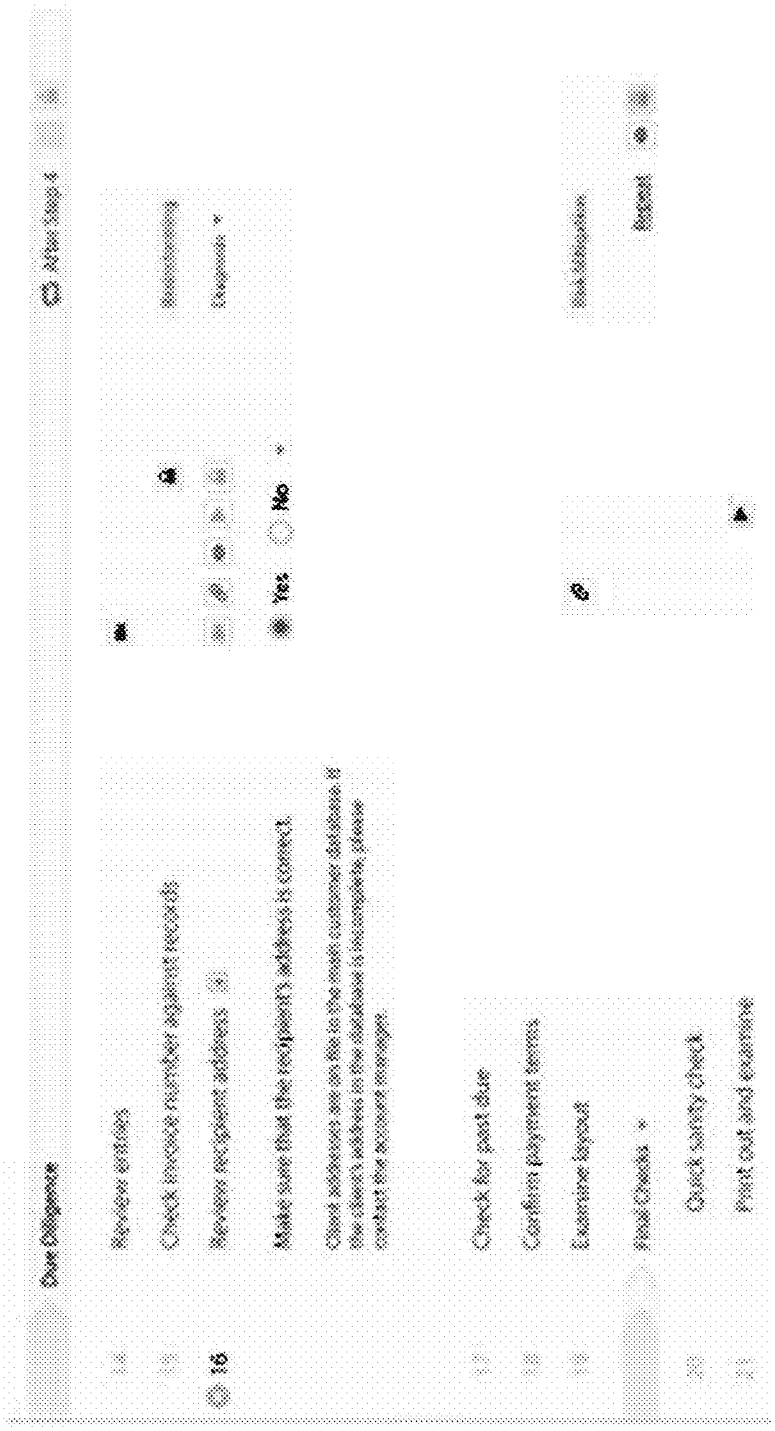
FIG. 206 shows an example of a user interface for presenting a Guide in an outline format in accordance with some embodiments of the disclosed subject matter.
Figure 207:
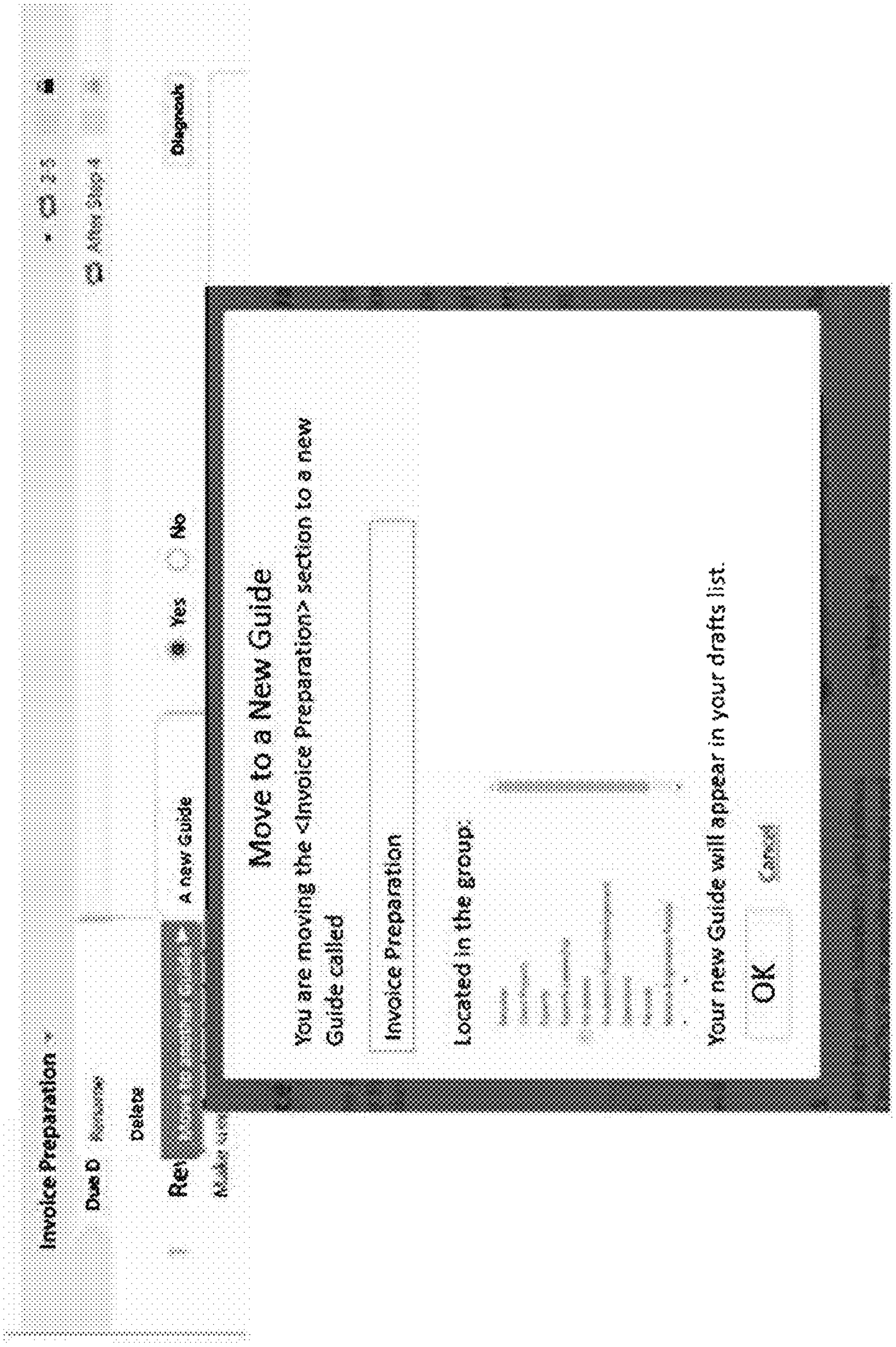
FIG. 207 shows an example of a user interface for moving steps from one Guide to another Guide in accordance with some embodiments of the disclosed subject matter.

Note that, in some embodiments, steps can be moved from one Guide to another Guide, as shown in FIG. 207. For example, in some embodiments, steps can be moved from an existing Guide to a new Guide. A Guide can create any suitable number of steps, sections, attachments, and/or any other suitable content. In some embodiments, a Guide (a draft of a Guide and/or an already published Guide) can be viewed in an outline format, as shown in FIG. 206. In instances where one or more attachments are included with a step in a Guide, the attachments can be presented as thumbnail images when the step is presented. In some embodiments, a larger version of the thumbnail image can be presented, for example, in response to determining that a cursor is positioned over the thumbnail image.

Figure 208:
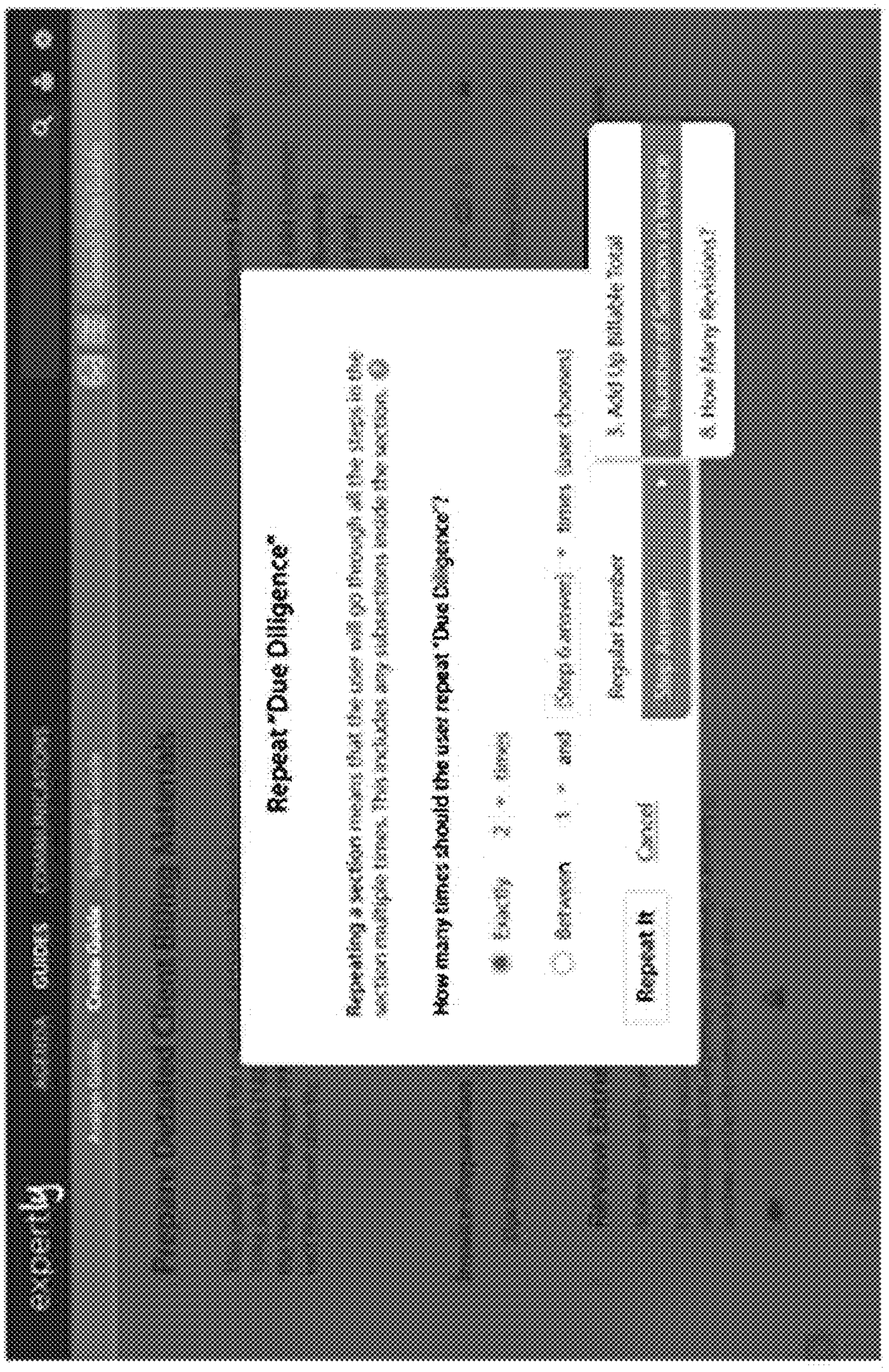
FIG. 208 shows an example of a user interface for configuring a Guide with multiple sections in accordance with some embodiments of the disclosed subject matter.

In some embodiments, steps within a Guide can be organized into any suitable number of sections. In some embodiments, a section can include one or more titles and/or names (which may be modifiable), any suitable number (e.g., one, two, five, ten, and/or any other suitable number) of steps, and/or any suitable subsections. In some embodiments, sections can be associated with criteria which indicate whether the section is to be displayed. For example, in some embodiments, the criteria can include privacy settings, a number of times (e.g., a maximum number of times, a minimum number of times, and/or any other suitable number) a section is to be displayed, and/or any other suitable criteria. In some such embodiments, the criteria may be set and/or modified using a user interface, as shown in FIG. 208. In some embodiments, a section can be set to repeat any suitable number of times. Additionally or alternatively, in some embodiments, sections can be moved, ended, modified to include or exclude steps within the section, and/or changed in any other suitable manner. Note that, in some embodiments, suitable steps and/or sections can be automatically identified for selection for populating response fields while a user is authoring a Guide. For example, in some embodiments, suitable steps and/or sections can be identified based on steps and/or sections used in Guides associated with similar activities. In some embodiments, a new parent section can be added to a Guide, which can cause relevant sections to be nested under the new parent section. Note that, in some embodiments, empty sections can be added. In some embodiments, section indications can be included when a Guide is presented in an outline view.

In accordance with some embodiments, any suitable information can be included in association with a Guide, such as names of creators and/or contributors, security information, checkpoints for activities and/or steps, and/or any other suitable information. For example, in some embodiments, a user who contributes to creation of a Guide can add themself to a list of contributors to the Guide. As another example, in some embodiments, a list of users required to approve a Guide before it can be published can be stored. As a more particular example, in some embodiments, the list of users can initially be set to a default list of users required to approve a Guide, and the default list can be modified at any suitable time. As yet another example, in some embodiments, a description of the Guide can be stored, and can indicate, for example, topics covered, users who might find the Guide useful, and/or any other suitable information. As a more particular example, in some embodiments, the description can indicate step dependencies, for example, that a particular step and/or activity is dependent on another step or activity for completion.

Figure 10:
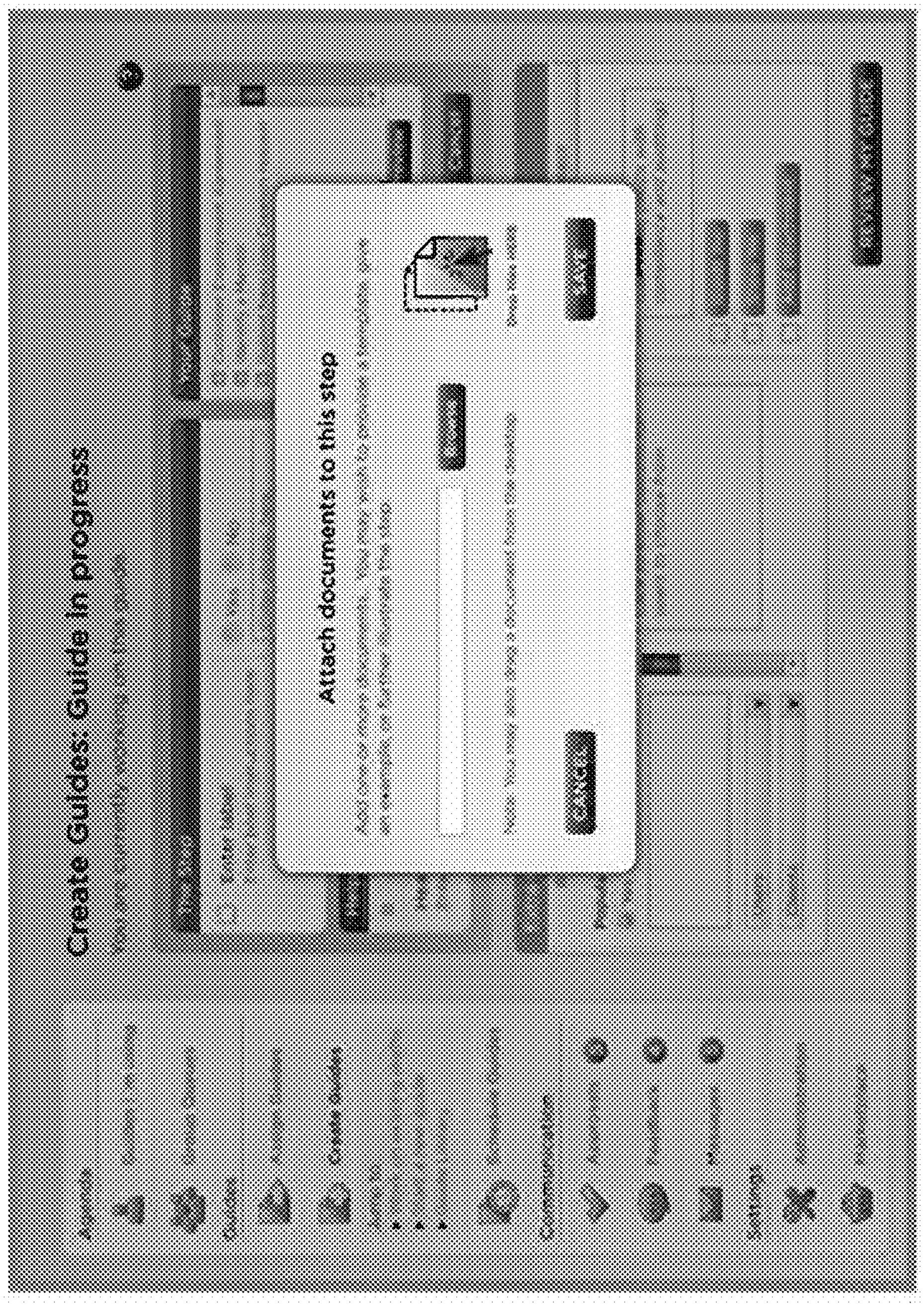
FIGS. 10 and 11 show examples of user interfaces for attaching files to a step in accordance with some embodiments of the disclosed subject matter.
Figure 11:
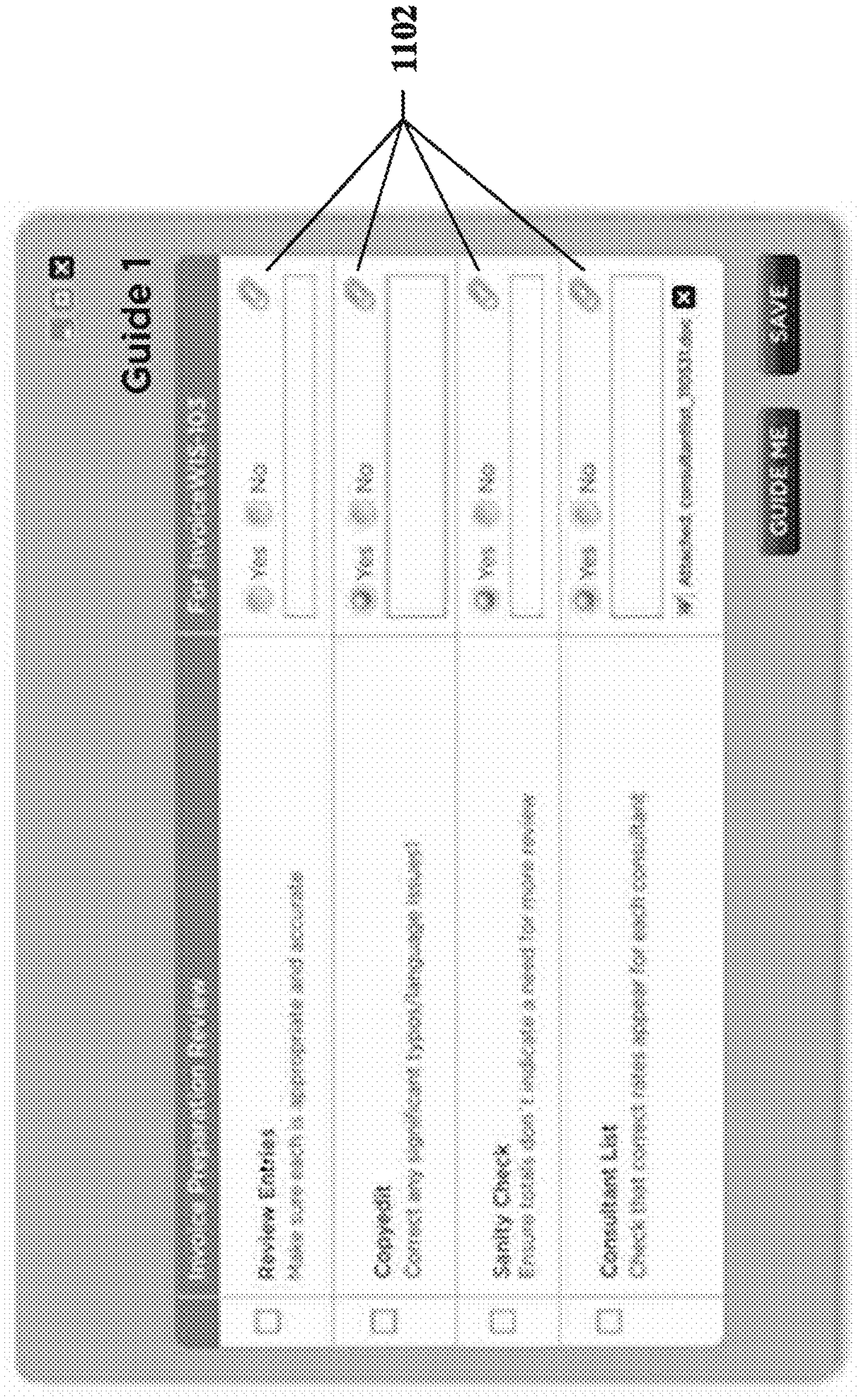

As shown in interface 1000 of FIG. 10, using an interface 1000 that may be presented by a hardware processor of a computing device, the hardware processor can allow a user can attach one or more types of files to a step as an attachment. The attachment can appear in the interactive checklist to benefit the user. For example, in some embodiments, using an interface 1100 that may be presented by a hardware processor of a computing device, the hardware processor can present attachments 1102 as shown in FIG. 11. Attachments can be used as examples to further illustrate how to complete a step. A user may also attach a template for the user to follow.

Figure 12A:
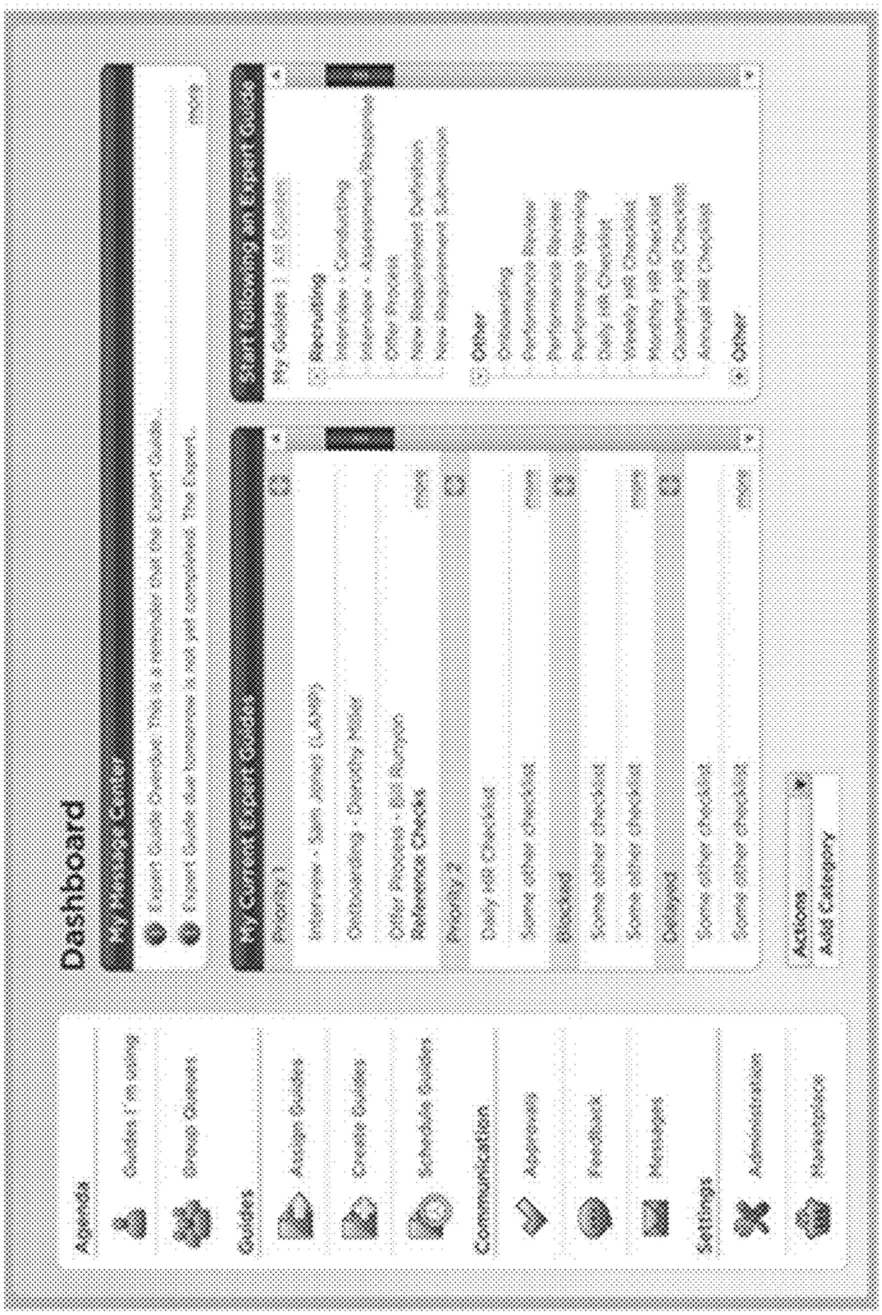
FIGS. 12A and 12B show examples of user interfaces for presenting a dashboard in accordance with some embodiments of the disclosed subject matter.
Figure 12B:
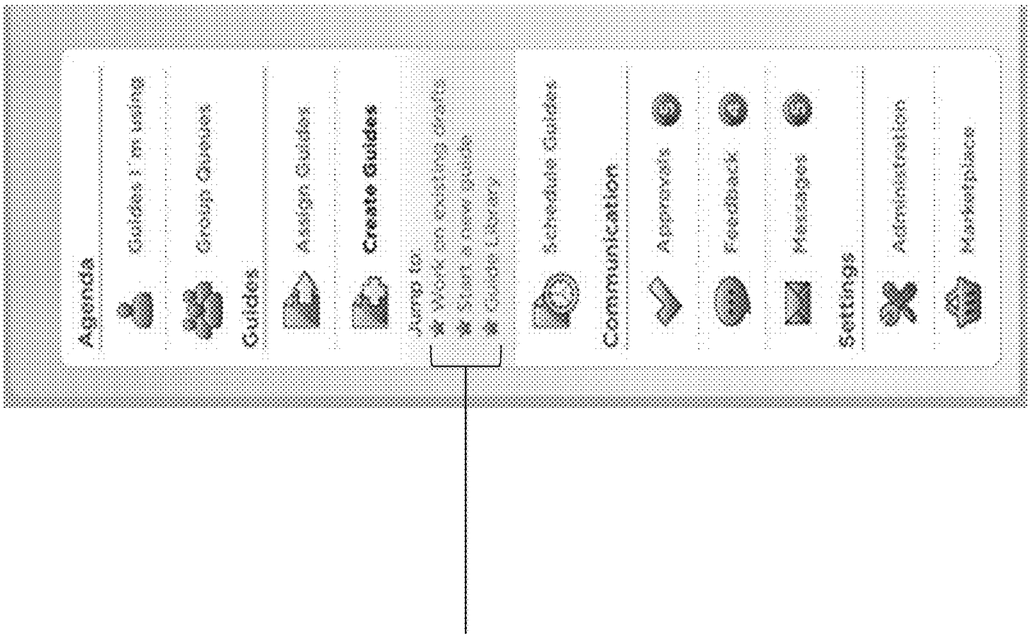

In accordance with some embodiments, using an interface 1202 that may be presented by a hardware processor of a computing device, the hardware processor can receive login information from a user. Upon receiving the login information, the hardware processor can present a dashboard, as shown in interface 1202 of FIG. 12A. The dashboard can contain one or more useful widgets that can help the user resume their work. The hardware processor can allow the user to view new internal messages, work on interactive checklists that have been assigned to them, access new interactive checklists, review alerts, review report summaries, and/or access any other widgets. The hardware processor can present a navigation menu 1204 on the left side of each screen as shown, for example in FIG. 12B. Each tab can allow the user to access a core component of the interactive checklist. Upon the hardware processor receiving a selection at a tab, the hardware processor can present a sub-navigation menu from the selected tab. For example, the hardware processor can present sub-navigation menu 1206 on navigation menu 1204 of FIG. 12B. This can allow the user to access key features on that tab. New communications can be brought to the user's attention with indicators. Alternately these dashboard widgets, or variants, may be used with any suitable third-party dashboard systems such as iGoogle™.

Figure 12C:
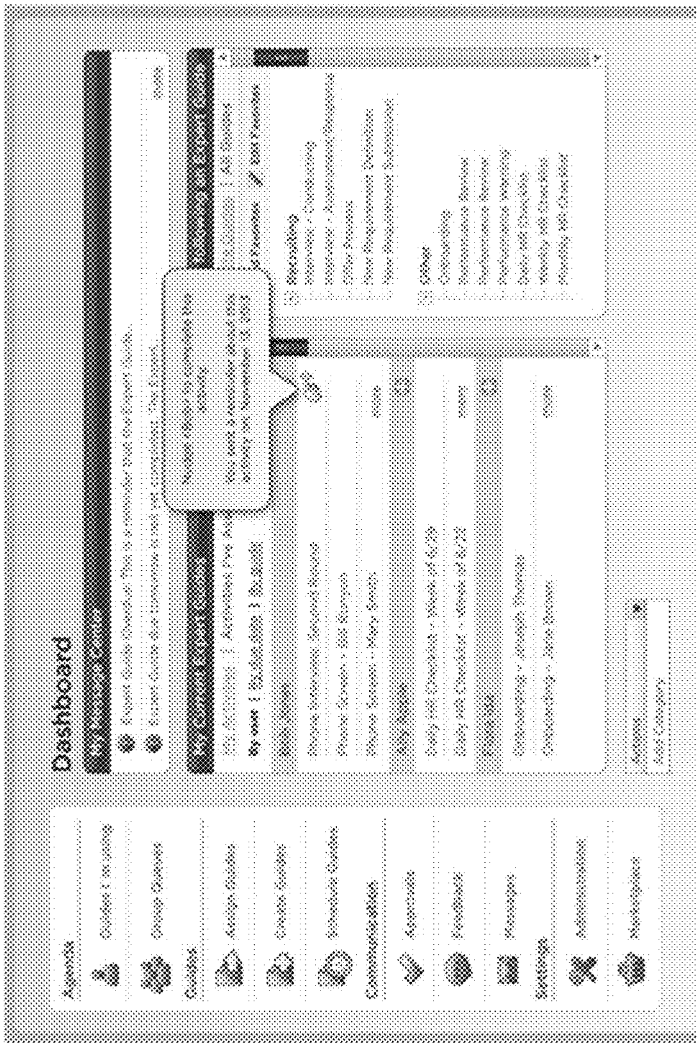
FIGS. 12C and 12D show examples of user interfaces for reminding a user to complete an activity in accordance with some embodiments of the disclosed subject matter.
Figure 12D:
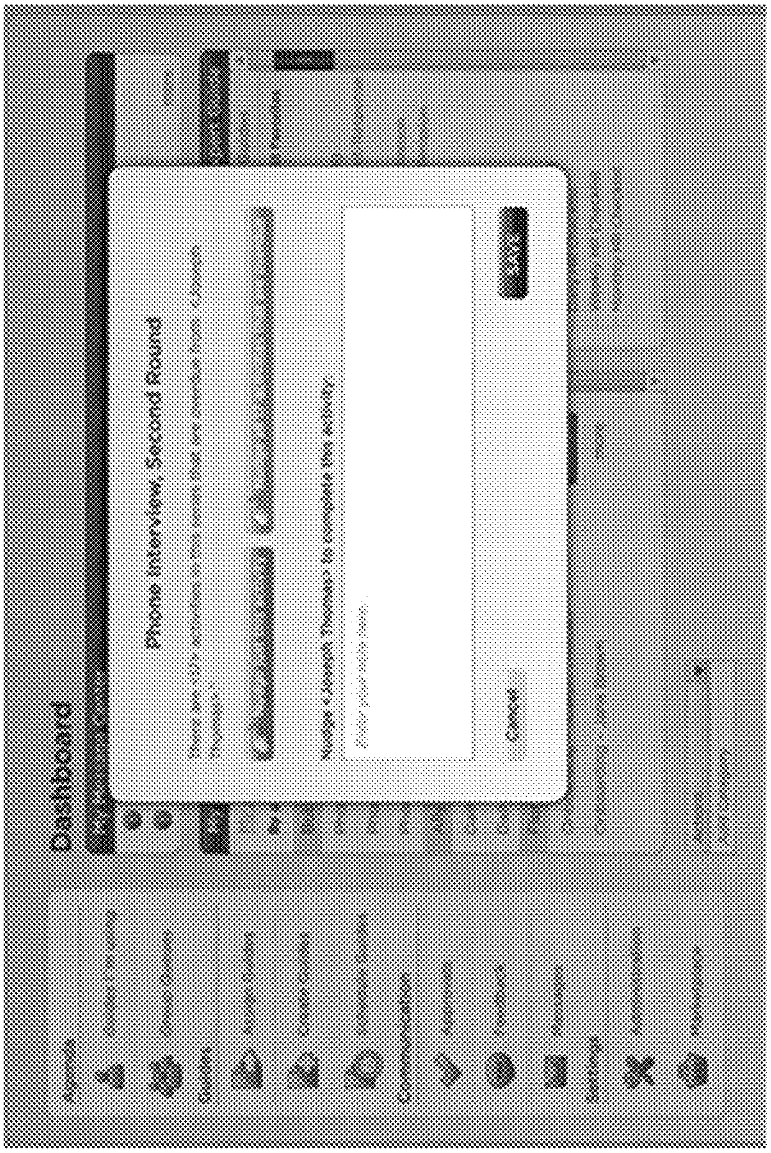
Figure 219:
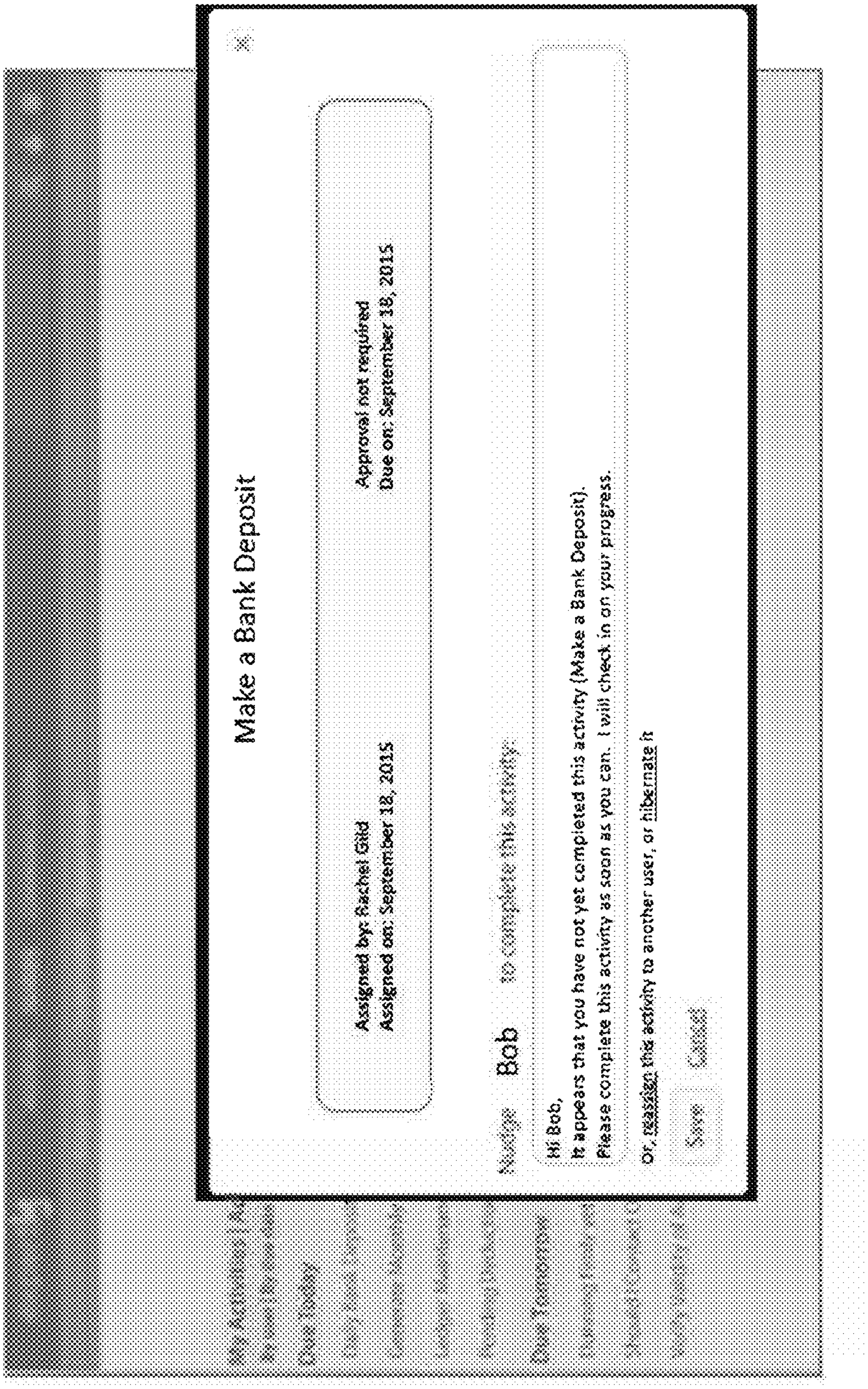
FIG. 219 shows an example of a user interface for reminding a user to complete an activity in accordance with some embodiments of the disclosed subject matter.

In accordance with some embodiments, the hardware processor can present outstanding assignments to remind users about overdue activities. The hardware processor can receive a user input to send additional reminders to other users about the overdue activities. The reminders can include additional information relevant to each individual situation. In some embodiments, if the overdue activity has not been completed, the hardware processor can present a "Nudge Feature" to remind and encourage completion of the activity, as shown in interface 1206 in FIG. 12C. A reminder sent in response to selection of the "Nudge Feature" can include any suitable information related to the activity, such as a deadline, a date the activity was assigned, other users involved in the activity, a message associated with the activity, one or more options to reassign the activity to other users, and/or any other suitable information. Note that, in some embodiments, the "Nudge Feature" can be used with any suitable user, including an assignee assigned to complete a particular activity and/or a reviewer assigned to review the particular activity. FIG. 219 shows a user interface for presenting details related to an activity in connection with the "Nudge Feature."

In accordance with some embodiments, the hardware processor can present smart suggestions based on a user's situation and selections. For example, if a user wishes to send a manual reminder about an activity in a series of activities (e.g., preparing weekly reports), the hardware processor can suggest sending reminders for other outstanding activities in the series. In such an example, the hardware processor can present a single reminder to be sent to cover a single activity or a series of related activities (e.g., all activities in a series that are overdue). As another example, in some embodiments, the hardware processor can present a smart suggestion of a delegation of an activity to another user. For example, in some embodiments, the hardware processor can identify other users in a team and/or in a group that have completed similar activities and suggest the identified users as suitable candidates to delegate an activity. As yet another example, in some embodiments, the hardware processor can determine and suggest deadlines for creating, reviewing, and/or revising activities, for example, based on schedules associated with other activities. As a more particular example, in some embodiments, the hardware processor can identify deadlines for an activity that are less likely to conflict with schedules of other activities. As still another example, in some embodiments, the hardware processor can identify activities for which a user is likely to want to delegate and/or modify a schedule associated with the activity. As a more particular example, in some embodiments, the hardware processor can identify an activity to delegate and/or modify the schedule for based on deadlines associated with other activities assigned to the user. The hardware processor can then present a suggestion that the user delegate the activity and/or modify the schedule associated with the activity. As still another example, in some embodiments, the hardware processor can suggest a Guide to use for a particular situation and/or activity. For example, in some embodiments, the hardware processor can identify one or more Guides associated with keywords that correspond to the situation and/or activity and can suggest that the user use one of the identified Guides.

Figure 13:
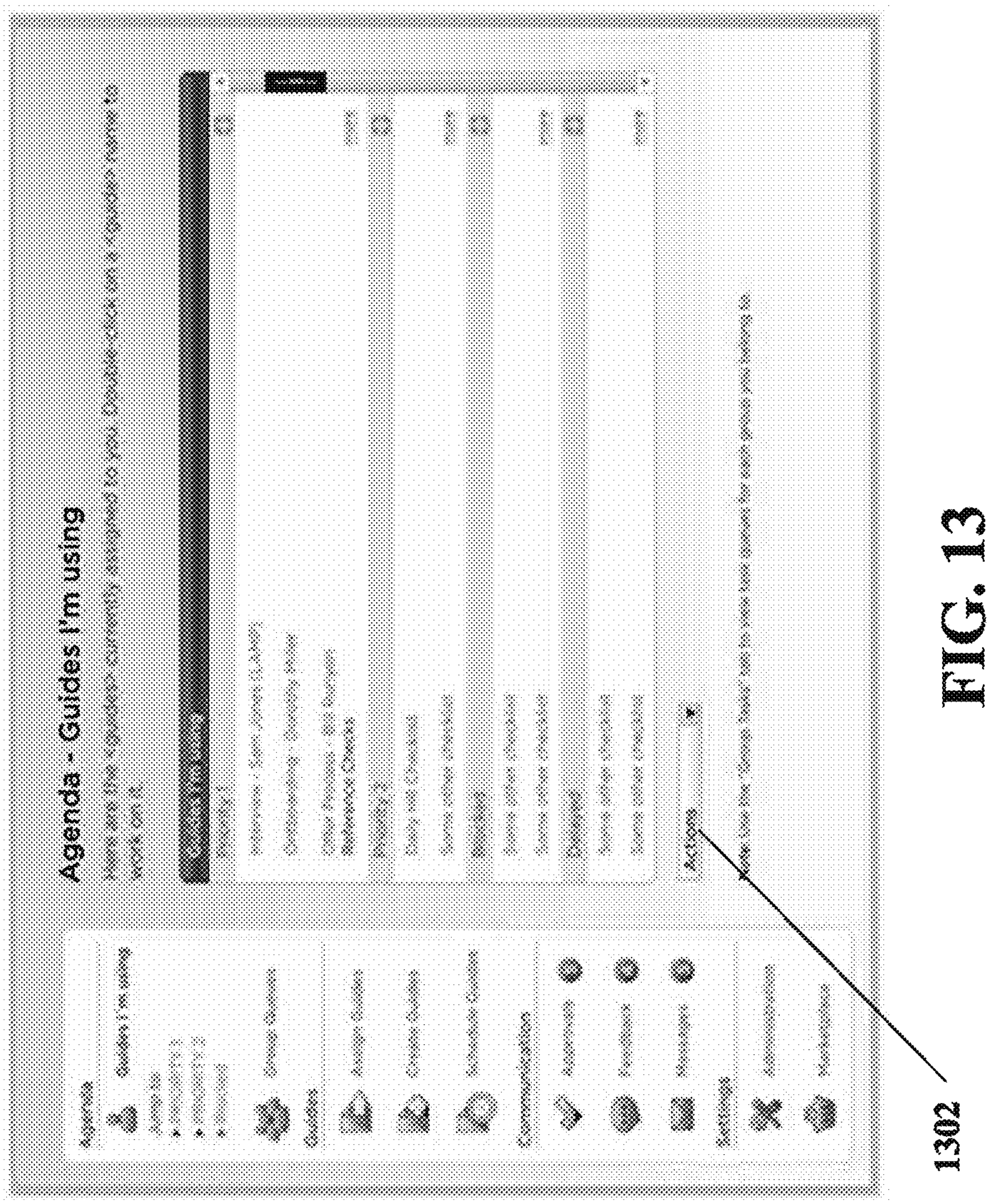
FIGS. 13 and 14 show examples of user interfaces for assigned interactive checklists in accordance with some embodiments of the disclosed subject matter.
Figure 14:
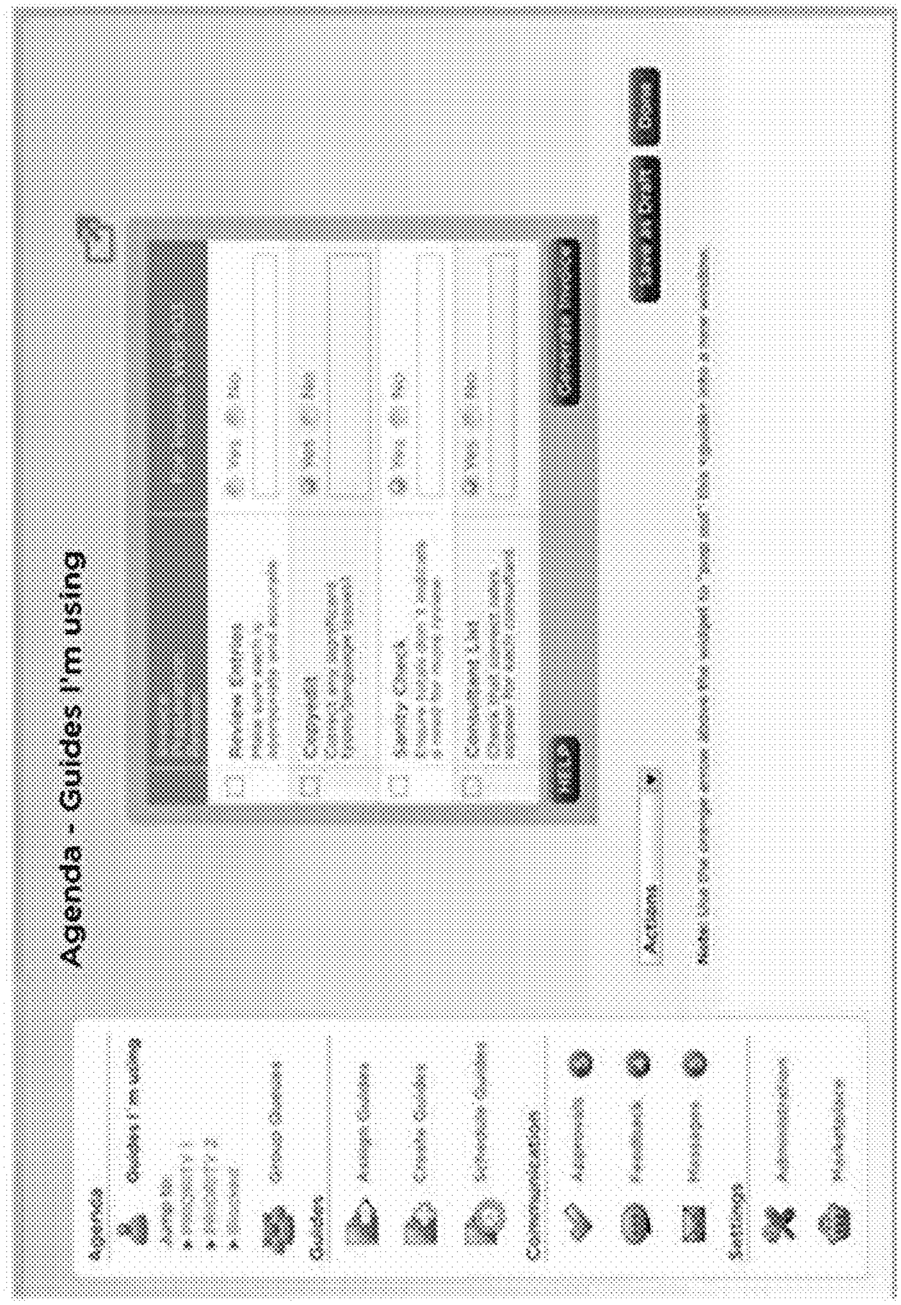

In accordance with some embodiments, using an interface 1300 that may be presented by a hardware processor of a computing device, the hardware processor can present an interactive checklist assigned to a user using a "My Activities" features. Upon selecting "My Activities" tab 1302, the hardware processor can present a list, as shown, for example, in interface 1300 of FIG. 13. In another example, a user can also access this list on a dashboard. The hardware processor can allow the user to organize the interactive checklists into categories of their choosing, such as "Priority 1, Priority 2, Priority" and/or "This Week, Next Week, In Two Weeks." In accordance with some embodiments, nested "child-level" checklists of an Activity that can be viewed at "My Activities" will not be displayed there. In accordance with some embodiments, the hardware processor can allow a user can reorder or move interactive checklists from one category to another using a drag and drop mechanism. Once a particular interactive checklist is selected from the list, the hardware processor can take the user to an interface within the interactive checklist itself. In some embodiments, using an interface 1400 that may be presented by a hardware processor of a computing device, the hardware processor can allow a user to work on the interactive checklist, for example as shown in FIG. 14. Additionally or alternatively, the hardware processor can present the interactive checklist from this interface to a new, second interface. The hardware processor can receive a number of user inputs indicating actions such as including, splitting, unsplitting, delegating and/or undelegating steps.

Figure 15:
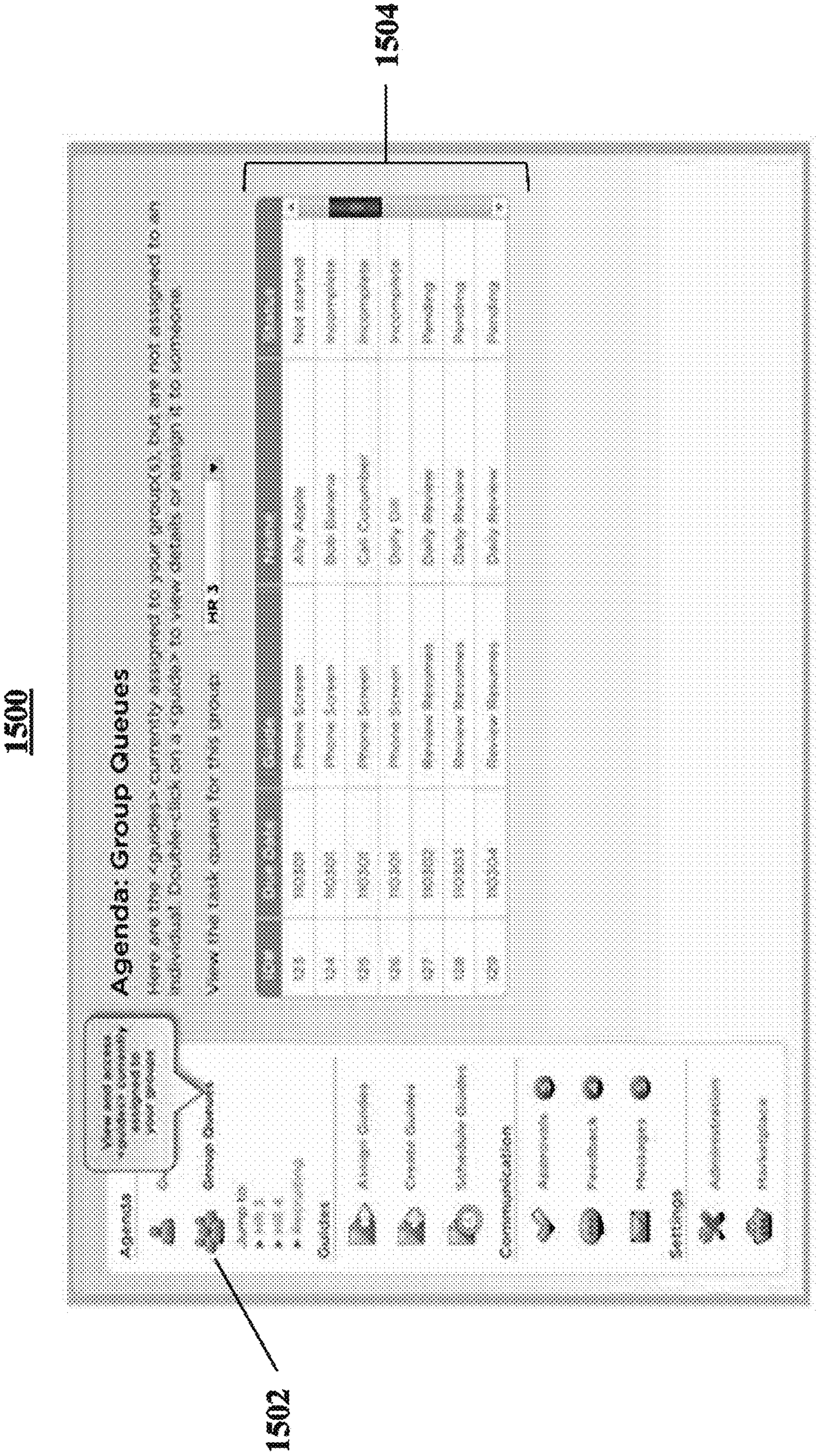
FIGS. 15 and 16 show examples of user interfaces for presenting group queues in accordance with some embodiments of the disclosed subject matter.
Figure 16:
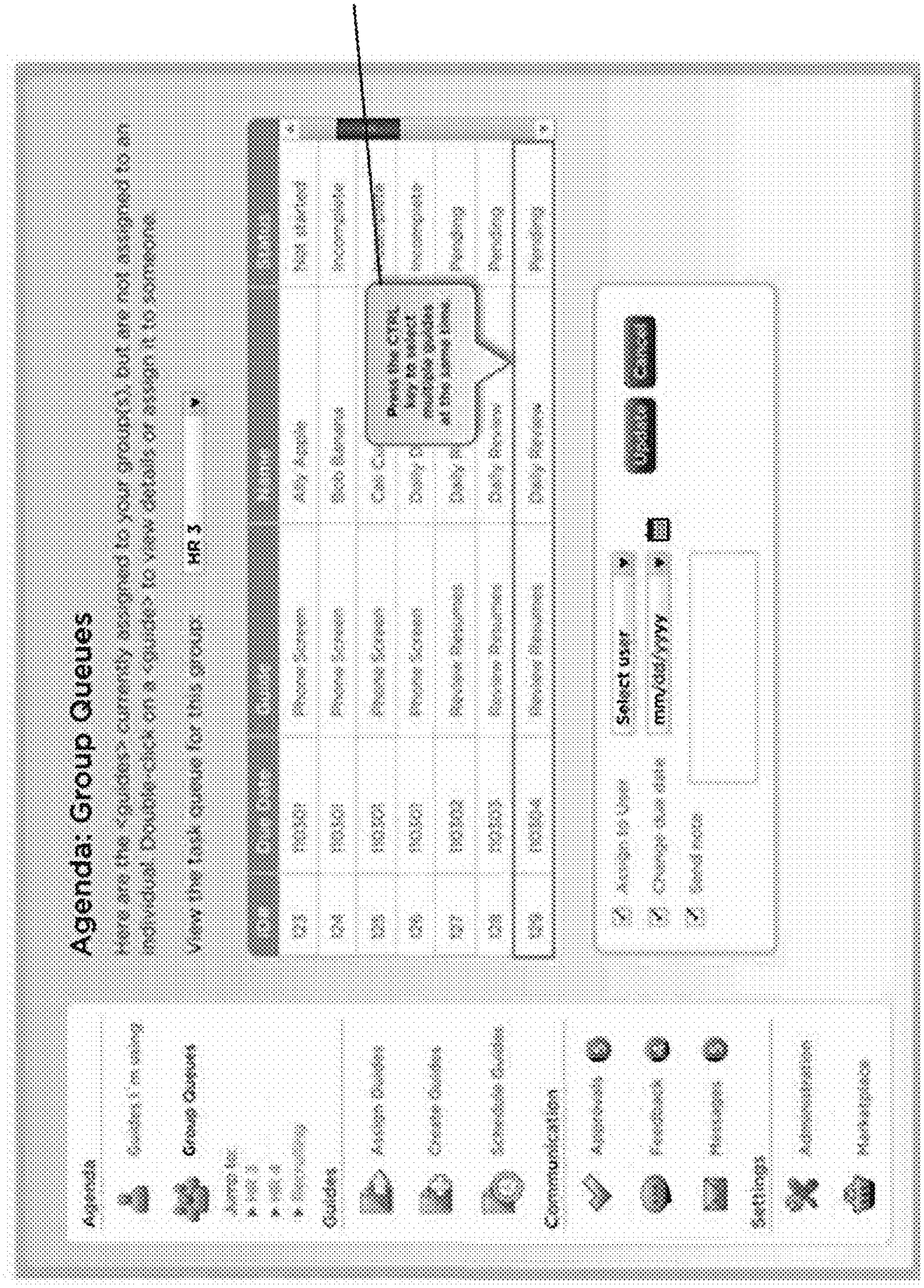

In accordance with some embodiments, as shown in FIG. 15, using an interface 1500 that may be presented by a hardware processor of a computing device, the hardware processor can receive a user input at "Group Queues" tab 1502 (e.g., by clicking). Upon receiving the user input at tab 1502, the hardware processor can display interactive checklists that have been assigned to groups to which they belong, either as specific groups and/or as aggregates of specific groups. For each group, the hardware processor can display the assigned interactive checklists, due dates and/or time, current status, and/or any other available information as shown in table 1504 of interface 1500 of FIG. 15. The hardware processor can receive user actions on the interactive checklists in group queues, either by assigning an interactive checklist to an individual user (e.g., with a note) and/or by changing the due date of the interactive checklist. Such actions can be performed on individual interactive checklists and/or in bulk on multiple interactive checklists at once. For example, snippet 1602 of interface 1600 of FIG. 16 shows that multiple interactive checklists can be selected at the same time. In some embodiments, an assignment may be made as a "suggested assignment", which can be accepted, reassigned or possibly taken by another user, possibly depending on context.

In some embodiments, a user can request that another user create a new interactive checklist or update an existing interactive checklist. For example, a user can assign the creating of an interactive checklist to another user (e.g., someone who has previously done the activity). Additionally and/or alternatively, the user can assign the creating of the interactive checklist to the other user in conjunction with a particular activity that the other user should complete. In such an example, the other user can create the interactive checklist and complete the particular activity at the same time. Upon completion of the interactive checklist, the interactive checklist can be routed to any approvers, who can approve it or send it back for modification. Note that, in some embodiments, a reviewer role can be configured, and a user designated as a reviewer can be assigned fewer responsibilities than a user assigned to other types of approver roles. In some embodiments, a user can choose to fill in details of a "Test Activity" while completing the activity to determine how the activity should be completed and identify missing elements.

Figure 17:
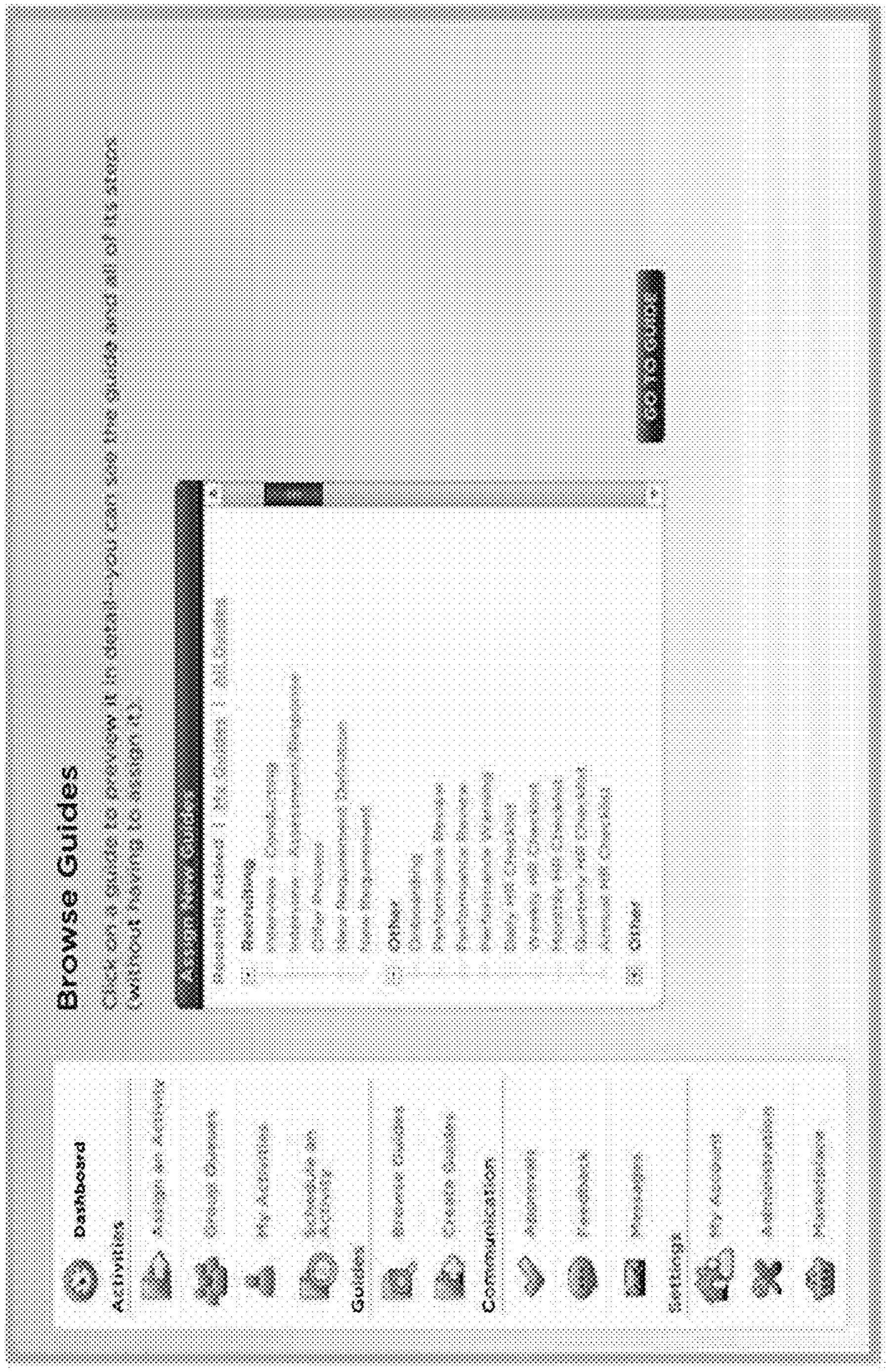
FIGS. 17, 18A, and 18B show examples of user interfaces for navigating an existing library of interactive checklists in accordance with some embodiments of the disclosed subject matter.
Figure 18A:
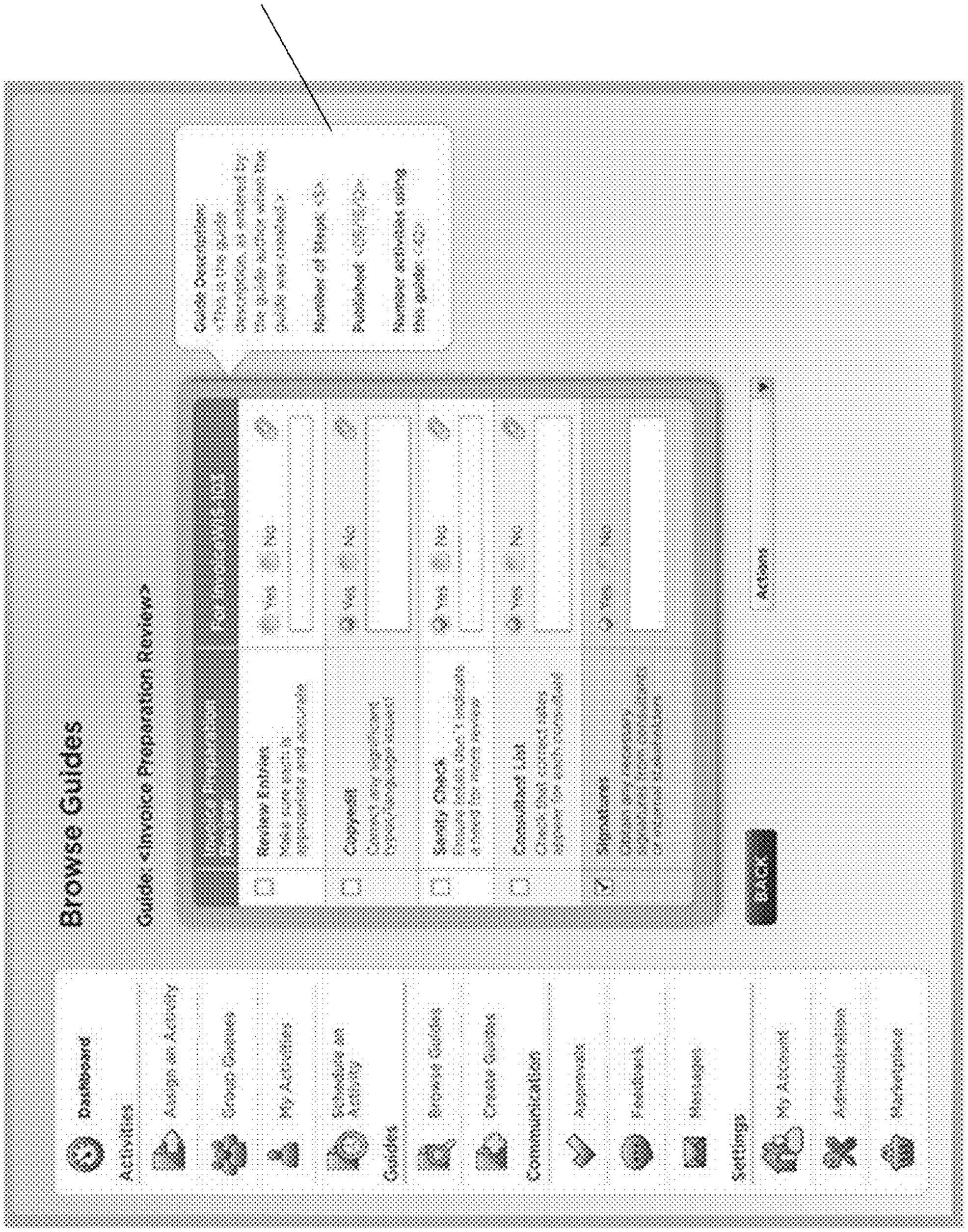

In accordance with some embodiments, using an interface 1700 that may be presented by a hardware processor of a computing device, the hardware processor can allow navigation of an existing library of interactive checklists. The hardware processor can allow the user to view all interactive checklists available to them through a number of filters, as shown, for example, in interface 1700 of FIG. 17. Once an interactive checklist is selected, the hardware processor can display the full interactive checklist in detail. Additional information about the interactive checklist, such as a description, a number of times it has been used, as well as any other additional information can be presented by the hardware processor to help give the user context. For example, as shown, in FIG. 18A, using a user interface 1800 that may be presented by a hardware processor of a computing device, the hardware processor can display for a checklist, a description of the checklist, a number of times it has been used, a publication date, and a number of activities performed using the interactive checklist at area 1804. The user can take actions using the selected interactive checklist, if desired. In some embodiments, the user's track record for completing the interactive checklist successfully and for completing the interactive checklist by the deadline can be shown when an assignment is being created.

Figure 18B:
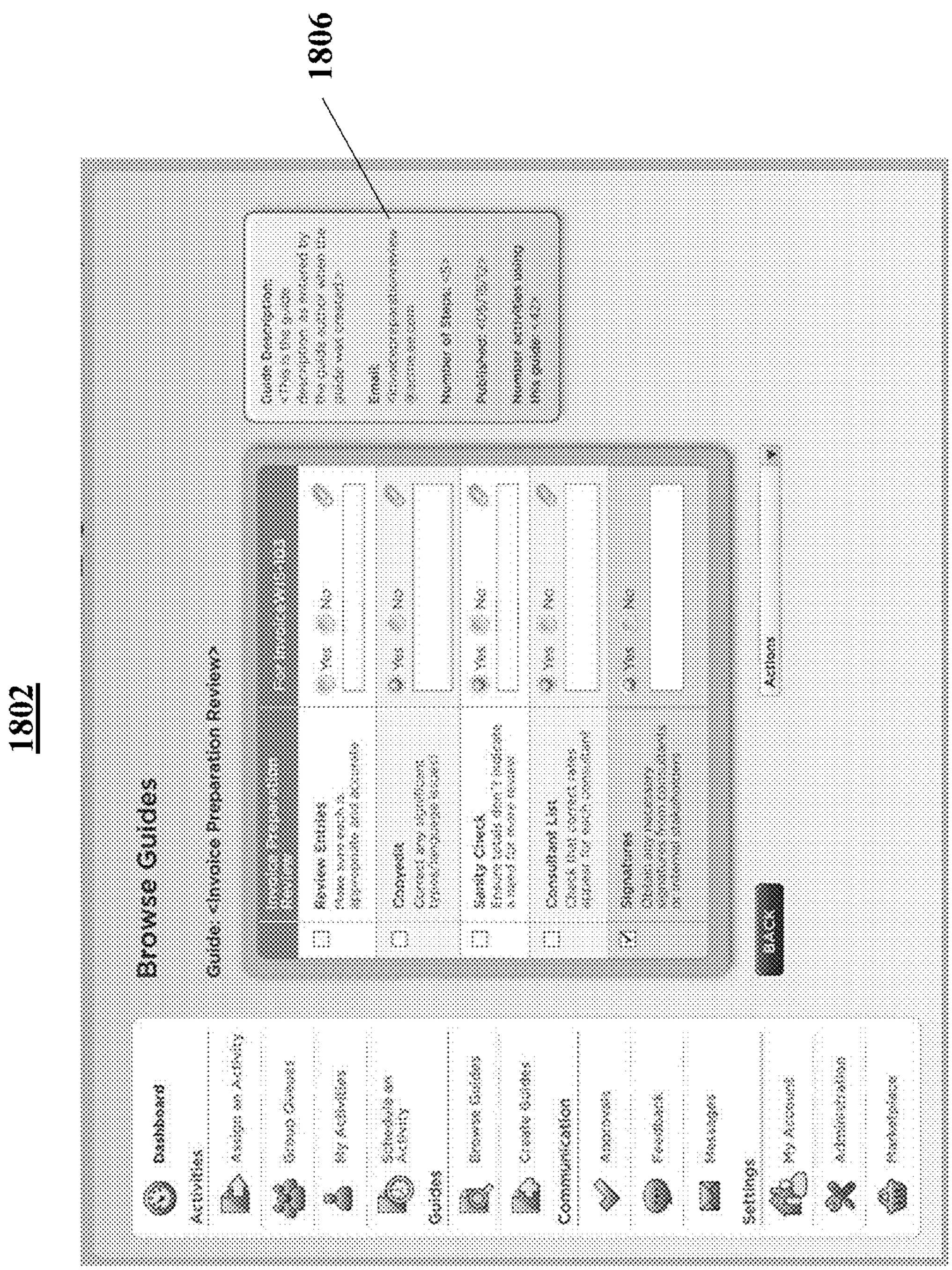

Turning to FIG. 18B, as shown in interface 1802, the interactive checklist is automatically given an email address as shown in 1806. A user can carbon copy or forward an email to any email address of the interactive checklist. Additionally or alternatively, an activity can be automatically created (filled in with details) and sent to all the users in an email confirmation. Any follow-up messages in an email chain may be recorded. Moreover, a user can carbon copy the email address to ensure that the email does not get lost or misplaced (e.g., spam filter).

Figure 18C:
FIGS. 18C, 18D, and 18E show examples of user interfaces for prefilling answers to one or more steps in accordance with some embodiments of the disclosed subject matter.
Figure 18D:
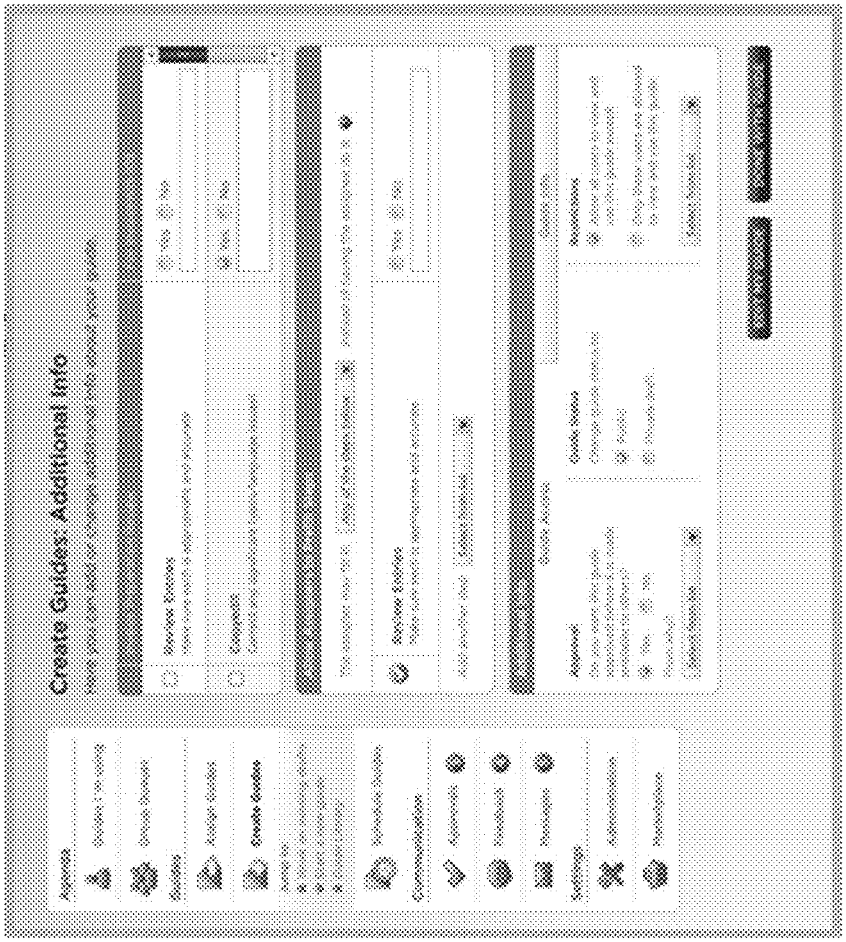
Figure 18E:
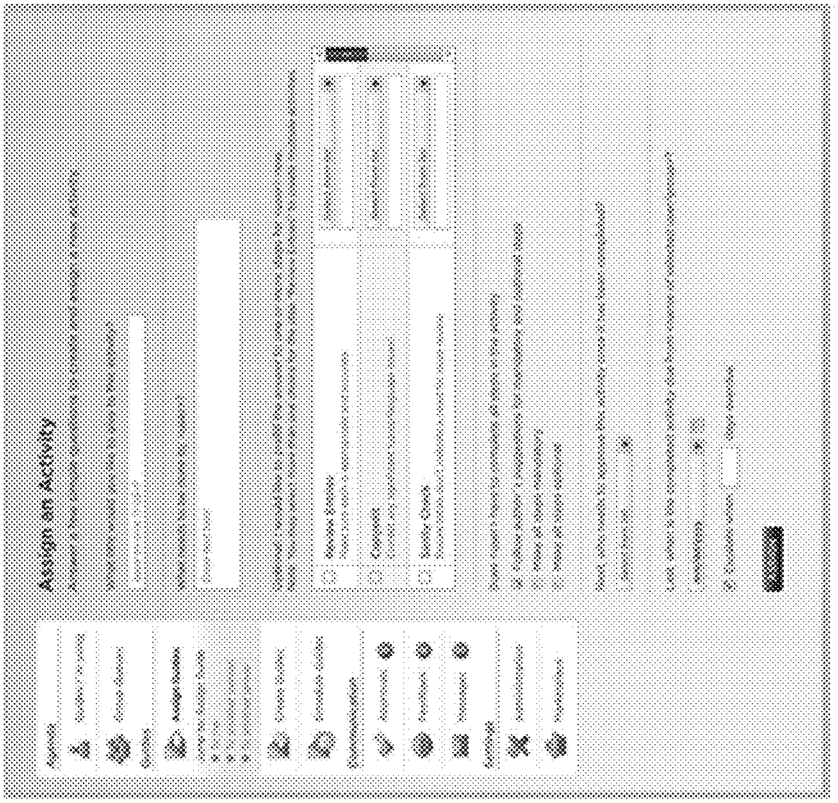

In accordance with some embodiments, the hardware processor can receive a user input indicating that a user has prefilled answers to one or more steps in an activity, as shown in interface 1808 of FIG. 18C. Upon assigning an activity, the hardware processor can receive a user input indicating that a user is prefilling the answers to one or more steps in the activity. In such an instance, a user of the original guide can optionally include requirements or restrictions for prefilling the steps, as shown in interface 1810 of FIG. 18D. In some embodiments, the hardware processor can receive a user input indicating one or more parameters and that the user is assigning multiple activities for each parameters, as shown in interface 1812 of FIG. 18E. For example, assigning multiple activities for each parameter can include assigning the same report to multiple employees, following the same sales process for multiple different prospects, preparing monthly invoices for each of a company's clients, assigning a project update report for multiple projects to a single individual, and/or any other suitable scenario. In some embodiments, the prefilled answers can be retrieved from external sources (e.g., a Web service or a database) or through data stored internally.

Figure 19A:
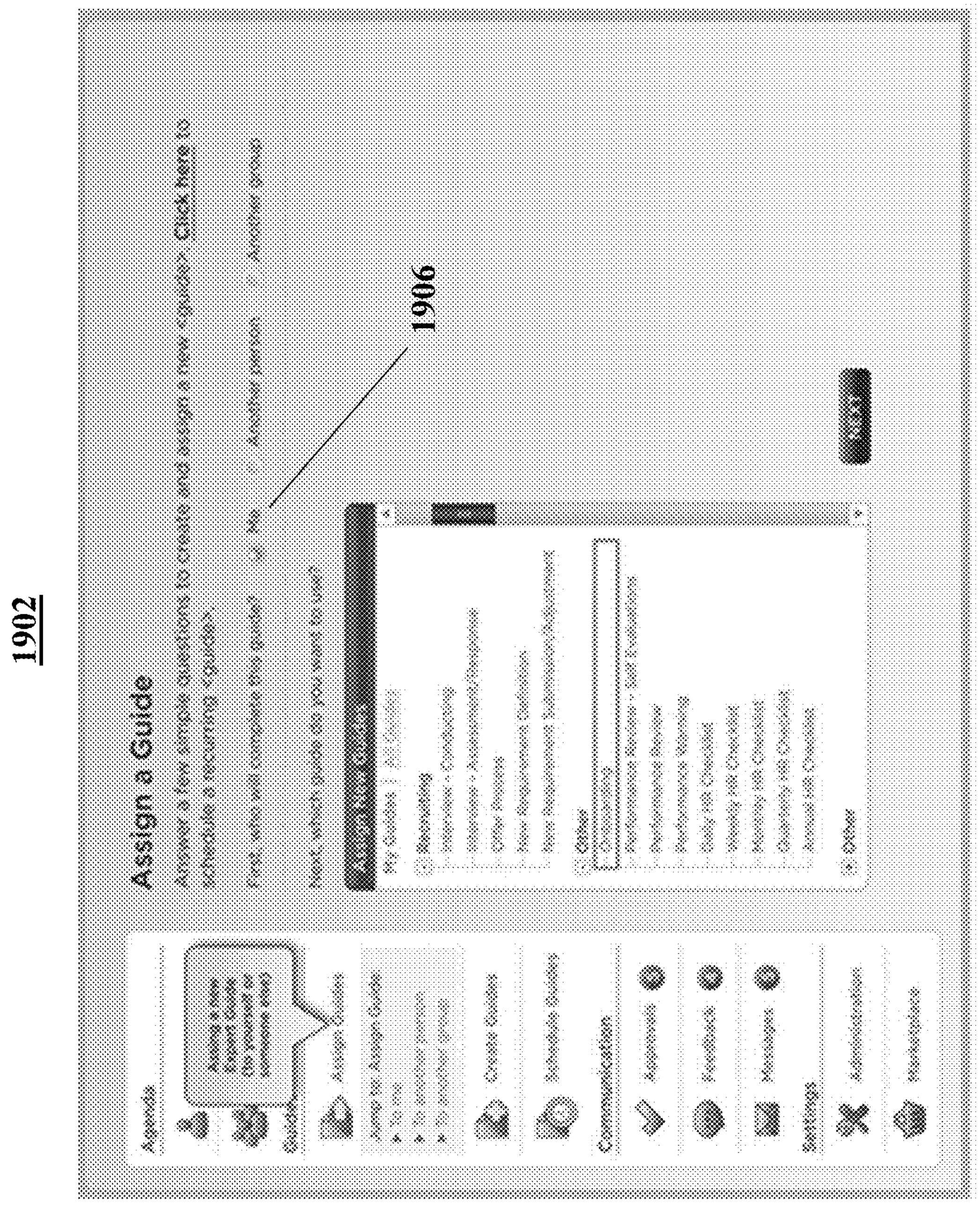
FIGS. 19A, 19B, 20A, 20B, and 20C show examples of user interfaces for assigning interactive checklists in accordance with some embodiments of the disclosed subject matter.
Figure 19B:
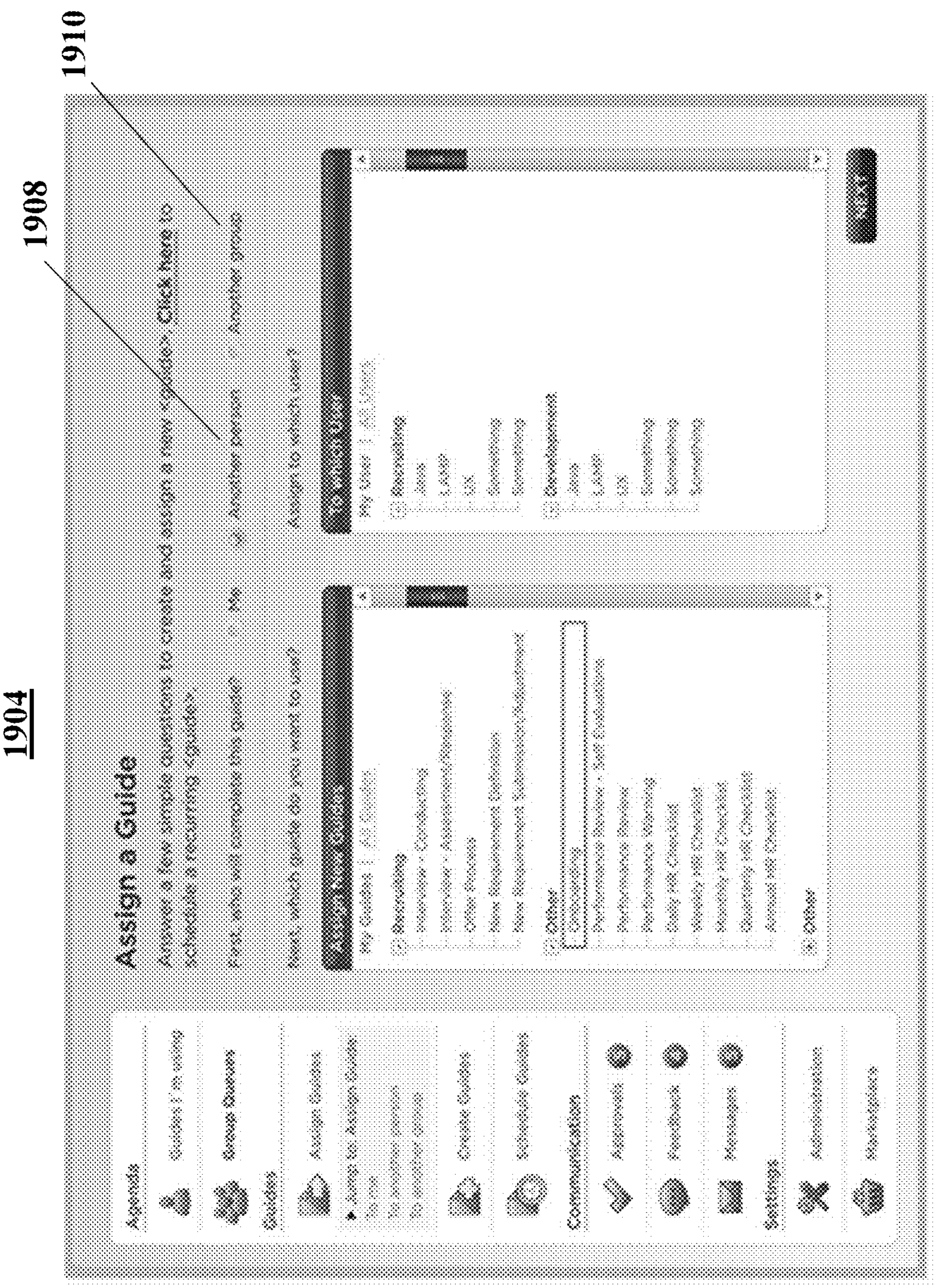

In accordance with some embodiments, using an interface 1902 that may be presented by a hardware processor of a computing device, the hardware processor can display questions for a user to answer. An example is shown in interfaces 1902 and 1904 of FIG. 19A and FIG. 19B. First, the hardware processor can receive a user selection of who can complete the interactive checklist, and receive a user selection of which interactive checklist can be used. If the interactive checklist is assigned to the user, the user can select to which individual user or which group of users to assign the interactive checklist. For example, in interface 1902 of FIG. 19A, the user has selected "Me" 1906, while in interface 1904 of FIG. 19B the user has selected "Another Person" 1908. Alternately multiple assignments can be made at once, to more than one user and/or group of users by selecting "Another Group" 1910.

Figure 20A:
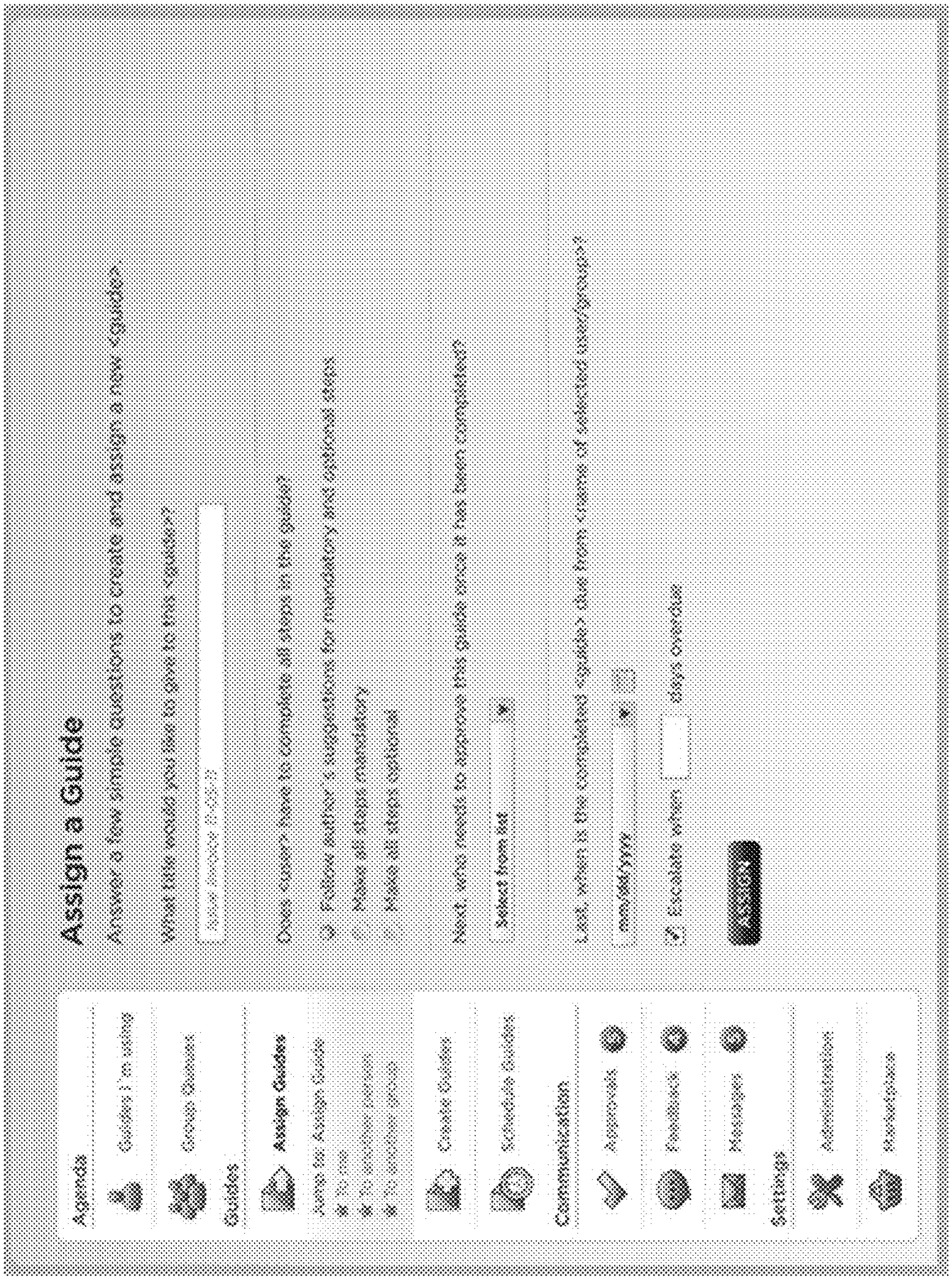
Figure 20B:
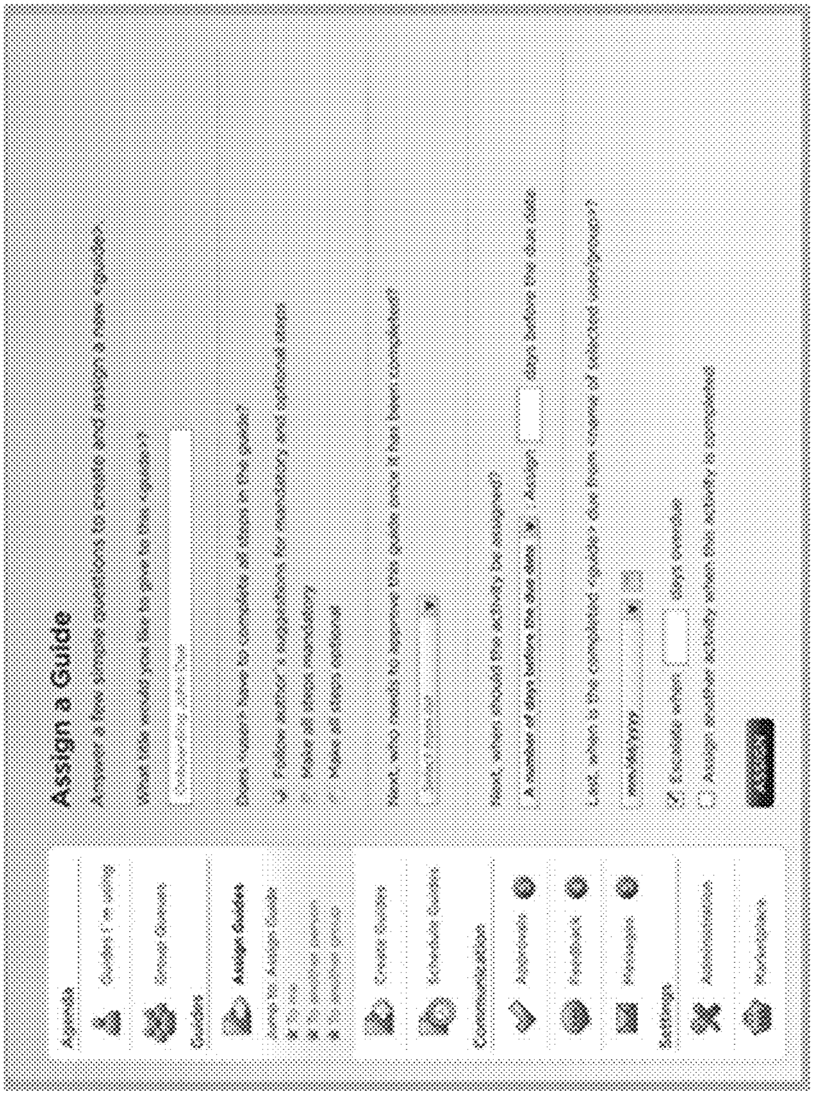
Figure 20C:
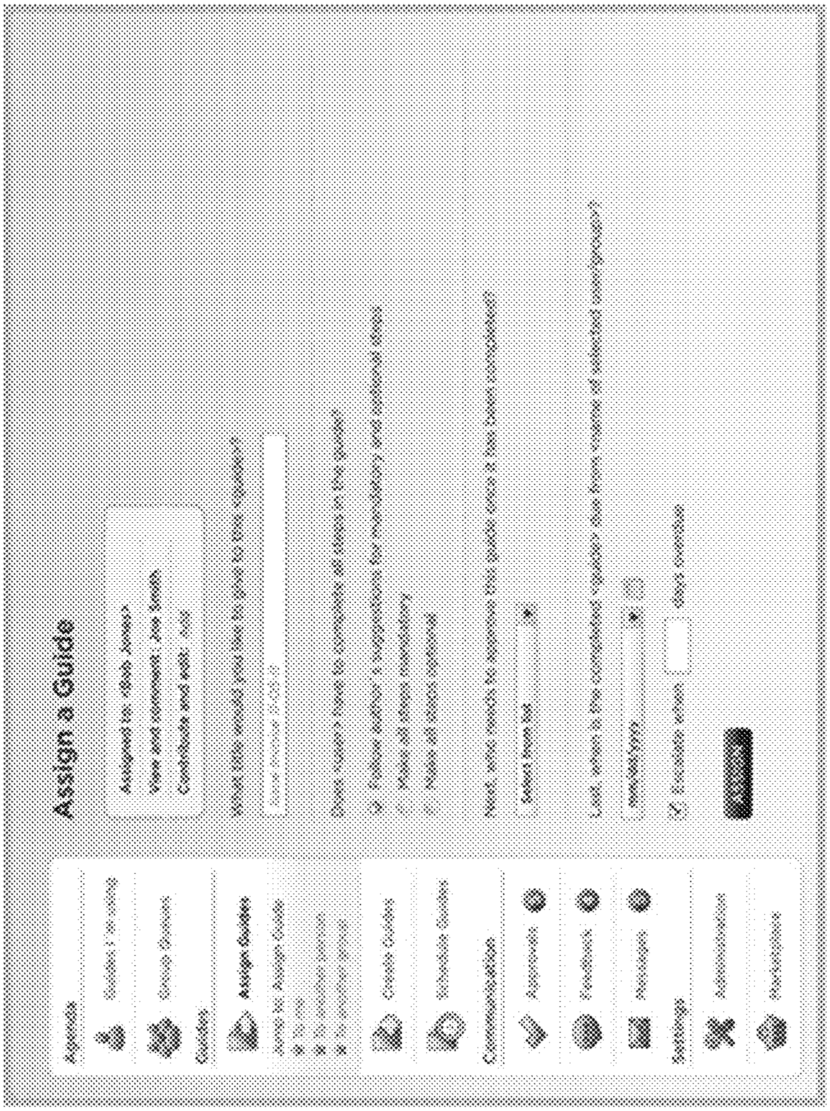

In accordance with some embodiments, as shown in interface 2000 of FIG. 20A, using an interface 2000 that may be presented by a hardware processor of a computing device, the hardware processor can present a prompt to the user for more pieces of information, such as, to give a title or description to an assignment, to provide attachments (possibly including email content), to indicate whether one or more of the steps in the interactive checklist are mandatory or optional, to indicate if a completed interactive checklist needs approval, to indicate a due date, and/or answer any other questions prompted by the interactive checklist. The interactive checklist can then be assigned to a designated user or group of users and can appear in their queue. In some embodiments, the hardware processor can receive a user input to configure a variety of automatic actions among assignments as in interface 2002 of FIG. 20B. For example, a second assignment can start as soon as a first assignment is completed. In some embodiments, the hardware processor can receive a user input to designate one or more associates to assist with an activity, as shown in interface 2004 of FIG. 20C. In some embodiments, a user interface for designating one or more associates can include any suitable user interface controls (e.g., a text input box, etc.) to describe a role of the designated associate(s) and/or to indicate activities or actions the associate is to work on. Additionally, the hardware processor can receive a designation of a level of involvement for each associate assigned.

In accordance with some embodiments, an assignment may not require or possibly even prompt for an assignee, and/or approvers. Alternatively, it may automatically assign to particular users or groups; and/or automatically set the approvers to particular users or groups. In some embodiments, a user can indicate the Assignee or the Approver by virtue of a relationship. For example, the Approver can be set to be "a direct manager of this assignee," "a QA Lead assigned to this project,", or "a system administrator assigned to this user's unit."

In some embodiments, the hardware processor can receive "assignment permissions" that can indicate who may submit a request for a type of interactive checklist to be assigned to a person or a group's queue. Additionally, the "Assignment Permissions" can indicate who may prepopulate certain steps that show details pertaining to the assignment. For example, for a new user creation request, the desired name, email, and role for that user can be viewed. Alternatively, "Assignment Permission" cannot allow a user to view the rest of the interactive checklist, what has been completed, and/or what steps are involved. In some embodiments, the "Assignment Permissions" can be preconfigured. For example, depending on the configuration, the hardware processor can send notifications to the user upon completion of the request with certain details (e.g., what was created) in any suitable manner, such as by email.

Figure 21A:
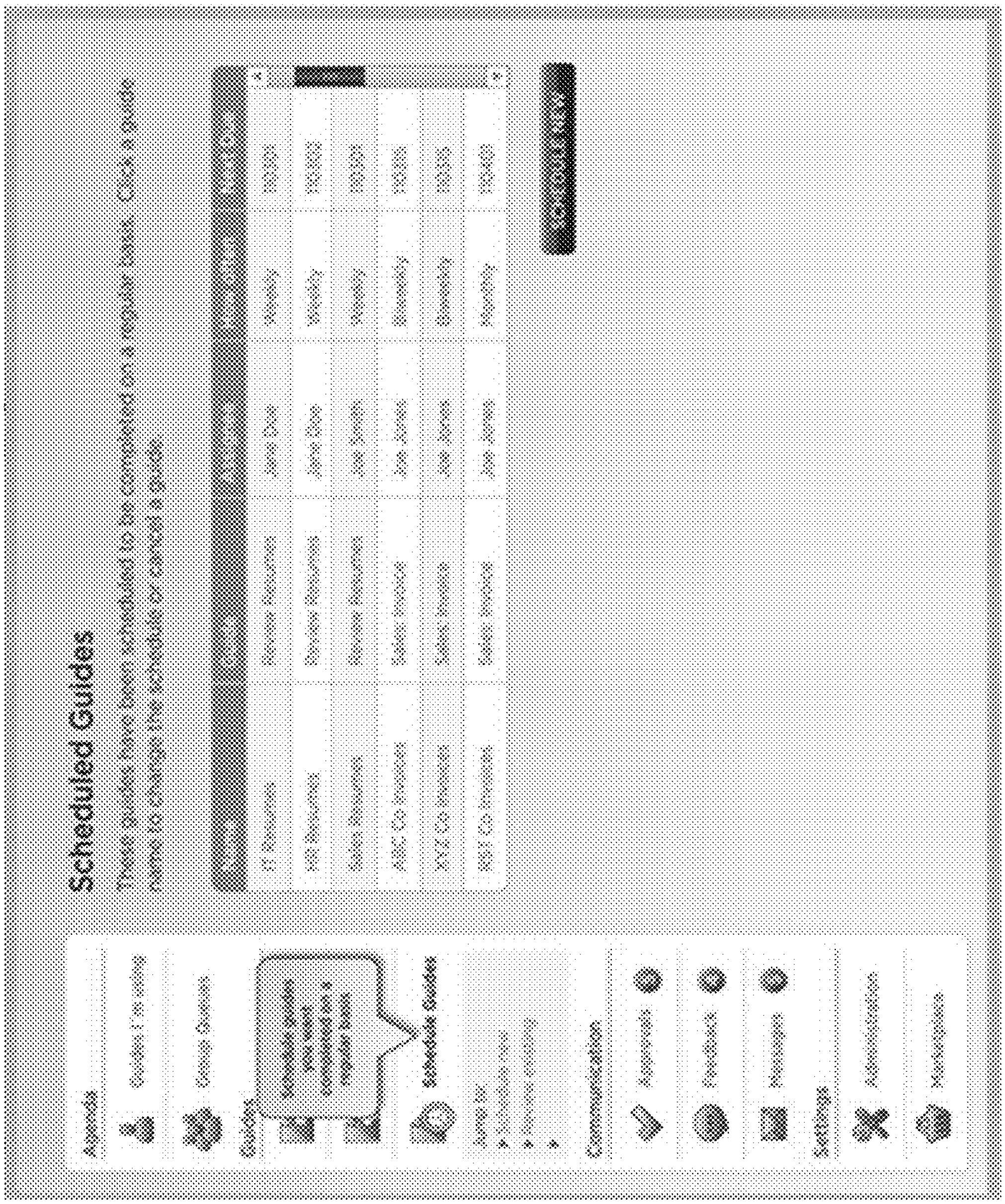
FIGS. 21A, 21B, 21C, 21D, 21E, 21F, 21G, 21H, and 21I show examples of user interfaces for scheduling an interactive checklist in accordance with some embodiments of the disclosed subject matter.
Figure 21B:
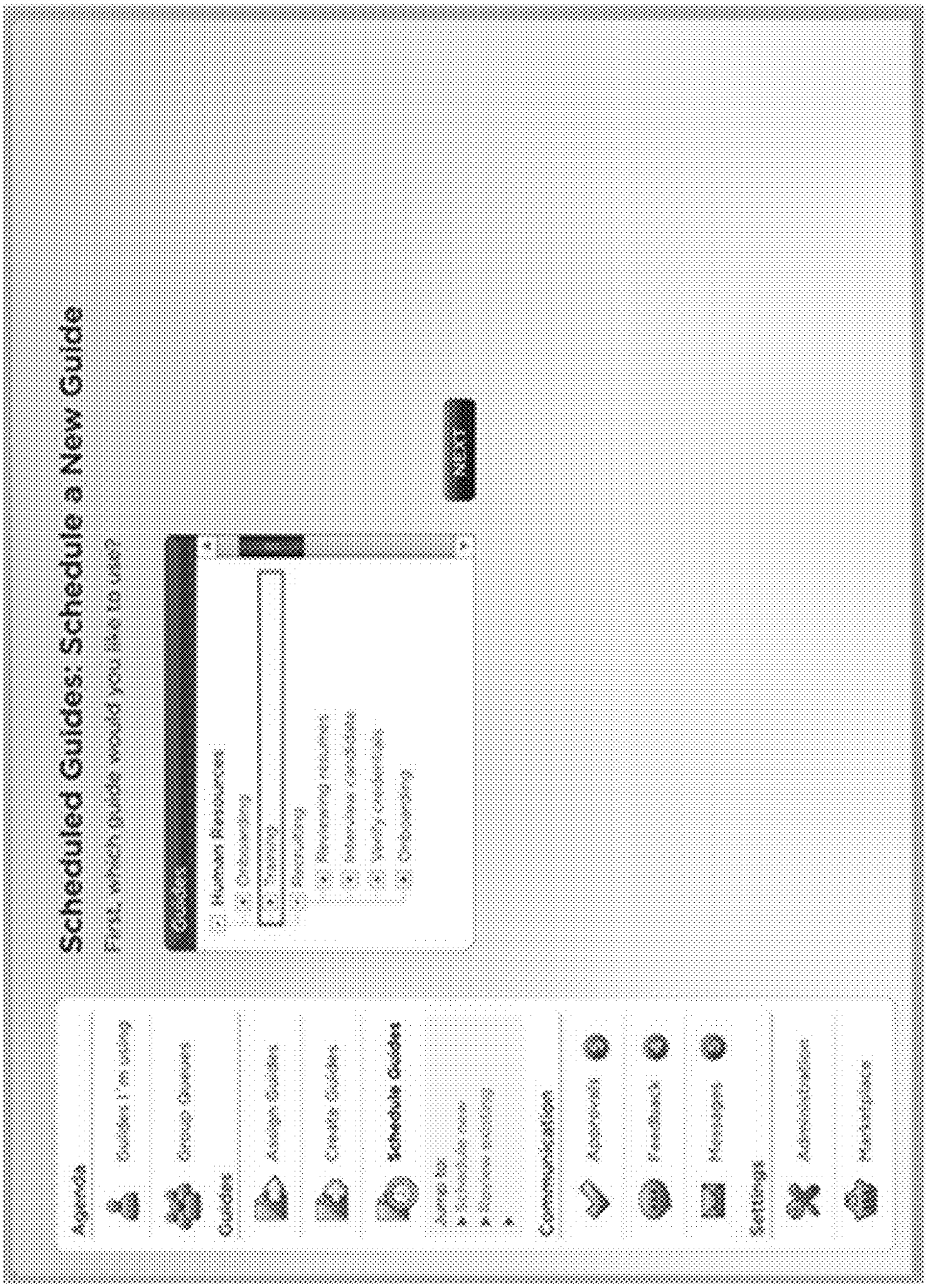

In accordance with some embodiments, a user may want to assign an interactive checklist on a recurring basis either to be completed once a week, every quarter, annually, and/or any other length of time, either indefinitely or until a specified date or for a number of assignments. Rather than manually assigning each interactive checklist, using an interface 2102 that may be presented by a hardware processor of a computing device, the hardware processor can present a "Scheduled Guide," as shown in FIG. 21A, which can enable a user to enter information just once. As with assigning a single interactive checklist, scheduling an interactive checklist can be a simple process. In some embodiments, using a user interface 2104 that may be presented by a hardware processor of a computing device, the hardware processor can receive a user selection to indicate which interactive checklist the user wishes to assign, as shown in FIG. 21B.

Figure 21C:
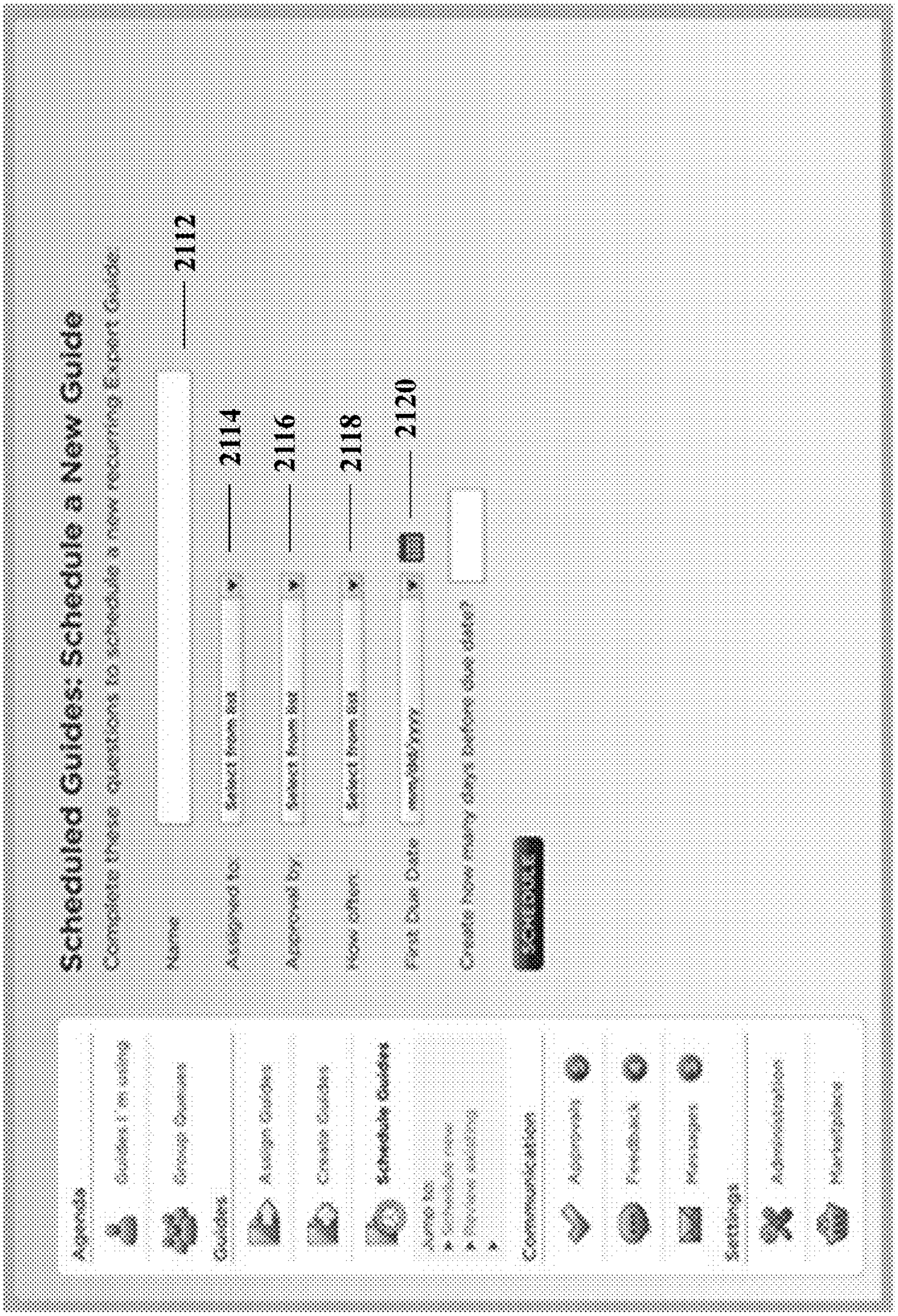

In accordance with some embodiments, as shown in FIG. 21C, using an interface 2106 that may be presented by a hardware processor of a computing device, the hardware processor can receive additional pieces of information, such as the title of the interactive checklist 2112, the user or group who should complete the interactive checklist 2114, the option to assign separately to each member of a group and/or for each element of a set (for example an invoicing assignment could be assigned for each member of a set of active clients), a user to approve the interactive checklist (if needed) 2116, how often the interactive checklist can be assigned (daily, weekly, and/or any other length of time) 2118, when a first interactive checklist may be due 2120, and/or any other suitable information. Once an interactive checklist is scheduled, it can be assigned and completed on a recurring basis until the user decides to cancel it or no longer has an active account. Additionally and/or alternatively, the interactive checklist can be assigned and completed on a recurring basis until the user sets and end date.

Figure 21D:
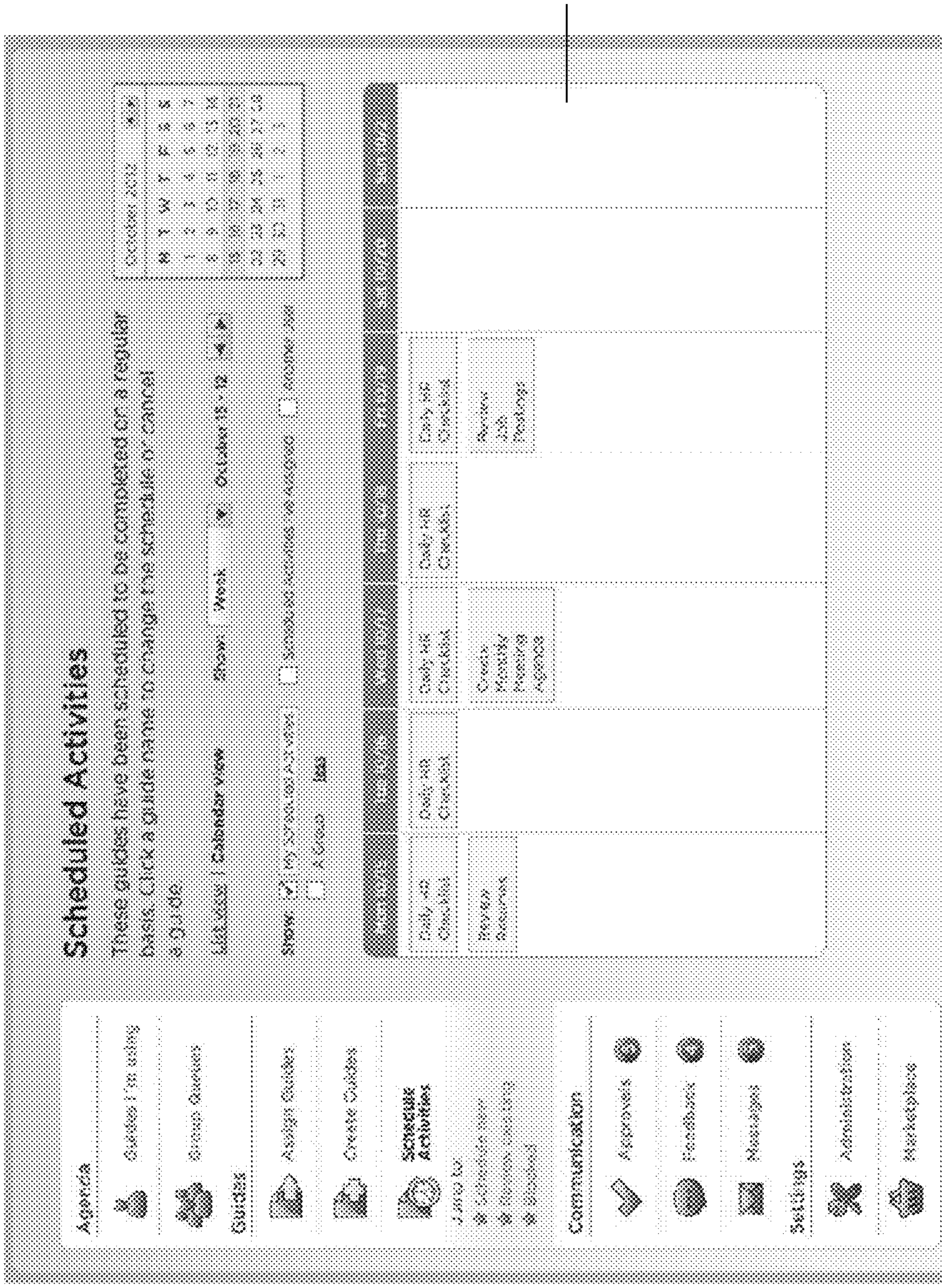

In accordance with some embodiments, as shown in FIG. 21D, using an interface 2000 that may be presented by a hardware processor of a computing device, the hardware processor can present a "Calendar View" feature that may help a user see the user's scheduled (and non-recurring) activities in order to show the user's upcoming workload at a glance. For example, the hardware processor can display the user's upcoming assignments as shown by calendar 2122. Additionally, calendar 2122 can be displayed in a "day," a "week," a "month," or a "multi-month" (e.g., three months, six months, nine months, twelve months) view. Note that, in some embodiments, calendar events can be synchronized with any suitable external calendars (e.g., a Google calendar, an iCal calendar, and/or any other suitable external calendars). In some such embodiments, activities and/or due dates can be presented in the external calendar. Additionally, note that, in some embodiments, a user may be presented with an indication that one or more due dates or meeting times occur at different times (e.g., based on different time zones) for one or more other users involved in an activity or meeting.

Figure 21E:
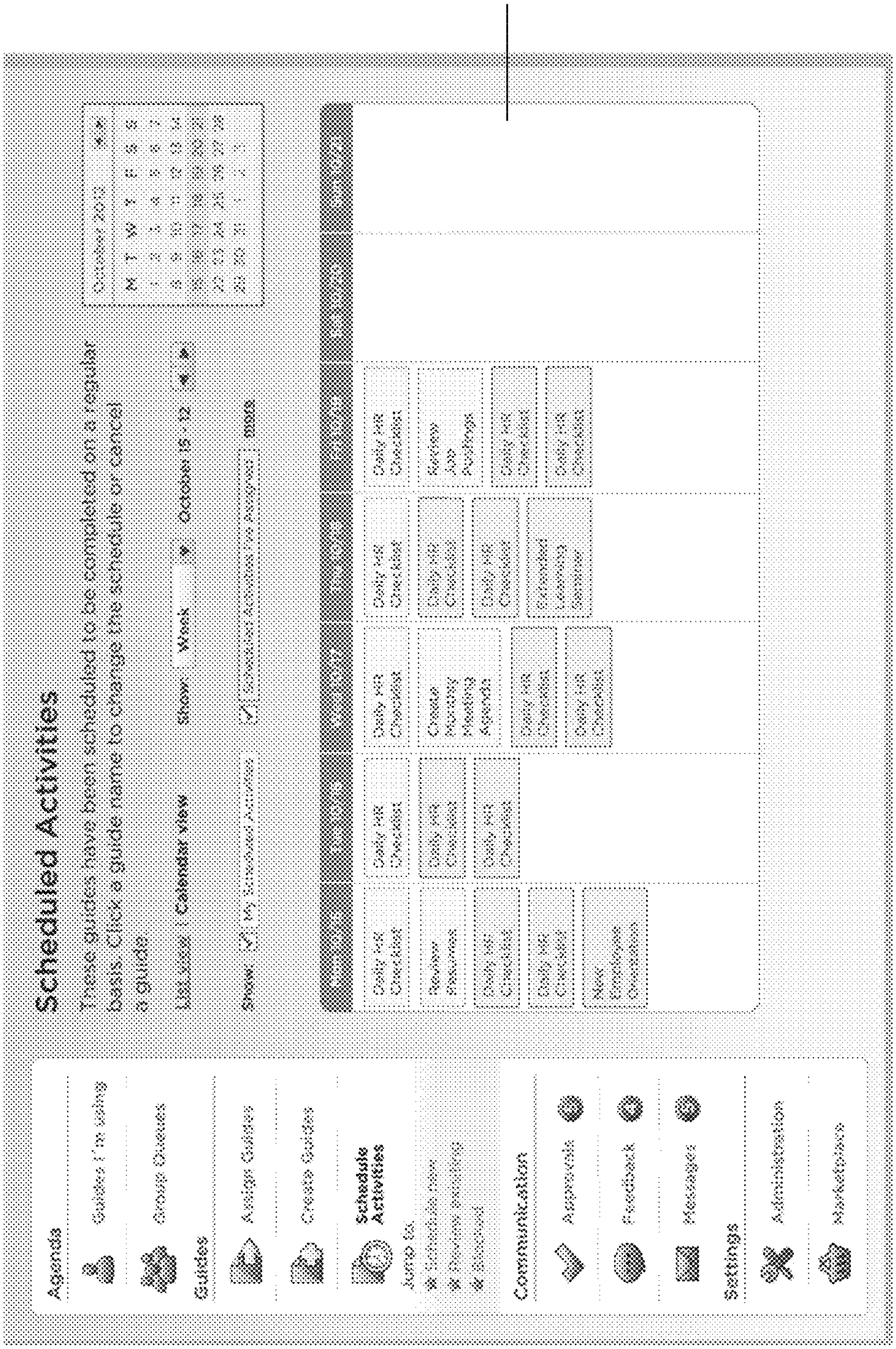

Turning to FIG. 21E, using an interface 2110 that may be presented by a hardware processor of a computing device, the hardware processor can receive user inputs (e.g., from a keyboard, a mouse, a touchscreen, and/or any other source of user input) to customize calendar 2124 with options including: interactive checklists assigned to the user, interactive checklists assigned by the user (for others to complete), interactive checklists assigned to or by other users (can specify user), and interactive checklists assigned to or by other groups of users (can specify groups). The hardware processor can display past assignments on calendar display 2124 (made visually distinct from current assignments). In addition, calendar display 2124 can be printed for ease of use.

Figure 21F:
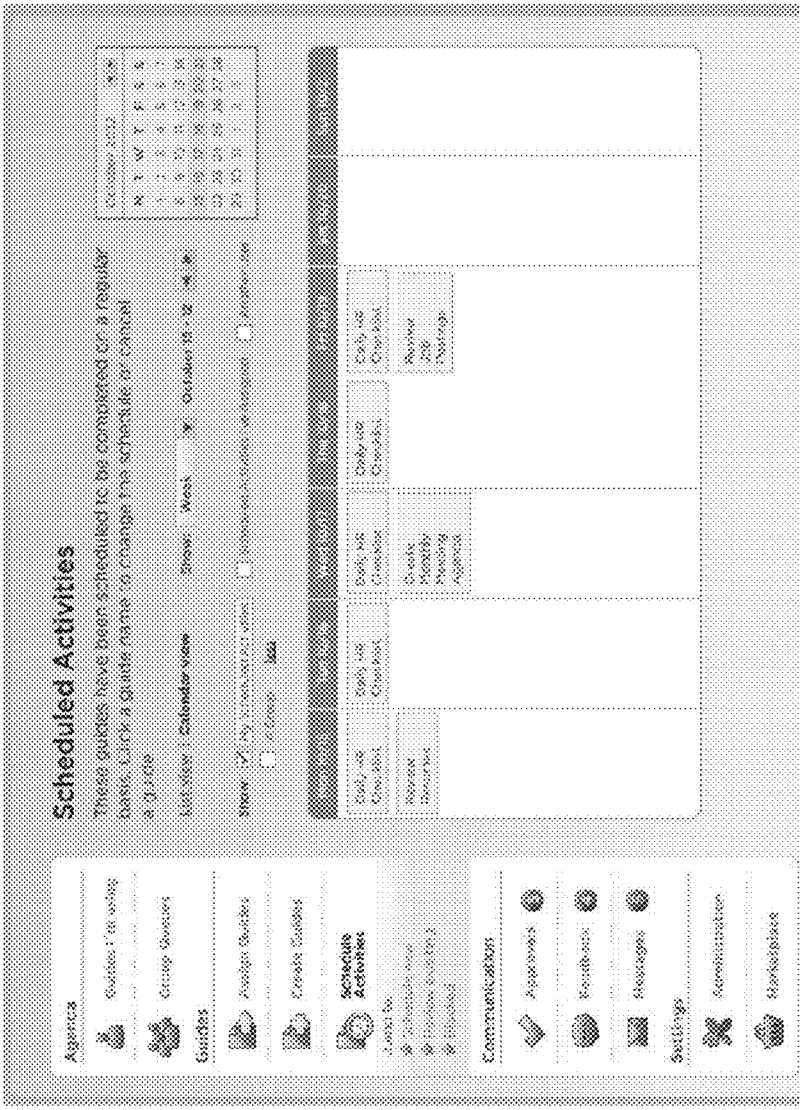
Figure 21G:
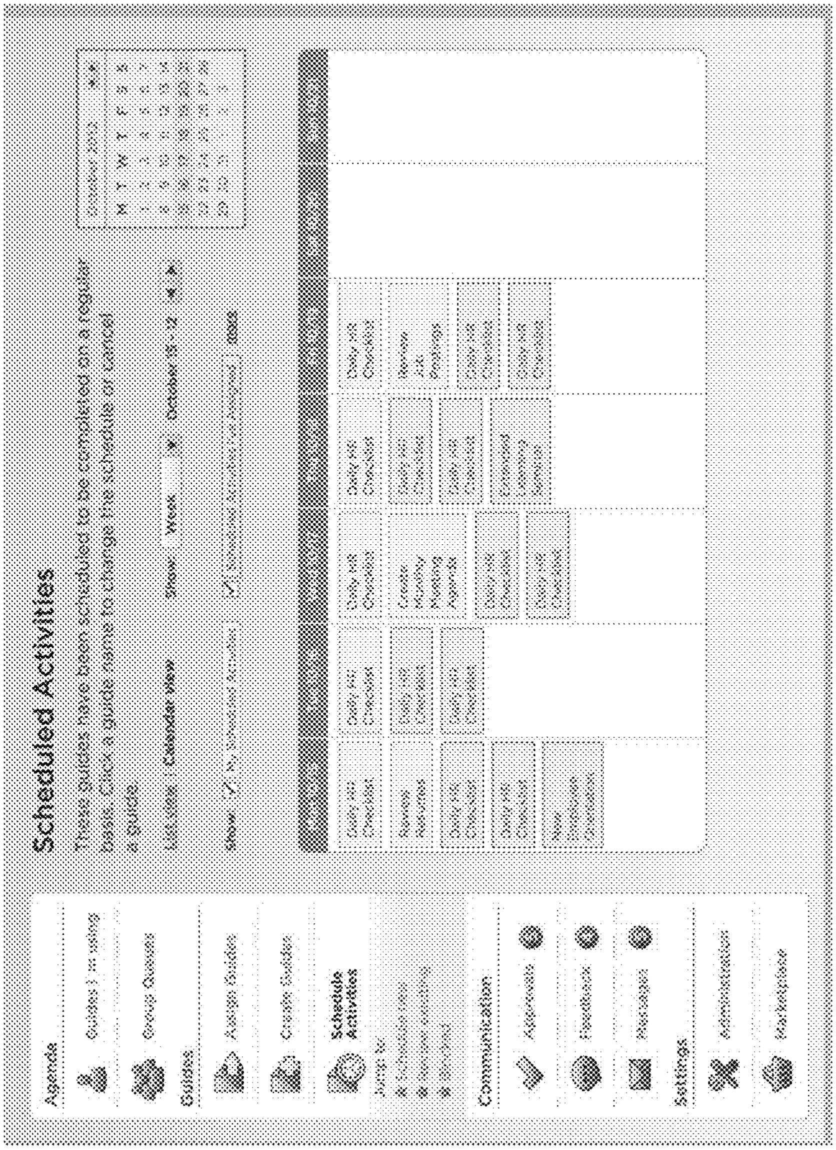
Figure 21H:
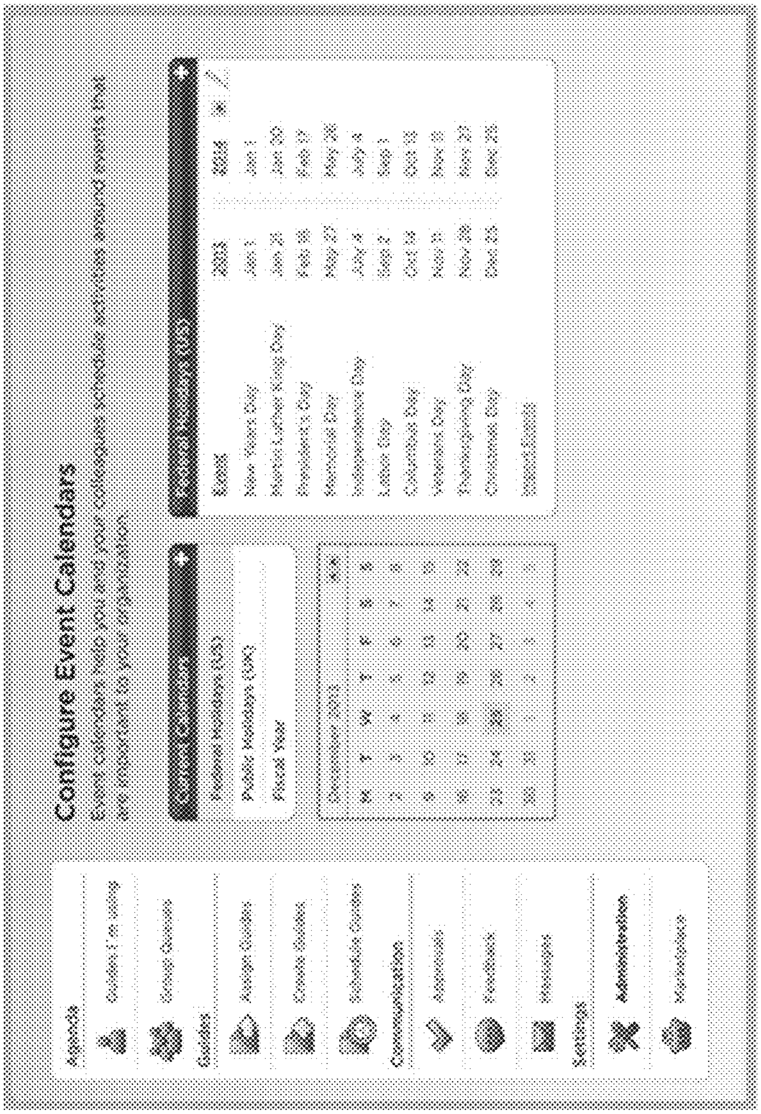
Figure 21I:
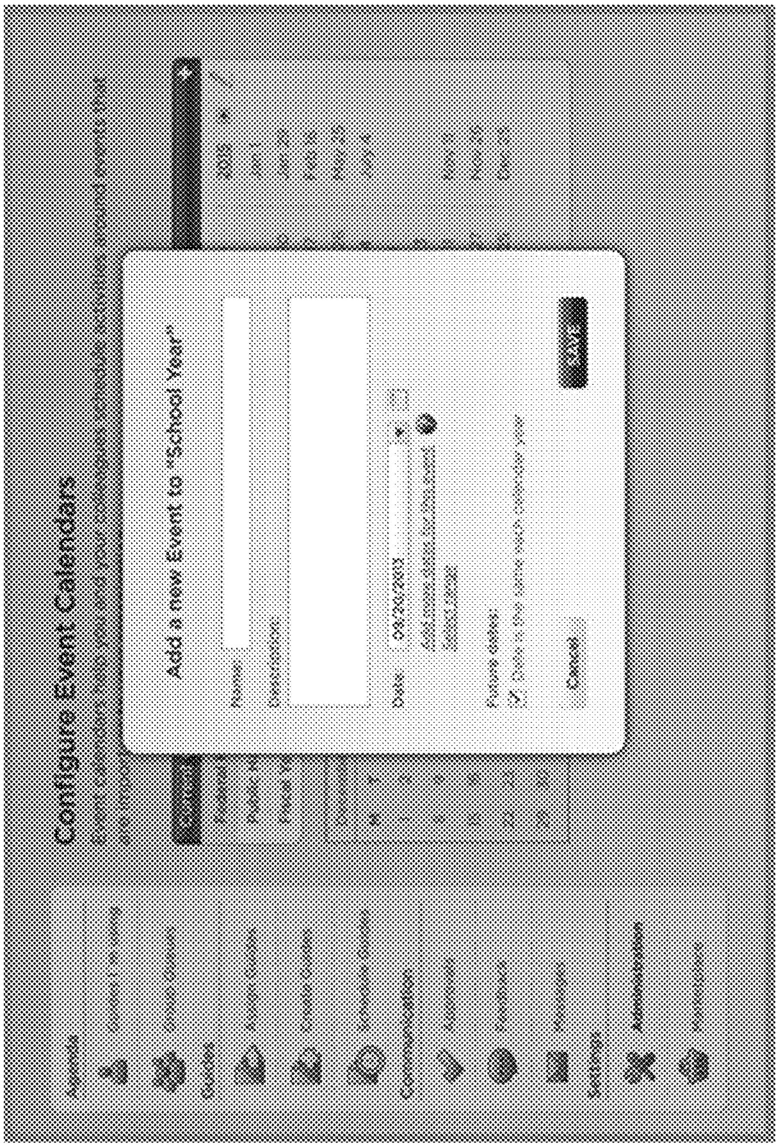

Turning to FIG. 21F, the hardware processor can present a "Calendar View" that includes a user's upcoming workload in a summary format, as shown in interface 2112. For example, the hardware processor can display upcoming assignments on a calendar display. The display can be viewed as a daily view, a weekly view, a monthly view, a yearly view, and/or any other suitable time frame view. In some embodiments, the hardware processor can receive customization options to customize the calendar that is displayed. Customization options can include guides assigned to a user, guides assigned by a user, guides assigned to or by other groups of a user, and/or any other suitable customization options. Additionally, the hardware processor can present past assignments on the calendar. For example, the past assignments can be visually distinct from current assignments, as shown in interface 1214 of FIG. 21G. In some embodiments, the calendar display can be printed.

In accordance with some embodiments, the hardware processor can present event calendars, as shown in interface 1216 of FIG. 12H. For example, the event calendars can be included by default. In another example, the event calendar can be created as a custom event calendar, as shown in interface 1218 of FIG. 12I. In such an example, custom calendars can be created for use by anyone in an organization. In some embodiments, each event on the event calendar can be customized for special cases such as event that last more than one day, events that might have multiple sub-events throughout the calendar year, events that occur on different dates in future calendar years, and/or any other suitable special case.

Figure 22:
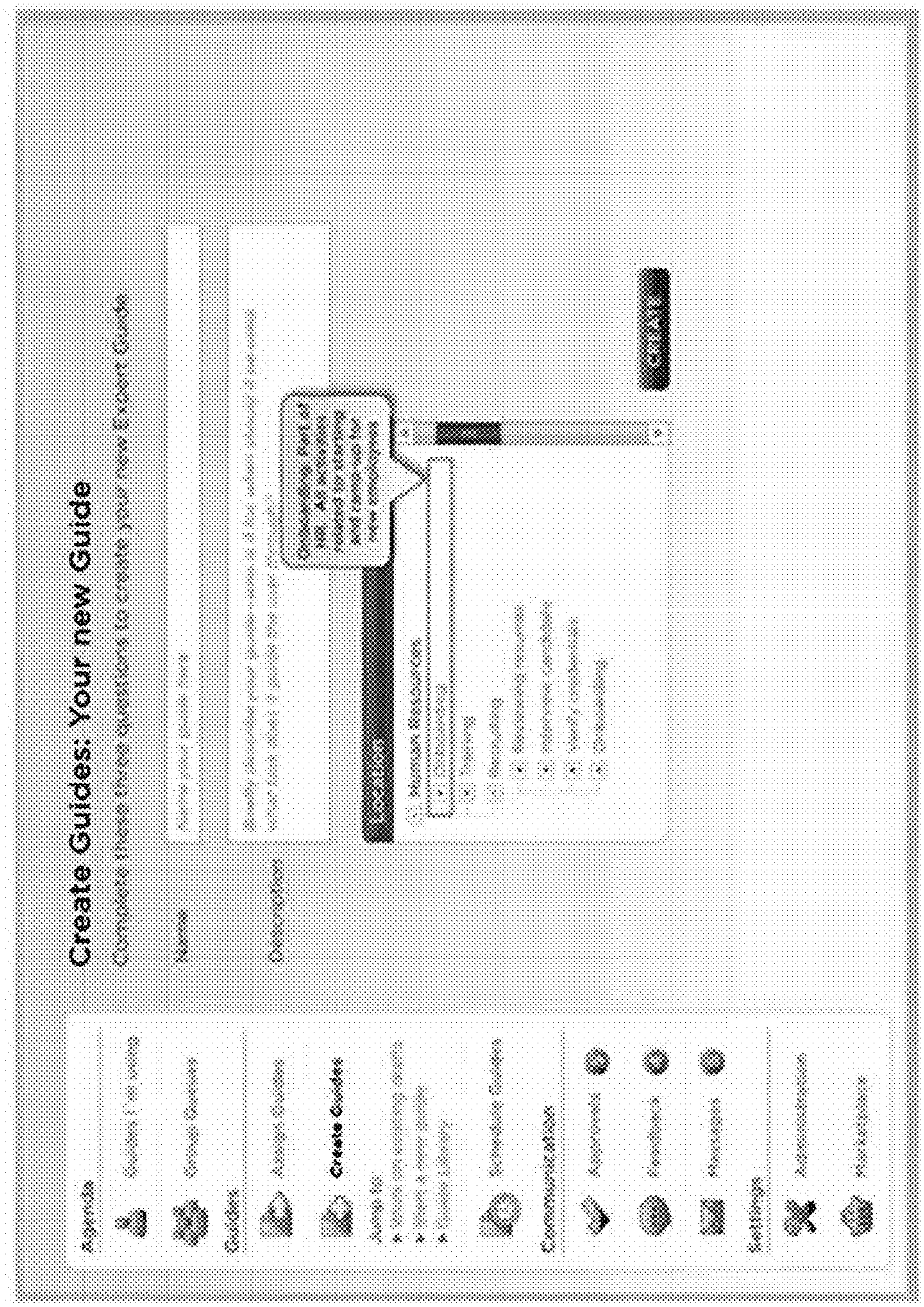
FIGS. 22, 23, 24, 25, 26A, 26B, 26C, 26D, 26E, 26F, 27A, 27B, 27C, and 27D show examples of user interfaces for creating an interactive checklist in accordance with some embodiments of the disclosed subject matter.

Turning to FIG. 22, using an interface 2200 that may be presented by a hardware processor of a computing device, the hardware processor can present an interface 2200 for creating interactive checklists. The hardware processor can receive any suitable information such as a title for the interactive checklist, a text description of the interactive checklist, a location for the interactive checklist (e.g., chosen from a company-wide hierarchy of groups) and/or any other information.

Figure 23:
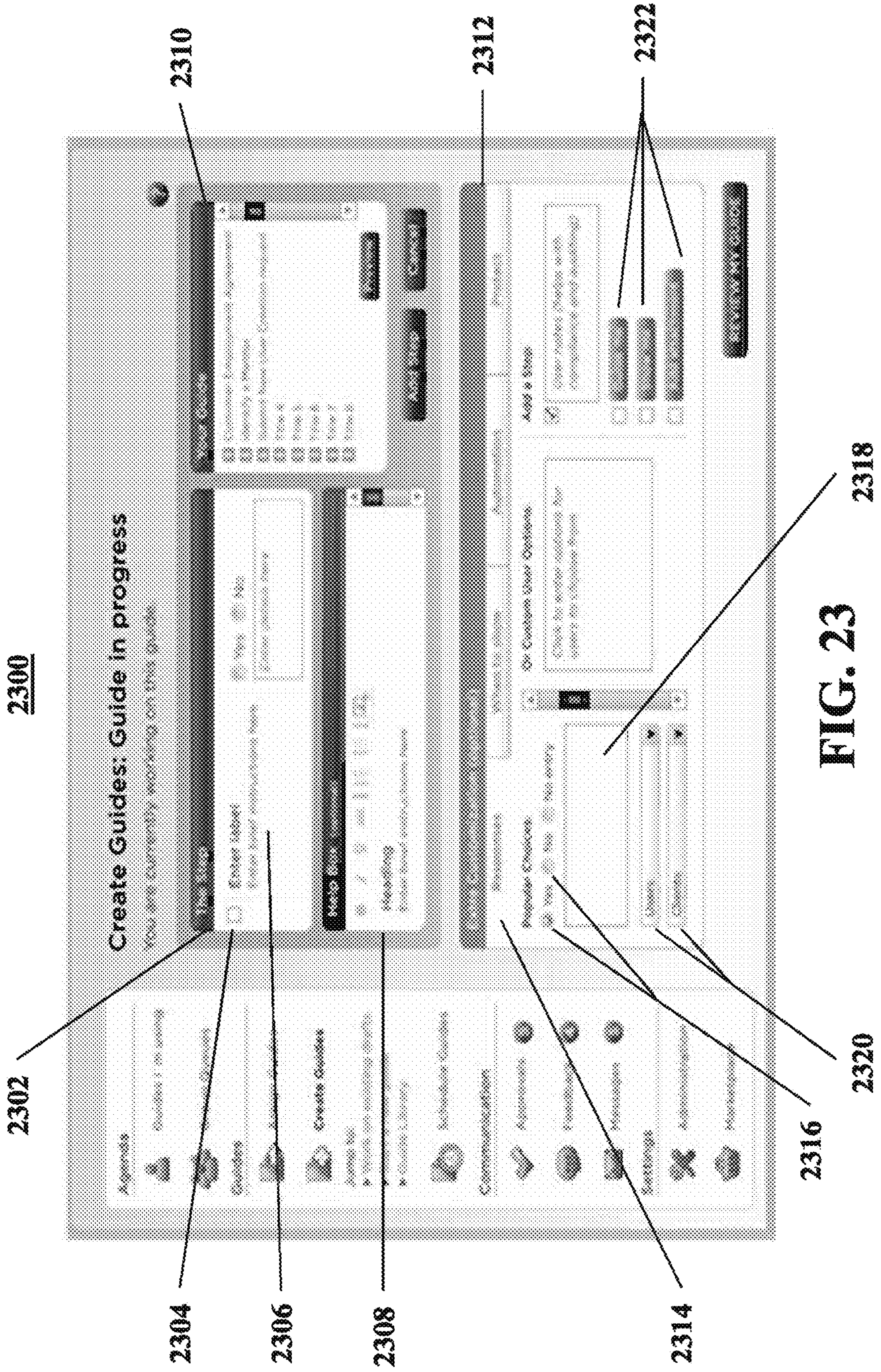

In accordance with some embodiments, using an interface 2300 that may be presented by a hardware processor of a computing device, the hardware processor can receive basic information. Upon receiving the basic information, the hardware processor can present an "Add a Step" interface, shown in FIG. 23. Here, using an interface 2300 that may be presented by a hardware processor of a computing device, the hardware processor can receive a user input to add as many steps as desired to the interactive checklist. The process and options for each step can be the same. Each step can have one or more fields that can be completed as shown, for example, in a "The Step" box 2302. An "Enter Label" box 2304 can be checked and a name of the step can be entered. Additionally, a "Brief Instructions" field 2306 may be available where text that explains how to complete the step can be entered. A "Responses" 2314 space that can be used to describe a format in which the user can complete or respond to the step may also be available. In some embodiments, a user can add a step using a What You See Is What You Get "WYSIWYG" interface. For example, the user can add elements (e.g., images, texts, and/or layouts) in the format the user will see the elements.

In some embodiments, the hardware processor can present a "Help Box" that can be completed by a user for each step (e.g., by entering expanded information as to how to complete the step). An example of a "Help Box" 2308 can be shown, for example, in interface 2300 of FIG. 23. Standard formatting tools can be available to encourage and enable longer, more thoughtful help text and images to be embedded and altered.

In some embodiments, each time a step is added to the interactive checklist, the hardware processor can display the step in a "Your Guide" widget. For example, the interactive checklist may appear in the top-right corner of the interface as shown in interface 2300 of FIG. 23 as "Your Guide" 2310.

In some embodiments, the hardware processor can display a list of the steps which have been added to the interactive checklist. In addition, the hardware processor can receive user inputs to easily reorder the steps using the drag and drop mechanisms provided, either individually, several at a time, with or without section dividers/headers, and/or by any other means available. In some embodiments, steps with dependencies, such as those that only show when specific criteria are met may be displayed indented, in an expandable/contractible tree-like widget, and/or any other way that allows it to be distinguished from those entries without dependencies. In some embodiments, section markers, header text, repeating blocks of steps and/or sections or groups of steps that may selectively become active, may also be indicated in the "Your Guide" widget.

There are one or more "extra customizations" available to a user, which can be optional in accordance with some embodiments of the invention. Some of these optional customizations can be, for example, displayed by the hardware processor in an "Extra Customization (optional)" section, shown as "Extra Customization (optional)" 2312 in interface 2300 in FIG. 23. In a "Responses" space 2314, the hardware processor can receive a user input indicating a selection of what response type a step may have. A default setting can provide "yes" and "no" radio buttons, as well as plain or rich text area for notes. In response space 2314, the hardware processor can display "yes" and "no" radio buttons 2316, as well as notes area 2318. Other response options can include drop-down or multi-select menus listing users, groups, other interactive checklists, organization-specific options, any predefined or dynamically generated list of choices, additional custom-text radio buttons and/or any other suitable options. Note that, in instances where a step response includes numerical values, numerical inputs can be received through any suitable user interface controls, such as a sliding scale, a star rating (e.g., where a user can select a number of stars out of five, or any other number, total stars), a text box to receive a numerical value, a calendar to select a date or a date range, and/or text boxes configured to receive currencies, durations, times, percentages, and/or any other suitable numerical input. An example of drop-down menus can be displayed by the hardware processor in interface 2300 of FIG. 23 as drop-down menus 2320. Additionally, note that, in some embodiments, a step response can be validated in any suitable manner, for example, by determining whether an entered response is valid based on any suitable validation criteria. In some embodiments, a step response can be prepopulated with any suitable default response value. In some such embodiments, a default step response can be indicated as a default in any suitable visual manner (e.g., presented in a color that indicates that the step response has been prepopulated as a default value, and/or in any other suitable manner).

In accordance with some embodiments, the hardware processor can present a "Guide Me" option, a "Show Me How" presentation, downloadable attachments, an extra user notes box, mandatory or optional user uploadable attachments, and/or any other available enhancements to allow a user to add enhancements to a step. For example, the hardware processor can display a "Guide Me", a "Show Me," and an "Add Attachment" enhancements that can be added to a step at enhancements 2322. Input validation can be configured so that user responses can meet regular expression-based criteria and/or other criteria to be accepted with or without a warning. For example, the criteria can require no blank or short entries, a valid phone number, and/or any other information. The hardware processor can receive a user input to disallow or allow custom steps to be added by another user and/or other users on an activity-specific or interactive checklist-wide basis, optionally while completing an activity.

Figure 24:
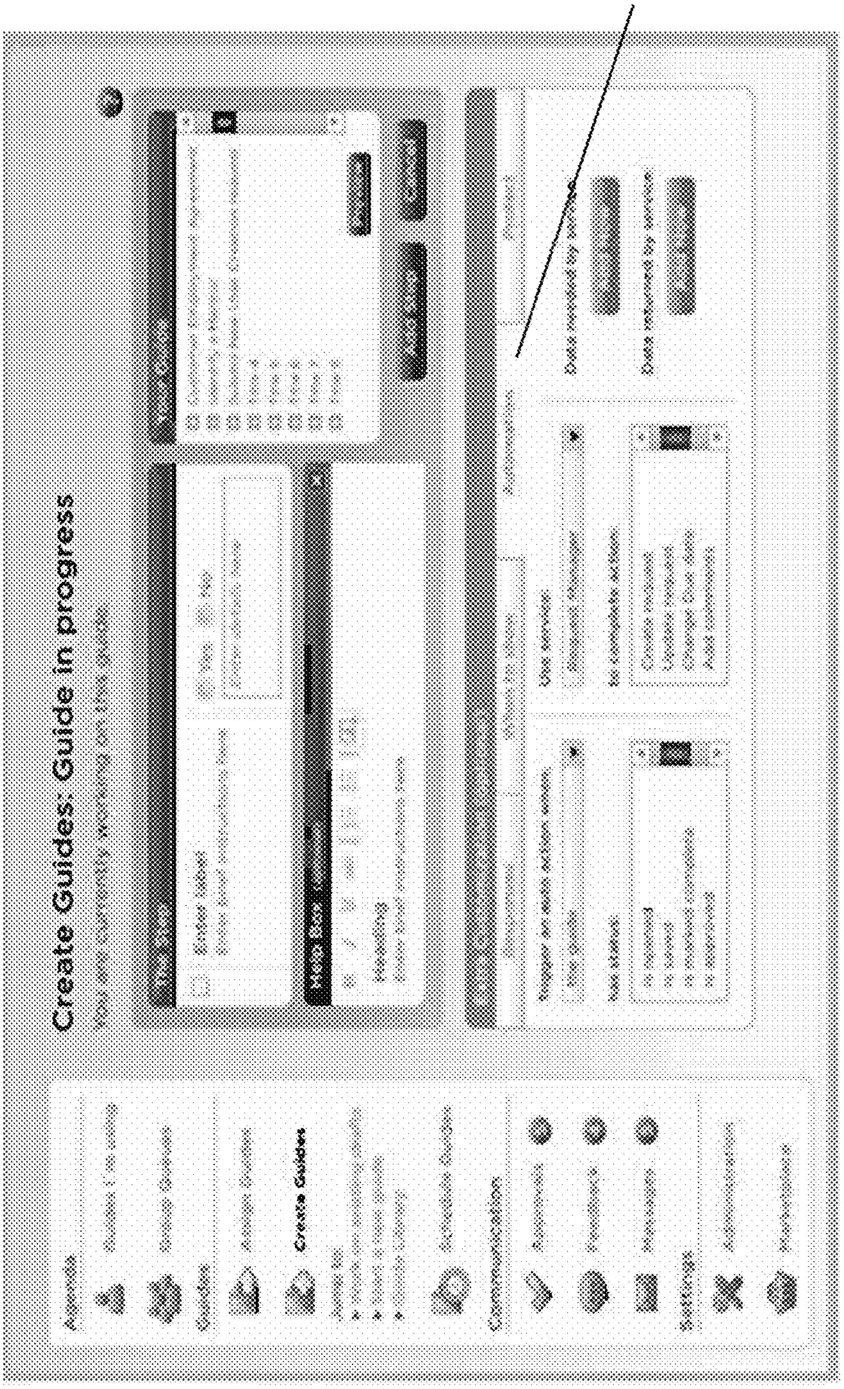
Figure 231:
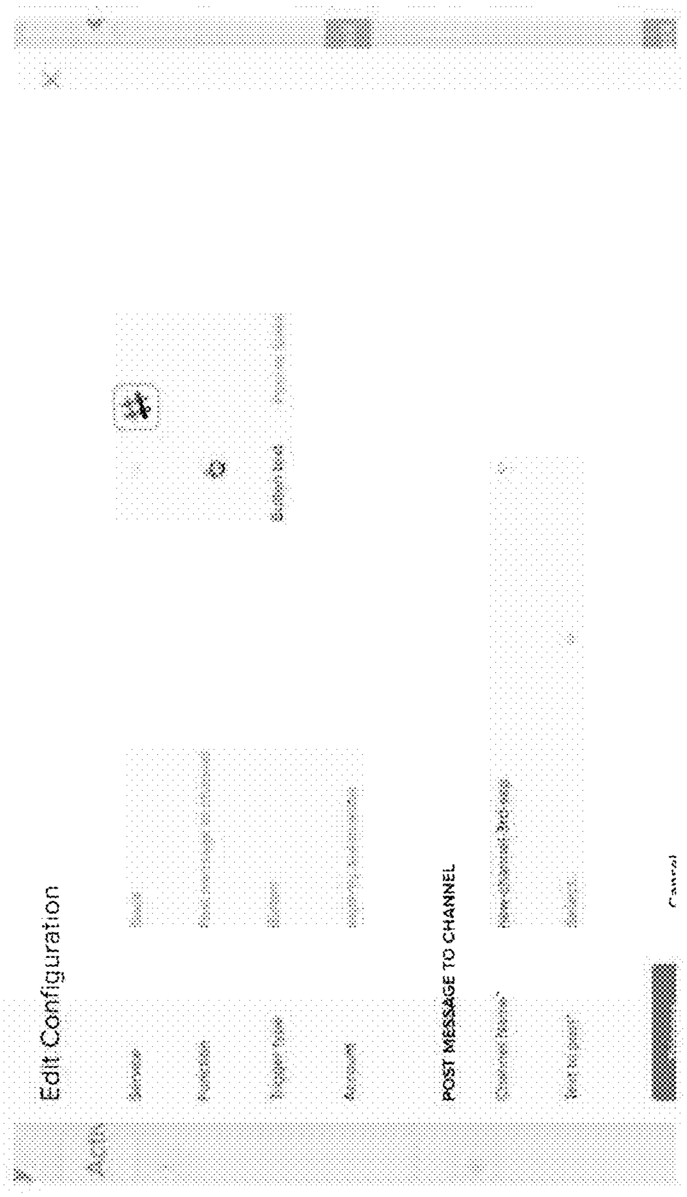
FIGS. 231-233 show examples of user interfaces for configuring actions based on detected events in accordance with some embodiments of the disclosed subject matter.
Figure 232:
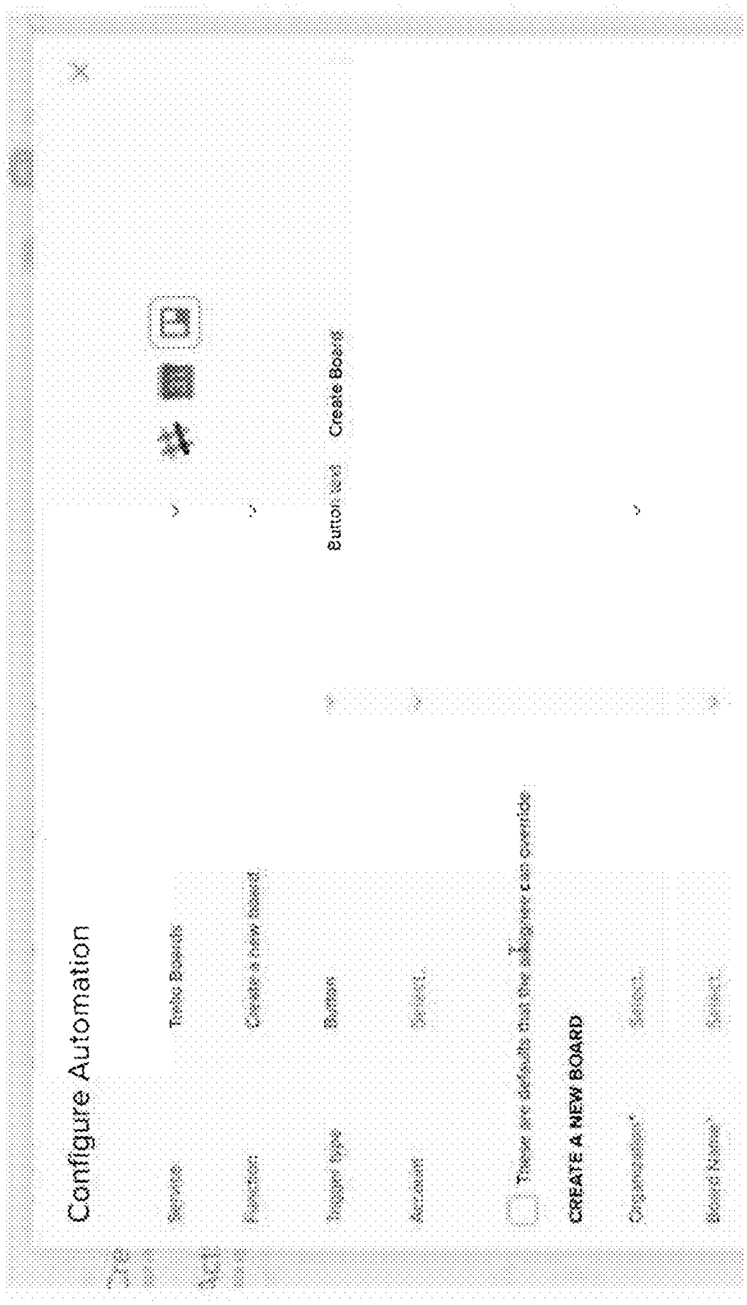

In accordance with some embodiments, using an interface 2400 that may be presented by a hardware processor of a computing device, the hardware processor can present an automation area, such as that shown as automation area 2402 in interface 2400 of FIG. 24. The hardware processor can receive a user input to configure automatic actions. The user input can indicate when an action can be triggered, for example, when the interactive checklist can be opened. Additionally, the user input can indicate which actions can be completed and by which external service. For example, an action can be sending an email using an email service (e.g., Gmail™). As another example, in some embodiments, an action can be posting a message to a particular thread or channel associated with a messaging service, as shown in FIGS. 231 and/or 232. As yet another example, in some embodiments, an action can include creating a new thread or channel associated with a messaging service. Note that, in some embodiments, automated actions can use any suitable scripting syntax that can retrieve inputs from multiple activities and use the inputs to perform any suitable operations, such as complete calculations, set variables, and launch automatic actions based on calculated values. In some embodiments, any suitable message can be presented when an automatic action has been successfully triggered. For example, in some embodiments, a message can be presented in connection with an activity associated with the triggered action (e.g., a note presented in connection with the activity).

Figure 25:

In accordance with some embodiments, using an interface 2500 that may be presented by a hardware processor of a computing device, the hardware processor can receive a user indication where the interactive checklist can find each piece of information to complete an action. For an email, the hardware processor can receive a user indication where the interactive checklist can find a recipient's email address, desired subject line, body copy, and/or any other information as shown in interface 2500 of FIG. 25. This information can come from a specific step in the interactive checklist, a fixed value, a variable, any other source within the interactive checklist, and/or any other source within another interactive checklist associated with this checklist. For example, another interactive checklist associated with this checklist can include a "child" interactive checklist associated with a step, a "parent" interactive checklist associated with this interactive checklist, the most recent interactive checklist of this type for which a particular value is present, and/or any other suitable checklist. The interactive checklist can also indicate what data points will be returned from the action. In some embodiments, functions and routines using any of several programming language syntaxes can also be used to perform calculations, manipulate data input or output, gather and transform data from elsewhere in the interactive checklist, and/or any other action. In some embodiments, the interactive checklist can be automated and not assigned to a user. For example, the interactive checklist can be automated when the interactive checklist can process certain types of items from a queue.

Figure 26A:
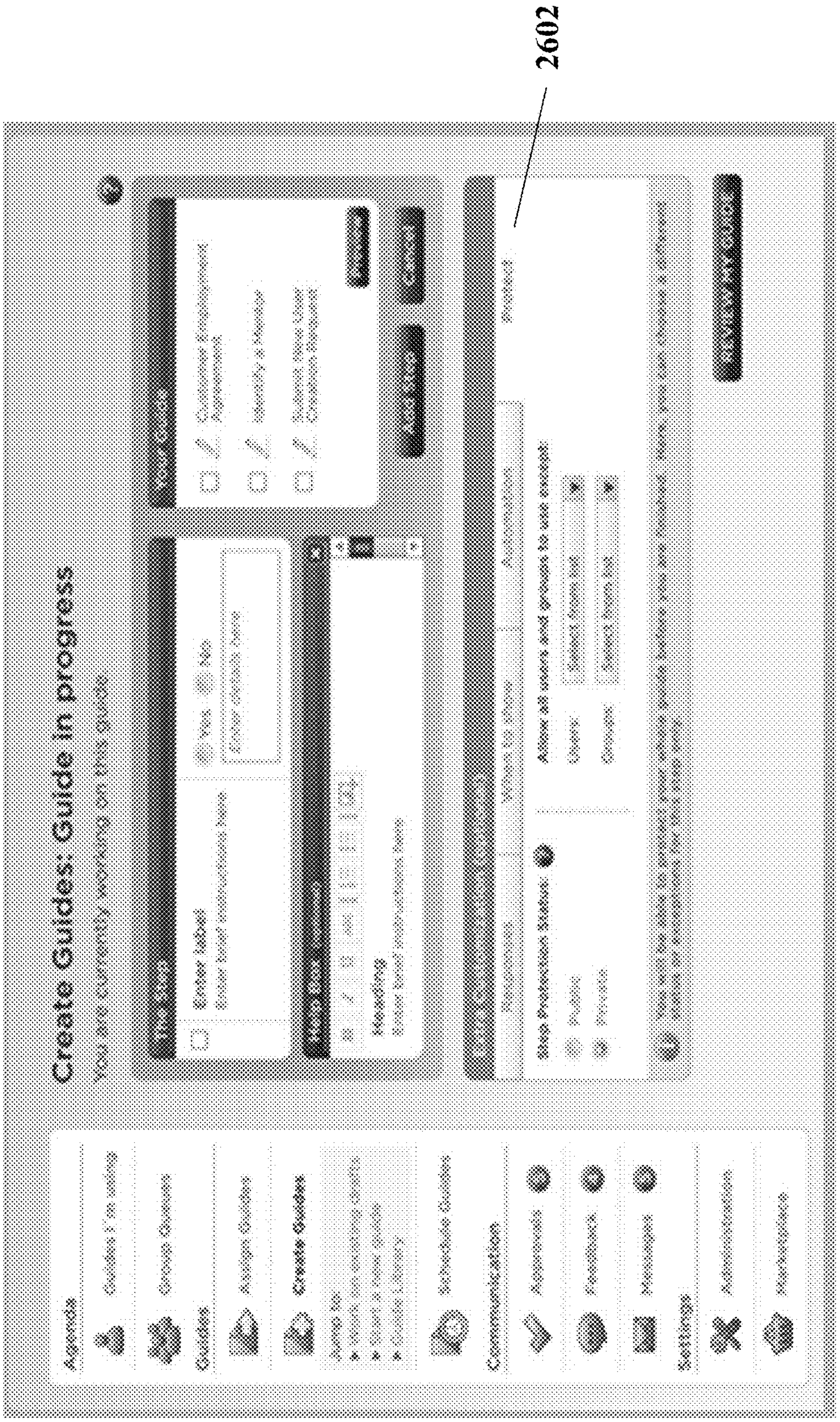
Figure 26B:
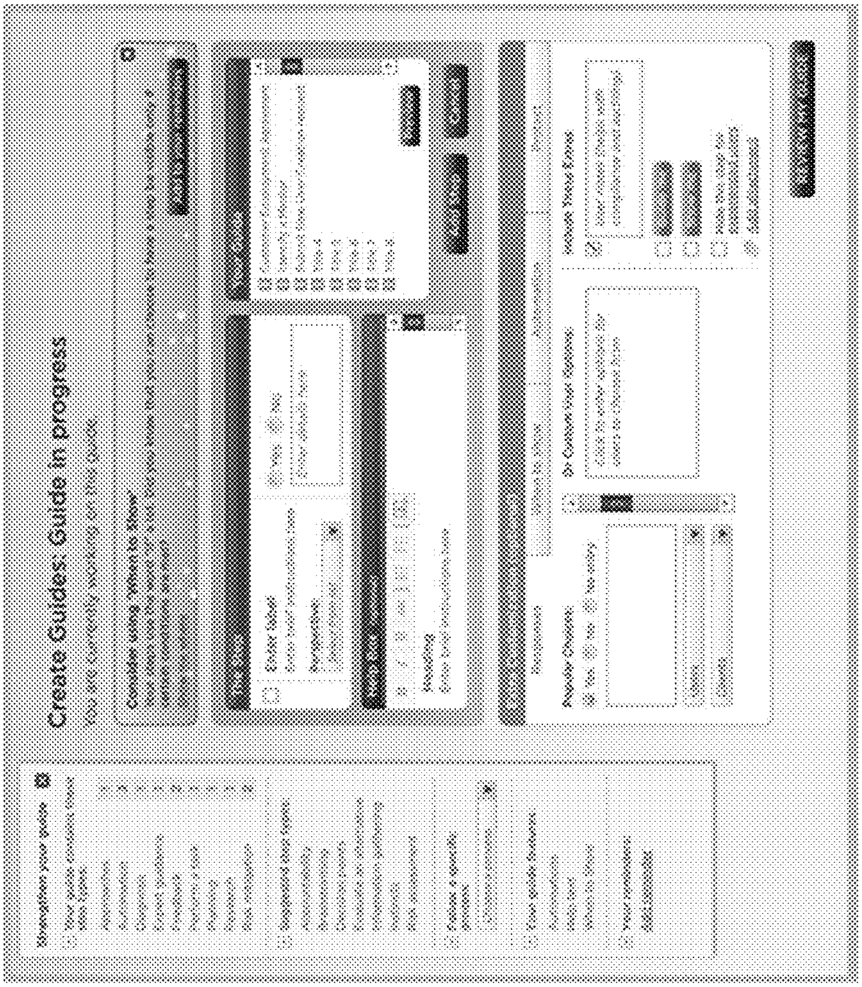

In accordance with some embodiments, using an interface 2600 that may be presented by a hardware processor of a computing device, the hardware processor can present a "Protect" area, shown as "Protect" area 2602 in FIG. 26A. For example, "Protect" area 2602 can let a user control access to a step. The user can choose to make the step public (available to everyone) or private (available only to them, e.g., while they test it out). As a further refinement, in some embodiments, the user can select individual users or groups to access (or prevent from accessing) the step. Note that, in some embodiments, a step and/or a Guide can be stored as a "Public draft," indicating that the step and/or Guide has not yet been approved for publication. In some such embodiments, steps and/or Guides stored in a public draft mode can be modified and/or edited before being made public. Access may regulate who can be shown this step when assigned an activity or when browsing an interactive checklist, as well as who may be aware of its existence, for example, when reviewing an activity for approval. In some embodiments, the hardware processor can present relevant suggestions to improve the user's experience and/or work product. For example, the hardware processor can present a "Guidance Box" feature to evaluate the guide in progress, as shown in interface 2604 in FIG. 26B. The "Guidance Box" can be displayed to remind the user of certain features at pertinent times.

Figure 26C:
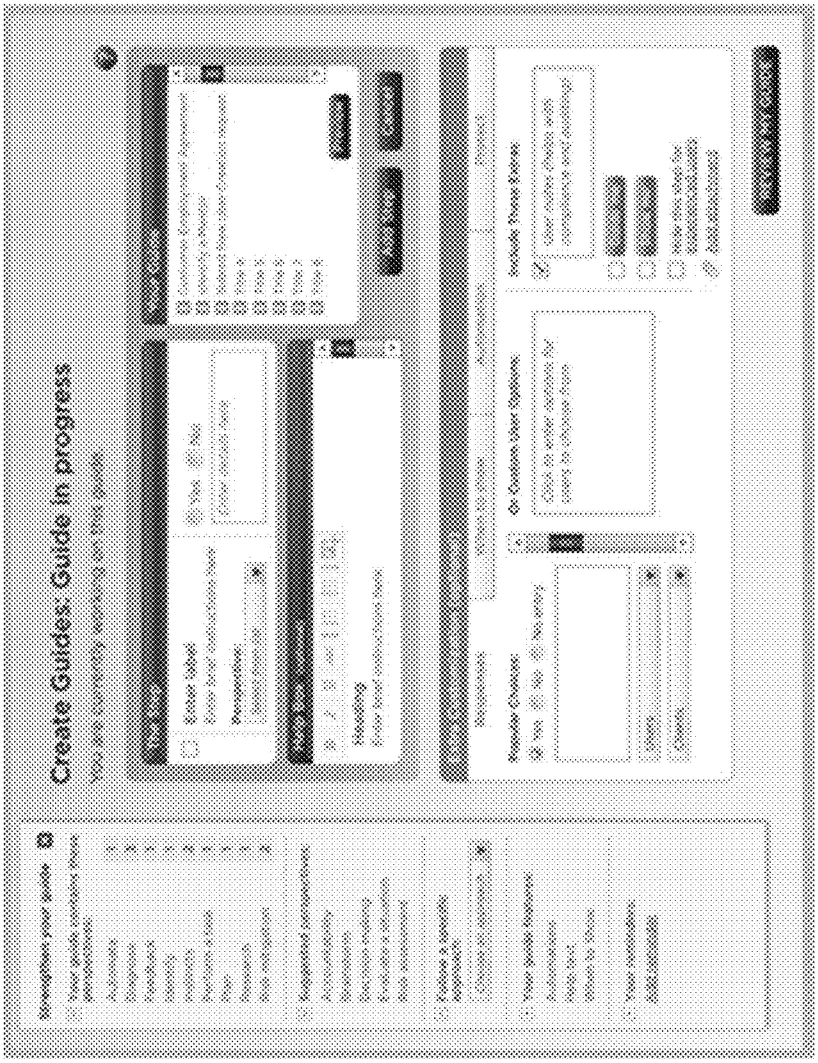
Figure 26D:
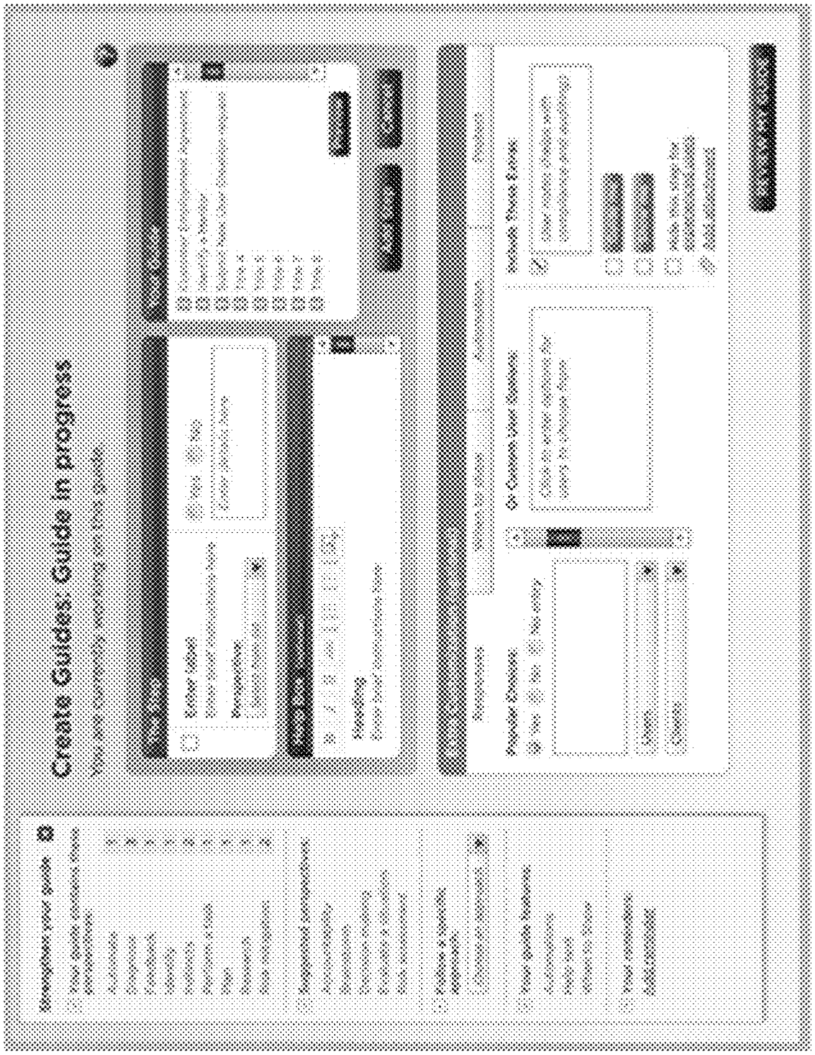
Figure 26E:
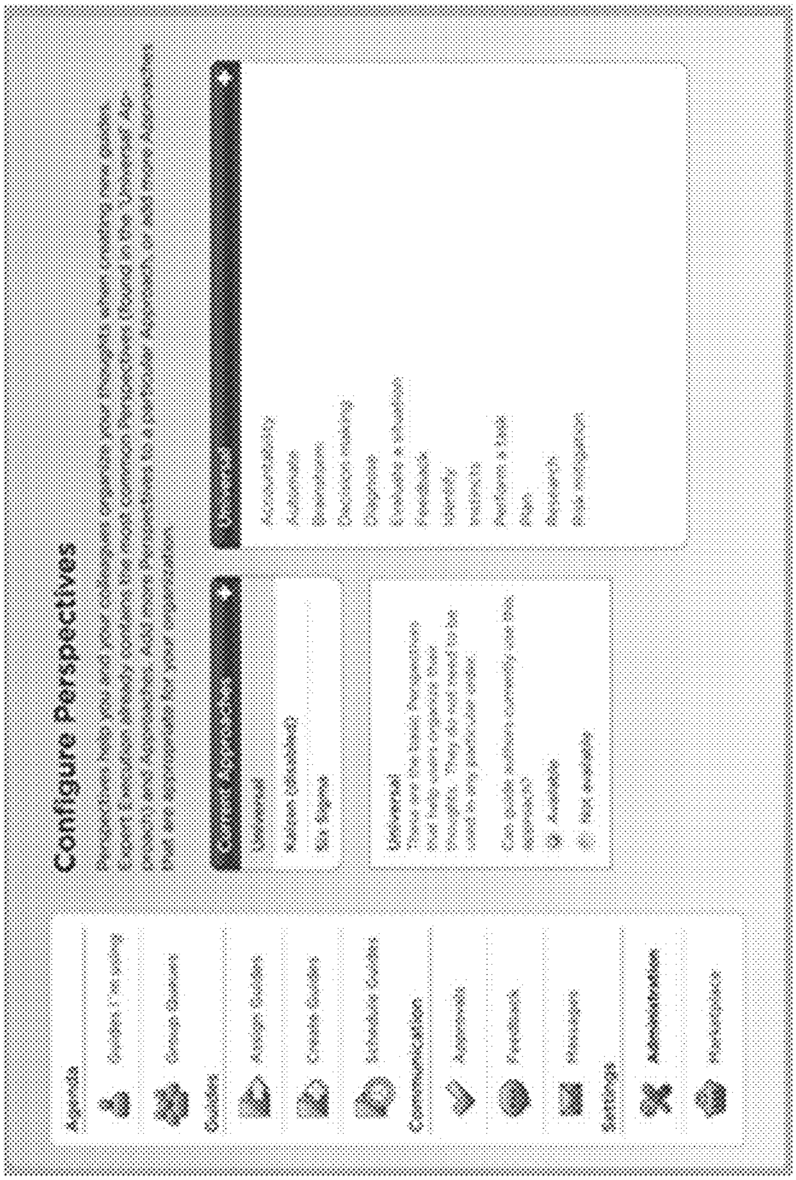
Figure 26F:
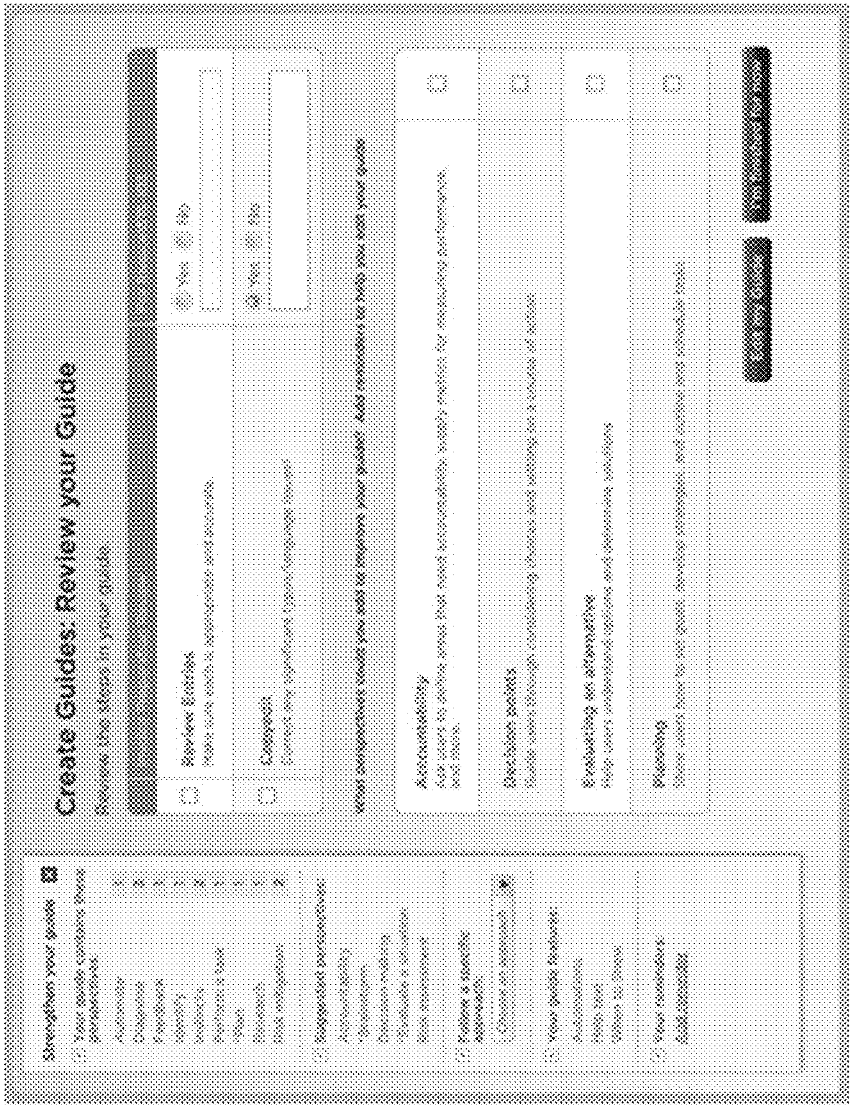

In accordance with some embodiments, the hardware processor can receive an "Approach" (e.g., a predetermined set of characteristics for each step). The "Approach" can be a paradigm for thinking about and working on a type of situation or request. For example, a "Six Sigma DMAIC" approach can ensure quality by thinking separately about a number of factors and/or consideration. The "Approaches" help ensure a complete guide maintains an appropriate and logical order and encourages the interactive checklist to be more effective according to proponents of each "Approach." In some embodiments, the "Approaches" can include a plurality of elements known as "Perspectives." In accordance with some embodiments, the hardware processor can display a "Perspective" feature, as shown in interface 2606 of FIG. 26C. The "Perspective" feature identifies know-how and instincts that made the user an expert in an area. For example, perspectives can include characteristics that define one or more steps, such as define, measure, automate, research, brainstorm, and/or any other suitable characteristic. In a particular example, when creating an interactive checklist and following a "Six Sigma Approach", the "Perspective" feature can help identify useful steps to include, based on the perspectives. In such an example, a "Measure perspective" will help identify an appropriate measurement-related steps to create. In some embodiments, the hardware processor can receive individual characteristics to assign to each step from a user, as shown in interface 2608 of FIG. 26D. In some embodiments, some "Approaches" can be predetermined, as shown in interface 2610 in FIG. 26E. Alternatively, some "Approaches" can be designed by a user or an organization. In some embodiments, the hardware processor can present a review draft to allow a user to review the "Perspectives" used in the guide, as shown in interface 2612 of FIG. 26F. Additionally, the hardware processor can present suggestions to improve the guide allowing the user to act upon the suggestions (e.g., by selecting the suggestion).

In accordance with some embodiments, once all steps have been added to an interactive checklist (perhaps, for the time being), the user can review them. For example, the user can review the steps using a "Test Mode" that shows the activity as a particular assignee would see it (e.g., steps that are not visible to that particular assignee would be either not displayed or grayed out). As the person conducting the review enters hypothetical inputs, the visibility of certain steps may change. Additionally and/or alternatively, the user conducting the review may specify a particular user or group from whose perspective the interactive checklist should be displayed.

Figure 27A:
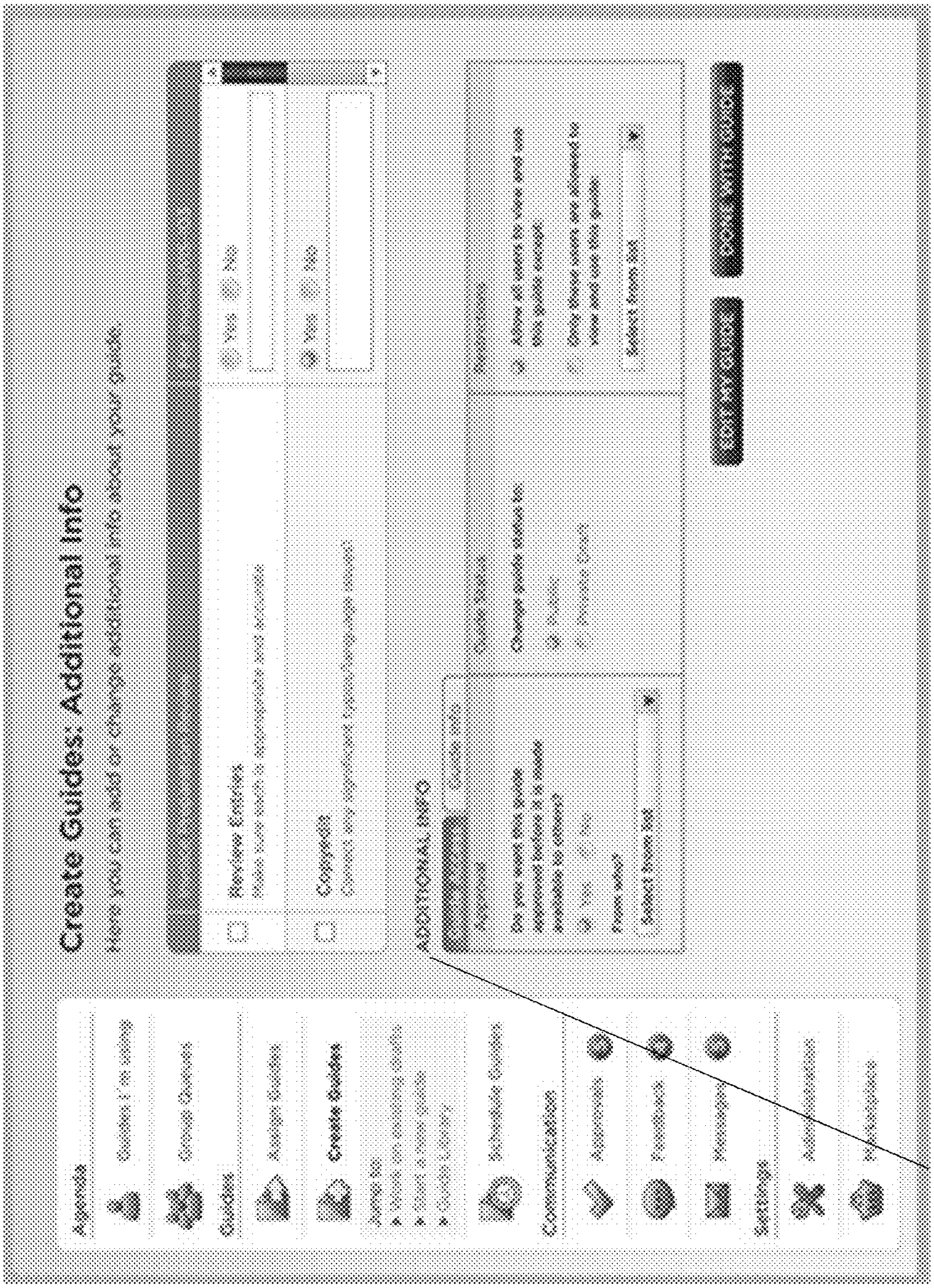
Figure 27B:
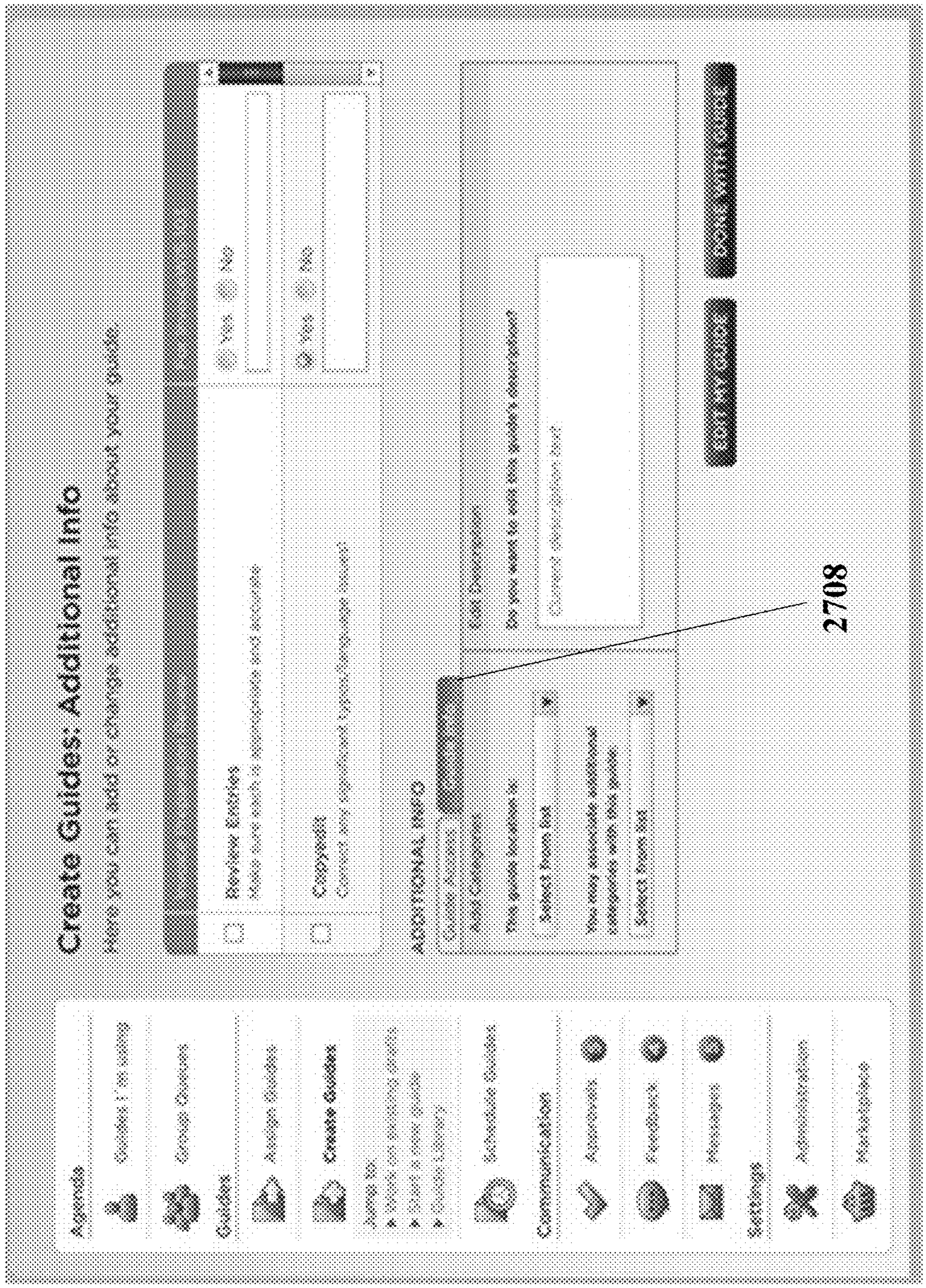

In some embodiments, using an interface 2702 that may be presented by a hardware processor of a computing device, the hardware processor can receive a user input to indicate interactive checklist-level access, for example, whether the initial interactive checklist(s) can require approval before subsequent uses can be used by the same user without approval, and the nature of the approval (e.g., by which users or groups, and in sequence or simultaneously), whether it can be made a public interactive checklist (or kept as a private draft), whether only certain users or groups can be allowed to use the interactive checklist, and/or any other indications. The hardware processor can display some of these examples in interface 2702 of FIG. 27A under "Guide Access" section 2704. As part of the review process, the user can also review the title, description, group, and/or any other information for the interactive checklist indicated at the beginning of the process. In some embodiments, using an interface 2706 that may be presented by a hardware processor of a computing device, the hardware processor can receive a user input to change these items at "Guide info" section 2708 in FIG. 27B.

Figure 27C:
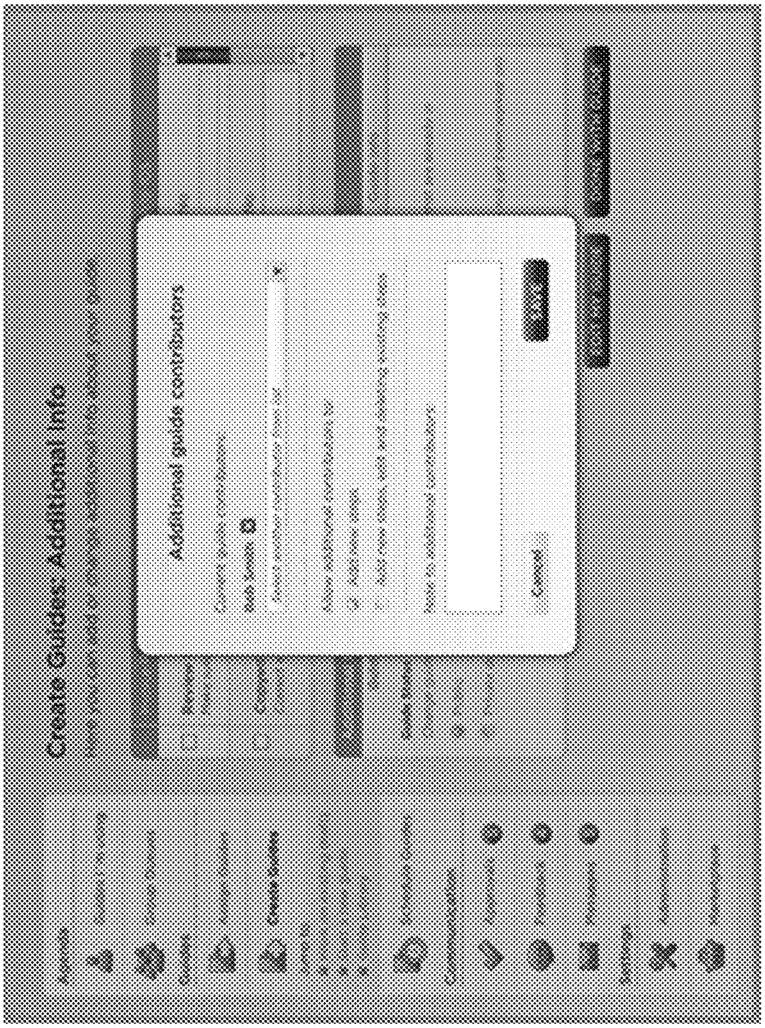
Figure 27D:
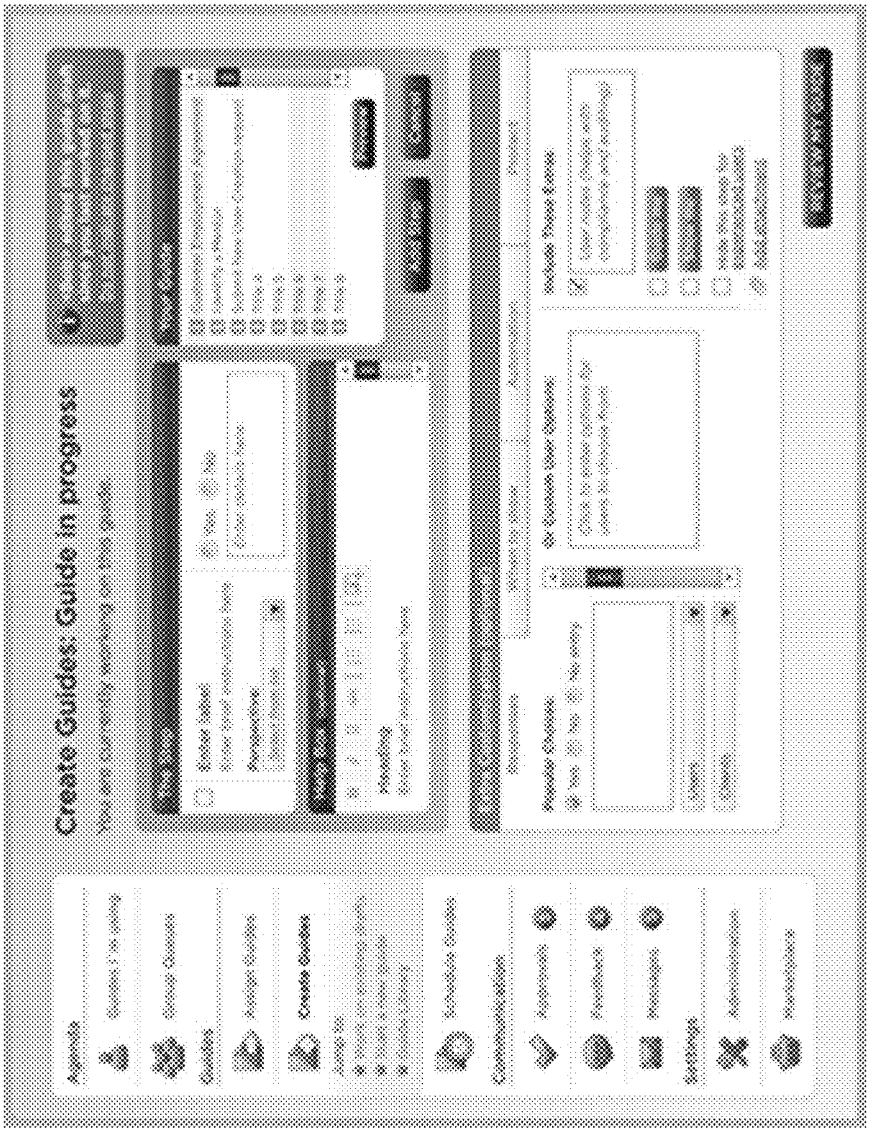

In some embodiments, the hardware processor can receive an additional contributor or multiple additional contributors to assist a user in creating the guide, as shown in interface 2710 of FIG. 27C. Turning to FIG. 27D, as shown in interface 2712, the hardware processor can display when each contributor works on an interactive checklist allowing the user to view and review changes made by each contributor.

Figure 28:
FIG. 28 shows an example of a user interface for presenting published and/or unpublished interactive checklists in accordance with some embodiments of the disclosed subject matter.

In some embodiments, using an interface 2800 that may be presented by a hardware processor of a computing device, the hardware processor can present published and/or unpublished interactive checklists in the "Guide Library," also located on the "Create Guides" tab shown in FIG. 28. In some embodiments, the hardware processor can present the interactive checklists in a merged view. For example, the hardware processor can display a visual indication (e.g., an icon) for each unpublished interactive checklist and a separate visual indication for each published interactive checklist. In some embodiments, the visual indication associated with each checklist can be presented whenever the checklist is presented. Additionally and/or alternatively, the hardware processor can display a visual indication for each interactive checklist that may be access-restricted. These checklists can be sorted and filtered.

Figure 29A:
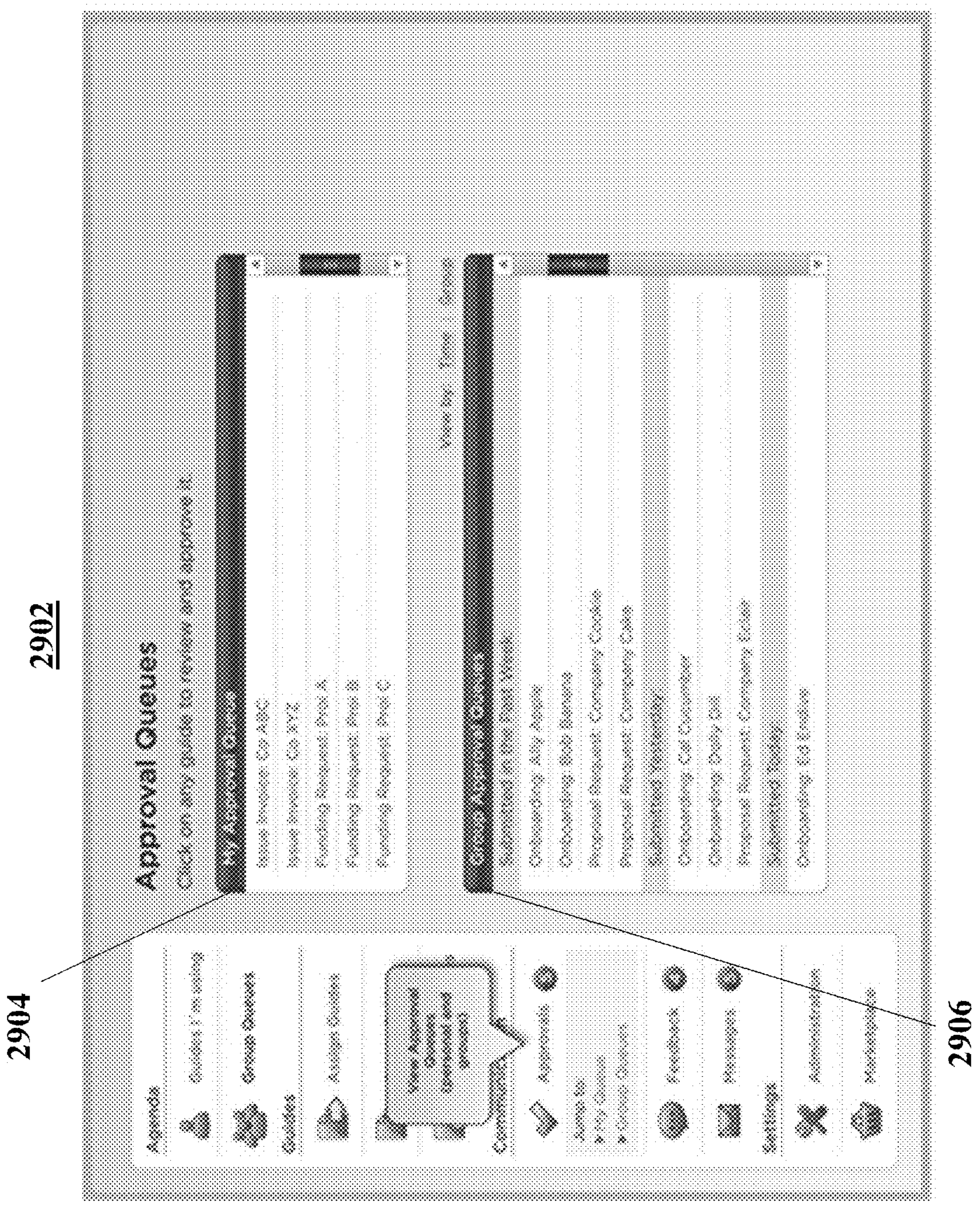
FIGS. 29A and 29B show examples of user interfaces for presenting approval queues in accordance with some embodiments of the disclosed subject matter.
Figure 29B:
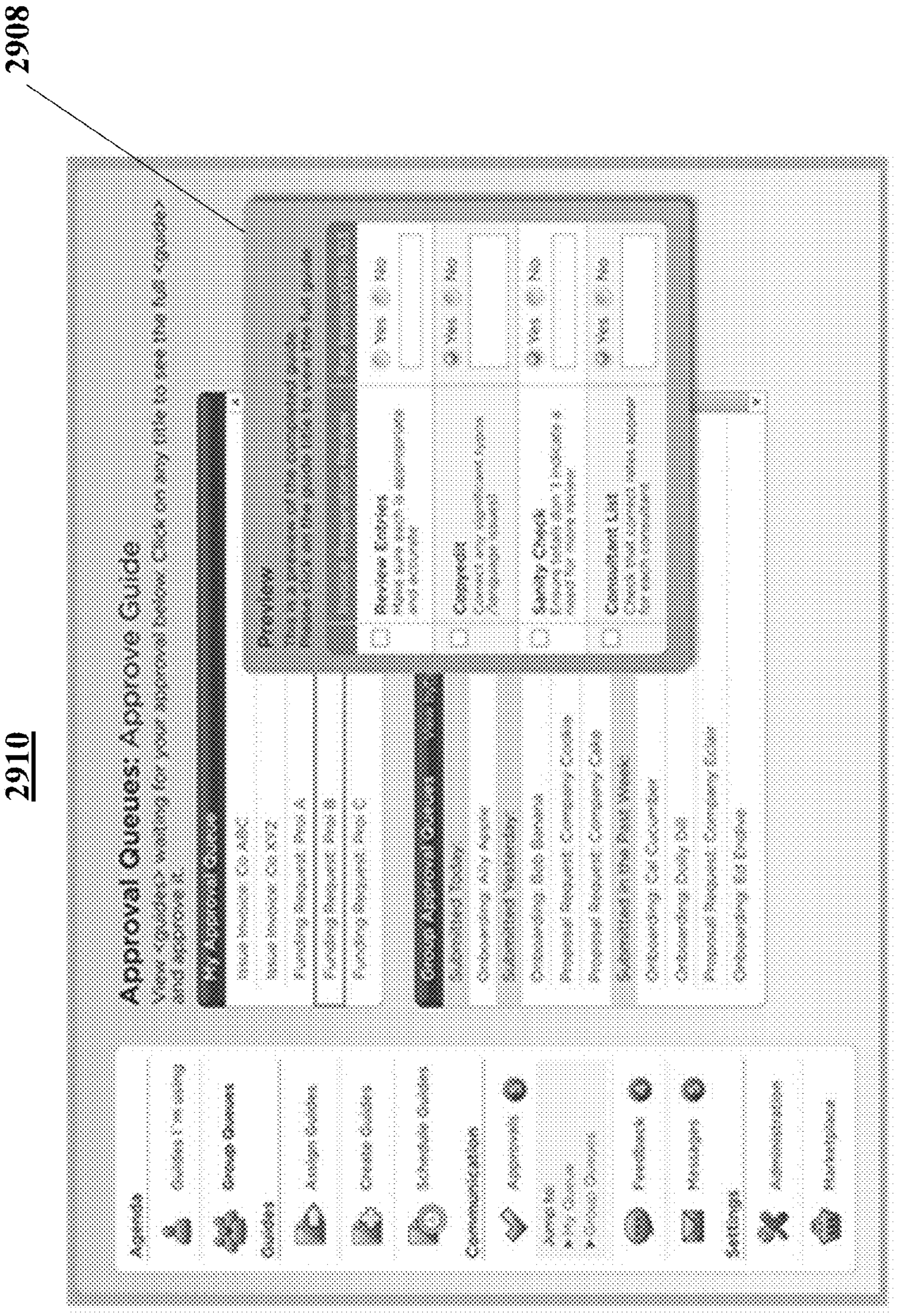
Figure 30:
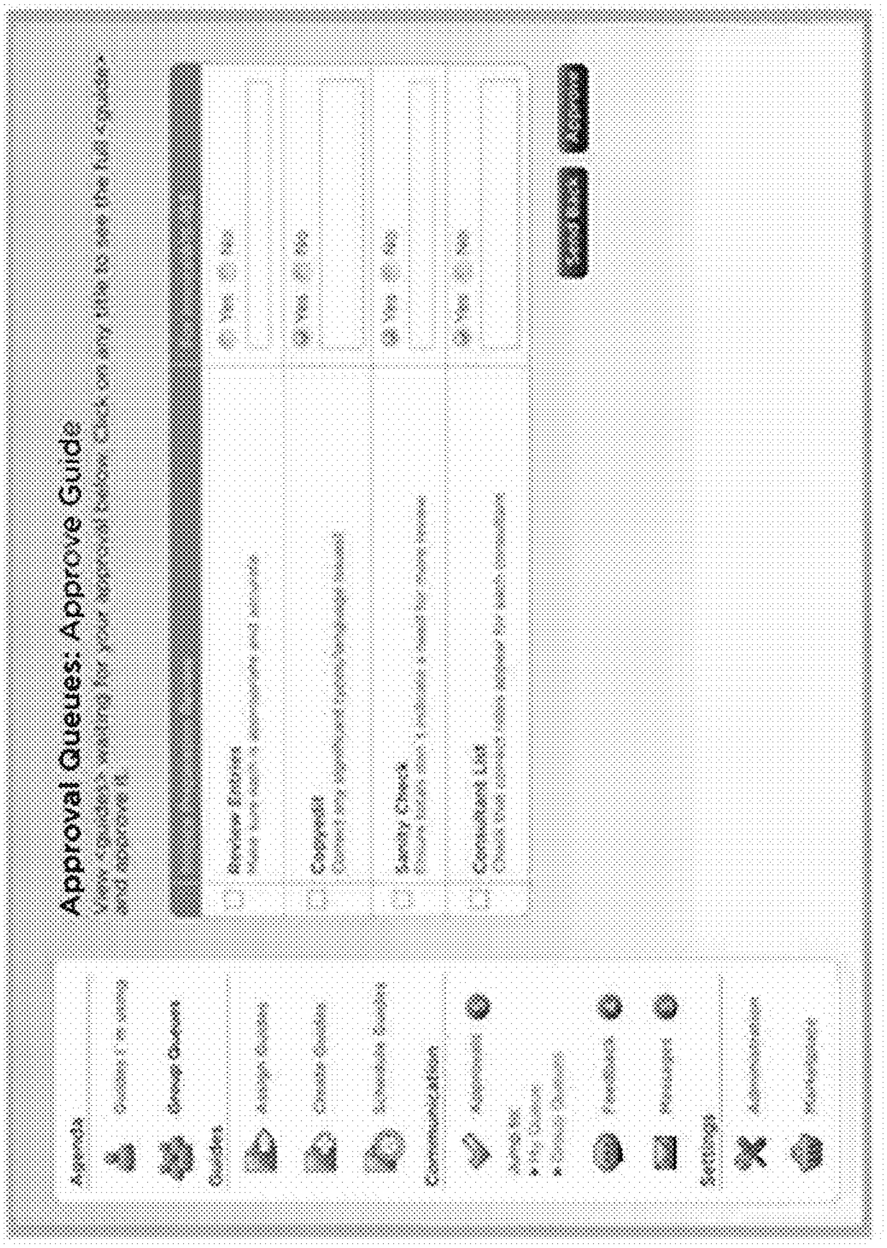
FIGS. 30, 31A, 31B, and 31C show examples of user interfaces for presenting feedback in accordance with some embodiments of the disclosed subject matter.

In accordance with some embodiments, in an "Assign a Guide" process, some complete interactive checklists may require another user's approval. In some embodiments, using an interface 2902 that may be presented by a hardware processor of a computing device, the hardware processor can display two approval queues for each user as shown in FIG. 29A. Additionally, the hardware processor can display a personal queue shown as "My Approval Queue" 2904 and a queue for groups shown as "Group Approval Queues" 2906 to which they belong (as for assigned interactive checklists). If an interactive checklist is completed that may require approval, it can be sent to the appropriate queue by the hardware processor. When a user comes to an approval queue, they can see all interactive checklists awaiting their approval. The user can opt to view a group approval queue either by submission time, by group, and/or by calculated priority which may consider any suitable one or more factors. In some embodiments, using an interface 2910 that may be presented by a hardware processor of a computing device, the hardware processor can display a small preview of the completed interactive checklist shown as "Preview" 2908 in FIG. 29B when a user hovers on an interactive checklist in the queue. In some embodiments, upon the hardware processor receiving a user input (e.g., clicking on an individual interactive checklist awaiting their approval), the hardware processor can present a separate screen, for example, interface 3000 of FIG. 30, where the hardware processor can display the completed interactive checklist. Here, the user can approve it or send it back for revision (with a note, if desired). Furthermore, in some embodiments, an activity can have processes with multiple steps and/or parts, and each step or part can require approval. In some such embodiments, subguides can be created, and intermediary checkpoints can be indicated within each subguide corresponding to different steps and/or parts.

Figure 31A:
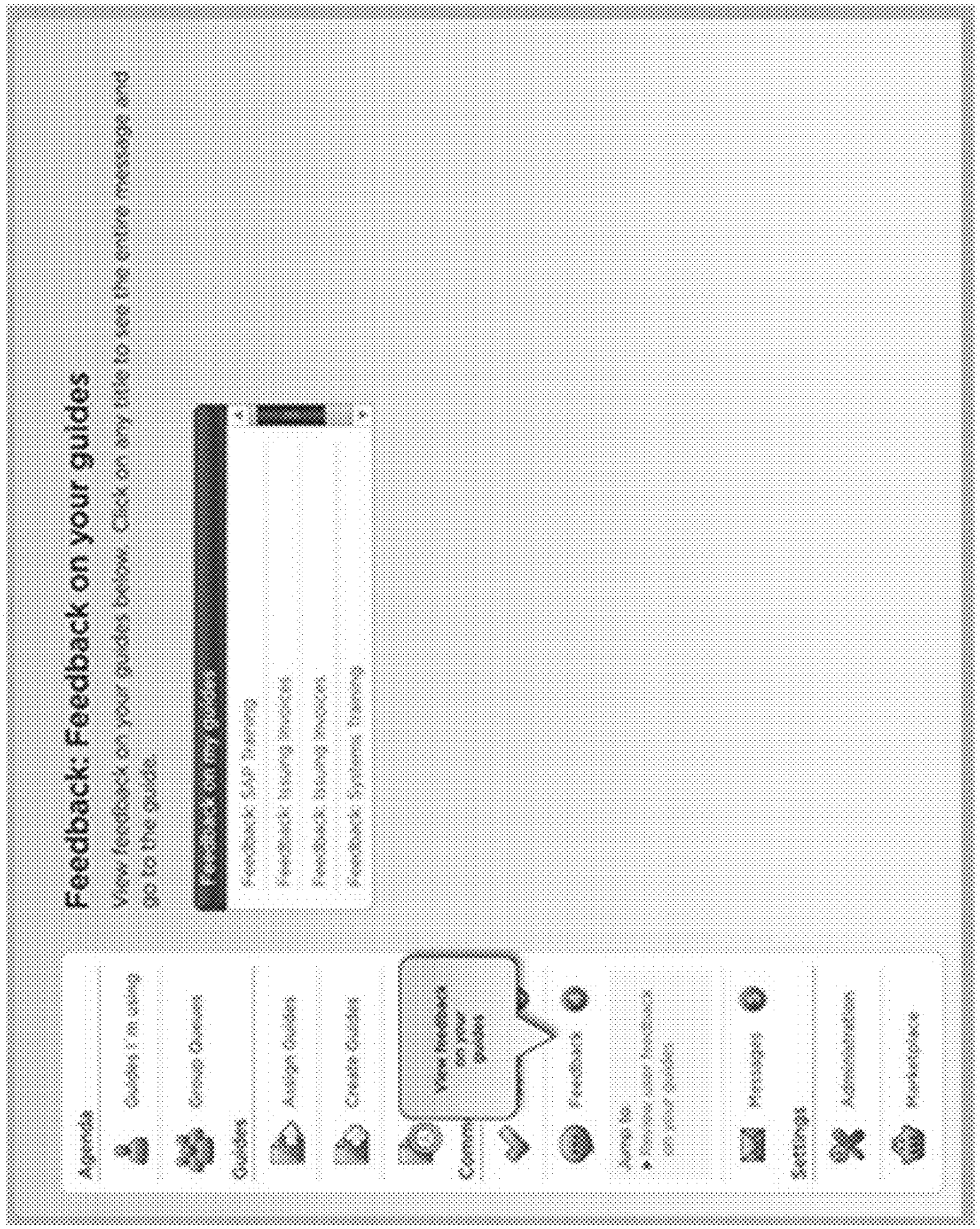
Figure 31B:
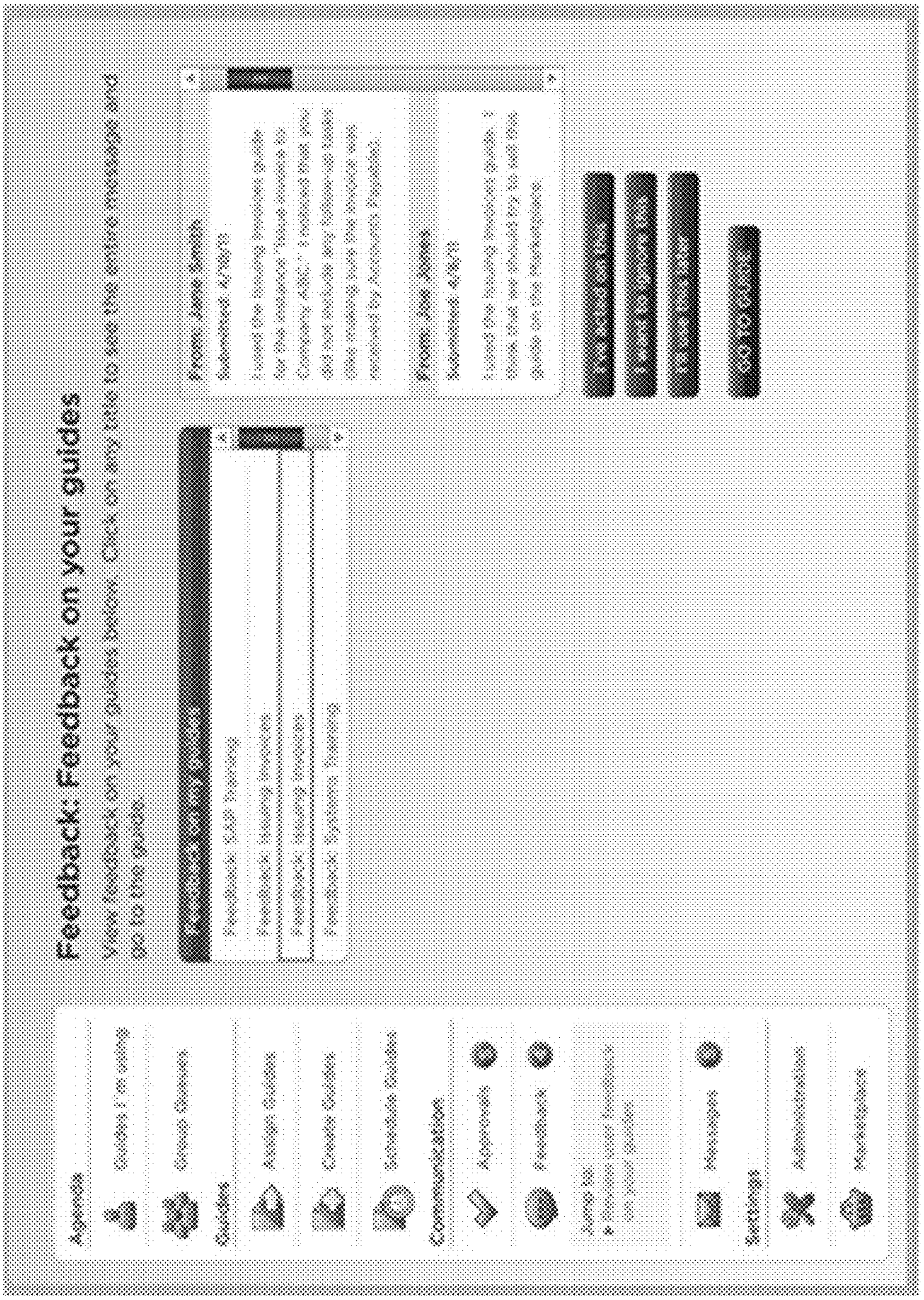
Figure 31C:
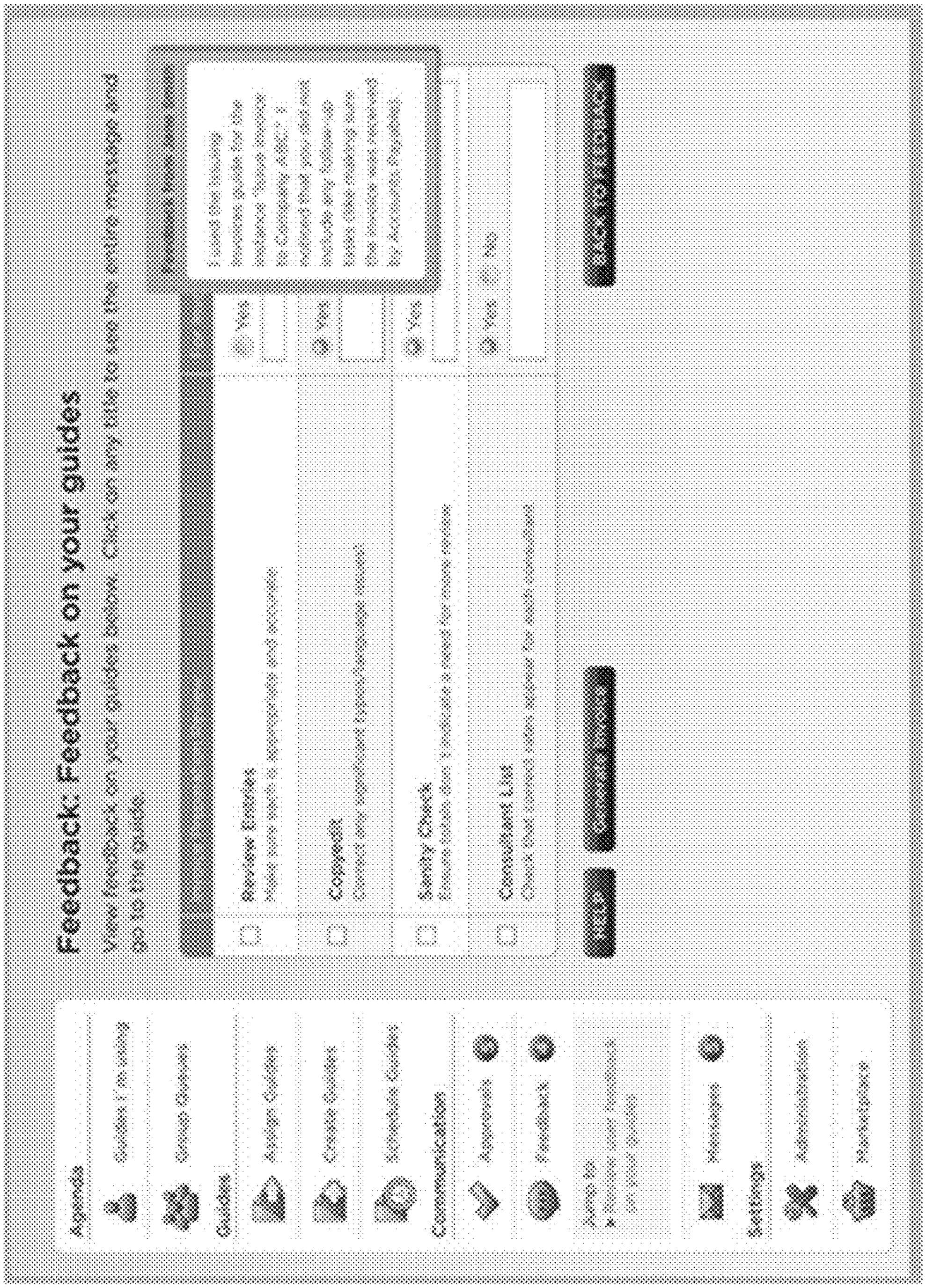

In accordance with some embodiments, using an interface 3102 that may be presented by a hardware processor of a computing device, the hardware processor can receive user feedback as shown in FIG. 31A. The user feedback can include any suitable feedback such as feedback to the interactive checklist, feedback pertaining to the user's experience, and/or any other suitable feedback. This feedback can then be sent to an appropriate feedback queue by the hardware processor. The hardware processor can display interface 3104, as shown in FIG. 31B, upon receiving a user selection of a piece of feedback from the queue. Additionally, the hardware processor can also display any other pieces of feedback for the same interactive checklist and the hardware processor can allow a user to react to feedback by responding to it, dismissing it, keeping it for later, etc. As an alternative, in some embodiments, the hardware processor can display the feedback in the context of the interactive checklist itself. Here, the hardware processor can present a copy of the interactive checklist and the hardware processor can receive user feedback from a separate widget as shown in interface 3106 of FIG. 31C.

Figure 32A:
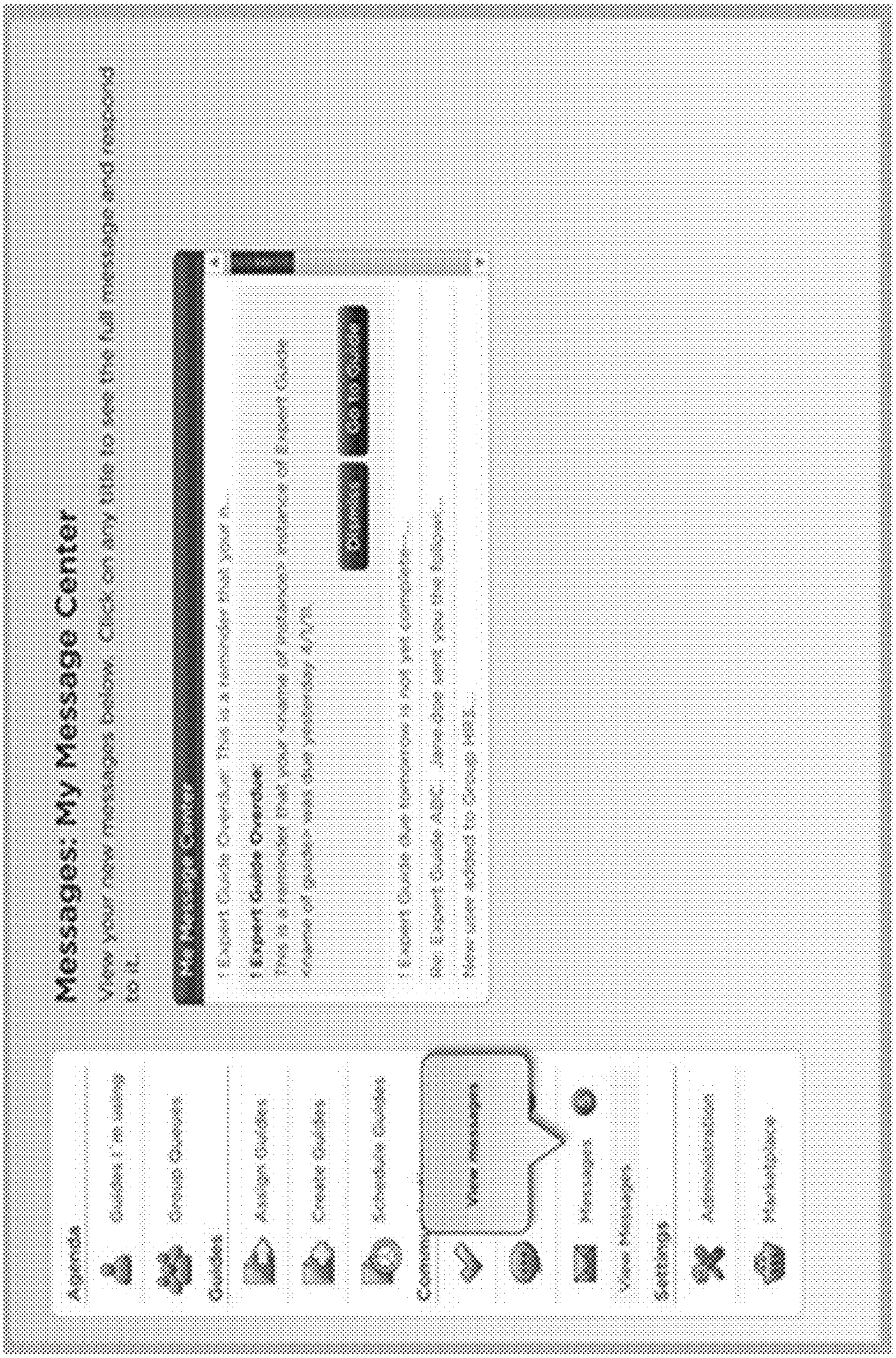
FIGS. 32A and 32B show examples of user interfaces for presenting internal messages in accordance with some embodiments of the disclosed subject matter.
Figure 32B:
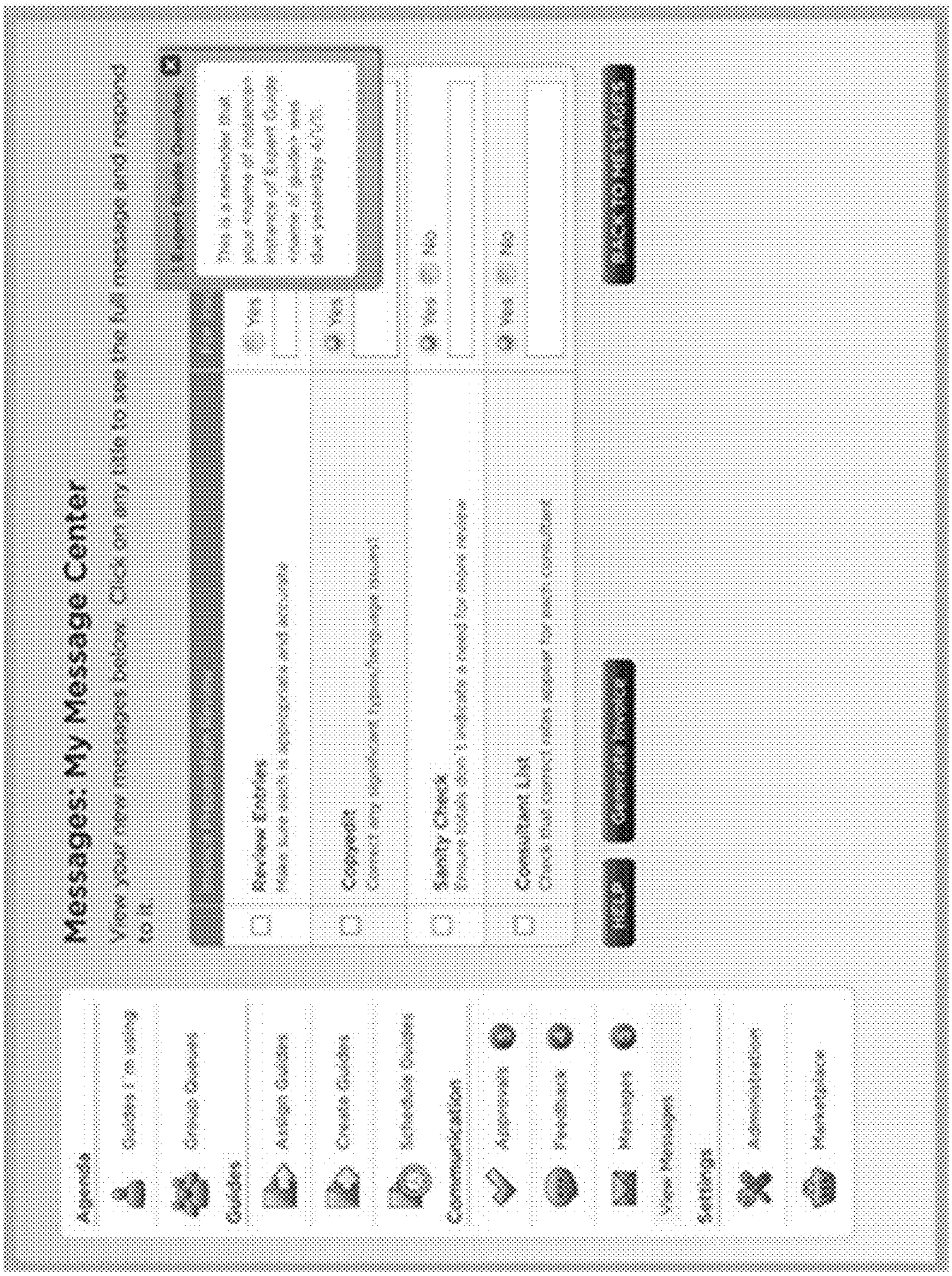

In accordance with some embodiments, using an interface 3202 that may be presented by a hardware processor of a computing device, the hardware processor can route internal messages to a "Message Center." The "Message Center," as shown, for example, in interfaces 3202 and 3204 of FIG. 32A and FIG. 32B, can be used by the hardware processor to send internal messages related to individual interactive checklists or users. Depending on the interactive checklist, organization, group or user configuration, and/or type of priority of message, a message may also be copied or rerouted to external message queues, such as a user's email, SMS, fax, Instant Messaging service, Message Bus, Enterprise Service Bus, or phone through text-to-speech. Messages can be sent by an interactive checklist when triggered by some action in some embodiments. User-to-user messages can also be provided in some embodiments. As with Feedback, the hardware processor can display the Message in context, with the interactive checklist to which it refers.

Figure 33:
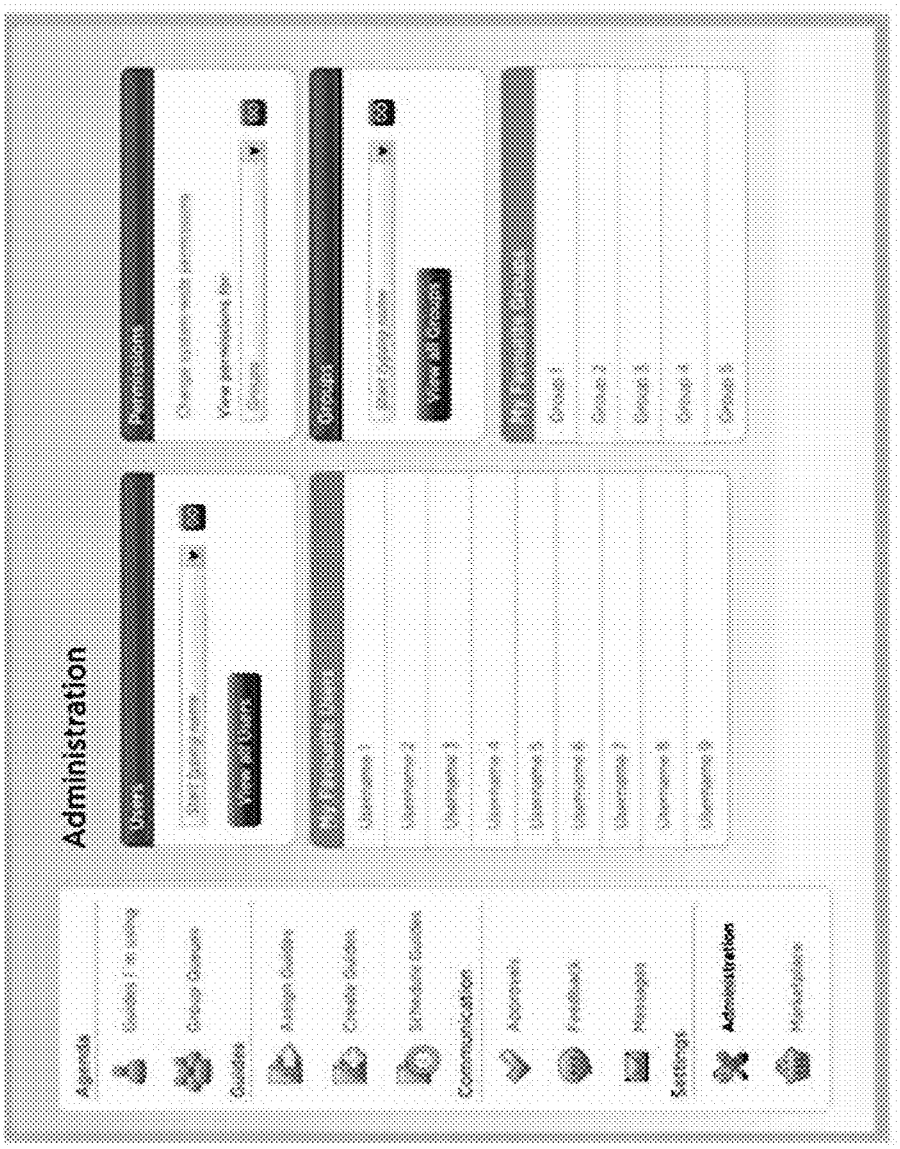
FIGS. 33, 34, 35, 36, 37, 38A, 38B, 38C, 39, 40, 41A, 41B, 42, 43, 44, 45, 46, 47, 48, 49A, 49B, 50A, 50B, 50C, 50D, 50E, 51, 52, 53, 54, and 55 show examples of user interfaces for configuring administration settings in accordance with some embodiments of the disclosed subject matter.

In accordance with some embodiments, one feature of an interactive checklist can be an "Administration Guide." In some embodiments, using an interface 3300 that may be presented by a hardware processor of a computing device, the hardware processor can configure settings and permissions from an organization. An example of such a guide is shown in interface 3300 of FIG. 33. From interface 3300, within an administration tab, the hardware processor can receive a user input to add or remove users from the interactive checklist, modify settings for existing ones, add or remove groups from the interactive checklist, modify settings for existing ones, modify interactive checklist-wide settings, and/or make any other modifications to the interactive checklist.

Figure 34:
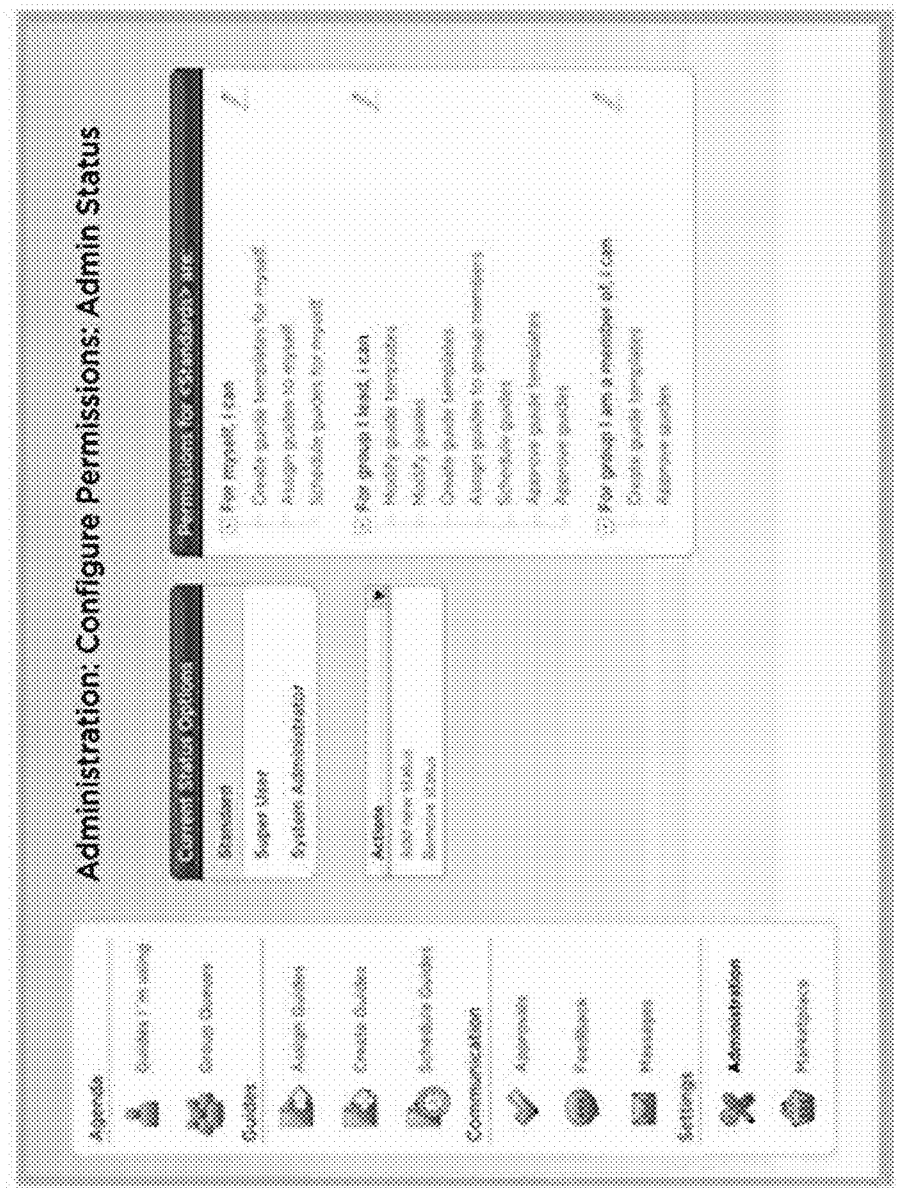

In accordance with some embodiments, there can be a series of interactive checklist-wide permissions that govern how permissions for users and groups can work. An example of such permissions can be presented by a hardware processor of a computing device as illustrated in interface 3400 of FIG. 34. The hardware processor can display an "Admin Status" that allows each user to be assigned an administrative status. As shown, an "Admin Status" option can define permissions the user has, for example, what they can or cannot do, view, and so forth. An interactive checklist can come with a number of default statuses. In some embodiments, the hardware processor can receive additional status options from a user, an administrator, etc. In some embodiments, an "Admin Status" option can be pre-configured and/or can be modified by a user, administrator, etc.

Figure 35:
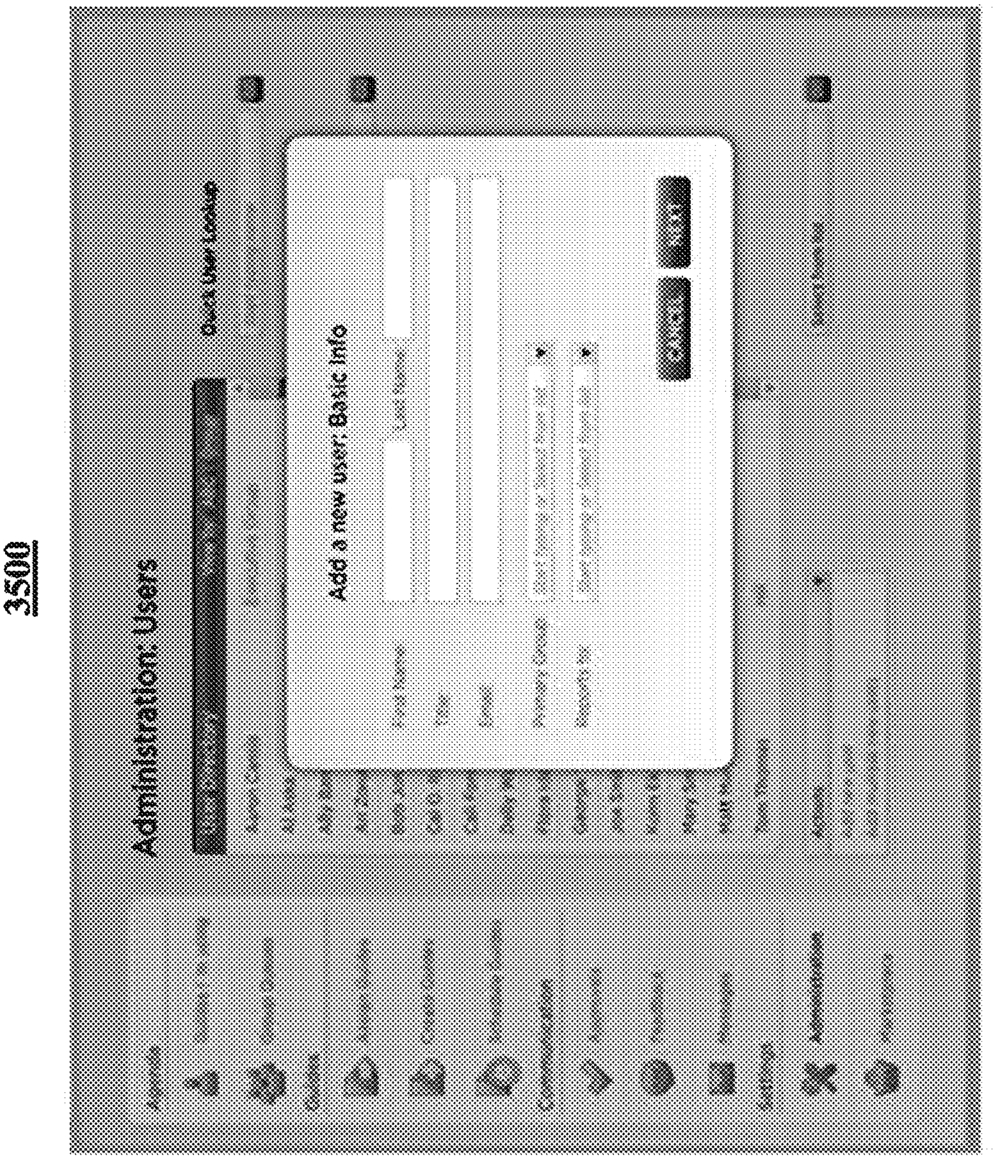

In accordance with some embodiments, when a new user is added to an interactive checklist, some details about the user can be added, such as, first and last names, job title, email address, and/or any other information as shown, for example, in interface 3500 of FIG. 35. A new user can be assigned to a primary group and a manager (another user in the interactive checklist). In some embodiments, the manager can be indicated as an administrative manager for follow up purposes. For example, the administrative manager can have less permissions than the manager in viewing details regarding the interactive checklists. Permissions settings can additionally or alternatively be configured for a new user. For example, a user can be assigned one of the available "Admin Status" choices, to provide a set of permissions. Modifications or exceptions to these permissions can be specified in some embodiments. Permissions can be copied from an existing user in some embodiments.

Figure 36:
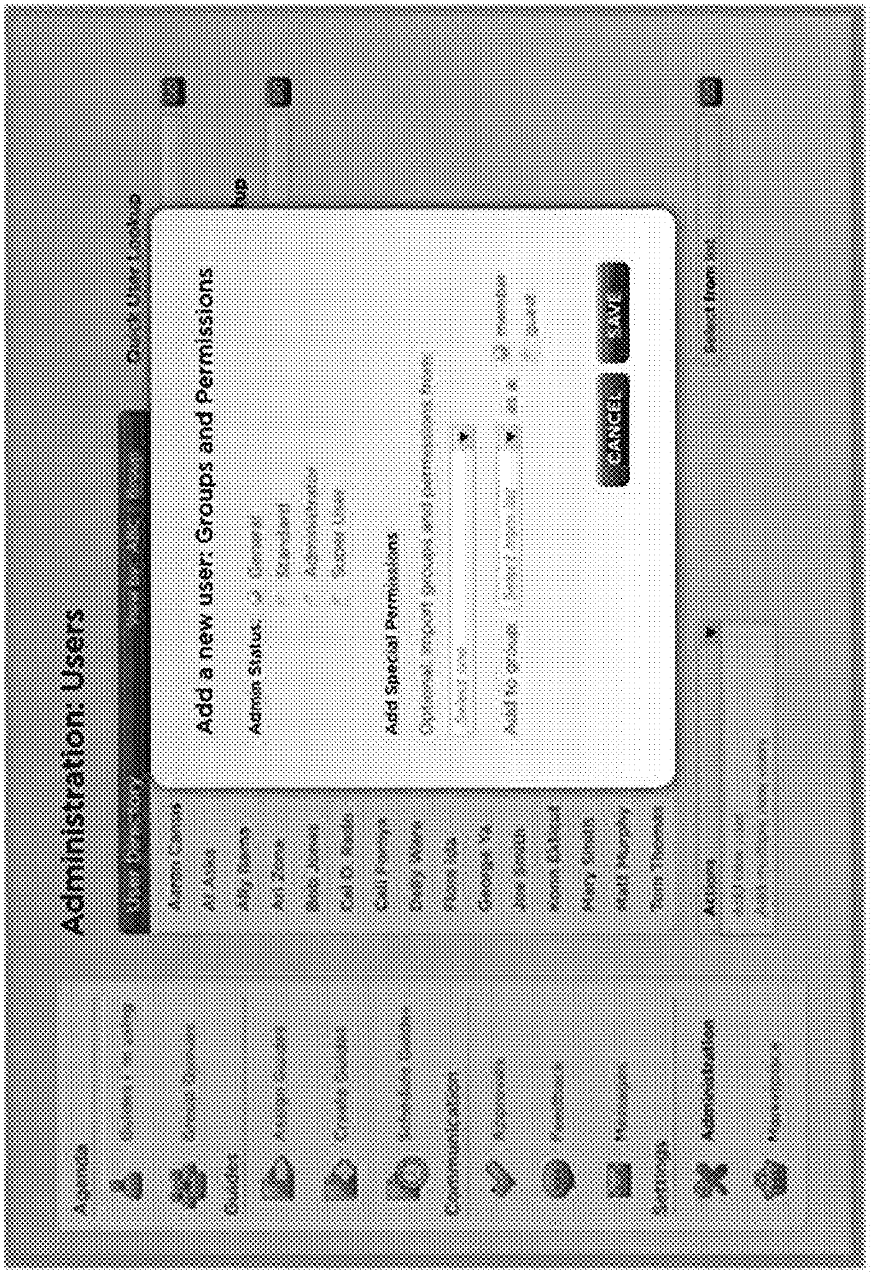

In accordance with some embodiments, multiple users may be added at once, for example, in interface 3600 of FIG. 36. Particular roles and other organizational or permissions settings may be set for all or a group of users at one time in some embodiments.

In some embodiments, upload from a spreadsheet, XML, format file, JSON format file, or a CSV format file, can be used to input user information, setting, permission, etc. In some embodiments, an LDAP directory can be used to provision and/or configure user accounts.

Figure 37:
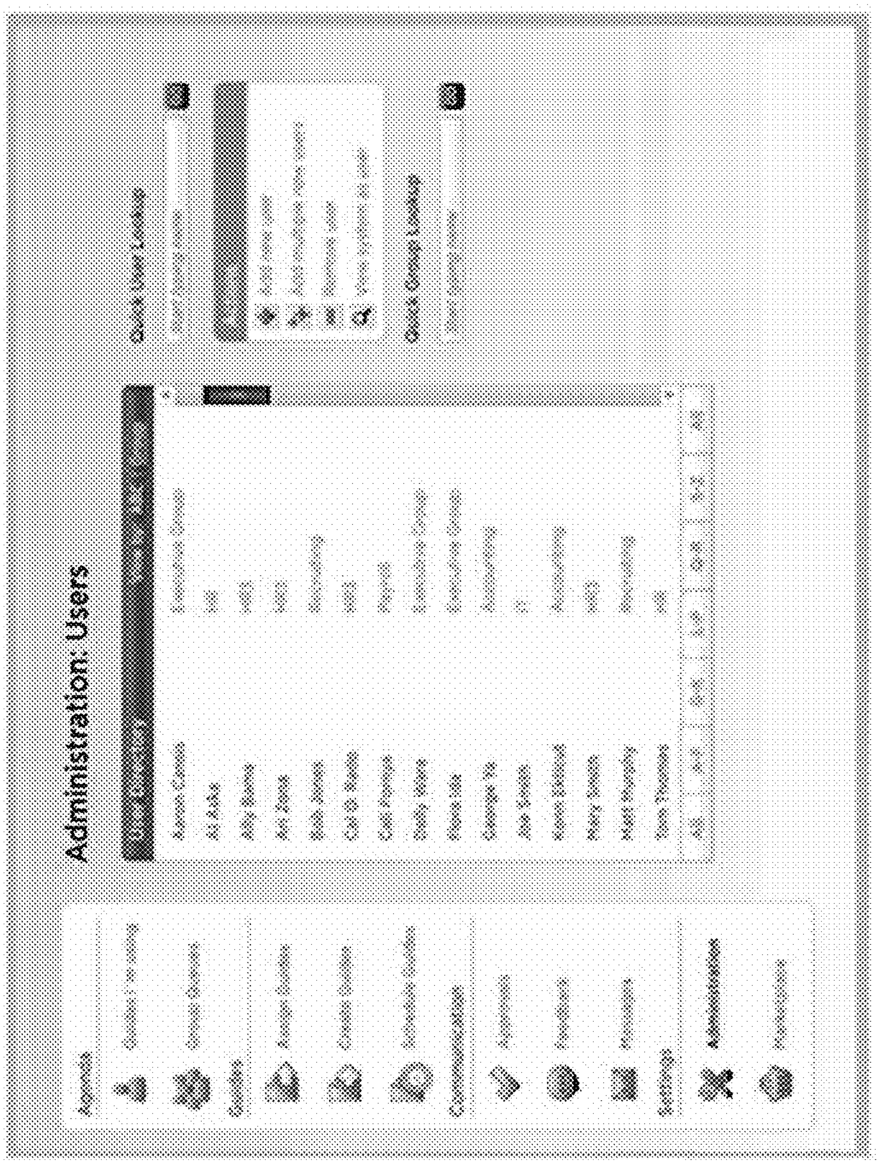
Figure 38A:
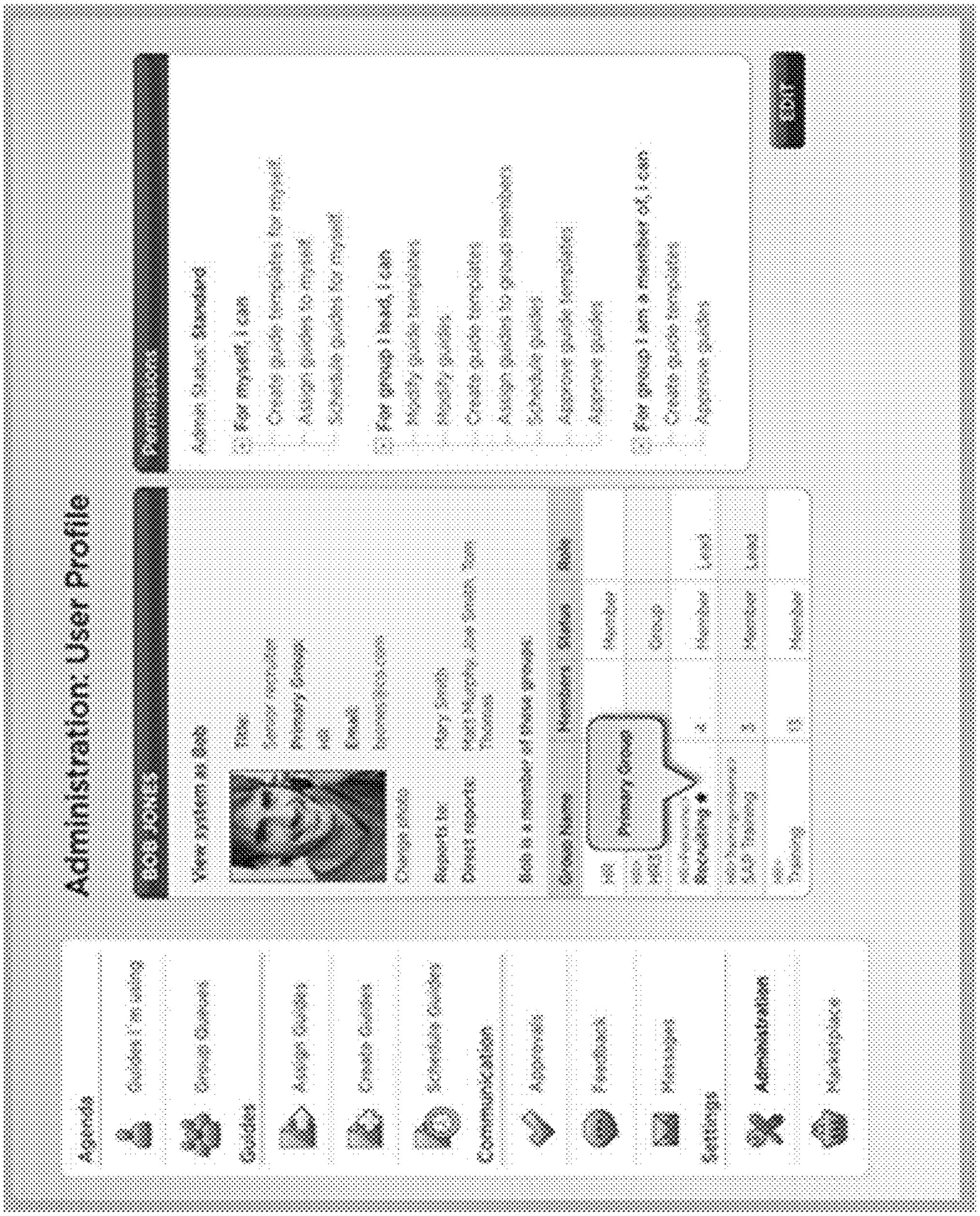

In accordance with some embodiments, using an interface 3700 that may be presented by a hardware processor of a computing device, the hardware processor can present a "User Directory" list, for example as shown in FIG. 37, once a user has been added to a mechanism for providing interactive checklists. The hardware processor can display the list alphabetically (by name) or by primary group affiliation. Access to the directory may be fully or partially allowed or restricted to particular individuals or groups' members. In some embodiments, using an interface 3802 of FIG. 38A (for example) that may be presented by a hardware processor of a computing device, the hardware processor can present a "User Profile" for any user appearing in the directory. As shown in interface 3802, the "User Profile" can display information such as basic information (e.g., name, email, manager, etc.), group memberships, permissions, additional fields configured by the organization, and/or any other suitable information.

In accordance with some embodiments, the hardware processor can receive a user input from an administrator indicating changes to a user's profile. In some embodiments, any element on a page can be modified, for example, basic information, group memberships, admin status, permissions, and/or any other element on the page as shown in interface 3804 of FIG. 38B. In some embodiments, the ability to modify an element on a page can be limited to certain groups of users or may be controlled by an external system or data repository. The hardware processor can receive a user input indicating permissions and/or permissions to grant at any suitable level, such as line by line, by groups (such as shown, for example, in interface 3806 of FIG. 38C), etc.

Figure 39:
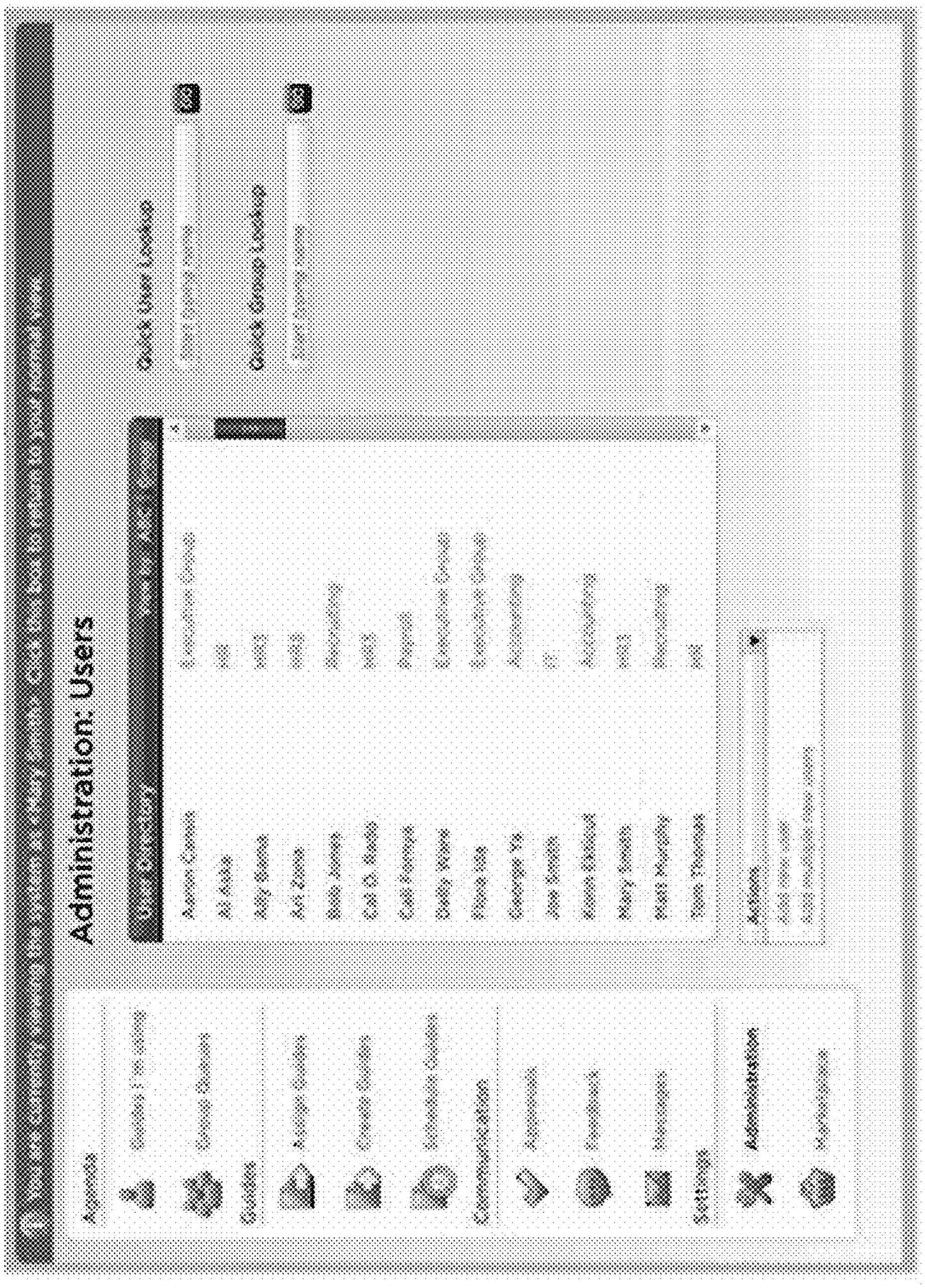

In accordance with some embodiments, another option available from the "User Profile" is the ability to view the interactive checklist as that user. Upon the hardware processor receiving a selection to view the interactive checklist as a second user, a first user can enter a mode in which the hardware processor displays the interactive checklist from the point of view of a second user, for example, as if the first user had logged in as the second user. The user can know that they are still in this mode from a bar that can appear across the top of each page when in this mode, as shown, for example, as presented by hardware processor in interface 3900 of FIG. 39; or from another rendering that indicates which user's perspective is in use. Restrictions on this functionality may be provided by a hardware processor for all or some users, preventing the "Viewer" from taking certain or all actions on behalf of the user, or accessing content restricted from them. Actions and navigation performed through this feature may be logged and displayed in attributions where appropriate.

Figure 38B:
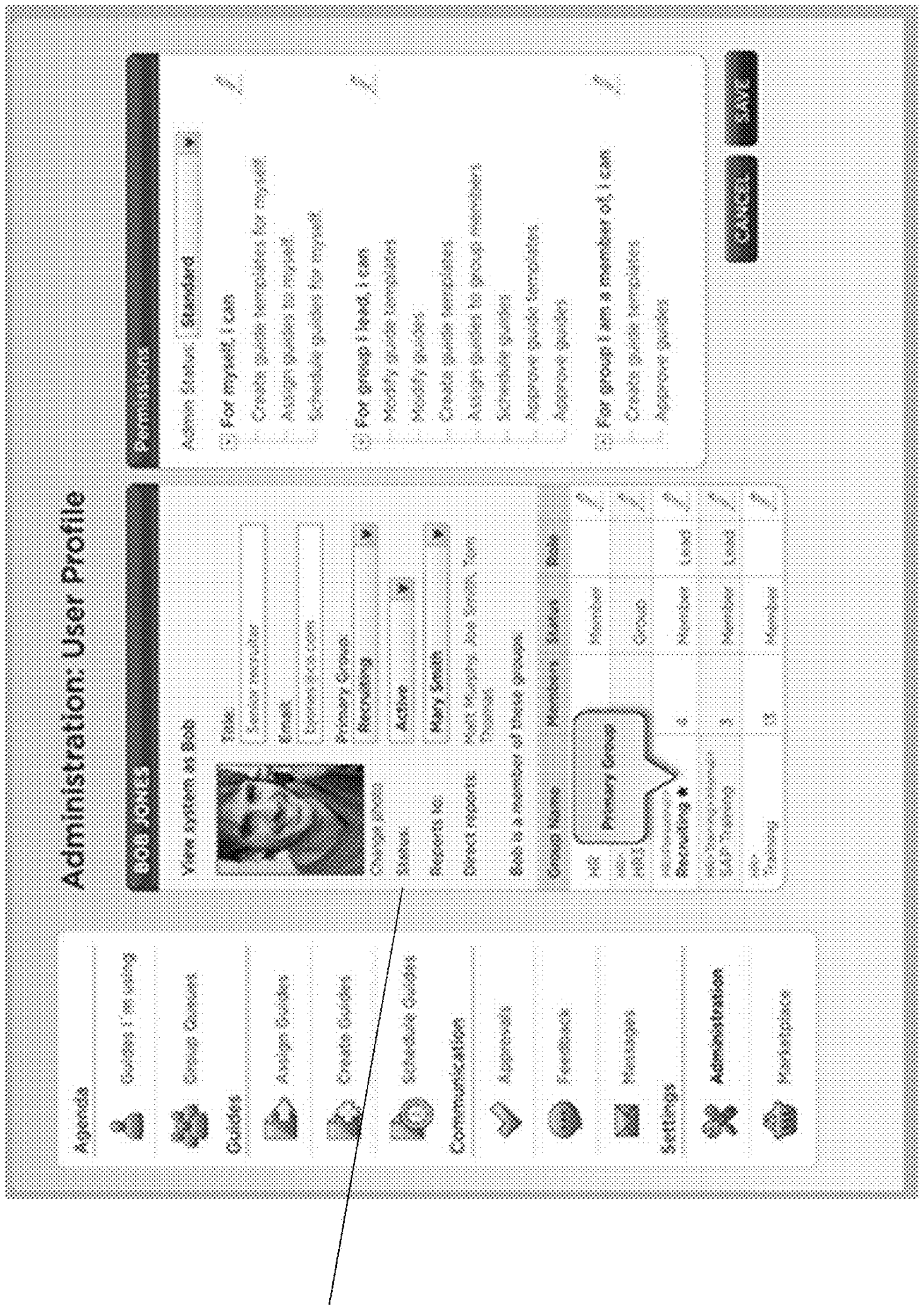
Figure 38C:
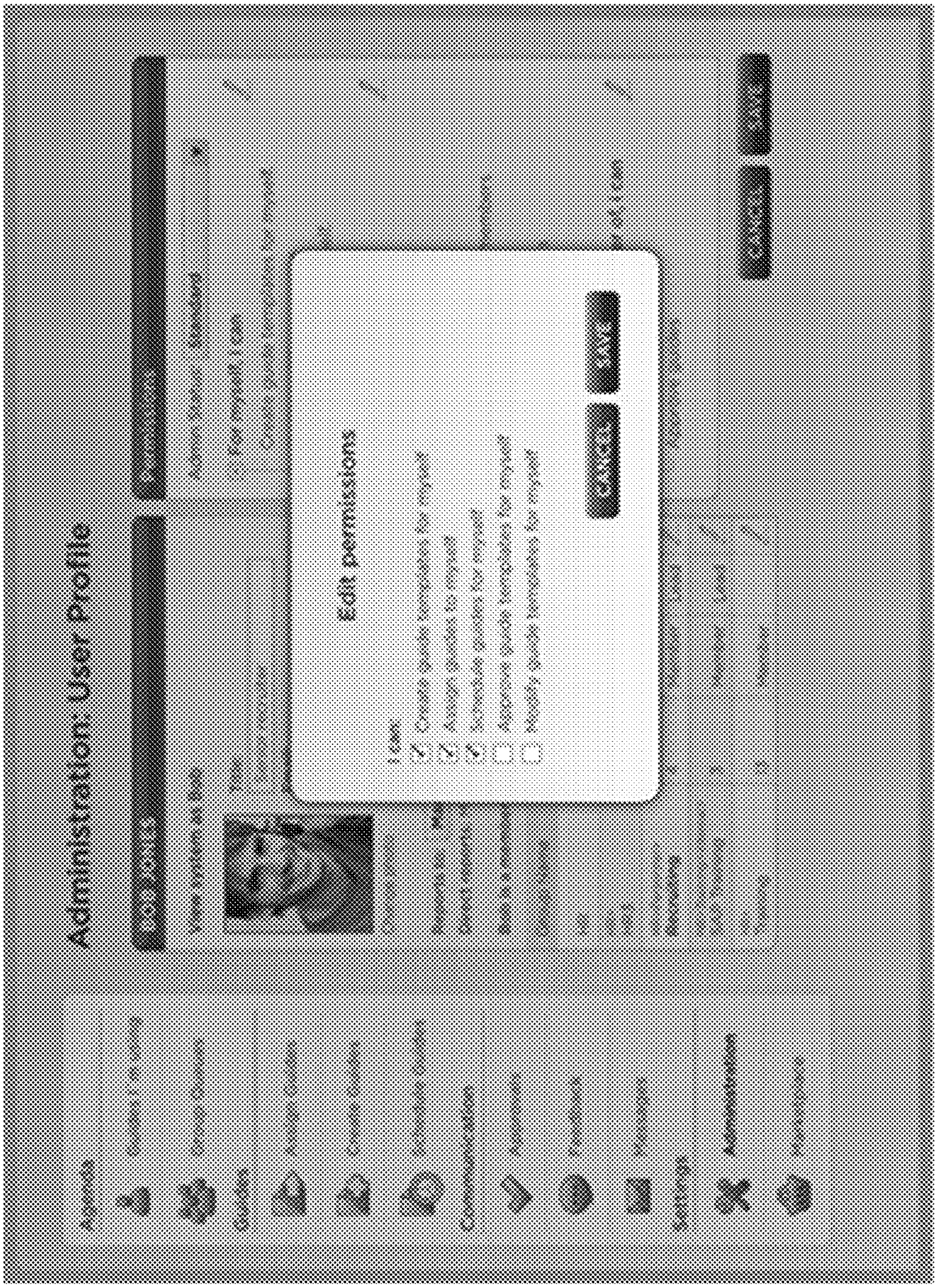
Figure 40:
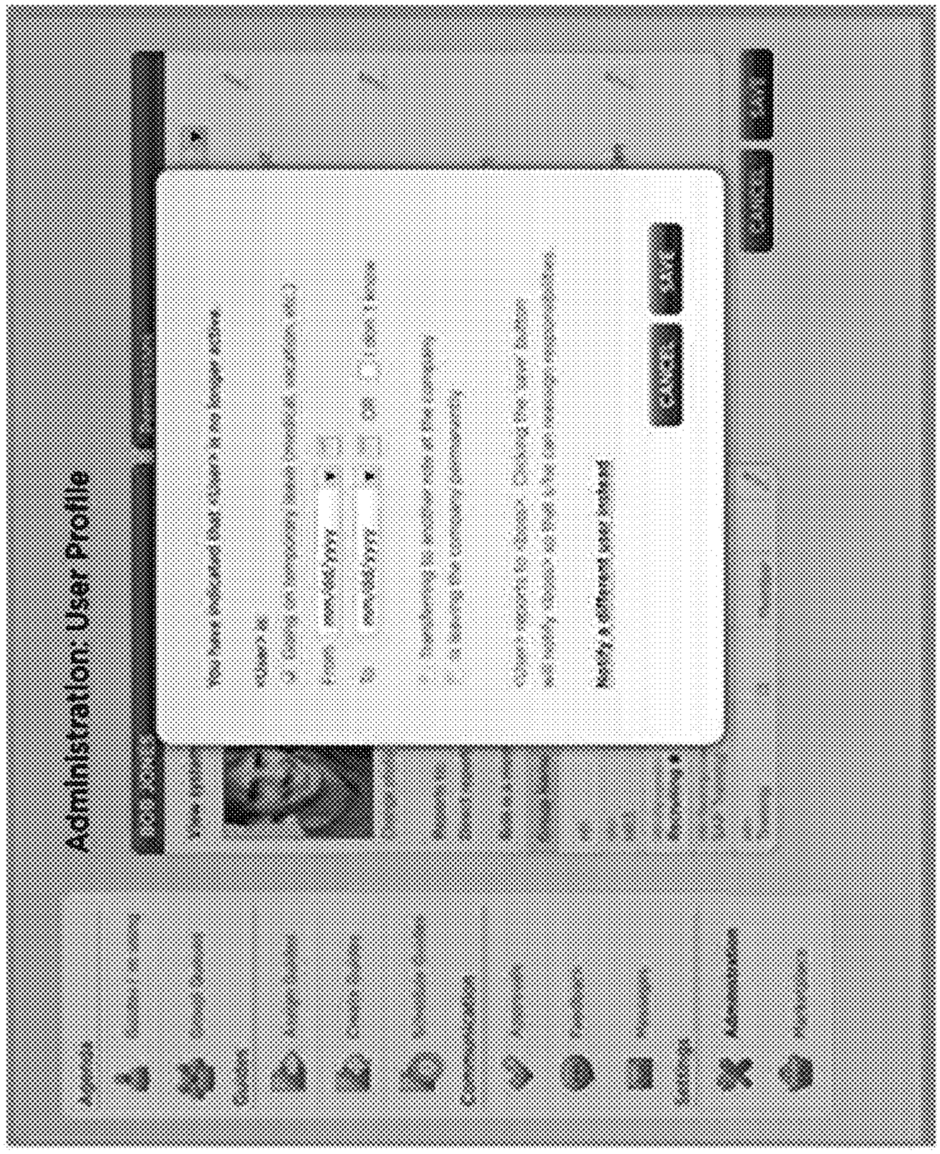
Figure 41A:
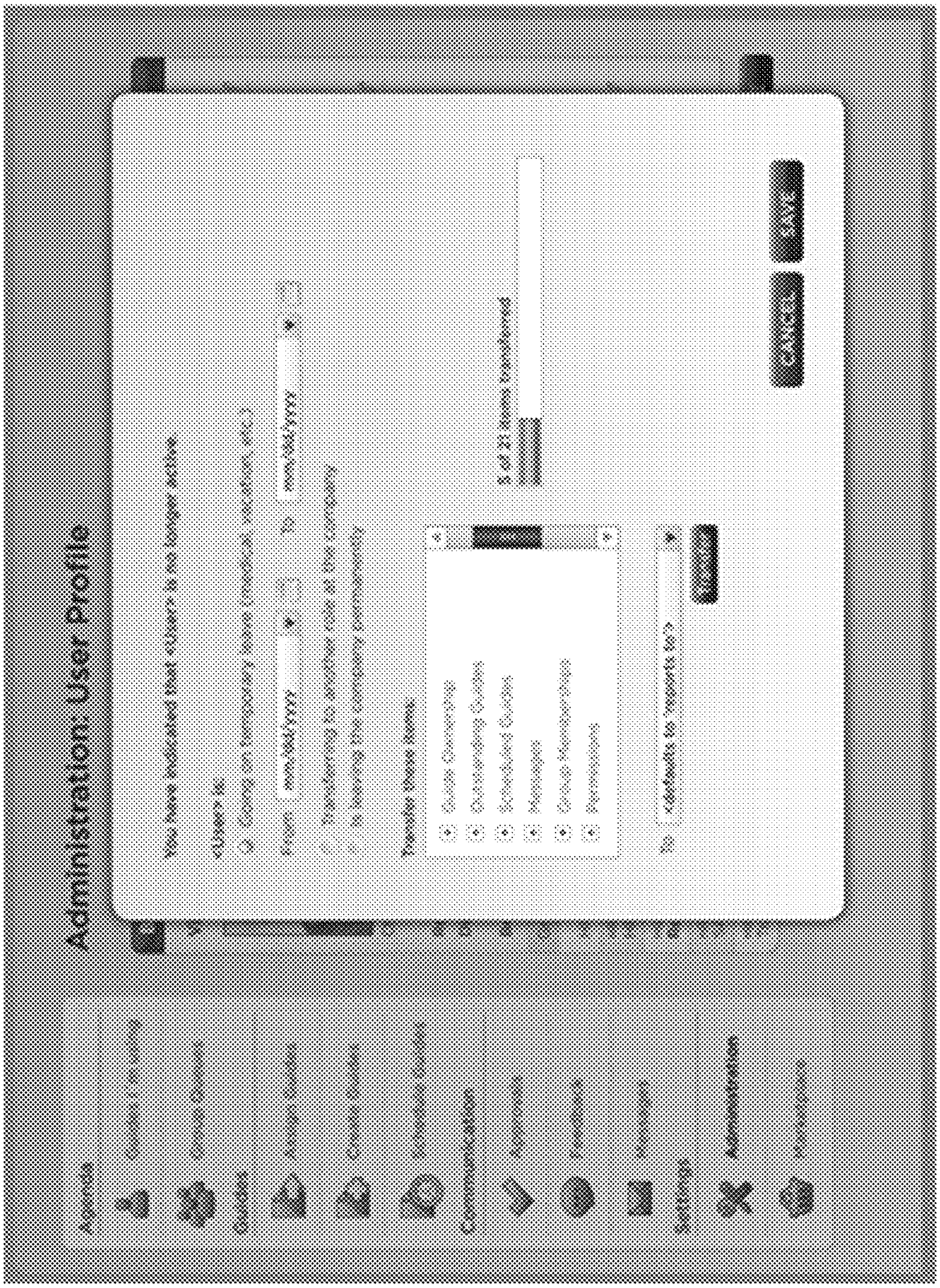
Figure 41B:
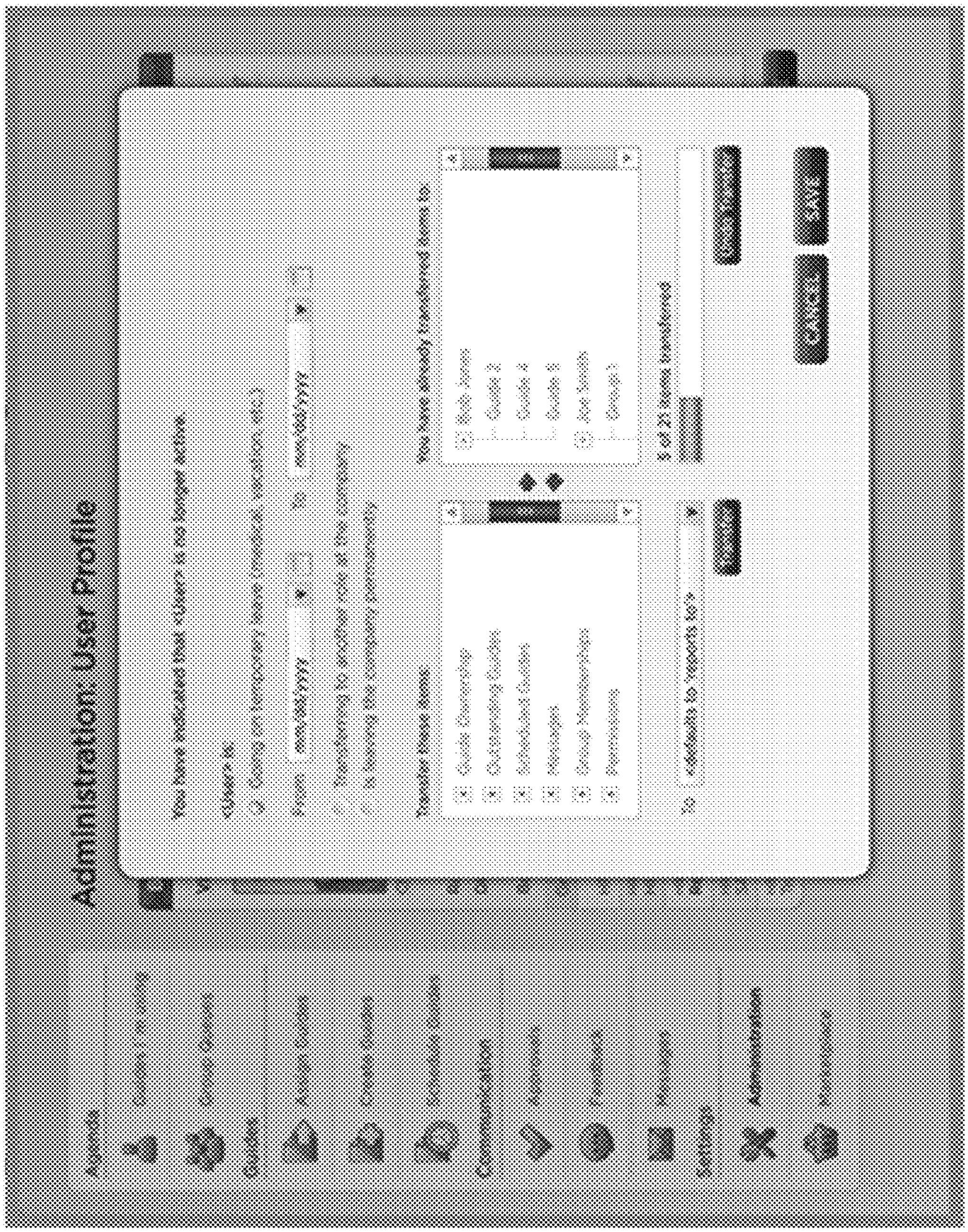

In accordance with some embodiments, from the user profile, using an interface 3804 that may be presented by a hardware processor of a computing device, the hardware processor can receive a user input to change a user's status at an organization as illustrated in FIG. 38B at a "Status" 3808 panel. A user can be considered active by default, but can be changed to be inactive. For example, a user may become inactive when on temporary leave (vacation, medical, etc.), when transferred to another role, when the user leaves the company permanently, and/or any other suitable reason. The interactive checklist can allow the interactive checklist user's work to be transferred to one or more other suitable users permanently or for specified dates as shown in interface 4000 of FIG. 40. If a user is going to become inactive, items can be transferred to other users, starting (and, if applicable, ending on) specified dates, such as interactive checklist ownership, outstanding assignments, scheduled interactive checklists, messages, group memberships, permissions settings, and/or any other transferable items as shown in interface 4102 of FIG. 41A. In some embodiments, each item can be transferred to a different user. If desired, the user can see which items they have already transferred, in addition to items awaiting transfer as shown in interface 4104 of FIG. 41B.

Figure 42:
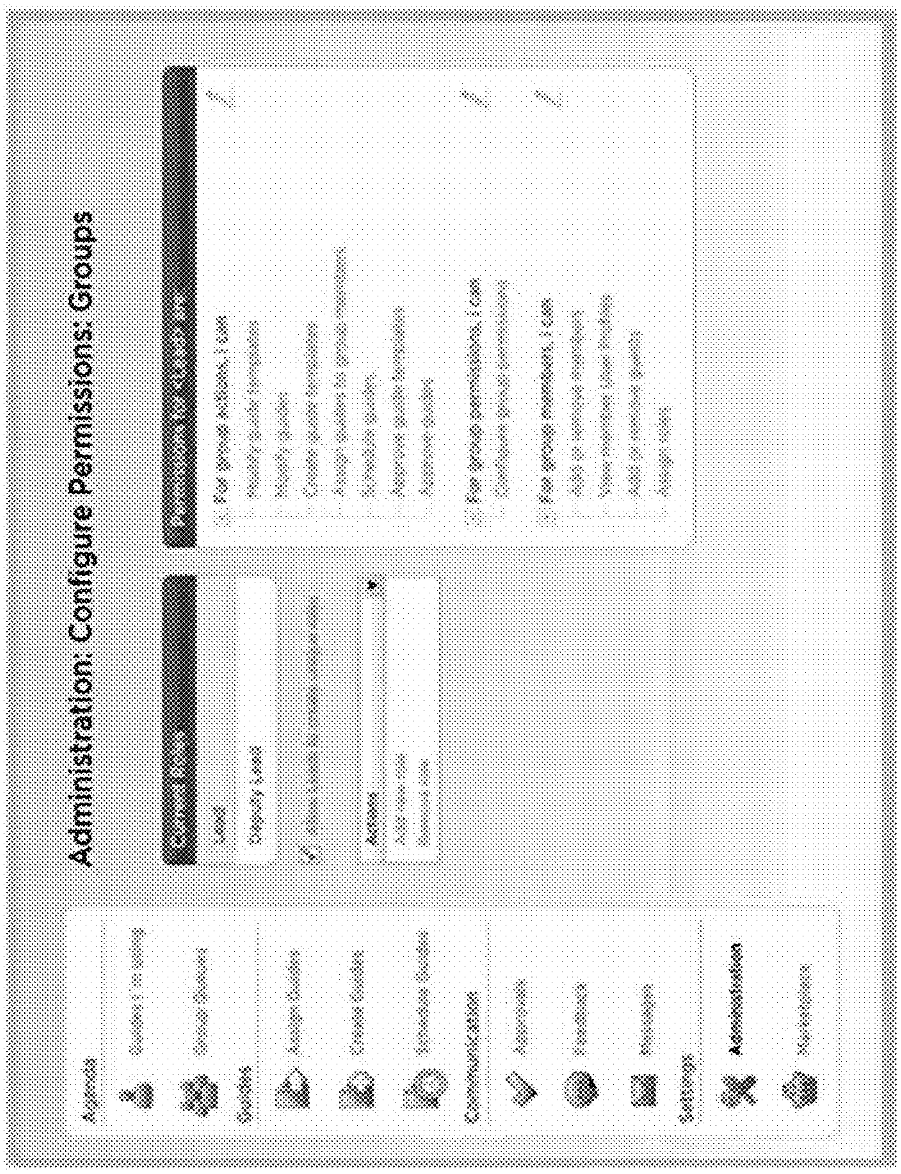

In accordance with some embodiments, an organization can have a hierarchy of "Groups." A group can have any suitable number of subgroups. Users can belong to groups where each can have a primary group with which they are affiliated, but can be members of any suitable number of groups. In some embodiments, interactive checklists can also belong to groups, and, when created, each interactive checklist can be given a location within a group in the group hierarchy. In some embodiments, a series of interactive checklist-wide permissions, e.g., as shown in interface 4200 of FIG. 42, can govern how permissions for users and groups can work. In a group, all users can be classified as members or guests of that group. Each designation can come with a preconfigured set of permissions. In addition, a group can have "Roles." For example, each group can have a role "Group Lead" (which can have a preconfigured set of permissions). This "Group Lead" may be inherited from group parent if not specified. Additional roles can be added, e.g., at the interactive checklist level (e.g., for all groups to optionally use) or at the group level (e.g., for only that group to use). In all cases, the preconfigured permissions can be modified as desired. In some embodiments, members or guests of a group can be set to dynamically inherit from another group. For example, changes to the other group's membership can result in changes to the group's membership.

Figure 43:
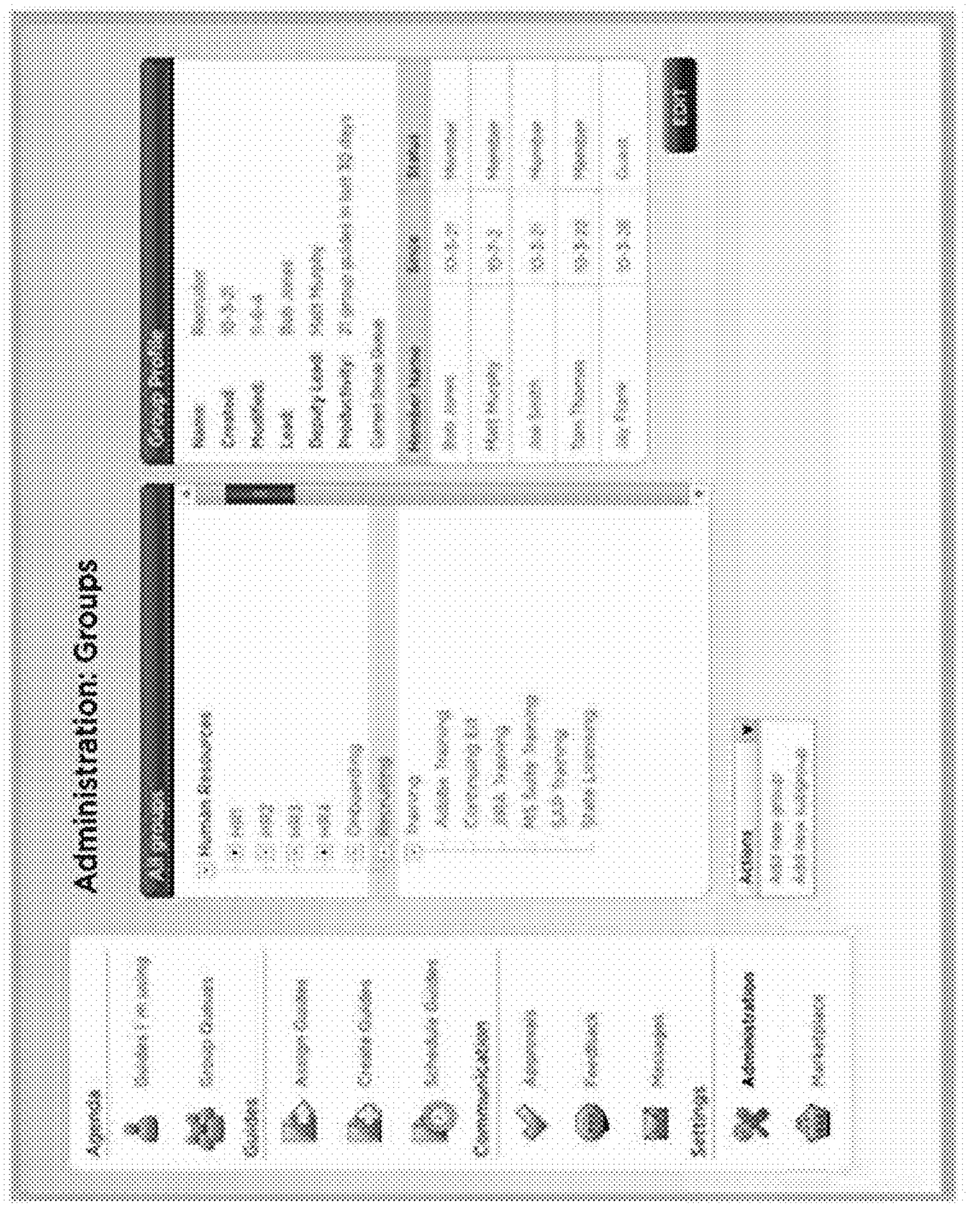
Figure 44:
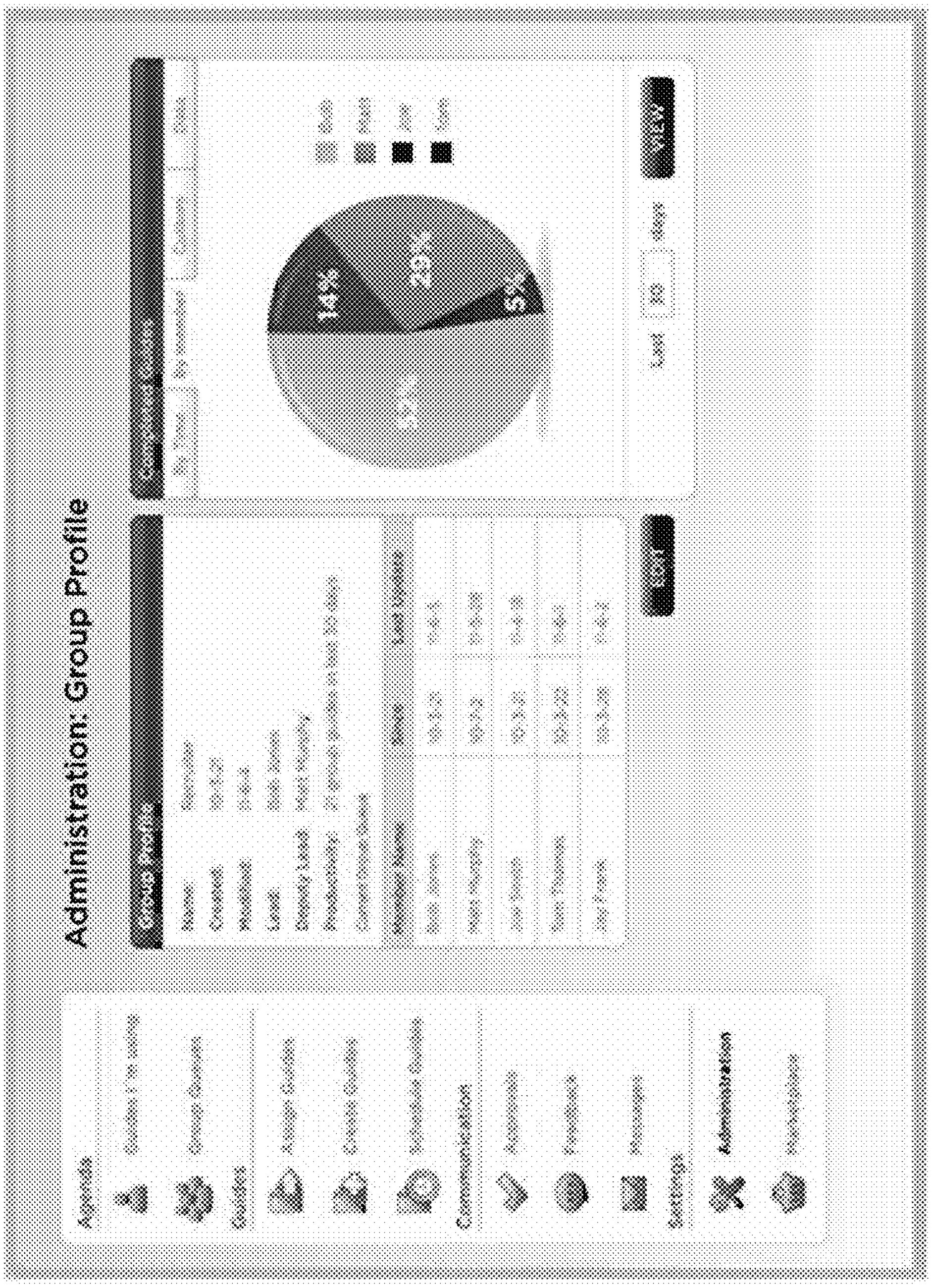
Figure 45:
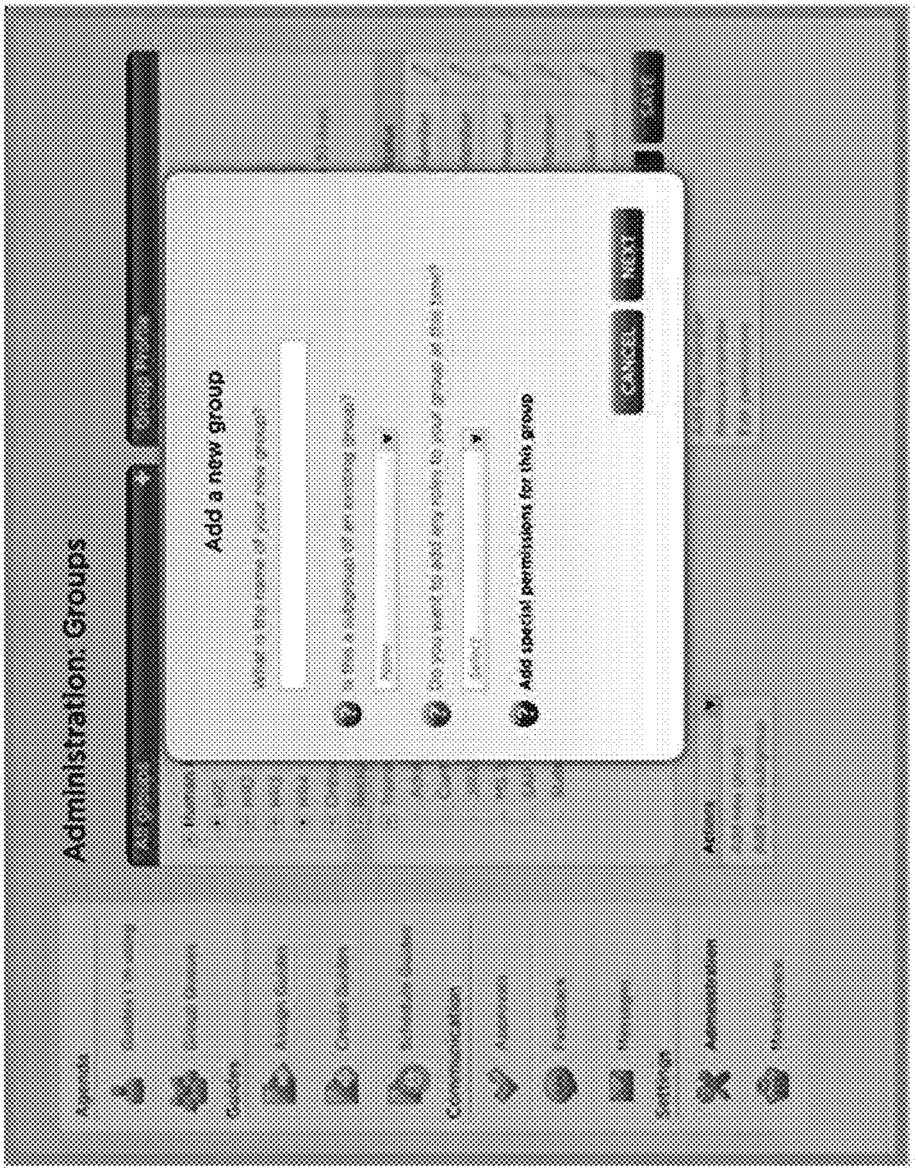

In accordance with some embodiments, all groups can be listed in a group hierarchy and each group can have a profile listing basic information about the group and a membership list as shown in interface 4300 of FIG. 43. When a detailed "Group Profile" is viewed, the same information can be available, as well as detailed productivity information as shown in interface 4400 of FIG. 44, in some embodiments. In some embodiments, using an interface 4500 that may be presented by a hardware processor of a computing device, the hardware processor can receive a new group, as shown in FIG. 45, from a user first providing information about the new group, for example, name of group, place in the group hierarchy (e.g., is it a subgroup of an existing group?), any interactive checklist-wide roles that should be added (e.g., the role "Group Lead" can be added by default), any modifications to default permissions, and/or any other information. Note that, in some embodiments, default permissions can indicate users and/or groups of users who, by default, are allowed to view different Guides or activities, are allowed to edit different Guides or activities, etc. In some embodiments, default permissions can be assigned to specific users or to groups of users (e.g., a group of users who share the same title in an organization, and/or any other suitable group of users). In some embodiments, default permissions can be overridden at any suitable time and/or in any suitable manner. In some embodiments, an activity can inherit default permissions from a Guide that includes the activity. In some embodiments, the hardware processor can display only certain groups. For example, the hardware processor can display or not display certain groups based on the groups' permissions settings.

Figure 46:
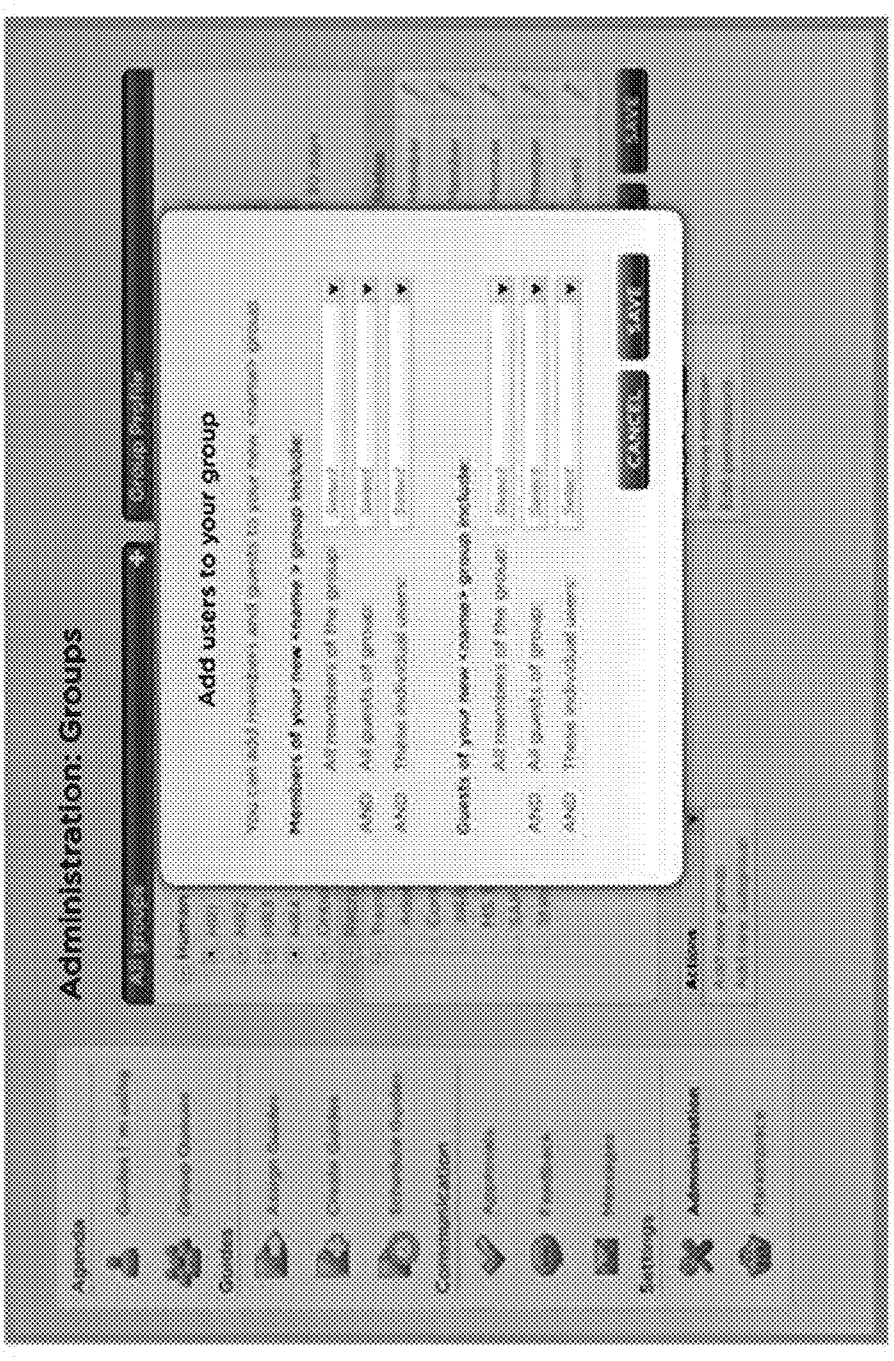
Figure 47:
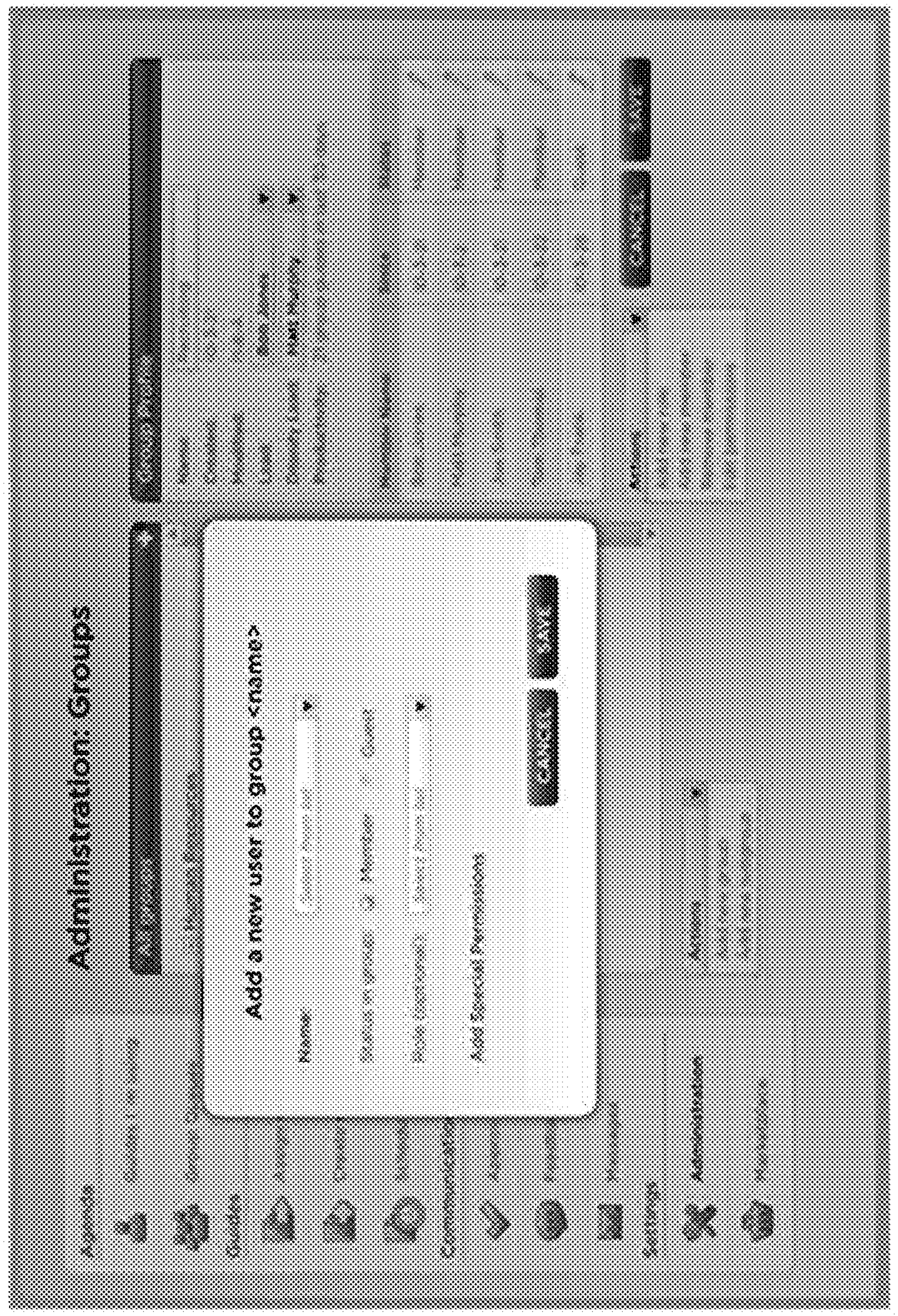

Then, as shown in interface 4600 of FIG. 46, using an interface 4600 that may be presented by a hardware processor of a computing device, the hardware processor can receive users to be added to the new group. New users can be added at any time. In some embodiments, the hardware processor can receive many new users at once by importing them from existing groups. New users can be added as members or guests. In addition, as shown in interface 4700 of FIG. 47, users can be added or removed from a group by indicating a user's name, a user's membership status (member or guest), a user's role (optional), and/or whether a user's permissions within the group should be modified.

Figure 48:
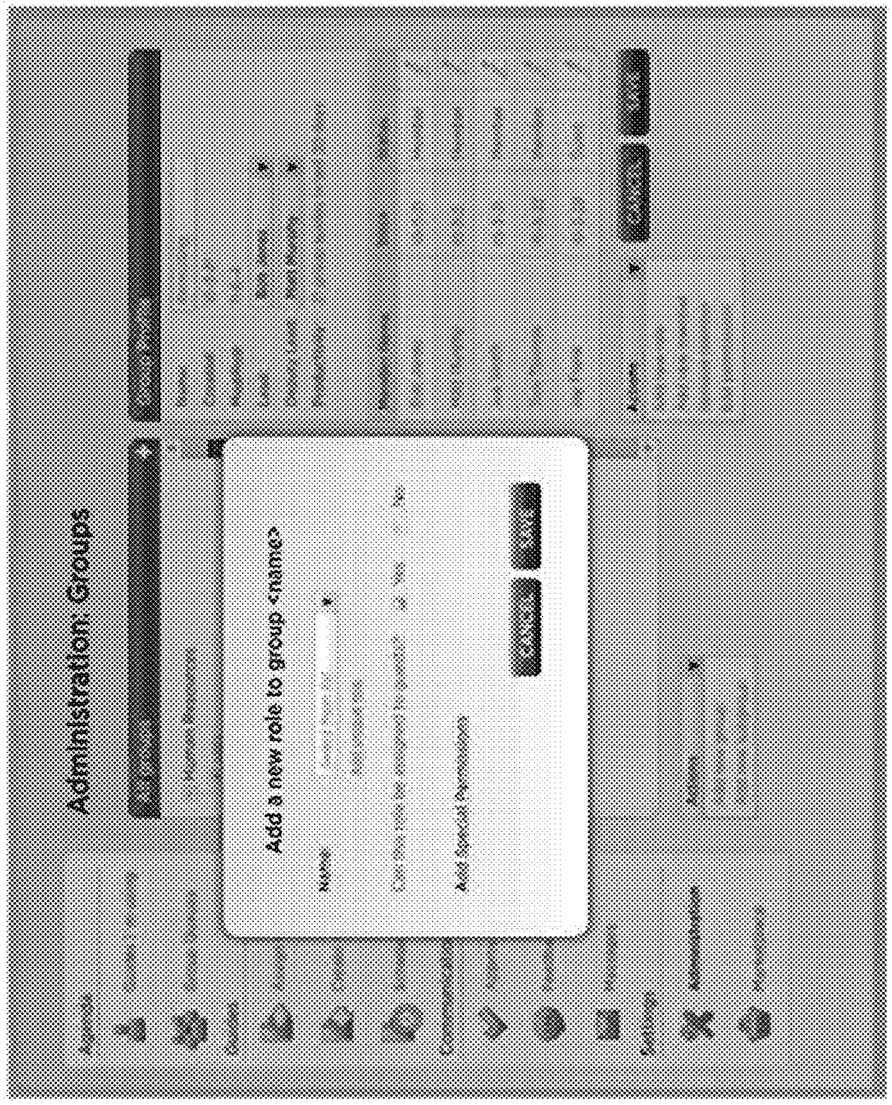
Figure 49A:
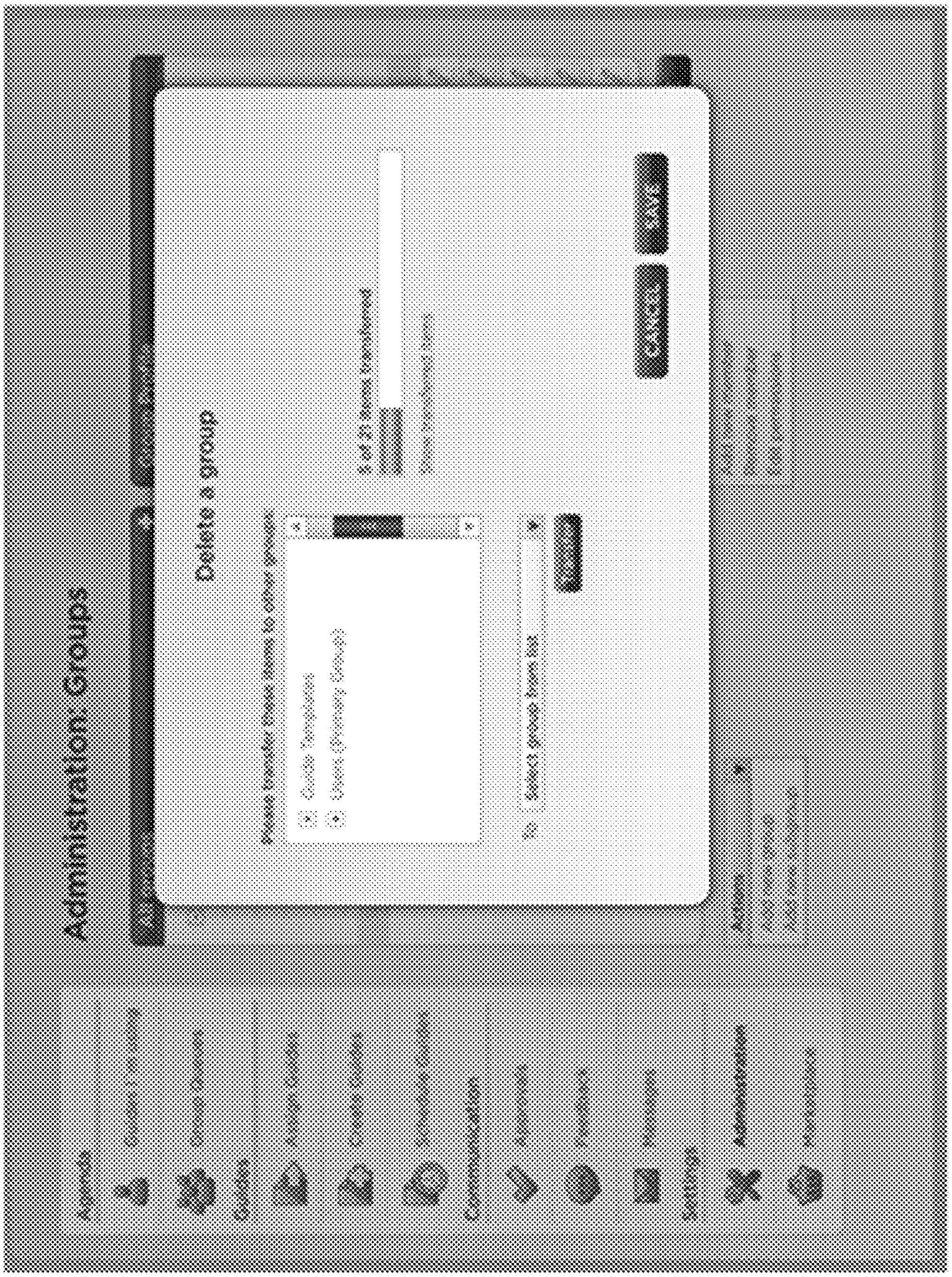
Figure 49B:
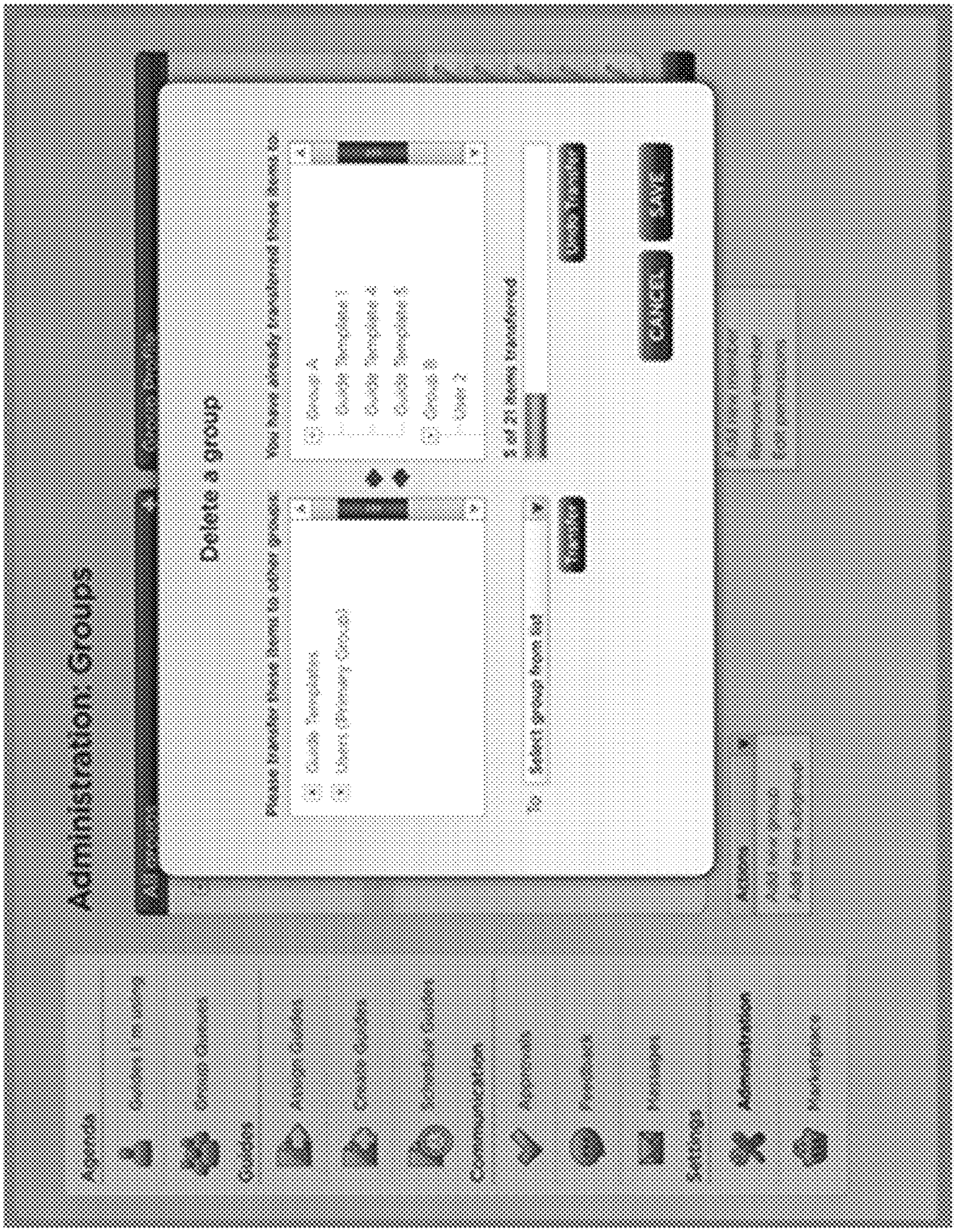

In accordance with some embodiments, using an interface 4800 that may be presented by a hardware processor of a computing device, the hardware processor can receive additional roles that can be added to a group as shown in FIG. 48. An interactive checklist-wide role can be selected from a drop-down menu or a role that is unique to a group can be added. If necessary, a group can be deleted as shown in interfaces 4902 and 4904 of FIG. 49A and FIG. 49B. In some embodiments, permissions can indicate whether this or other functions can be performed by an individual or by members of a group. To do so, items such as, for example, interactive checklists whose location is this group or users for whom this group is their primary group can be transferred to other groups. In some embodiments, using an interface 4904 that may be presented by a hardware processor of a computing device, the hardware processor can display a transfer widget, as shown, for example, in FIG. 49B that can be used to transfer items between users.

Figure 50A:
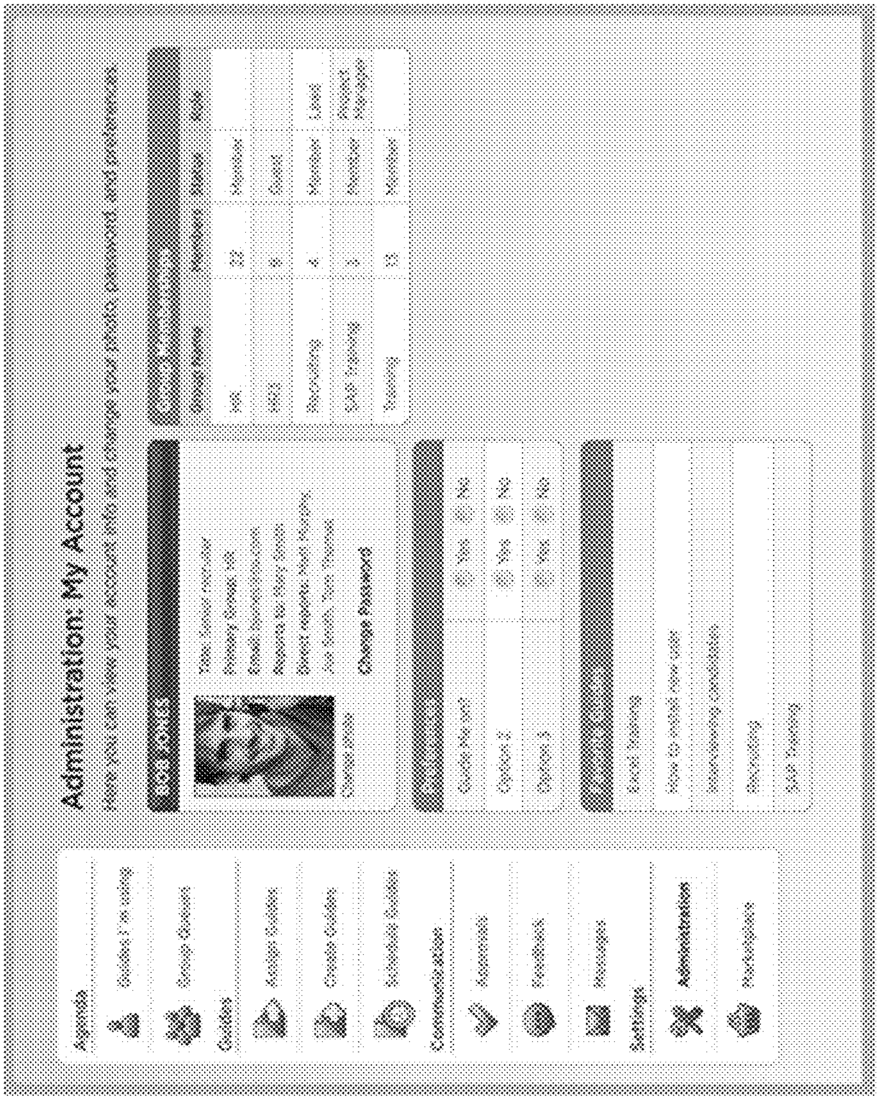

In accordance with some embodiments, using an interface 5000 that may be presented by a hardware processor of a computing device, the hardware processor can present a "My Account" page (e.g., for each user) as shown, for example, in FIG. 50A. Here, the hardware processor can display a user's basic information, the user's group memberships, and/or the user's interactive checklists. The hardware processor can receive a user input to indicate the user's interactive checklist preferences and/or receive a user input to indicate a user would like to change their password.

Figure 50B:
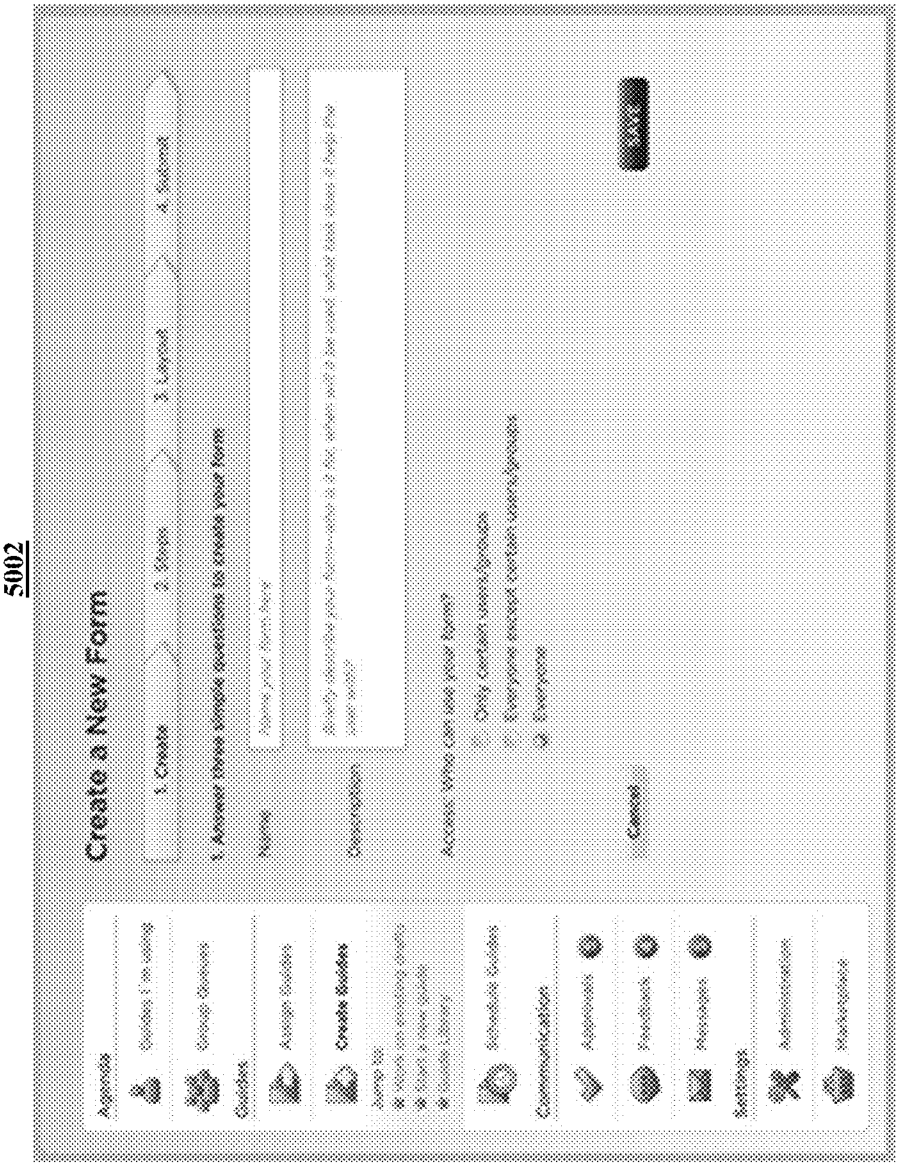
Figure 50C:
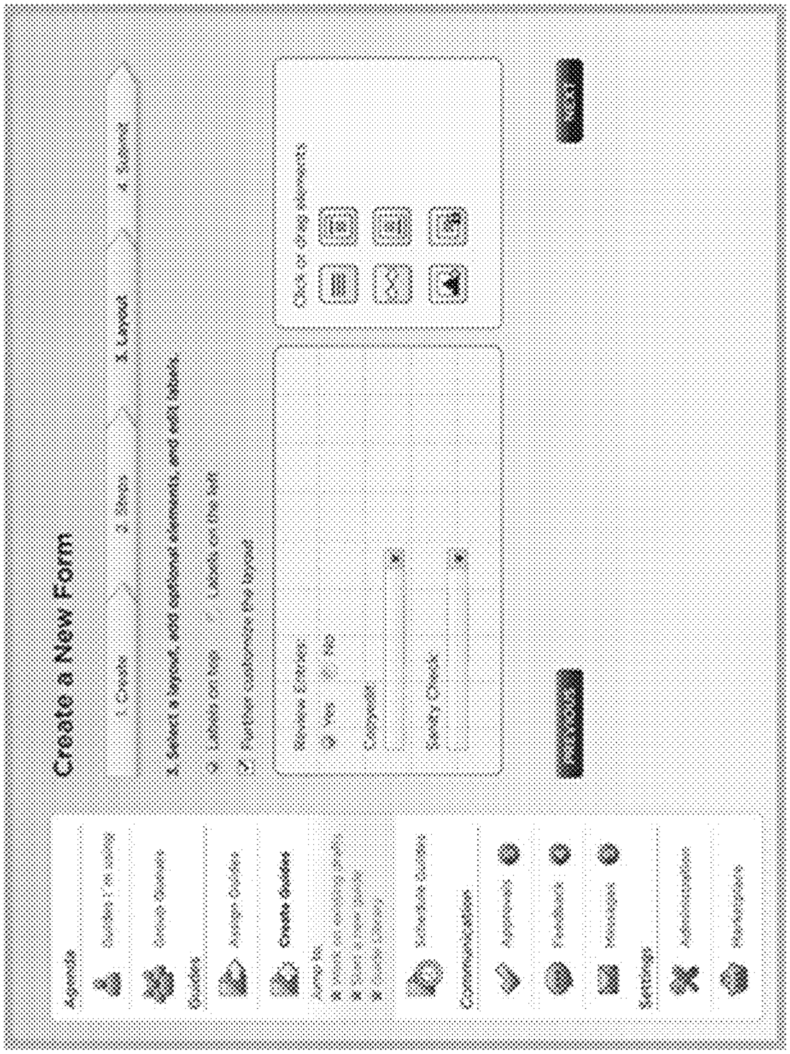
Figure 50D:
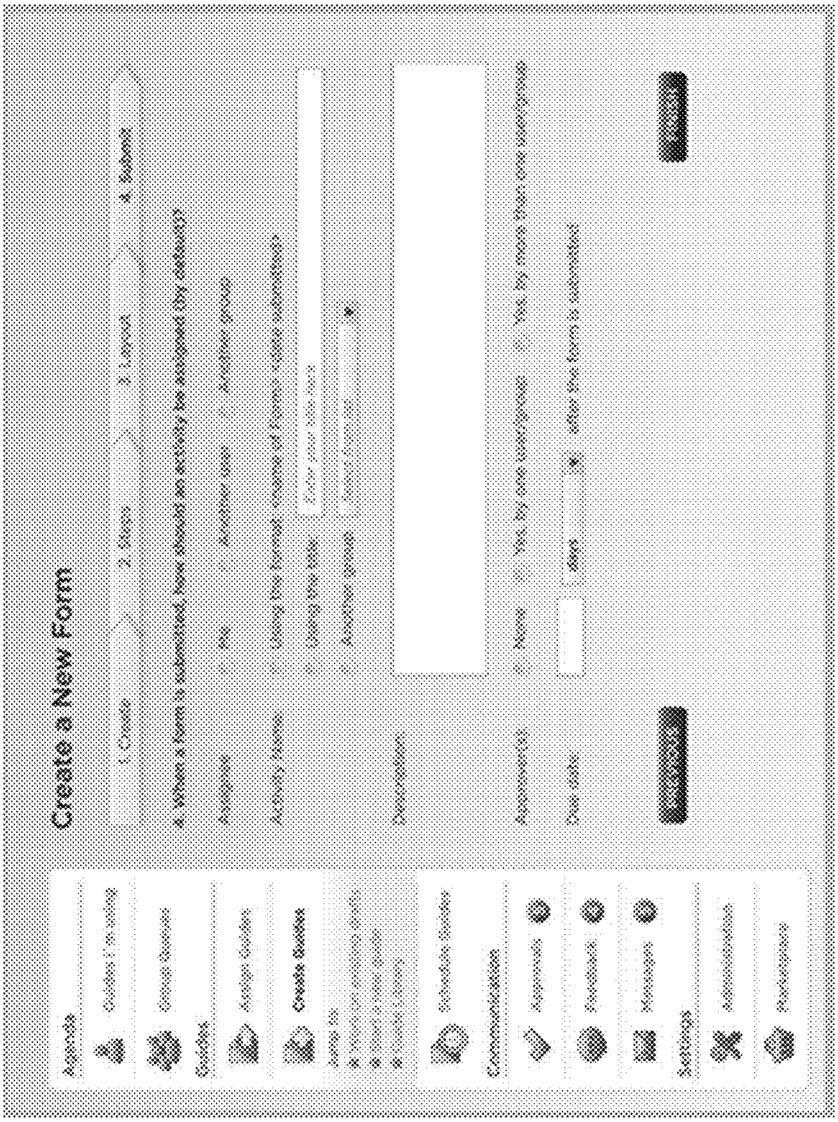
Figure 50E:
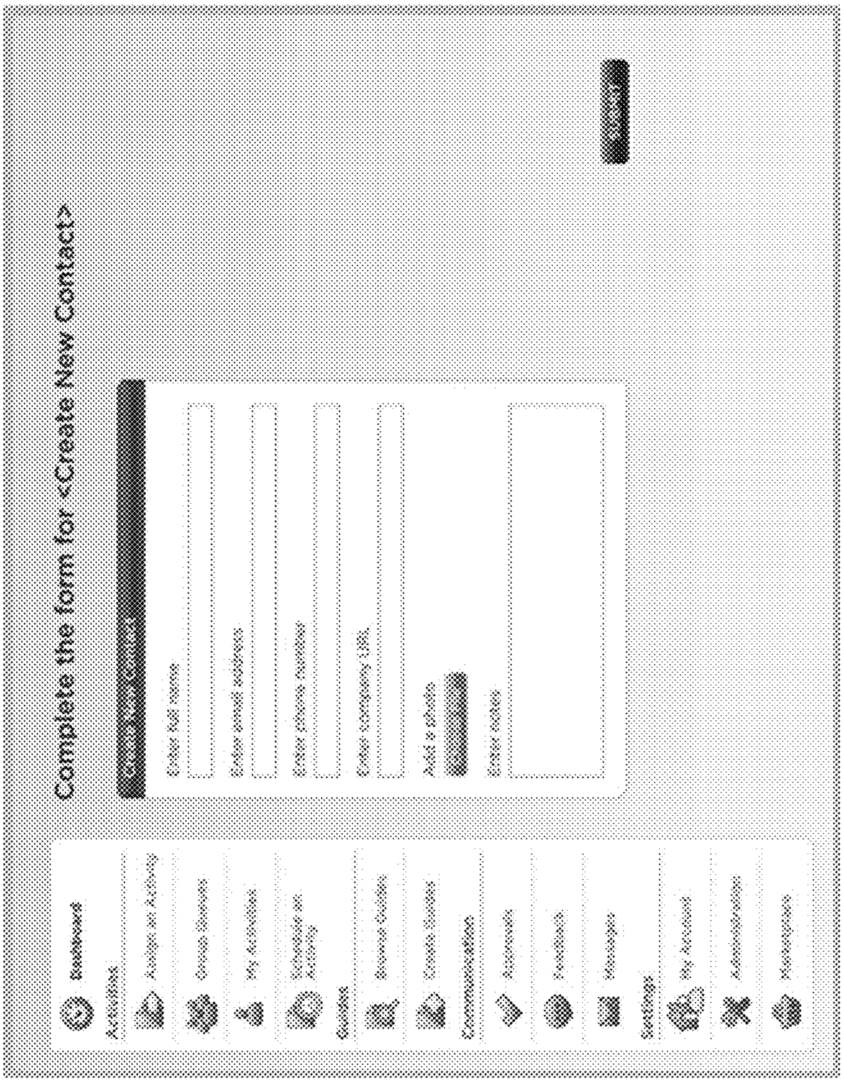

In accordance with some embodiments, the hardware processor can receive a user input indicating a request to create a new interactive checklist, as shown in interface 5002 of FIG. 50B Creating a new interactive checklist provides an alternative approach to enabling a specification and assignment of an interactive checklist. In some embodiments, the new interactive checklist can be used in conjunction with specific guides or as standalone objects. Additionally, the new interactive checklists can be used internally by the hardware processor or can be used on an external website enabling individuals who are not part of an organization to initiate a request. In some embodiments, the hardware processor can receive a user input to customize the new interactive checklist. The new interactive checklist can include any suitable properties such as an ability to restrict access, an ability to map answers to steps in a guide, and/or any other suitable property. In some embodiments, the hardware processor can receive layouts and styles for the new interactive checklist, as shown in interface 5004 of FIG. 50C. For example, the layouts can be default layouts or customized layouts. In such an example, images, headings, and additional text can be included and optionally positioned for each layout. In some embodiments, the hardware processor can receive a user input to configure the new interactive checklist to automatically generate new activities using the interactive checklist input fields, as shown in interface 5006 of FIG. 50D. In some embodiments, for example, the hardware processor can receive a request to create a new contact, as shown in interface 5008 of FIG. 50E. For example, the request can include a name of the contact, an email of the contact, the phone number of the contact, a photo of the contact, and/or any other suitable information of the contact. In some embodiments, a "New User Configuration" interactive checklist can be submitted with a request to create a new user accounts, which can in turn assign a separate Activity to a system administrator. For example, the fields can look consistent with some other systems and the user may not know he or she were indirectly invoking an interactive checklist. In some embodiments, creation of a new user account can cause a new user group to additionally be created corresponding to the new user account, and, in some embodiments, one or more personal Guides can be stored in association with the new user group.

Figure 51:
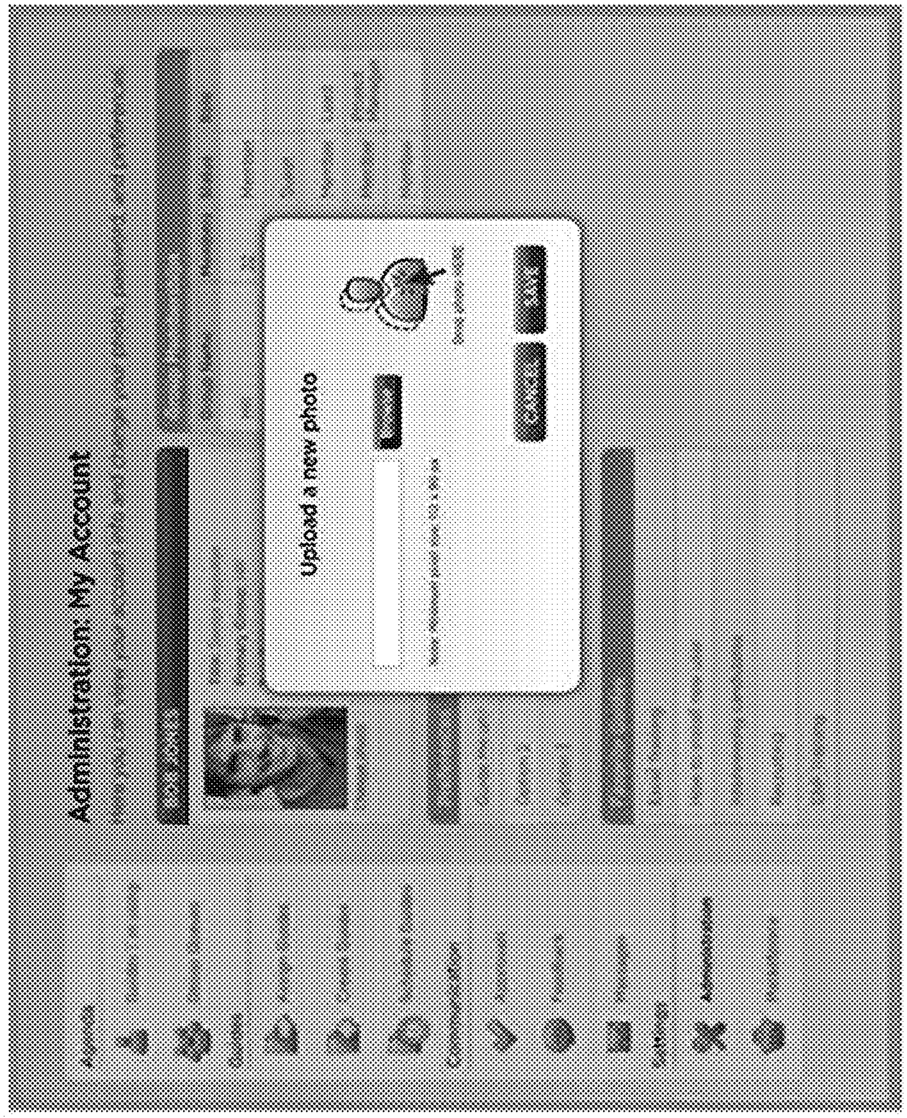

In accordance with some embodiments, the hardware processor can receive user photography and/or video uploads. For example, the hardware processor can receive a file from a user (e.g., drag and drop it into place as shown in interface 5100 of FIG. 51) or receive a file imported from an external service such as a social media website or application (e.g., Facebook™).

Figure 52:
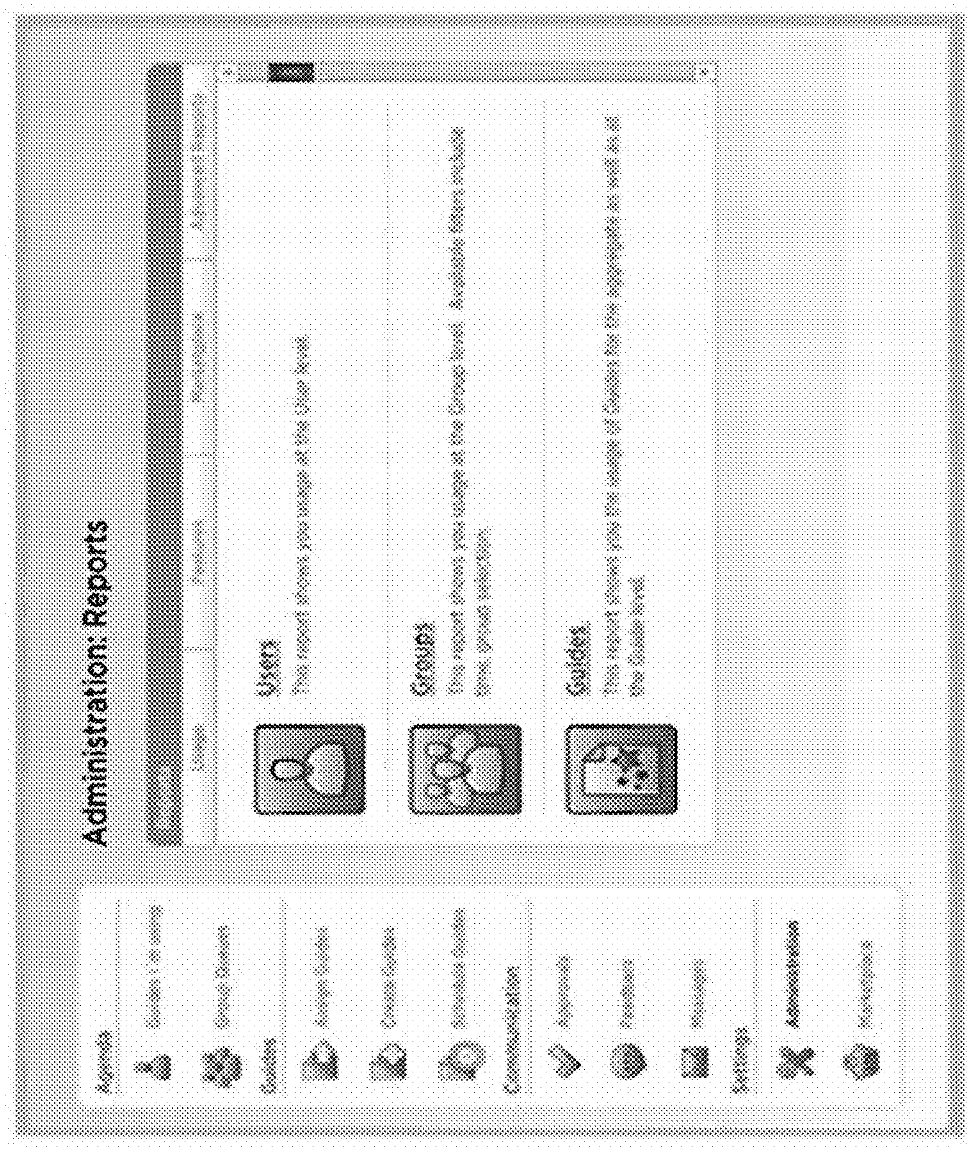
Figure 53:
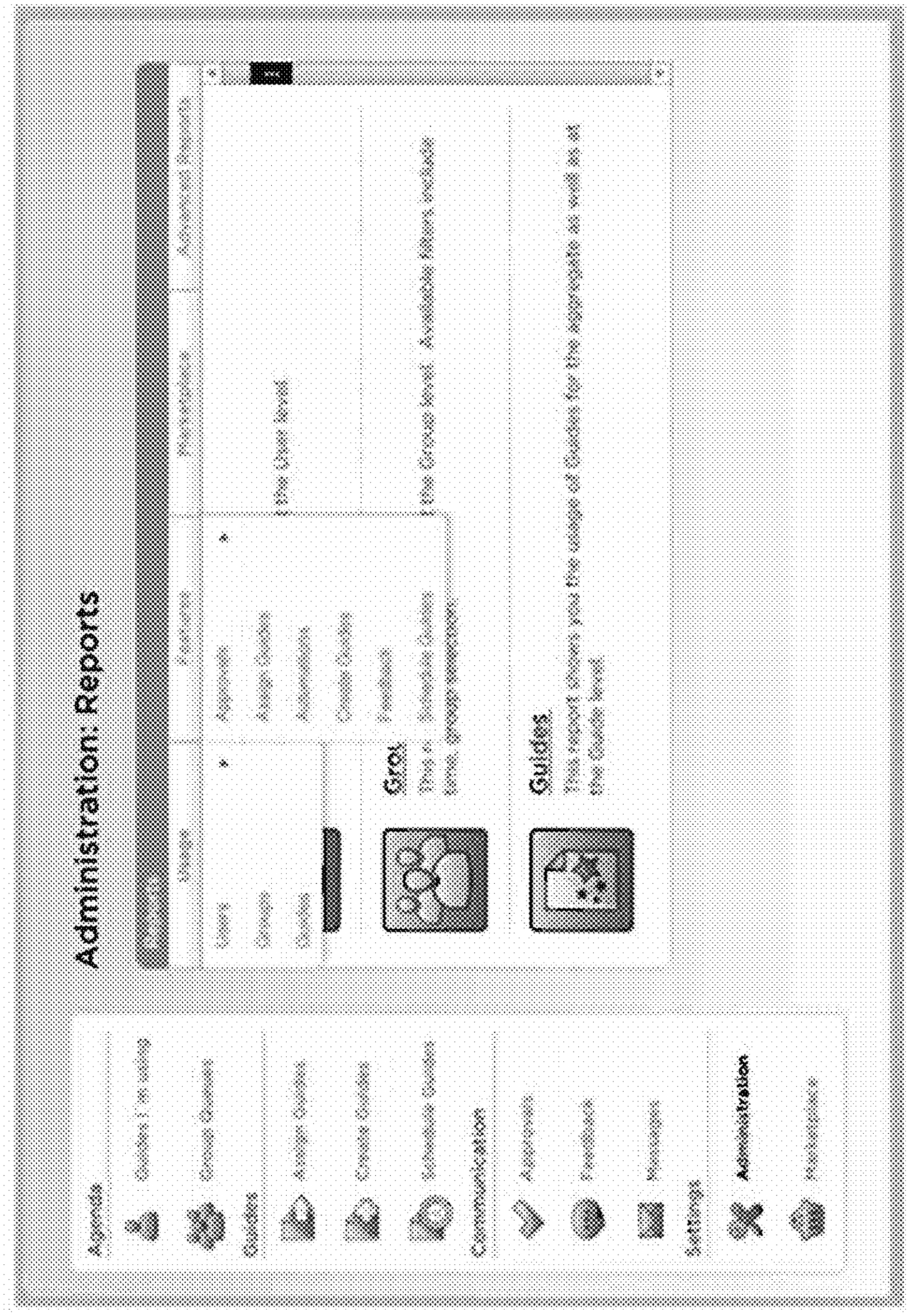
Figure 54:

In accordance with some embodiments, a reporting interactive checklist feature can be provided. In some embodiments, this feature can be available on a "Reports" tab to users with appropriate permissions as shown, for example, in interface 5200 of FIG. 52. Users can navigate through reports using a master list, which in some embodiments may be hierarchical, or they can use navigational tabs offered as shown in interface 5300 of FIG. 53. A report can offer an easy-to-read graphical representation of data, for example, the chart shown, for example, in interface 5400 of FIG. 54; or alternately a tabular structure. A report can also have a custom set of filters to organize the data. Filters set in a previous session can be remembered in some embodiments. Reports can be available in a printer-friendly format or as a convenient downloadable spreadsheet. Any suitable reports can be customized and/or added in some embodiments. In some embodiments, a user's report configuration can be saved, and added to a Dashboard.

Figure 55:
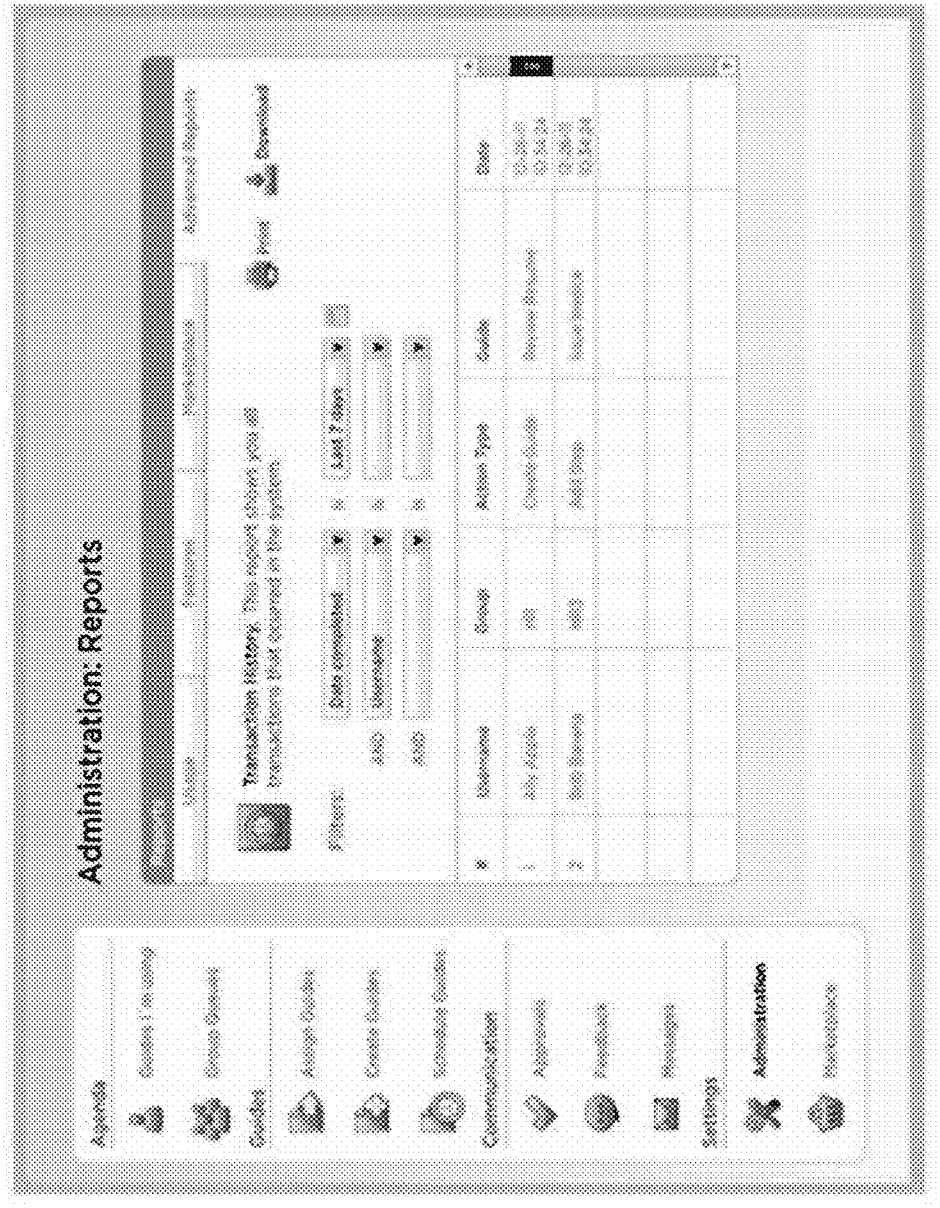

In accordance with some embodiments, using an interface 5500 that may be presented by a hardware processor of a computing device, the hardware processor can present a "Transaction History" report as shown, for example, in FIG. 55. Actions taken in the interactive checklist can be recorded with a timestamp and included in this report. A subset of fields can be displayed by the hardware processor in a summary view, while more or all may be downloaded. A horizontal scrollbar can appear when needed to display the fields.

Figure 56:
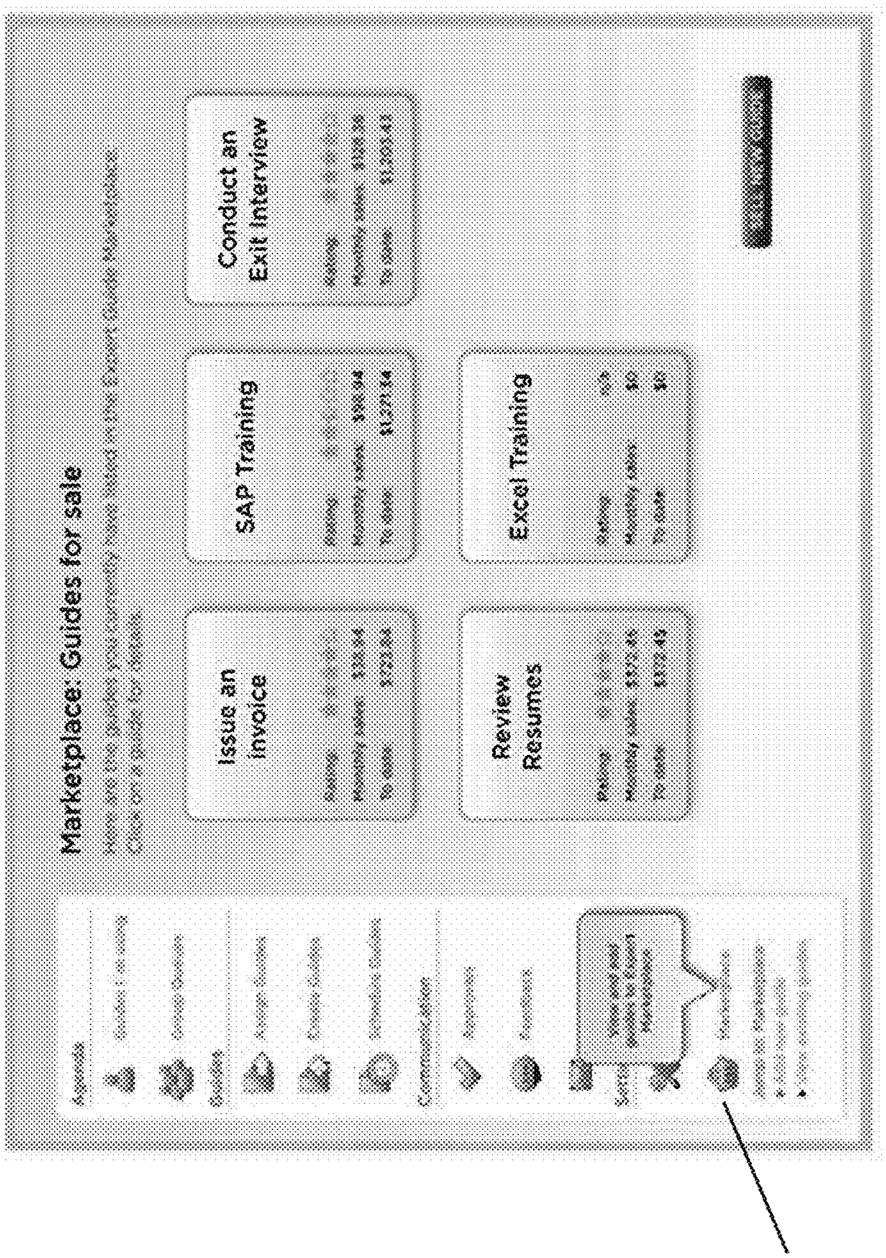
FIGS. 56, 57, 58, 59, 60, 61A, 61B, 61C, 62, 63, and 64 show examples of user interfaces for publishing an interactive checklist on a guide marketplace in accordance with some embodiments of the disclosed subject matter.
Figure 57:
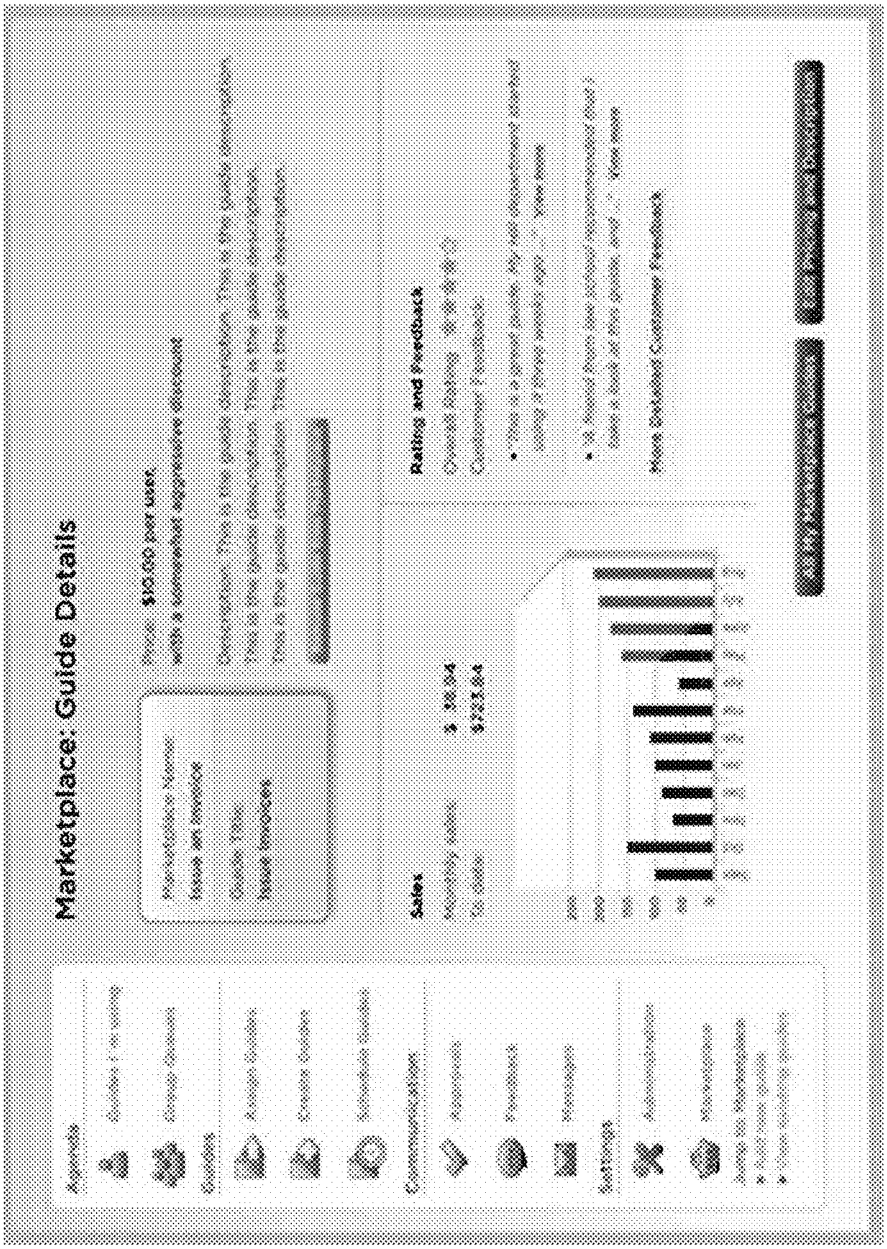
Figure 223:
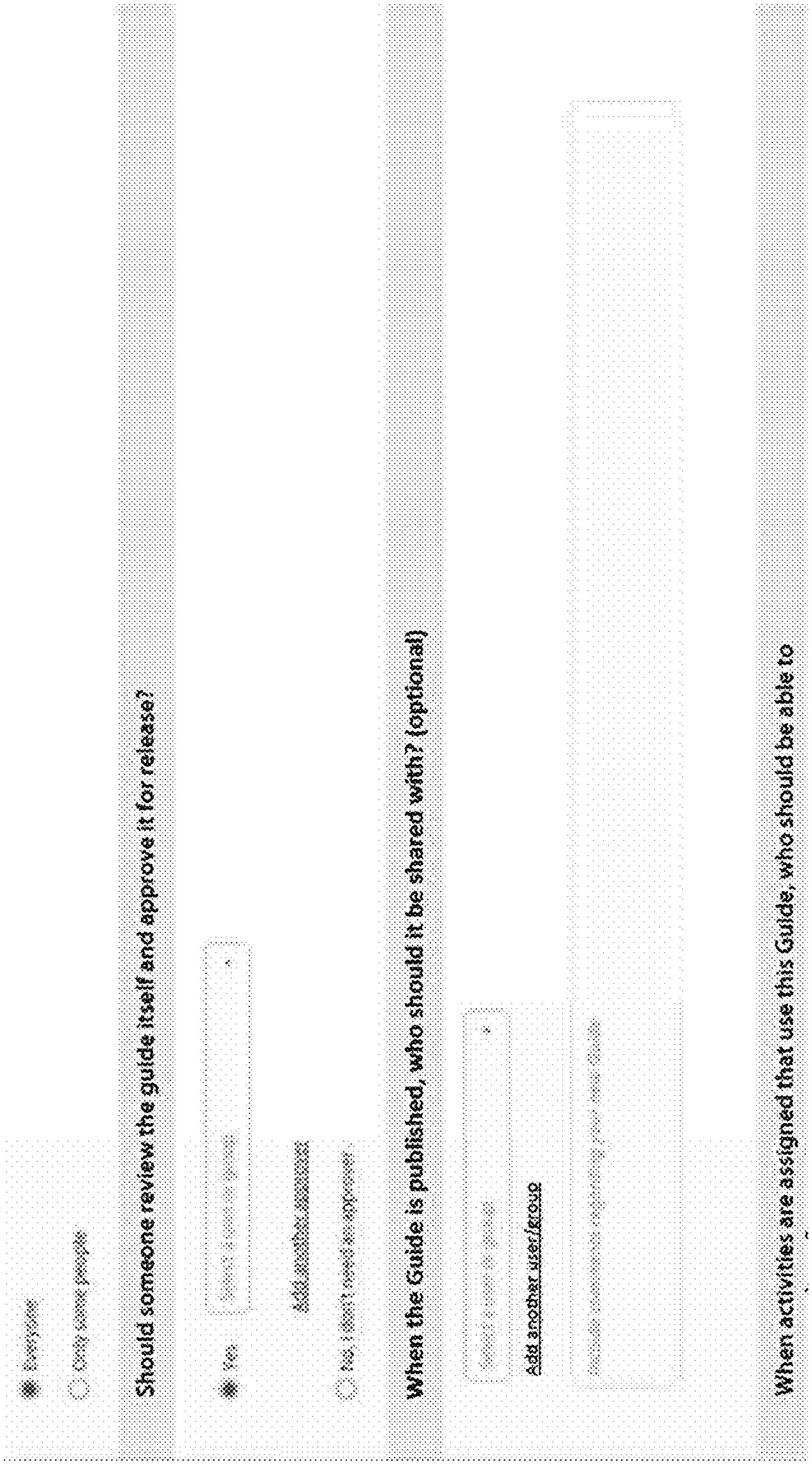
FIG. 223 shows an example of a user interface for sharing a Guide with one or more users in accordance with some embodiments of the disclosed subject matter.

In accordance with some embodiments, using an interface 5600 that may be presented by a hardware processor of a computing device, the hardware processor can receive interactive checklists to be published or sold on a public "Guide Marketplace" as shown, for example, in FIG. 56. Publishing interactive checklists can enable users and/or organizations to 1) spread their brand, 2) create an additional revenue stream, and/or 3) provide a compact, easy way to share expertise and processes with other organizations. On a "Guide Marketplace" tab, shown as "Marketplace" tab 5602 on interface 5600 of FIG. 56, the hardware processor can display the interactive checklists that have already been published on the "Guide Marketplace." In this view, the hardware processor can display which interactive checklists have been published, how buyers have rated them, and the revenue they have generated. If the user clicks on an interactive checklist on an overview page, shown, for example, in interface 5700 of FIG. 57, the hardware processor can display details about a published interactive checklist. Available data can include detailed sales information and customer feedback. Additionally or alternatively, in some embodiments, a Guide can be privately shared with another organization not in the Guide Marketplace. In some such embodiments, the Guide can be shared in any suitable manner, such as being directly shared, using a coupon code, and/or in any other suitable manner. Note that, in some embodiments, when a Guide author creates a Guide and/or modifies an existing Guide, the author can specify one or more users and/or groups that are to be notified. FIG. 223 shows an example of a user interface for allowing a Guide author to indicate users who are to be notified when it is shared and/or published.

Figure 58:
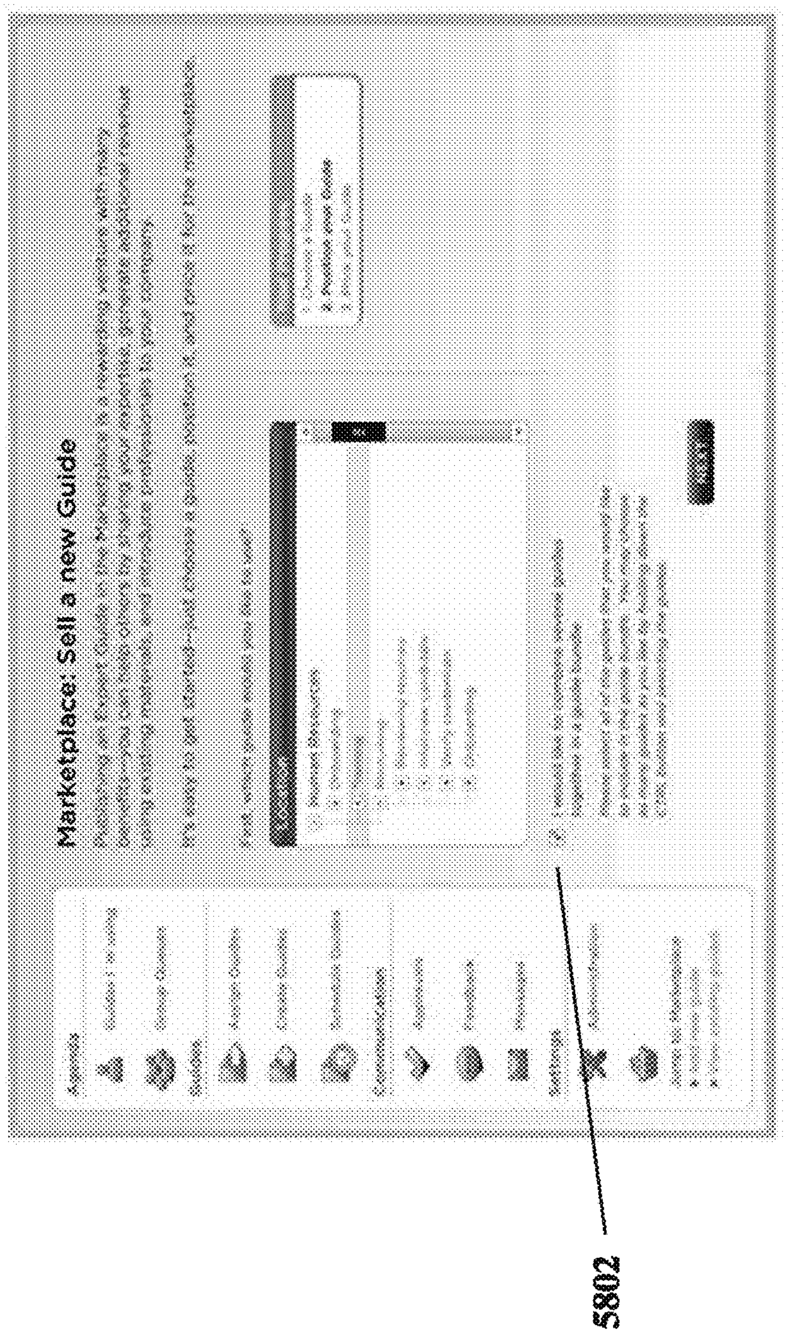

In accordance with some embodiments, to prepare an interactive checklist for sale, as shown, for example, in interface 5800 of FIG. 58, the hardware processor can receive a user selection of an interactive checklist to sell, or receive a user selection indicating that they wish to sell multiple interactive checklists together in a "Guide Bundle" by checking a box 5802 as shown, for example, in interface 5800 of FIG. 58, in which case, the hardware processor can be prompt the user to select multiple interactive checklists to be included in the bundle.

Figure 59:
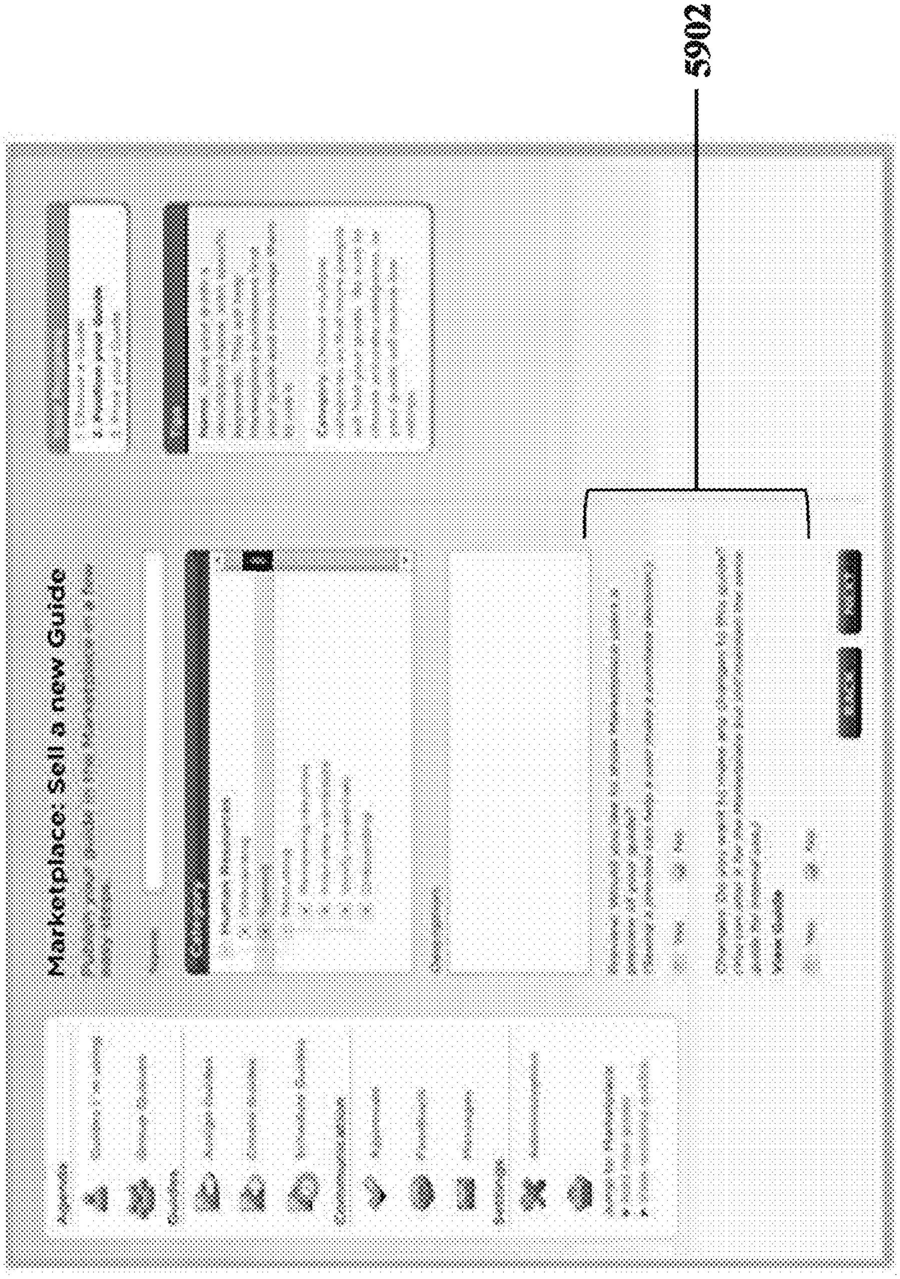
Figure 60:
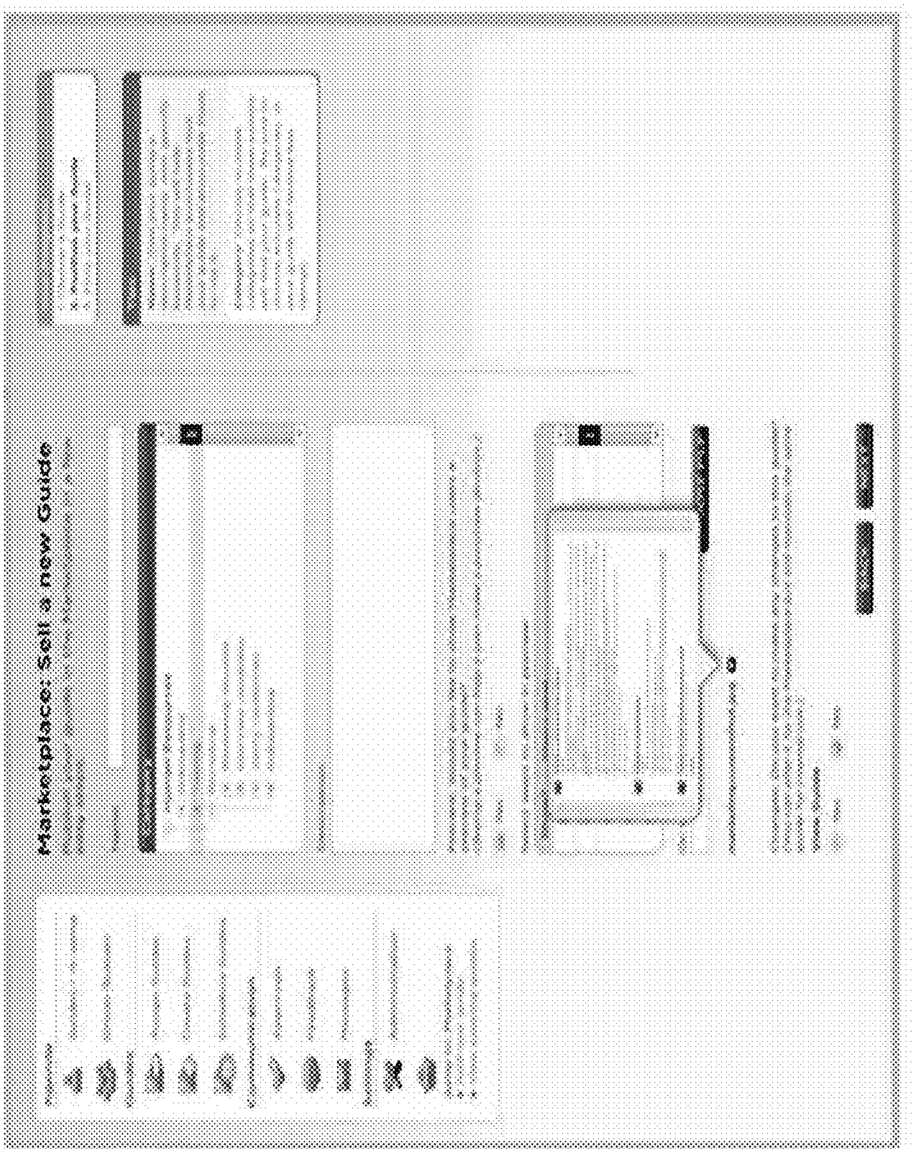

Next, in some embodiments, using an interface 5900 that may be presented by a hardware processor of a computing device, the hardware processor can receive details about the interactive checklist(s), for example, a public title for the interactive checklist, a sales category (or subcategory at any level of depth), a sales description, and/or any other details. The hardware processor can receive a user input to present a preview of the interactive checklist to prospective buyers at section 5902 of interface 5900 of FIG. 59. Additionally, at 5902, the hardware processor can receive a user input to make changes to the interactive checklist to protect any sensitive information. Upon receiving a selection to display a preview, the hardware processor can add it at interface 6000 of FIG. 60. When printing a preview, the hardware processor can present a user selection of one or more steps from the interactive checklist and/or present uploaded attachments, for example, as images of the interactive checklist or a sample completed interactive checklist.

Figure 61A:
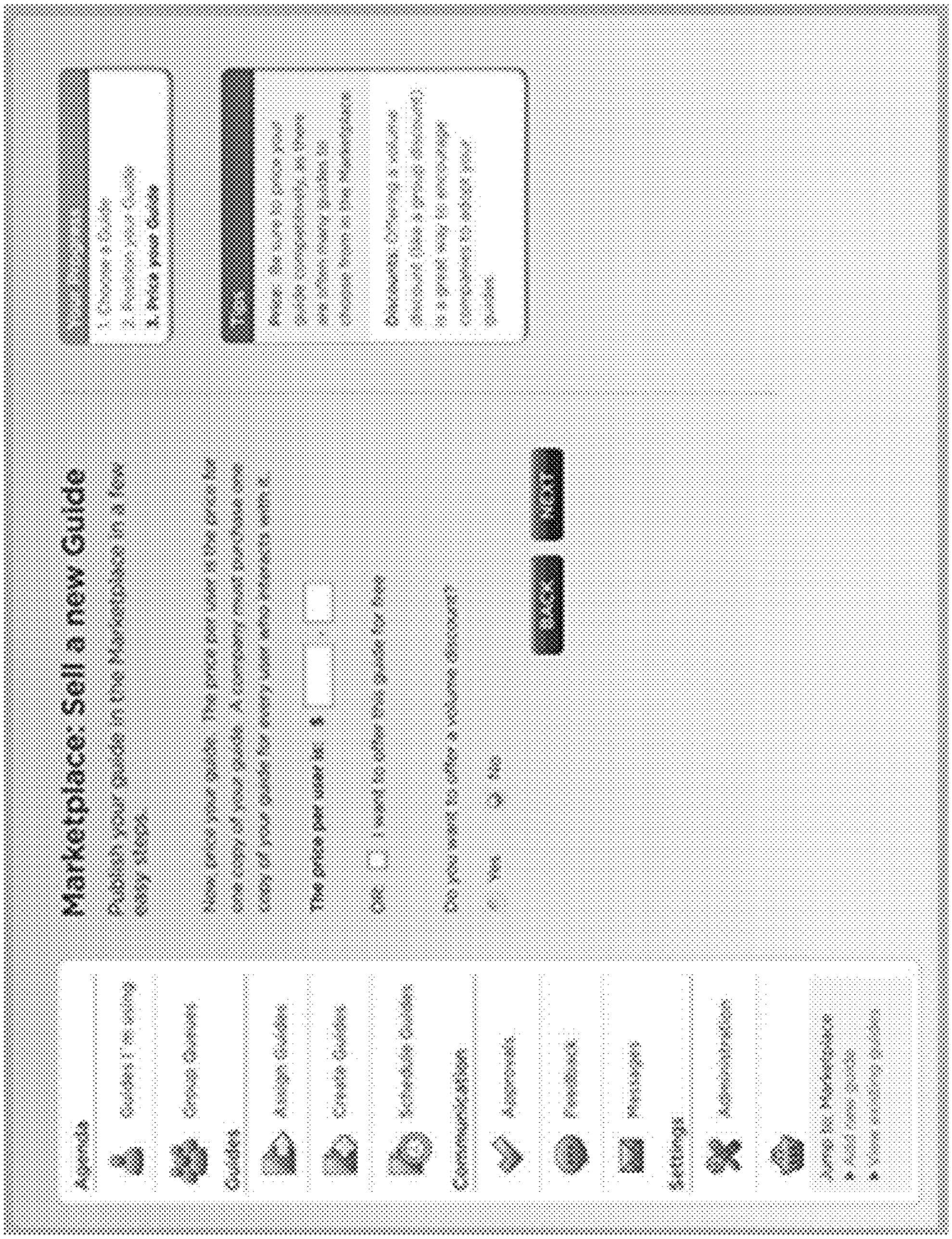
Figure 61B:

Next, in some embodiments, using an interface 6102 that may be presented by a hardware processor of a computing device, the hardware processor can receive price information for the interactive checklist as shown, for example, in FIG. 61A. Alternatively, a user may offer the interactive checklist free of charge. The user may offer a flat price per user. As a means of encouraging sales, the user can opt to offer a volume discount. As shown in FIG. 61B, using an interface 6104 that may be presented by a hardware processor of a computing device, the hardware processor can display several choices for volume discounts, indicating a level of discount offered. These levels can be predetermined percentages off of the base price (as indicated by the user). For example, the higher the number of copies purchased, the lower the price per copy can be. In addition, the user may offer the first x copies of an interactive checklist to a client for free, to encourage widespread adoption. In some embodiments, the user may also set price points.

Figure 61C:
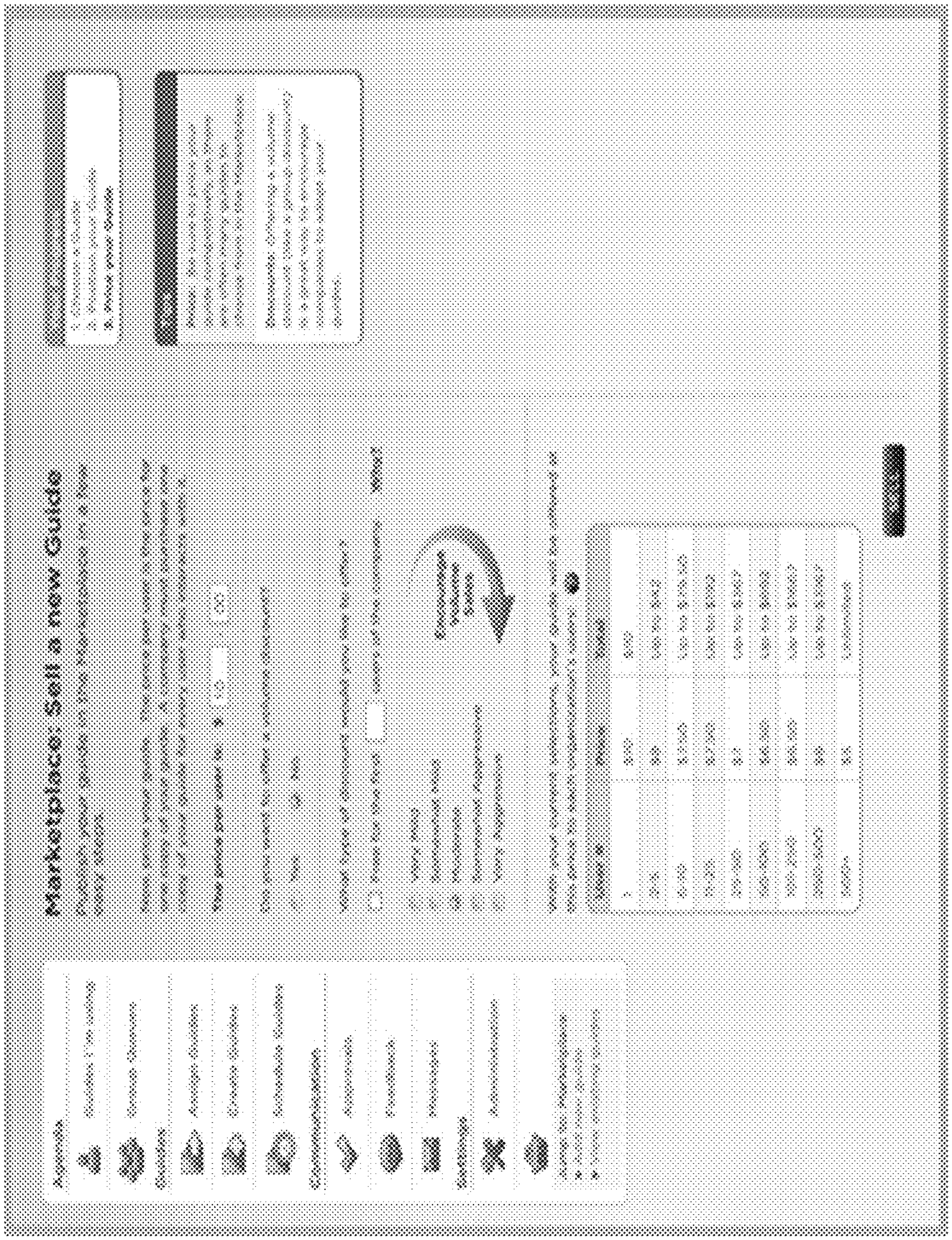
Figure 62:
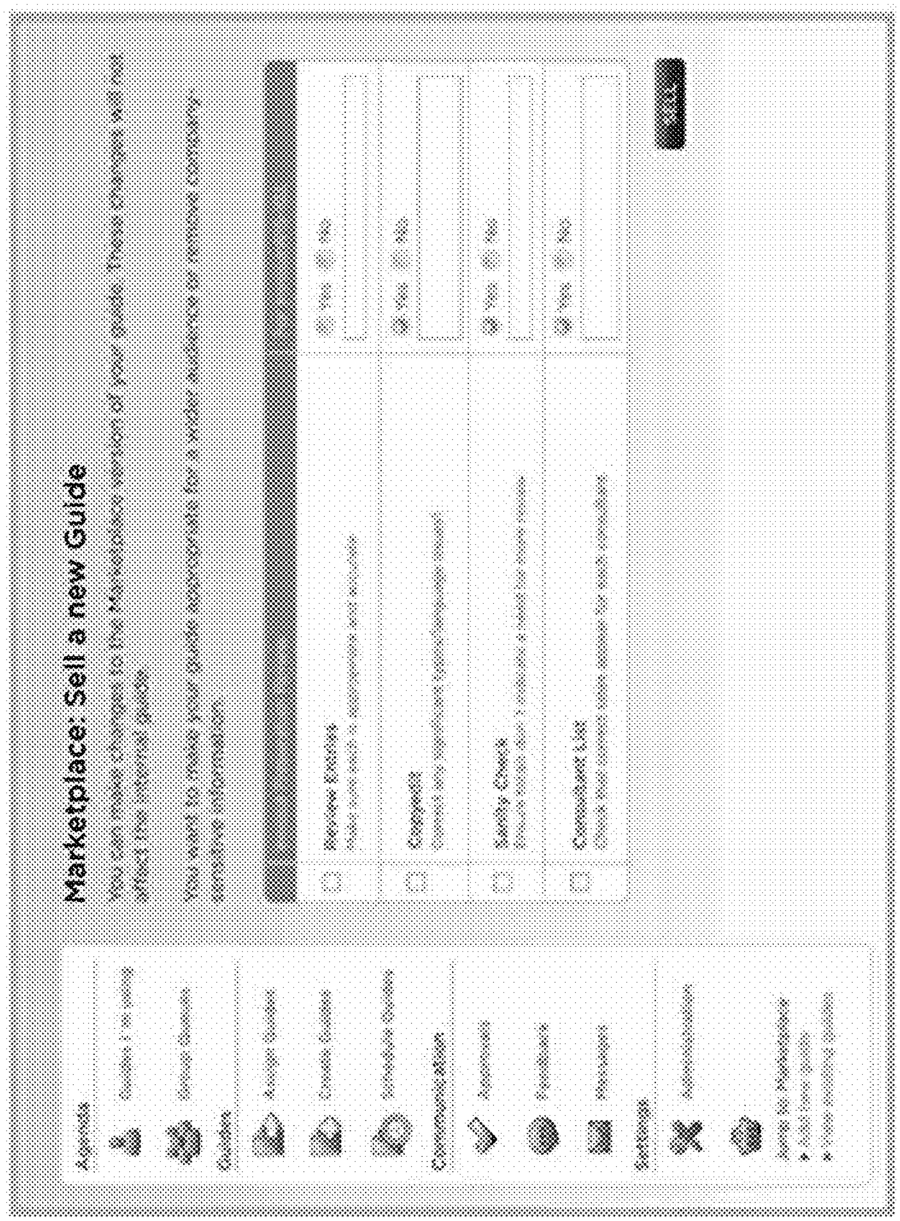
Figure 63:
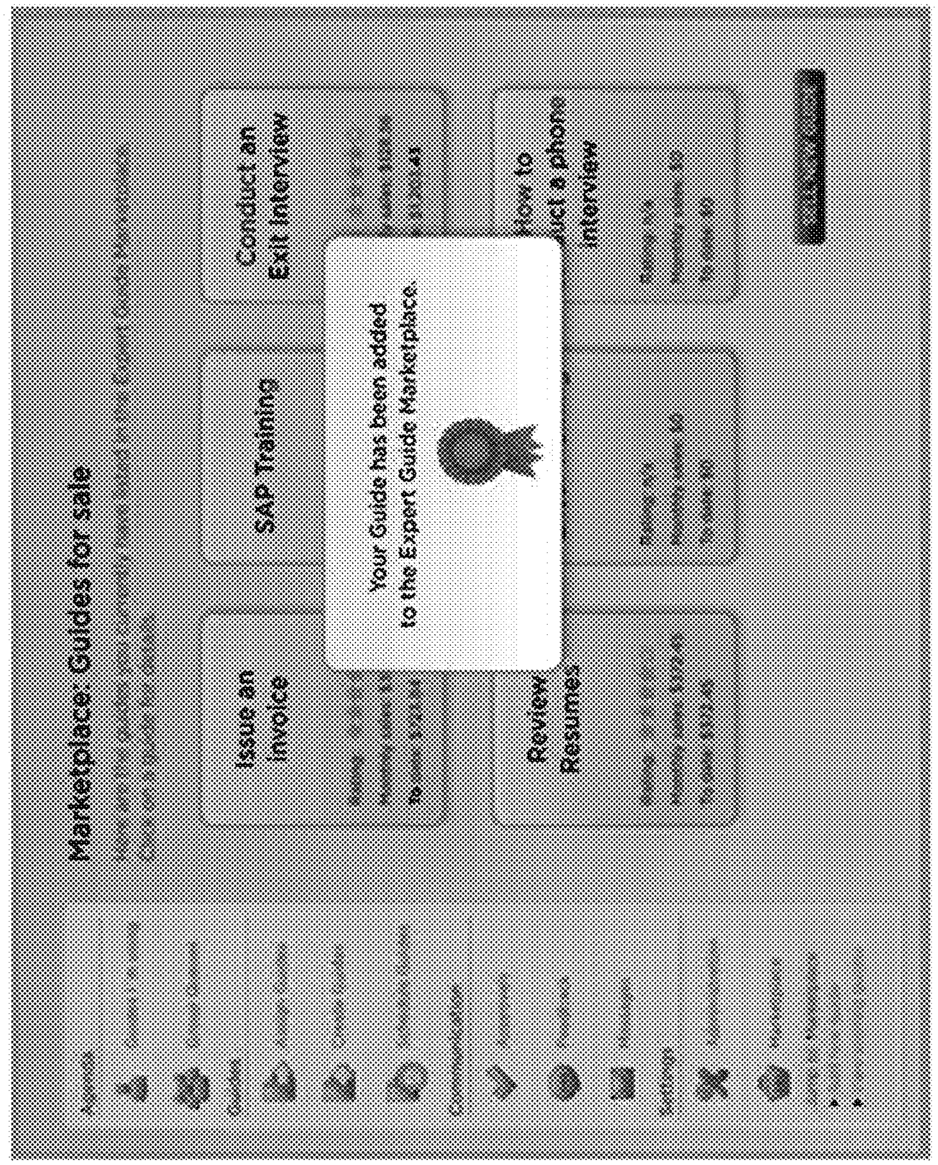
Figure 64:
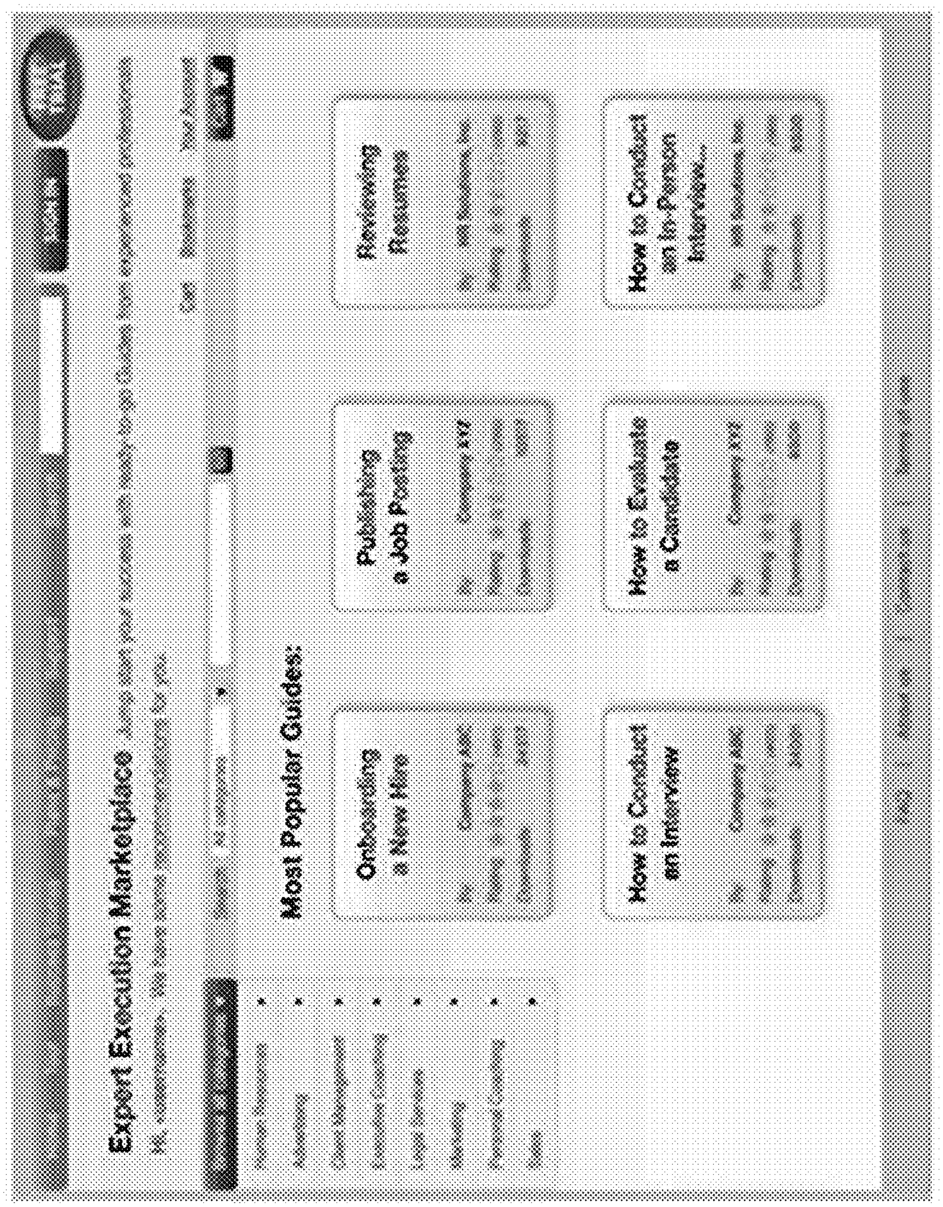

In accordance with some embodiments, once the hardware processor receives a discount level, as shown in interface 6106 of FIG. 61C, the hardware processor can present a table of the discounted prices, at different numbers of copies sold. The level or the base price can be modified until the user is satisfied with the sales table. A user can set their own price points if they prefer, directly or by adjusting from the discount level-determined prices. As shown, for example, in interface 6200 of FIG. 62, the hardware processor can display a review of the interactive checklist and its contents before sending to be put up for sale in the "Guide Marketplace." Once confirmed, the hardware processor can send the interactive checklist to the public marketplace and can be displayed by the hardware processor among the published interactive checklists for the organization as shown in interface 6300 of FIG. 63. The "Guide Marketplace" can be a public website, as shown, for example, in interface 6400 of FIG. 64, where a user of the interactive checklist can buy and sell interactive checklists for use by other individuals. In some embodiments, the "Guide Marketplace" can be a private website (e.g., a website for a professional association) where the interactive checklists are not available to the public. In accordance with some embodiments, subsequent purchases may be entitled to a price based on the cumulative number of that interactive checklist purchased, for that version, since a particular past version, or for all versions. In some embodiments, a user can purchase or can download a "Guide Bundle" that can includes Event Calendar(s) and/or Approach(es). In some embodiments, the "Guide Marketplace" can include a "Plagiarism Detector" that seeks to identify steps that contain substantially similar content (e.g., in language or in meaning) to other Guides in the marketplace. The "Plagiarism Detector" can flag the Guides that include similar content to prevent undesired publication to the marketplace.

Figure 65:
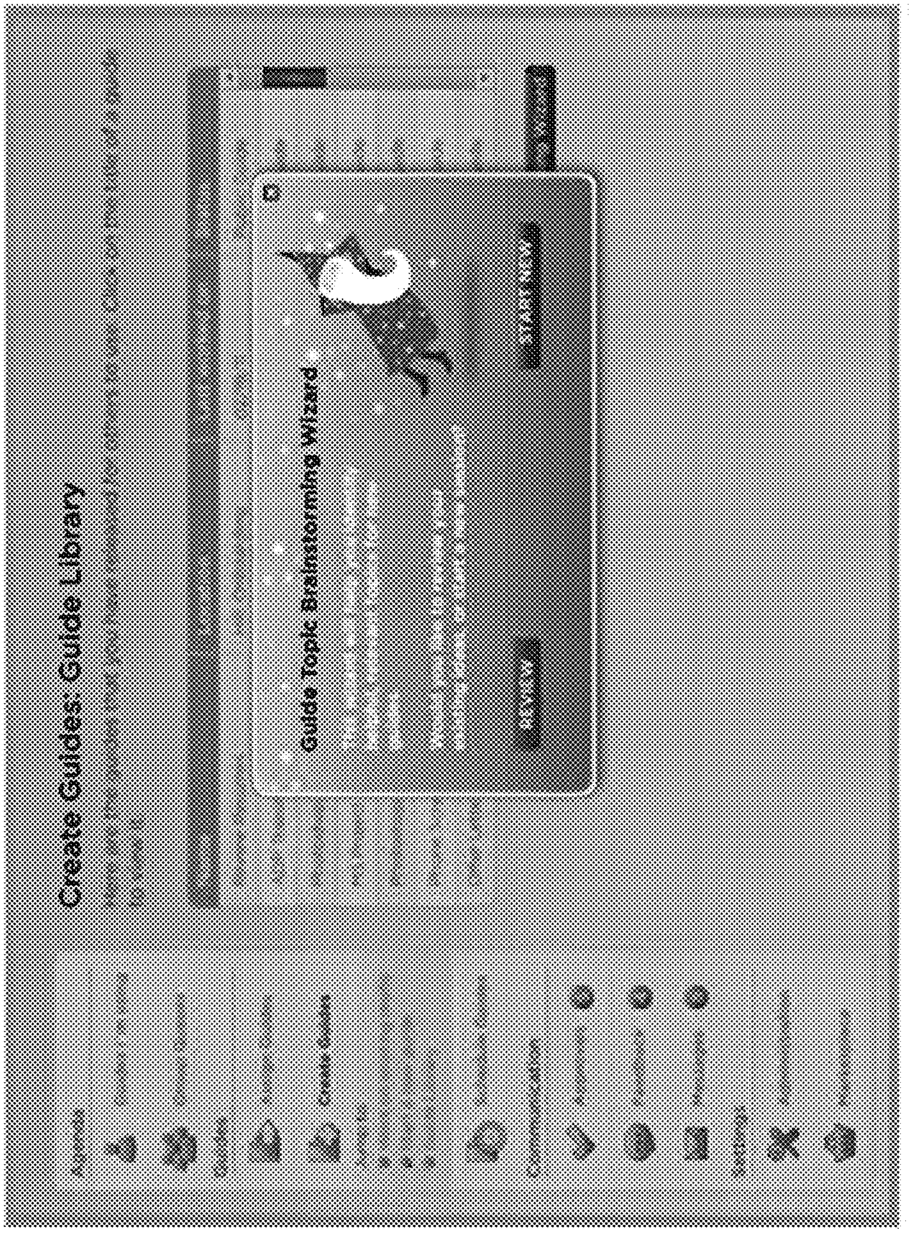
FIGS. 65, 66, 67A, and 67B show examples of user interfaces for presenting a topic brainstorming wizard in accordance with some embodiments of the disclosed subject matter.

In accordance with some embodiments, different users in an organization can create interactive checklists for themselves and for others to use. Sometimes, however, a user needs a little help in thinking of topics that can make for good interactive checklists. When a user needs help thinking of interactive checklist ideas, they can navigate through an interactive checklist using interface 6500 that may be presented by a hardware processor of a computing device. The hardware processor can present a topic brainstorming wizard as shown, for example, in FIG. 65.

Figure 66:
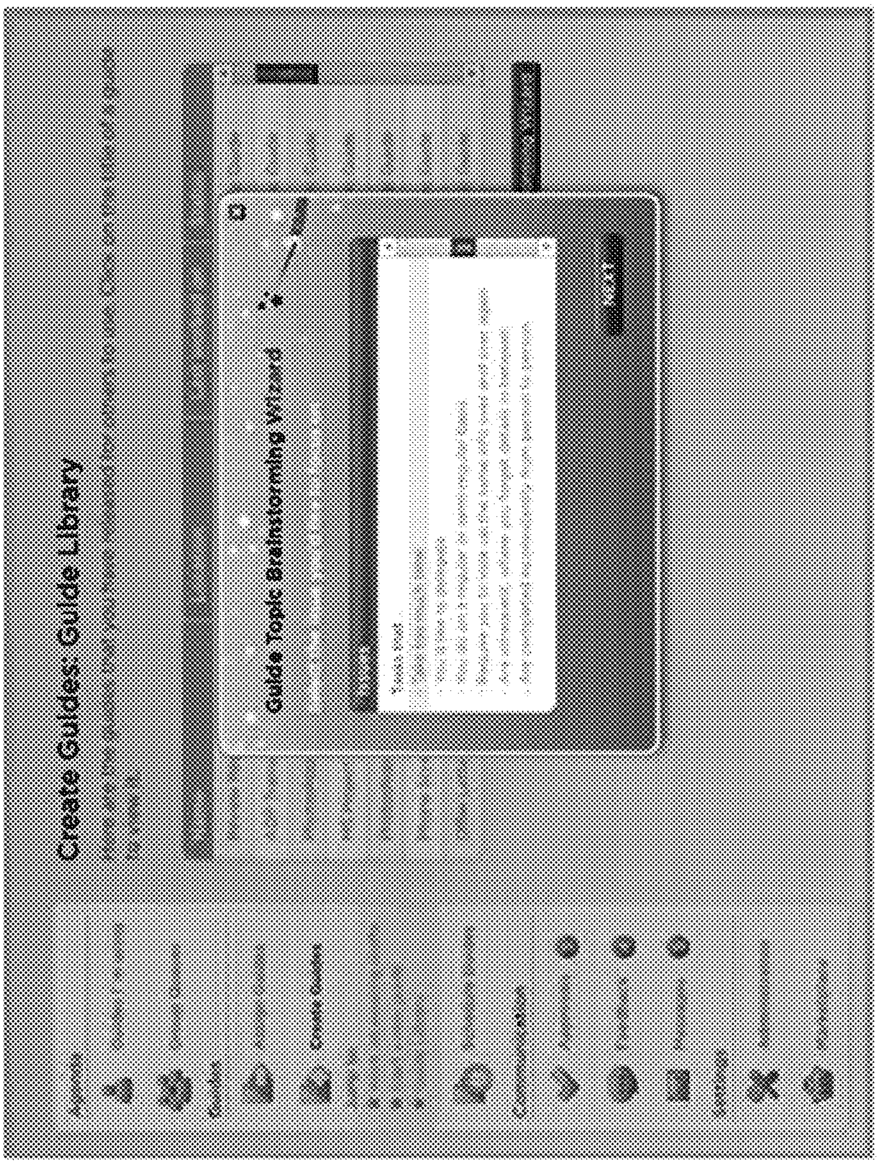
Figure 67A:
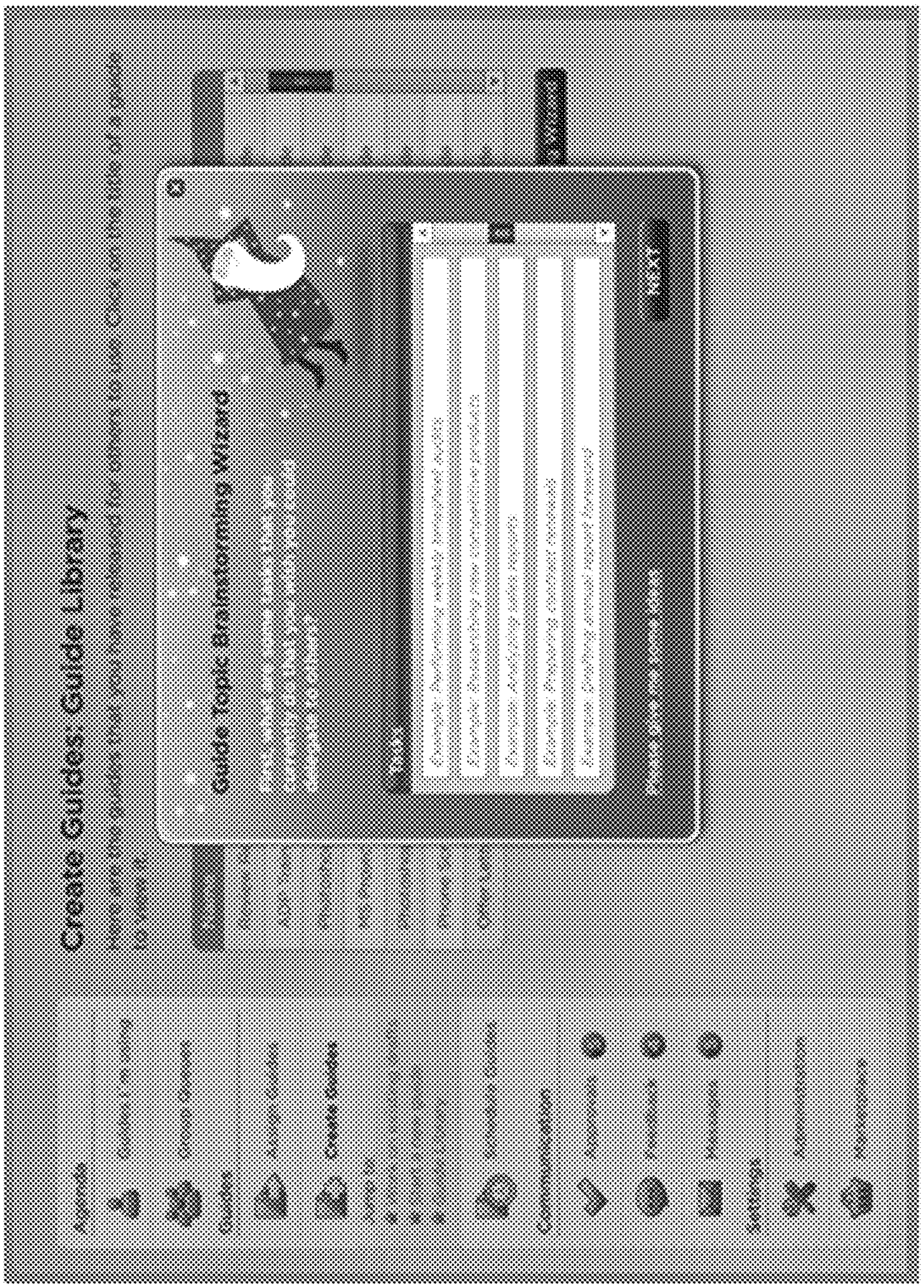
Figure 67B:
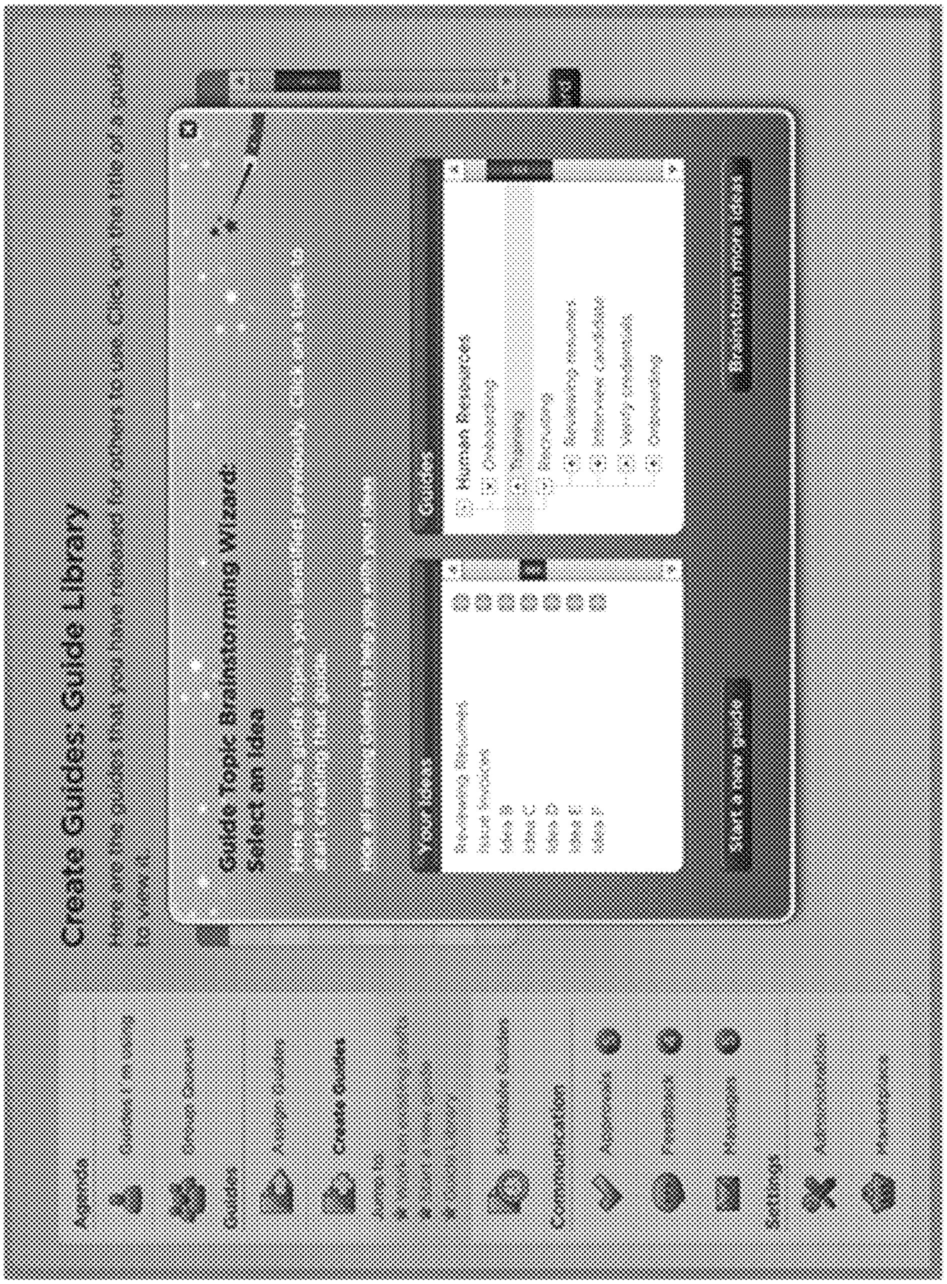
Figure 68:
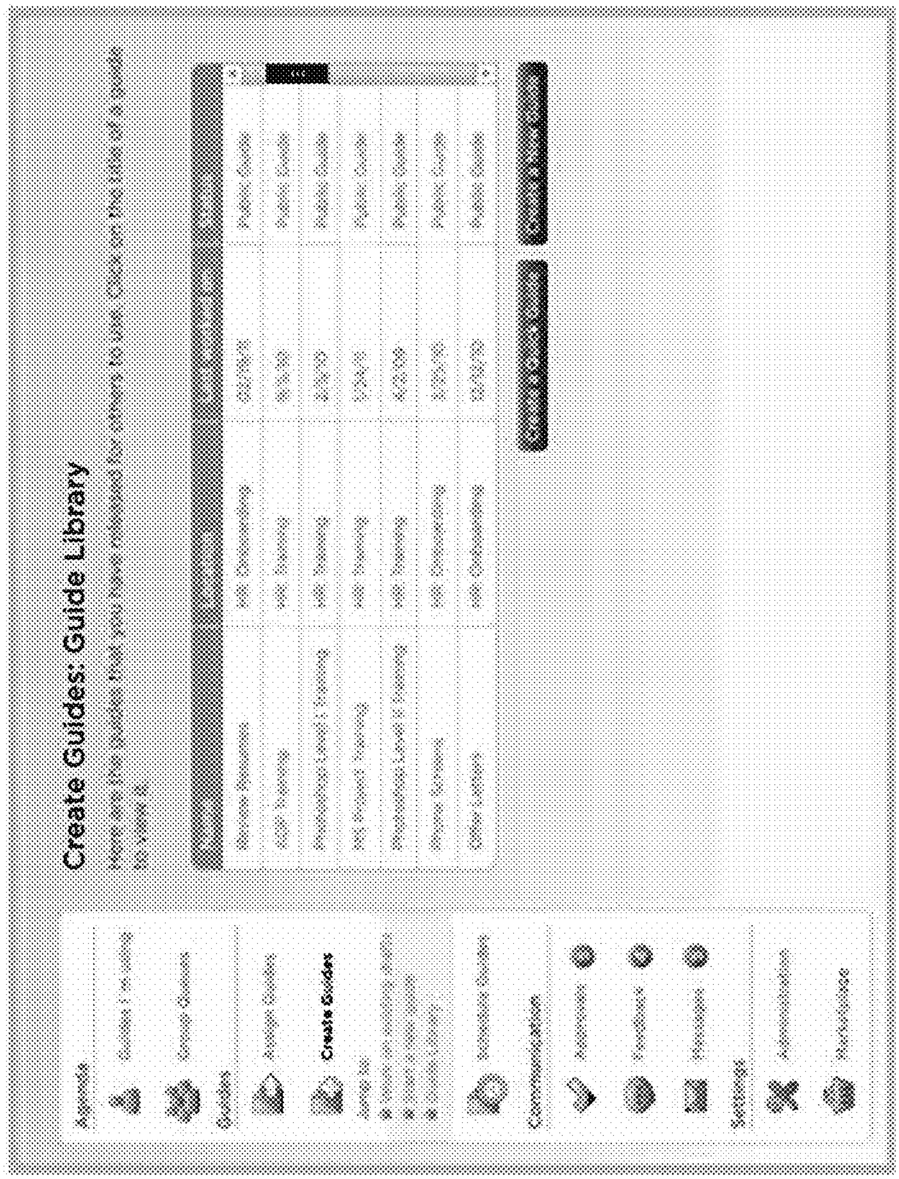
FIGS. 68, 69, 70, 71, 72, 73, 74, 75, 76, 77, 78, 79, and 80 show examples of user interfaces for creating an interactive checklist in accordance with some embodiments of the disclosed subject matter.
Figure 69:
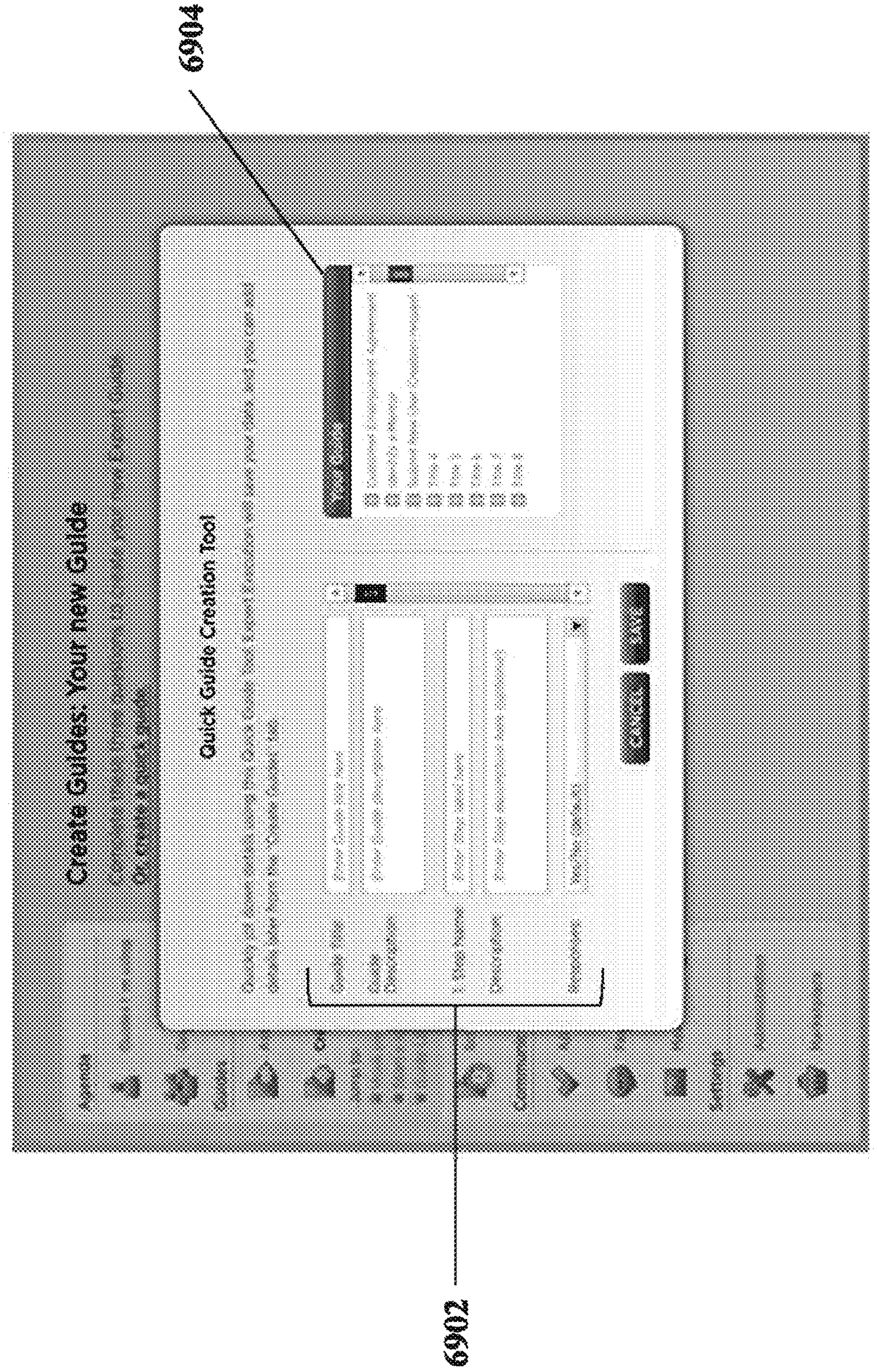

In accordance with some embodiments, using an interface 6600 that may be presented by a hardware processor of a computing device, the hardware processor can display a wizard that can guide a user through a series of questions and exercises. As shown, for example, in interface 6600 of FIG. 66, these can help the user identify tasks that have turned into pain points, for example, tasks that may take too much time, that they would like to delegate to others, that they perform infrequently, and/or any other tasks that have become pain points. In some embodiments, using an interface 6702 that may be presented by a hardware processor of a computing device, the hardware processor can receive user ideas in the wizard as shown, for example, in FIG. 67A. The hardware processor can save ideas from a current brainstorming session that can be reviewed in future sessions. The user can also compare another user's ideas with existing interactive checklists to provide further inspiration and/or prevent duplication as shown in interface 6704 of FIG. 67B. Sometimes, a user might have a great idea for an interactive checklist, but may not have time to create a full interactive checklist. Starting from interface 6800 of FIG. 68, the hardware processor can receive instructions for a new interactive checklist to be created. In some embodiments, using an interface 6900 that may be presented by a hardware processor of a computing device, the hardware processor can receive the user's idea and/or some simple steps at the "Quick Guide Tool" shown in FIG. 69.

Figure 225:
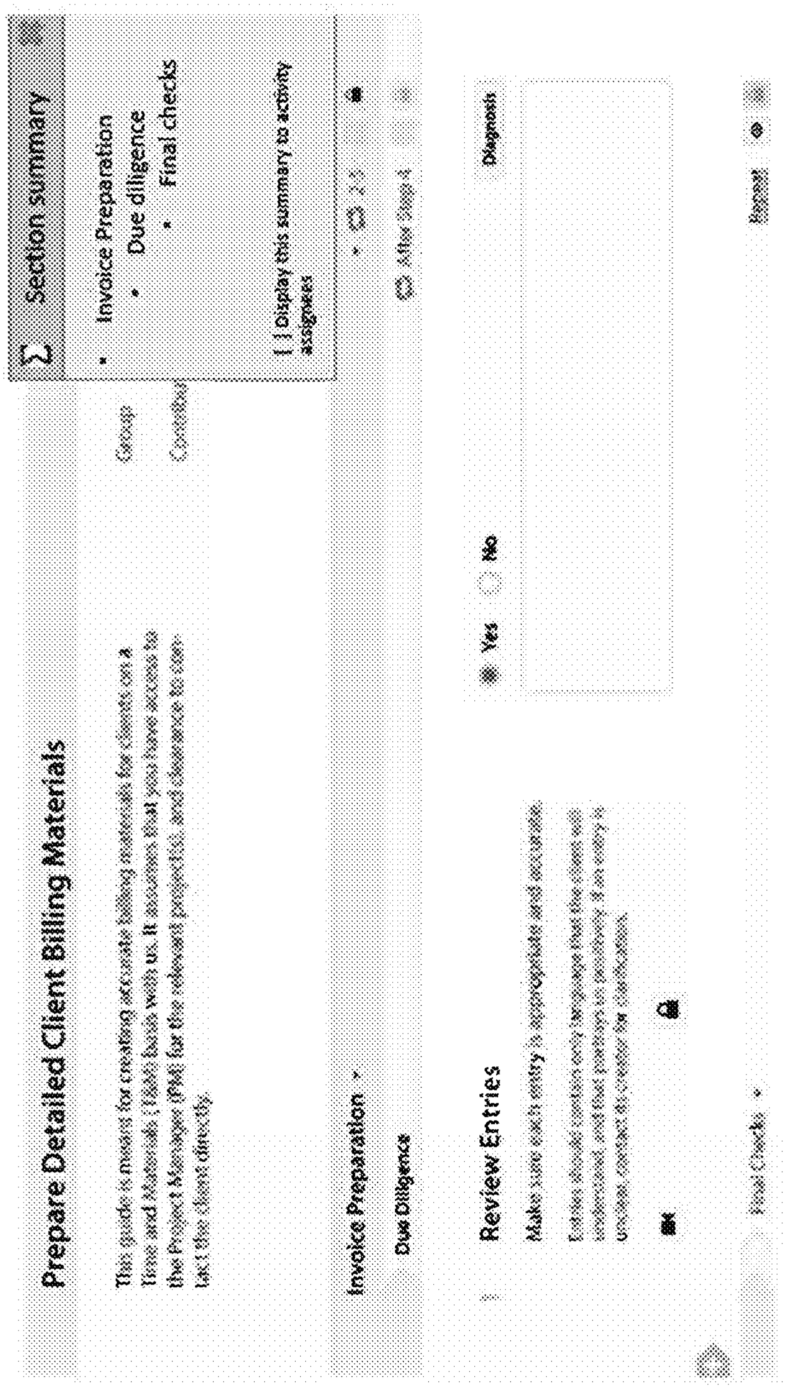
FIG. 225 shows an example of a user interface for presenting a summary of a Guide in accordance with some embodiments of the disclosed subject matter.
Figure 226:
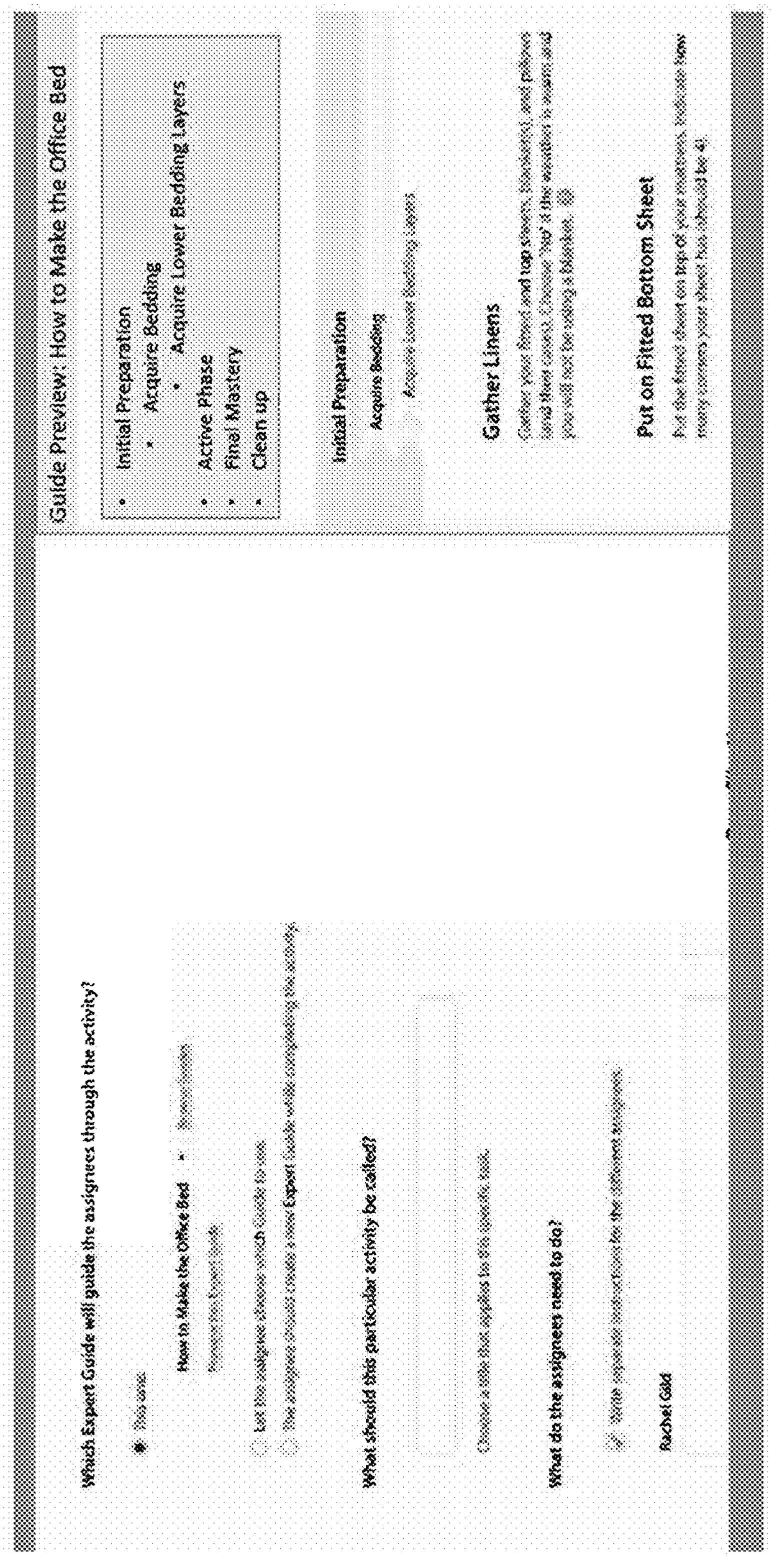
FIG. 226 shows an example of a user interface for presenting a preview of a Guide in accordance with some embodiments of the disclosed subject matter.

In some embodiments, the hardware processor can receive a user input at the "Quick Guide Tool" to start creating an interactive checklist. The hardware processor can receive a new interactive checklist title and/or a description. Then, for each step, the hardware processor can receive a step name and brief instructions. Additionally, the hardware processor can receive a user input to indicate a response format (but can be offered their previous choice by default) or a more likely alternative if sensed from the content. These elements 6902 can be displayed by the hardware processor, for example, on the left side of interface 6900 of FIG. 69. In some embodiments, the hardware processor can present a "Your Guide" preview, shown as "Your Guide" 6904 in interface 6900 of FIG. 69, to allow the user to review the steps that they have added. Later, the user can return to this interactive checklist and refine and/or enhance it when there's more time. Another example of a Guide preview is shown in FIG. 226. In some embodiments, the Guide preview shown in FIG. 226 can be presented to a user when assigning an activity to another user. Furthermore, in some embodiments, users (e.g., a user completing an activity using a Guide, a user creating a Guide, and/or any other suitable user) can view a summary of the Guide organized by sections, as shown in FIG. 225. For example, in some embodiments, each section of the Guide can be collapsed or expanded.

Figure 70:
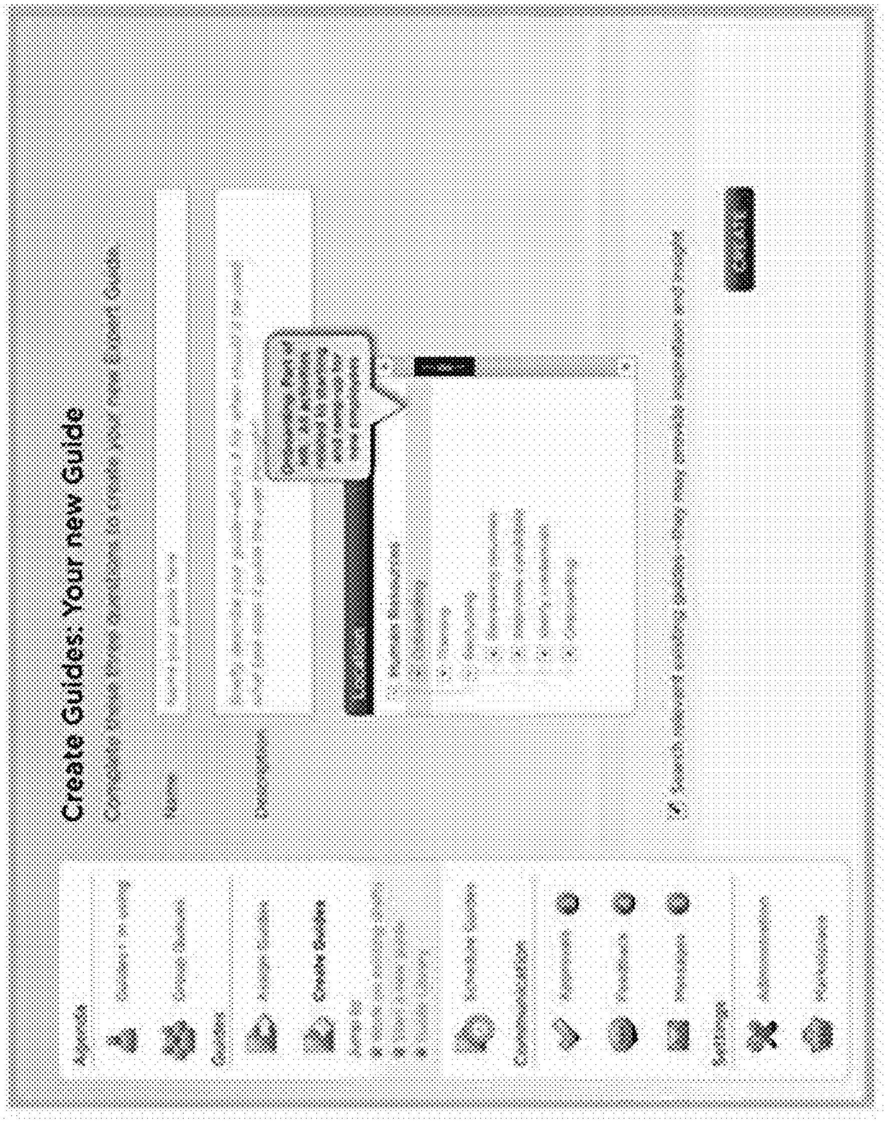
Figure 71:
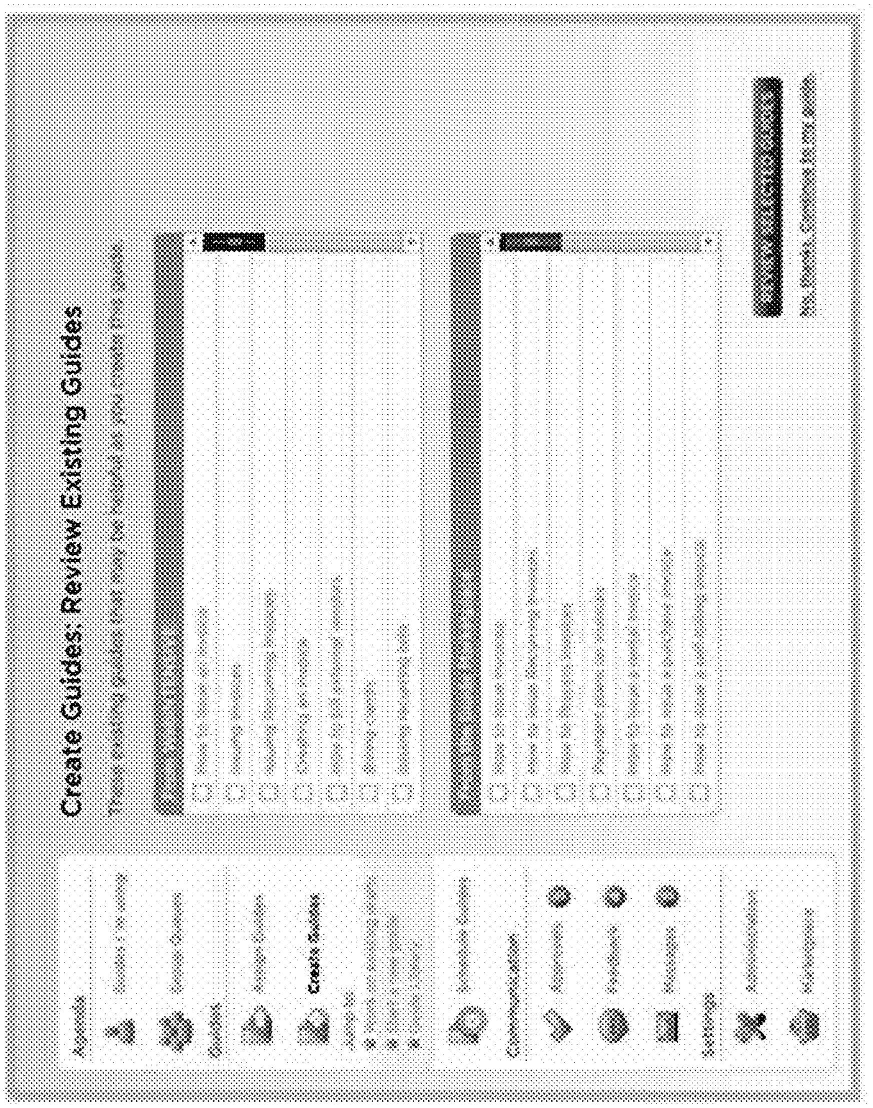
Figure 72:
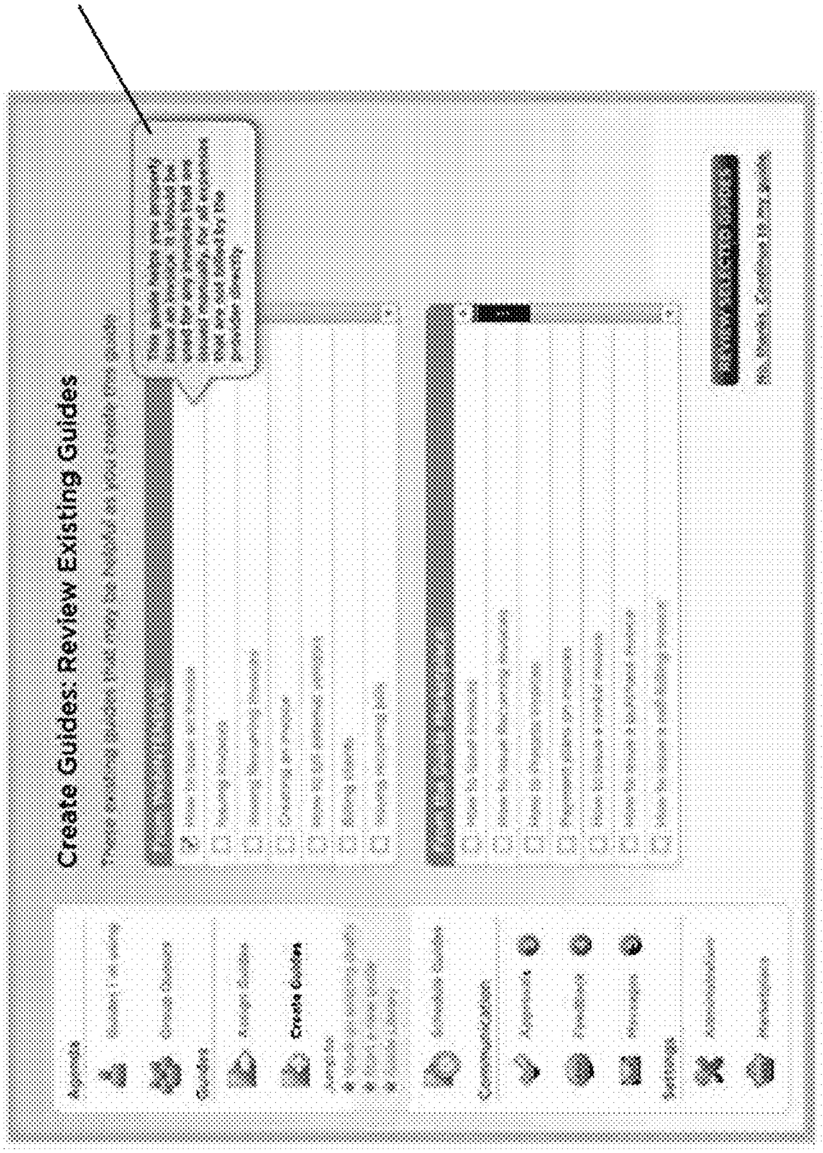

In accordance with some embodiments, a user may have an idea for an interactive checklist, but may want to ensure that they are not duplicating an existing interactive checklist or may need inspiration or ideas for the interactive checklist. At the start of creating the interactive checklist process (e.g., when they have only provided a title and description), they can opt to consult existing interactive checklists as shown, for example, in interface 7000 of FIG. 70. Once the hardware processor has received a title and an optional description, the hardware processor can present the user with similar or related existing interactive checklists from the user's own organization and/or the "Guide Marketplace" as shown, for example, in interface 7100 of FIG. 71. These suggestions may optionally take into account other factors associated with the user's likely need, for example possibly considering the user's industry, role, and/or other interactive checklists the user has used or purchased. The user can review the existing interactive checklists, indicating which ones they would like to review. To help them choose interactive checklists, the user can hover over any title to review a longer description of the interactive checklist as shown, for example, by description 7202 shown, for example, in interface 7200 of FIG. 72.

Figure 73:
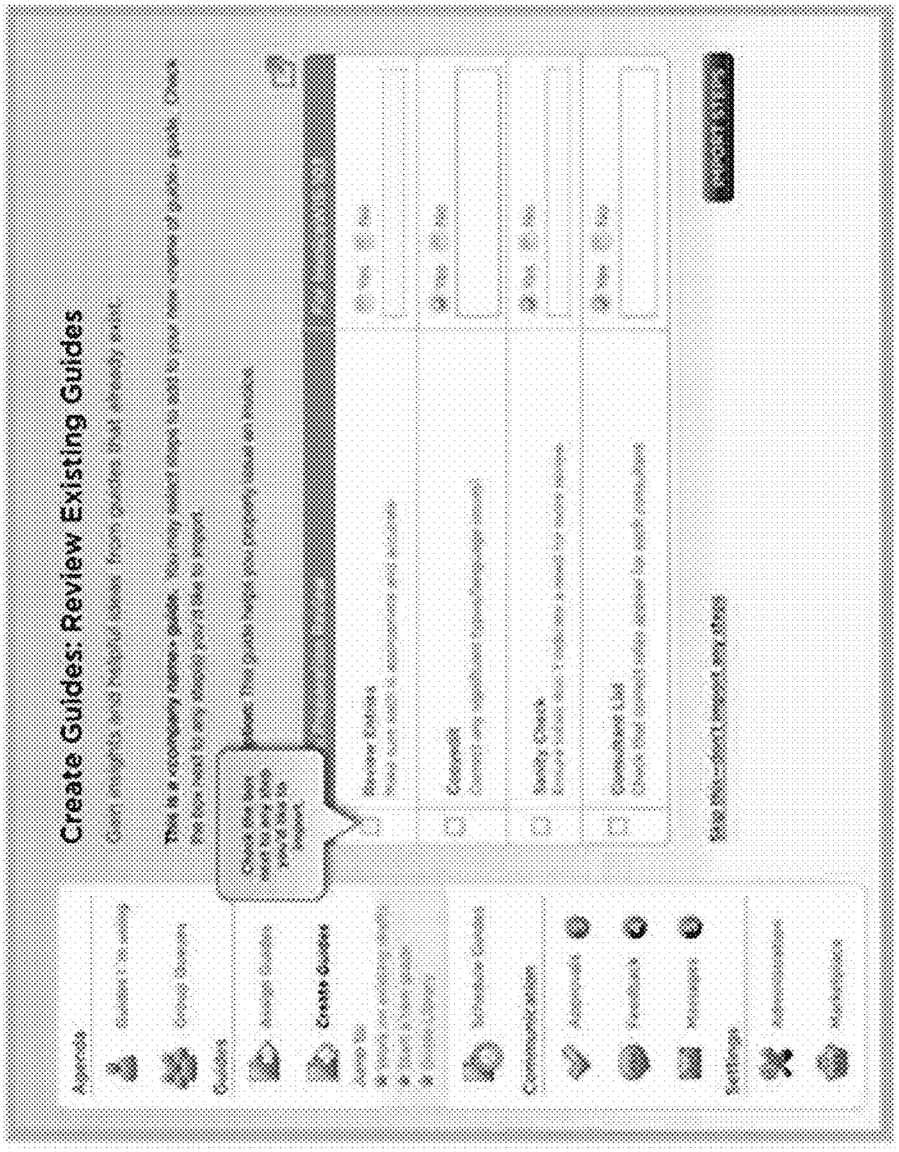
Figure 74:
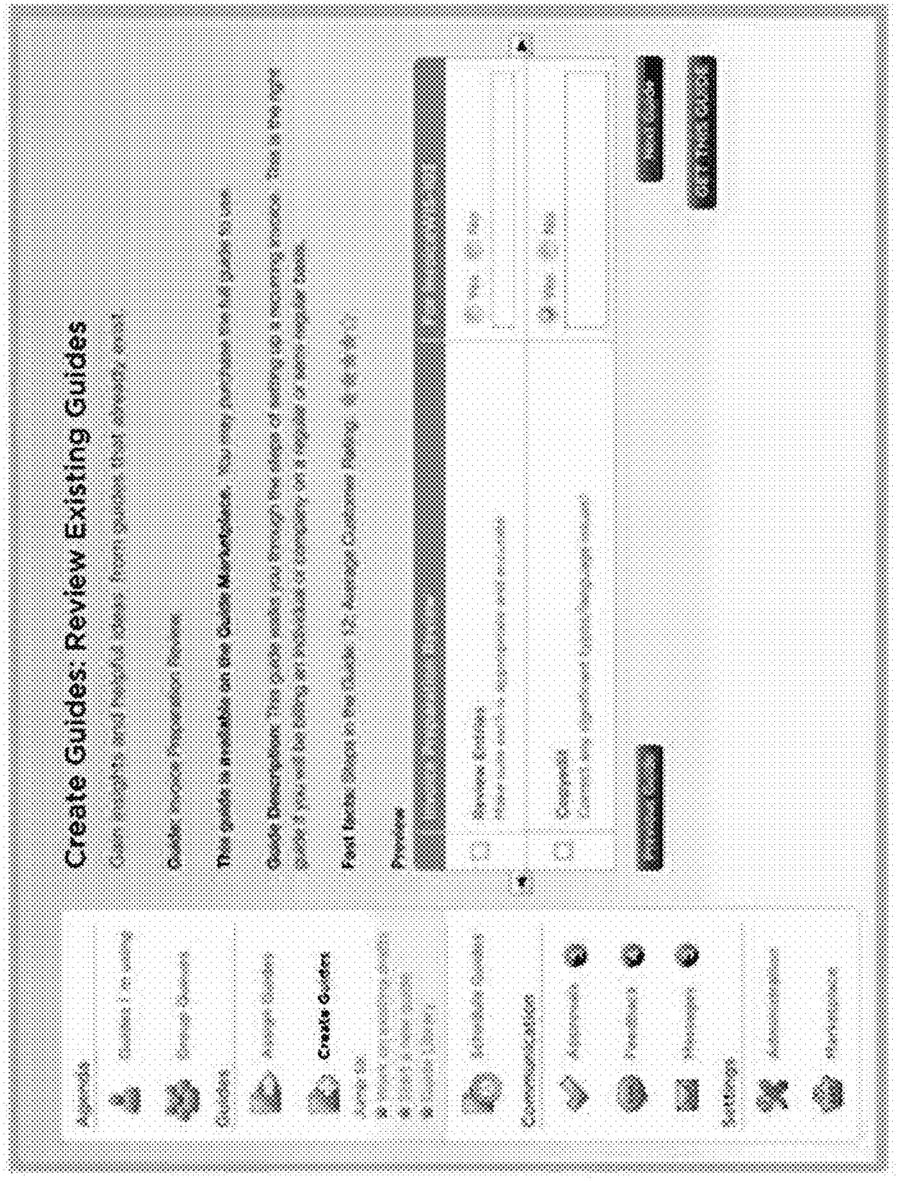

In accordance with some embodiments, as shown, for example, in FIG. 73, using an interface 7300 that may be presented by a hardware processor of a computing device, the hardware processor can present an interactive checklist description and a full interactive checklist. The user can import one or more steps from the existing interactive checklist into the new interactive checklist that they are creating or they can just review the interactive checklist for ideas. In some embodiment, as shown, for example, in interface 7400 of FIG. 74, the hardware processor can present an interactive checklist description, customer rating, and/or an interactive checklist preview for each "Guide Marketplace." The user can opt to purchase the interactive checklist from the "Guide Marketplace" or they can just review a preview for ideas.

Figure 75:
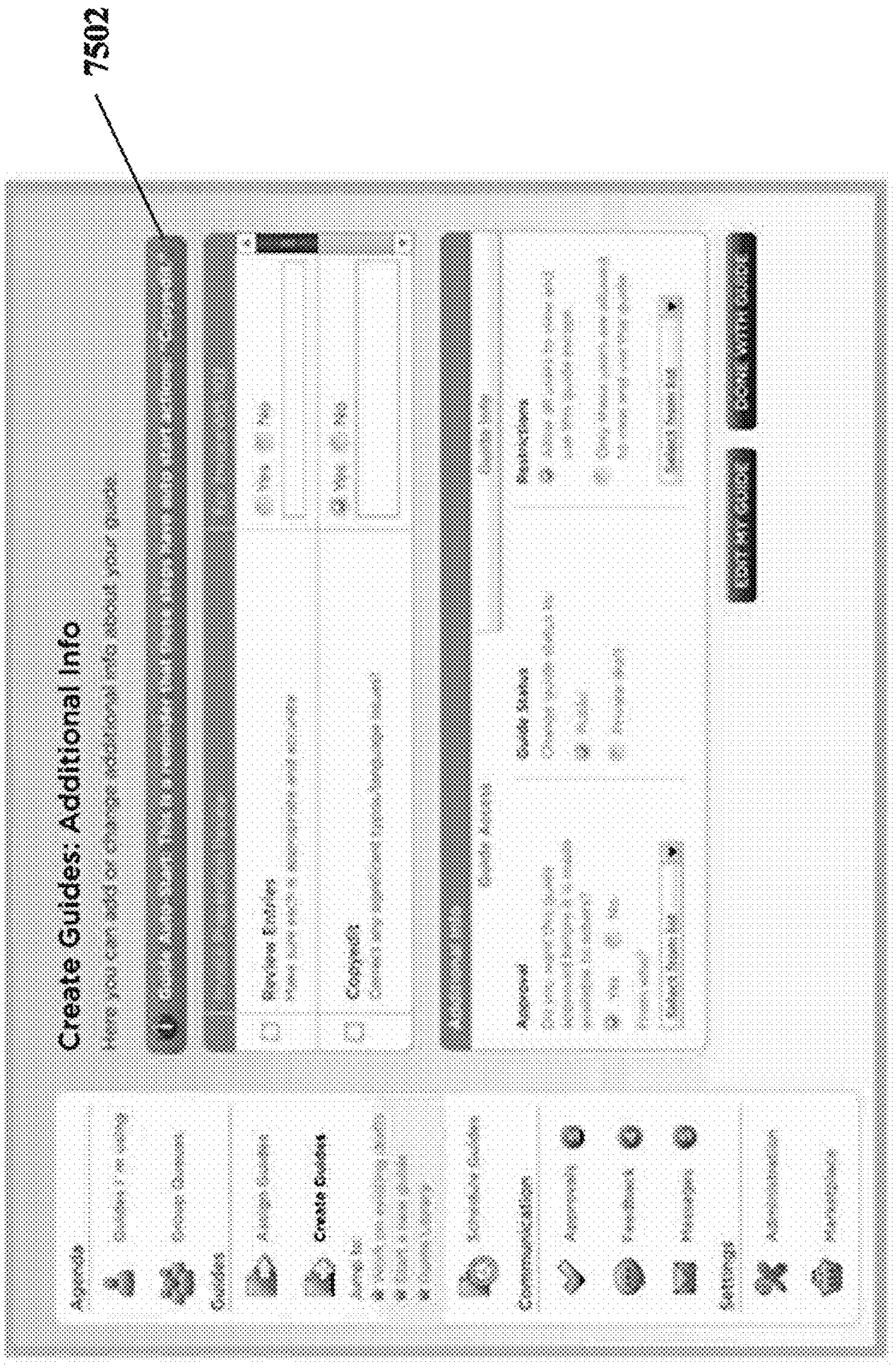

In accordance with some embodiments, interactive checklists can have the ability to launch specific applications, run macros of commands in these applications, open certain webpages, run macros of commands in these pages, etc. In some embodiments, the hardware processor can receive several types of enhancements to the steps to be added in an interactive checklist. One enhancement, automations, can be designed to help users by automatically completing actions. Automations can be configured to occur at certain trigger points, for example, when a specific step is completed, when an interactive checklist is approved, or even when an interactive checklist is assigned even before the user has shown, for example, the interactive checklist. Interactive checklist auto-start messaging as shown, for example, as guide auto-start 7502 of interface 7500 of FIG. 75, can remind the user that an interactive checklist has automations that occur before the interactive checklist is opened. In some embodiments, automations can include any action that is automatically taken. For example, automations can include sending an email or an SMS, inserting data into a database, prefilling fields or field suggestions based on past/likely responses, retrieving relevant information from external services, sending relevant information to external services, and/or any other suitable actions.

Figure 76:
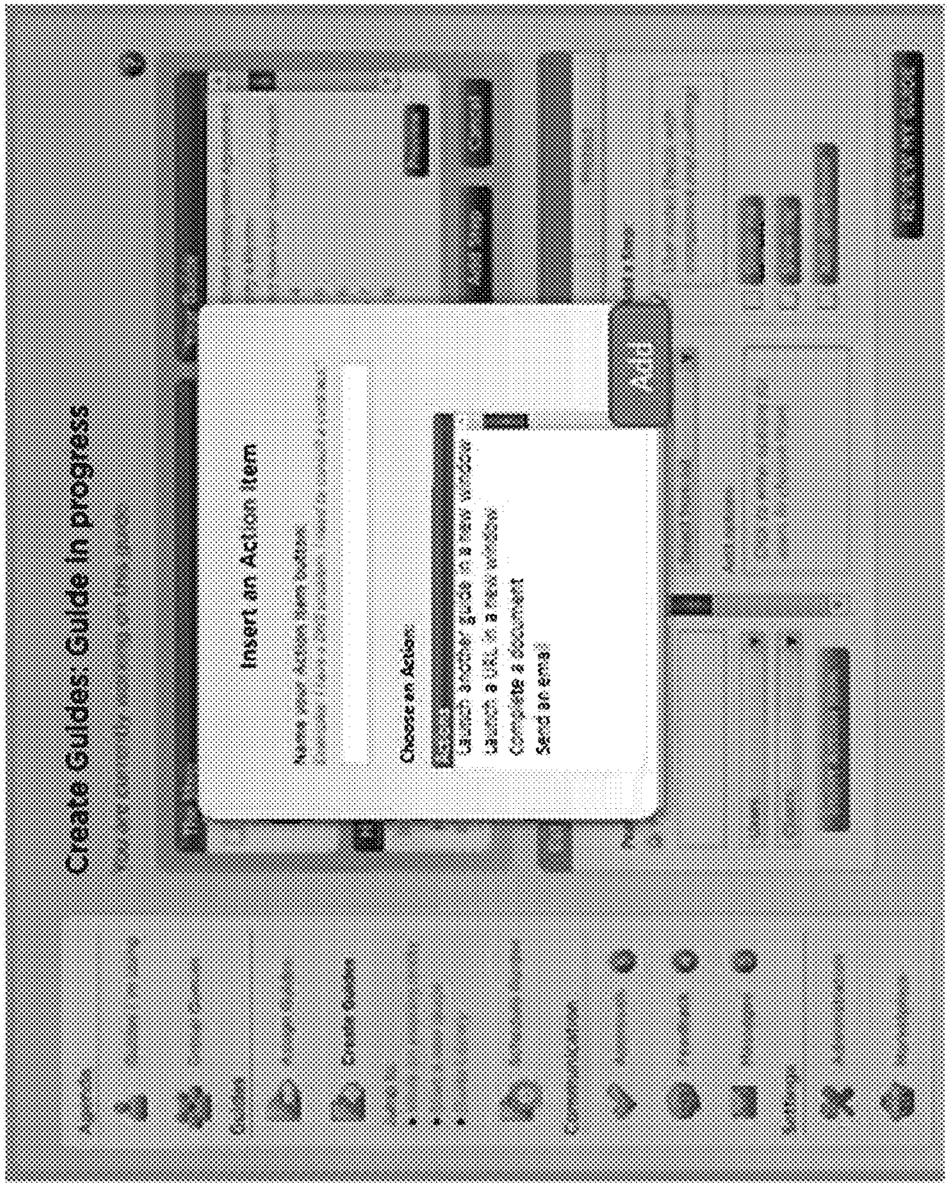

In accordance with some embodiments, another option for interactive checklists can be the ability to add an "Action Item" to any step. The hardware processor can receive action items, such as launching another interactive checklist in a new window, completing a document, or sending an email, to any step. As shown, for example, in FIG. 76, using an interface 7600 may be presented by a hardware processor of a computing device, the hardware processor can display a button that when selected can launch that action item.

Figure 77:
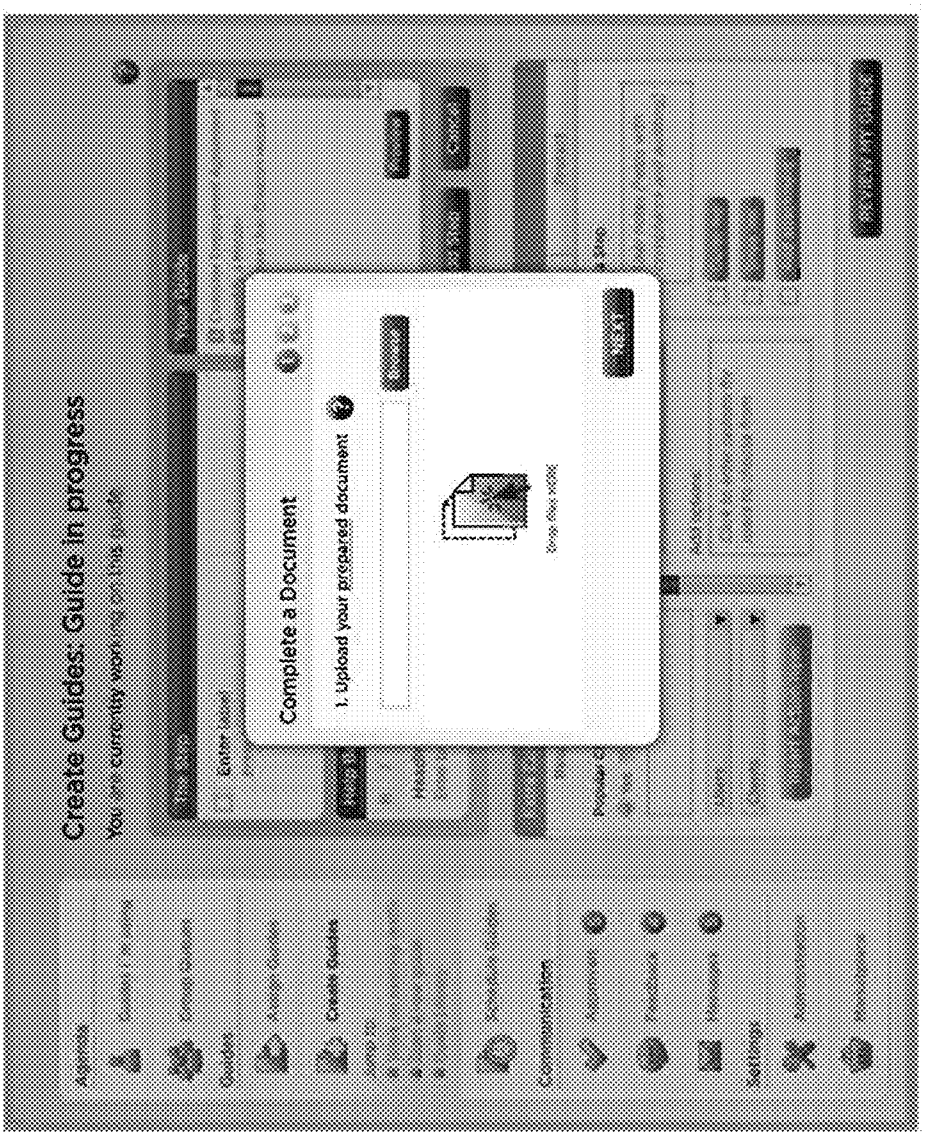

In accordance with some embodiments, one action can be to complete a document. As shown, for example, in FIG. 77, using an interface 7700 that may be presented by a hardware processor of a computing device, the hardware processor can receive a user upload of a template document with dynamic fields. For example, upon the hardware processor receiving a user input (e.g., by clicking a button), the interactive checklist can complete those fields for the user using data from the interactive checklist producing a completed document. Template documents may be of any suitable files types, such as Microsoft Office files, PDF files, Photoshop files, and/or any other types of files.

Figure 78:
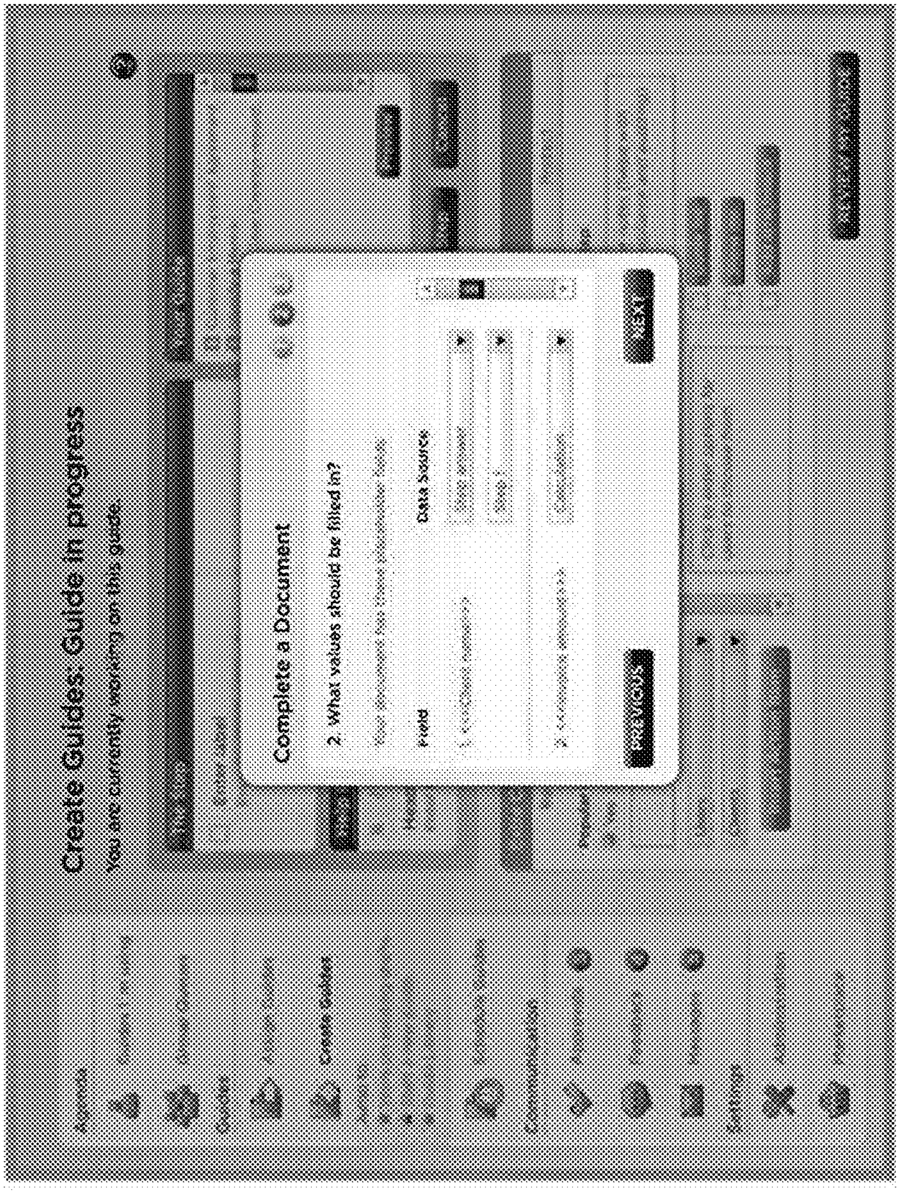
Figure 79:
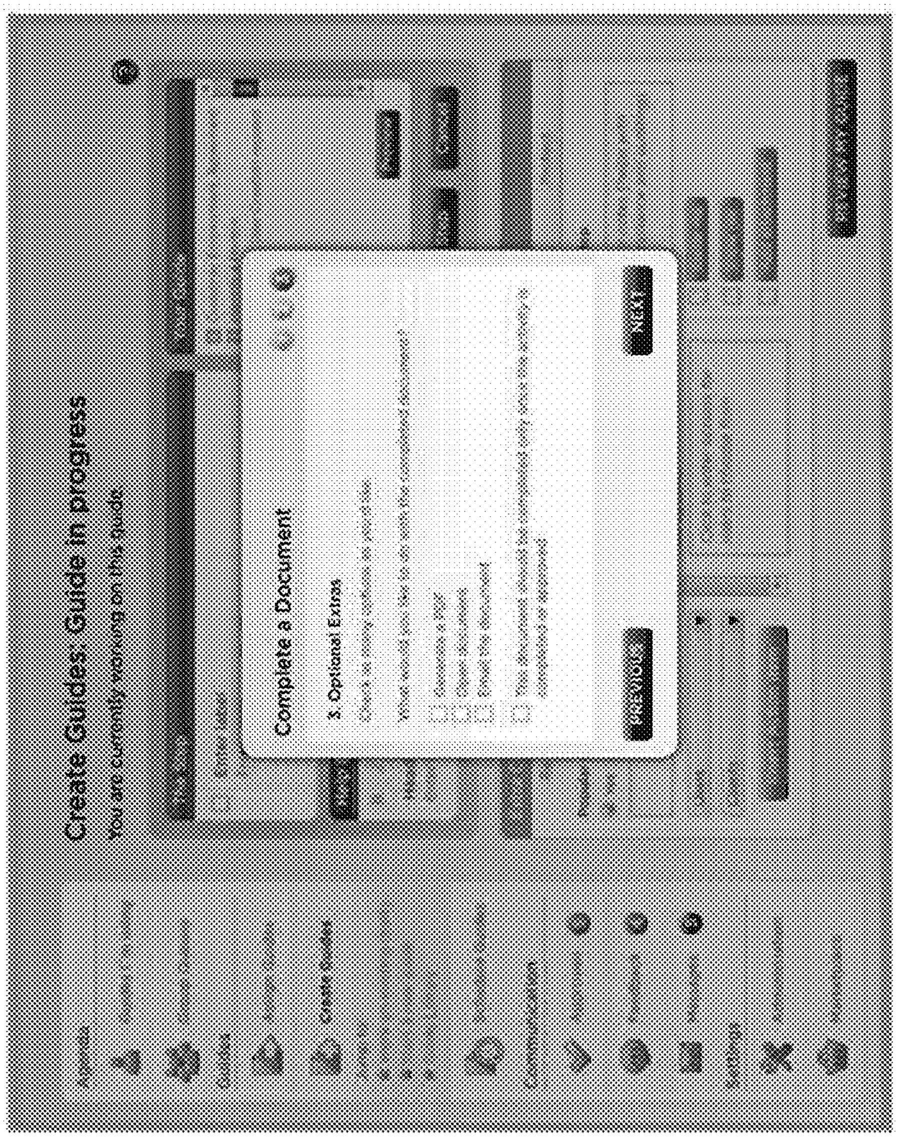

The hardware processor can receive a user upload of a template document, for example, an employment contract. The template contains certain dynamic placeholder fields such as <<Client name>> and <<invoice amount>> as shown, for example, in interface 7800 of FIG. 78. The interactive checklist can identify these fields and the hardware processor can present a prompt to the user to complete the fields. Sources for these fields can be from step answers, in this or related/unrelated interactive checklists, retrieved from a Web service, calculated, and/or a constant value. Additionally or alternatively, the template can also include syntax that indicates conditional inclusion, such as <<if: notblank:Client name>>. Lastly, the hardware processor can receive a user input to indicate what can be done with a completed document (other than automatically attaching it to the interactive checklist). Options can include opening it, emailing it, or generating a PDF of it as shown, for example, in interface 7900 of FIG. 79.

Figure 80:
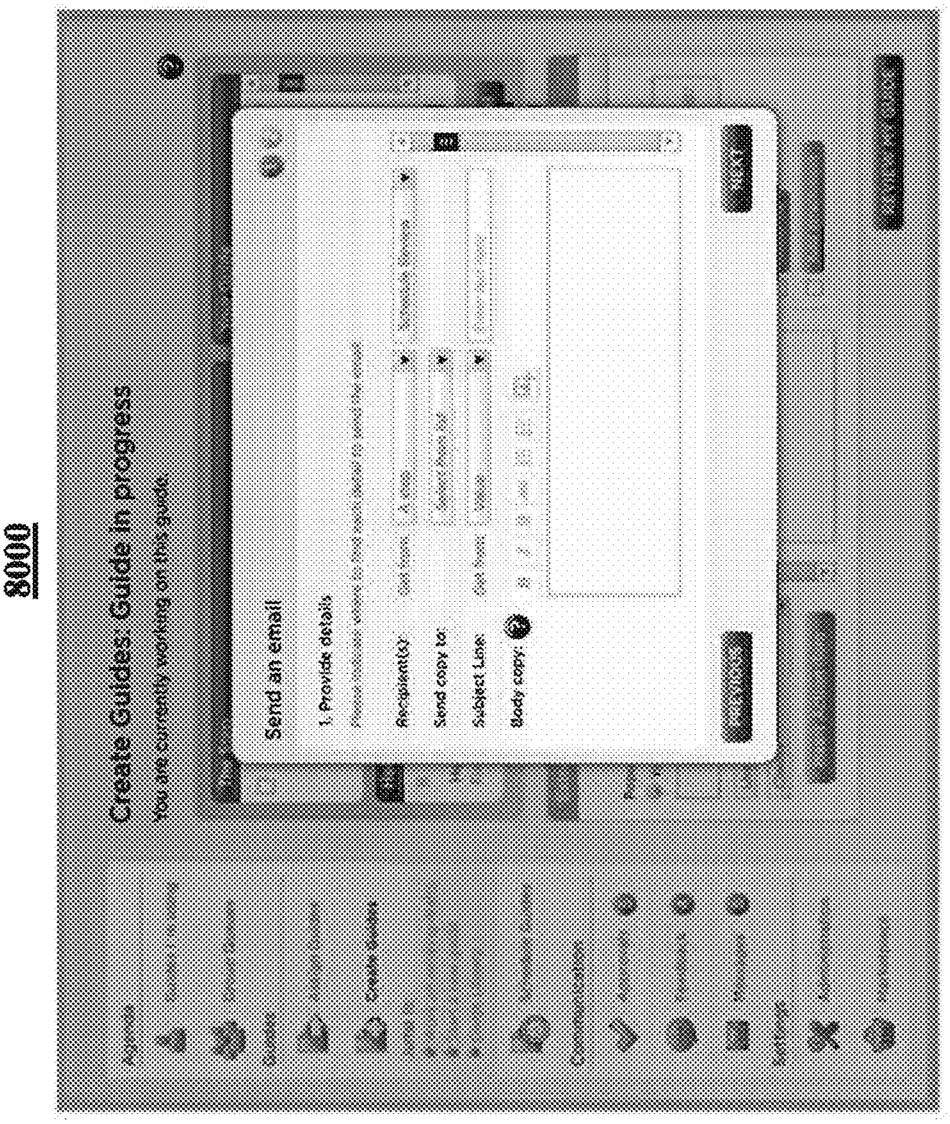

In accordance with some embodiments, another powerful action item can be the ability to send an email. As shown, for example, in FIG. 80, using an interface 8000 that may be presented by a hardware processor of a computing device, the hardware processor can receive a user input to configure the email, for example, such as recipients, subject line, and body copy. Similar to completing a document, the hardware processor can receive a user input to indicate where to get the information from, for example, from a step answer or from a constant value. The email can include dynamic fields in the body copy of the email. In accordance with some embodiments, other action items may include assigning an interactive checklist, or delegating steps.

Figure 81:
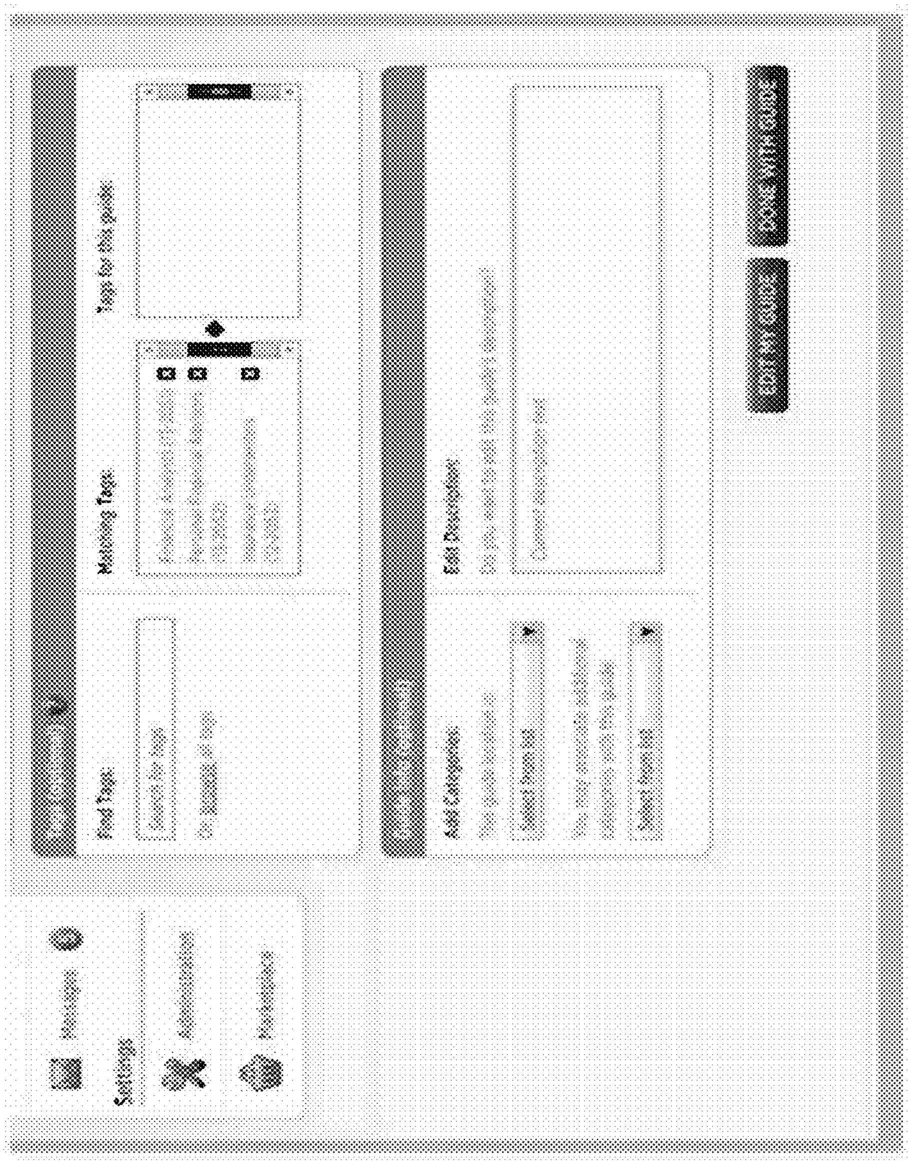
FIGS. 81, 82, 83, 84, and 85 show examples of user interfaces for tagging an interactive checklist in accordance with some embodiments of the disclosed subject matter.
Figure 82:
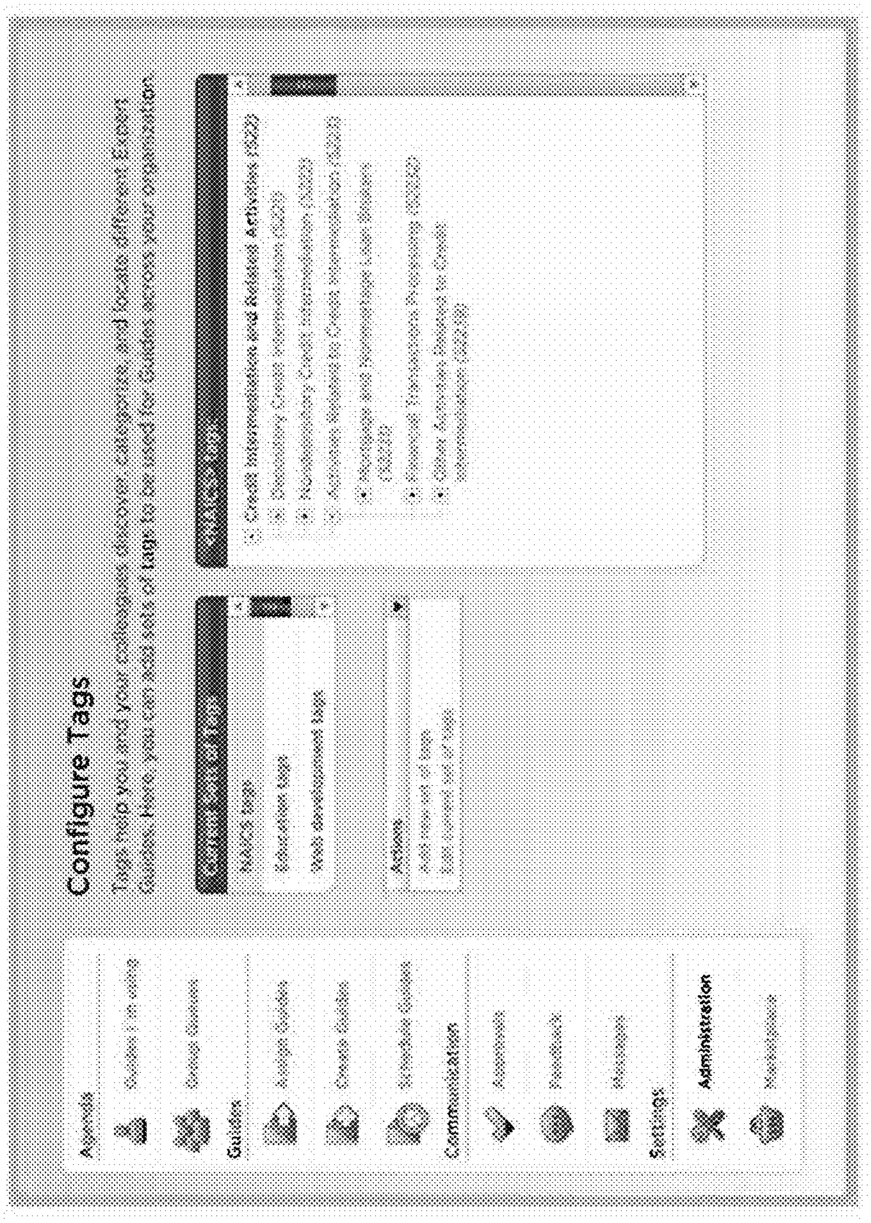
Figure 83:
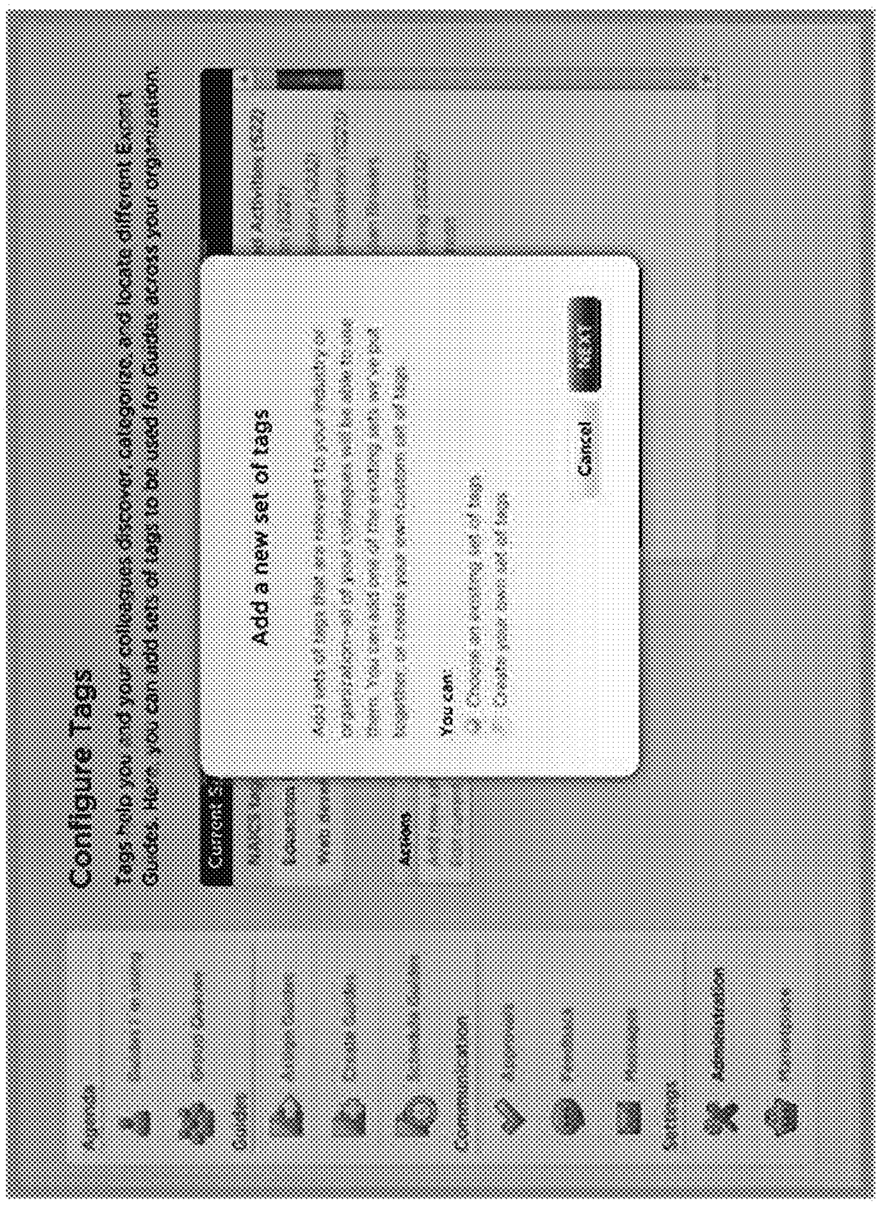

In accordance with some embodiments, a later part of creating an interactive checklist can be reviewing interactive checklist steps, as well as information about the interactive checklist, such as a title and a description. In addition, using an interface 8100 that may be presented by a hardware processor of a computing device, the hardware processor can receive a user input to tag the interactive checklist as shown, for example, in FIG. 81. The interactive checklist can offer the user matching tags or they can search interactive checklist tags using their own keywords. Any suitable sets of tags can be available to the user. The hardware processor can receive a user input to add one or more sets of tags to be used by users in an organization as shown, for example, in interface 8200 of FIG. 82. Two types of sets can be added, either default sets (e.g., that come with or without interactive checklists or optionally with a single interactive checklist) or custom sets (e.g., created by the organization), as shown, for example, in interface 8300 of FIG. 83.

Figure 84:
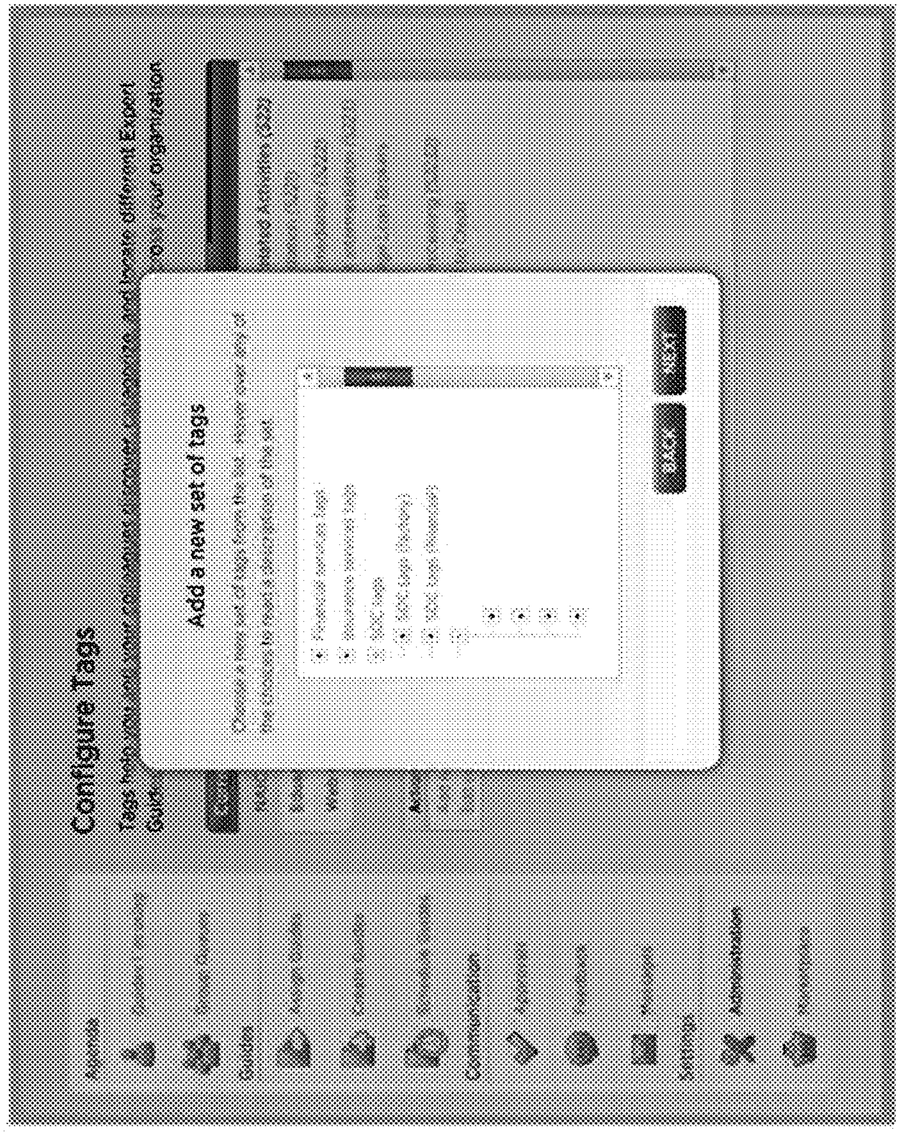
Figure 85:
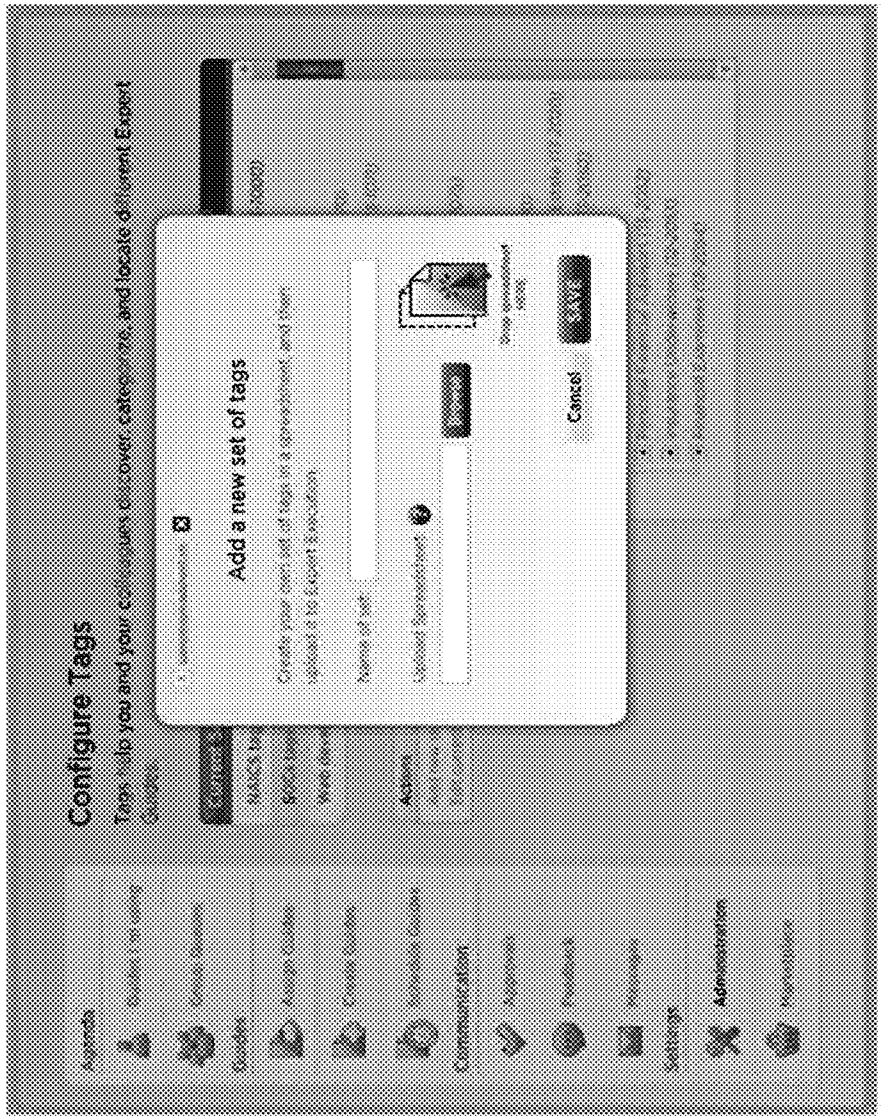

In accordance with some embodiments, an interactive checklist can come with many sets of tags as shown, for example, in interface 8400 of FIG. 84. Tag sets can be based on widely used classification systems, such as SOC and NAICS and/or industry-specific terms and ideas in some embodiments. The hardware processor can receive a unique set of tags from an organization as shown, for example, in interface 8500 of FIG. 85. A user can be provided with a set format, and can upload or enter and manage their own hierarchical set of tags.

Figure 86:
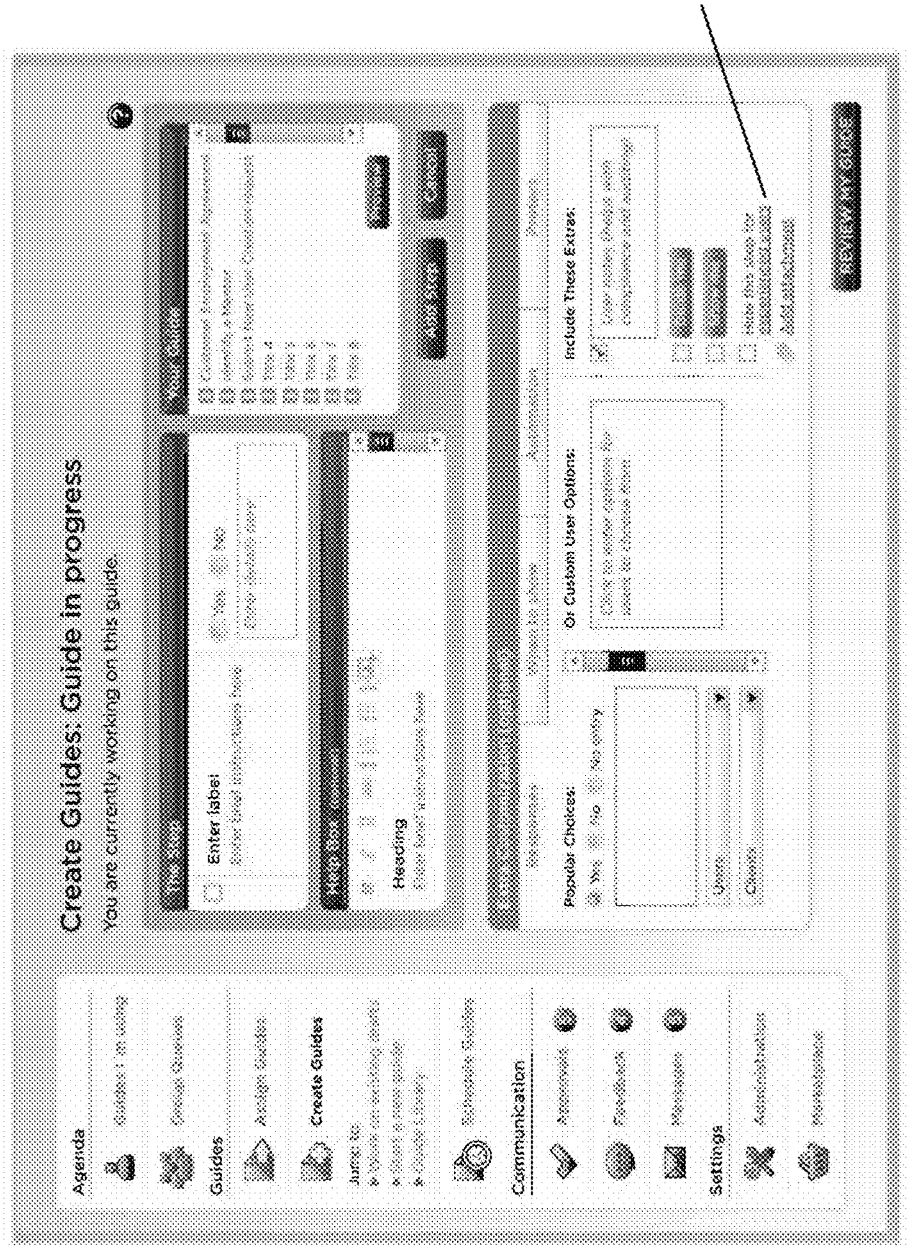
FIGS. 86 and 87 show examples of user interfaces for modifying an interactive checklist in accordance with some embodiments of the disclosed subject matter.
Figure 87:
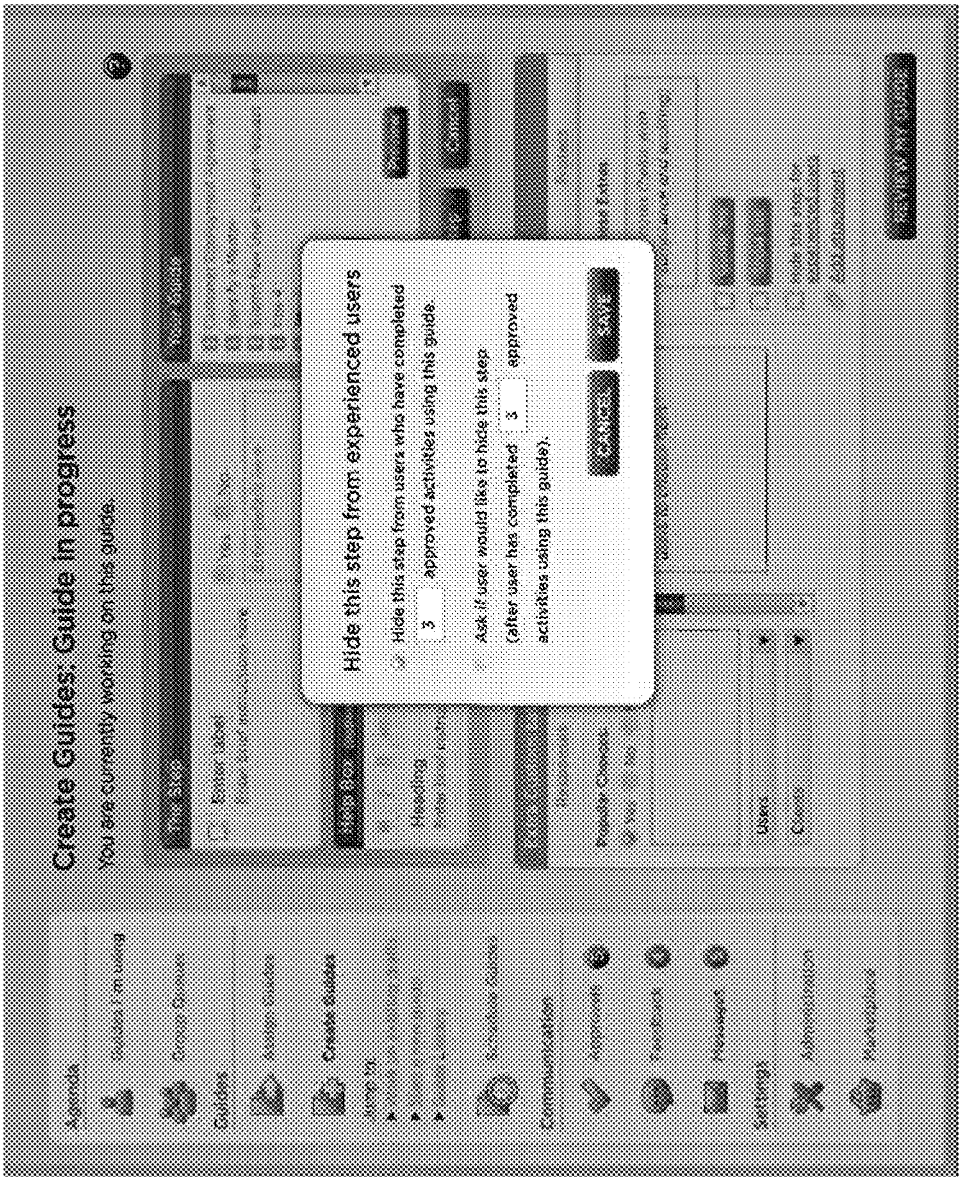

In accordance with some embodiments, once an interactive checklist has been created and has been assigned or used, the hardware processor can receive a user input to modify the interactive checklist. Sometimes, a user may decide that a particular step is no longer needed (e.g., at least for certain users). In that case, the hardware processor can receive a user input at box 8602 of interface 8600 of FIG. 86 to hide the step. When the user decides to hide the step from experienced users, they can have the flexibility to hide the step after a user has completed the interactive checklist a certain number of times or ask the user if they would like the step hidden after the user has completed the interactive checklist a certain number of times as shown, for example, in interface 8700 of FIG. 87.

Figure 88:
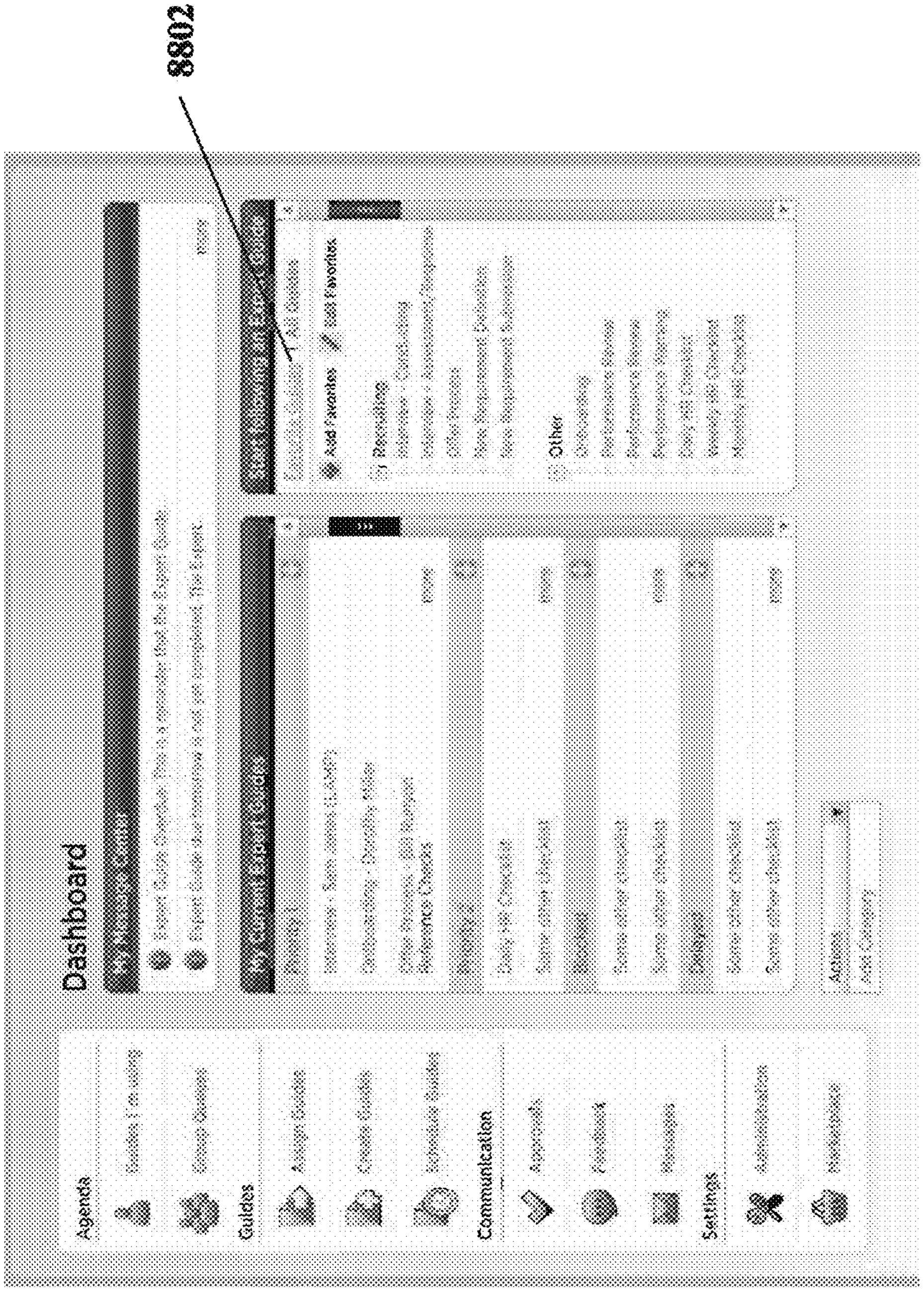
FIGS. 88 and 89 show examples of user interfaces for presenting a list of favorite interactive checklists in accordance with some embodiments of the disclosed subject matter.

In accordance with some embodiments, published user interactive checklists can be used to complete tasks. It can be common for a user to use the same interactive checklists over and over again for tasks that they complete on a regular basis. These interactive checklists (and others) can be presented by the hardware processor on a user dashboard under a "Favorite Guides" menu as shown, for example, in interface 8800 of FIG. 88 as 8802.

Figure 89:
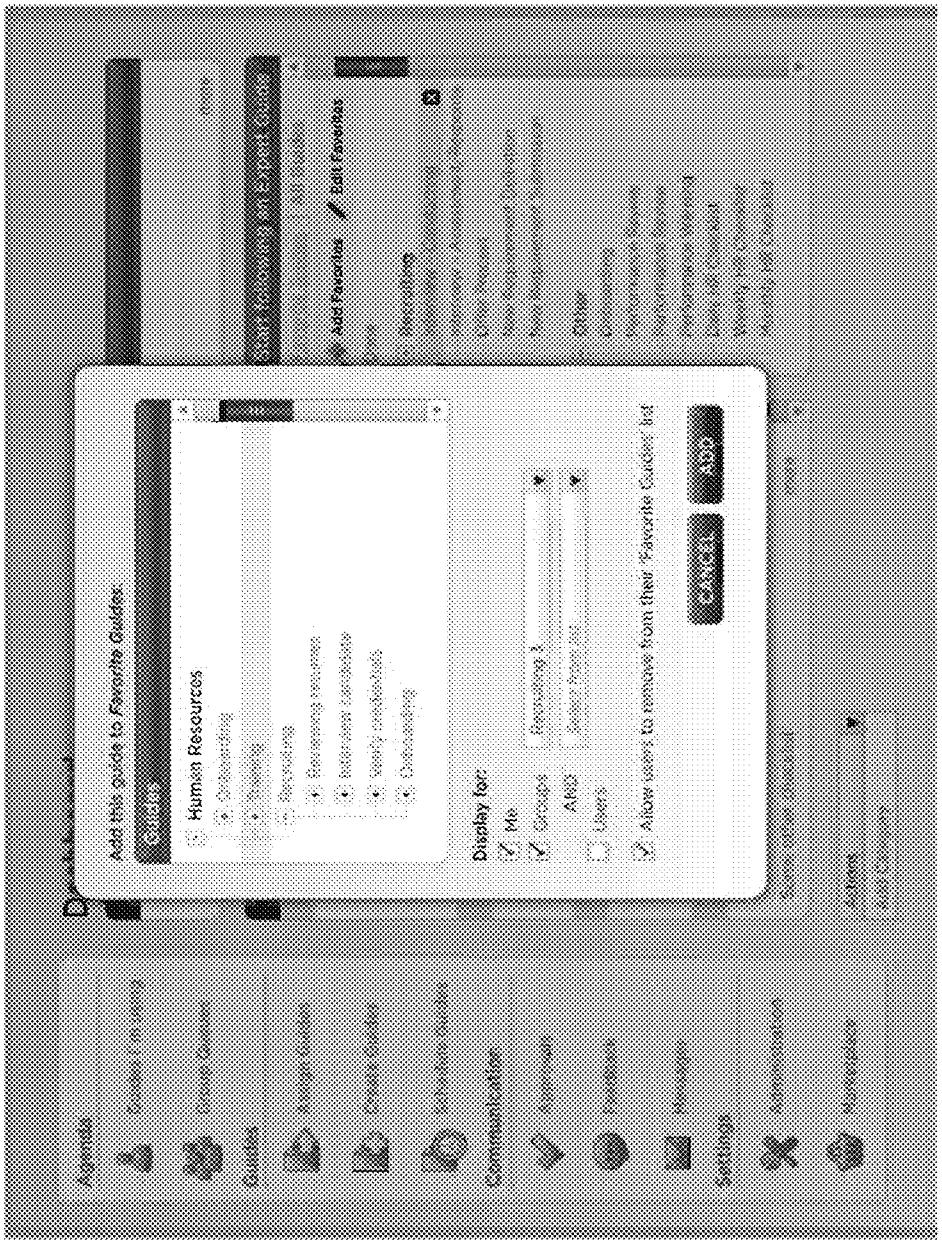

In some embodiments, using an interface 8900 that may be presented by a hardware processor of a computing device, the hardware processor can receive a user input to add an interactive checklist to a user's list of "Favorite Guides" as shown, for example, in interface 8900 of FIG. 89. The user can also choose to add it to a "Favorite Guides" list of another user or group of users in some embodiments. A user may subscribe to the interactive checklists authored by a selected user, group, or organization in some embodiments. Additionally and/or alternatively, the user may be subscribed to the interactive checklists directly or by virtue of the user's member to a Group. This can cause all of the selected user's, groups, or organization's current and future interactive checklists to be favorite and/or, if the user designates, those current or future interactive checklists can be brought to the user's attention upon publication or modification and possibly offered for designation as a favorite.

Figure 90A:
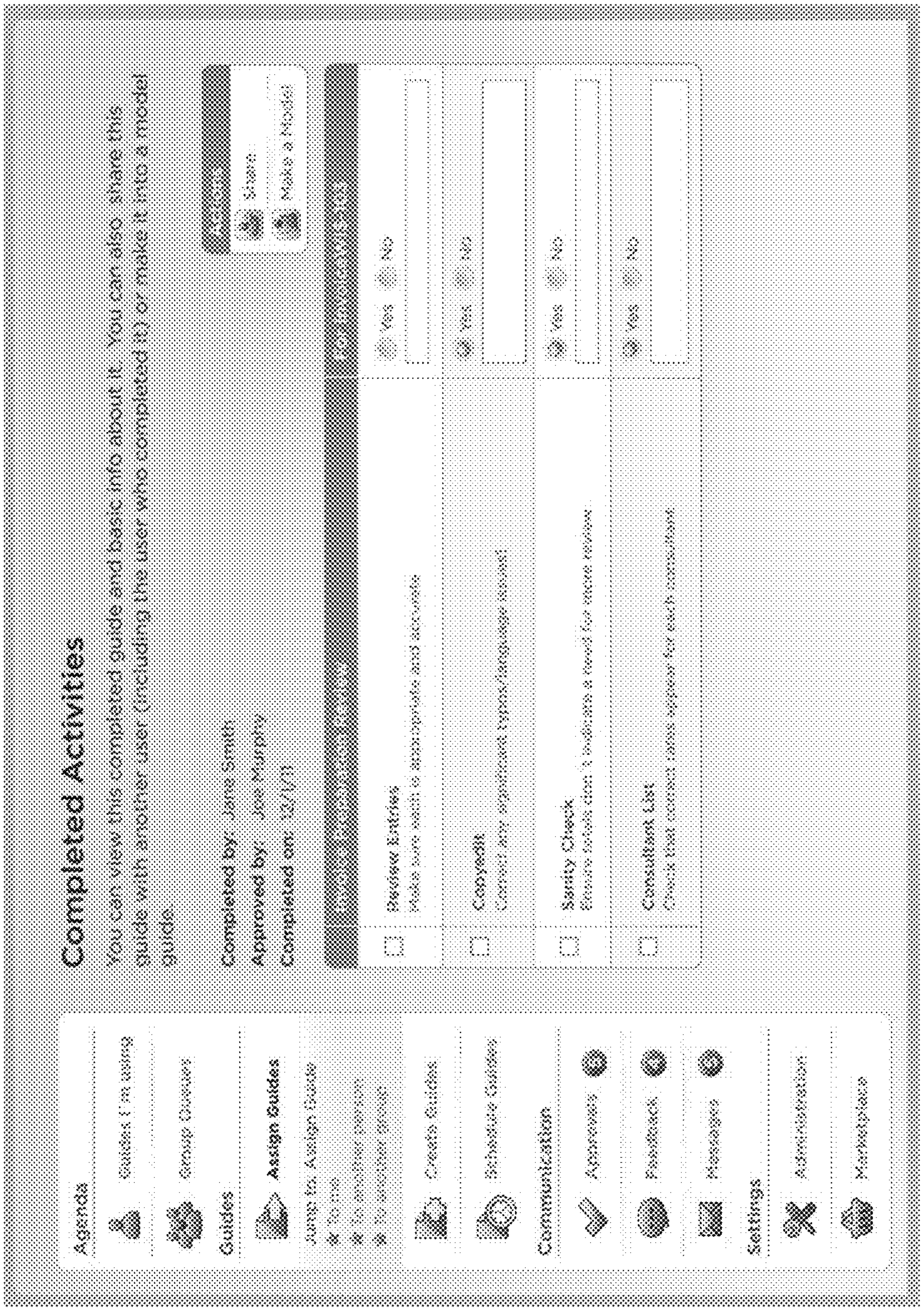
FIGS. 90A and 90B show examples of user interfaces for sharing a complete activity in accordance with some embodiments of the disclosed subject matter.
Figure 90B:
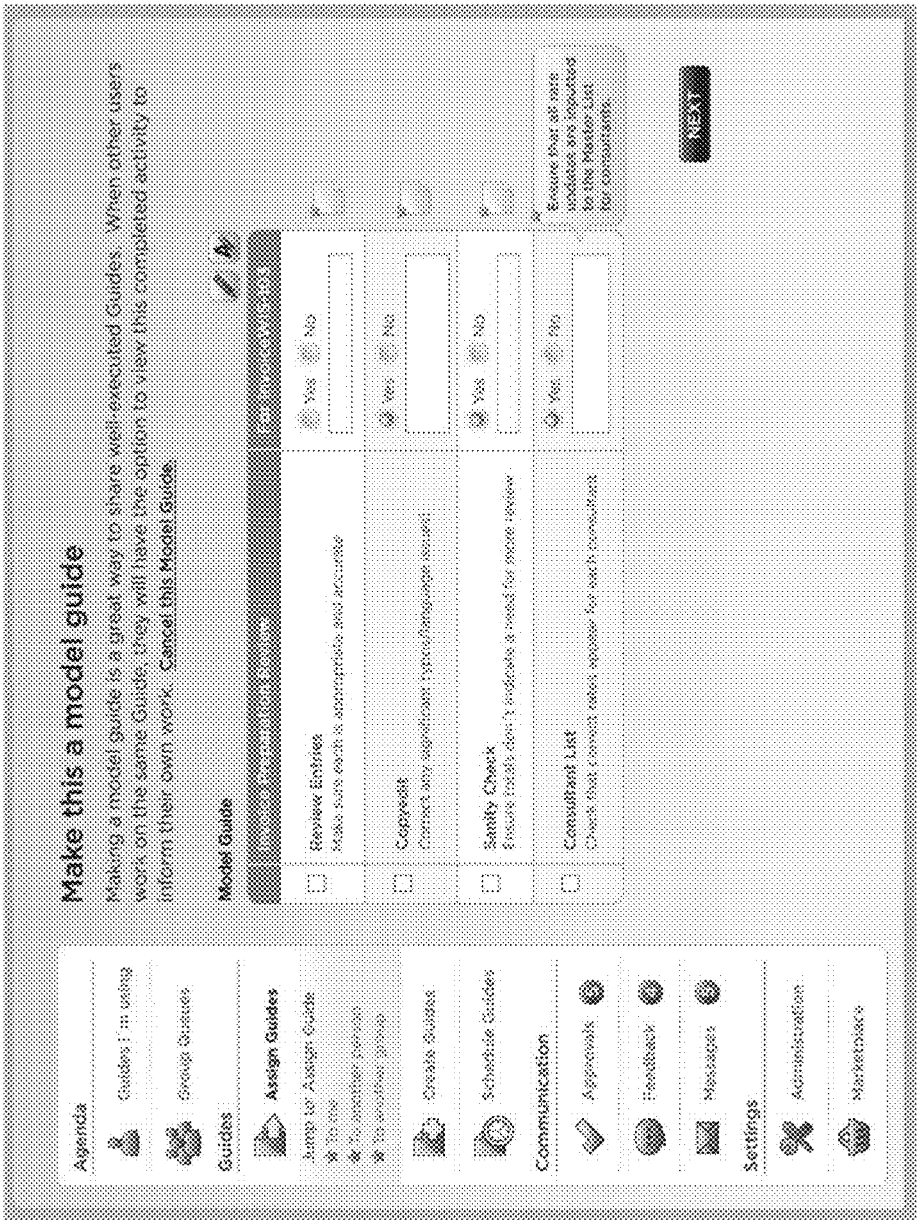

Interactive checklists can be assigned to any number of people, any number of times. A user can view most-completed activities that use the interactive checklist that they created. The user can share a completed activity with another user or the users can opt to turn it into a model interactive checklist as shown, for example, in interfaces 9002 and 9004 of FIG. 90A and FIG. 90B. A model interactive checklist can aid other users who are working on the same interactive checklist. The hardware processor can receive a user input to add notes to a step, highlight text in the interactive checklist, alter text in the interactive checklist (to protect private or sensitive information), and/or make any other additions.

Figure 91:
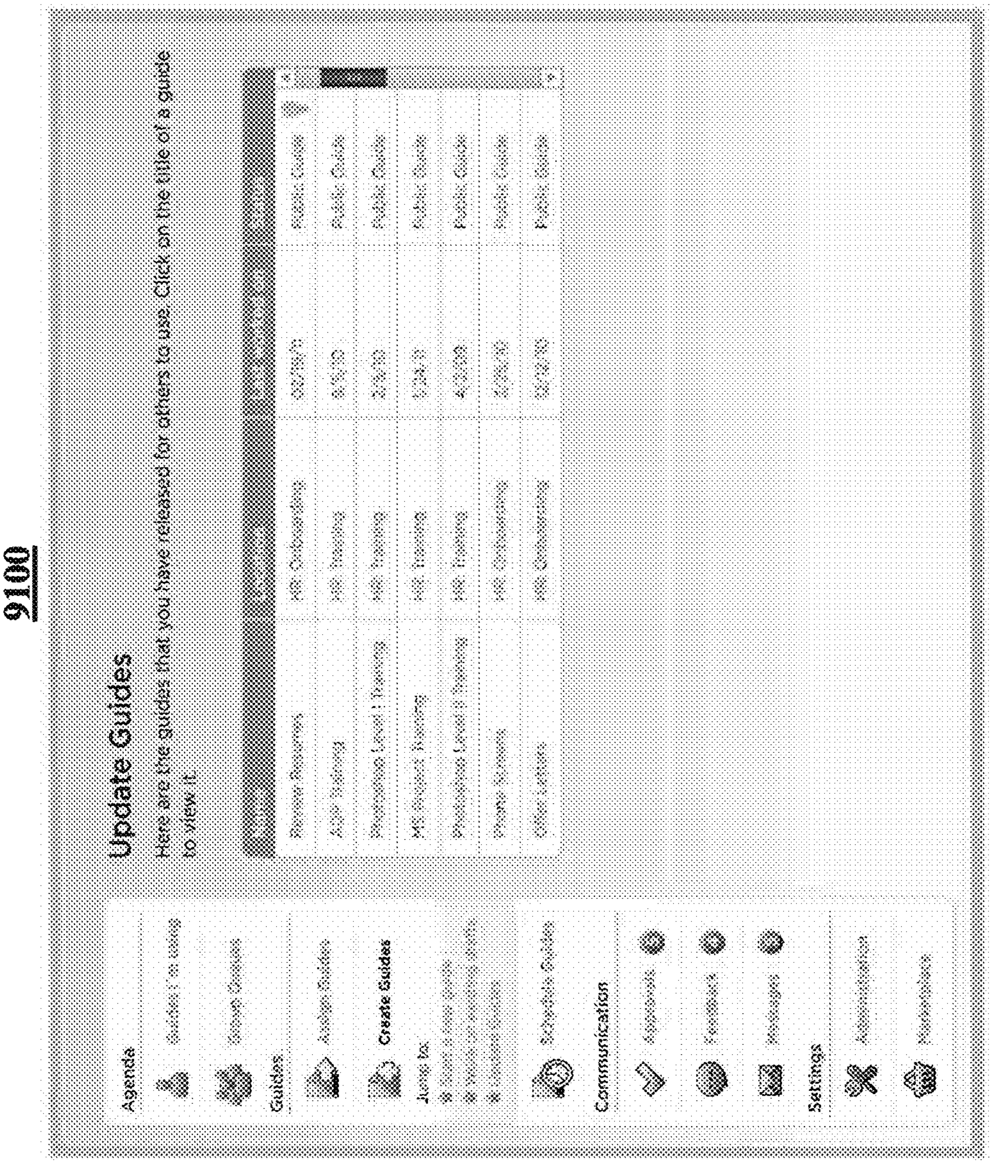
FIGS. 91, 92A, and 92B show examples of user interfaces for promoting steps of an interactive checklist in accordance with some embodiments of the disclosed subject matter.
Figure 92A:
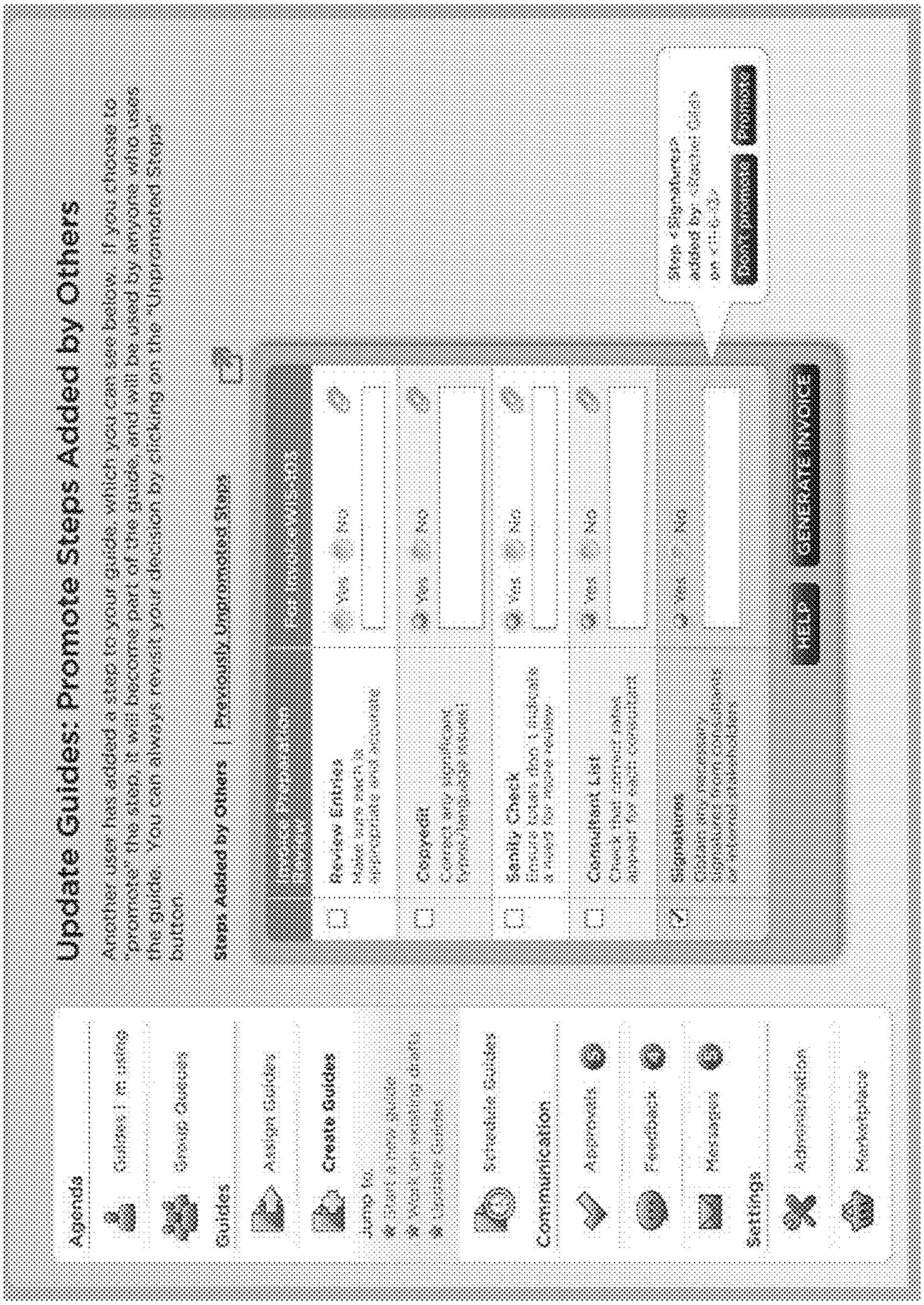
Figure 92B:
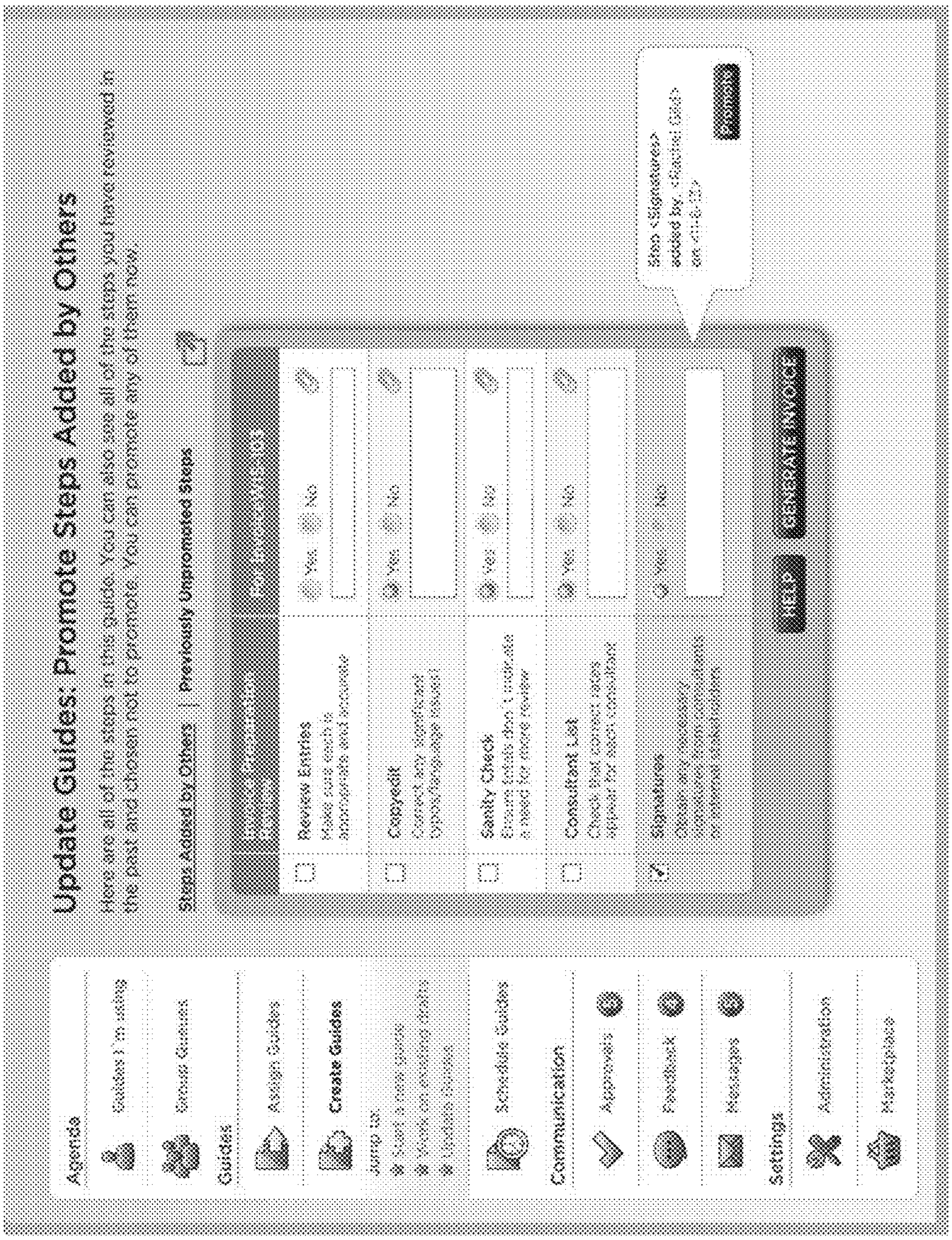

In accordance with some embodiments, another way an interactive checklist user can modify a published interactive checklist can be through a "Step Promotion" feature. In some embodiments, once an interactive checklist is published, using an interface 9100 that may be presented by a hardware processor of a computing device, the hardware processor can receive a user input to modify or add steps for their own use only, as shown, for example, in FIG. 91. Additionally and/or alternatively, modifying or adding steps can be for a limited set of people or groups of people. However, the published interactive checklist owner can review customizations that have been added (provided protections allow this), and can choose to promote some to being part of the published interactive checklist. In accordance with some embodiments, the owner may alter a step in association with the promotion. The owner can review new steps as shown in interface 9202 of FIG. 92A. If the owner chooses to promote, the step can be added to the published interactive checklist and used by everyone. If the owner chooses to not promote, the published interactive checklist can stay the same. This feature can help harness grassroots interactive checklist improvements thought of from throughout an organization. In some embodiments, a user can return to steps they previously had said not to promote. With extra time and perspective, the user may now wish to promote the step that they previously denied as shown, for example, in interface 9204 of FIG. 92B.

Figure 93:
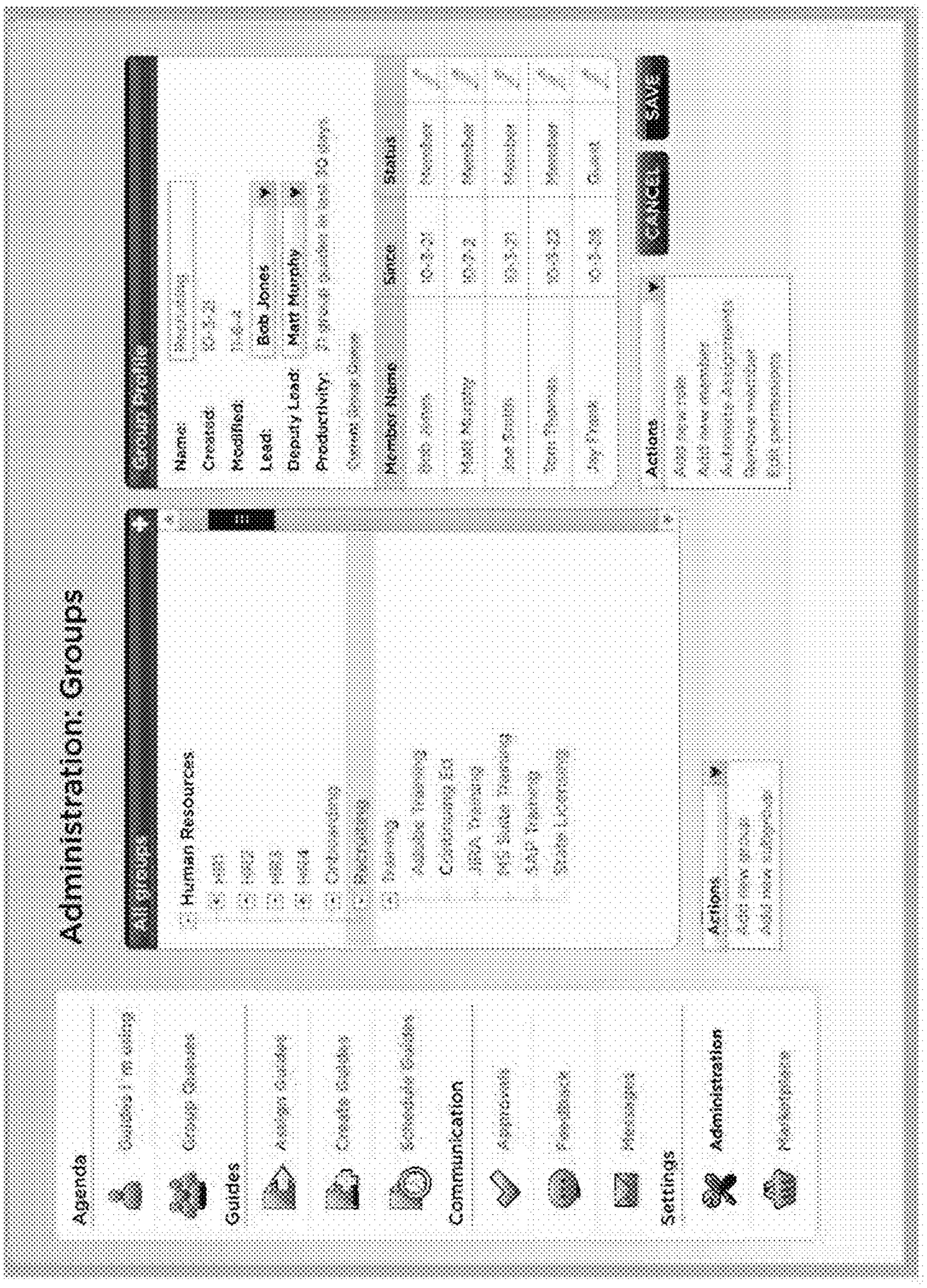
FIGS. 93 and 94 show examples of user interfaces for presenting assigned interactive checklists in accordance with some embodiments of the disclosed subject matter.
Figure 94:
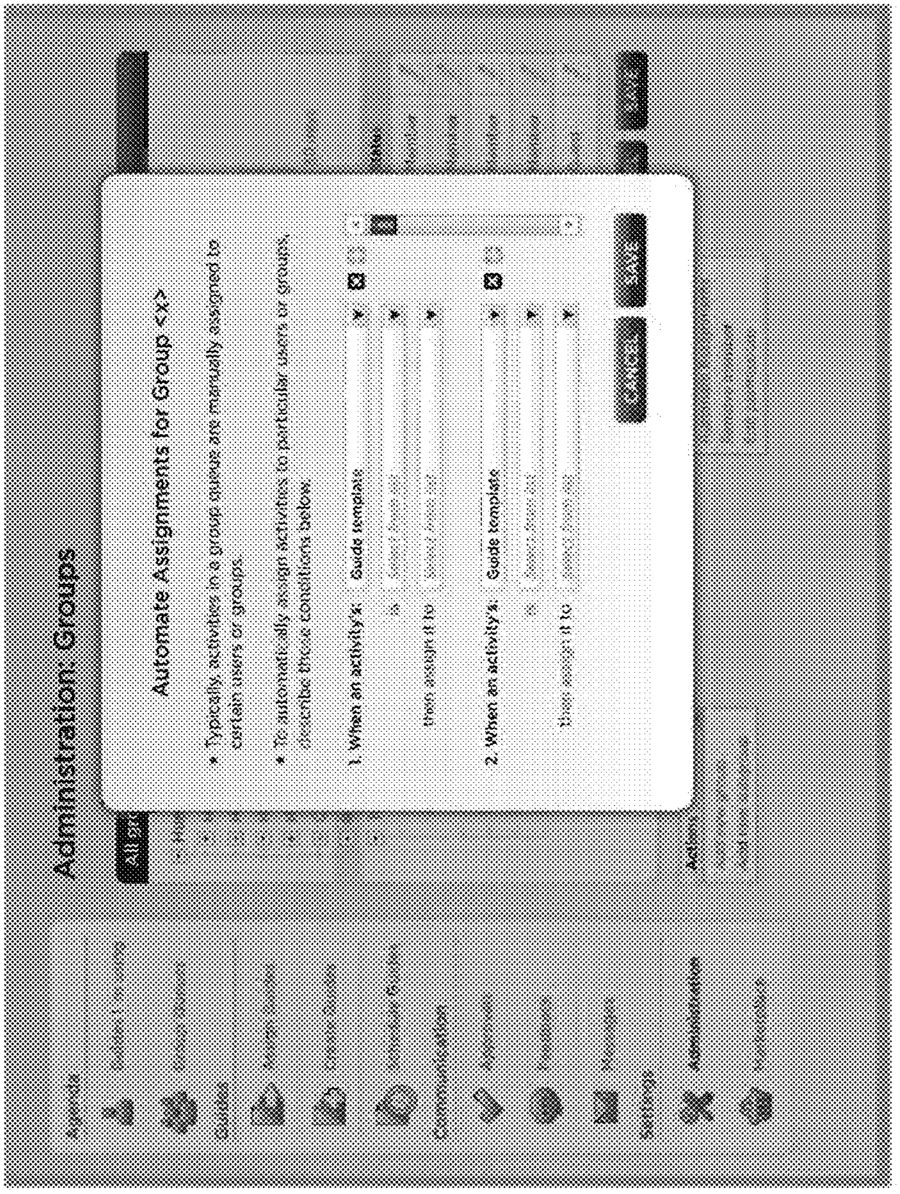

Interactive checklists can be assigned to an individual user or to a particular group as shown, for example, in interface 9300 of FIG. 93. A leader of a group can configure rules so that group assignments can be automatically assigned/reassigned to the correct user(s), subgroup(s) and/or unrelated group(s). As shown, for example, in FIG. 94, using an interface 9400 that may be presented by a hardware processor of a computing device, the hardware processor can present activities that can be reassigned based on the interactive checklist used, an activity's title, the user who is going to approve the activity, the activity's due date, the activity description, the activity assigner, time, seasonality, weekday, the workloads of potential assignment candidates, activity responses that were prefilled, for instance during creation (in full or in part), data from related sources, for example a parent activity, automation queries that may rely on information such as aforementioned elements, and/or any other information. Note that, in some embodiments, information relating to an activity can be presented in a page associated with the activity. In some such embodiments, a user can modify the information relating to the activity via a user interface associated with the page. For example, in some embodiments, individual fields within the user interface (e.g., indicating a due date, people assigned to the activity, and/or any other suitable fields) can be modified within the user interface. Additionally or alternatively, in some embodiments the activity can be cancelled and/or deleted using the user interface associated with the activity page. Furthermore, in some embodiments, an activity that was previously cancelled can be reopened (e.g., by a user that has permission to reopen the activity, and/or any other suitable user), and users can perform any suitable actions related to a reopened activity (e.g., setting one or more due dates, assigning the activity, adding comments and/or notes, and/or any other suitable actions).

Figure 95:
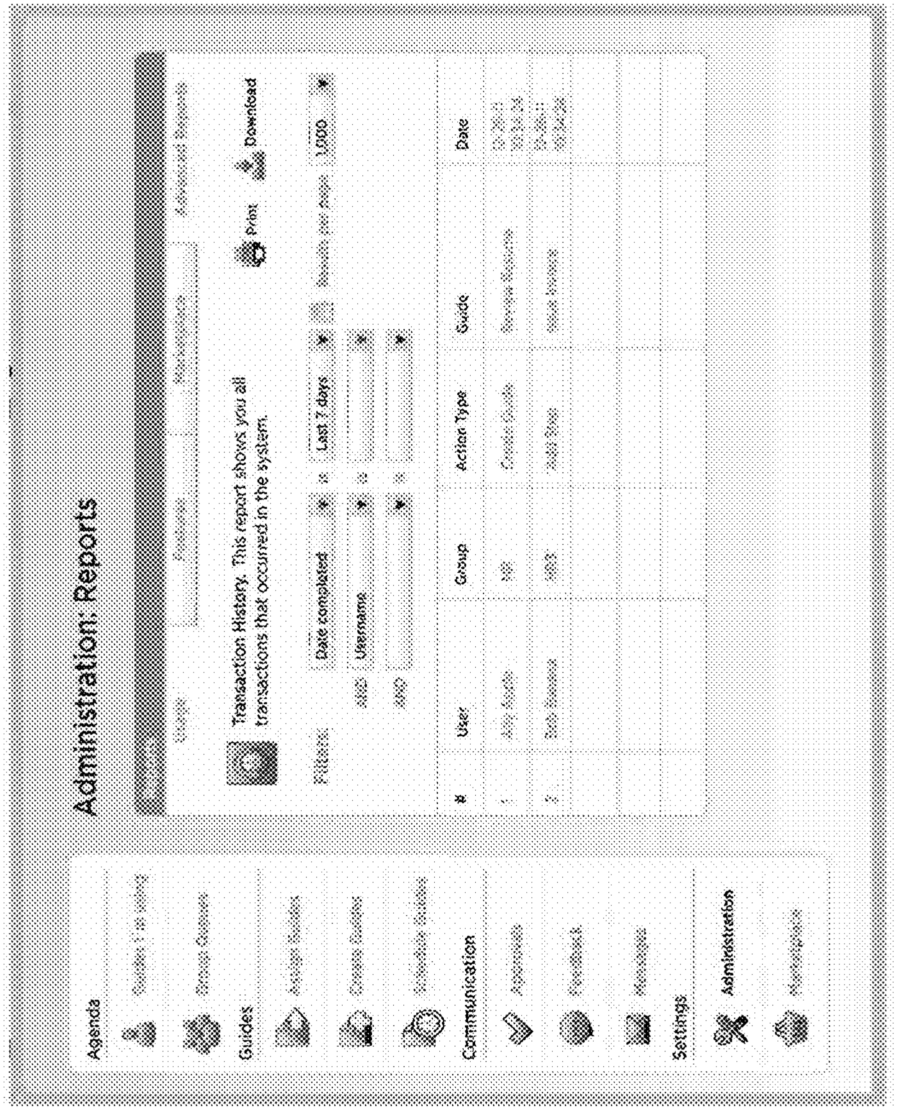
FIG. 95 shows an example of a user interface for presenting a transaction history in accordance with some embodiments of the disclosed subject matter.
Figure 96A:
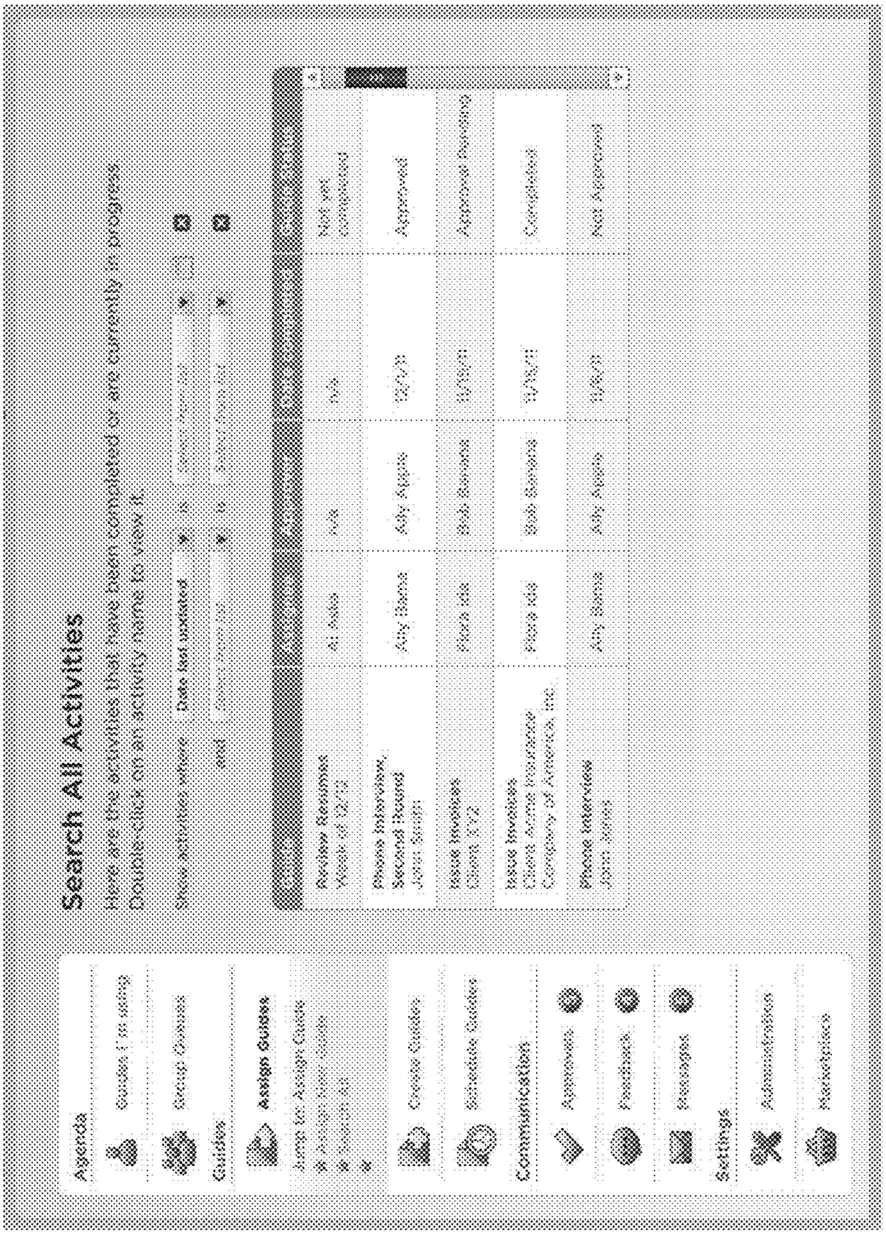
FIG. 96A shows an example of a user interface for presenting an assignment history in accordance with some embodiments of the disclosed subject matter.

In accordance with some embodiments, the hardware processor can present a "Transaction History" report. The interactive checklist can keep an audit trail of form submissions made in the interactive checklist. As shown, for example, in FIG. 95, using an interface 9500 that may be presented by a hardware processor of a computing device, the hardware processor can present transaction information for a period of time which can filter a list by a variety of parameters. In some embodiments, using an interface 9600 that may be presented by a hardware processor of a computing device, the hardware processor can present an "Assignment History," as shown, for example, as interface 9600 of FIG. 96A, which can be a useful tool that can allow a user to navigate through assigned activities. The hardware processor can receive a user input to locate, browse, and view assigned activities, regardless of status (e.g., not yet completed, completed, approval pending, etc.). Additionally, the hardware processor can receive a user input to filter the list using a variety of parameters.

Figure 96B:
FIG. 96B shows an example of a user interfaces for linking an activity in accordance with some embodiments of the disclosed subject matter.

In some embodiments, the hardware processor can receive a user input to link one activity to another activity, as shown in interface 9602 of FIG. 96B. For example, the activities can be linked regardless of whether or not the activities have been completed or created. Linked activities indicate that the activities are related in some way. Additionally, linked activities can allow users to ensure that separated but related tasks are completed properly. For example, one step can be to ensure that a related activity was completed. In another example, another step can be to identify and assign certain activities associated with related guides. In some embodiments, linked activities can ensure that information needed for multiple activities can be easily accessible and transferred accurately. Additionally and/or alternatively, linked activities can enable an interactive checklist to automatically retrieve or set information in a related interactive checklist. In some embodiments, as shown in FIG. 96B, the hardware processor can present an "Assign a new activity instead" option that allows a user to create and assign an activity that can then be linked. As another example, in some embodiments, one or more activities can be automatically identified that meet particular criteria and can be suggested as activities to link to another activity. Note that, in some embodiments, the hardware processor can determine that a new entry has been published in an RSS feed, and can create and/or assign a new activity based on the new entry.

Figure 97:
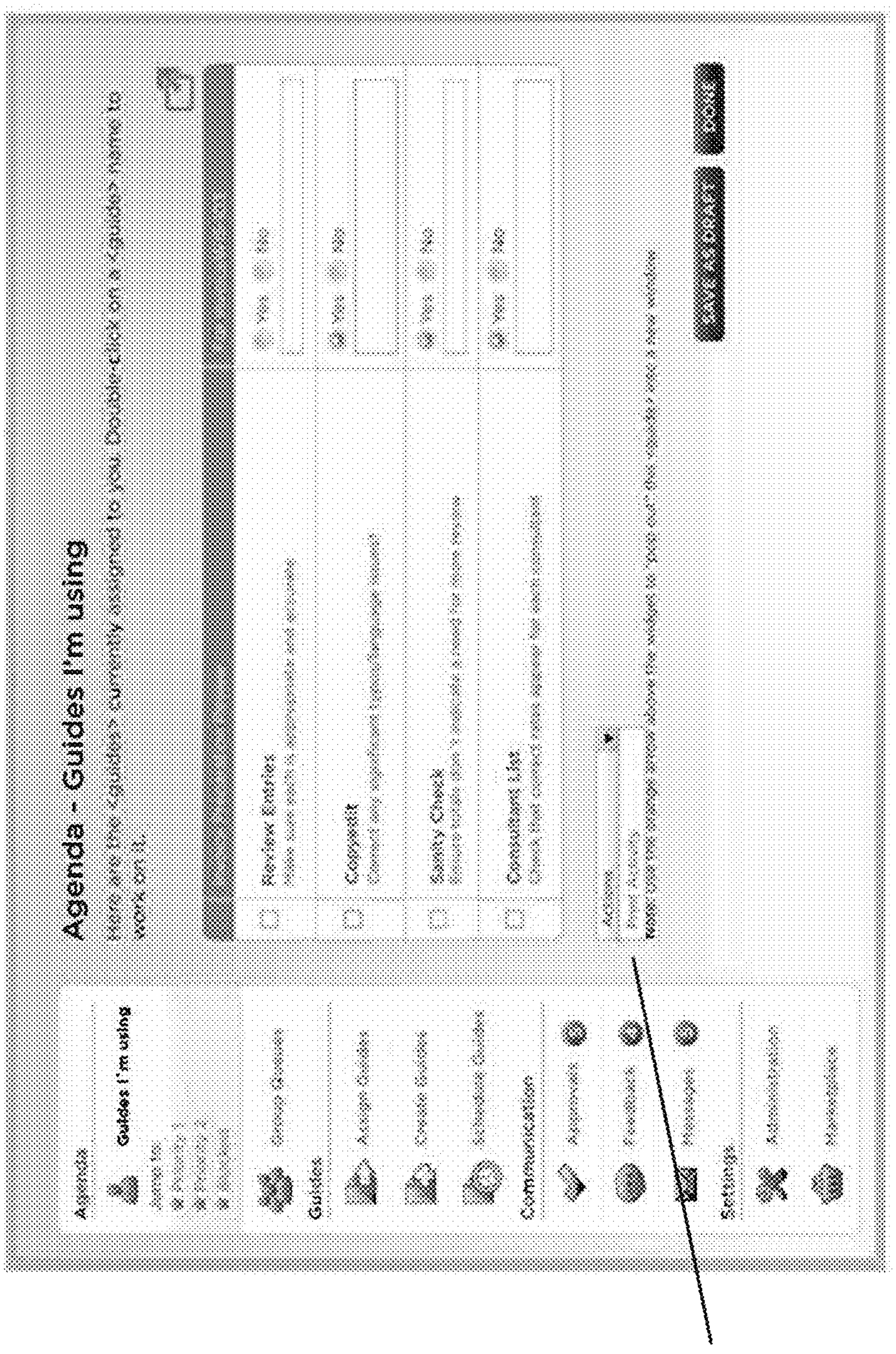
FIGS. 97, 98, 99, 100, 101, 102, 103, 104, and 105 show examples of user interfaces for printing an interactive checklist in accordance with some embodiments of the disclosed subject matter.
Figure 98:
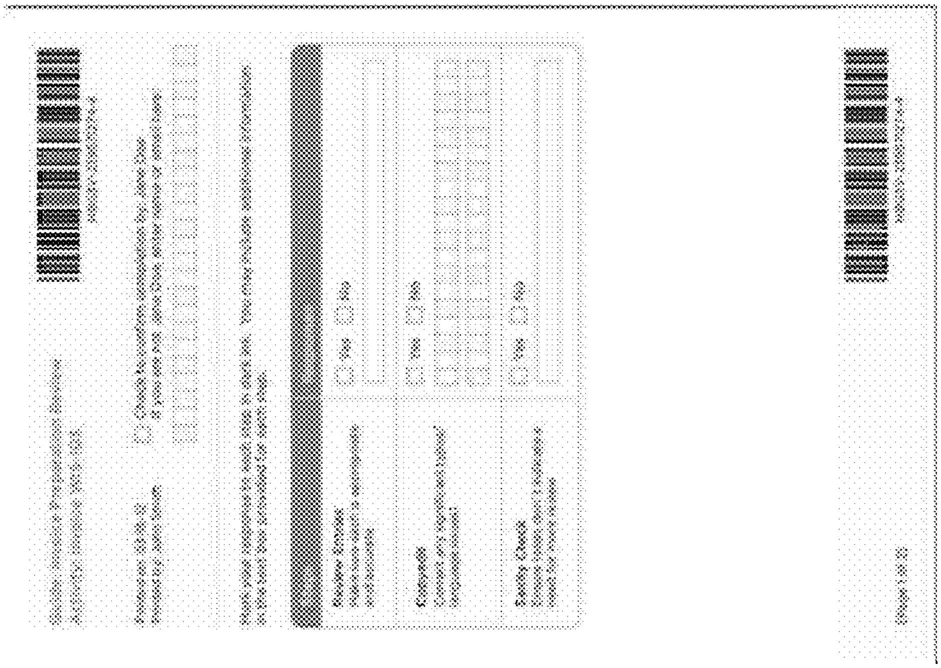
Figure 99:
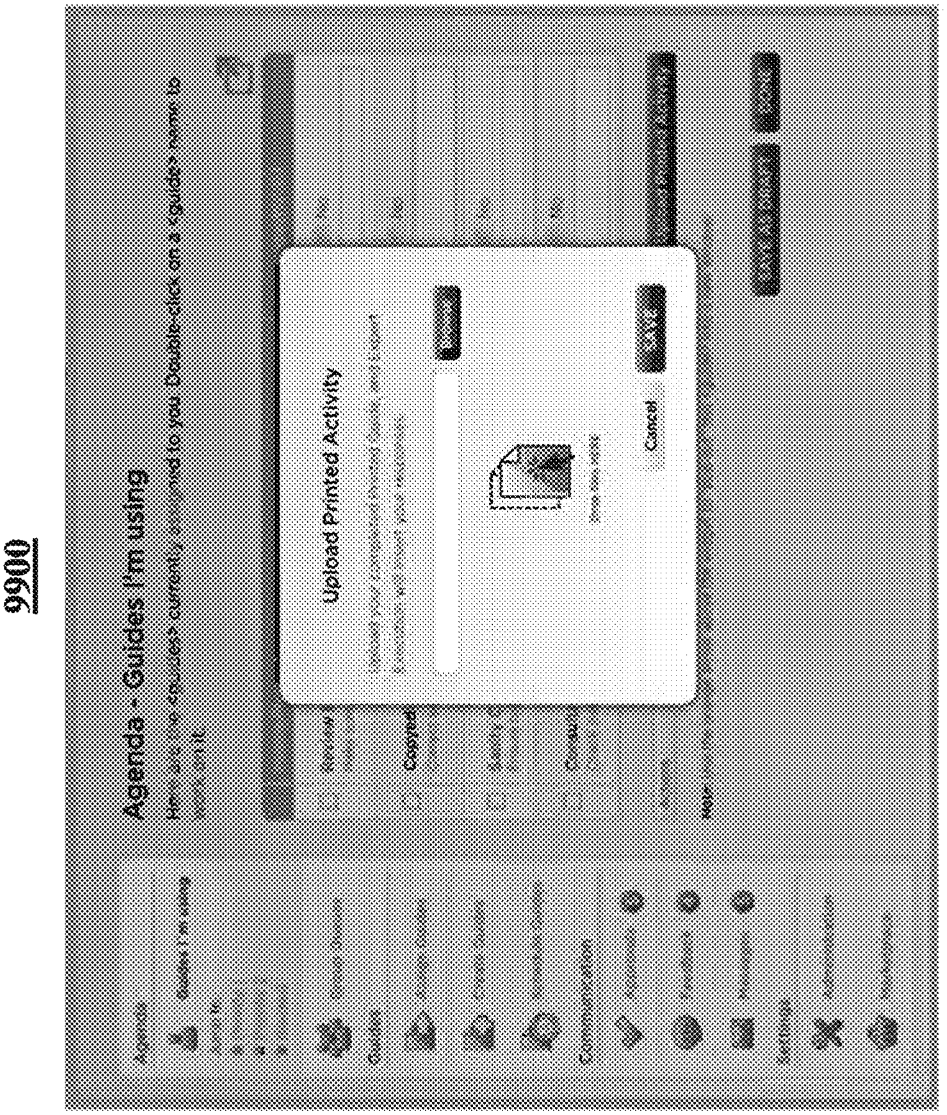

In accordance with some embodiments, when working on a particular activity, using an interface 9700 that may be presented by a hardware processor of a computing device, the hardware processor can receive a user input, via drop-down menu 9702, to print an activity as shown, for example, as shown in FIG. 97. The particular activity can be printed at any point in time. As shown, for example, in interface 9800 of FIG. 98, a printout can include activity information (e.g., activity name, interactive checklist name, print information, etc.), an identifying barcode or QR code, the interactive checklist itself (all steps and response fields), and/or any other activity information. In some embodiments, the hardware processor can display or omit to display, steps that are not currently visible based on criteria such as "When to Show" details with a visual indicator of any steps that are not initially visible. When the printout is completed, the printout can be scanned and the interactive checklist can fill in the appropriate responses in the digital copy of the activity. This upload capability, as shown, for example, in interface 9900 of FIG. 99, can be accessed from a number of points. In some embodiments, because of the unique barcodes, the user can upload multiple activities to the hardware processor at once and the interactive checklist can match up activities.

Figure 100:
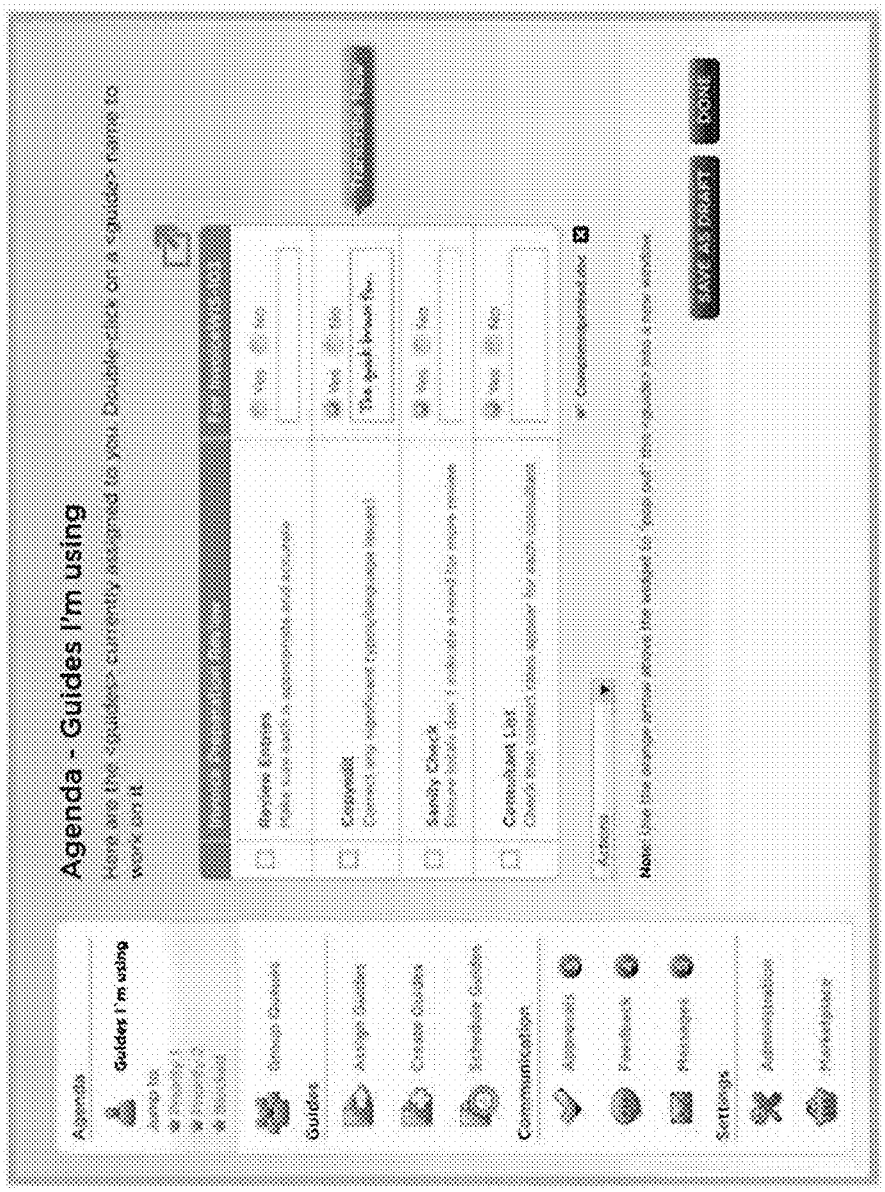
Figure 101:
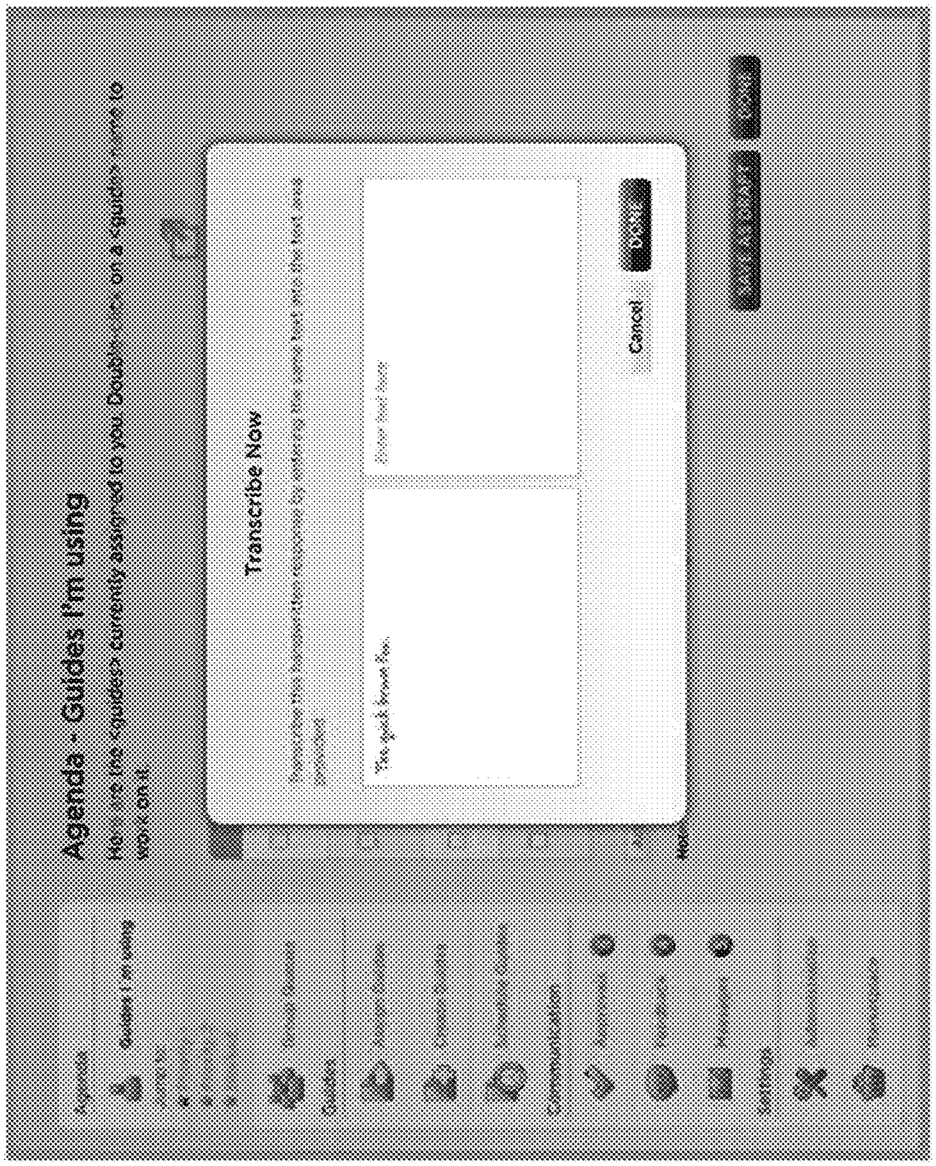

In accordance with some embodiments, an interactive checklist can complete fields in a digital copy of the activity. When possible, the hardware processor can use optical character recognition (OCR) technology to read handwritten text. If the text cannot be accurately determined, however, an image of the text can be used instead. Then, the user can transcribe it themself as shown, for example, in interface 10000 of FIG. 100, or can opt for a transcription service, a colleague, and/or group to do it instead. If the user opts to transcribe text themself, the hardware processor can receive the transcription using a simple entry box or rich text entry, as shown, for example, in interface 10100 of FIG. 101. This text can then replace the image of the text.

Figure 102:
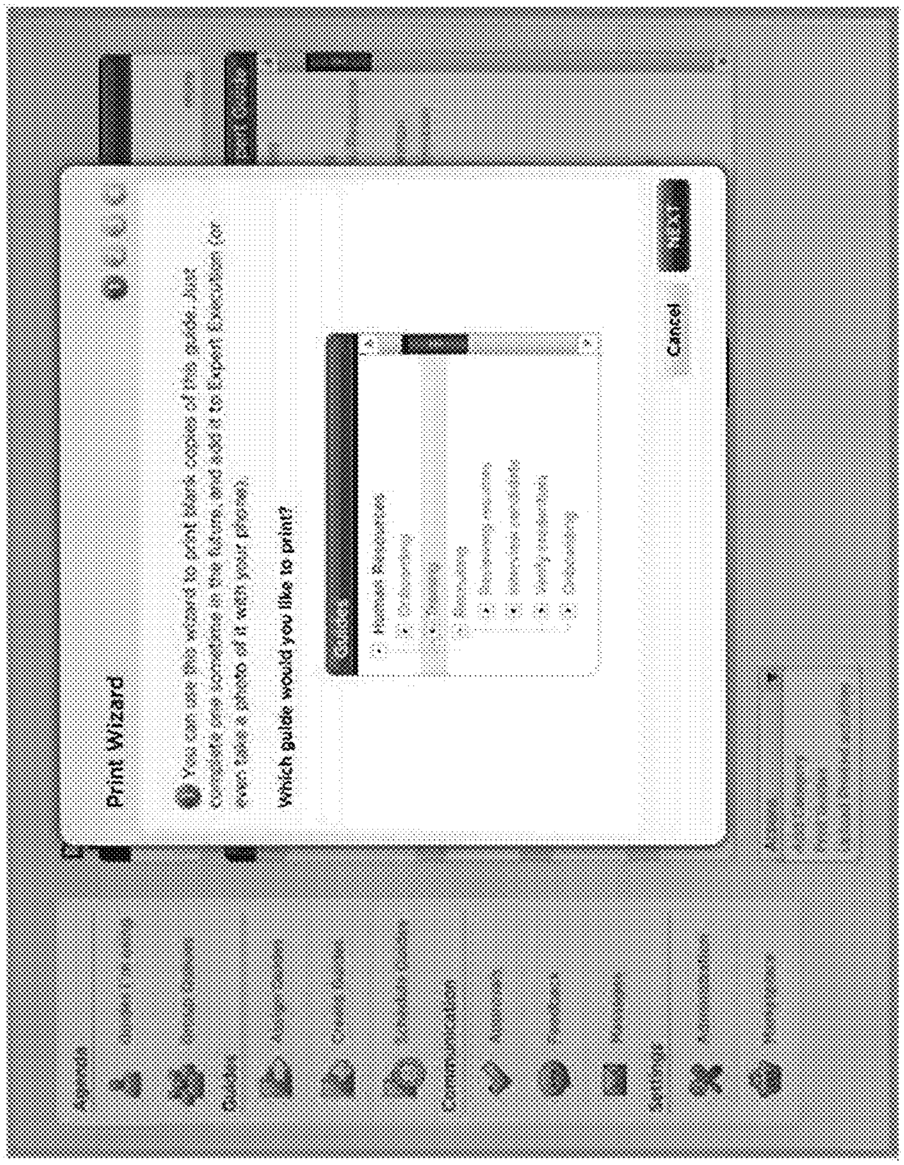
Figure 103:
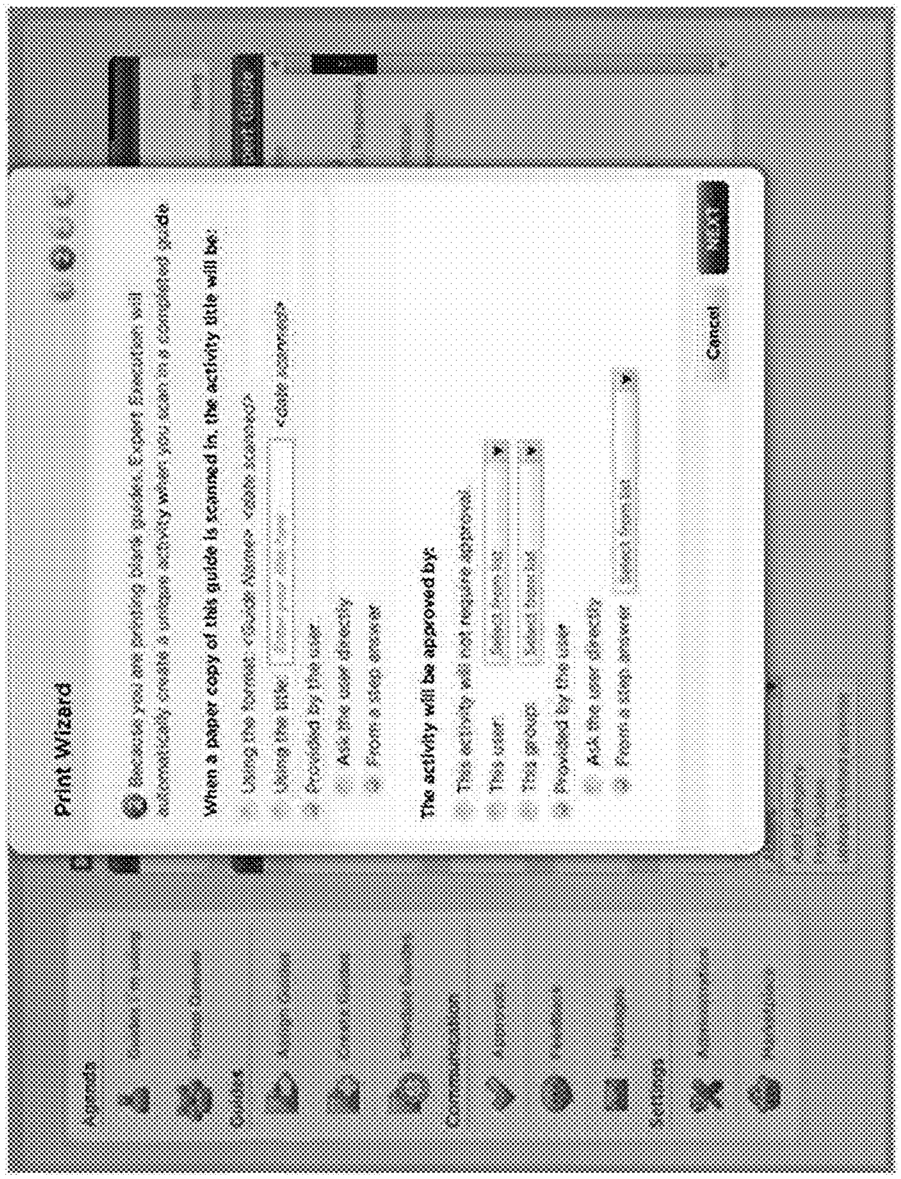
Figure 104:
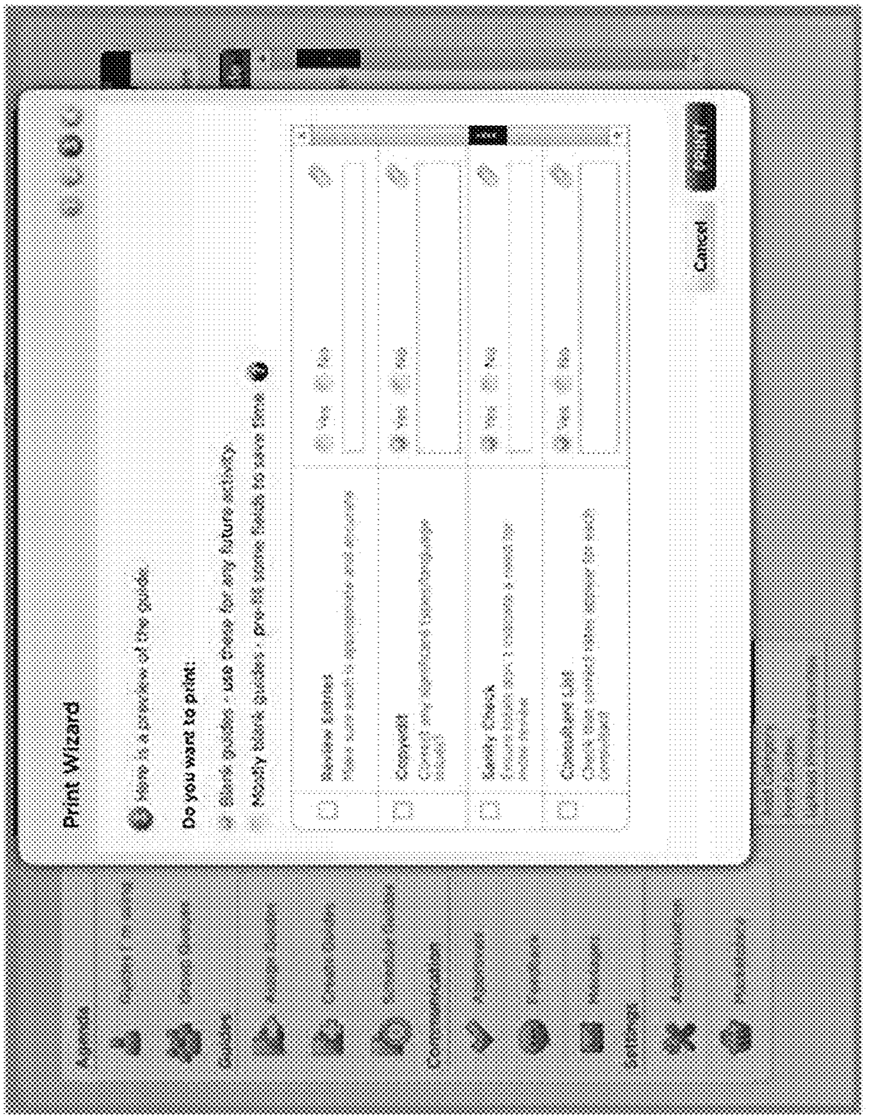
Figure 105:
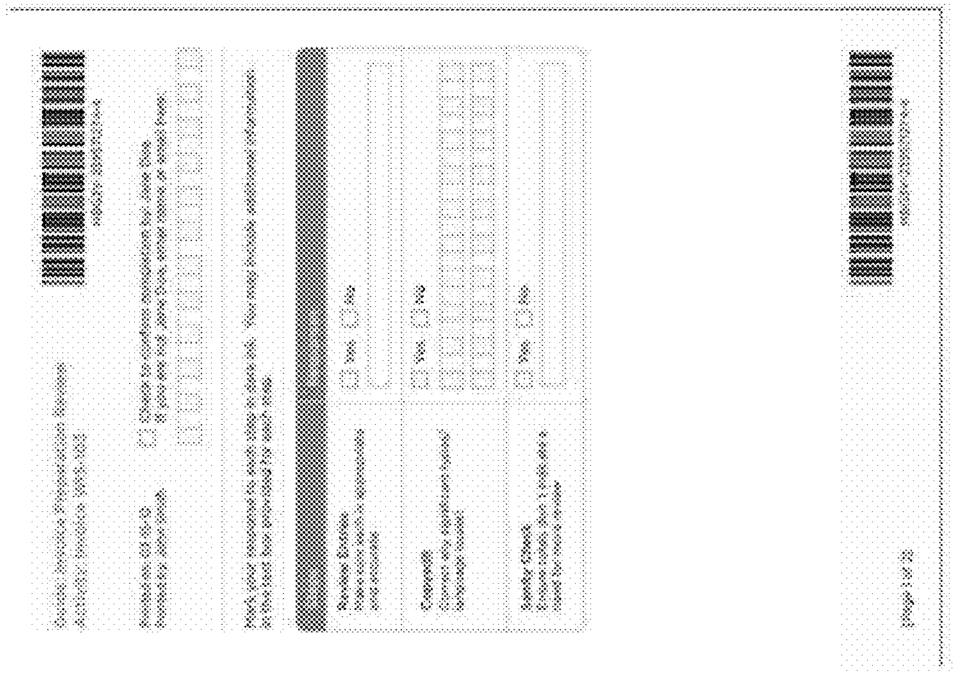

In addition to printing a specifically assigned activity, in some embodiments, blank copies of an interactive checklist can be printed. These interactive checklists can be used at a point in the future. The user can grab a blank printout, fill it out, then upload it to the interactive checklist and the interactive checklist automatically can assign and complete it as a new activity. This process can be facilitated by a print wizard displayed by a hardware processor as shown, for example, in interface 10200 of FIG. 102. The hardware processor can display a "Print Wizard" to prompt the user to complete a few information fields so that a new activity can be accurately created when a blank interactive checklist is uploaded. As shown, for example, in interface 10300 of FIG. 103, requested fields can include a way to name the activity and approval information for the activity. The user can even pre-fill some fields to save time as shown, for example, in interface 10400 of FIG. 104. Any desired number of copies of the interactive checklist can be printed as shown, for example, in interface 10500 of FIG. 105. The hardware processor can present varying information fields at the top of the page, before the steps of the interactive checklist, depending on the print selections the user made in the print wizard and received by the hardware processor. For example, if the user fills out a "weekly progress report" interactive checklist for an in-jeopardy Acme Widgets project every week for the next quarter, the user can pre-fill the Client field to specify "Acme Inc.," a Project field to say "Widgets Project," and a "Is this a high-risk project" field to indicate "Yes".

Figure 122:
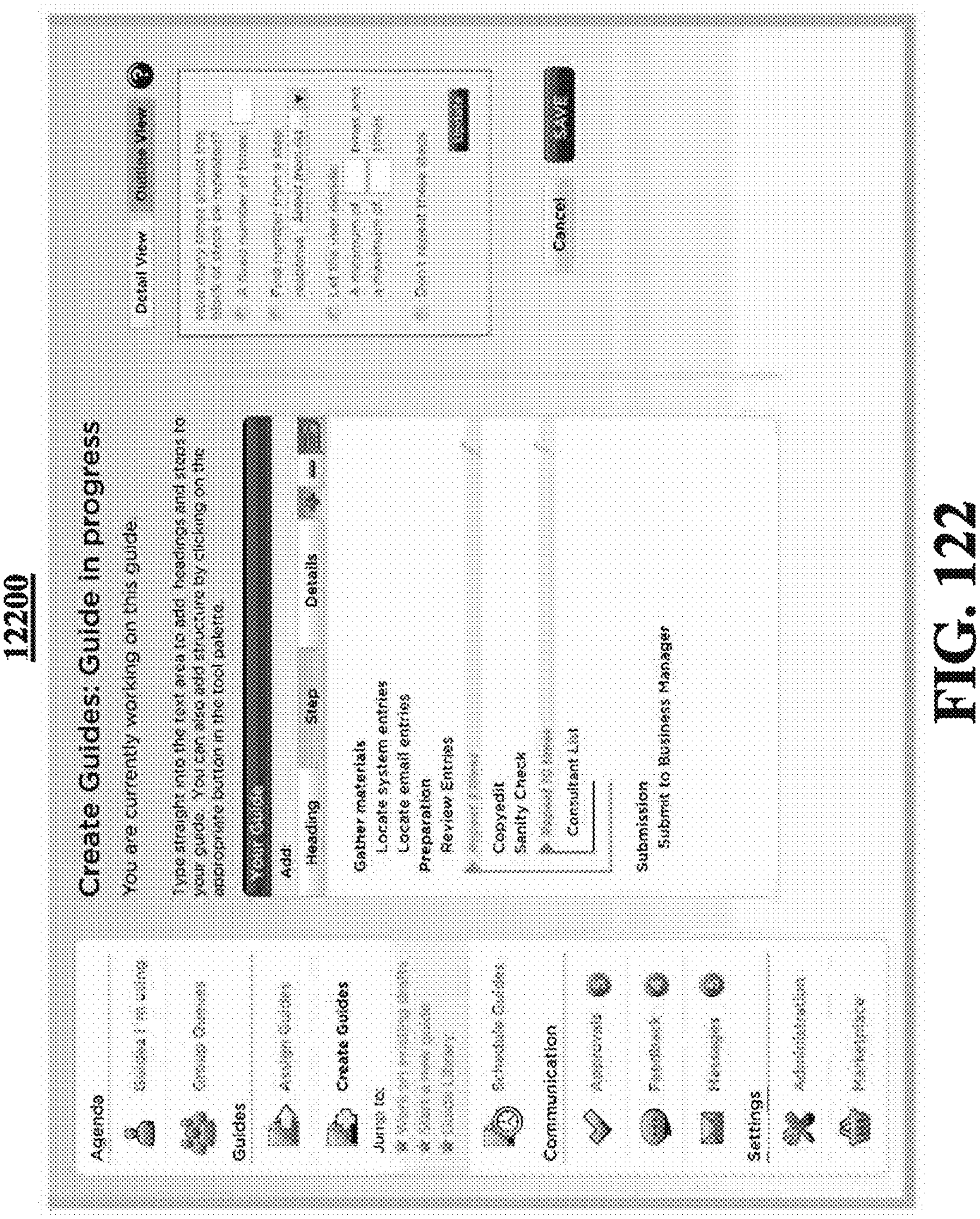
FIGS. 122, 123, and 124 show examples of user interfaces for repeating steps in accordance with some embodiments of the disclosed subject matter.
Figure 123:
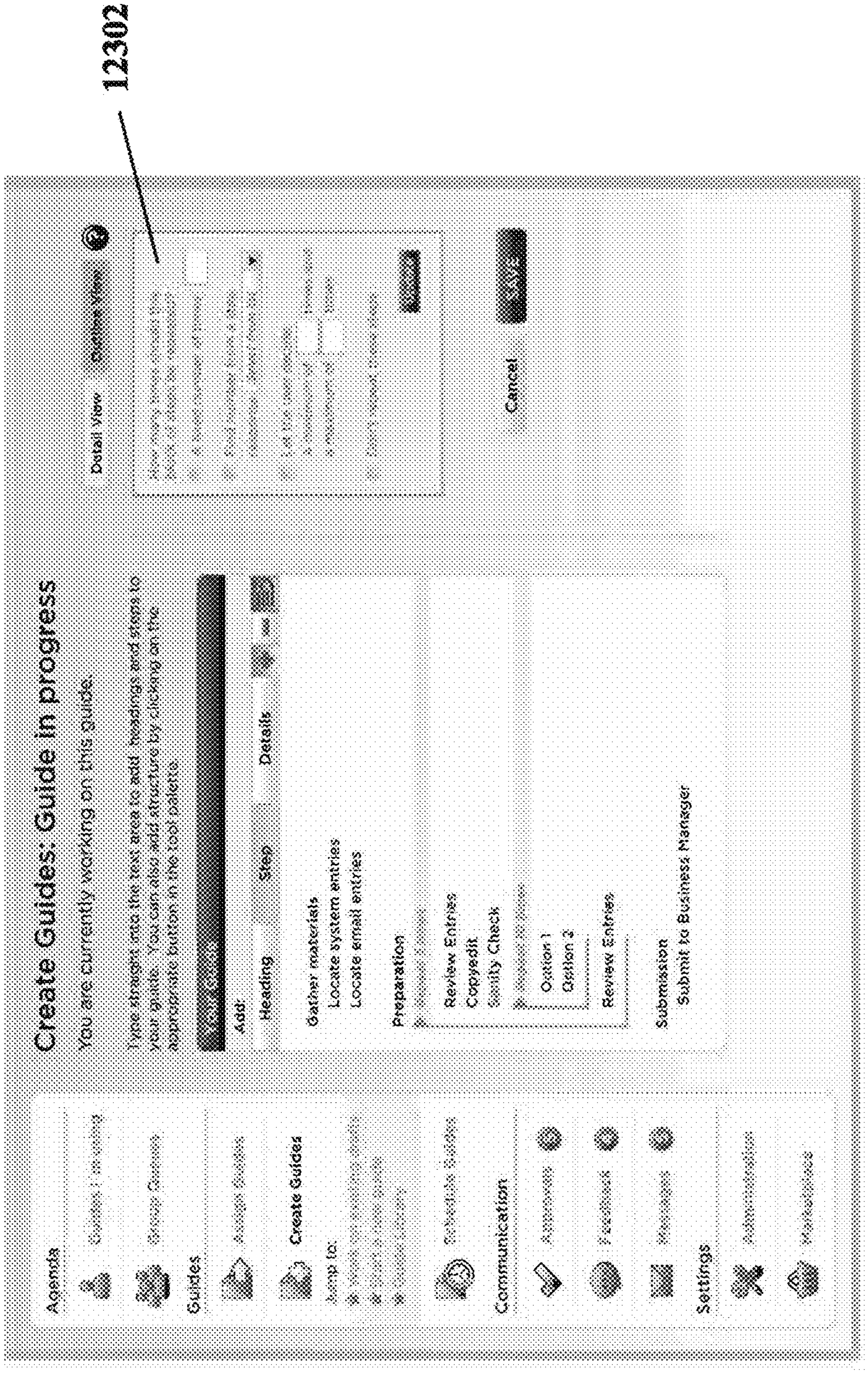
Figure 124:
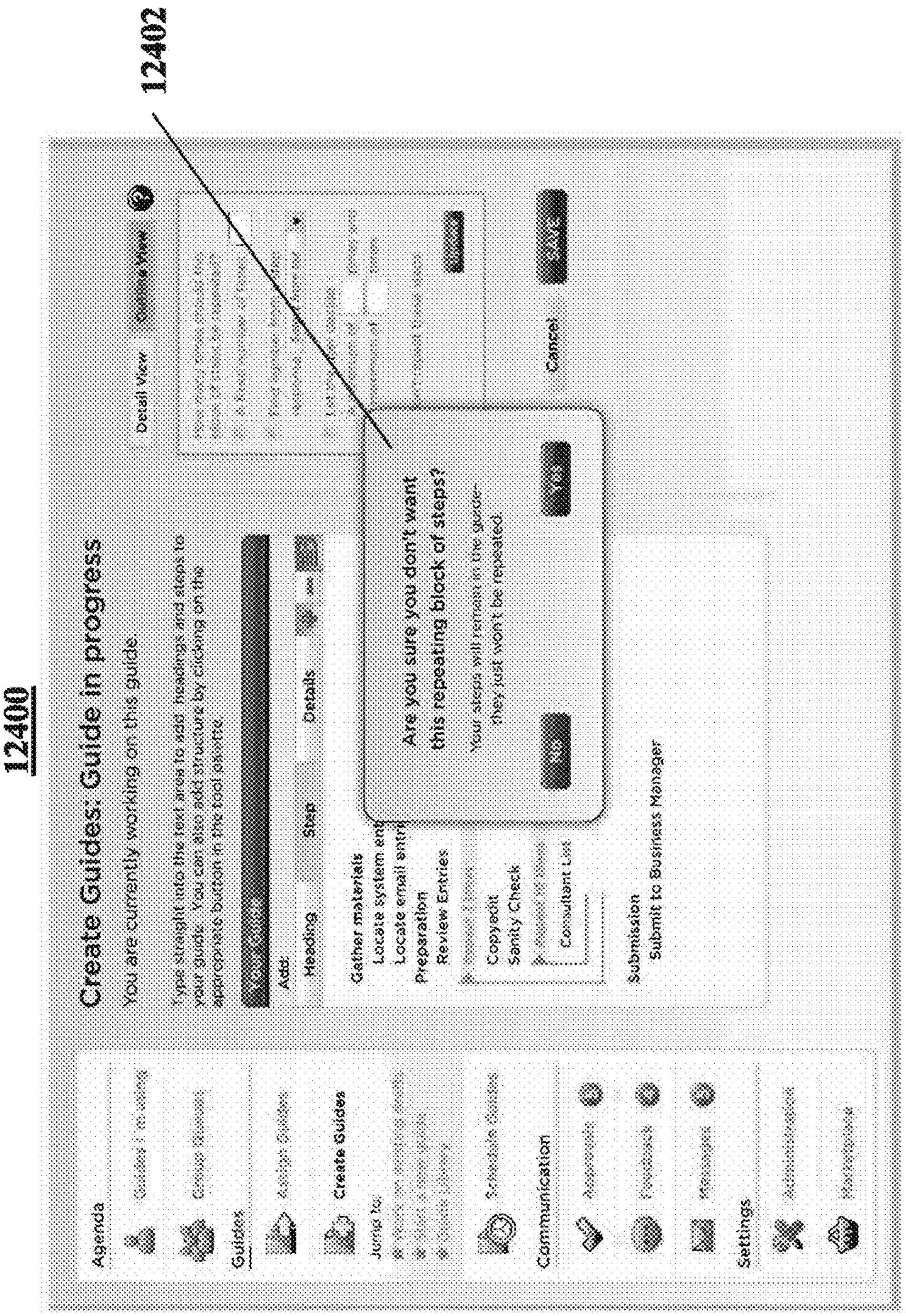
Figure 224:
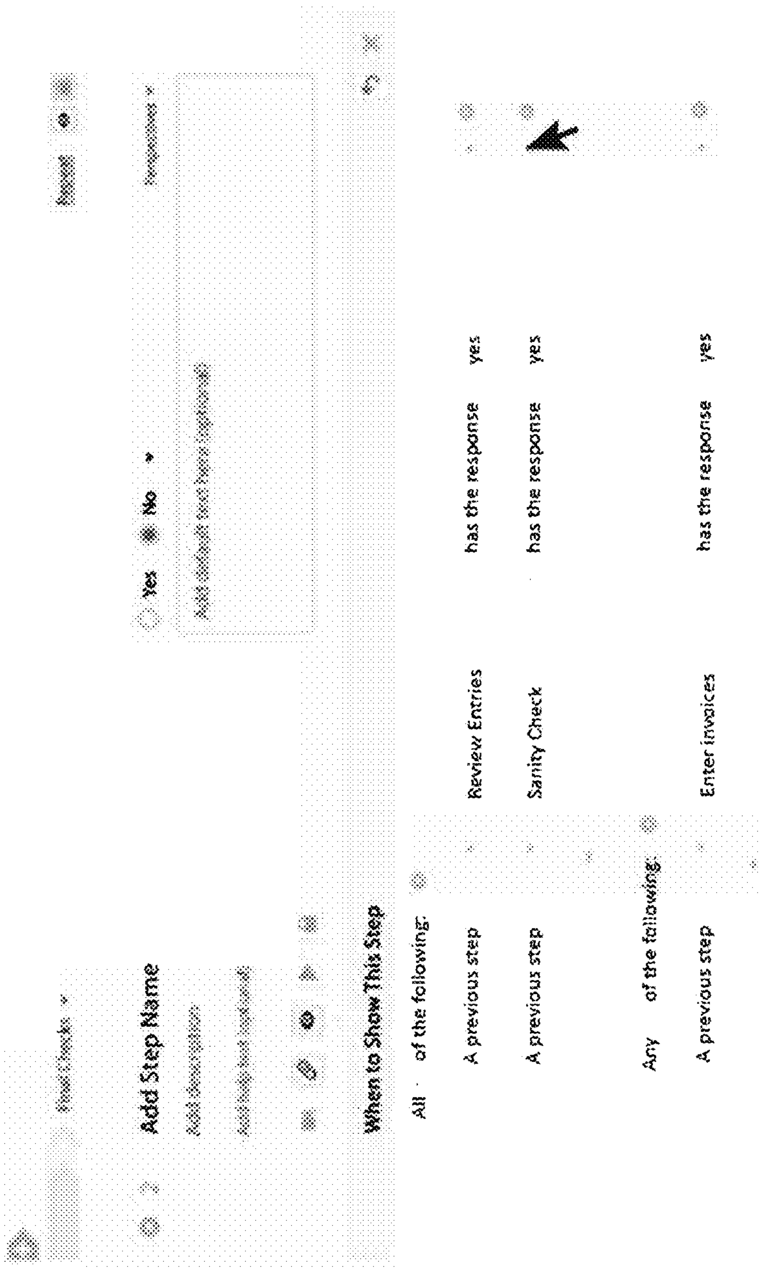
FIG. 224 shows an example of a user interface for configuring nested conditions for presenting a step in a Guide in accordance with some embodiments of the disclosed subject matter.
Figure 229:
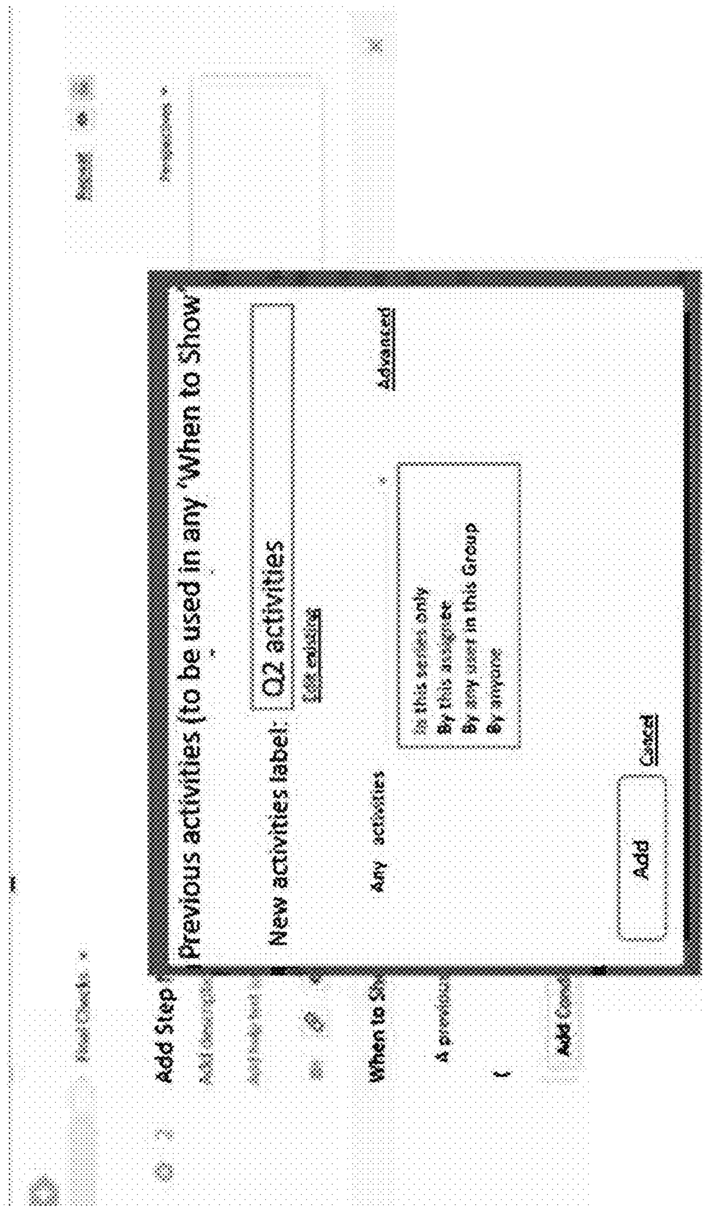
FIGS. 229 and 230 show examples of user interfaces for configuring conditions for presenting a step in an activity in accordance with some embodiments of the disclosed subject matter.
Figure 230:
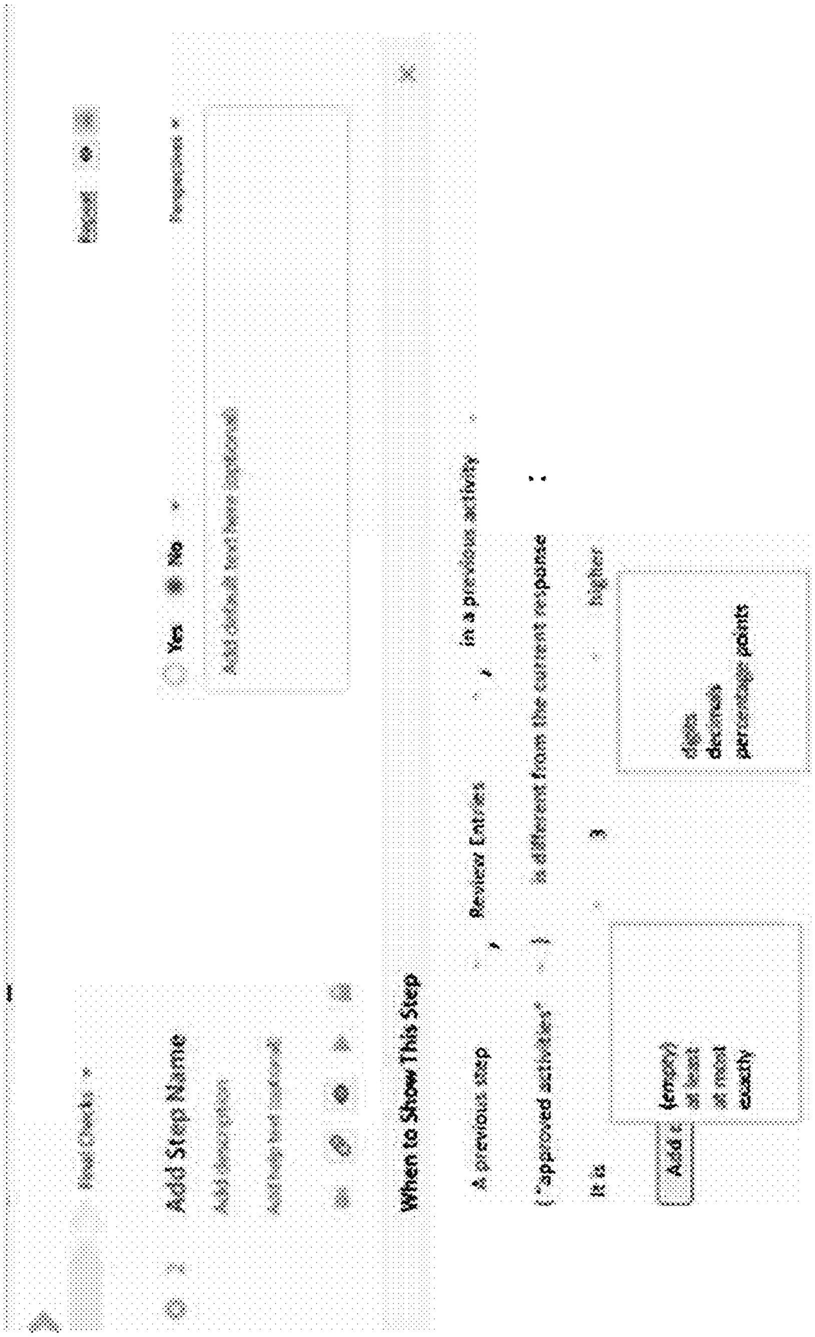

In accordance with some embodiments, a user may want another user to repeat a particular step or block of steps a number of times. The hardware processor can receive a user input indicating that the user may want another user to repeat a particular step or block of steps a number of times. Upon receiving such an indication, the hardware processor can display a "Repeat Steps" feature shown, for example, in interface 12200 of FIG. 122. When the user chooses this feature, the hardware processor can display the steps in the interactive checklist and the hardware processor can receive a user input to select the step(s) that should be repeated. Additionally, the hardware processor can receive a user input indicating how many times the steps are to be repeated as shown, for example, in block 12302 of interface 12300 of FIG. 123. This can be indicated in a number of ways, such as a fixed number, or indicated by the answer to a previous step, for example. In some embodiments, the hardware processor can display a popup window 12402 in interface 12400 of FIG. 124 to allow the user to change how the number of repeats is determined or to not to have these steps repeat at all. The user can also have multiple blocks of nested repeating steps in the same interactive checklist in some embodiments. In accordance with some embodiments, a user can assign "When to Show" conditions and/or Protections to a block of steps. Note that, in some embodiments, any suitable number of "When to Show" conditions can be included. Additionally, in some embodiments, any suitable groups of criteria can be attached to groups of conditions. For example, as shown in FIG. 224, a step can be configured to be shown when every step in a first group of steps is completed and/or is associated with a particular answer and when at least one step in a second group of steps is completed and/or is associated with a particular answer. Furthermore, in some embodiments, steps from any suitable number (e.g., one, two, five, ten, and/or any other suitable number) of activities can be included when creating "When to Show" conditions. For example, as shown in FIG. 229, multiple activities can be identified based on any suitable parameters or combination of parameters, such as by users assigned to complete the activities, by due date, by users in a particular group, by activities grouped together in any suitable manner (e.g., based on a series of activities, based on a Guide, and/or in any other suitable manner), by date of completion, by current approval status (e.g., in review, in a queue for review, and/or any other suitable status), and/or any other suitable parameters. Additionally, as shown in FIG. 230, a "When to Show" condition can be configured based on a comparison of responses to different steps (e.g., a numerical comparison, determining whether two responses are the same, and/or in any other suitable manner). Configuration of "When to Show" conditions can therefore allow an activity to be treated as a database, where steps of the activity can be dynamically generated based on criteria associated with other activities.

Figure 125:
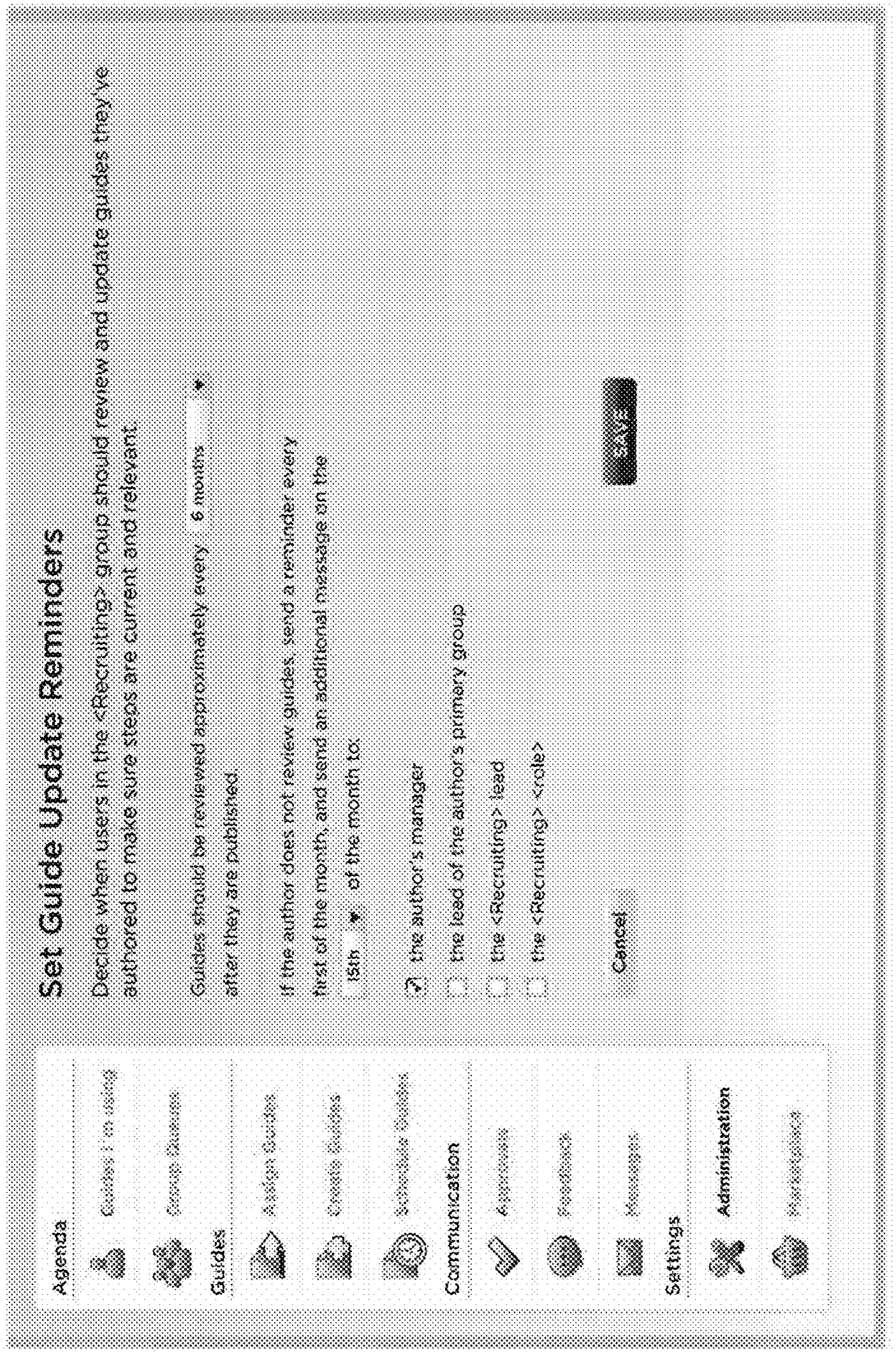
FIG. 125 shows an example of a user interface for presenting an update reminder in accordance with some embodiments of the disclosed subject matter.

In accordance with some embodiments, a hardware processor of a computing device can receive a reminder schedule to alert a user when a particular interactive checklist may require review. This feature can allow a user to automatically receive alerts notifying them self that it is time to review the interactive checklist and potentially update it so that it remains relevant and useful. Updates can be configured at multiple levels, such as across the organization, or for specific groups. An example of an interface with these features can be as shown, for example, in interface 12500 of FIG. 125.

Figure 126:
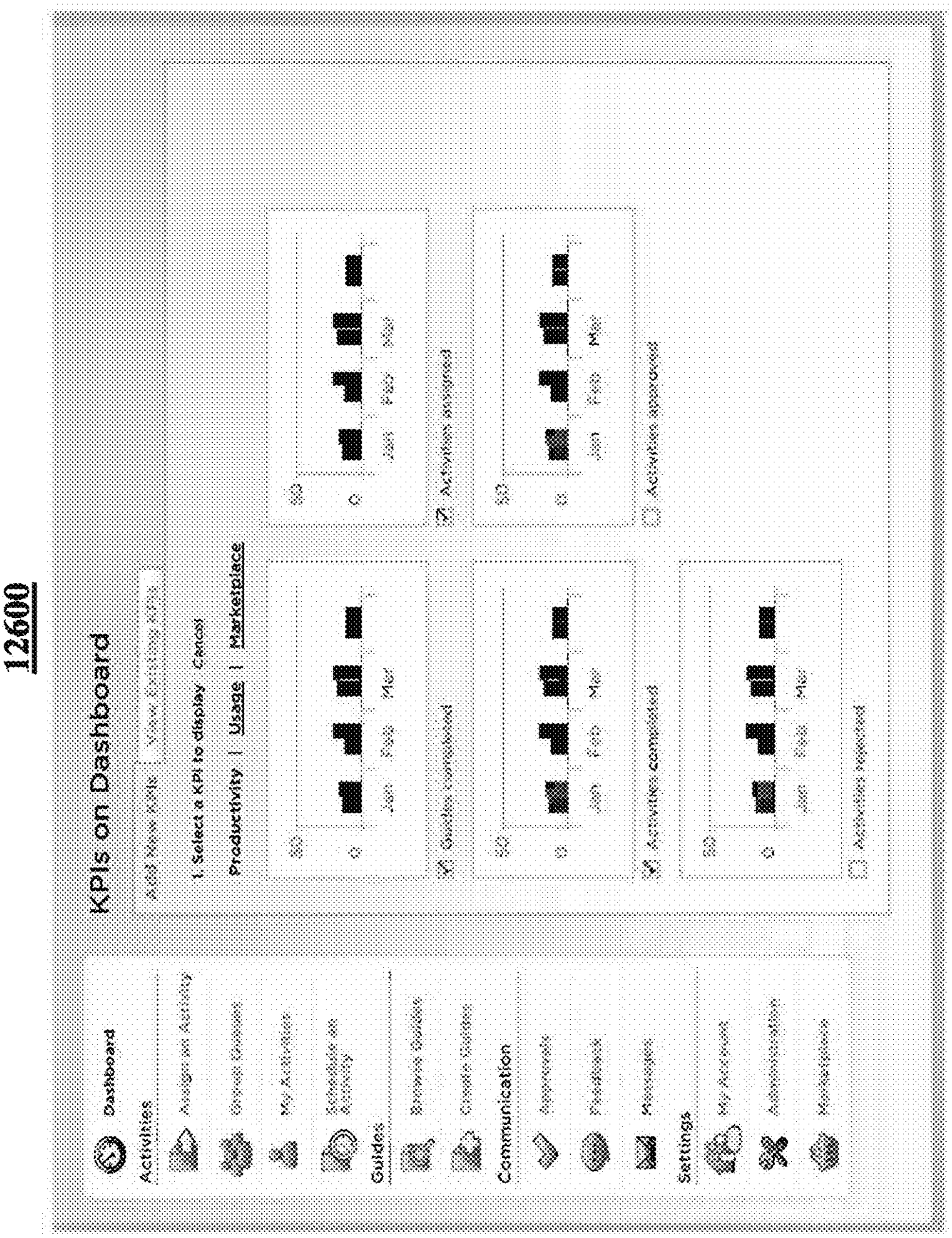
FIGS. 126, 127, 128, 129, and 130 show examples of user interfaces for configuring key performance indicators in accordance with some embodiments of the disclosed subject matter.

In accordance with some embodiments, as shown, for example, in FIG. 126, using an interface 12600 that may be presented by a hardware processor of a computing device, the hardware processor can present dashboard widgets to allow the user to configure key performance indicators (KPIs) and other metrics for display on a dashboard and the dashboards of other users. A user can also configure alert levels to correspond with the changes in these metrics. Alert levels can be set for different circumstances (e.g., for the user, for groups, for an organization, and/or any other circumstance) to trigger a variety of interactive checklist actions. Individual interactive checklist reports can be turned into KPI displays with one click or the user can customize a KPI display. Flow to add a new KPI to the dashboard can begin with selection of a pre-configured KPI provided by the interactive checklist in some embodiments.

Figure 127:
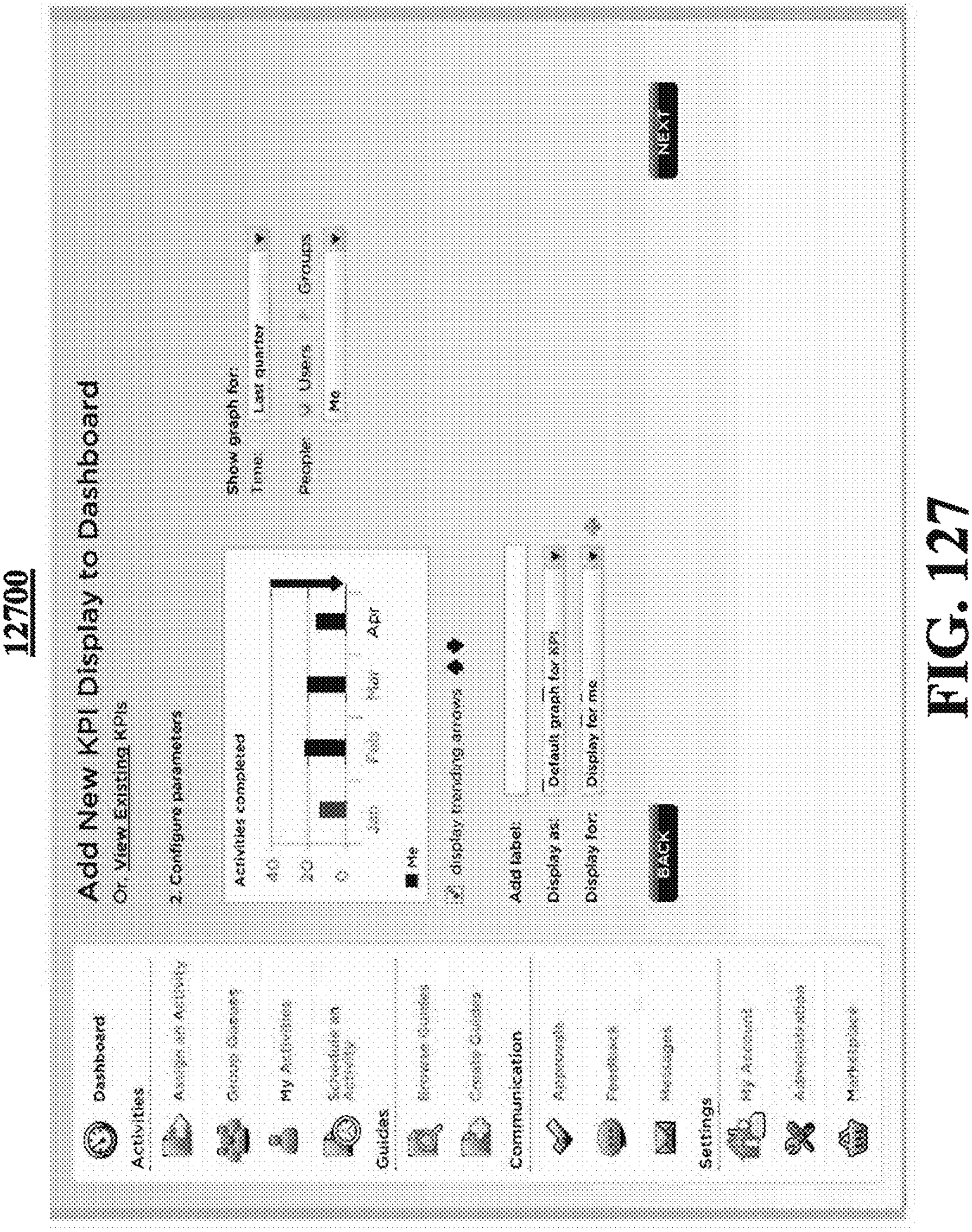
Figure 128:
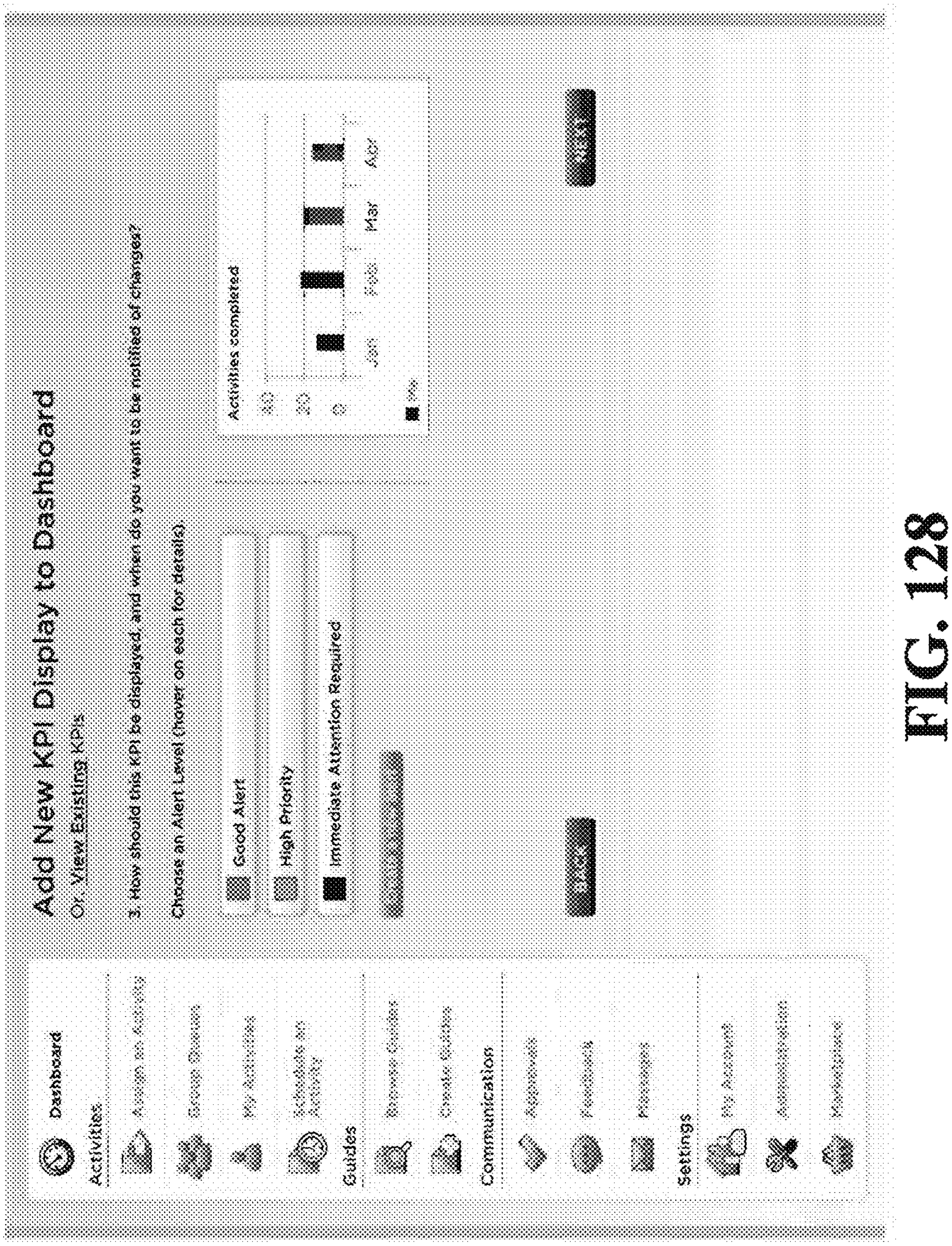

In some embodiments, using an interface 12700 that may be presented by a hardware processor of a computing device, the hardware processor can receive a user input to configure a variety of parameters to customize the KPI to their needs as shown, for example, in FIG. 127 in accordance with some embodiments of the invention. Custom options can include, but are not limited to, the ability to specify a period of time, particular user(s) and/or groups, what type of visual display to utilize, and/or for which users or groups the KPI can appear. The user can decide what alert or alerts should be associated with the KPI display. The hardware processor can receive a variety of alert levels previously created by the organization, a group, and/or themselves. Examples of different alert level options can be as shown, for example, in interface 12800 of FIG. 128.

Figure 129:
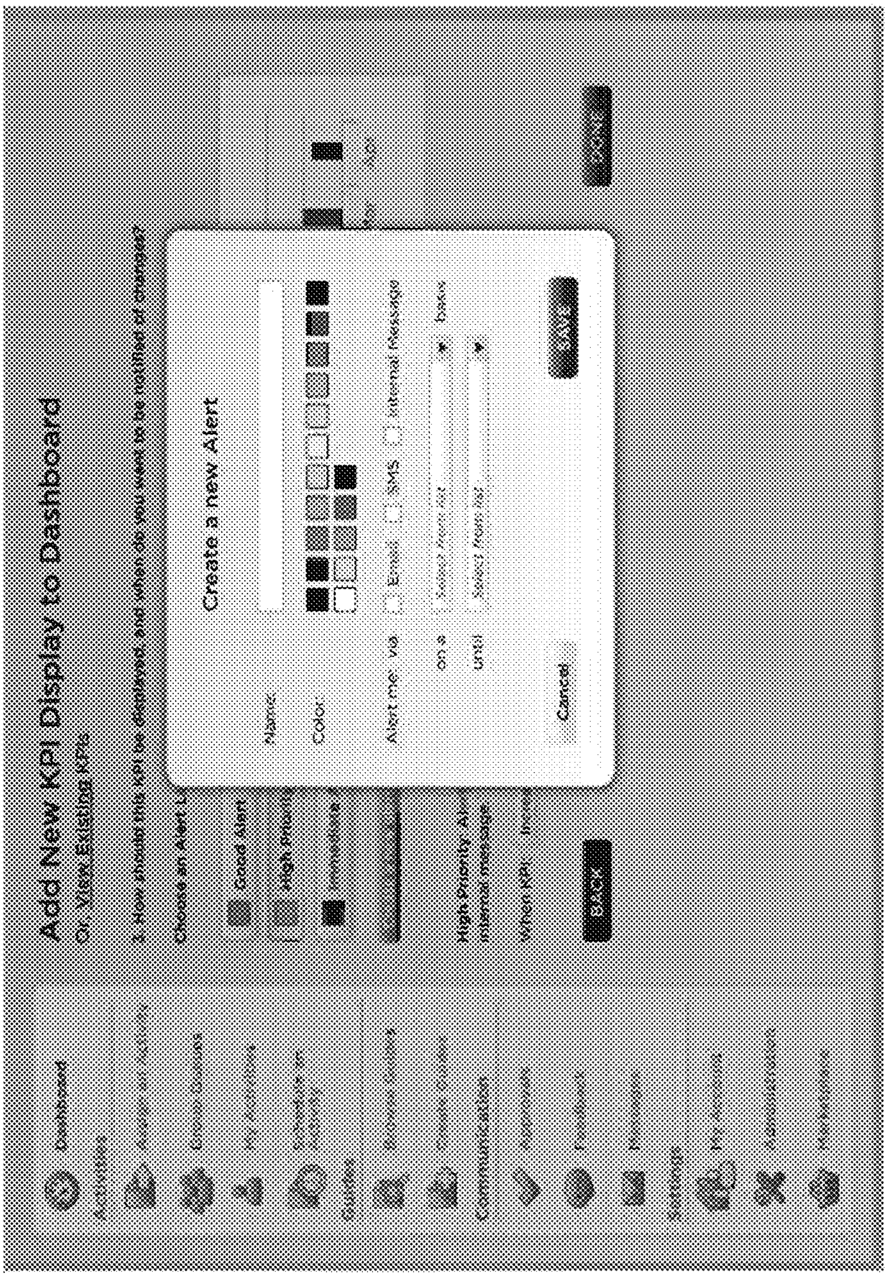
Figure 130:
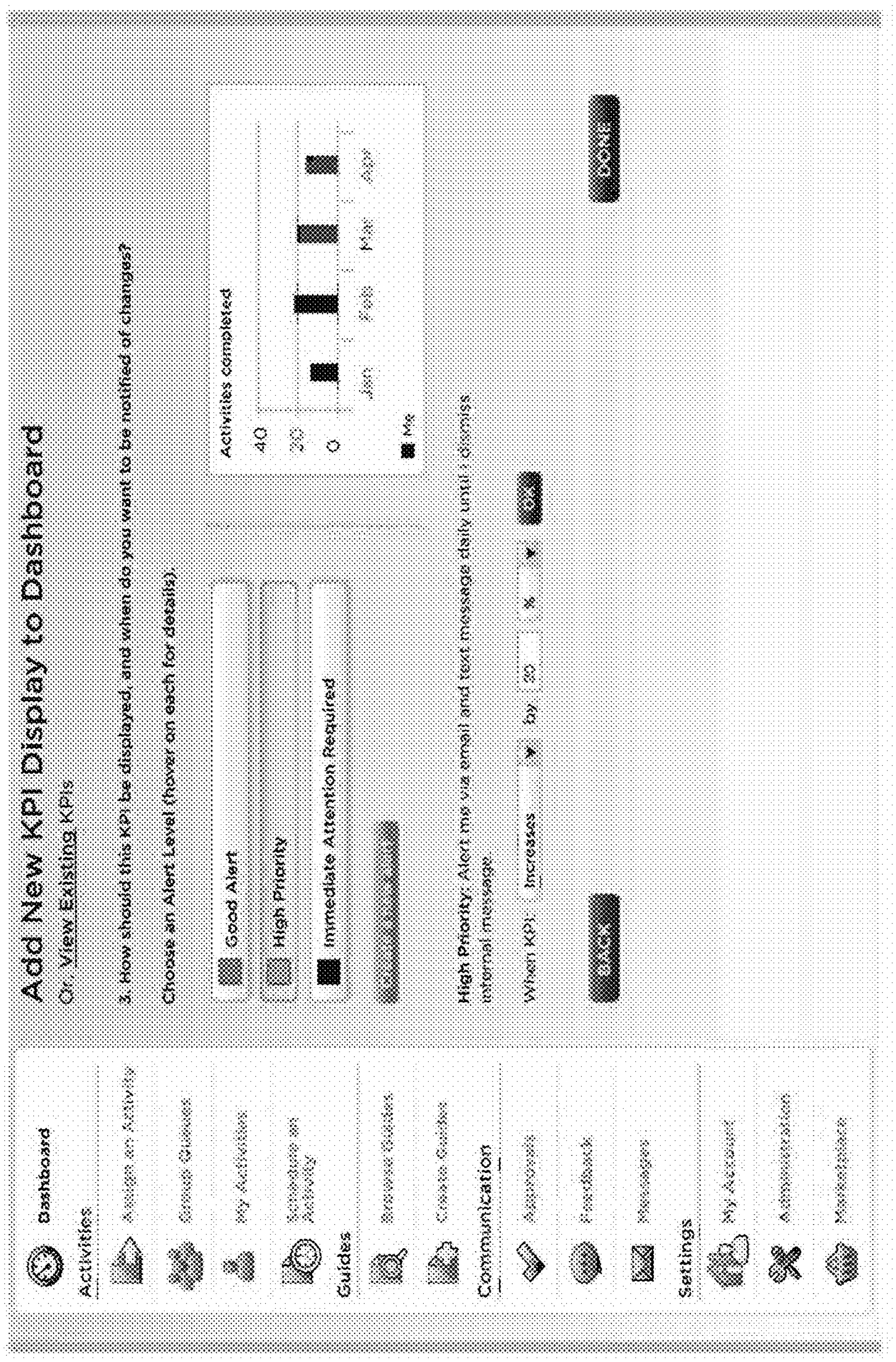

Alternatively, in accordance with some embodiments, the hardware processor can receive a user input to configure a new alert, which can then be used for a given KPI. Alerts can include a common set of features, such as the method(s) and frequency of contact with the user as shown, for example, in interface 12900 of FIG. 129. Once the hardware processor receives an alert level selection, the hardware processor can receive a user input to configure a trigger that can cause the alert to go into effect as shown, for example, in interface 13000 in FIG. 130.

Figure 131:
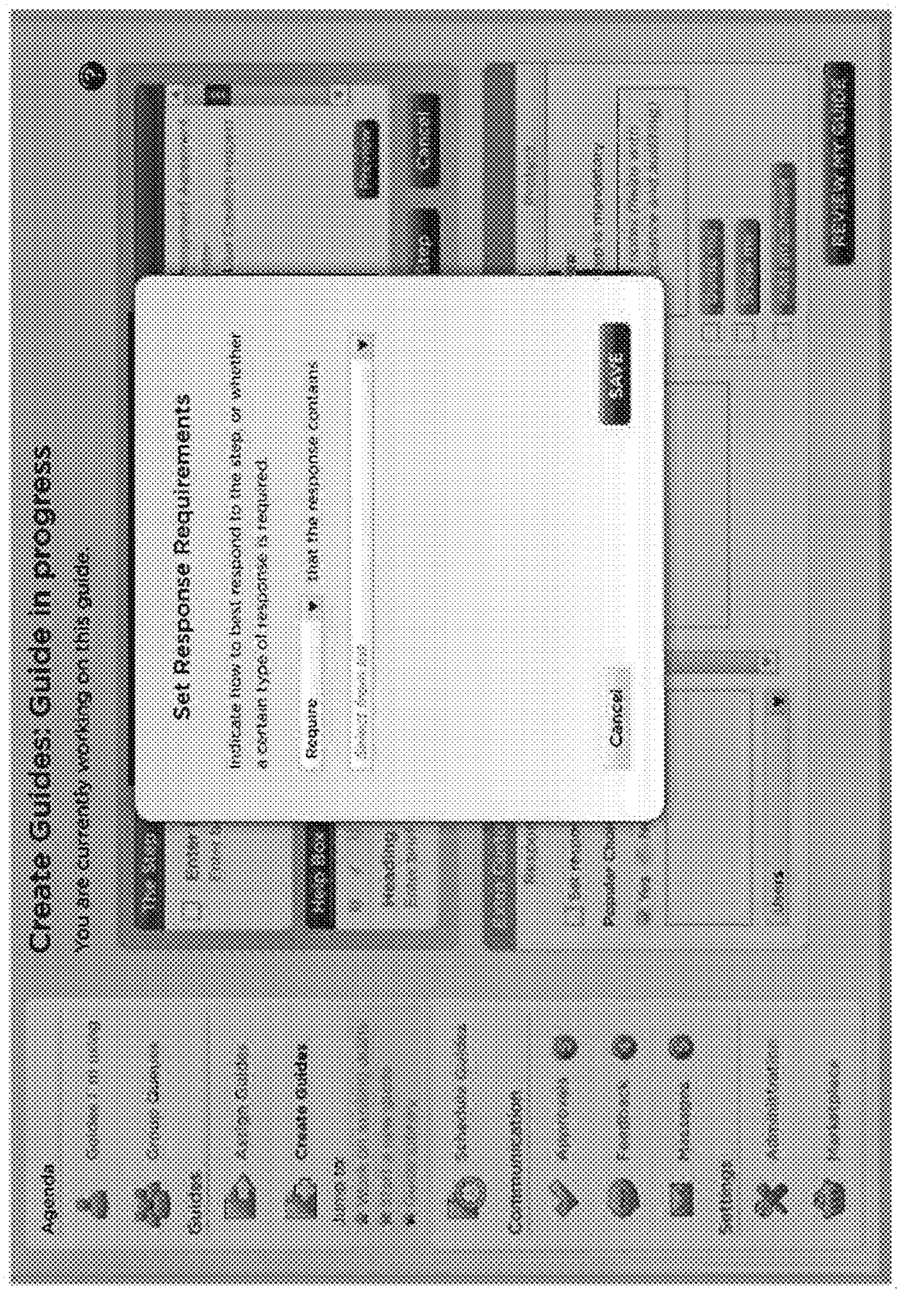
FIGS. 131 and 132 show examples of user interfaces for configuring a response requirement in accordance with some embodiments of the disclosed subject matter.
Figure 132:
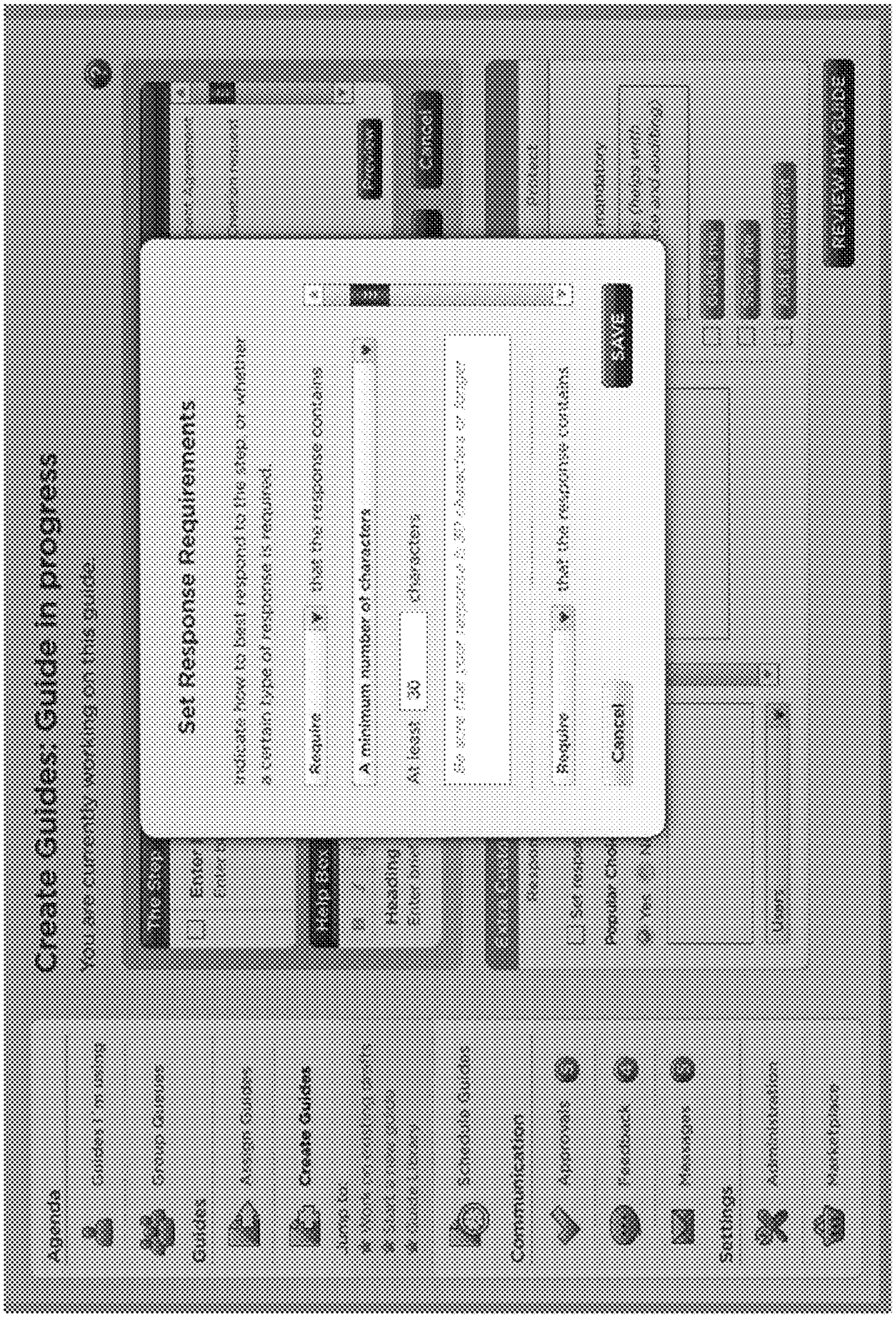

In accordance with some embodiments, as shown, for example, in interface 13100 of FIG. 131, the hardware processor can receive a user input to specify if a certain type of response is required for a step, such as having to include a valid email address or phone number, be of a certain length, and/or any other type of response. Once the hardware processor receives a requirement, the hardware processor can receive a user input to add explanatory details as shown, for example, in interface 13200 of FIG. 132. When the interactive checklist is later used, an assignee can view the explanation, and can receive warning if their responses do not validate against the user's stated requirements for the step.

In some embodiments, using interfaces 10602-12104 that may be presented by a hardware processor of a mobile device, the hardware processor can execute a mobile application. A mobile application (app) can service existing users and can optionally be free to users of the interactive checklist mechanisms in accordance with some embodiments of the invention. The mobile app can be available for a variety of mobile and tablet platforms. In some embodiments, the mobile application can cache certain data. In such an instance, the mobile application can be available for offline use and upon reconnecting to the Internet any updates can be synced. Turning back to FIG. 106A, the hardware processor can receive login information from a user. Upon receiving the login information, the hardware processor can present a dashboard, where the user can view messages, approval notifications, their personal list of activities, and/or a list of activities for their groups as shown, for example, in interface 10602 of FIG. 106A. Primary navigation can be received by the hardware processor through four icons (or any other suitable number) at the bottom of a screen noted as 10604 in interface 10602 of FIG. 106B. For example, the icons can be a star (symbolizing, for example, the Dashboard), a plus sign (which can allow for addition of something new, to create a User Guide, assign an Activity, or schedule an Activity for example), a camera, (which can take or choose photos and video for example), and an ellipses (which include other functions, such as settings and help for example). Pop-up window 1604 of interface 10606 of FIG. 106B shows examples of functions available via the plus sign.

Figure 106A:
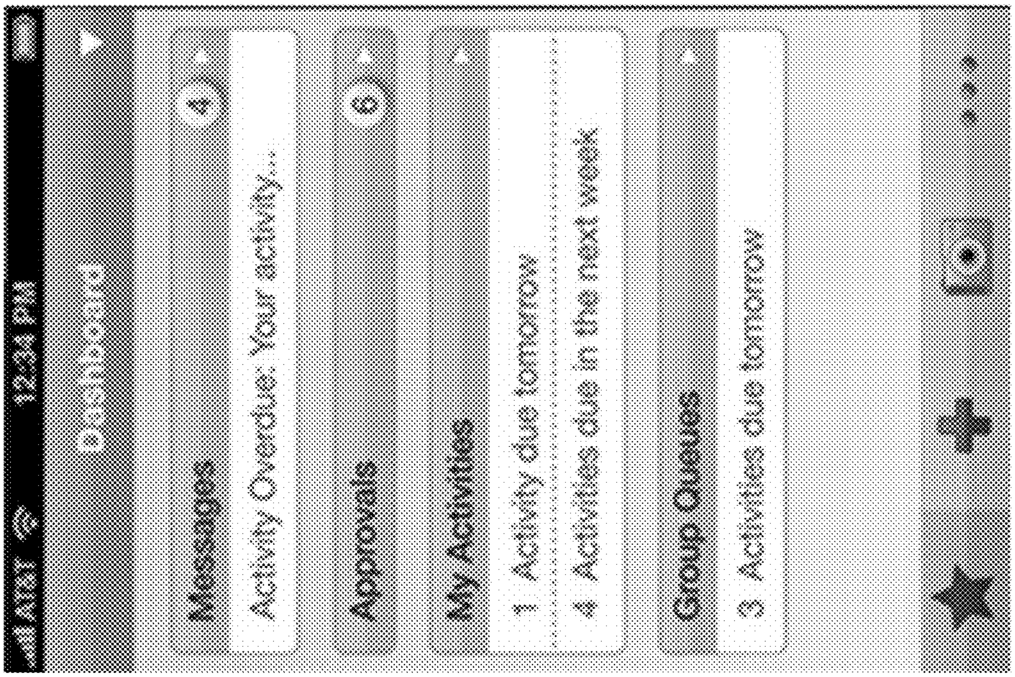
FIGS. 106A and 106B show examples of user interfaces displayed on a mobile device for presenting a dashboard in accordance with some embodiments of the disclosed subject matter.
Figure 106B:
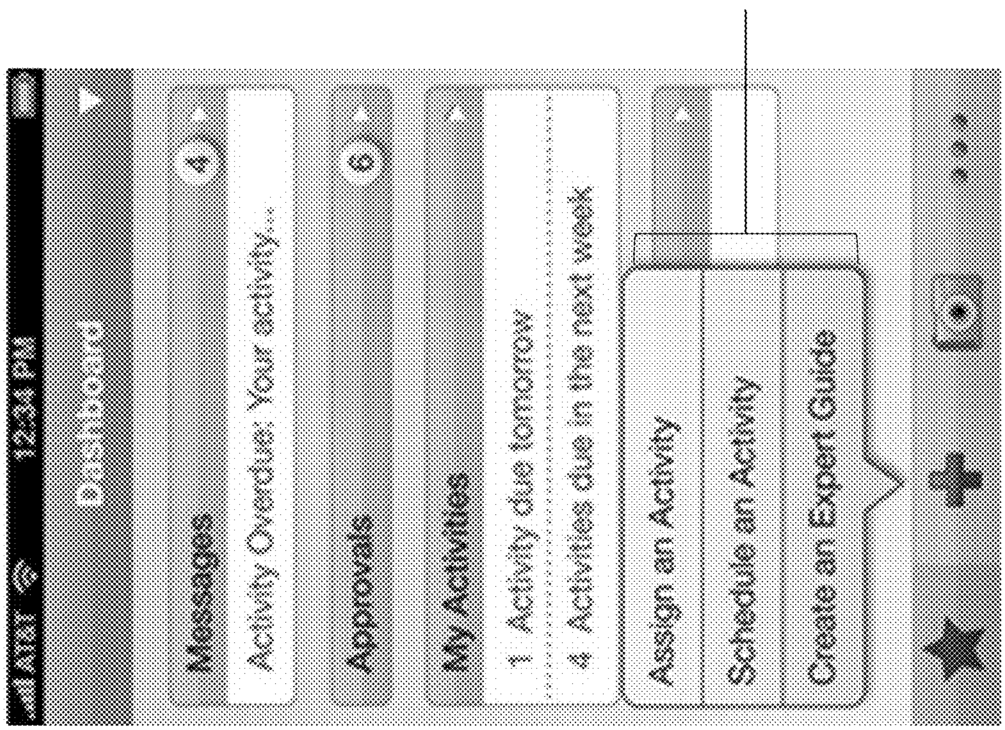

Also, shown, for example, in interfaces 10602 and 10604 of FIG. 106A and FIG. 106B, in some embodiments, the hardware processor can display recent activities by receiving a user input at a quick tool in the upper-right corner of the screen (in the header for example). Header text can help the user orient themselves. A back button can also be available in the upper left corner (in the header).

Figure 107A:
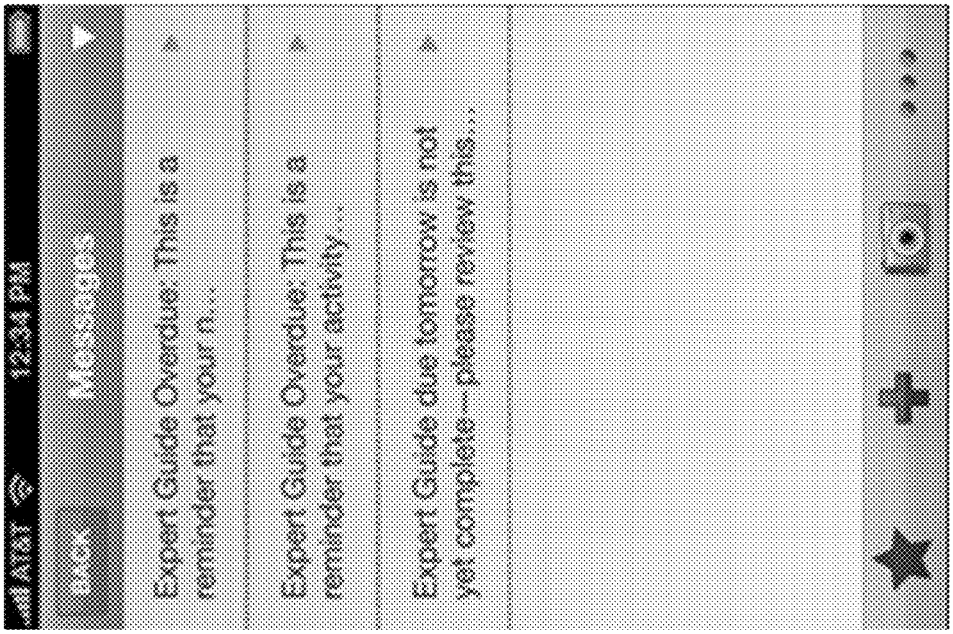
Figure 107B:
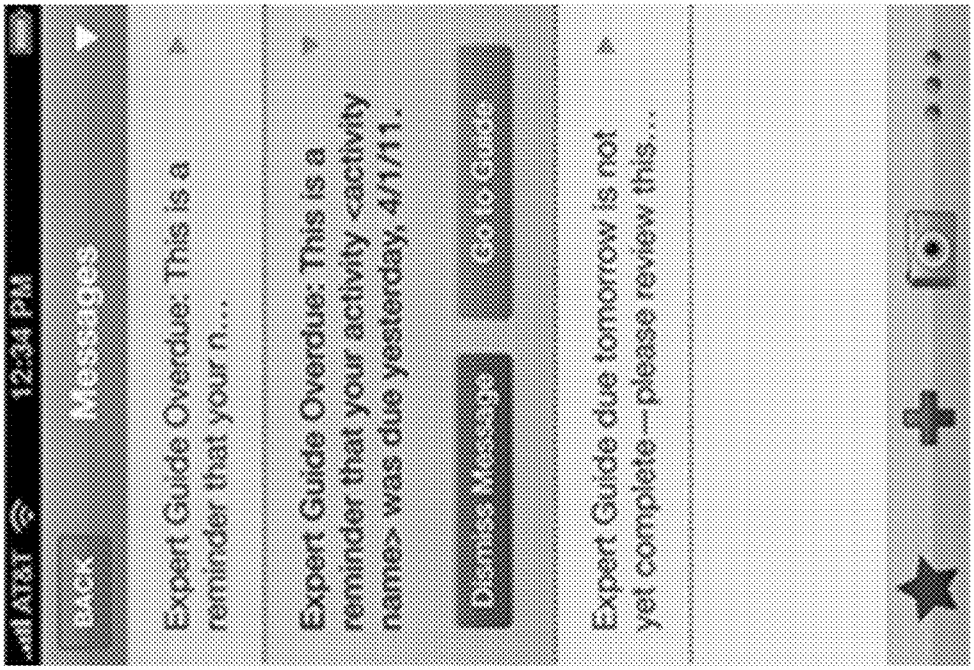

In accordance with some embodiments, messages can function similarly to the message center feature on the desktop version of the interactive checklist. The hardware processor can present all read and unread messages as shown, for example, in interface 10702 of FIG. 107A. For a particular message, the hardware processor can receive a user input to dismiss it or to go to a relevant interactive checklist (if applicable) as shown, for example, in interface 10704 of FIG. 107B. If the user opts to go to the interactive checklist, the hardware processor can display a "Summary View" shown, for example, in interface 10802 of FIG. 108 and can toggle to the "Detailed View" shown, for example, in interface 10802 of FIG. 108. In either view, the user can dismiss the message, view the message alongside the interactive checklist, or continue working on the interactive checklist. Note that, in some embodiments, the hardware processor can use any suitable logic for highlighting and presenting messages. For example, in some embodiments, older messages may be automatically deleted or presented in a manner (e.g., grayed out, in a less prominent position, and/or in any other suitable manner) that indicates decreased relevance. In some embodiments the hardware processor can assign a state to a message indicating, for example, whether the message is currently unseen, has been seen, was sent more than a predetermined duration of time ago (e.g., more than a week ago, more than a month ago, and/or any other suitable time period), is related to an activity that has already been completed, and/or any other suitable state. The hardware processor can then use the assigned state to determine a visual manner to present the message. In some embodiments, the hardware processor can update a state of a message at any suitable time(s) based on any suitable information.

Figure 109A:
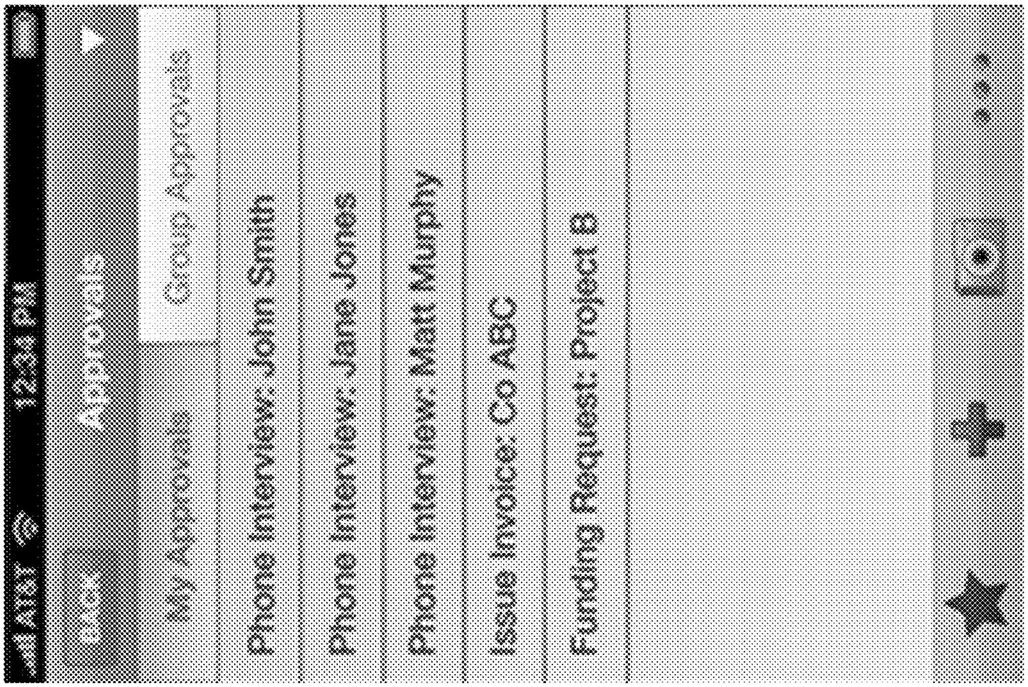
FIGS. 109A and 109B show examples of user interfaces displayed on a mobile device for presenting approval queues in accordance with some embodiments of the disclosed subject matter.
Figure 109B:
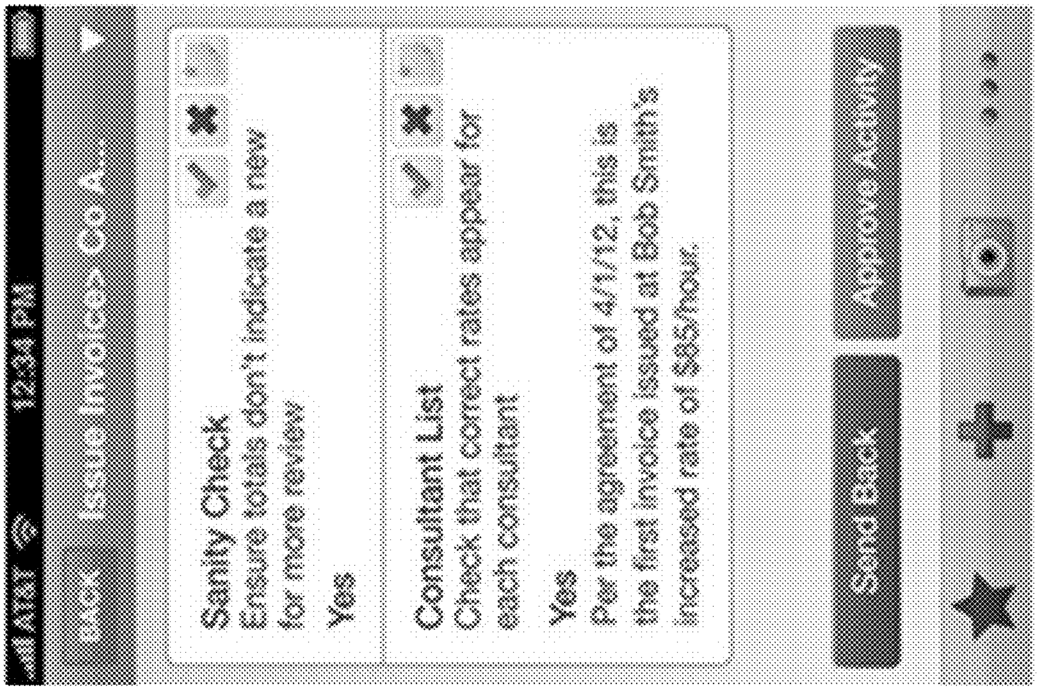

In accordance with some embodiments, approvals can function similarly to the approvals feature on the desktop version (e.g., non-mobile version) of the interactive checklist. The hardware processor can display a user's personal Approvals queues and the queues for their groups as shown, for example, in interface 10902 of FIG. 109A. The hardware processor can receive a user input to select any waiting activity. Additionally, the hardware processor can present a detailed view of the activity to allow a user to approve it or send it back as shown, for example, in interface 10904 of FIG. 109B.

Figure 110:
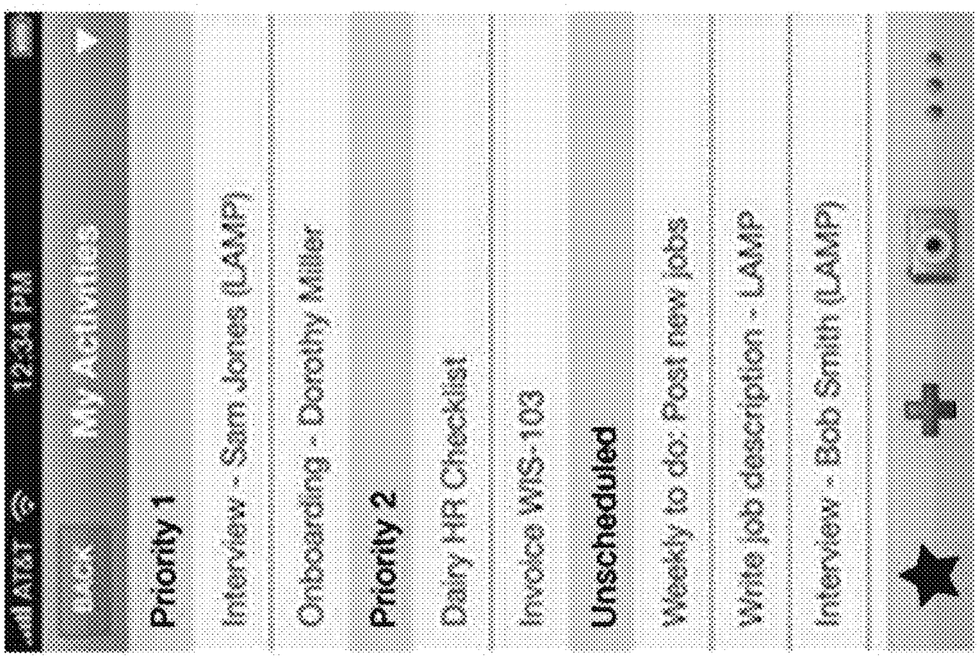
Figure 112:
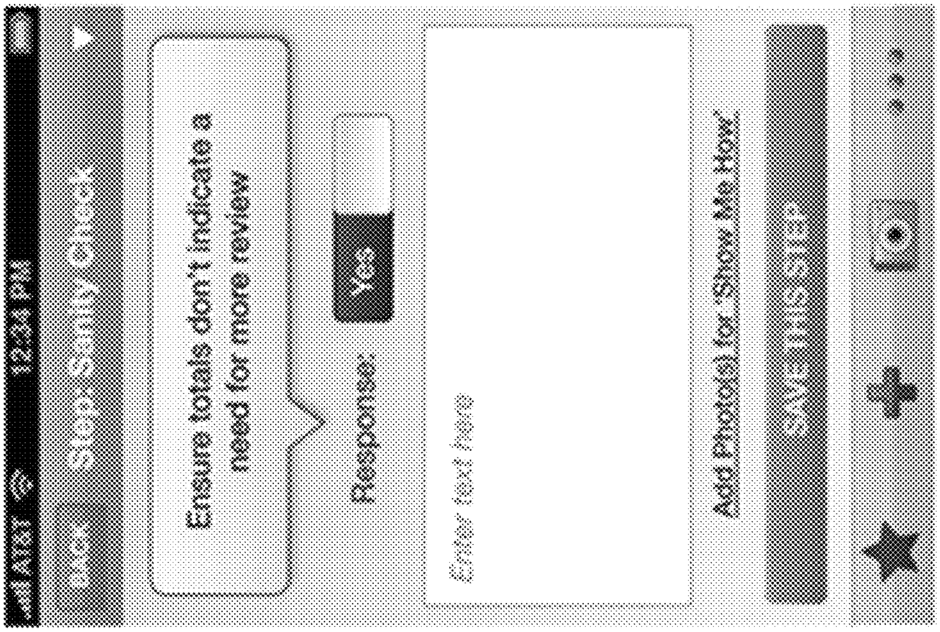

In accordance with some embodiments, a "My Activities" list can function similarly to as on the desktop. As shown, for example, in interface 11000 of FIG. 110, the hardware processor can present a list of all outstanding activities assigned to the user. The user's personal headings carry over from the desktop. The hardware processor can receive a user input (e.g., by clicking on an activity) to work on the activity. As shown, for example, in interfaces 11102 and 11104 of FIG. 111, the user can toggle between two views of the activity a "Summary View" (list of the step labels) and a "Detailed View" (list of the step labels, step instructions, and any completed responses. For both views, there can be visual distinctions between completed and incomplete steps. The hardware processor can receive a user input (e.g., by clicking on a step) to edit or complete it. Upon receiving the user input at an individual step, the hardware processor can present a step screen shown in interface 11200. Here, the hardware processor can display a step label, step instructions, and response choices. The user can take actions such as respond/edit response, add/edit text details, or add photos or video to the step.

Figure 113A:
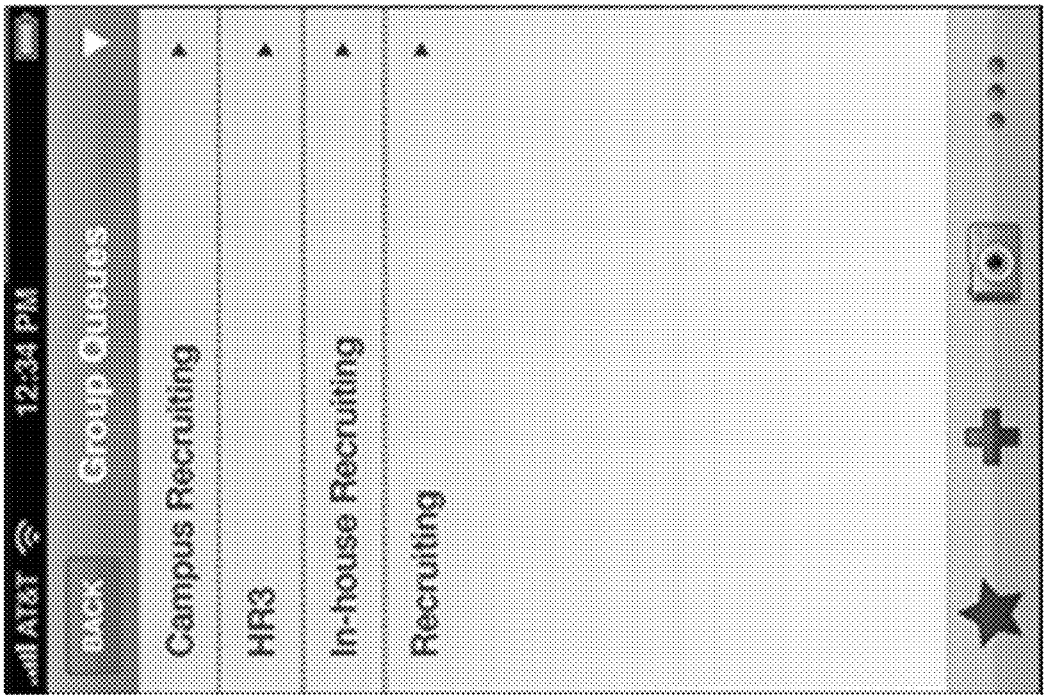
FIGS. 113A and 113B show examples of user interfaces displayed on a mobile device for presenting group queues in accordance with some embodiments of the disclosed subject matter.
Figure 113B:
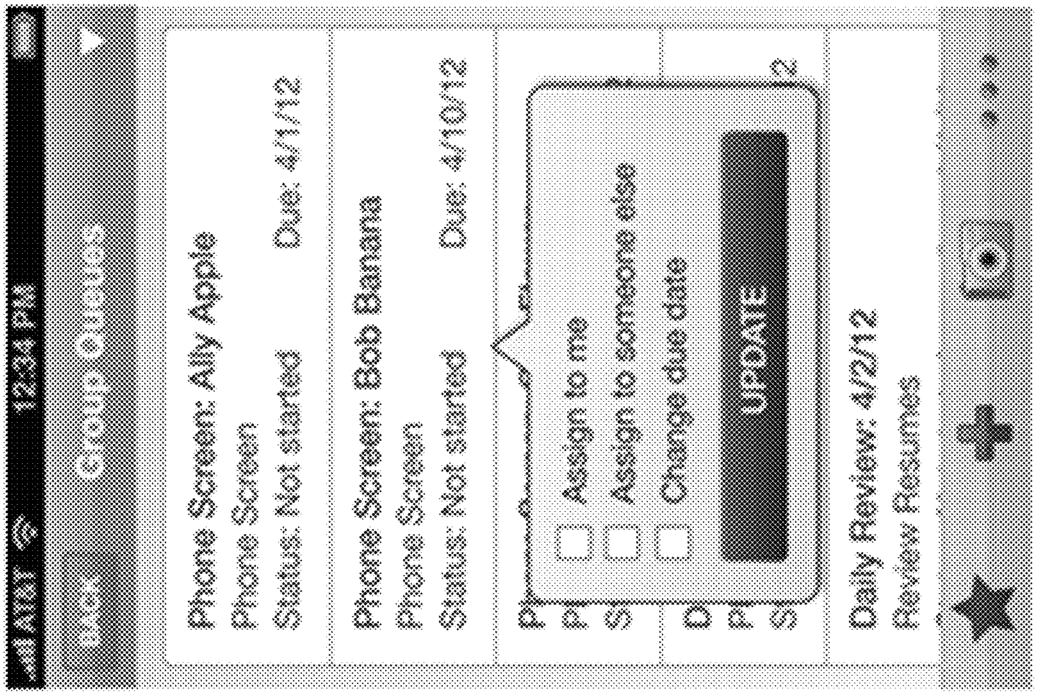

In accordance with some embodiments, a "Group Queues" list can function similarly to as on the desktop. The hardware processor can present a queue for each group to which they belong as shown, for example, in interface 11302 of FIG. 113A. Each queue can list all outstanding activities assigned to that group. The hardware processor can receive a user input at any activity title to assign it to an individual user (including themselves) or to change the due date as shown, for example, in interface 11304 of FIG. 113B.

Figure 114A:
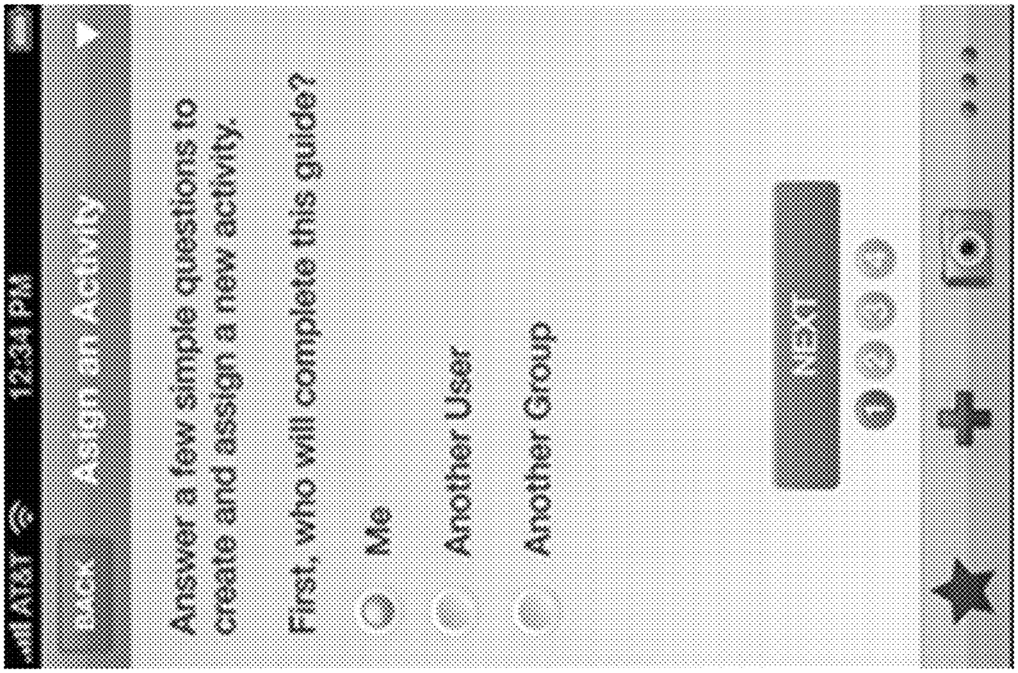
FIGS. 114A, 114B, and 115 show examples of user interfaces displayed on a mobile device for assigning an activity in accordance with some embodiments of the disclosed subject matter.
Figure 114B:
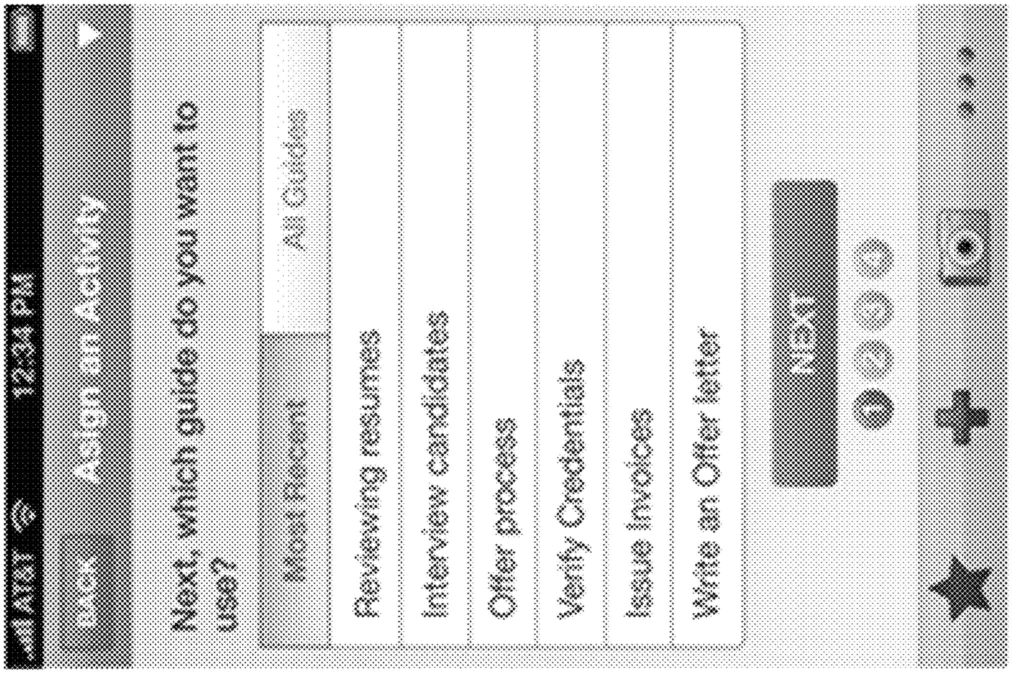
Figure 115:
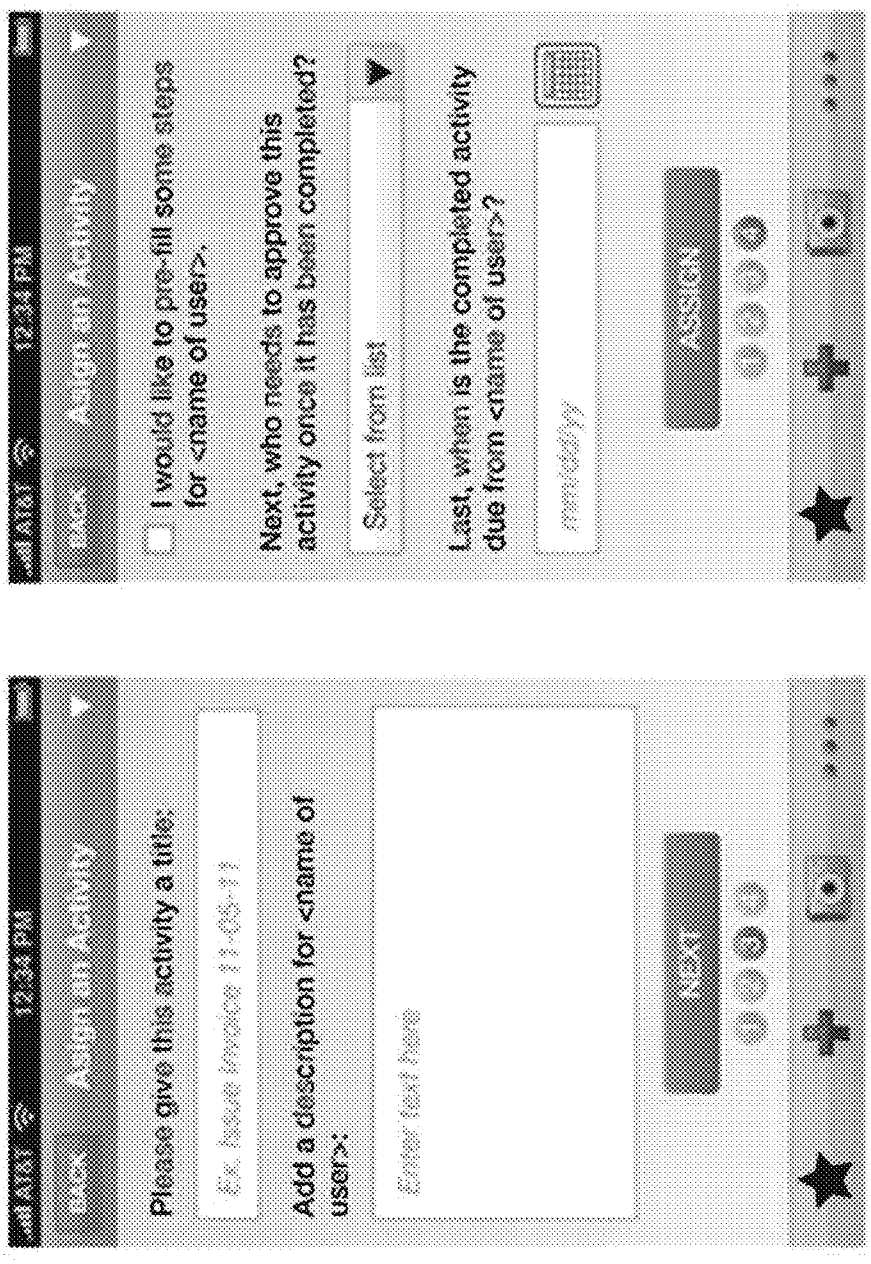
Figure 205:
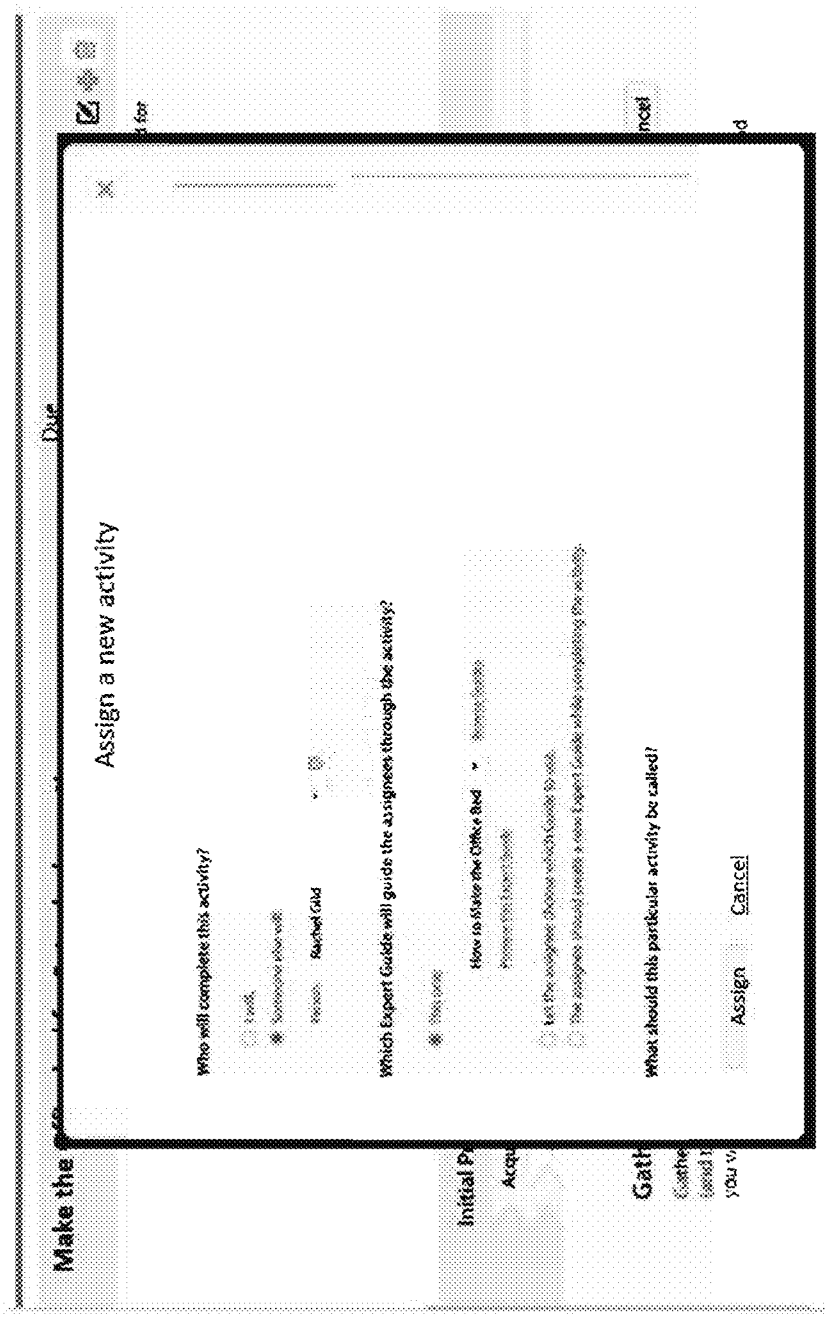
FIG. 205 shows an example of a user interface for assigning an activity in accordance with some embodiments of the disclosed subject matter.
Figure 222:
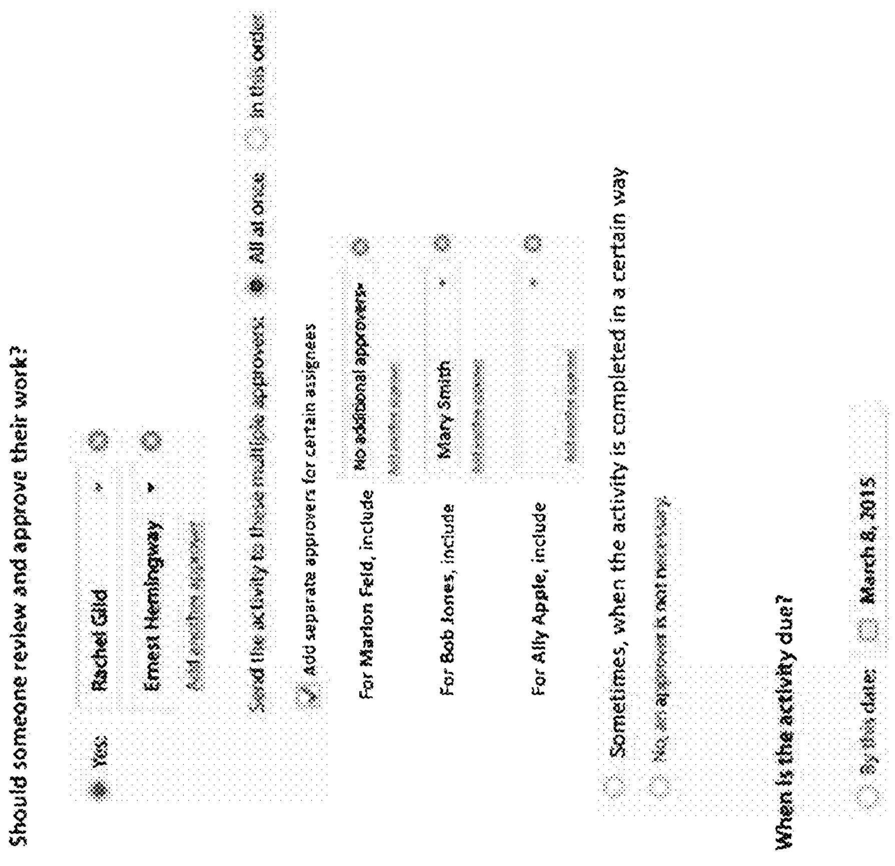
FIG. 222 shows an example of a user interface for assigning multiple approvers to an activity in accordance with some embodiments of the disclosed subject matter.
Figure 227:
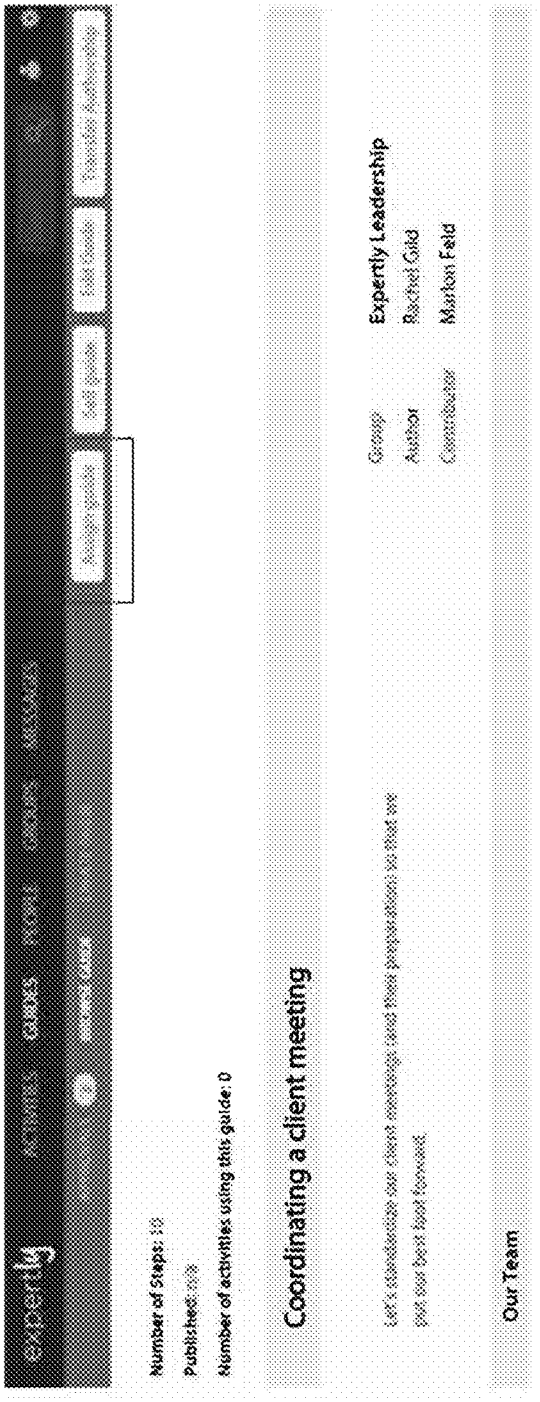
FIG. 227 shows an example of a user interface for assigning activities from a Guide in accordance with some embodiments of the disclosed subject matter.

In accordance with some embodiments, an "Assign an Activity" feature can function similarly to the desktop version. Here, the hardware processor can present a wizard-like series of screens to take the user through a process. Fields can be the same as the desktop version. For example, who will be required to complete the activity shown, for example, in interface 11402 of FIG. 114A, and which interactive checklist will be used (e.g., toggle between lists of recent interactive checklists, and all interactive checklists) as shown, for example in interface 11404 of FIG. 114B, can be the same as in the desktop version. As another example, a title for the activity and a description for the activity as shown, for example, in interface 11502 of FIG. 115, and the option to pre-fill steps, an approver for the activity, or a due date and/or time for the activity as shown in interface 11504 of FIG. 115, can be the same as in the desktop version. Note that, in some embodiments, any suitable number of approvers can be specified for a particular activity, as shown in FIG. 222. Additionally, in instances where multiple approvers are specified or requested, the approvers can be notified simultaneously or sequentially of the activity to be approved. Additionally, in some embodiments, different approvers can be specified for different parts of an activity. Furthermore, in some embodiments, multiple assignees completing a particular activity can each be assigned a different approver, as shown in FIG. 222. Note that, in some embodiments, an activity can be assigned from pages other than the "Assign an Activity" features. For example, in some embodiments, an activity can be assigned from an existing Guide, an existing page associated with an activity, and/or through any other suitable user interface, as shown in FIG. 205. Additionally, note that, in some embodiments, a user can request that an activity assignee select an appropriate guide for completing the activity. As another example, in some embodiments, additional activities can be assigned using an "Assign Guide" selectable input within a Guide, as shown in FIG. 227. As a more particular example, in some embodiments, a user working on an activity using the Guide can assign a different activity to themself, another user, and/or a group of users using the Guide. As another more particular example, in some embodiments, a user browsing a Guide can assign one or more activities within the Guide to themself and/or another user using the Guide.

Figure 116A:
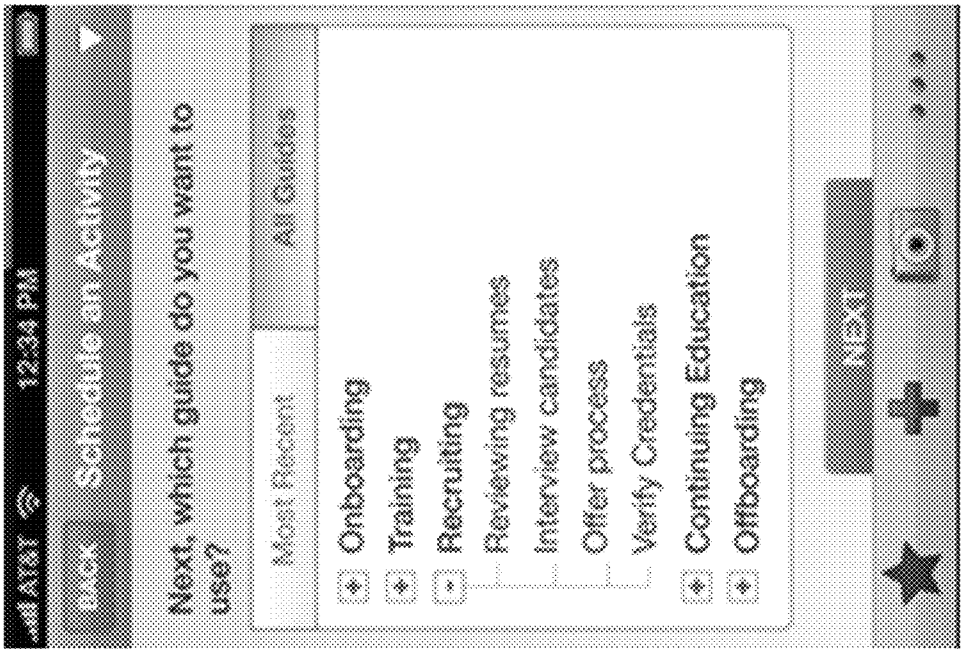
FIGS. 116A and 116B show examples of user interfaces displayed on a mobile device for scheduling an activity in accordance with some embodiments of the disclosed subject matter.
Figure 116B:
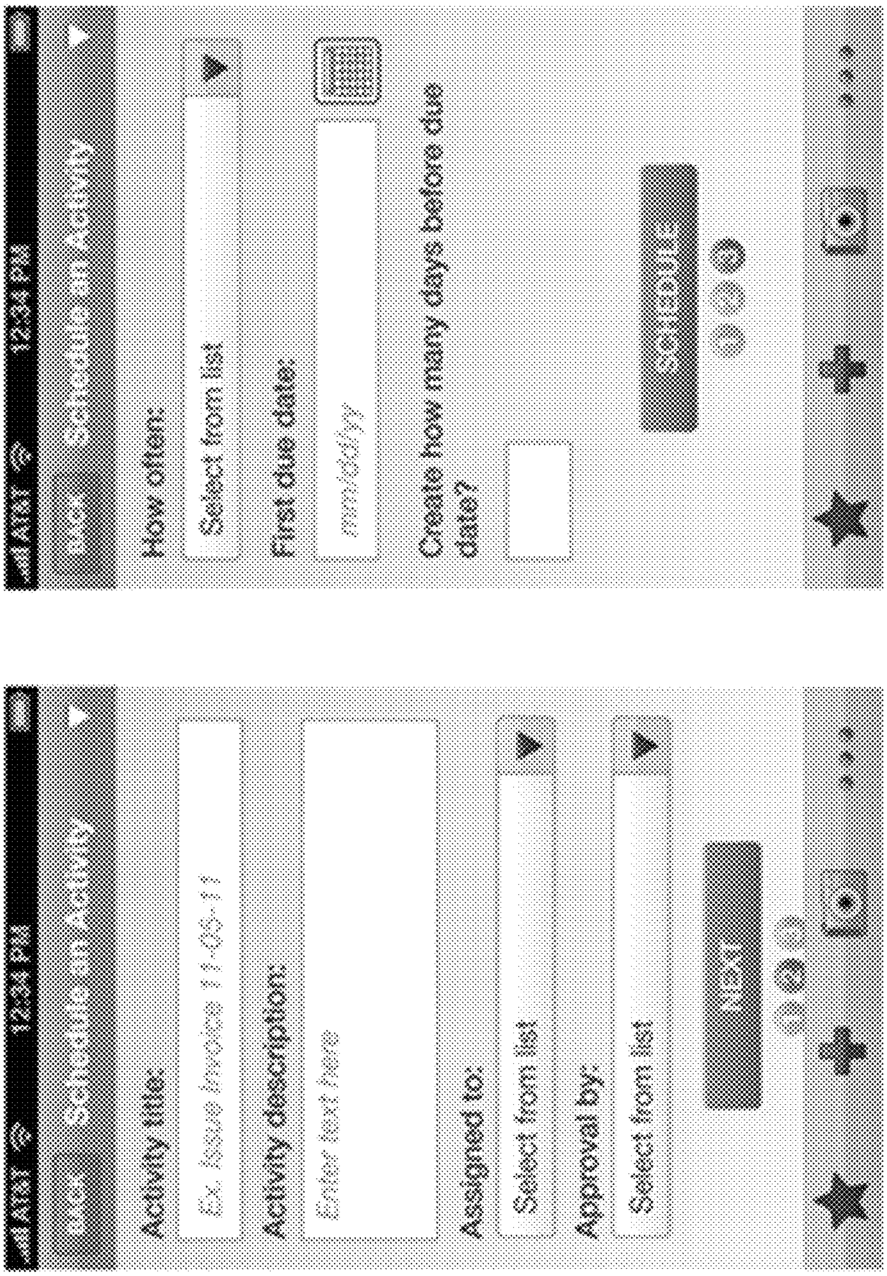

In accordance with some embodiments, a "Schedule an Activity" feature can function similarly to the desktop version. Here, the hardware processor can present wizard-like series of screens to take the user through the process. Fields can be the same as the desktop version. The user can indicate, for example, as shown, for example, in interface 11602 of FIG. 116A, which interactive checklist they would like to use, as shown, for example, in interface 11604 of FIG. 116B, an activity title, an activity description, an assignee, and an approver, and as shown, for example, in interface 11606 of FIG. 116B, frequency, first due date and/or time, and when each activity should be created. Note that, in some embodiments, a placeholder title can be used to configure an activity title in a particular format without requiring a particular activity title input from a user.

Figure 117A:
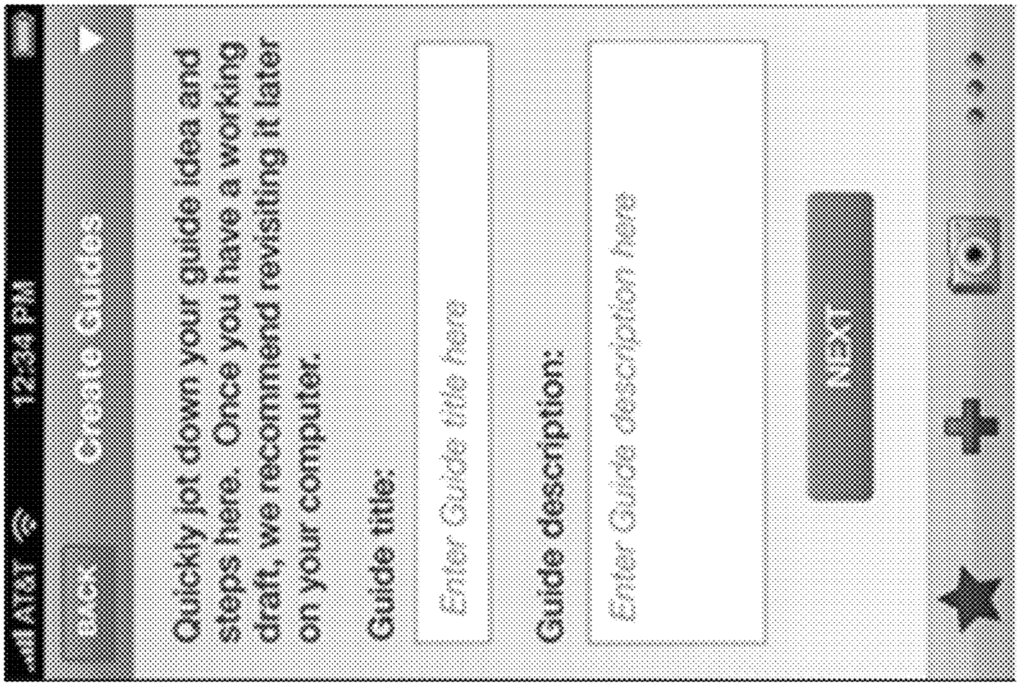
FIGS. 117A and 117B show examples of user interfaces displayed on a mobile device for creating an interactive checklist in accordance with some embodiments of the disclosed subject matter.
Figure 117B:
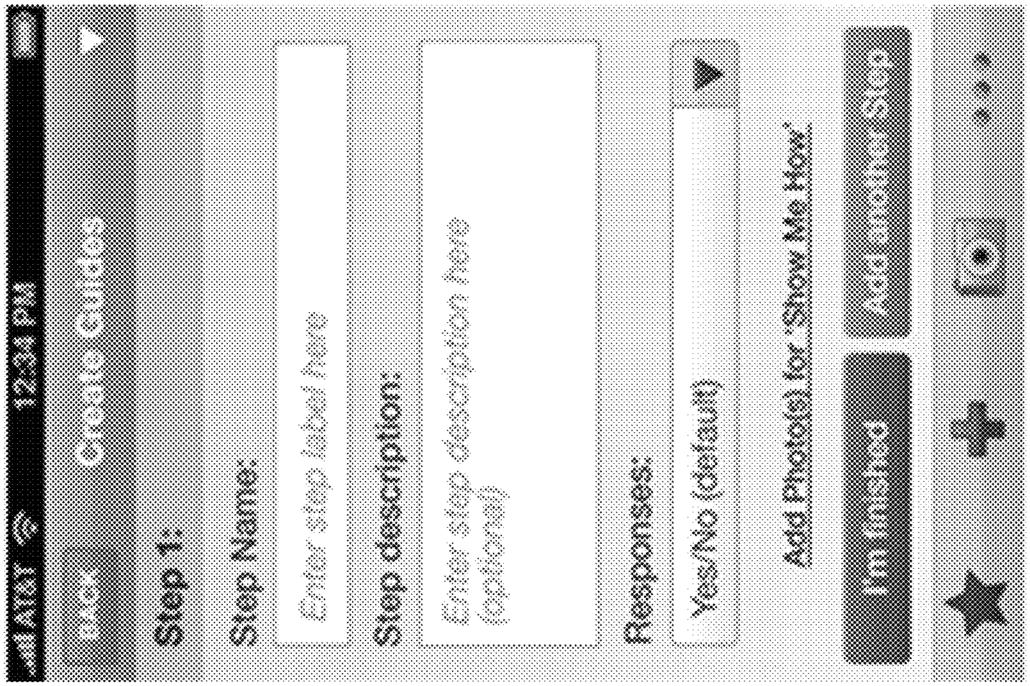

In accordance with some embodiments, the mobile app can offer the ability to create a new interactive checklist using the "Quick Guide Tool." The tool can function similarly to the one offered on the desktop version. The user can quickly jot down their ideas into a basic framework of an interactive checklist. For the interactive checklist, as shown, for example, in interface 11702 of FIG. 117A, the hardware processor can receive an interactive checklist title and an interactive checklist description. Additionally, in interface 11704 of FIG. 117B, the hardware processor can receive a step name (step label) and a step description (instructions). The user can also enhance the step by adding photos or "Show Me How" guidance. The user can later flesh out the full interactive checklist using the normal "Add a Step" interface on the desktop version of the interactive checklist.

Figure 118:
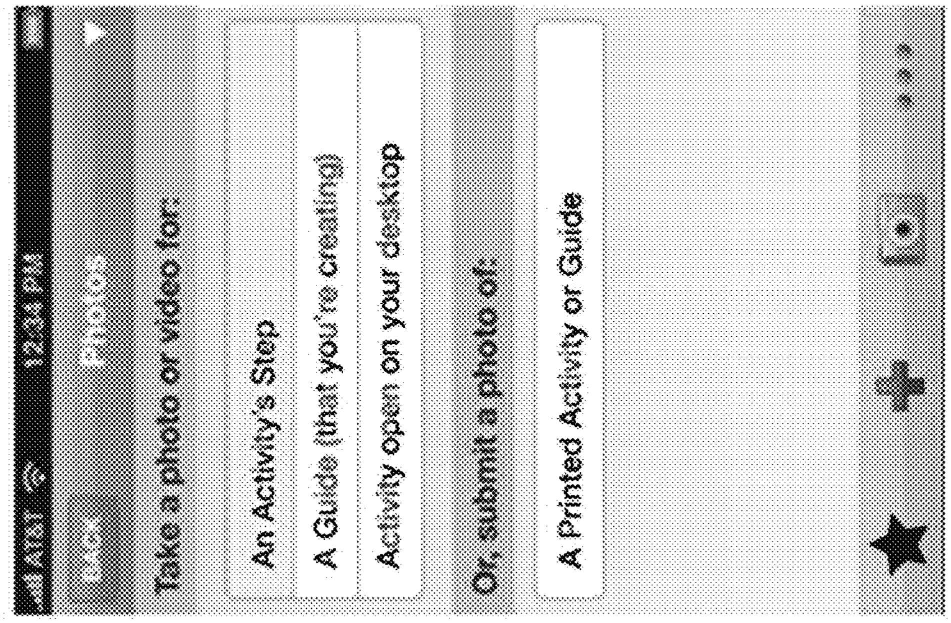
FIGS. 118, 119, 120, 121A, and 121B show examples of user interfaces displayed on a mobile device for adding photos or video to a step in accordance with some embodiments of the disclosed subject matter.
Figure 119:
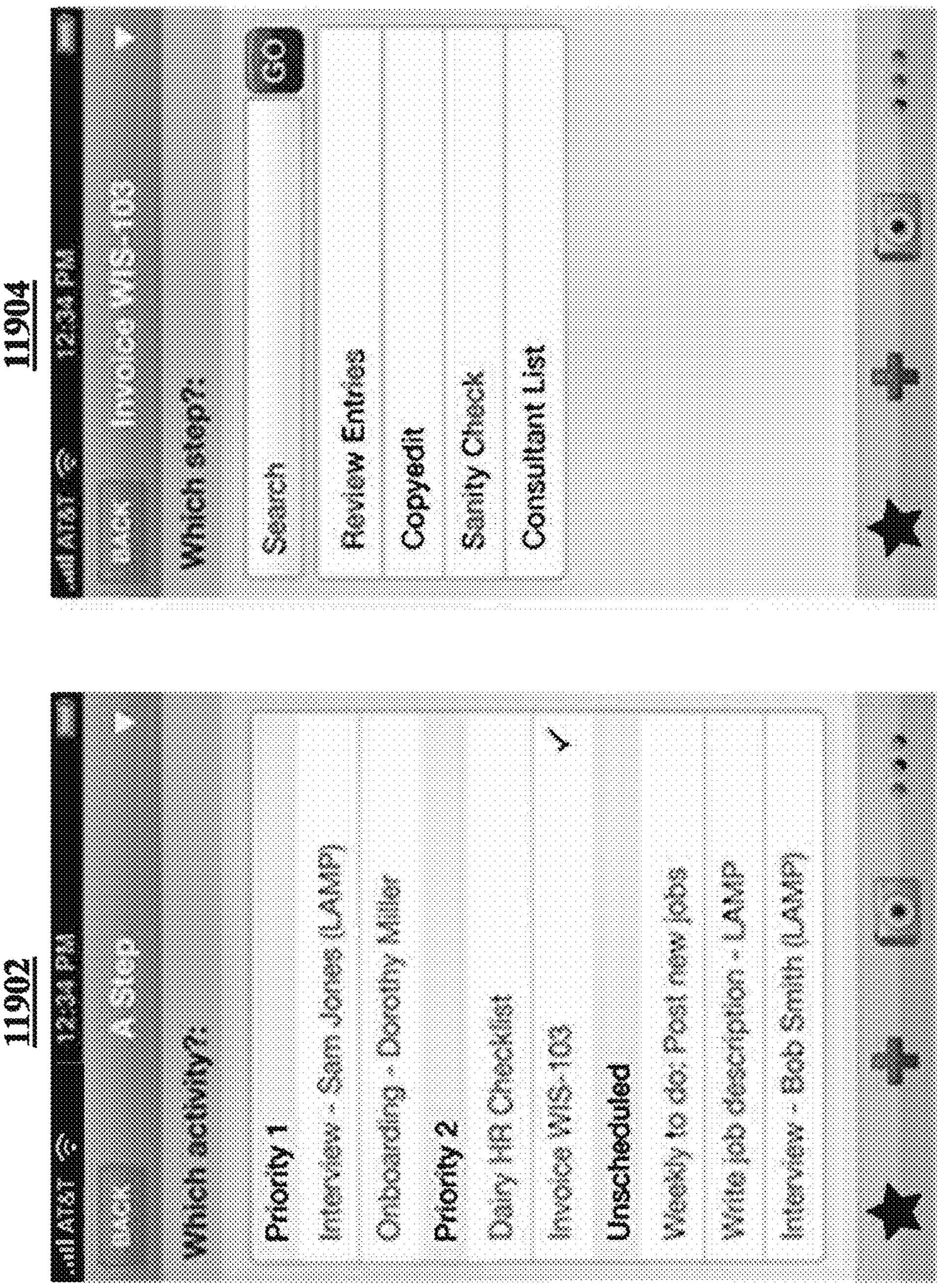
Figure 120:
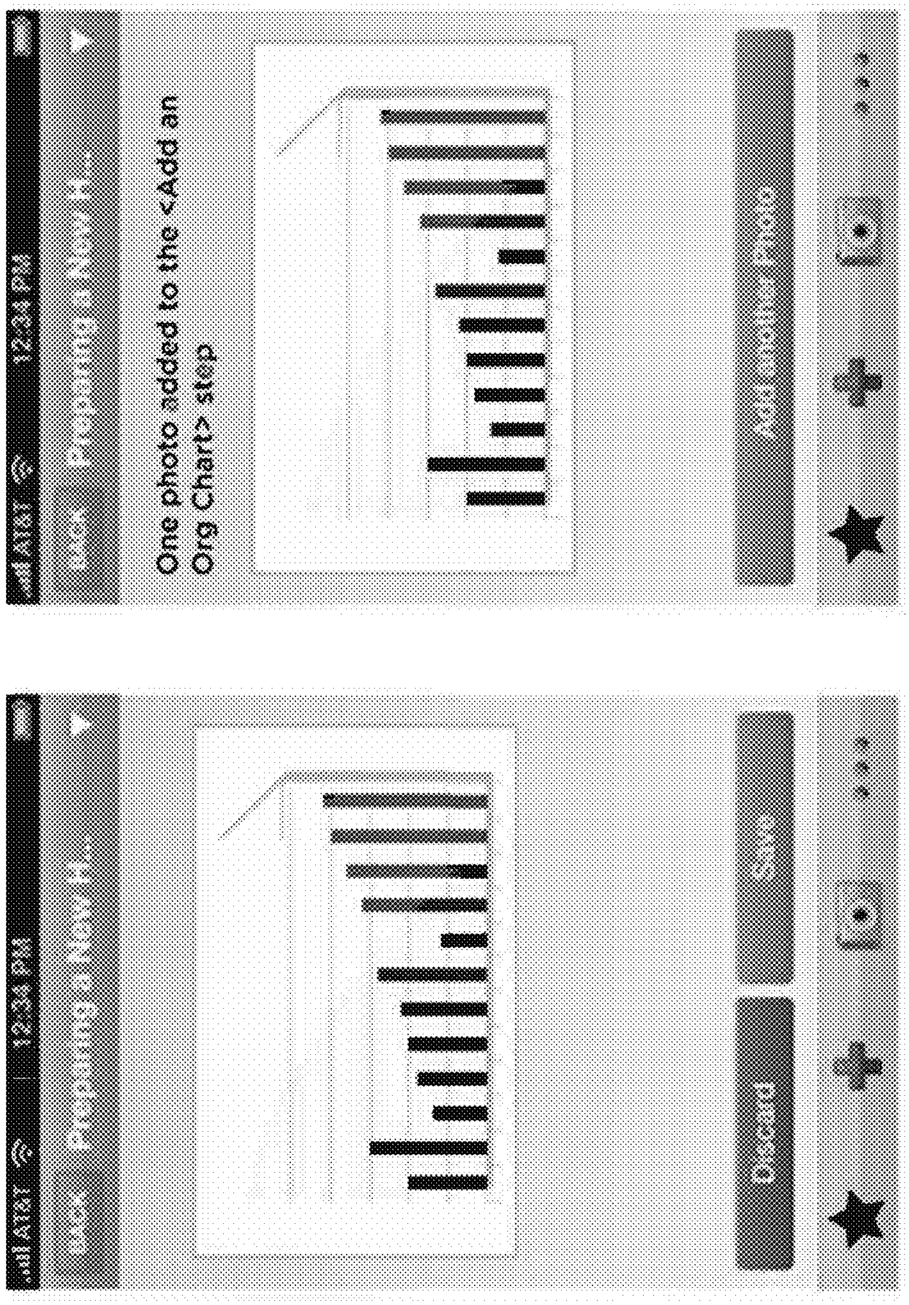
Figure 121A:
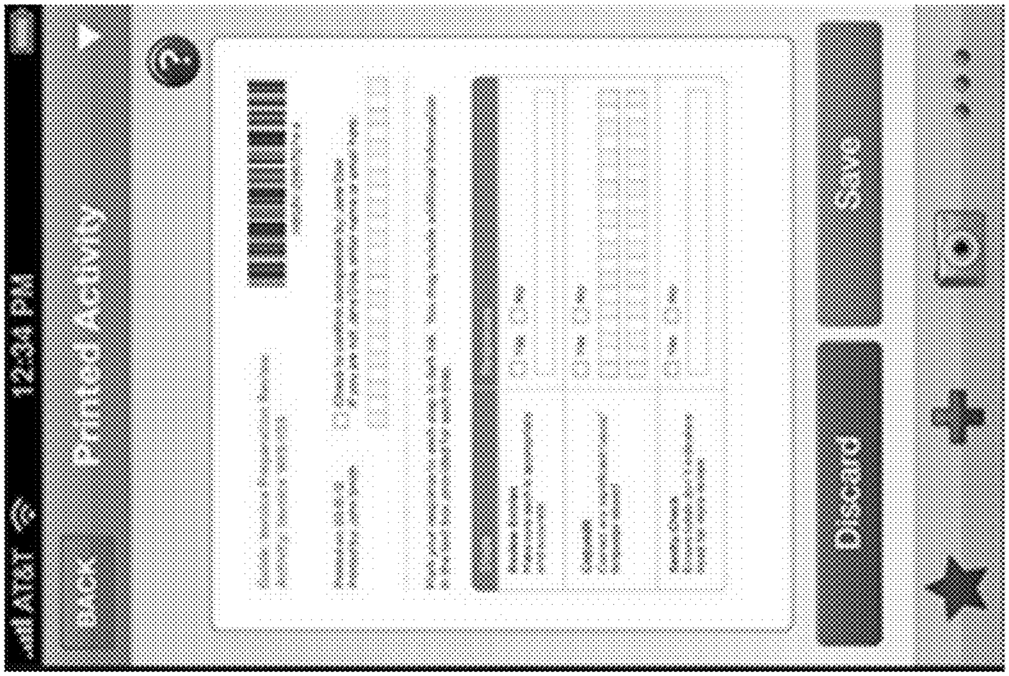
Figure 121B:
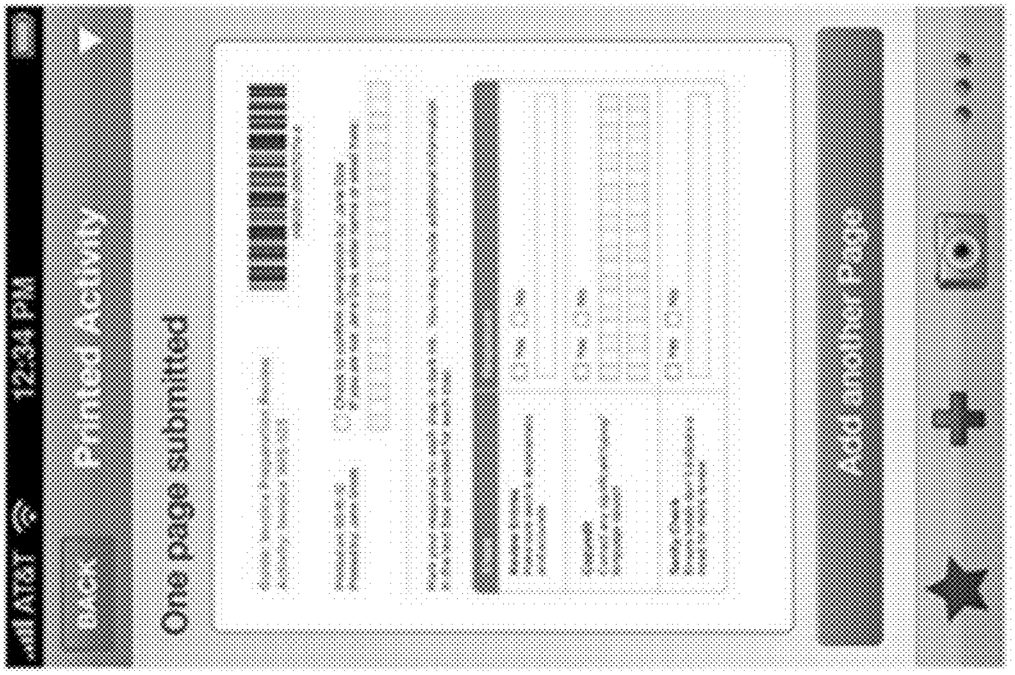

In accordance with some embodiments, the user can take advantage of their smartphone camera by adding photos or video to a step in an existing interactive checklist or a new interactive checklist, as shown, for example, in interface 11800 of FIG. 118. They can also take photos of printed activities to submit printouts. The user can drill down and select a particular step in a particular activity as shown, for example, in interface 11902 of FIG. 119. The hardware processor can receive a new photo to add to the step from a user's camera roll as shown, for example, in interface 11904 of FIG. 119. Even if the user is not on the go, their smartphone camera may be the quickest and easiest way to upload a photo. The desktop and mobile versions of the interactive checklist can sync in some embodiments. The user can work on the desktop and can indicate that they want to add a photo from the mobile app. Then, the user can take a photo, and the mobile app can know to add it to the activity open on the desktop as shown, for example, in interfaces 12002 and 1204 of FIG. 120. The user can even submit printed activities in some embodiments. They can take a photo of the completed printout(s) as shown, for example, in interface 12102 of FIG. 121A. The photo can then be submitted and the interactive checklist can transcribe the responses to the activity as shown, for example, in interface 12104 of FIG. 121B. Note that, in some embodiments, a user's smartphone camera and/or a web camera associated with a laptop or desktop computer can additionally or alternatively be used to take a picture used for a profile picture associated with the user's account.

In some embodiments, the hardware processor can present a list of available "Step Types." For example, the hardware processor can receive a user input from an author to tag a step with a "Step Type" to indicate the nature of its purpose and/or its characteristic(s). In a more particular example, a step can be tagged using a taxonomy that may be customized by the organization. In some embodiments, tagging a step with a "Step Type" may cause a label, icon, display element and/or guidance/resource(s) to appear near the step when a user observes it. In some embodiments, tagging a step with a "Step Type" may offer guidance to the step author about how to compose a step of this nature. In some embodiments, tagging a step with a "Step Type" may influence the display of the step to more appropriately present it. In some embodiments, tagging a step with a "Step Type" may influence the behavior associated with the step or its interface.

In some embodiments, interface element(s) may also assist a user, such as the author of an Interactive Checklist, in composing an effective Interactive Checklist. For example, the interface element(s) may indicate the number of steps associated with a particular Step Type, so that inattention to that aspect of the Interactive Checklist can be addressed. In some embodiments, the interface element(s) may provide guidance for identifying/composing a step of that nature.

In some embodiments, a Step Type can be of any suitable nature. For example, a Step Type may reflect a type of action. More particularly, for example, the type of action could include "Diagnose/Decide," "Evaluate an alternative," "Feedback" (e.g., Gathering feedback, giving feedback, possibly to help people learn or to enhance the process), "Gather information/inputs" (e.g., indicating information the user should gather from elsewhere), "Option creation" (e.g., indicating identification of additional option(s) that are available, and/or an expansion of the user's available options), "Perform a task," (e.g., Entering data into an external system; tell someone something; mail a letter), "Plan" (e.g., a planning step), "Situational awareness/assessment," (e.g., Assess aspect(s) of the situation and/or information), "Teach/Train," or any labels that have similar or other suitable meanings.

In some embodiments, a Step Type may refer to aspects that are not actions as well. For example, a Step Type can include "Accountability" (e.g., indicating an action geared toward verifying that a needed action has taken place, properly), "Instinct" (e.g., communicating the reaction that an expert should want to have when presented with a relevant fact pattern), "Risk," (e.g., highlighting or identifying risk(s)), "Suggestion," (e.g., communicating a suggestion based on previous inputs and other circumstances), etc.

In some embodiments, Step Types may reflect paradigms as well. For example, the Six Sigma methodology can utilize the "DMAIC" paradigm, i.e., Define, Measure, Analyze, Improve, Control. In some embodiments, each element of such paradigm can be used as a Step Type.

In some embodiments, only one Step Type could be assigned to a single step. In some embodiments, multiple Step Types could be assigned to a single step. In some embodiments, the nature of the specific Step Types may influence what may be combined and/or whether more tags can be added.

In some embodiments, an administrator may configure the permissible Step Types. More particularly, for example, the administrator can configure the permissible Step Types by enabling/disabling Step Types, importing bundles of Step Types offered by other parties (e.g., whether the Administrator's organization or a third party), and/or configuring Step Types through an interface. In some embodiments, the administrator may adjust/customize aspects of the display and behavior of a particular Step Type.

Figure 133A:
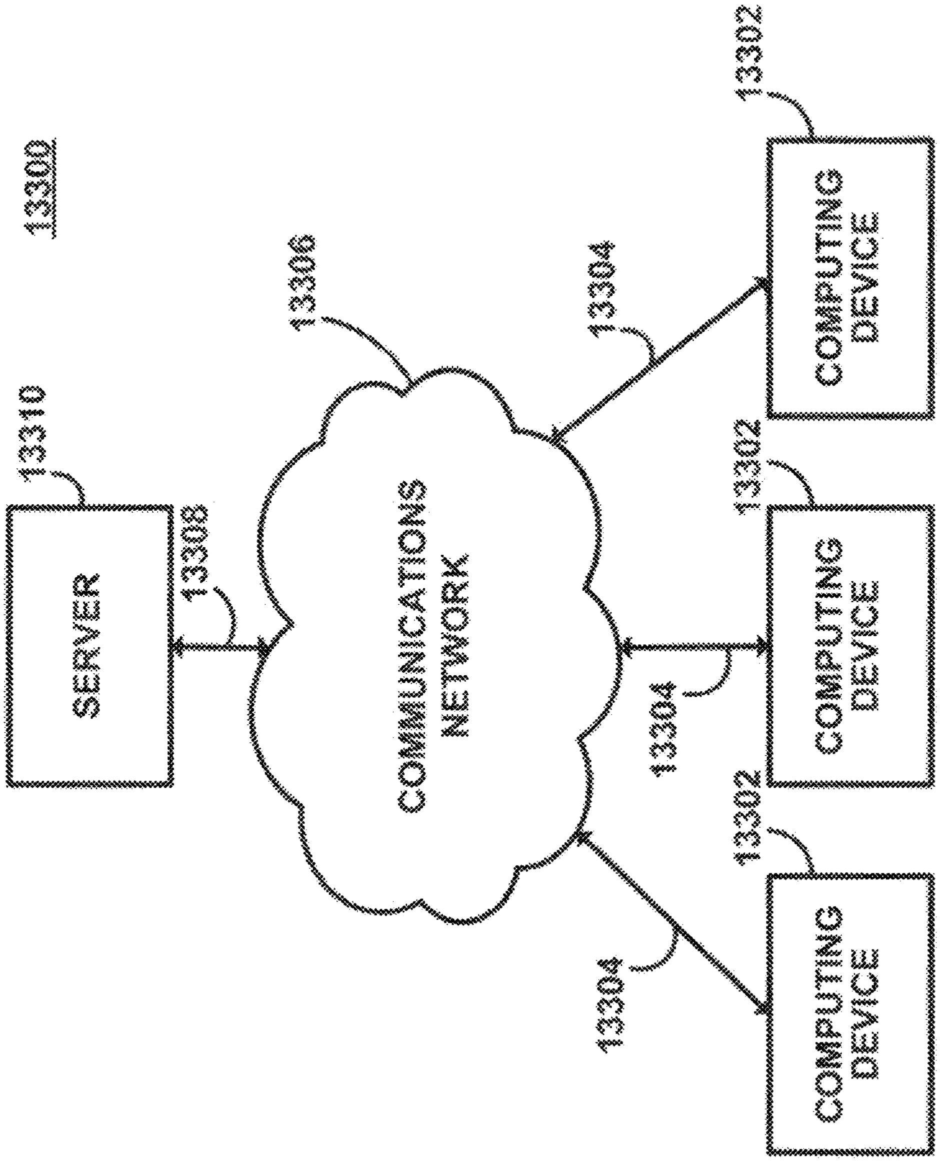
FIG. 133A shows a schematic diagram of an example of a system for presenting an interactive checklist in accordance with some embodiments of the disclosed subject matter.

Turning to FIG. 133A, an example of a generalized schematic diagram of a system 13300 in which the mechanisms described herein can be implemented in accordance with some implementations of the disclosed subject matter is shown. As illustrated, system 13300 can include one or more computing devices 13302, such as a computing device for presenting an interactive checklist, a sever 13310, a communications network 13306, and communications links 13304 and 13308.

Computing devices 13302 can be any suitable device for performing one or more of the functions described herein, such as a personal computer, a tablet device, a mobile device, a personal data assistant (PDA), a portable email device, a mobile telephone, a gaming device, a set-top box, a television, and/or any other suitable user device. Computing devices 13302 can be connected by one or more communications links 13304 to a communications network 13306 that can be linked via a communications link 13308 to a server 13310.

Server 13310 can be any suitable device for performing one or more of the functions described herein, such as a processor, a computer, a data processing device, or a combination of such devices.

In some embodiments, the functions described herein can be distributed into multiple backend components and multiple frontend components or interfaces. In a more particular example, backend components, such as data storage, can be performed on one or more servers 13310. As another more particular example, graphical user interfaces can be generated and distributed by one or more servers 13310 to computing devices 13302.

Each of the computing devices 13302 and server 13310 can be any of a general purpose device such as a computer or a special purpose device such as a client, a server, and/or any other suitable device for performing the functions described herein. Any of these general or special purpose devices can include any suitable components such as a hardware processor (which can be a microprocessor, digital signal processor, a controller, and/or any other suitable device for executing instructions and/or performing the functions described herein), memory, communication interfaces, display controllers, input devices, and/or any other suitable device for performing the functions described herein. For example, computing device 13302 can be implemented as a personal computer, a tablet device, a mobile device, a personal data assistant (PDA), a portable email device, a multimedia terminal, a mobile telephone, a gaming device, a set-top box, a television, and/or any other suitable device.

Communications network 13306 may be any suitable computer network including the Internet, an intranet, a wide-area network ("WAN"), a local-area network ("LAN"), a wireless network, a digital subscriber line ("DSL") network, a frame relay network, an asynchronous transfer mode ("ATM") network, a virtual private network ("VPN"), or any combination of any of such networks. Communications links 13304 and 13308 may be any communications links suitable for communicating data between computing devices 13302 and server 13310, such as network links, dial-up links, wireless links, hard-wired links, any other suitable communications links, or a combination of such links.

Computing devices 13302 and server 133010 may be located at any suitable location(s). Computing devices 13302 can be local to each other or remote from each other. In some implementations, computing devices 13302 and server 13310 may be located within an organization. Alternatively, computing devices 13302 and server 13310 may be distributed between multiple organizations.

Figure 133B:
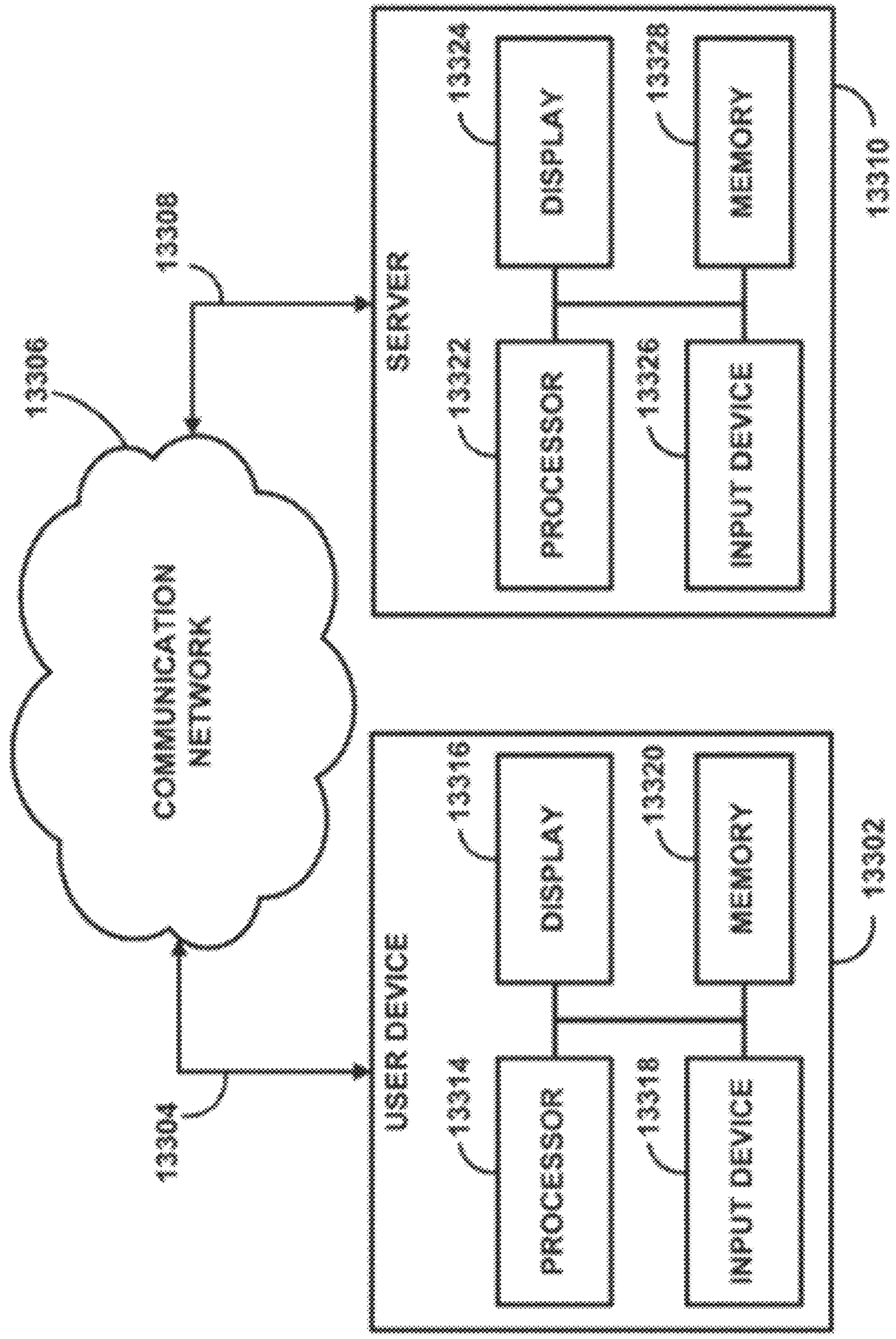
FIG. 133B shows an example of hardware that can be used in a server and/or a computing device in accordance with some embodiments of the disclosed subject matter.
Figure 134:
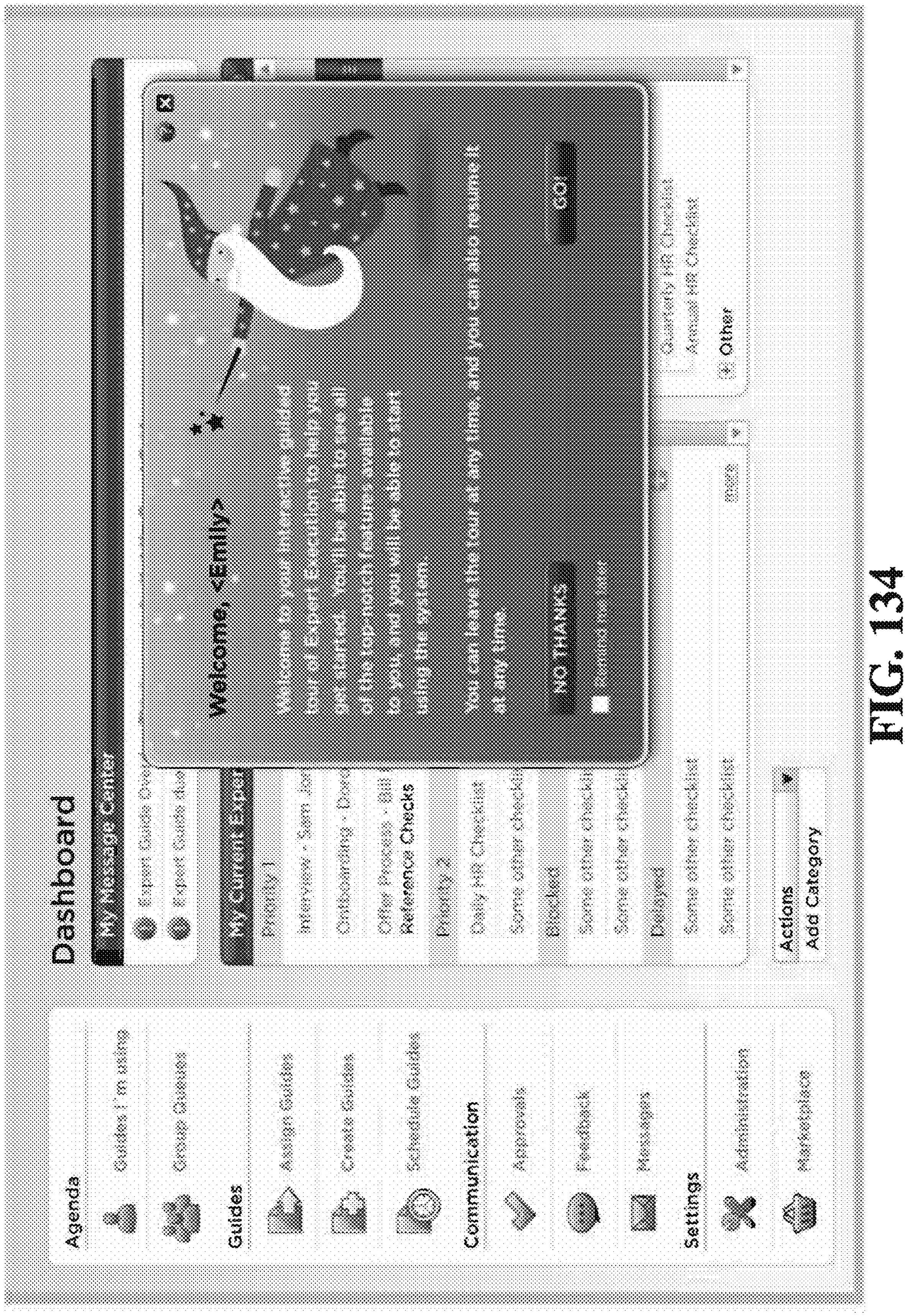
FIGS. 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, and 180 show examples of tour interfaces for presenting an interactive checklist in accordance with some embodiments of the disclosed subject matter.
Figure 135:
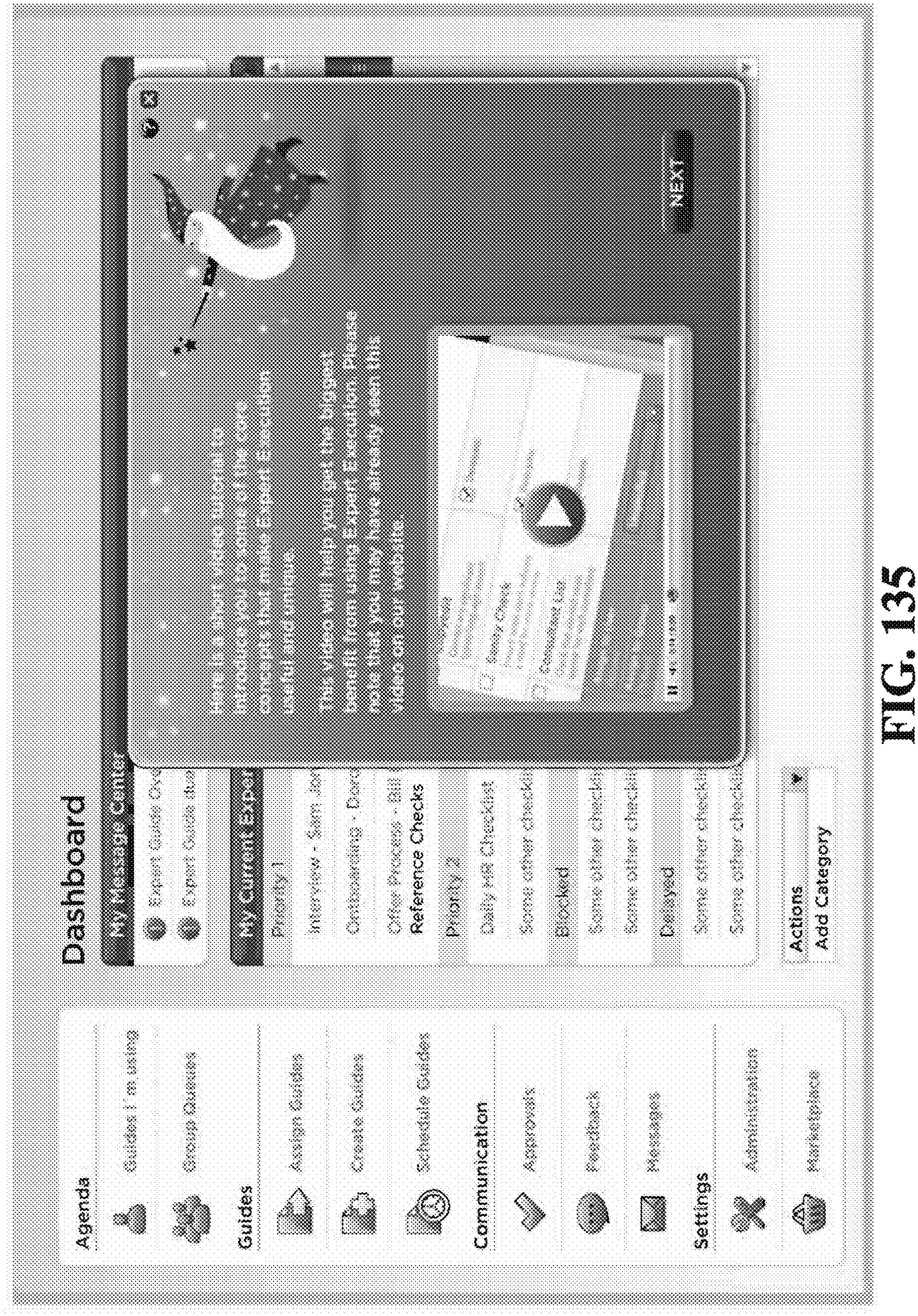
Figure 136:
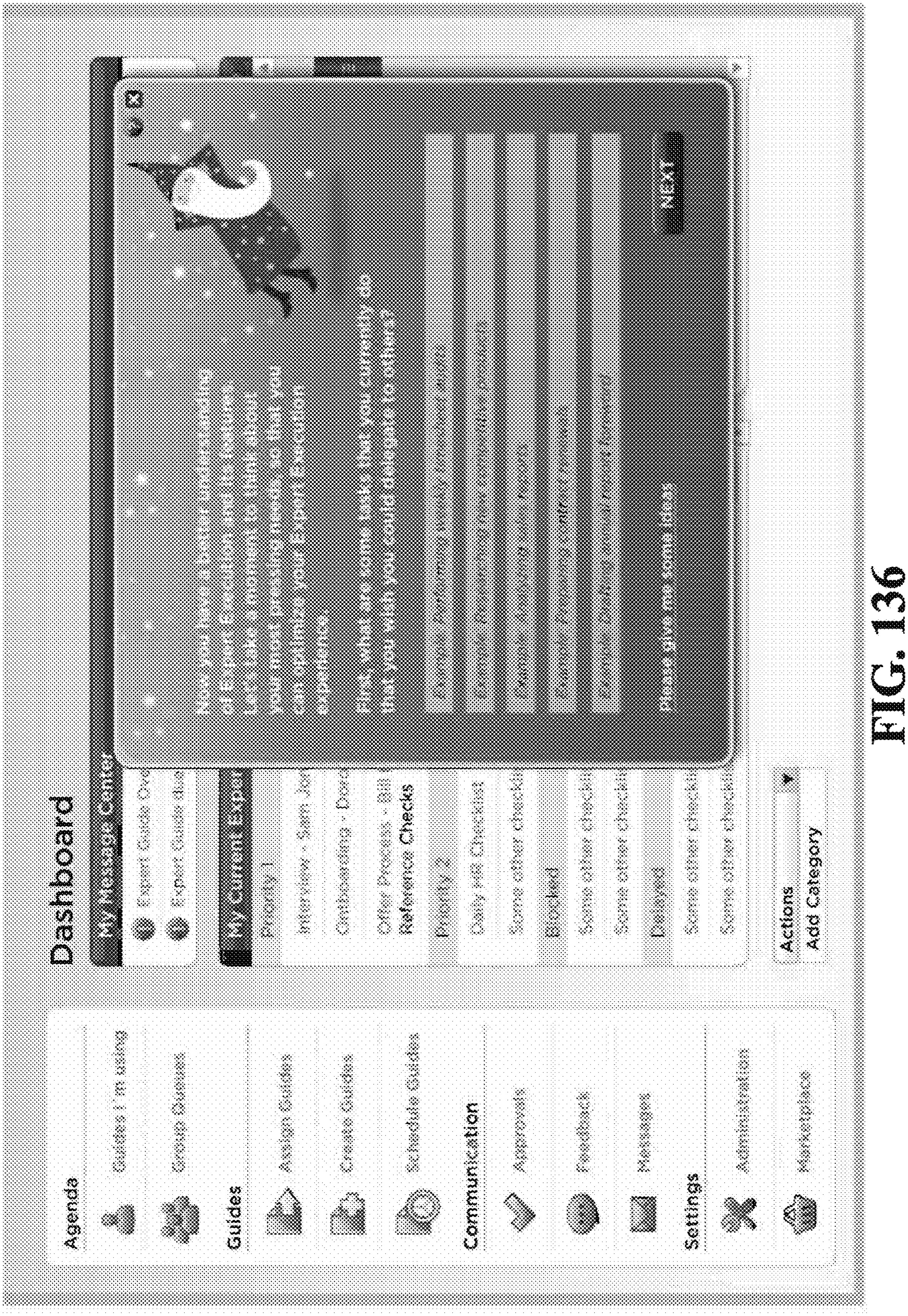
Figure 137:
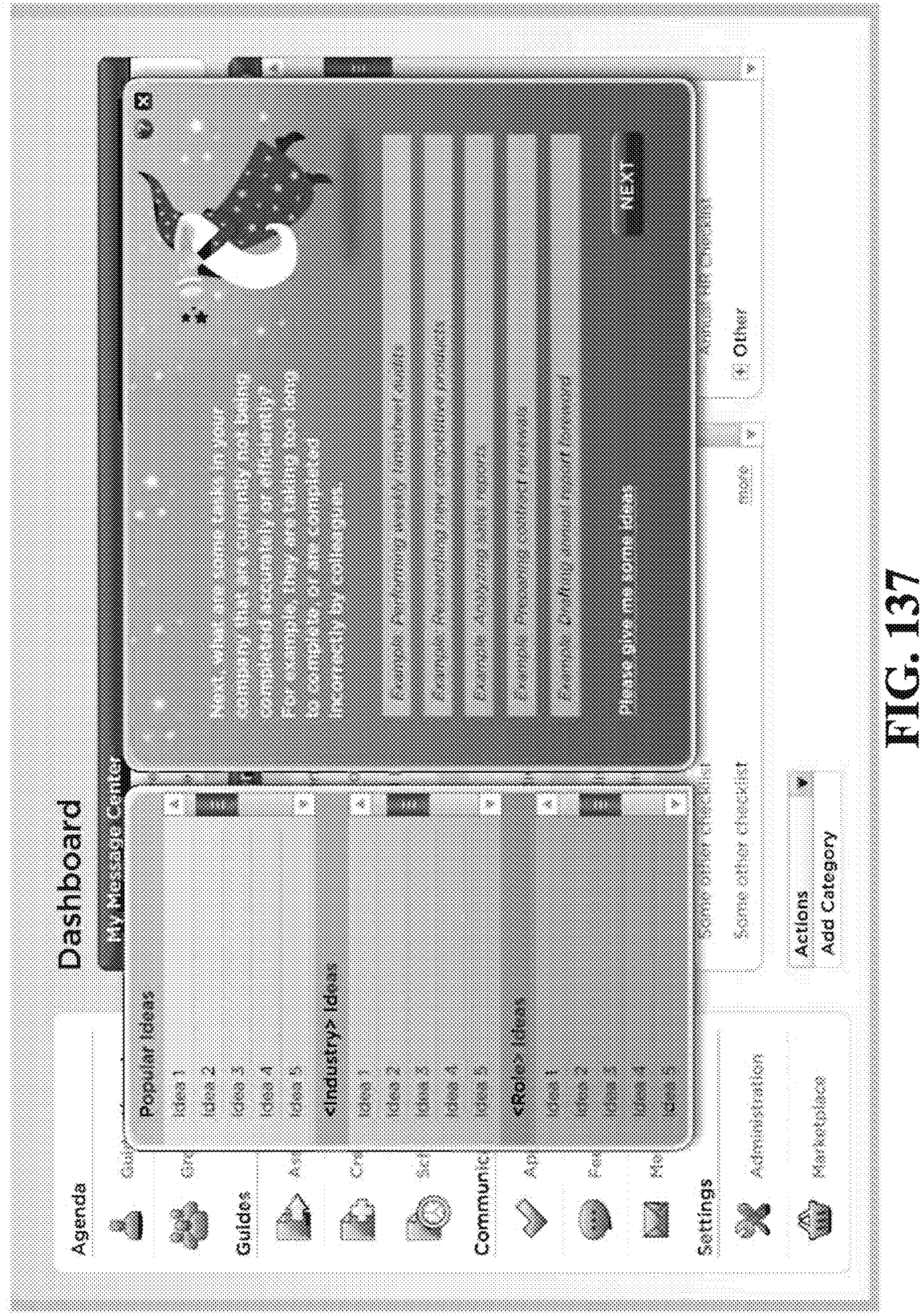
Figure 138:
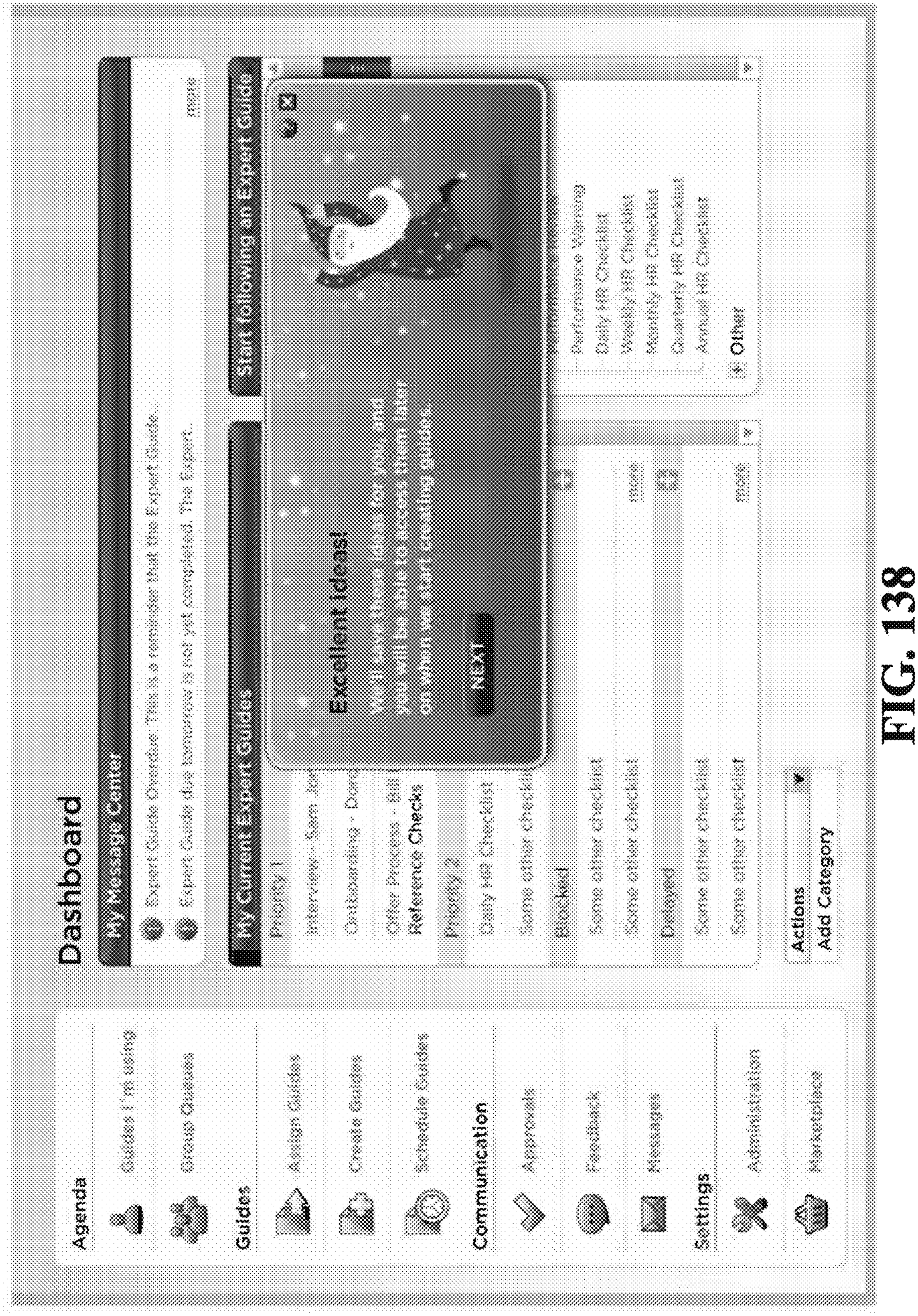
Figure 139:
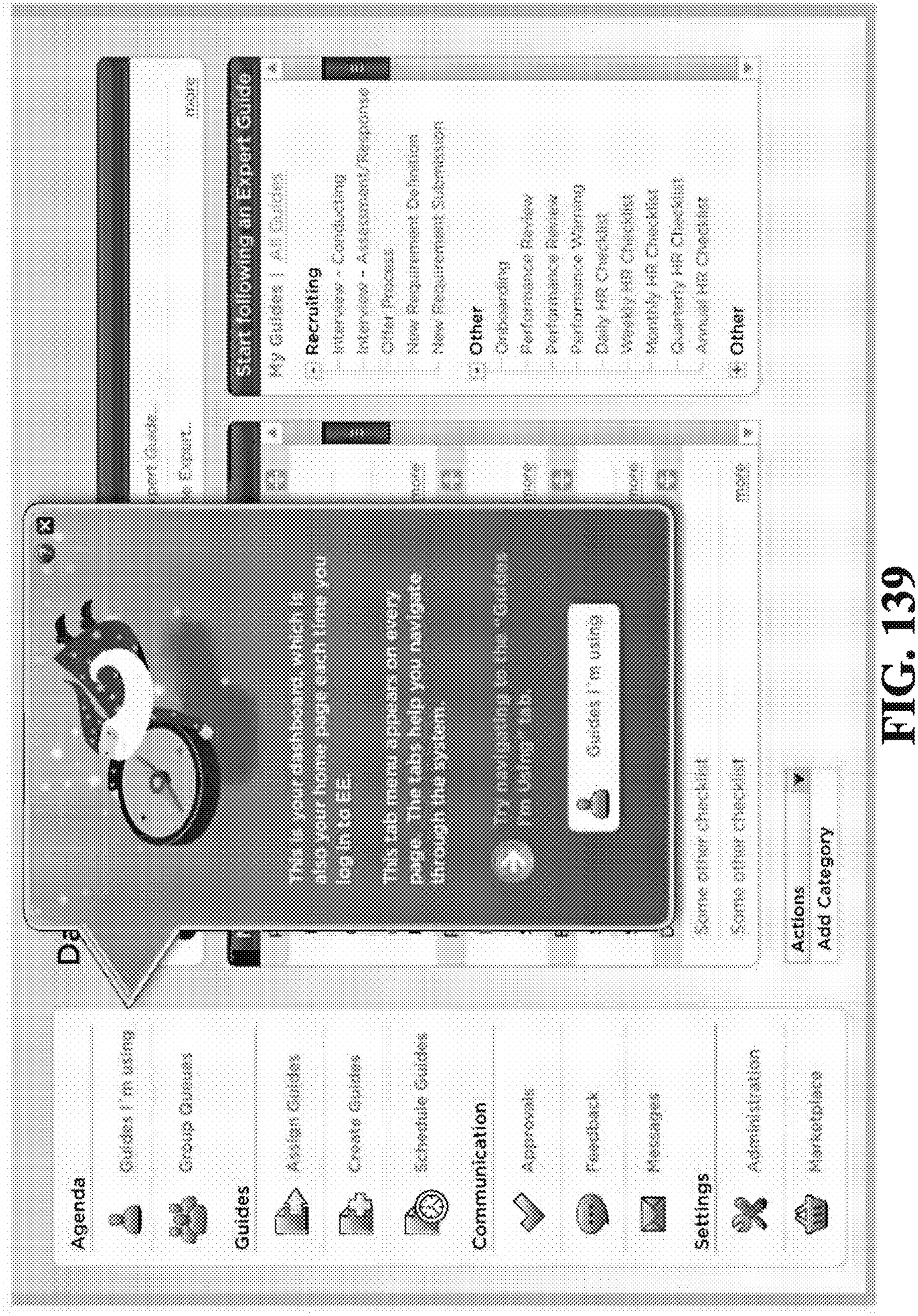
Figure 140:
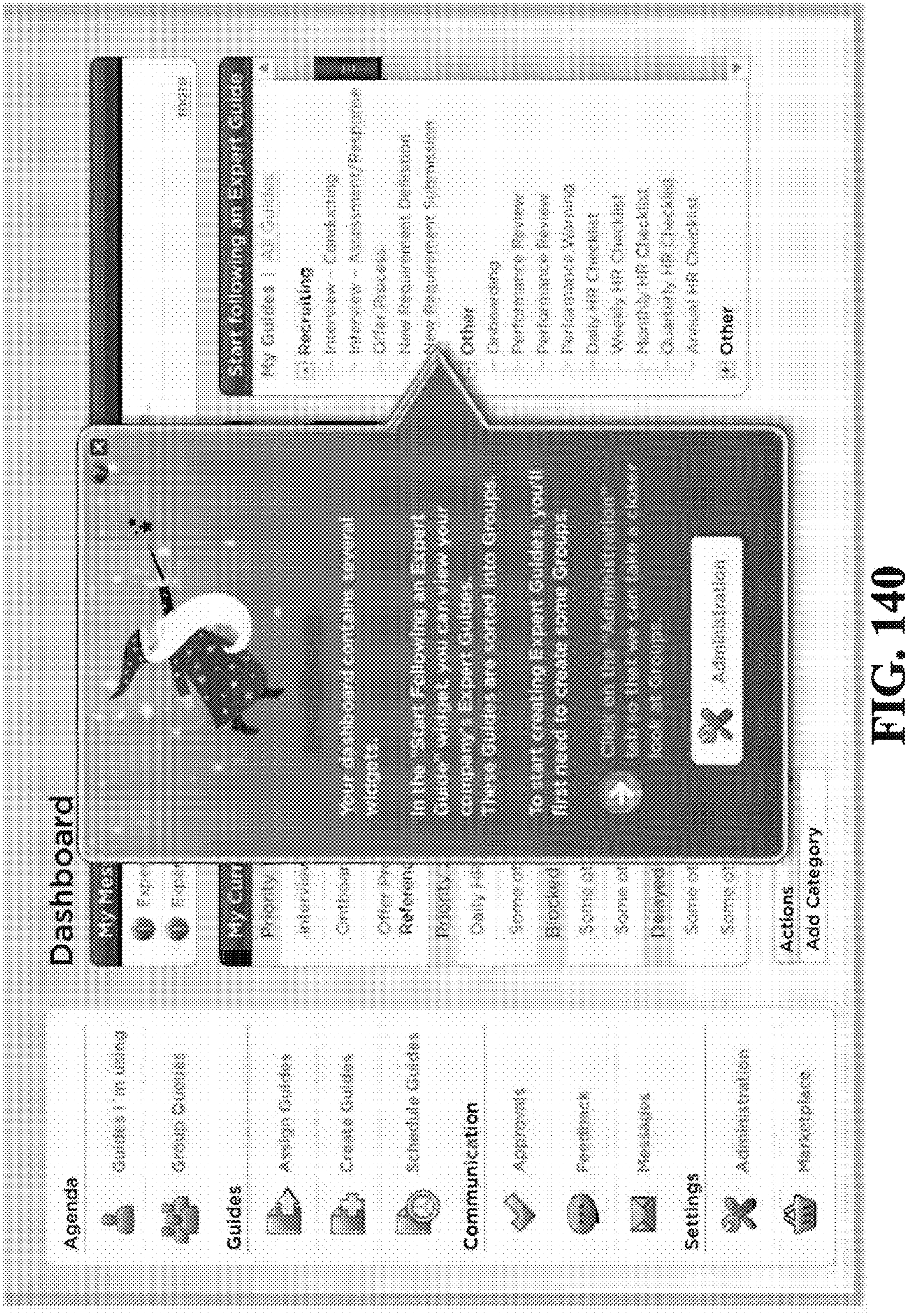
Figure 141:
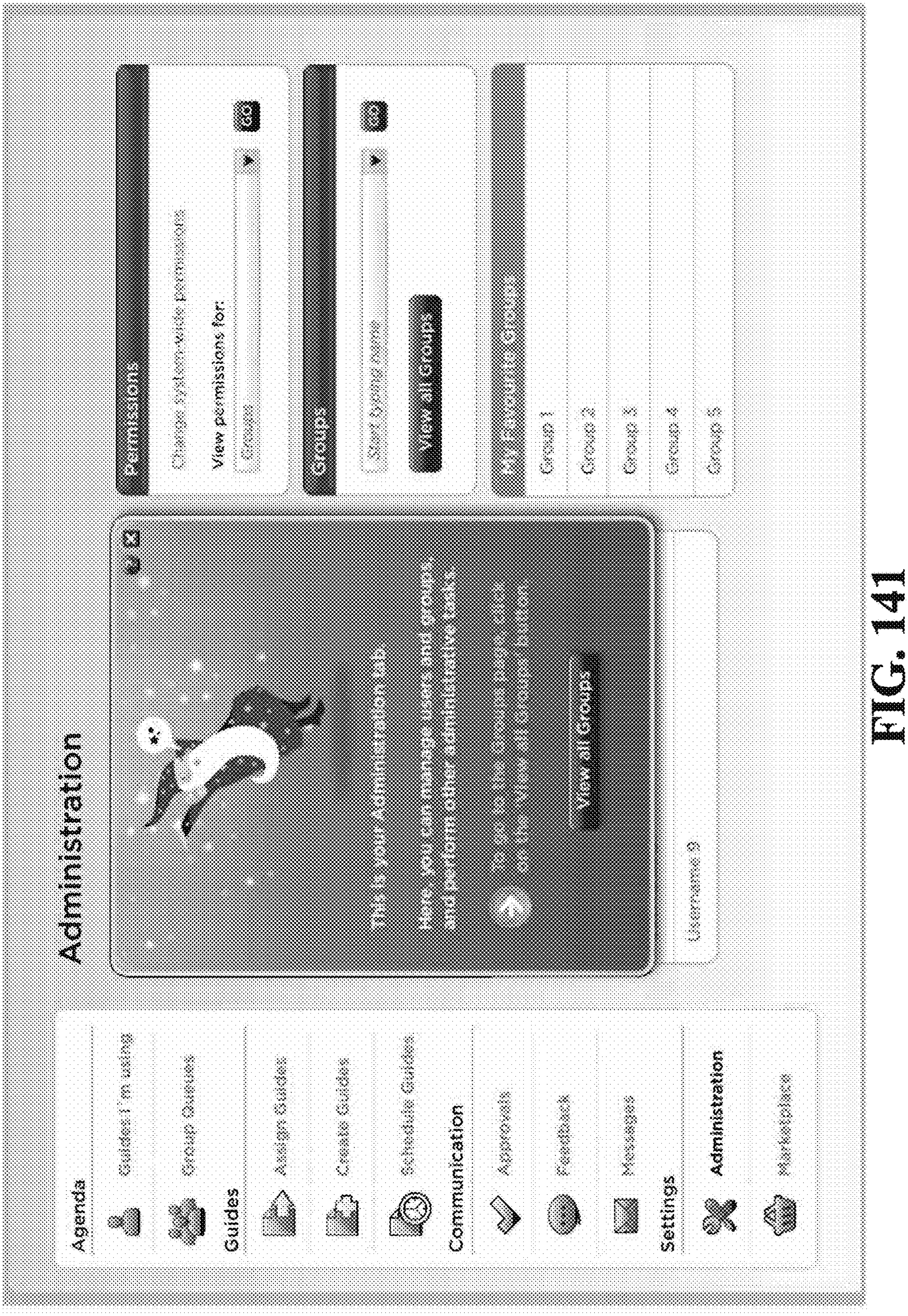
Figure 142:
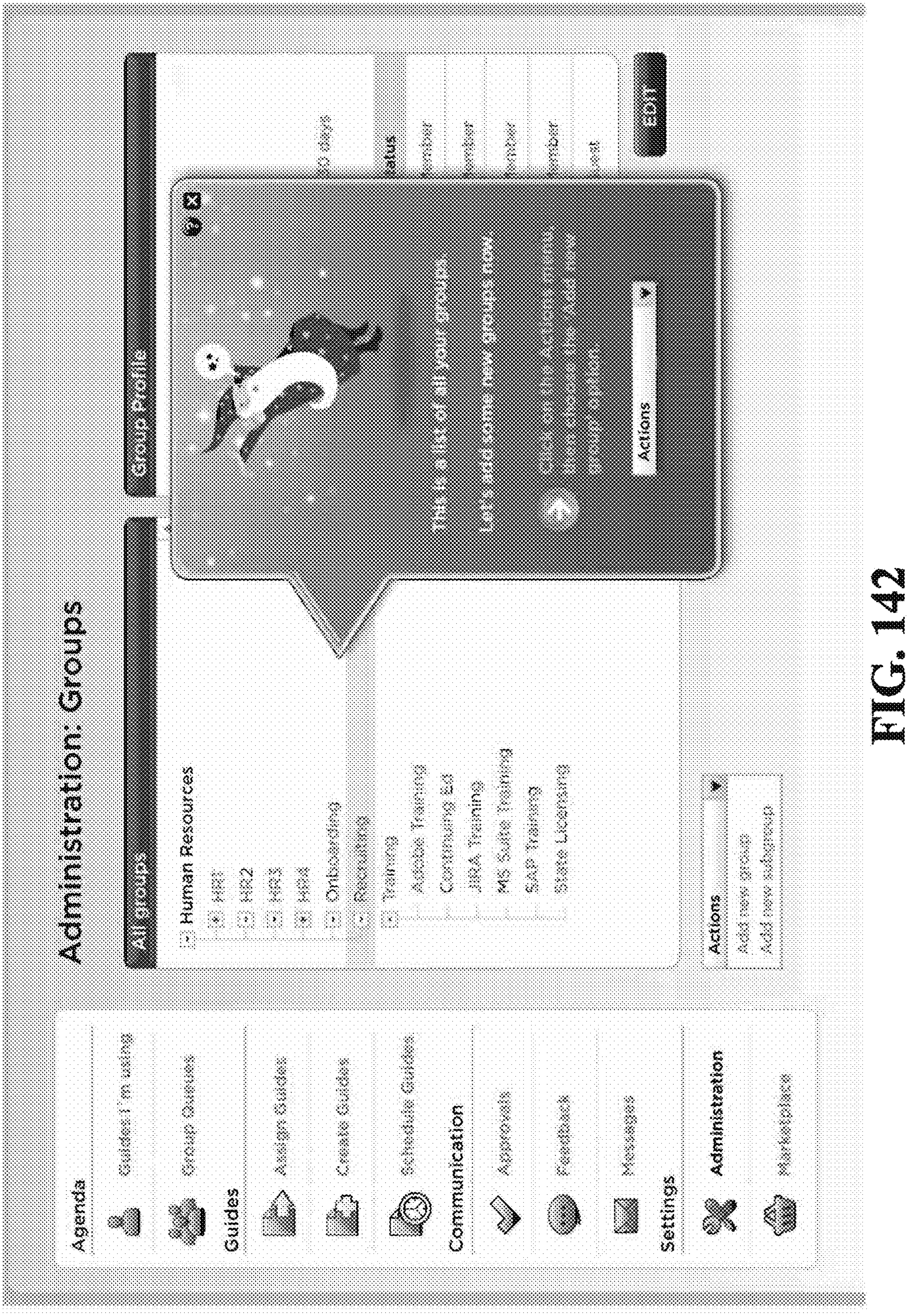
Figure 143:
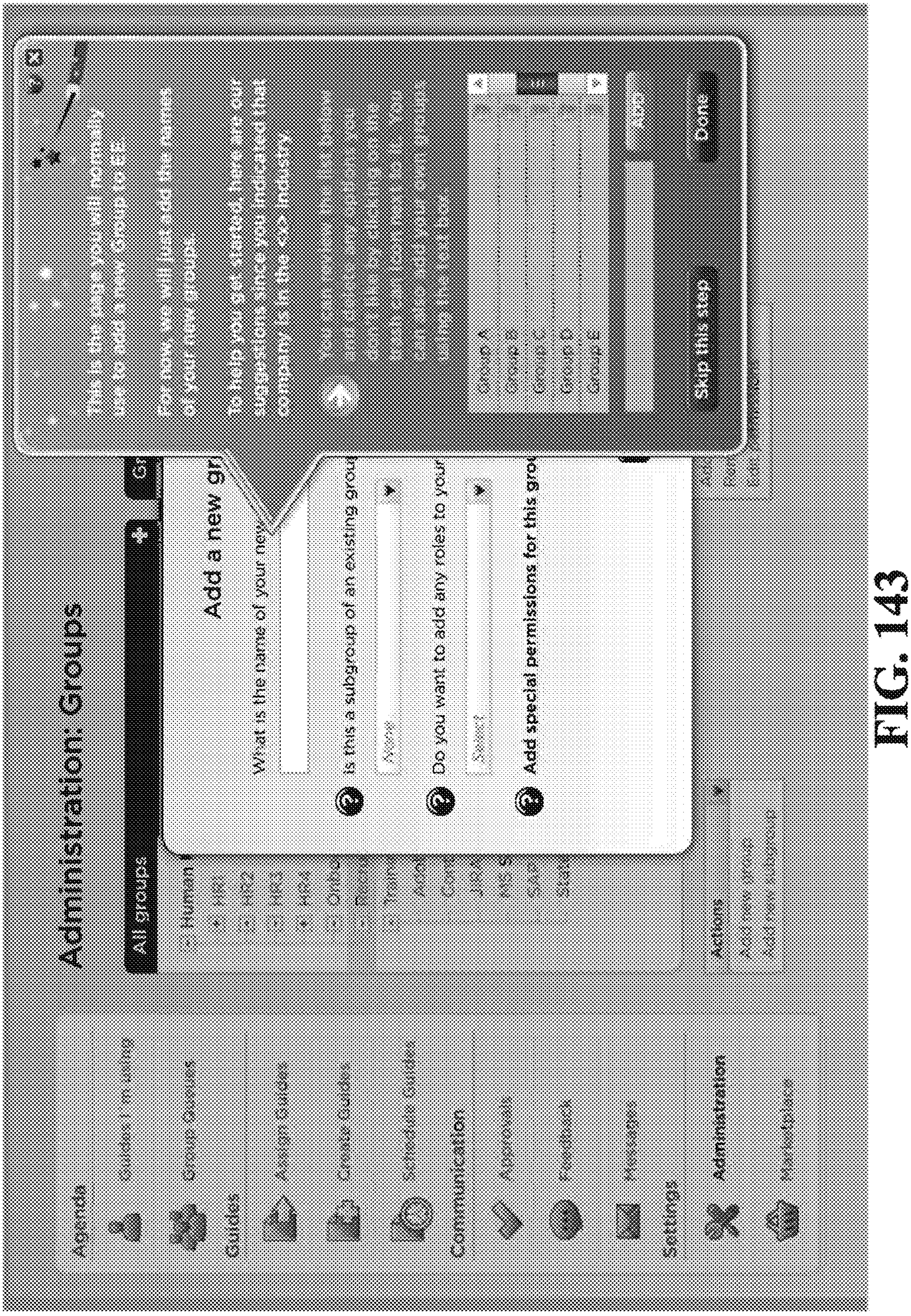
Figure 144:
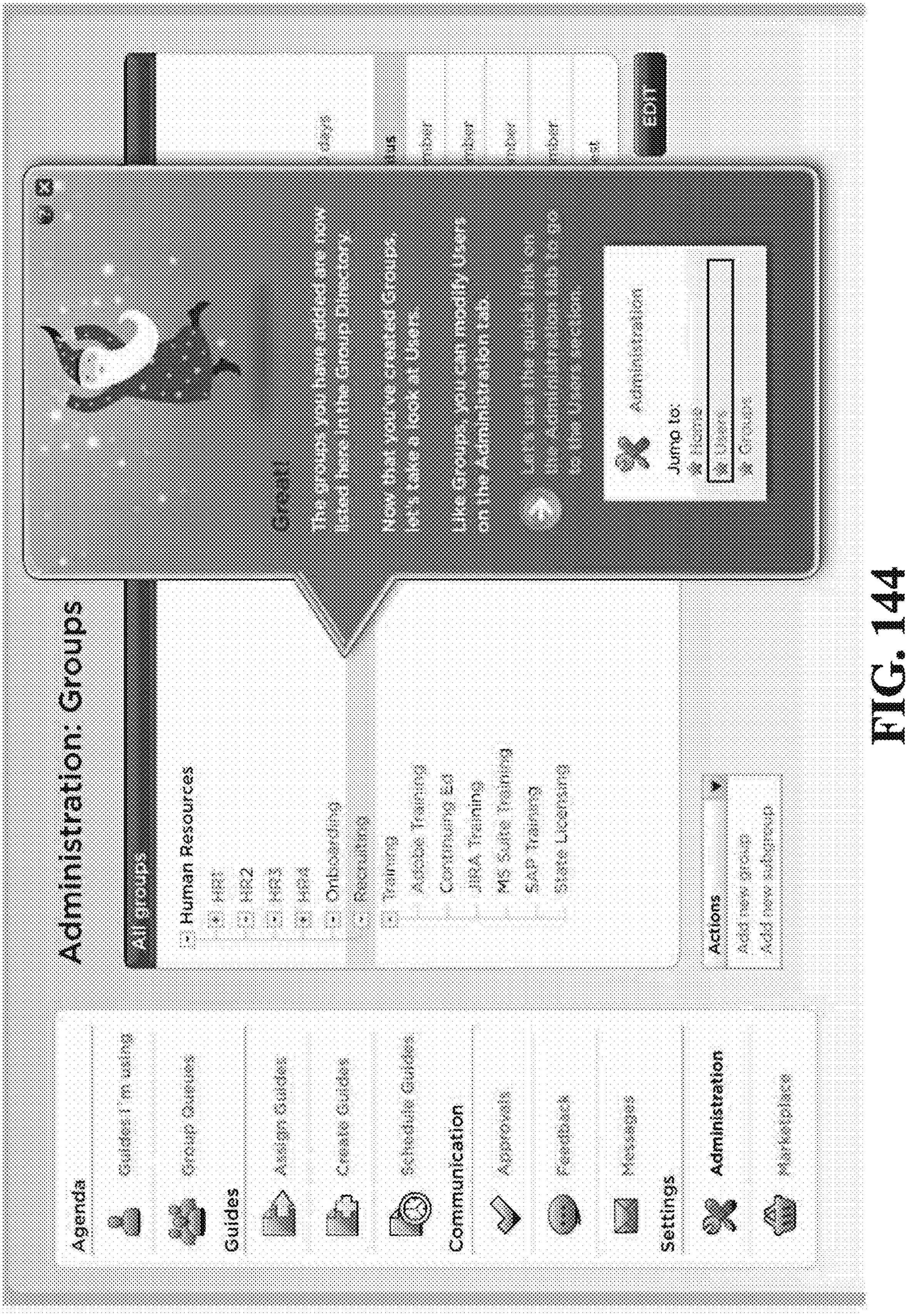
Figure 145:
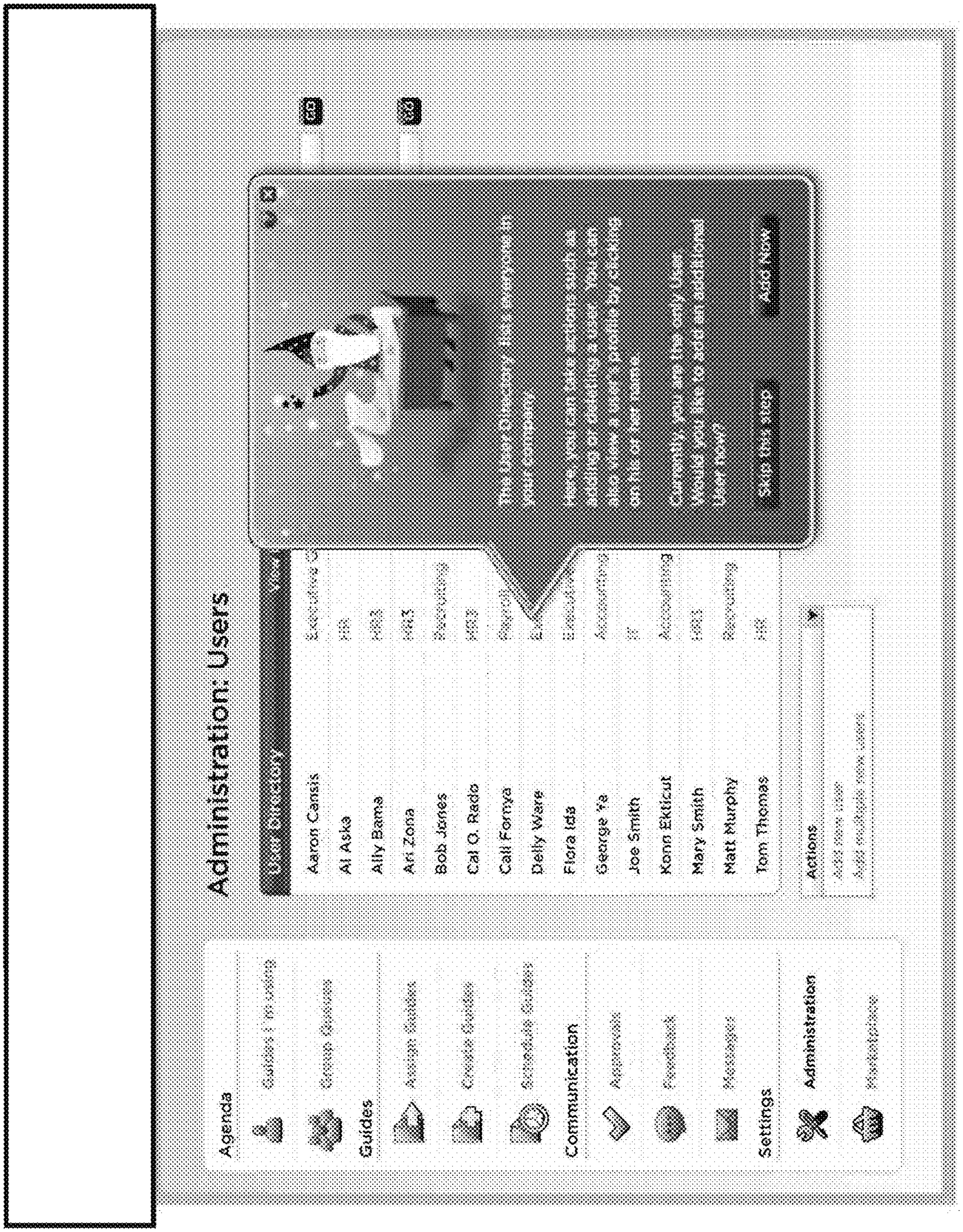
Figure 146:
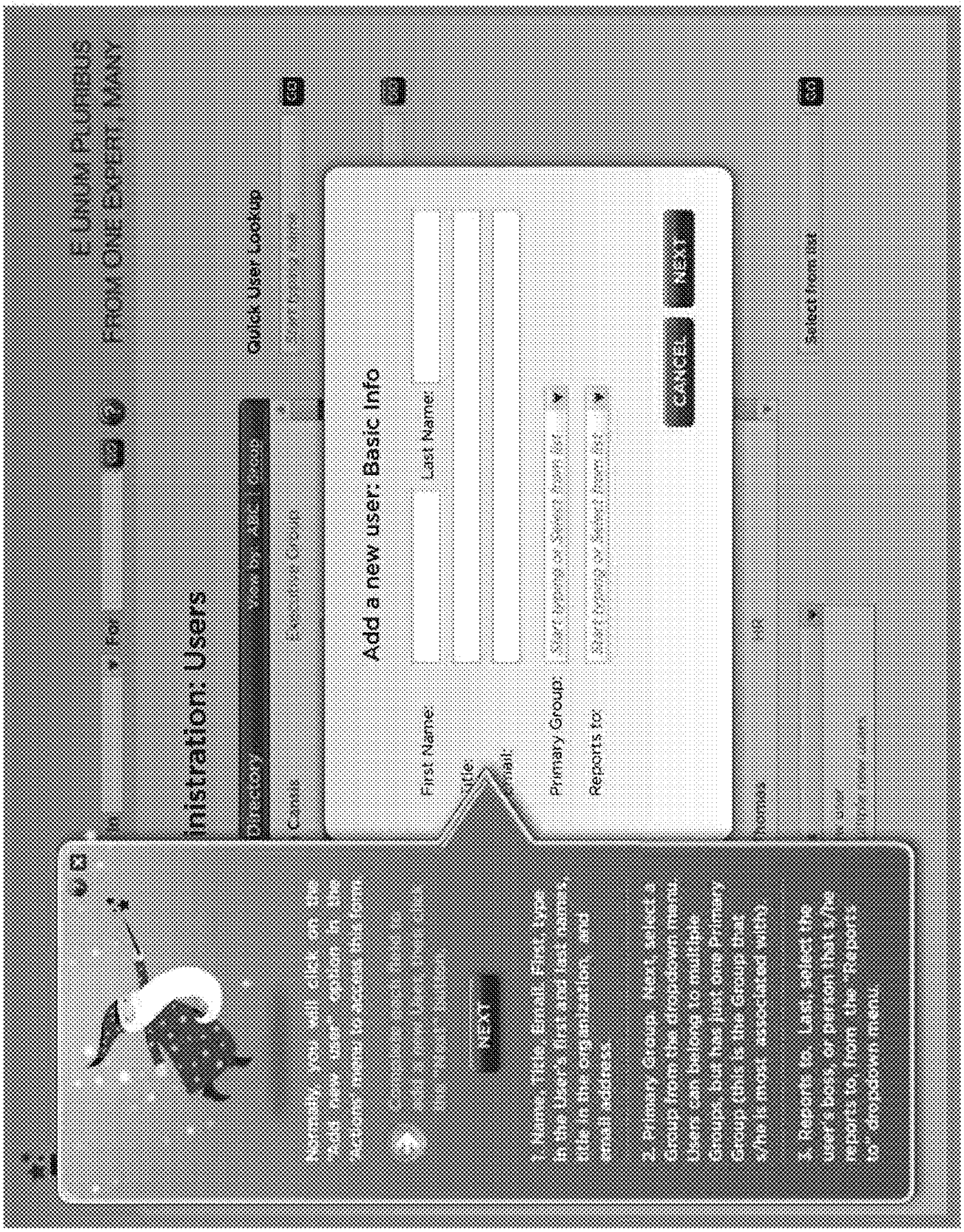
Figure 147:
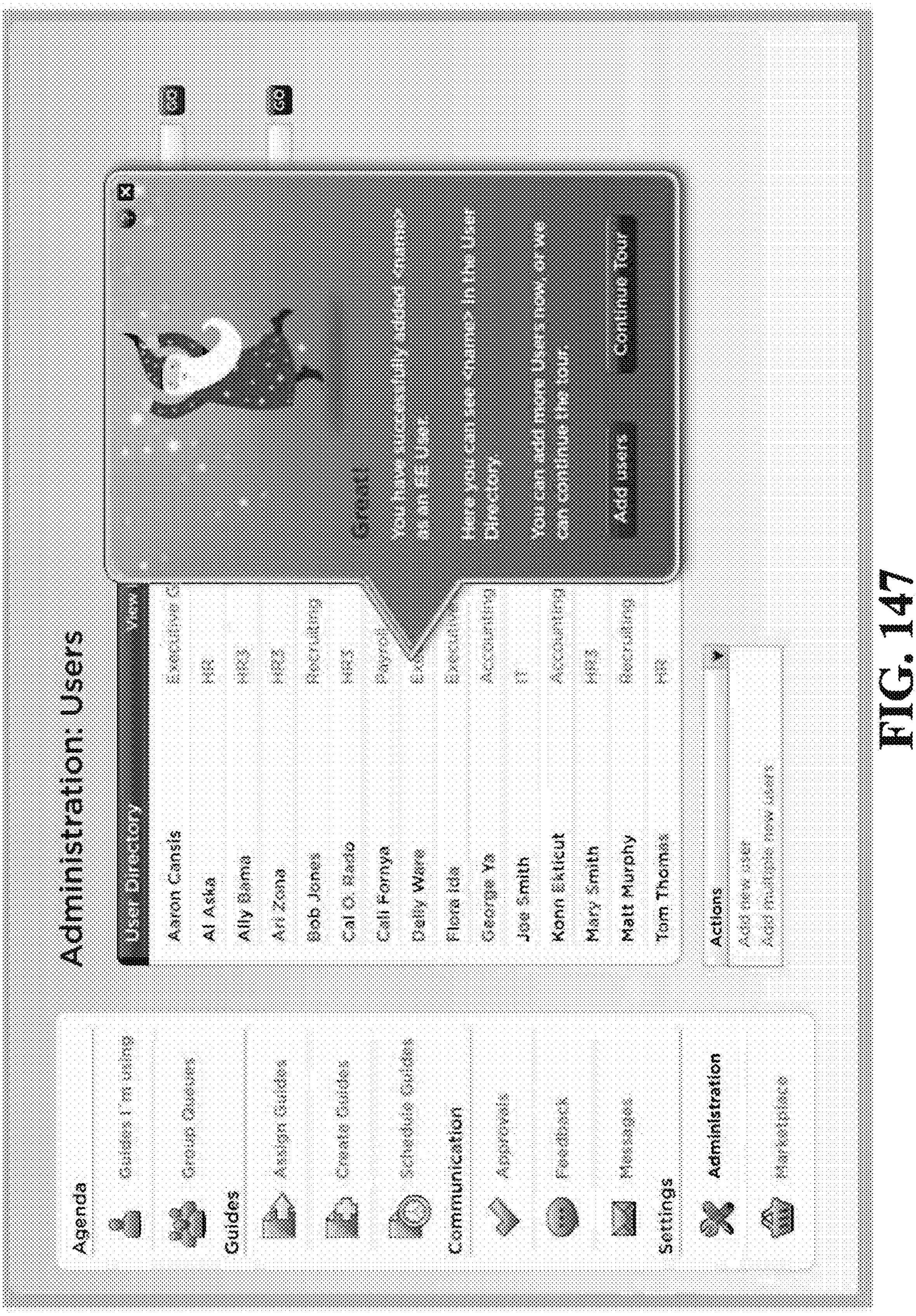
Figure 148:
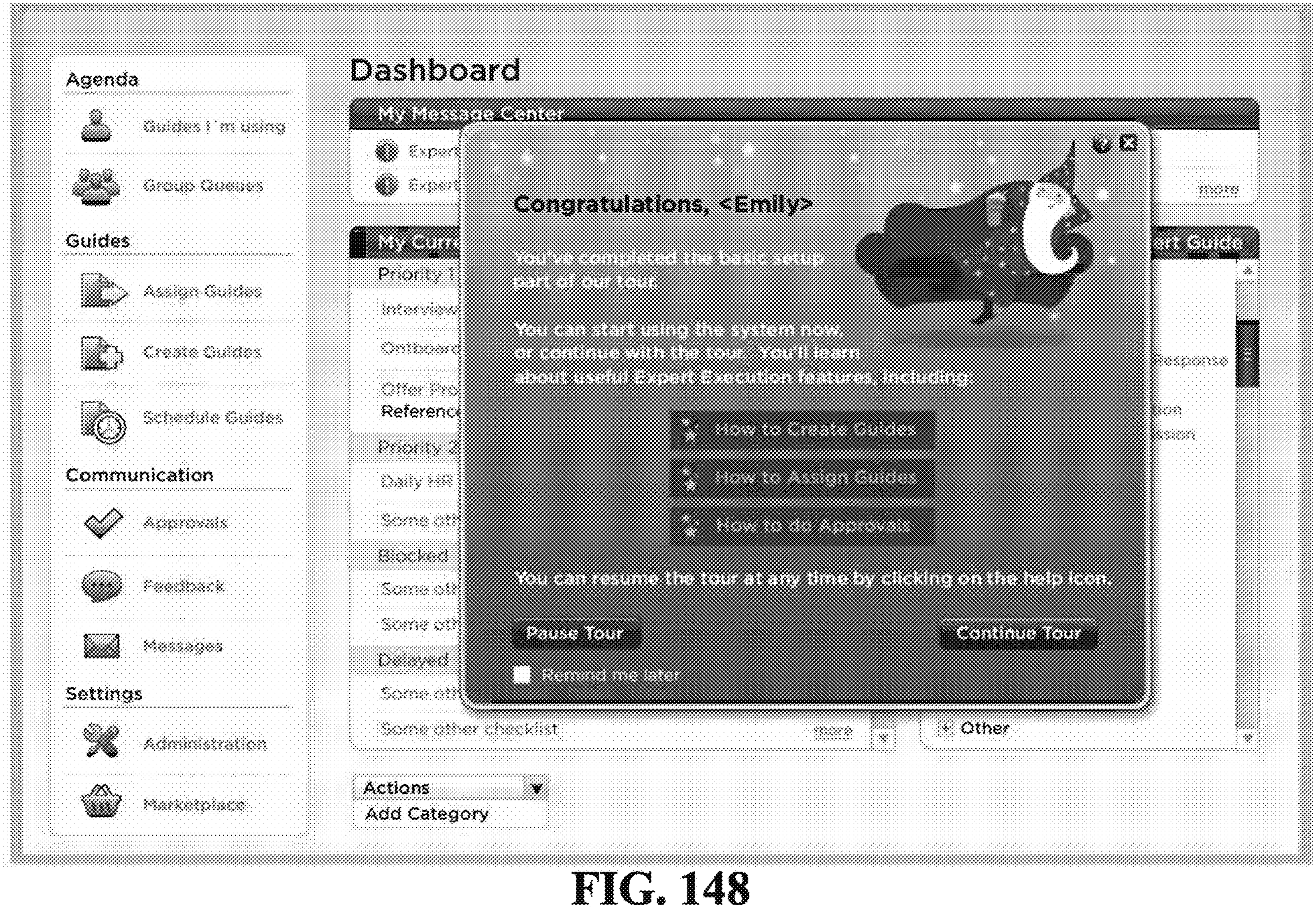
Figure 149:
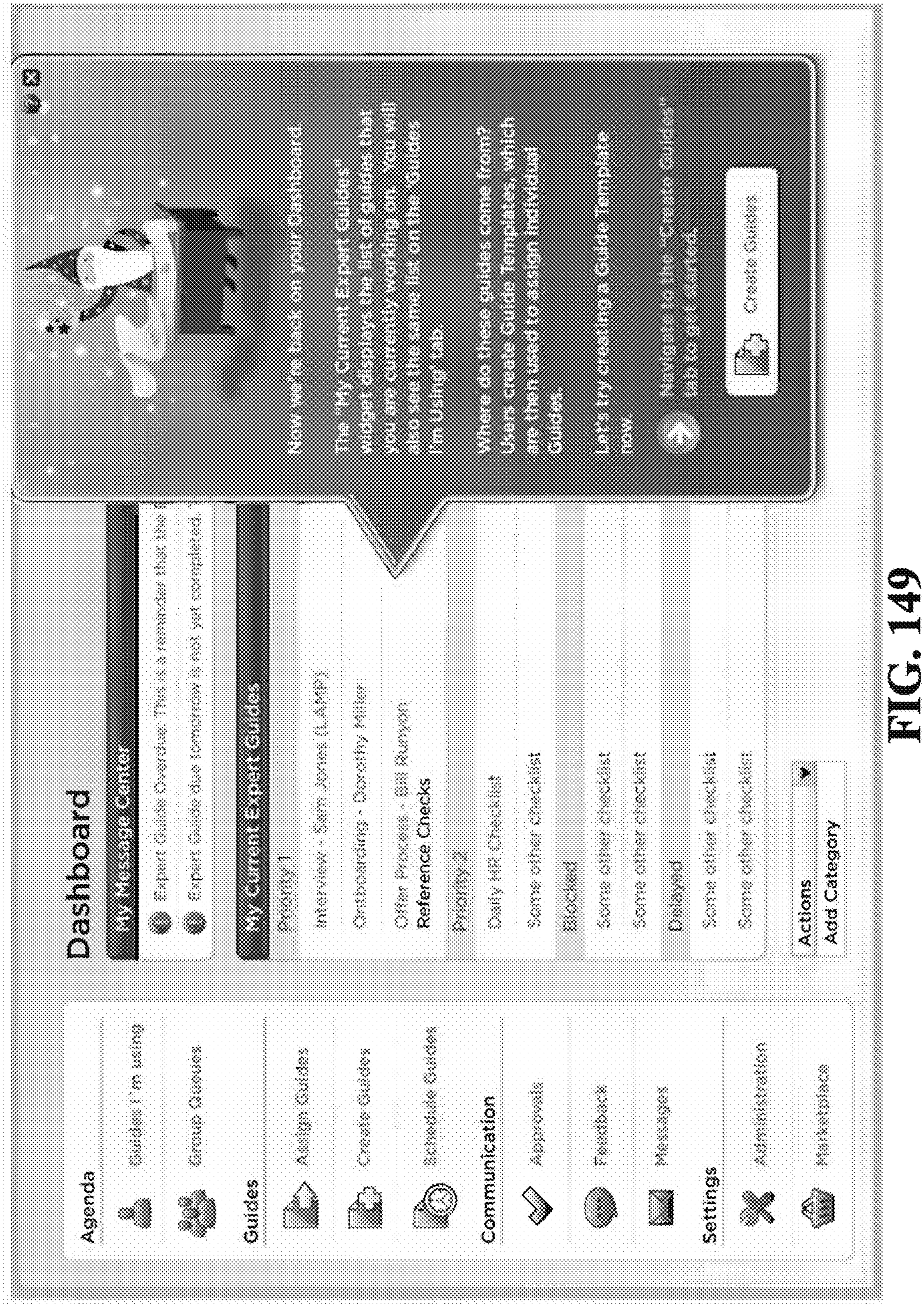
Figure 150:
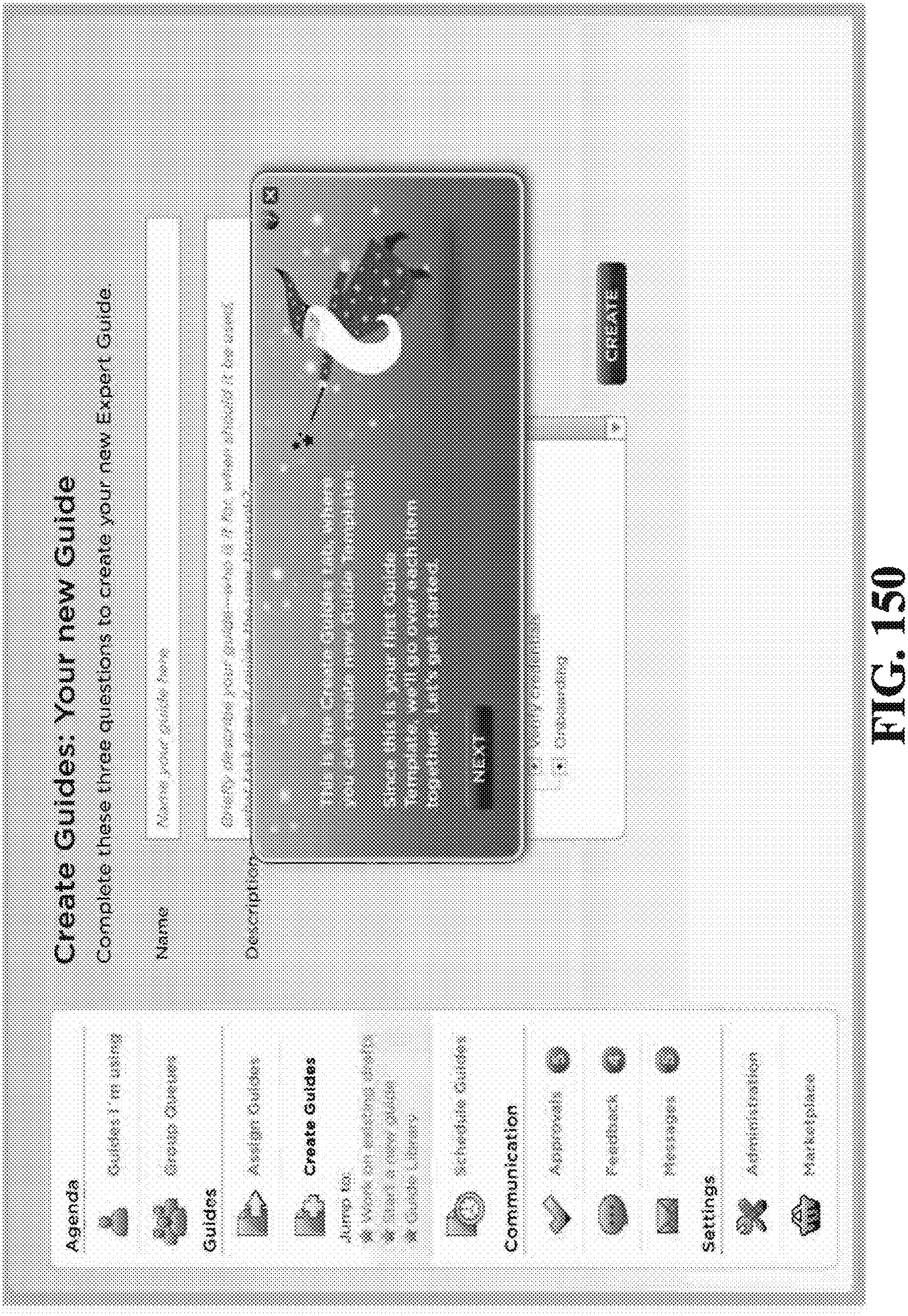
Figure 151:
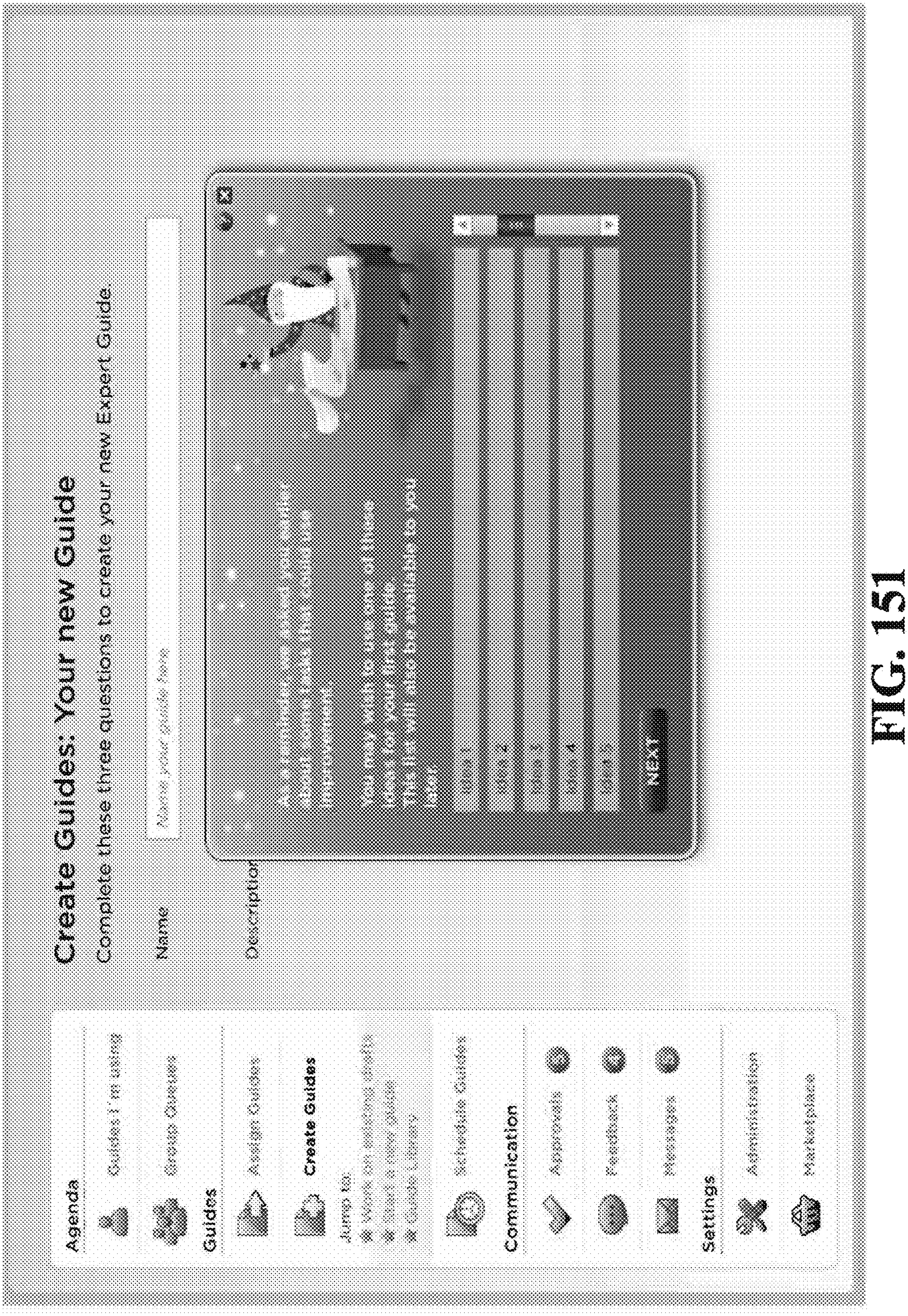
Figure 152:
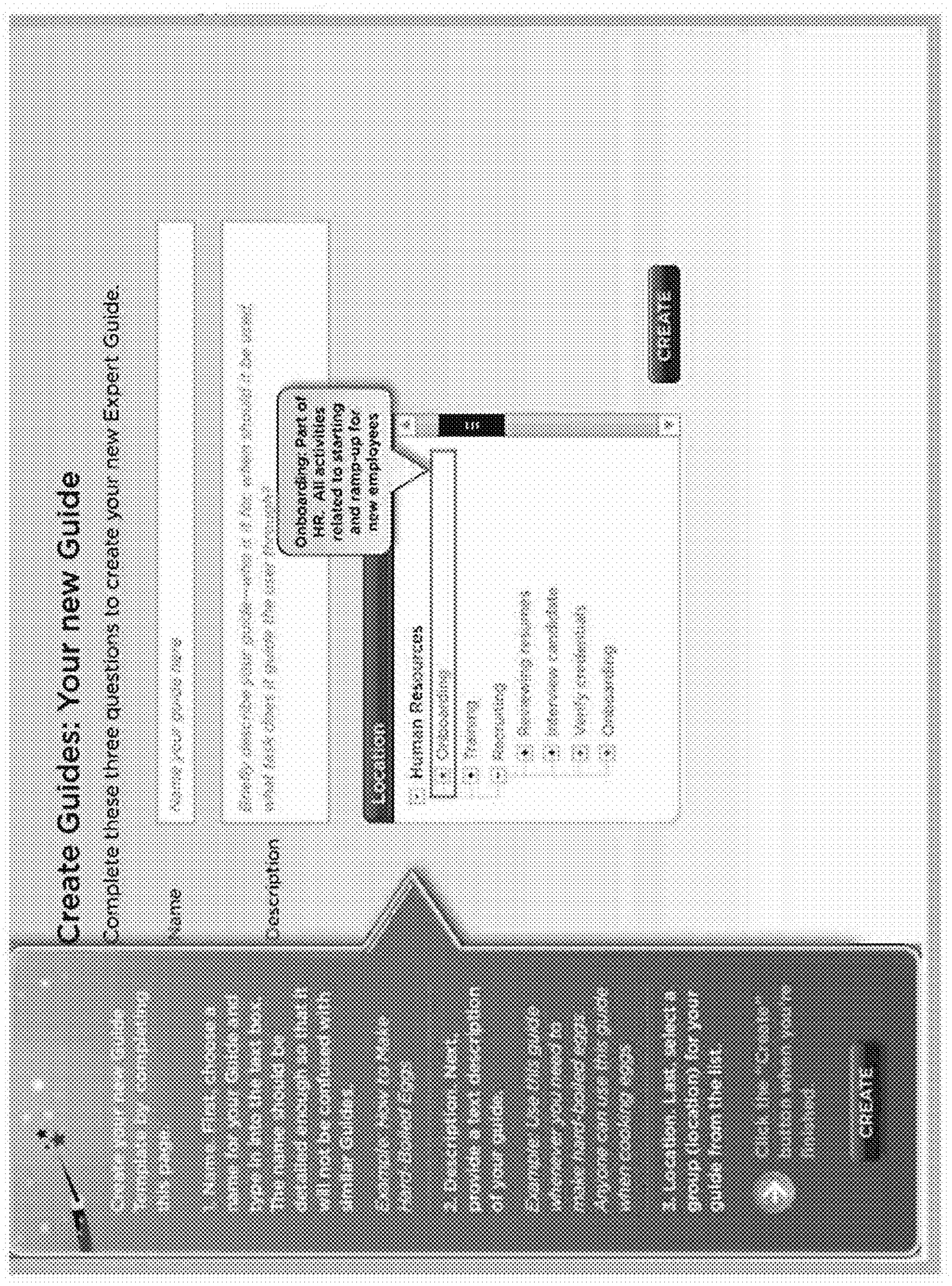
Figure 153:
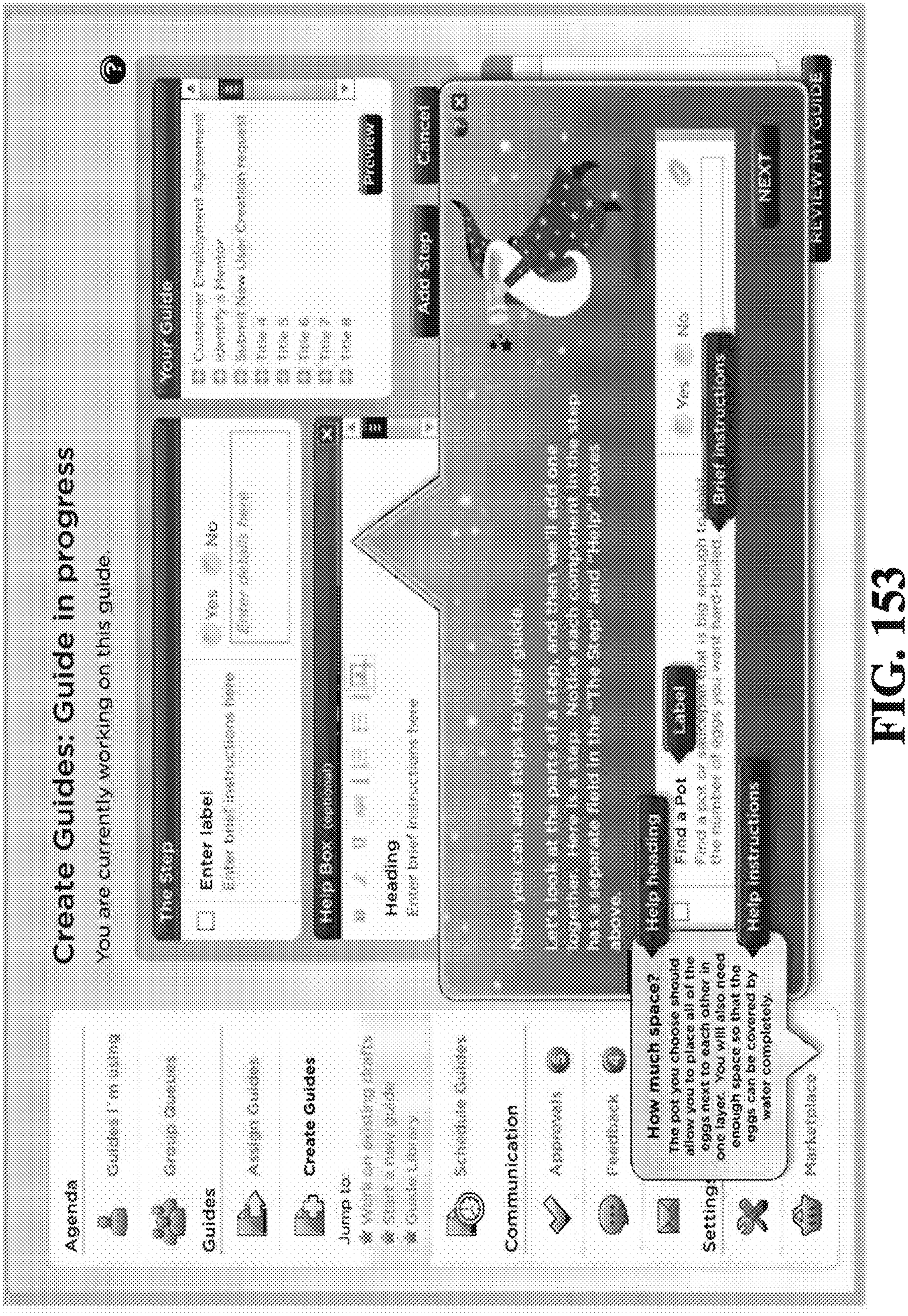
Figure 154:
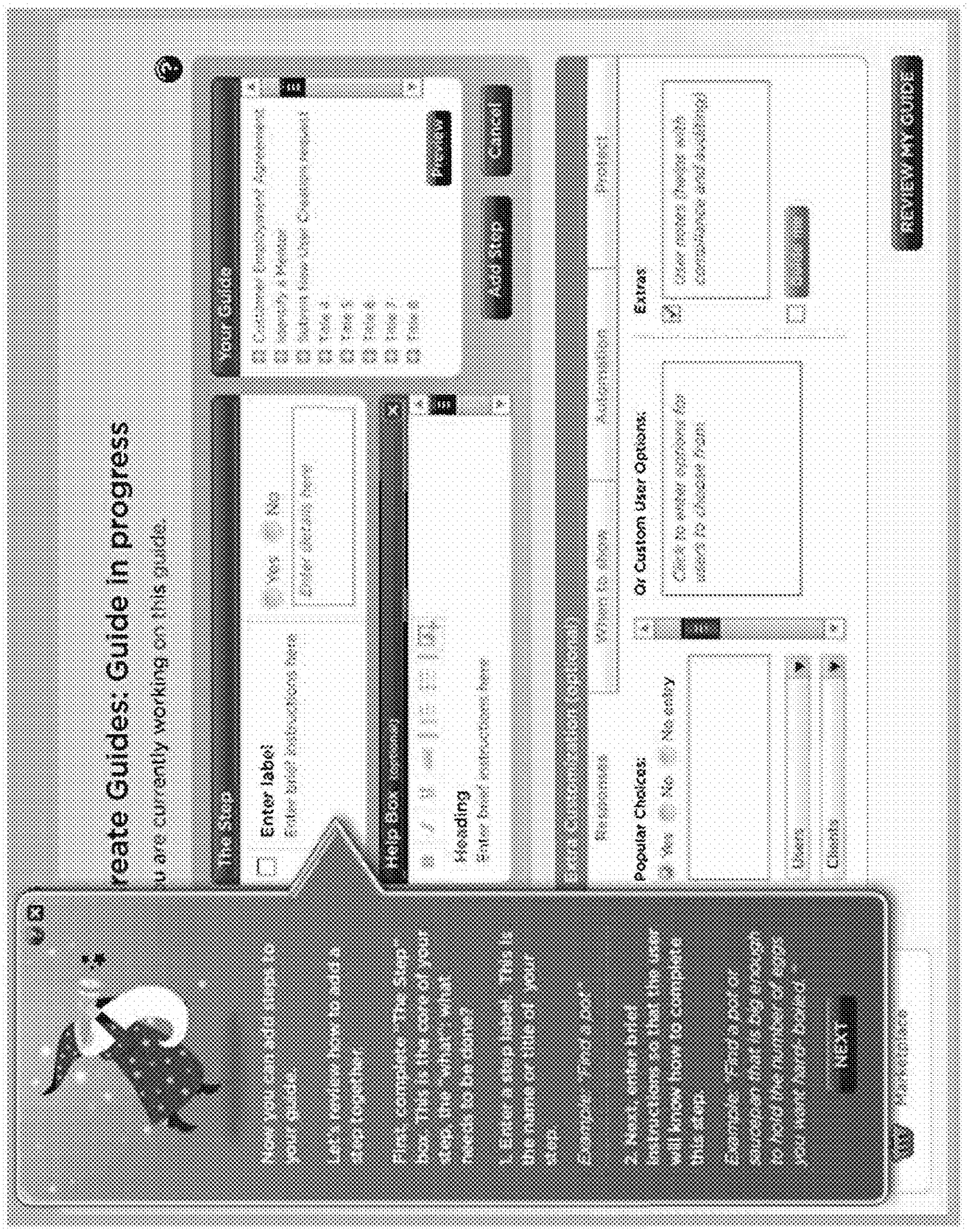
Figure 155:
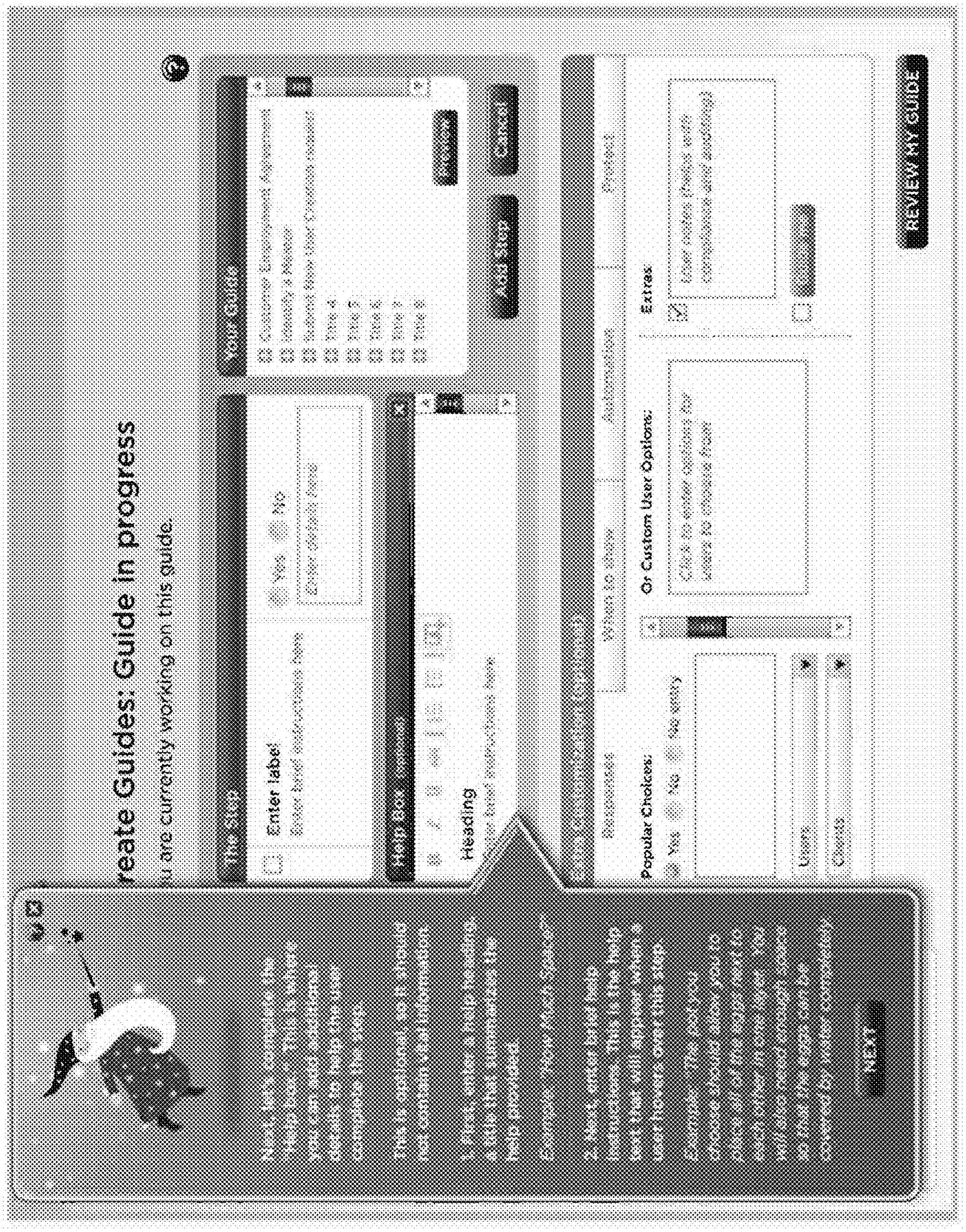
Figure 156:
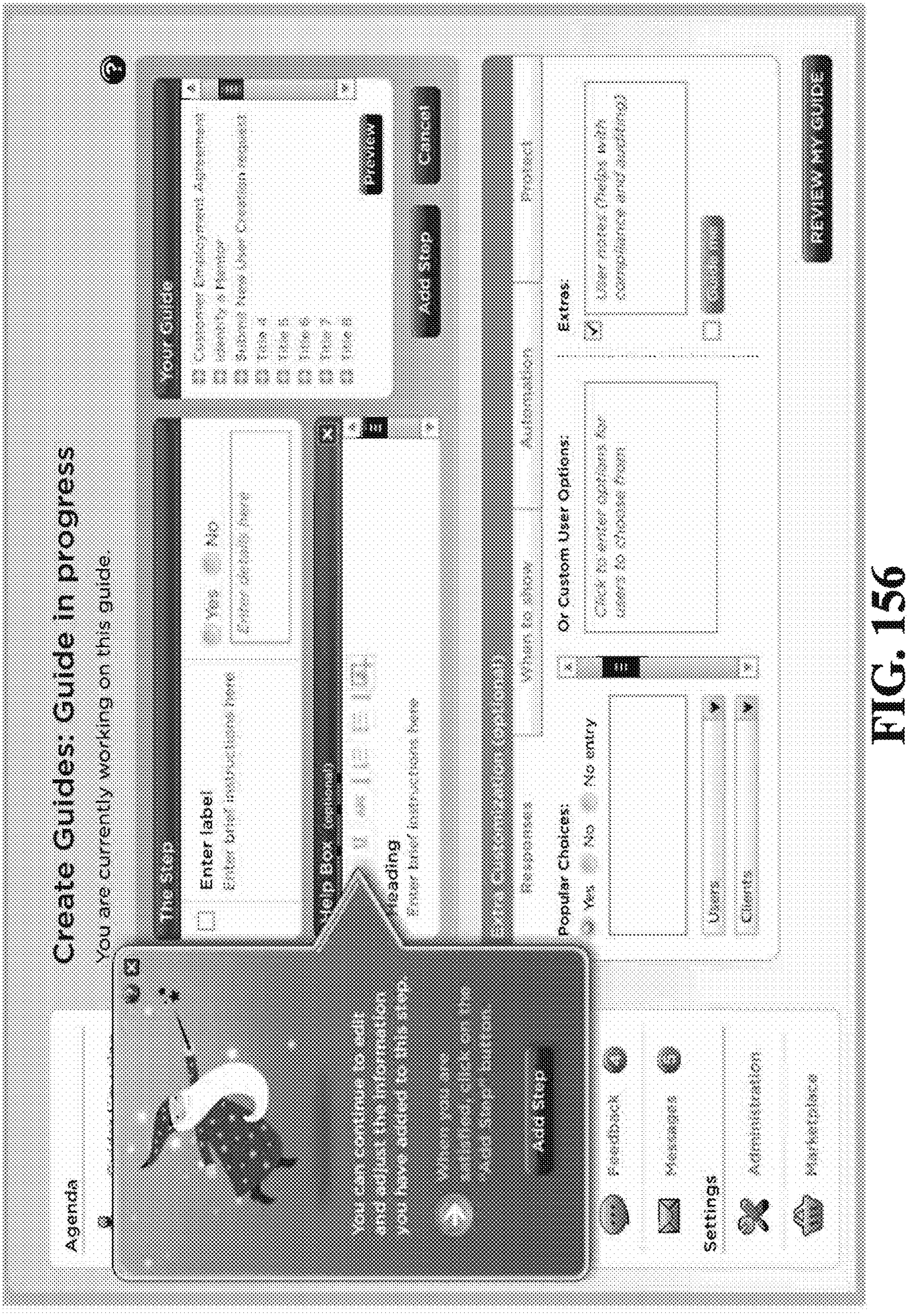
Figure 157:
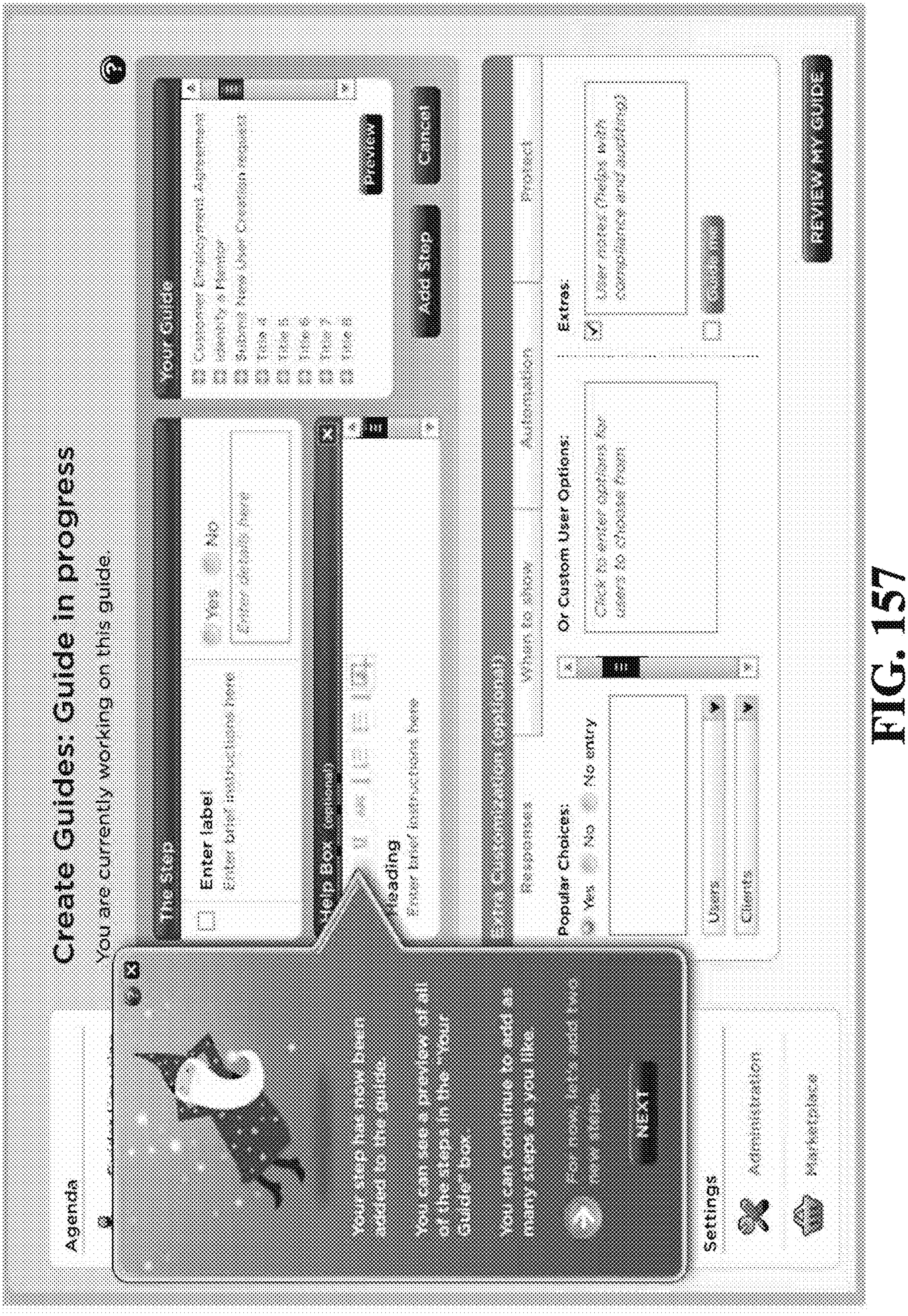
Figure 158:
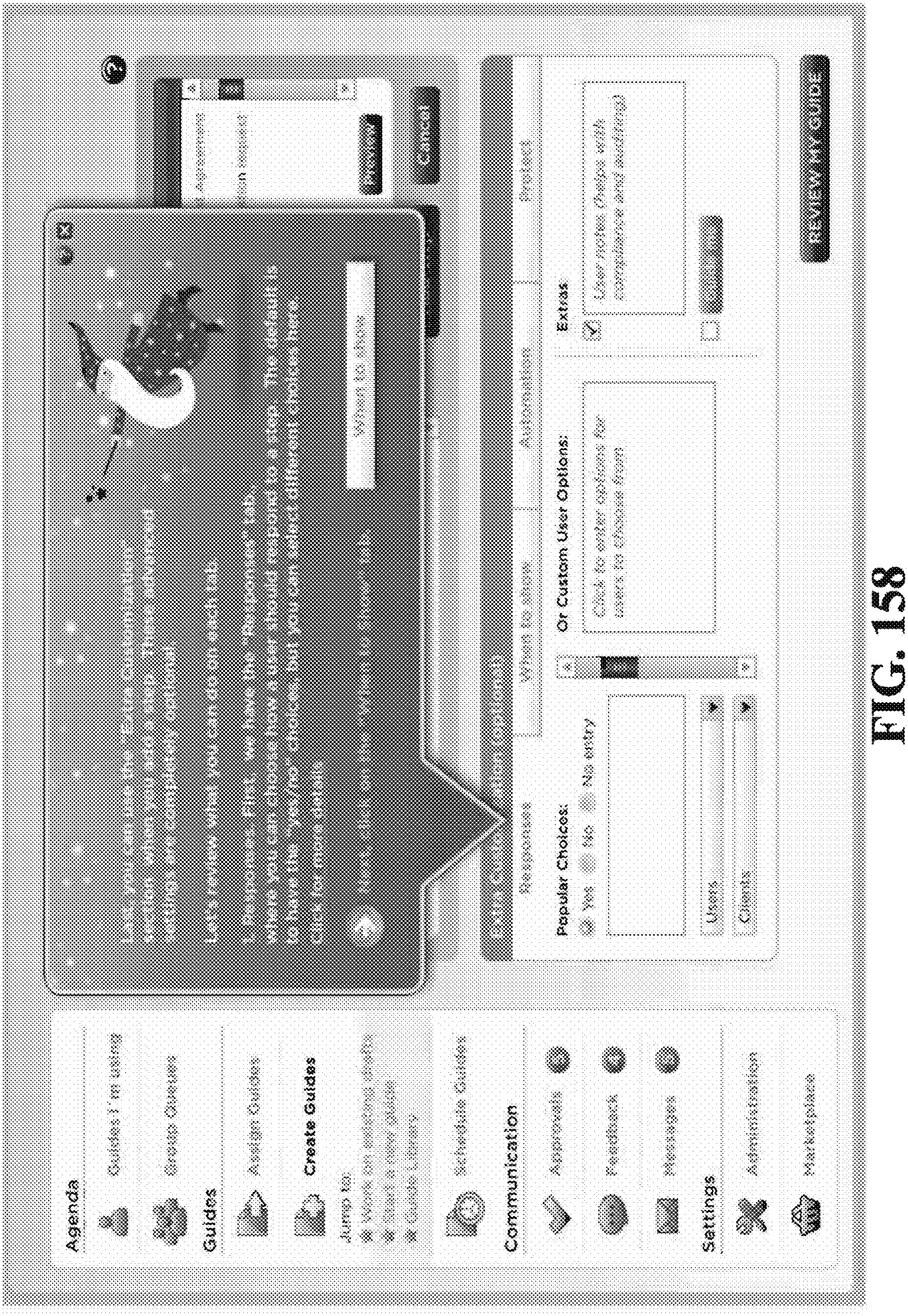
Figure 159:
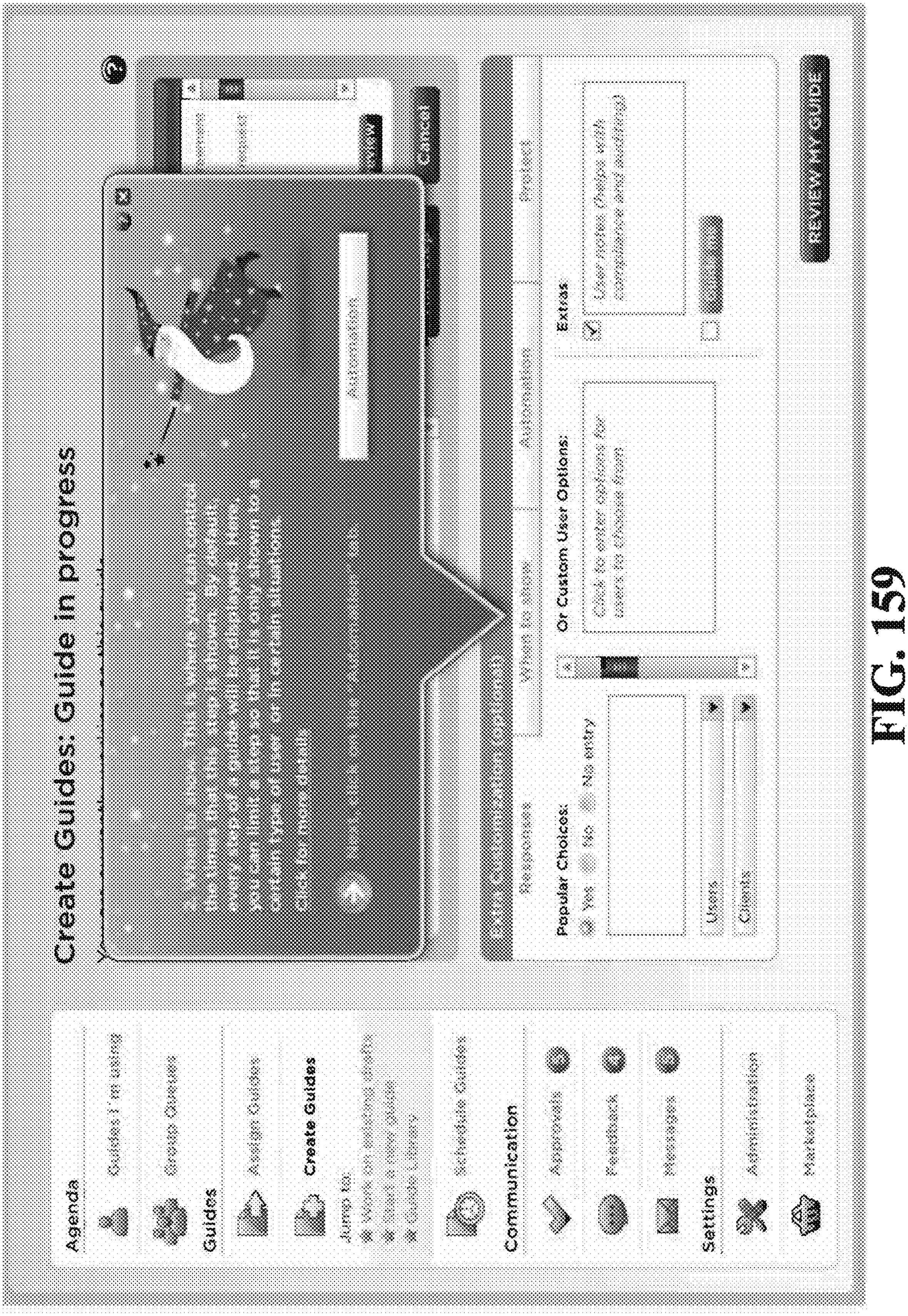
Figure 160:
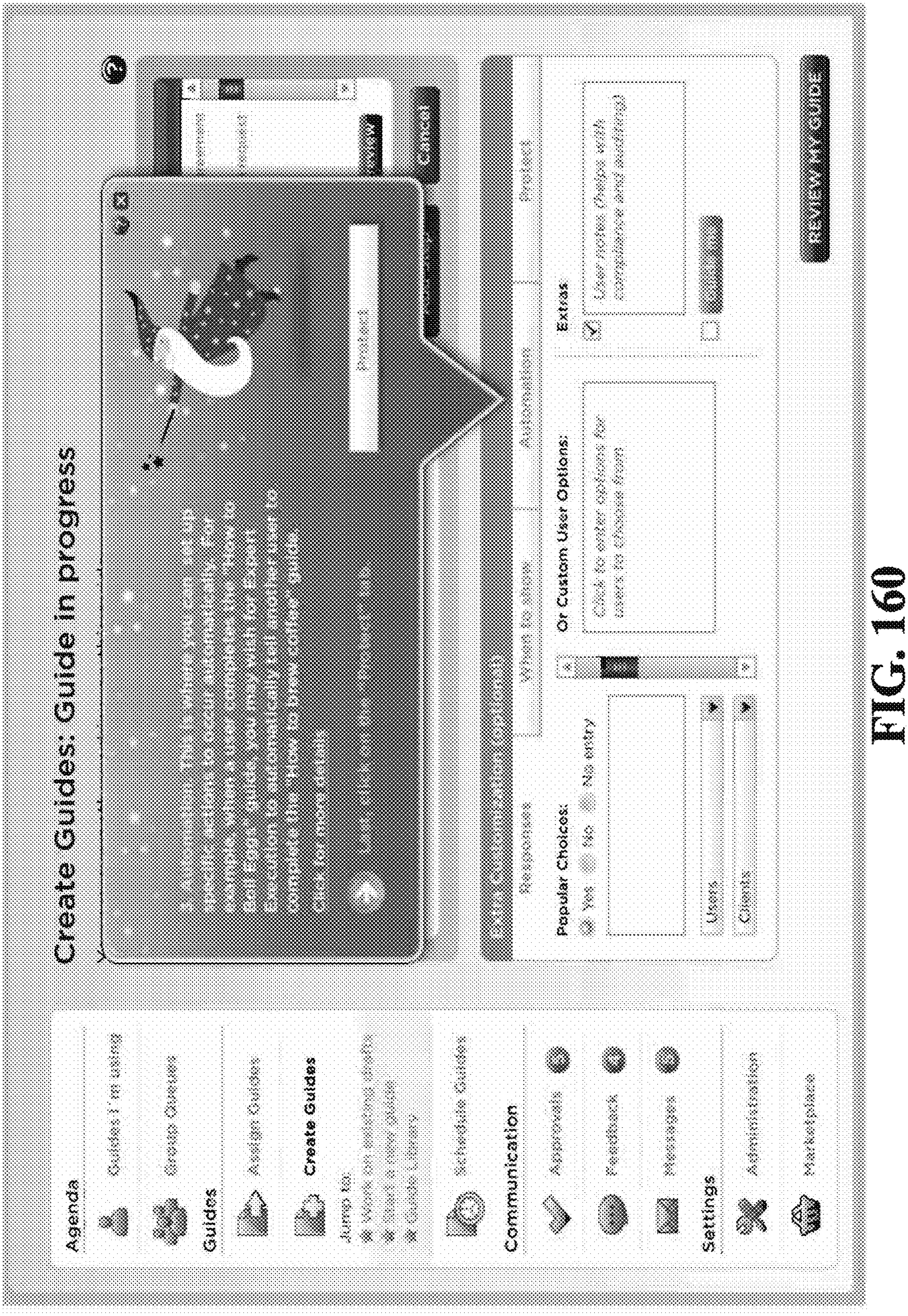
Figure 161:
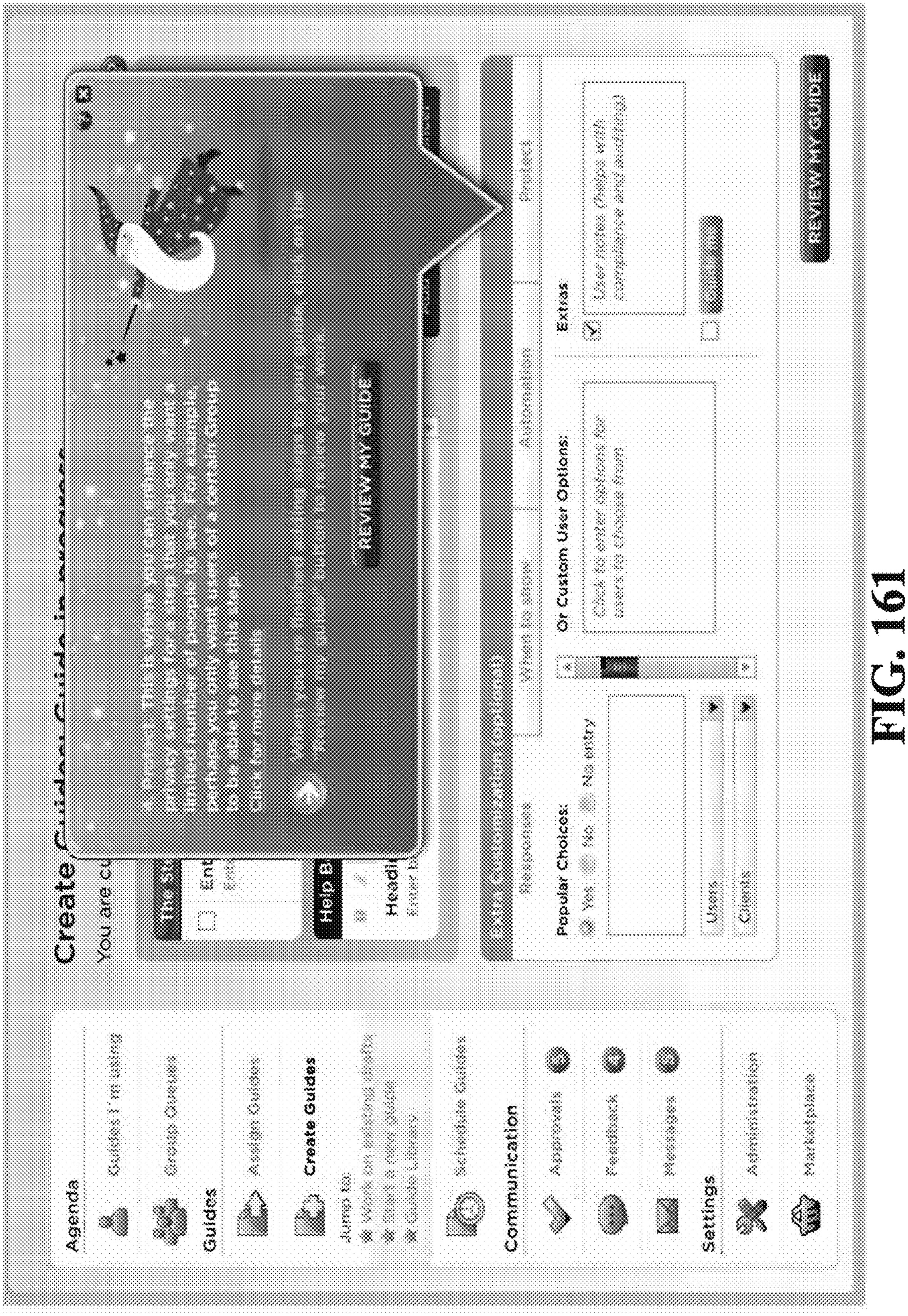
Figure 162:
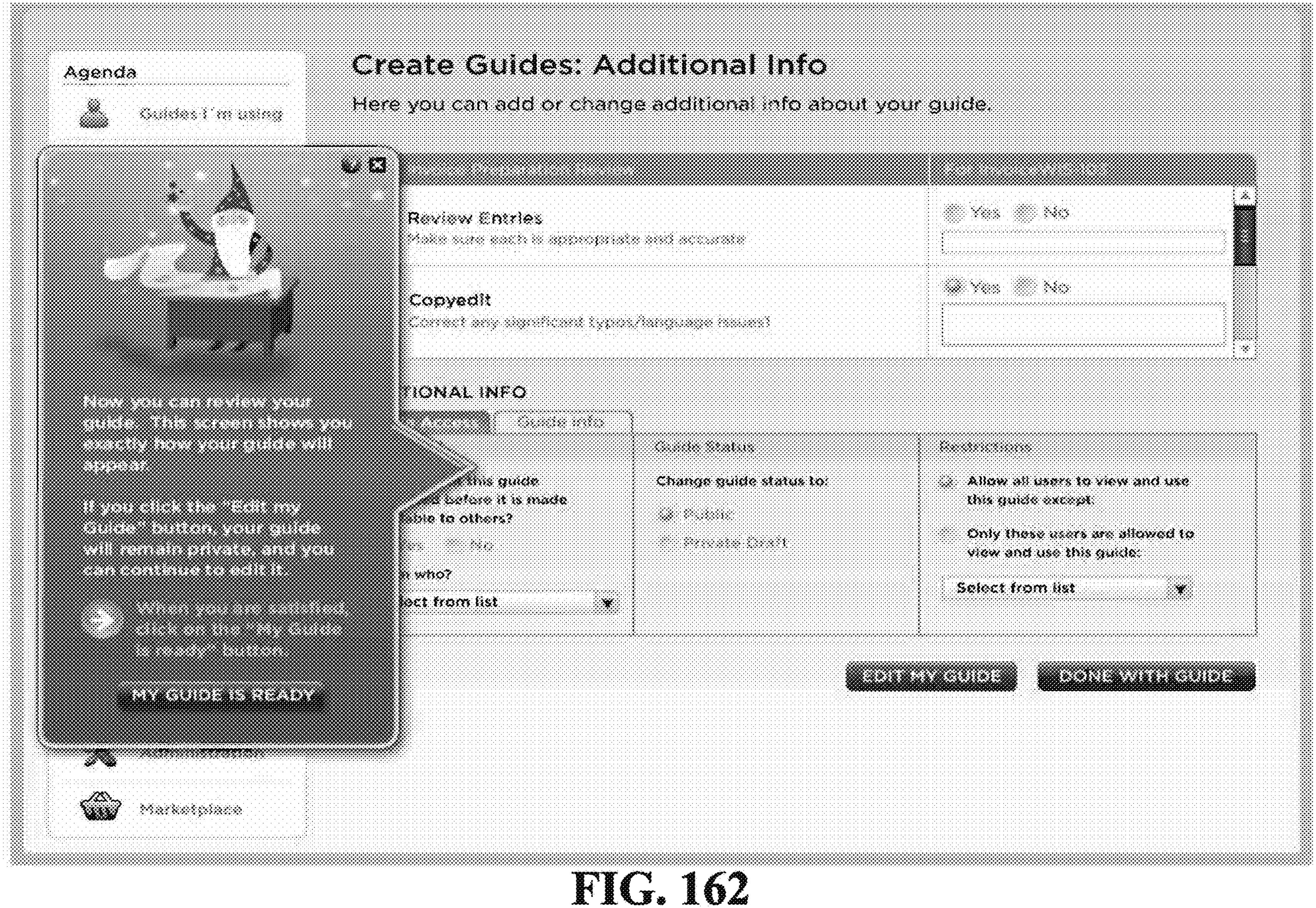
Figure 163:
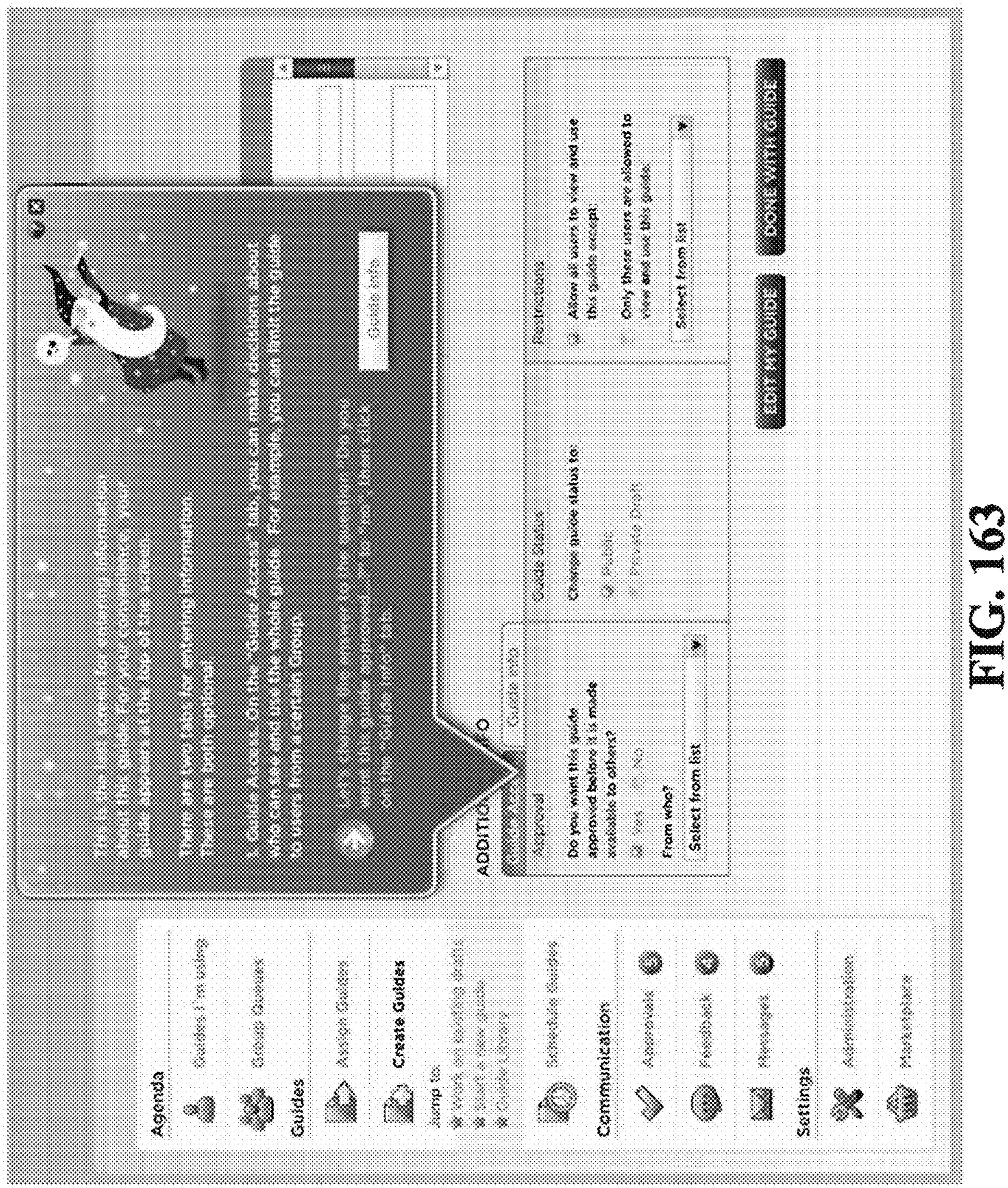
Figure 164:
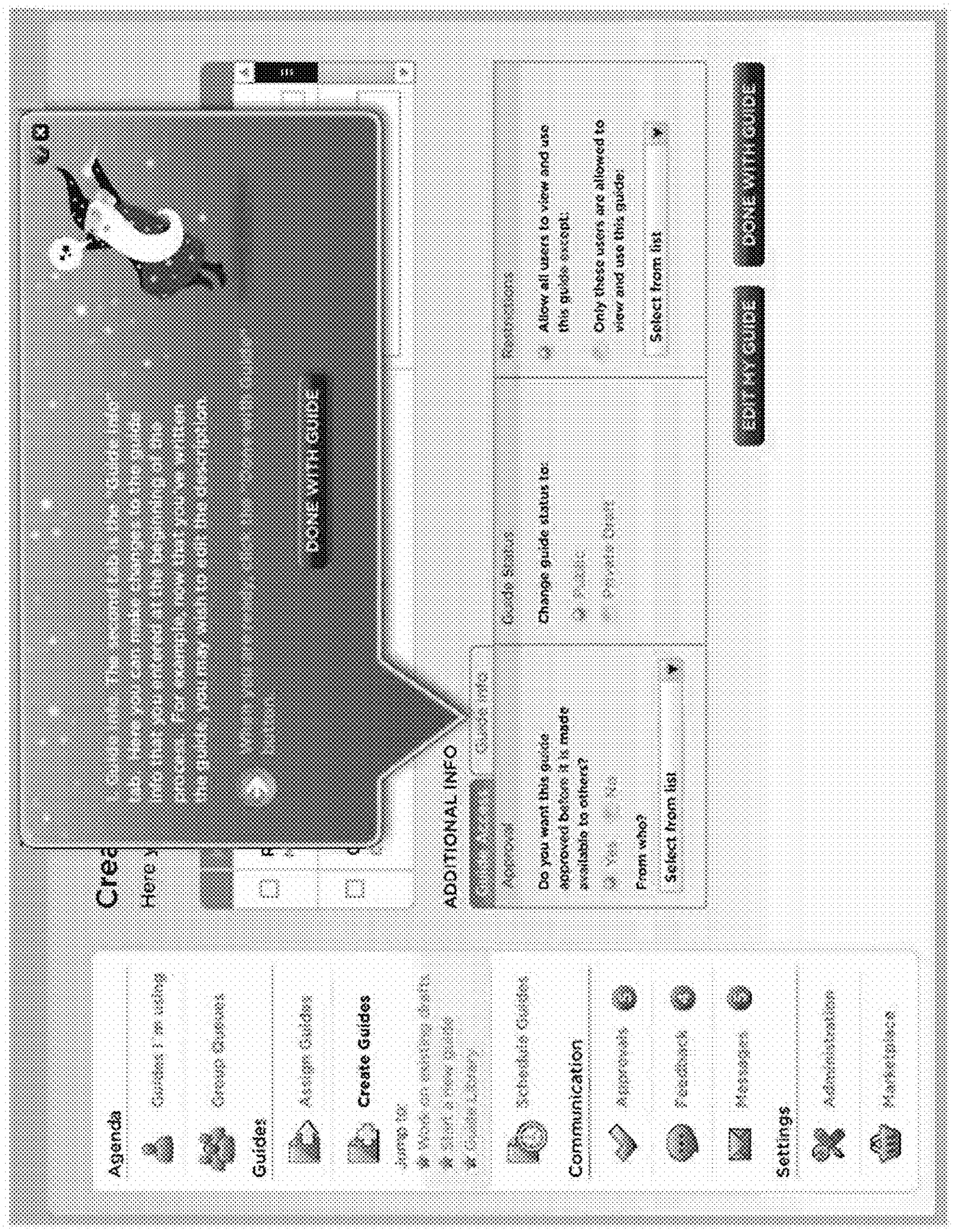
Figure 165:
Figure 166:
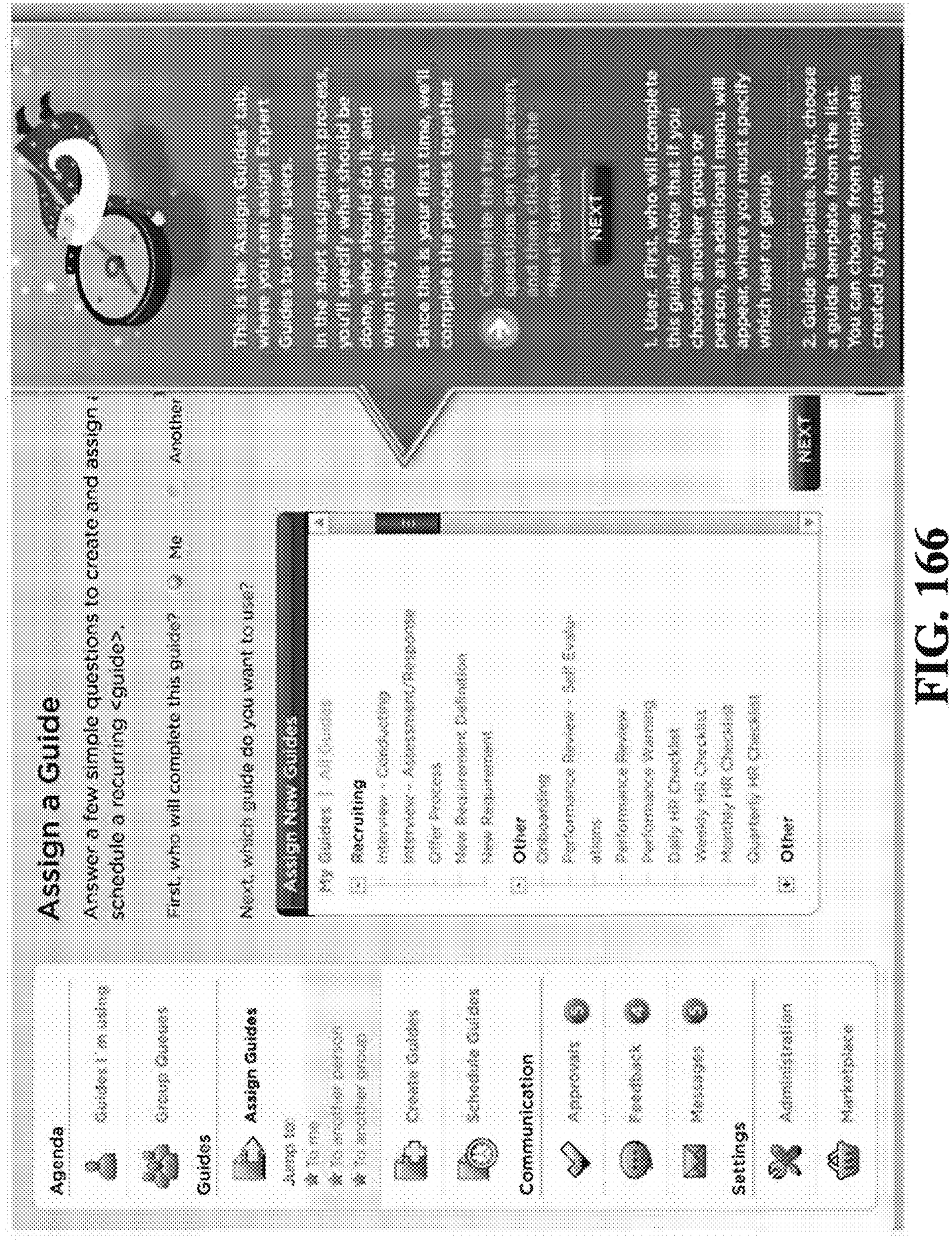
Figure 167:
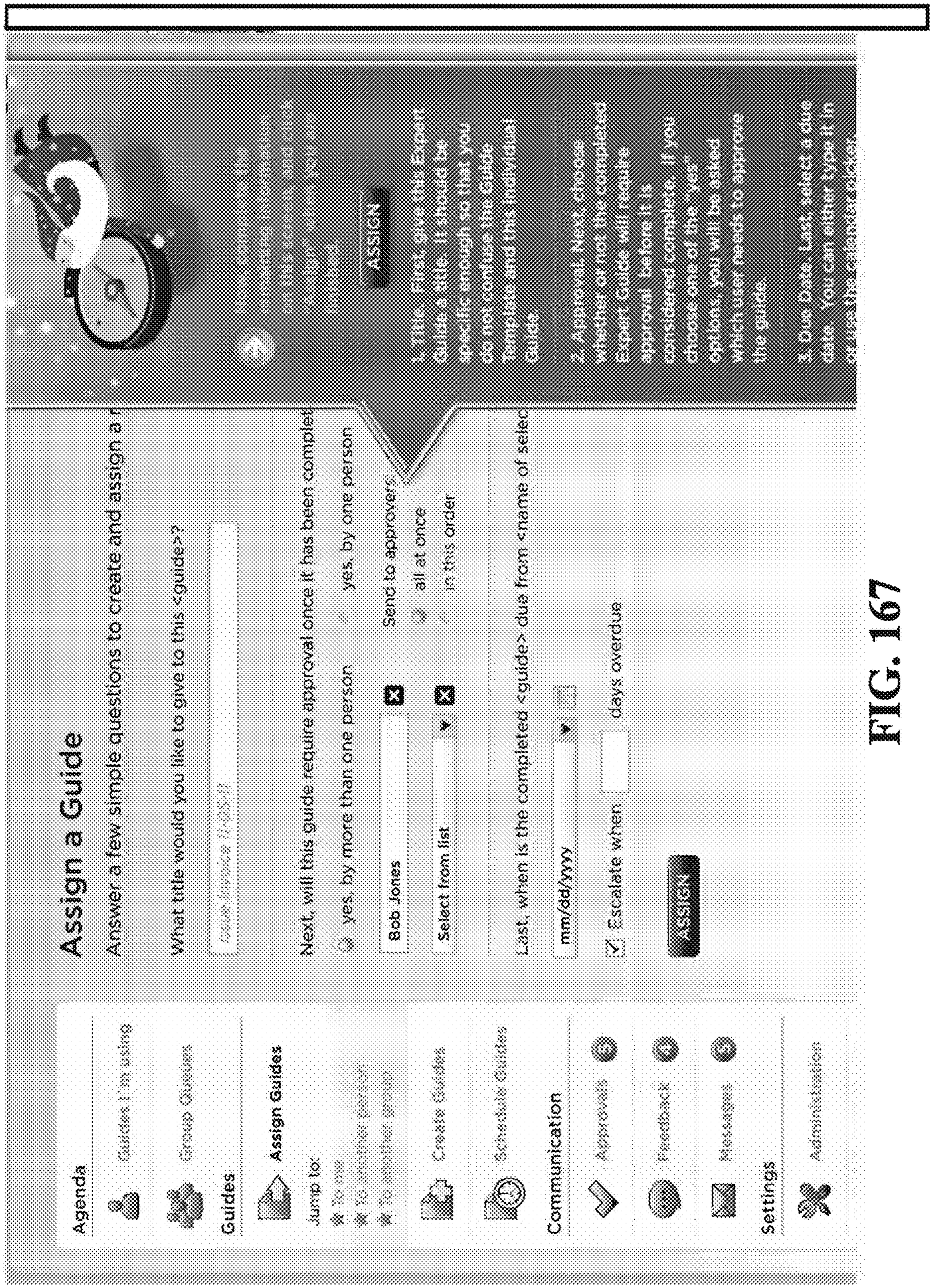
Figure 168:
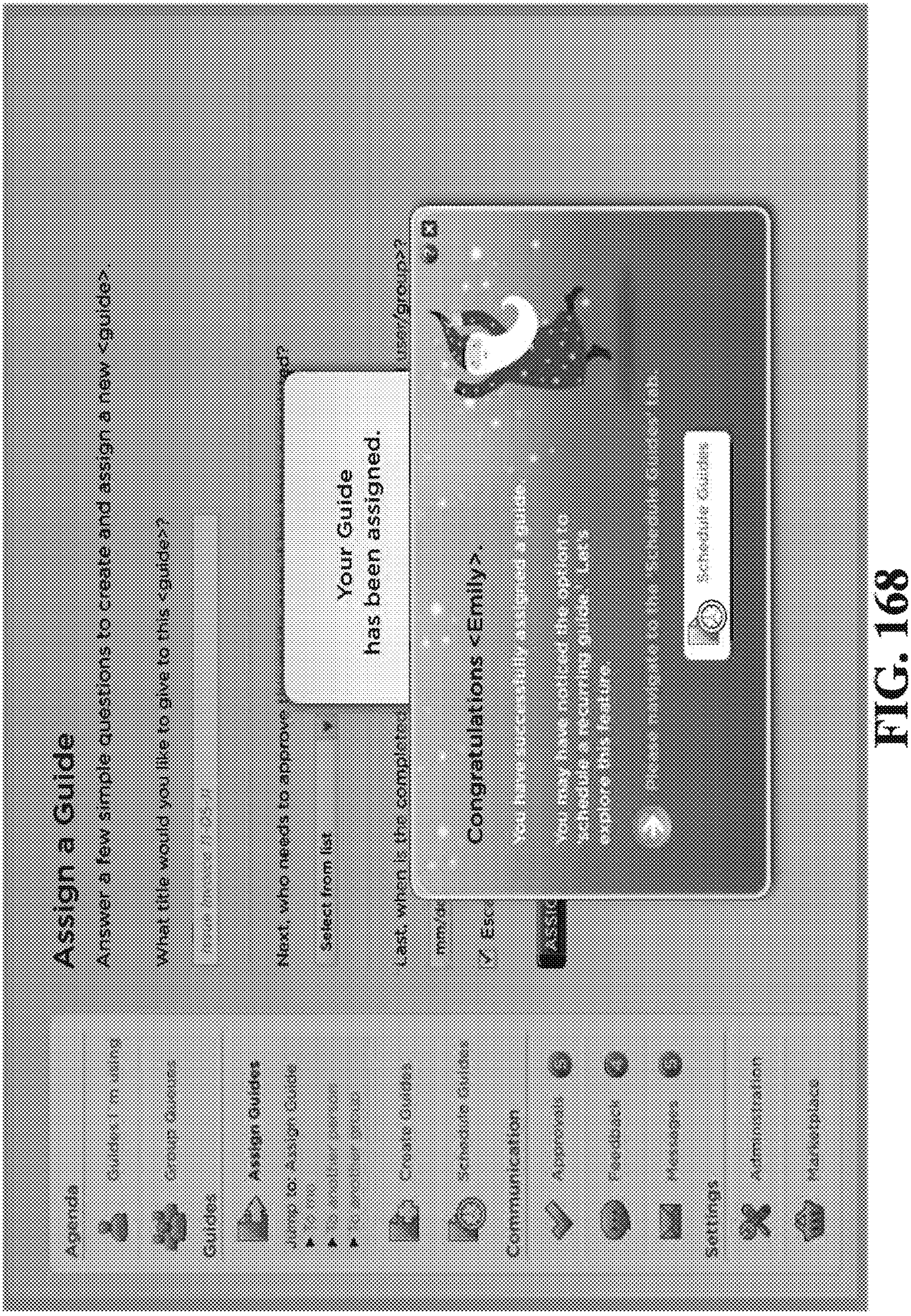
Figure 169:
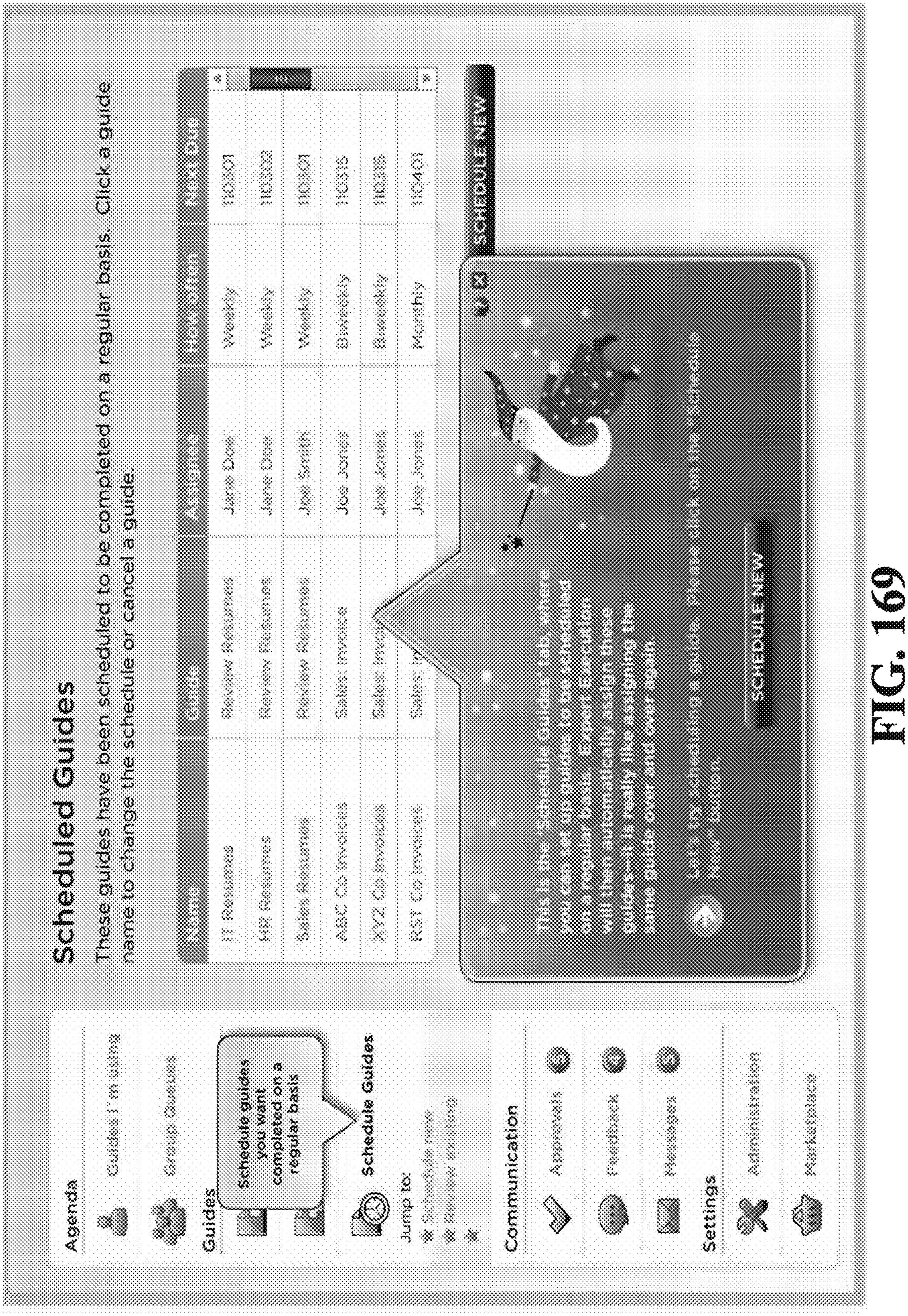
Figure 170:
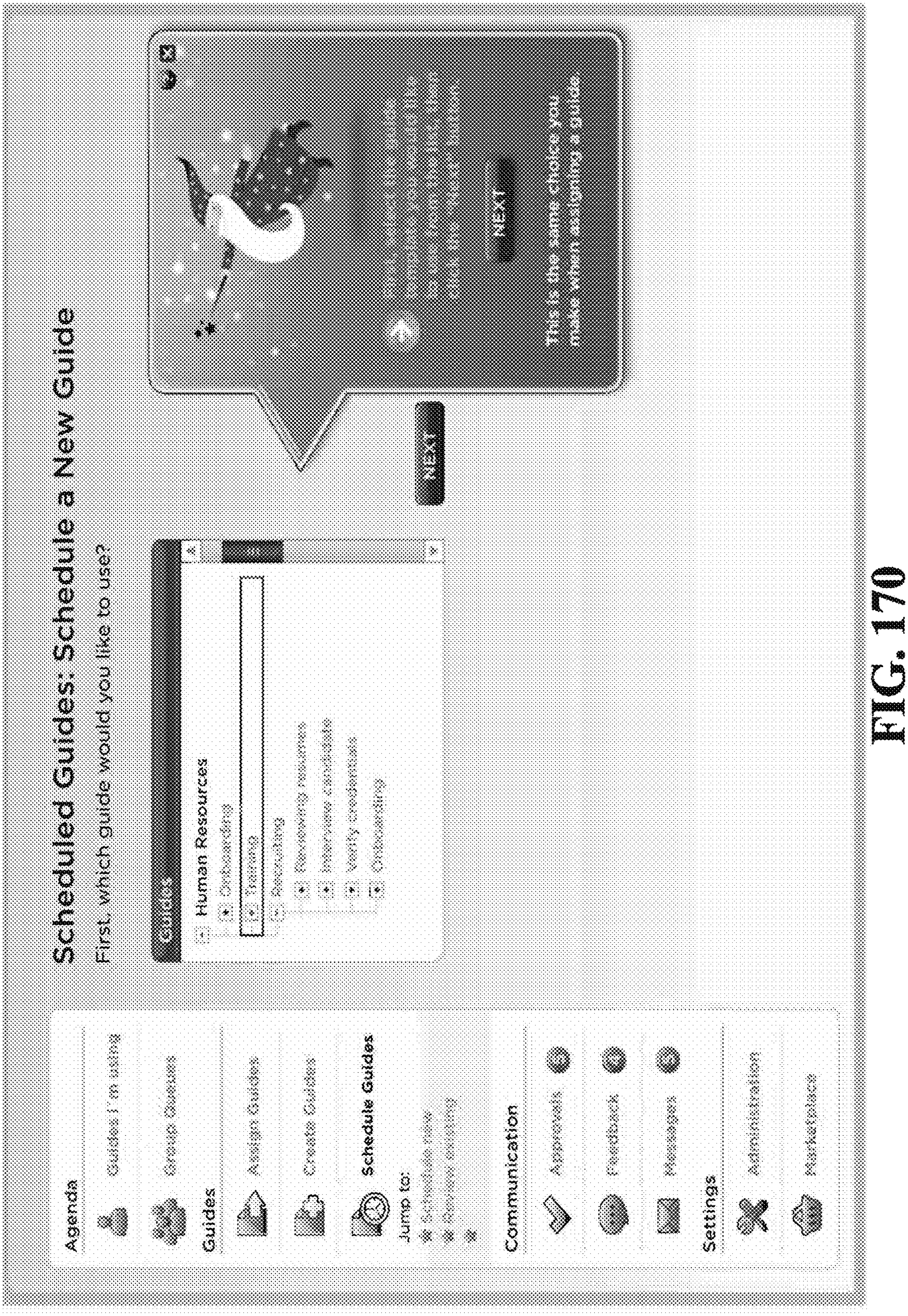
Figure 171:
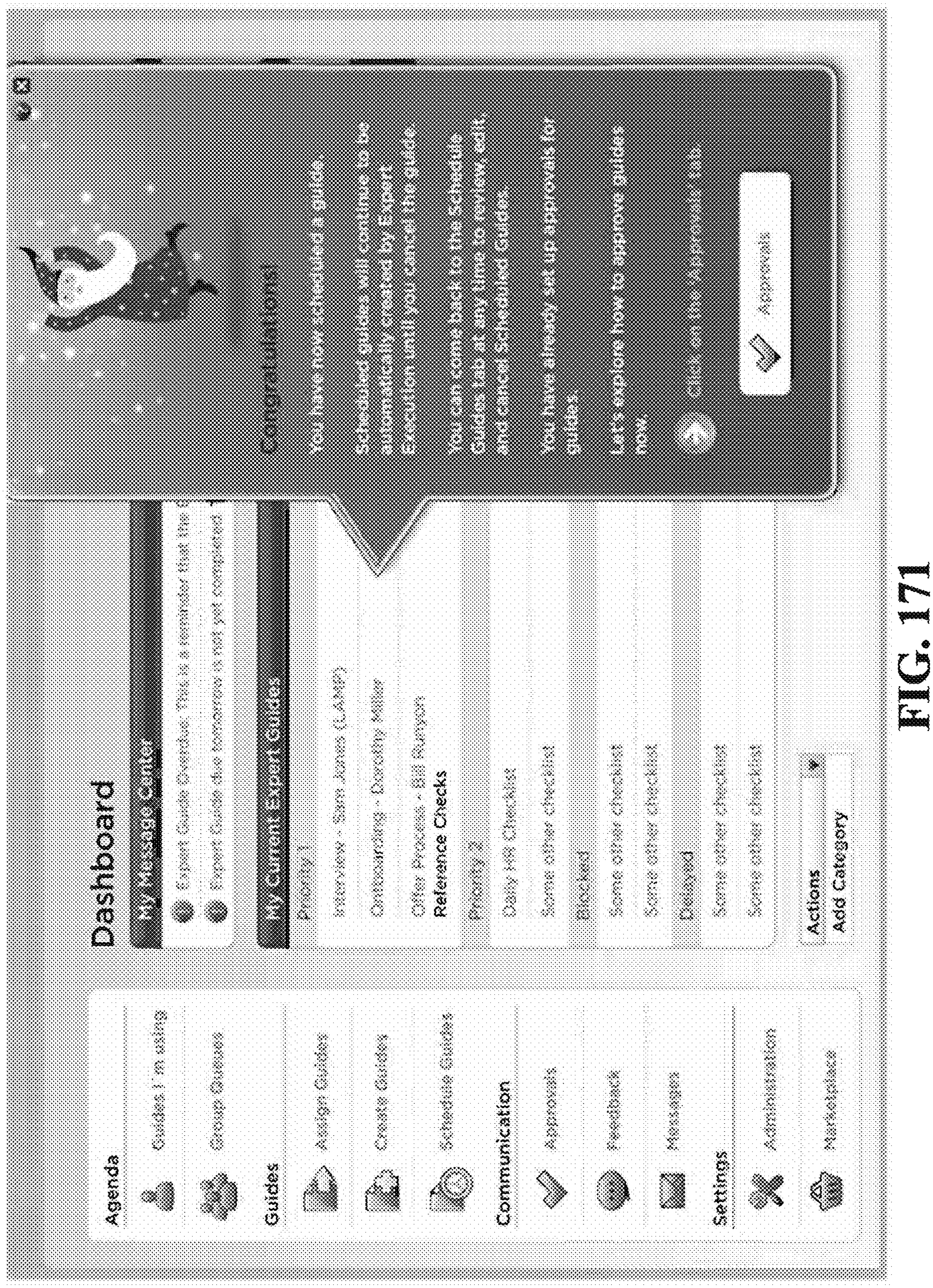
Figure 172:
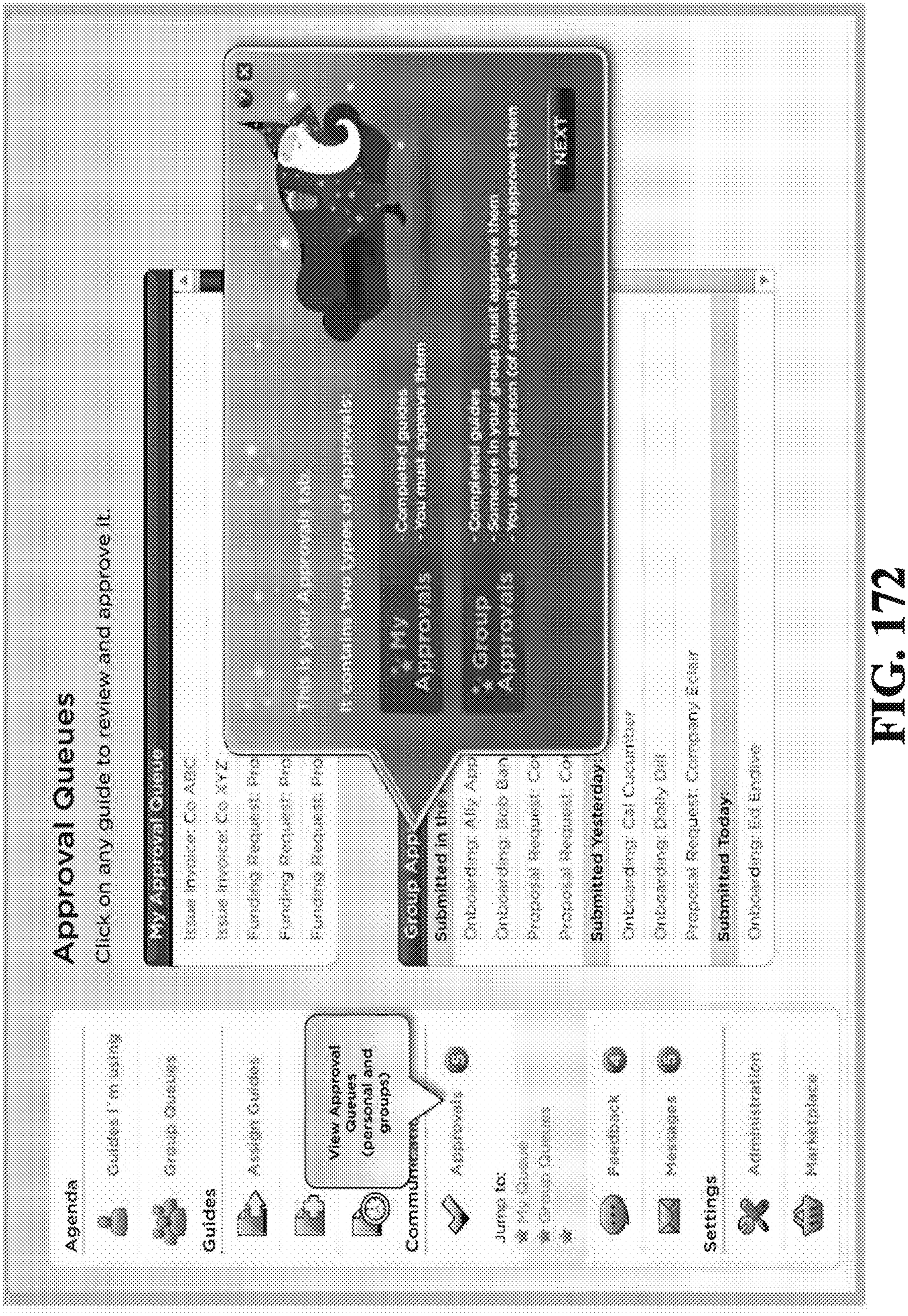
Figure 173:
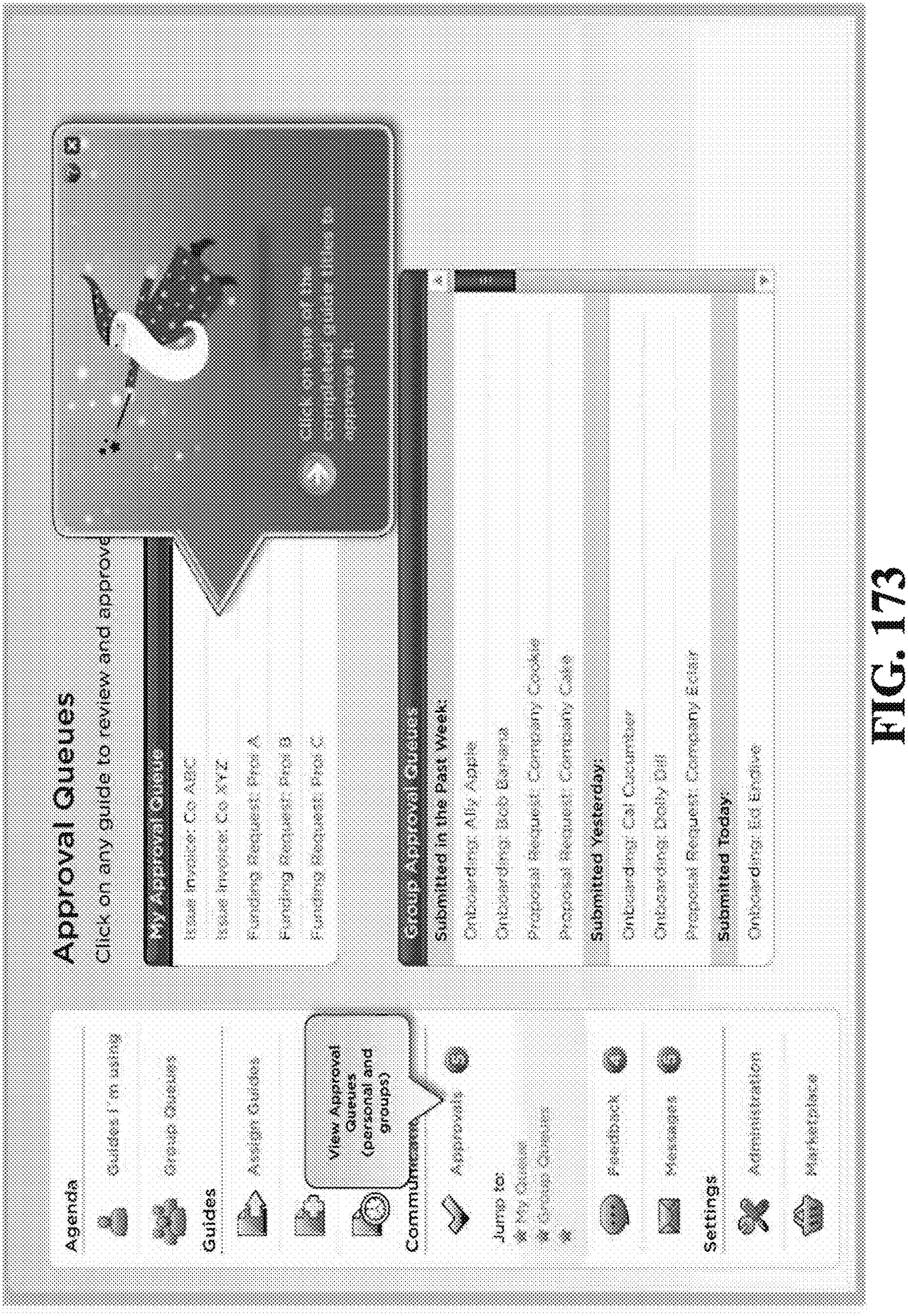
Figure 174:
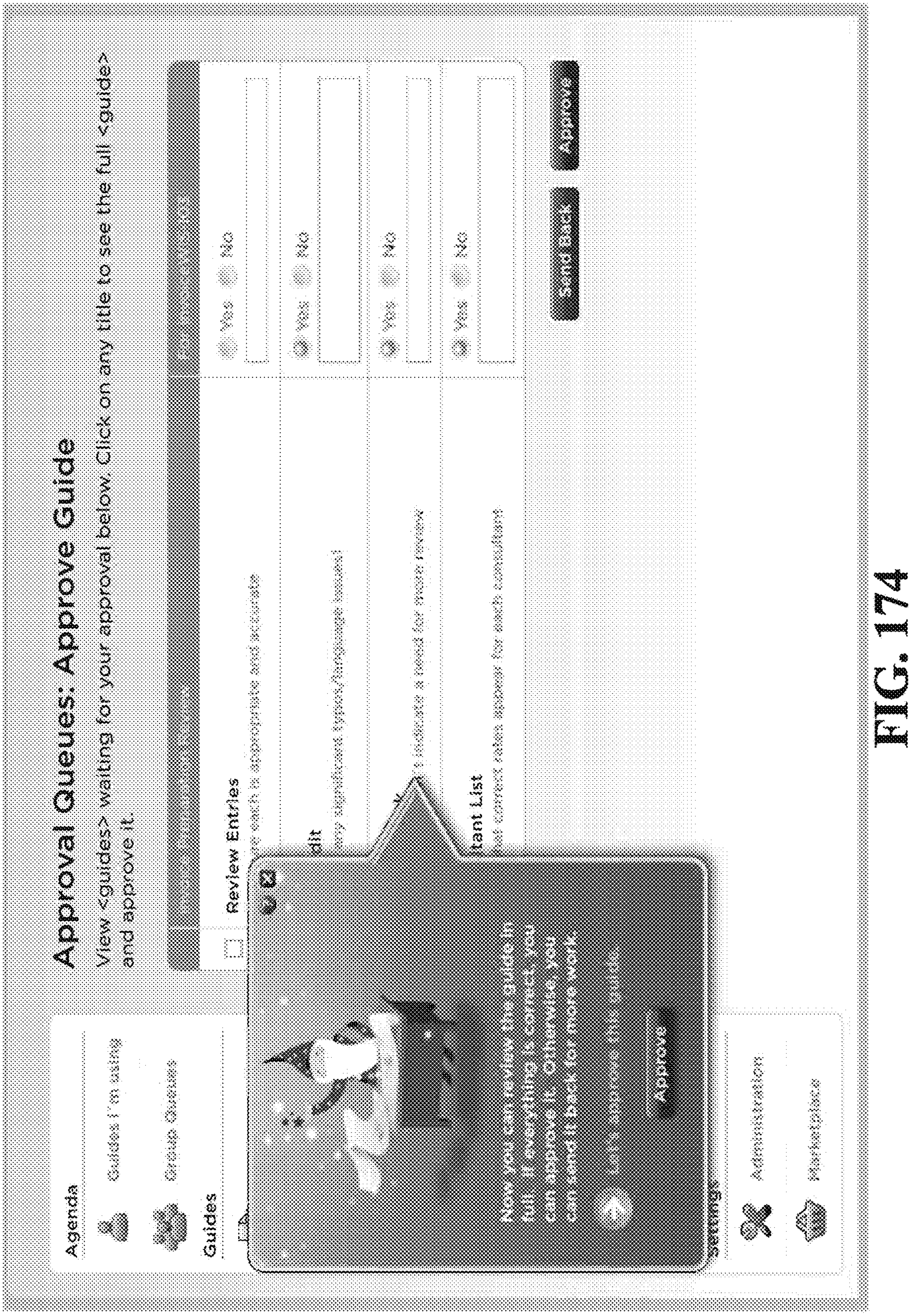
Figure 175:
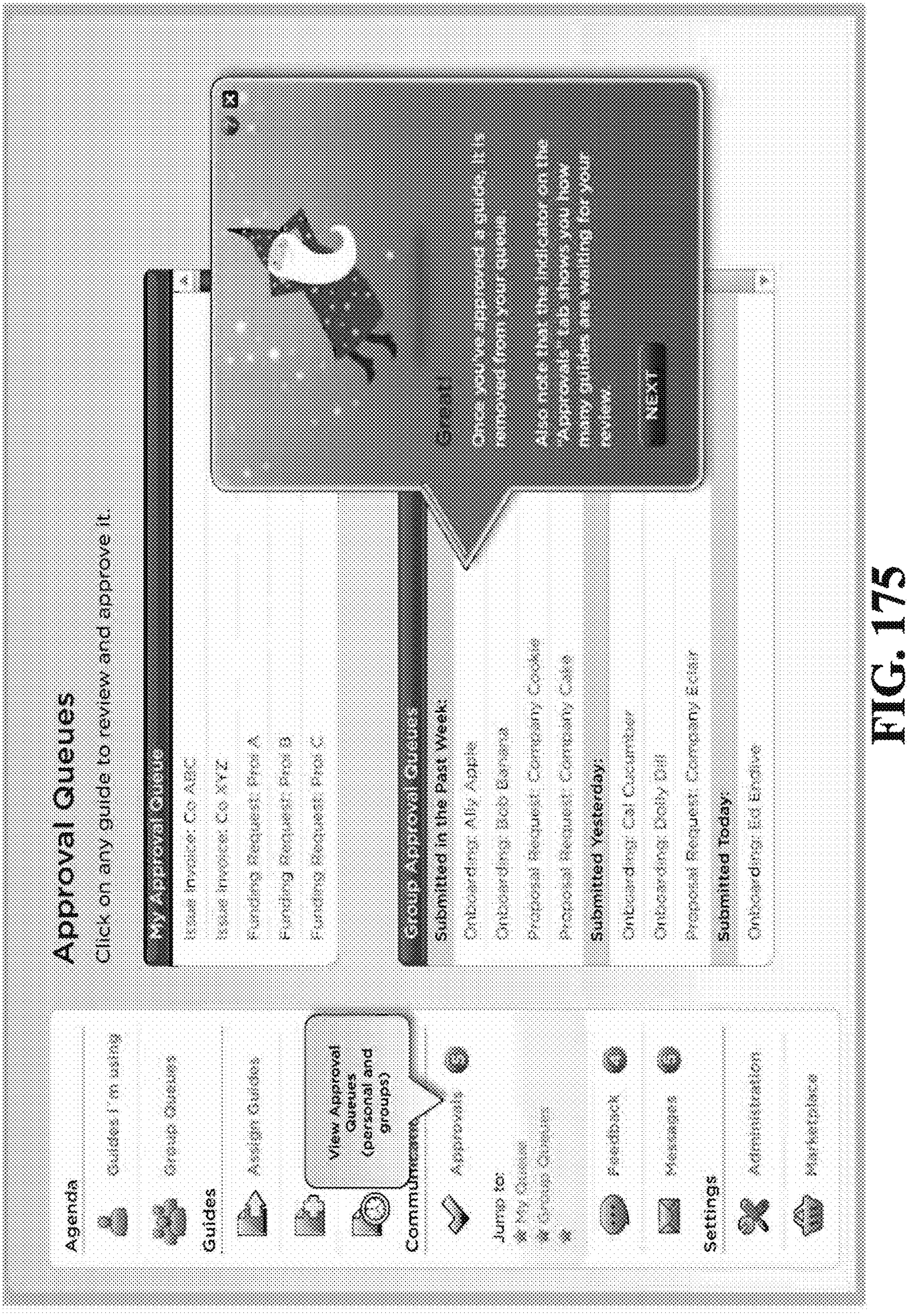
Figure 176:
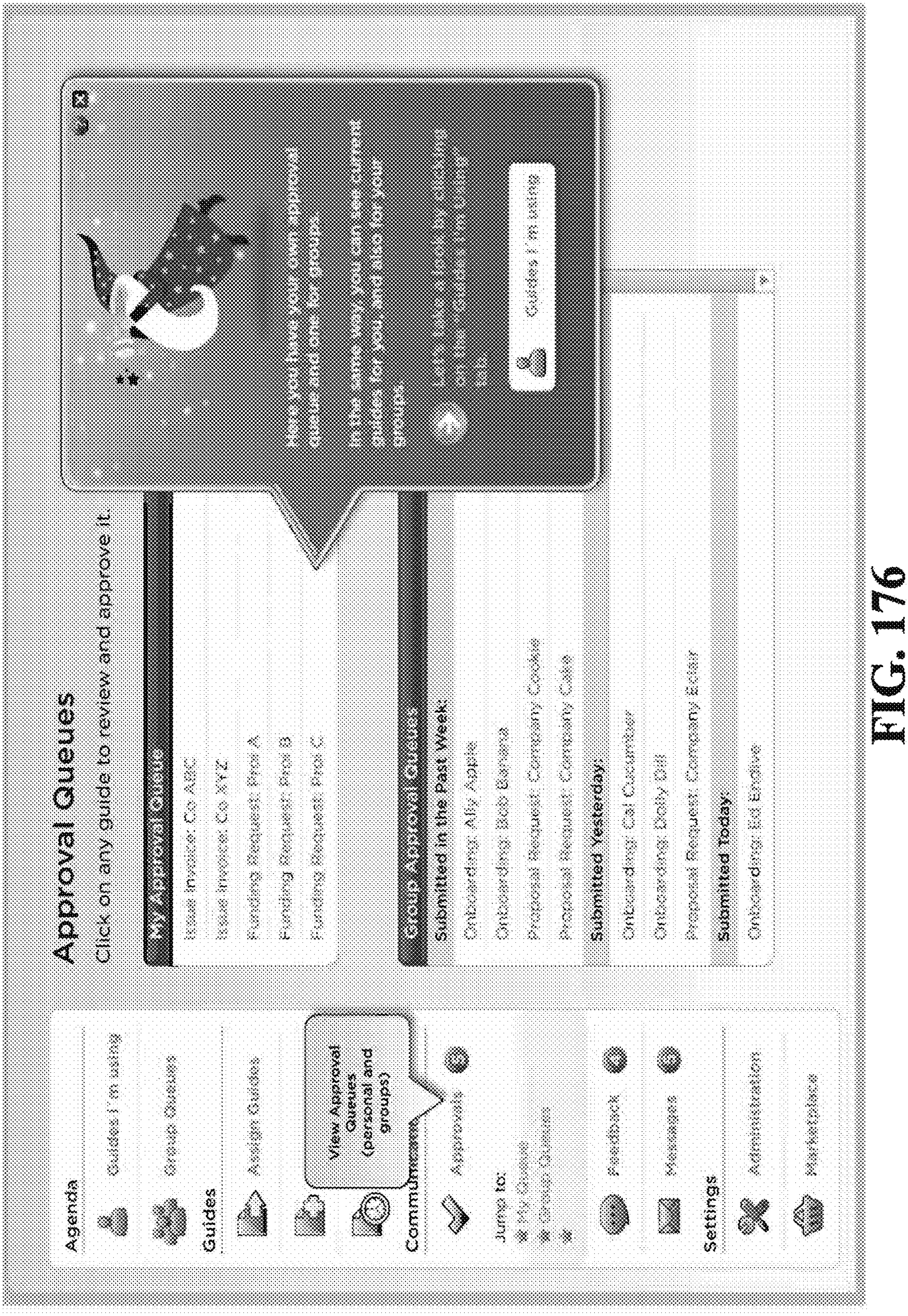
Figure 177:
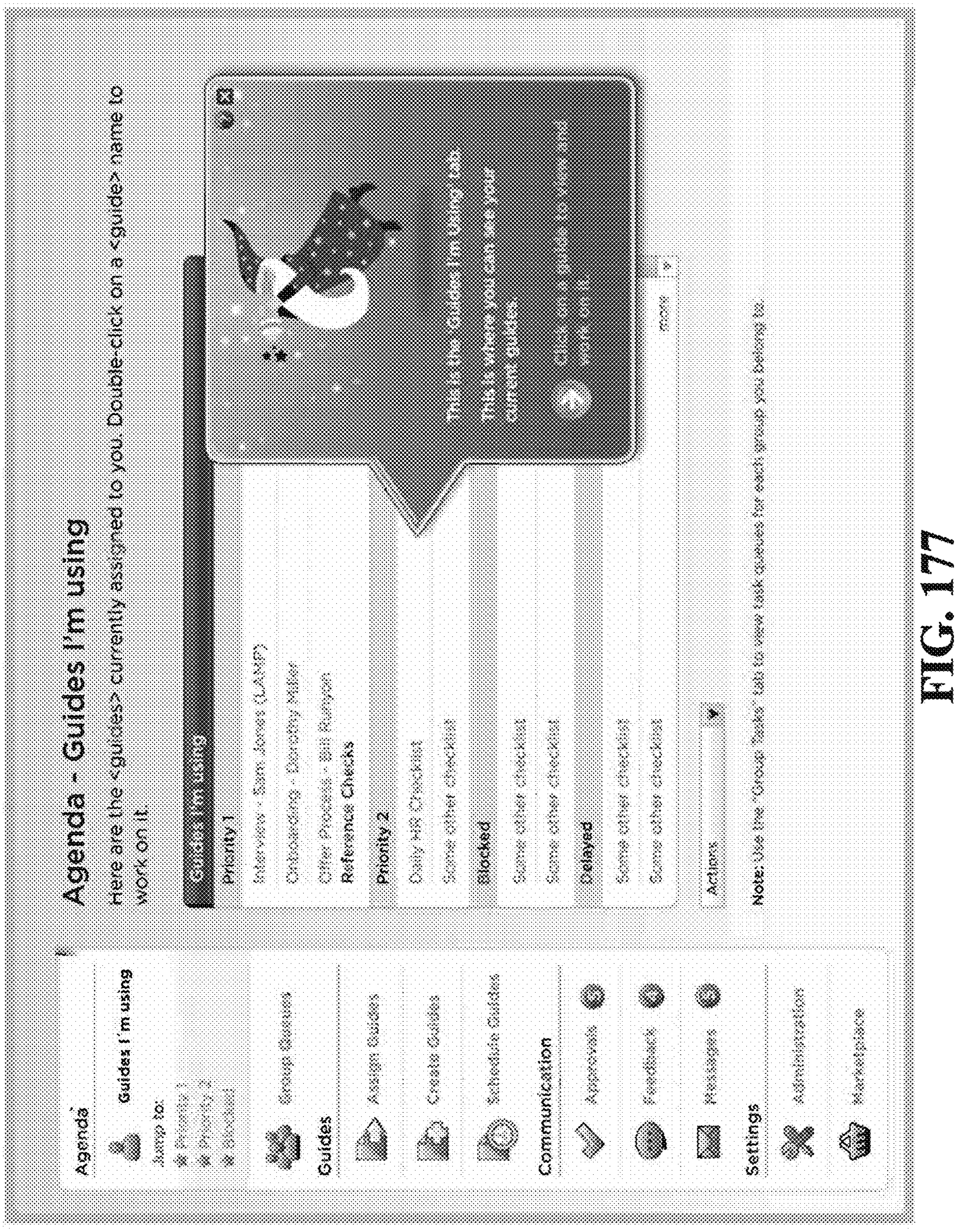
Figure 178:
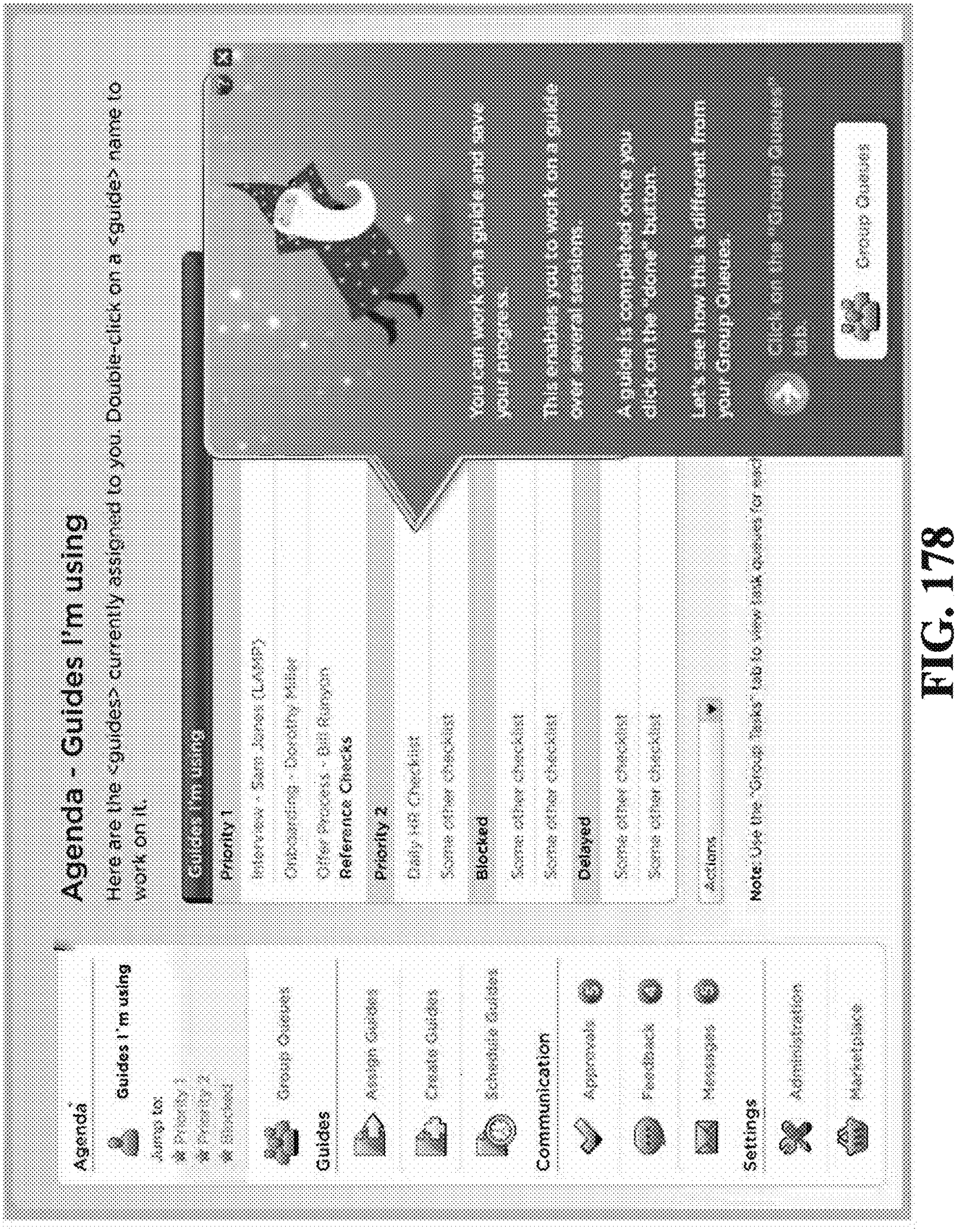
Figure 179:
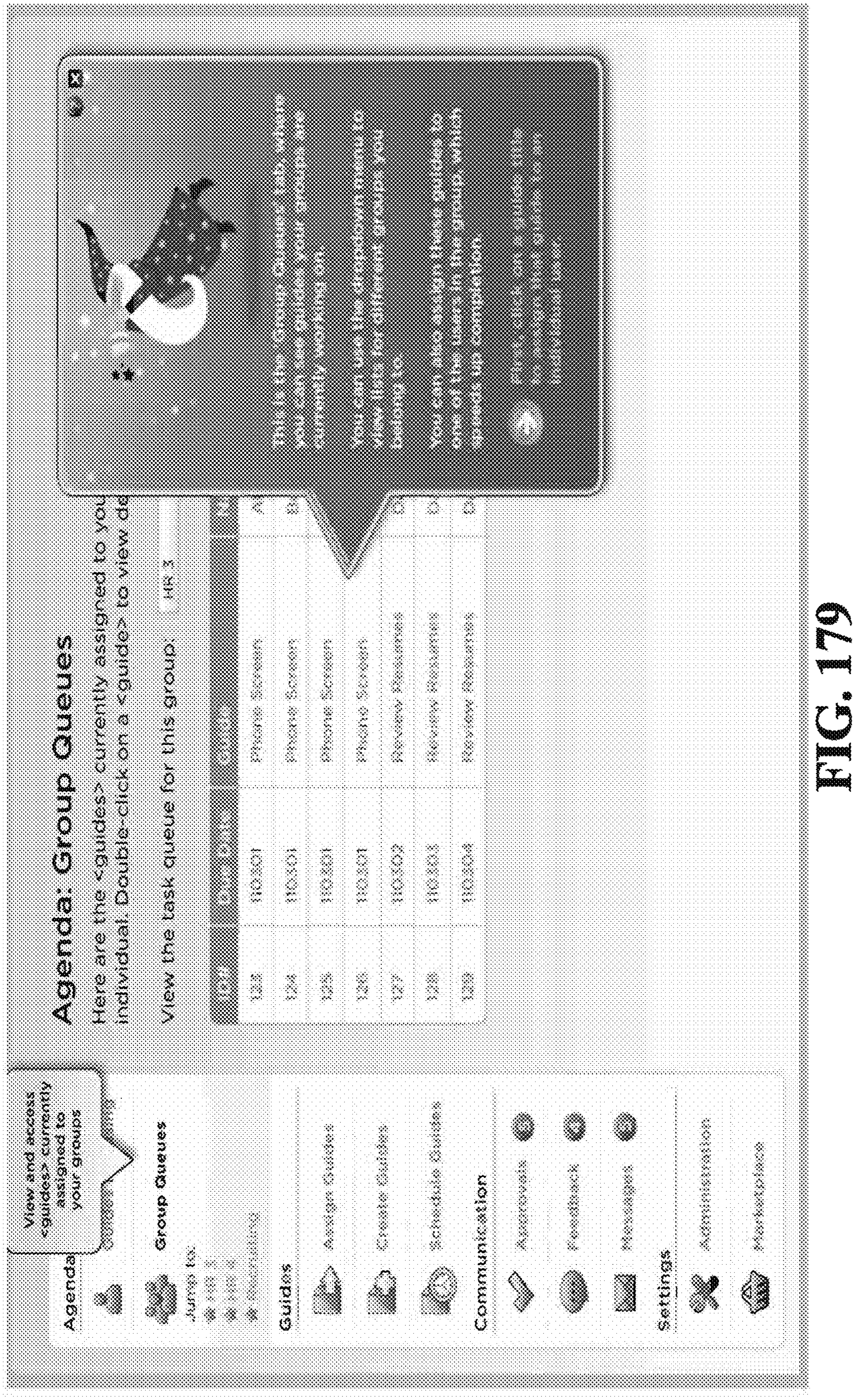
Figure 180:
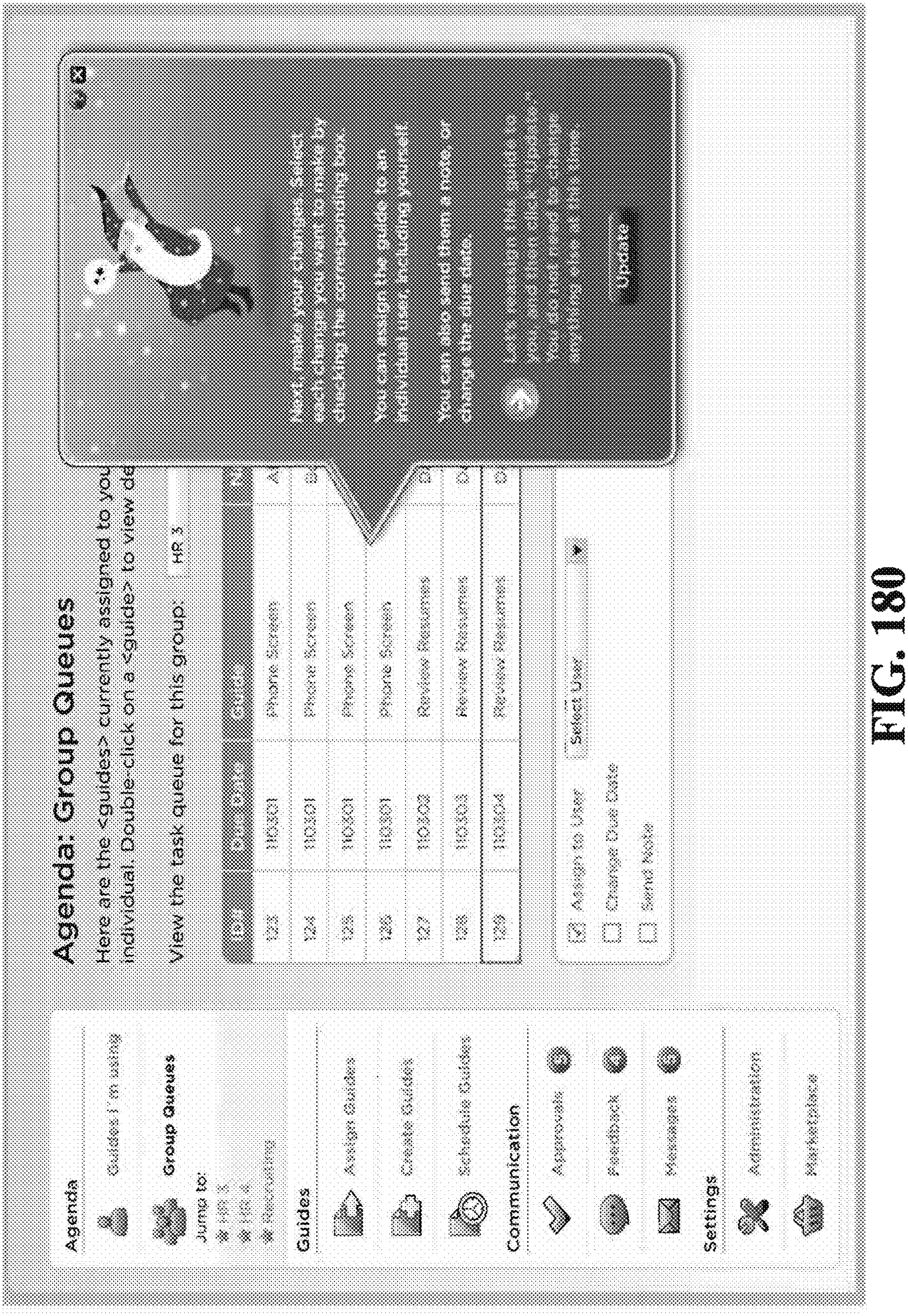
Figure 181:
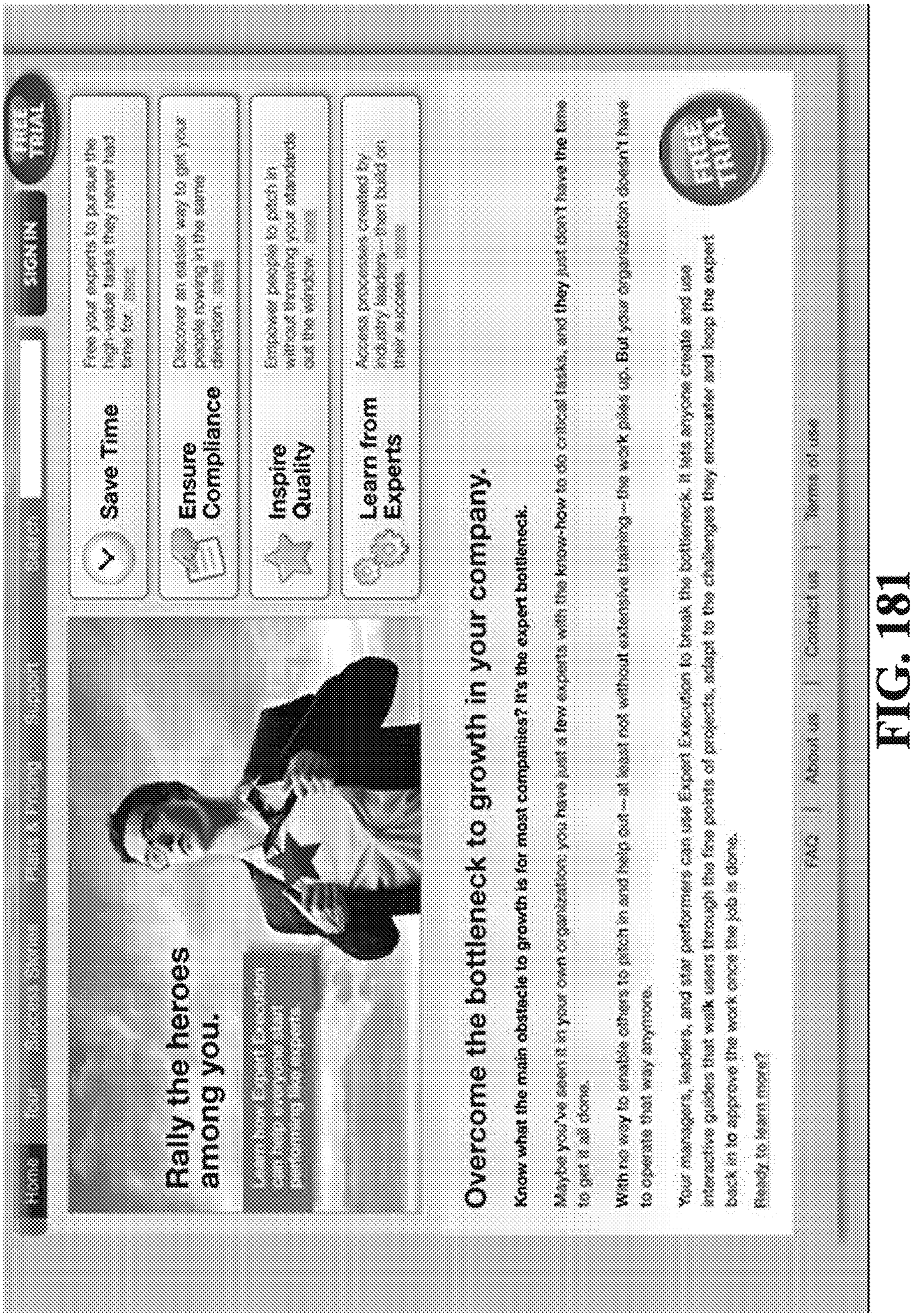
FIGS. 181, 182A, 182B, 183, 184, 185, 186, 187, 188, 189, 190, 191, and 192 show examples of a public website for an interactive checklist in accordance with some embodiments of the disclosed subject matter.
Figure 182A:
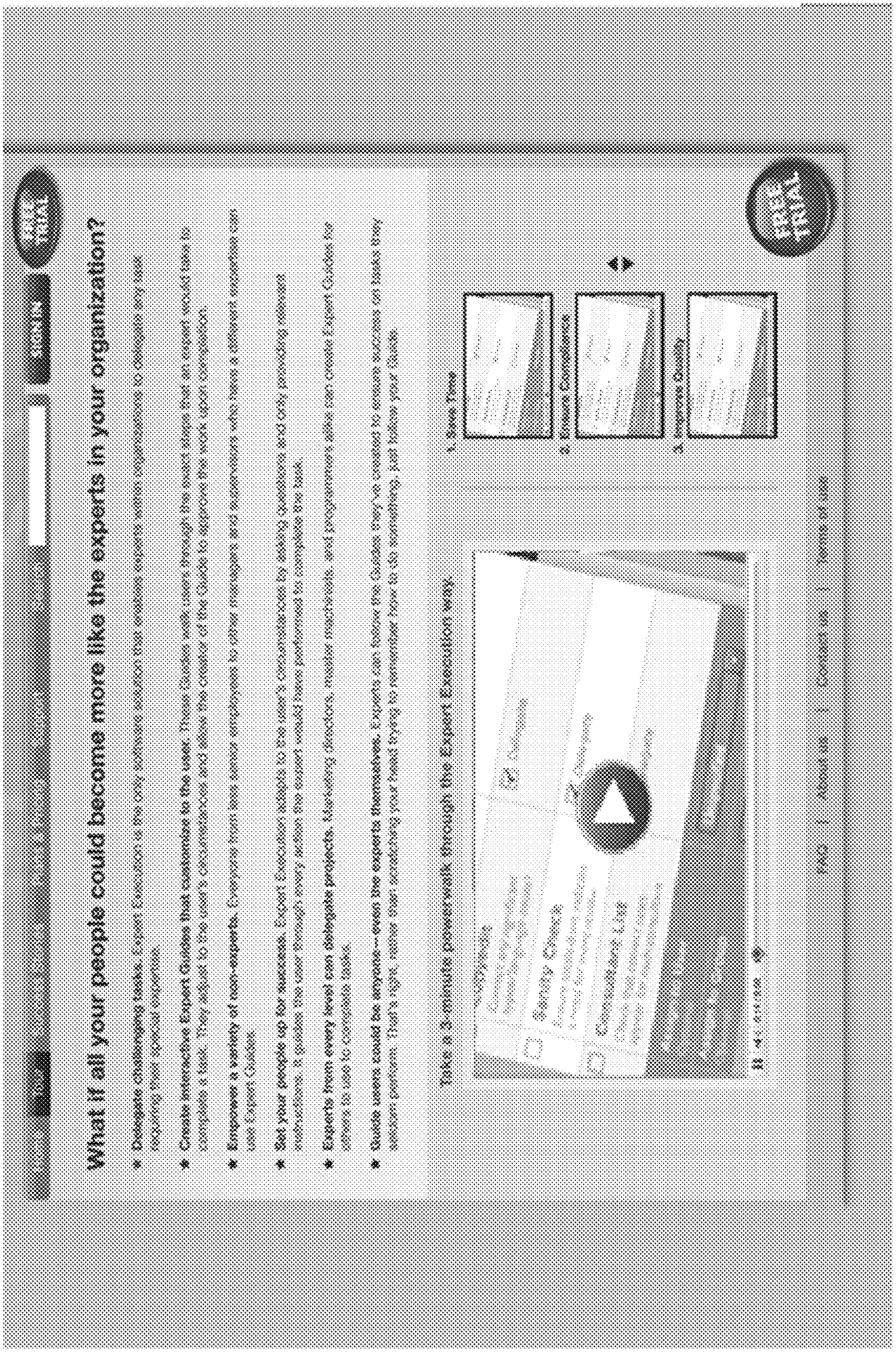
Figure 182B:
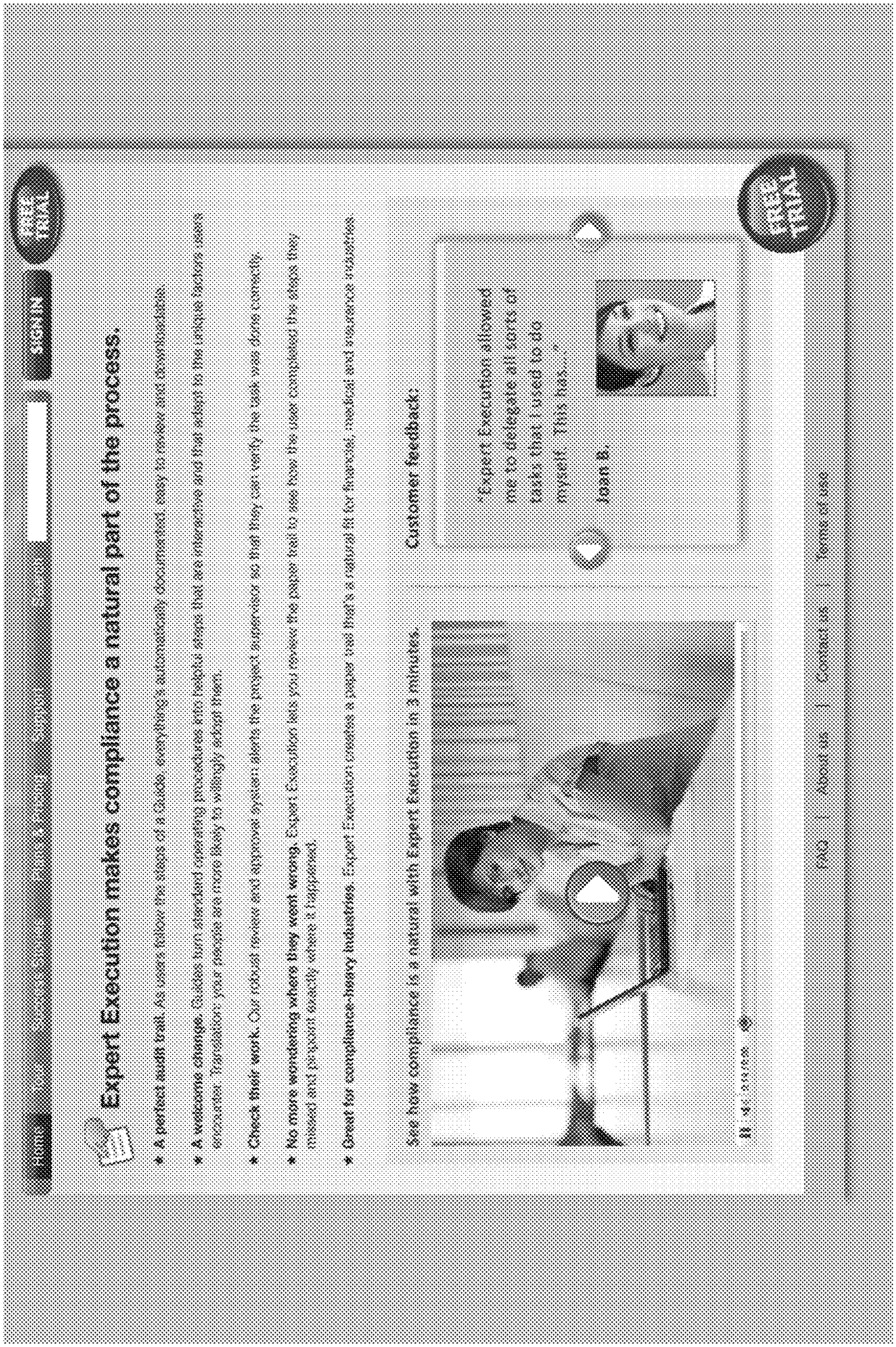
Figure 183:
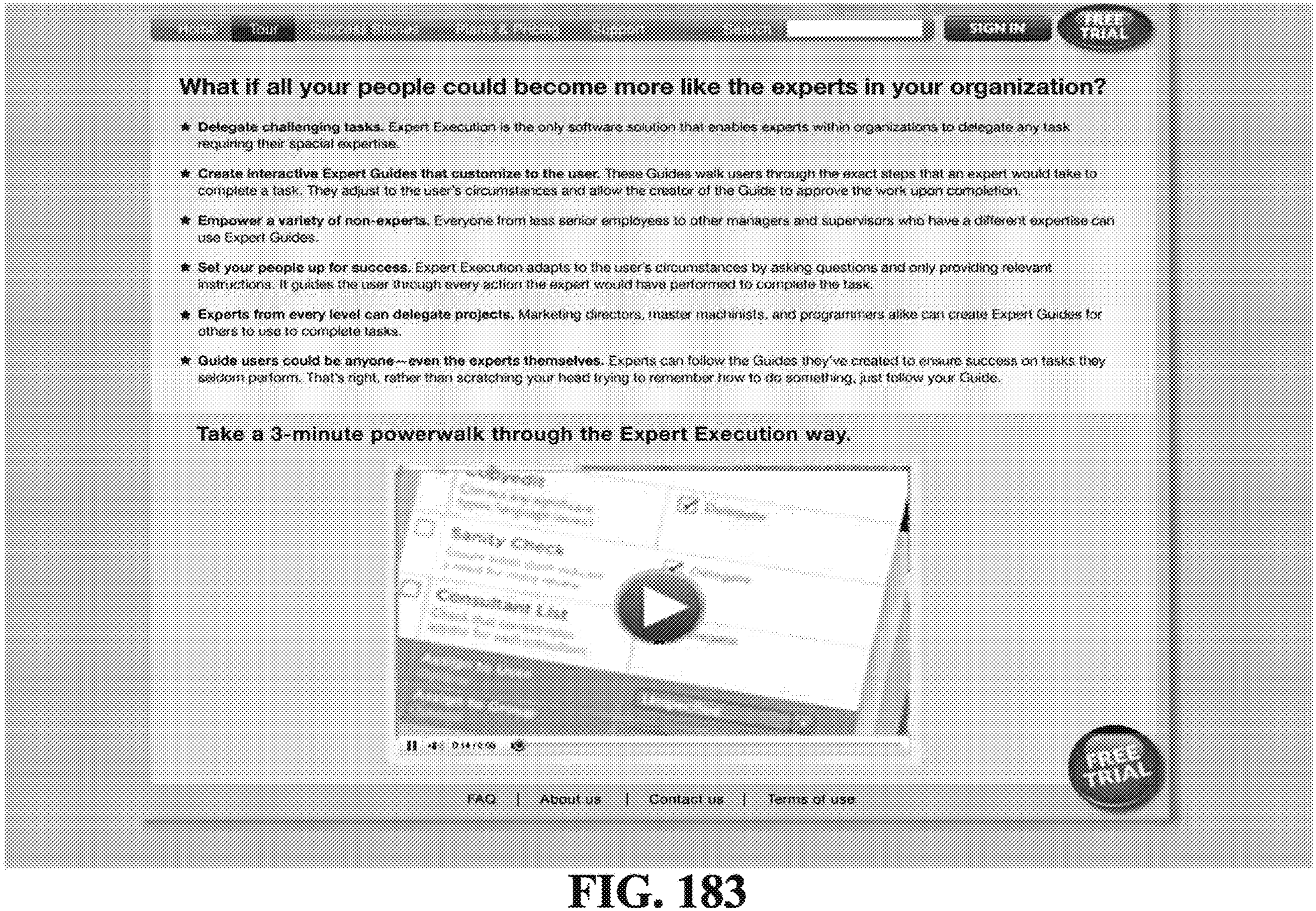
Figure 184:
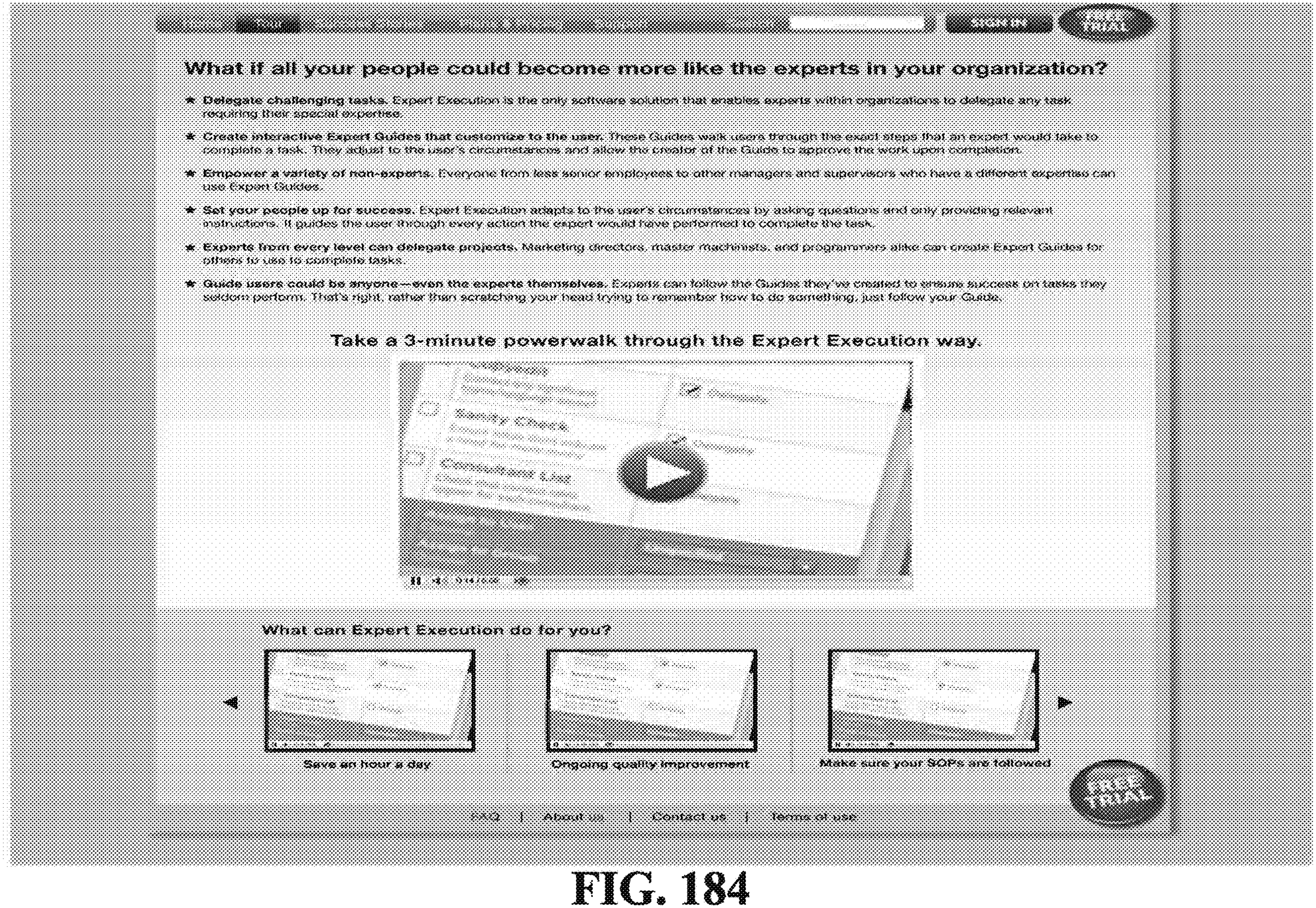
Figure 185:
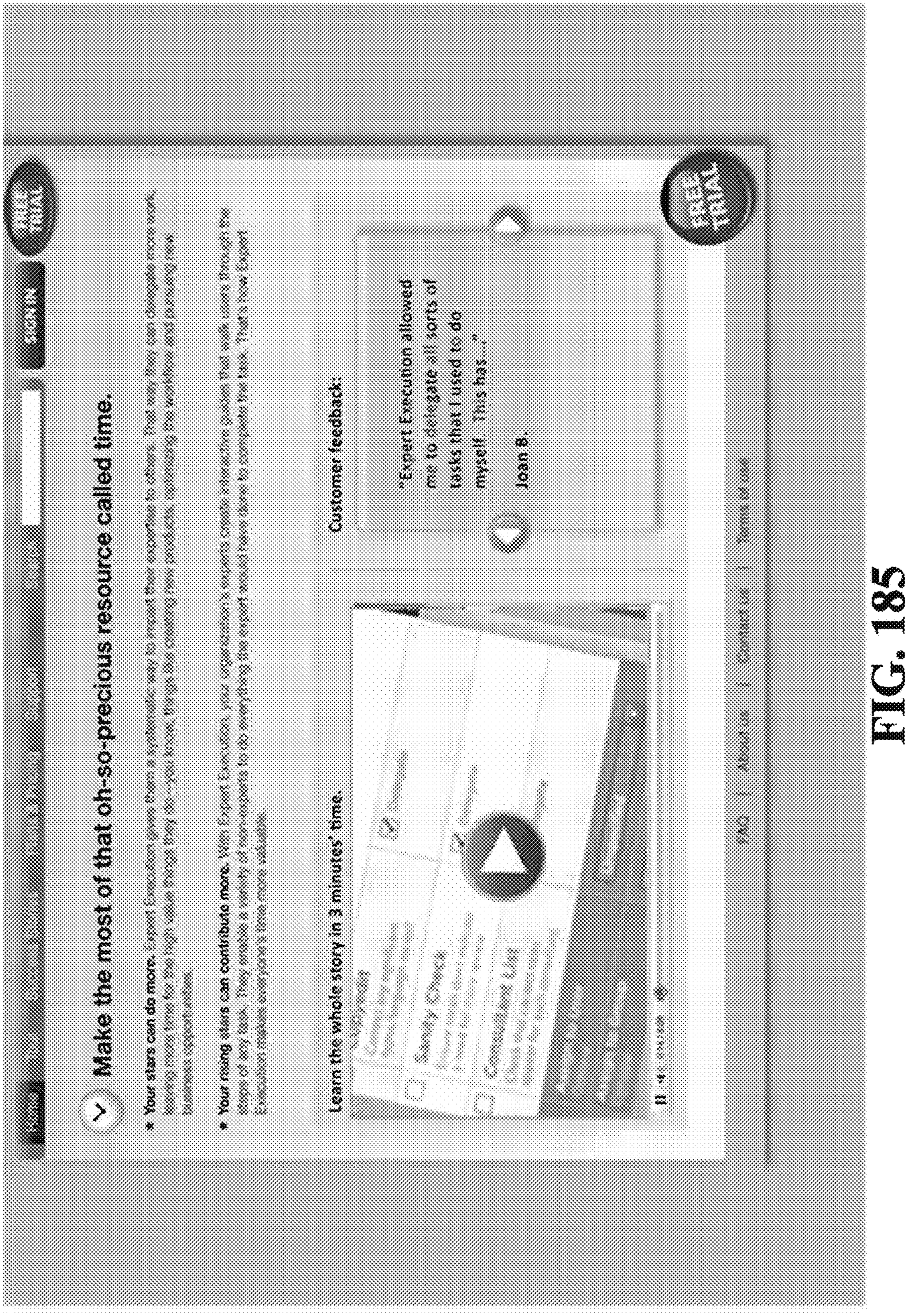
Figure 186:
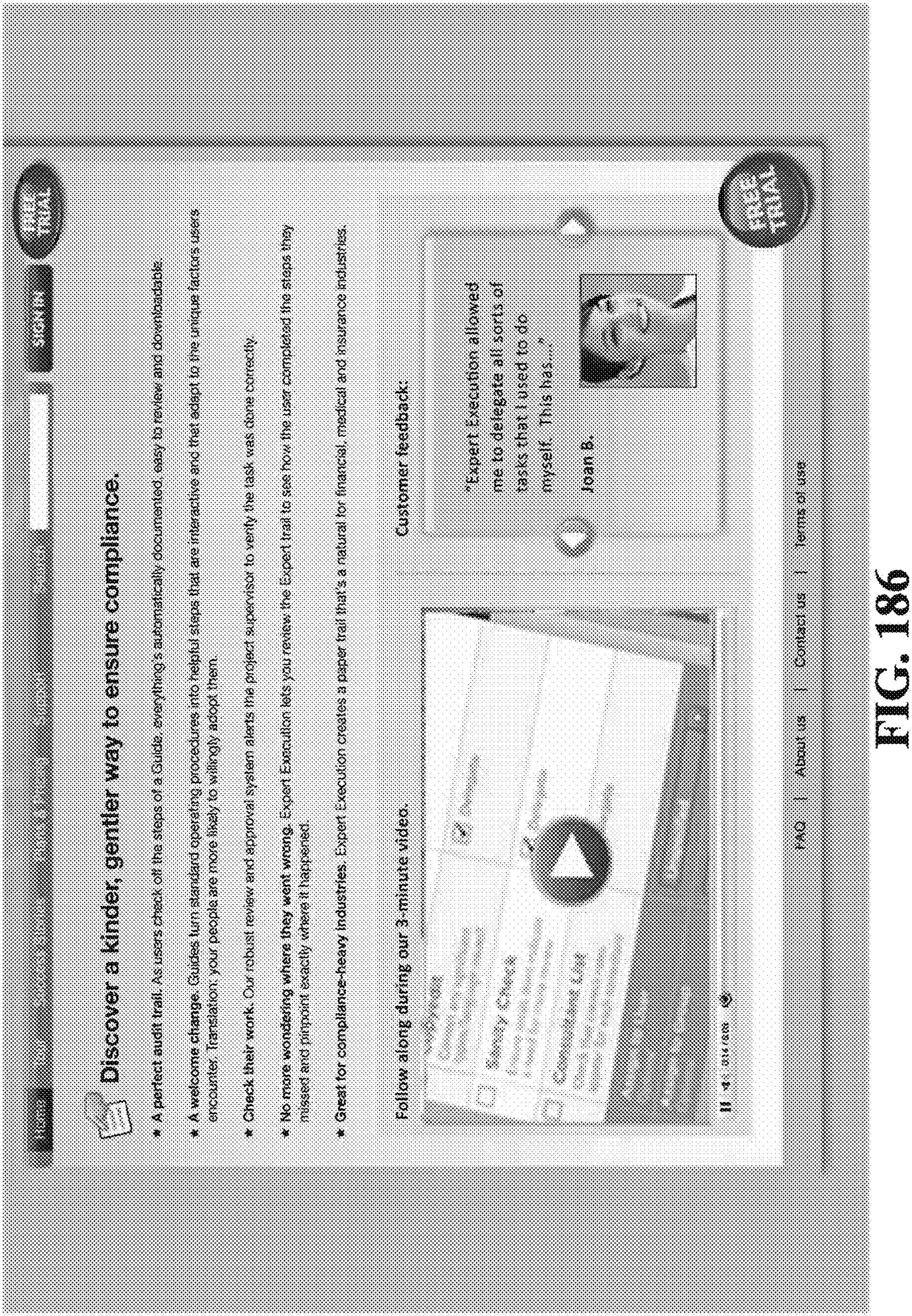
Figure 187:
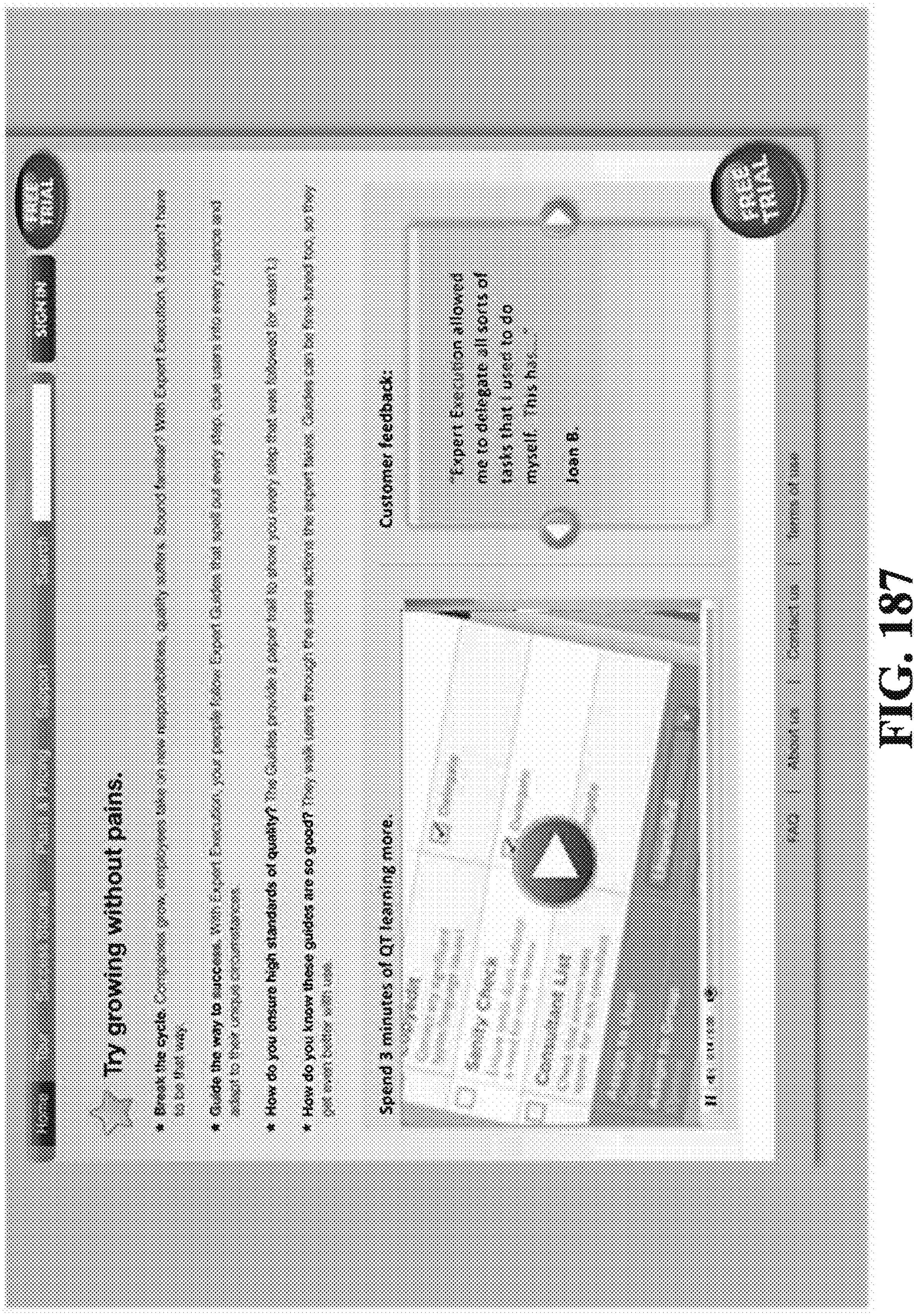
Figure 188:
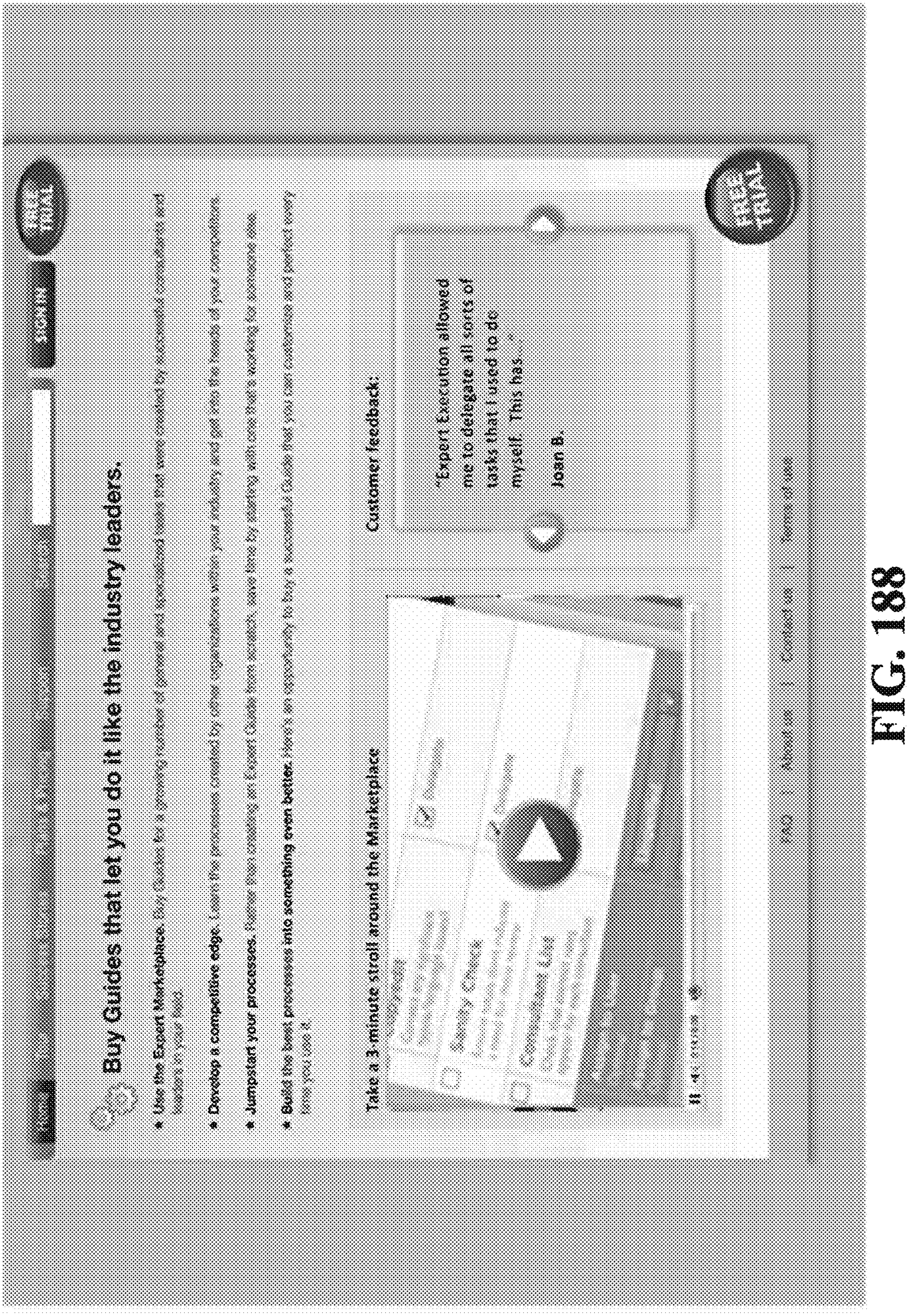
Figure 189:
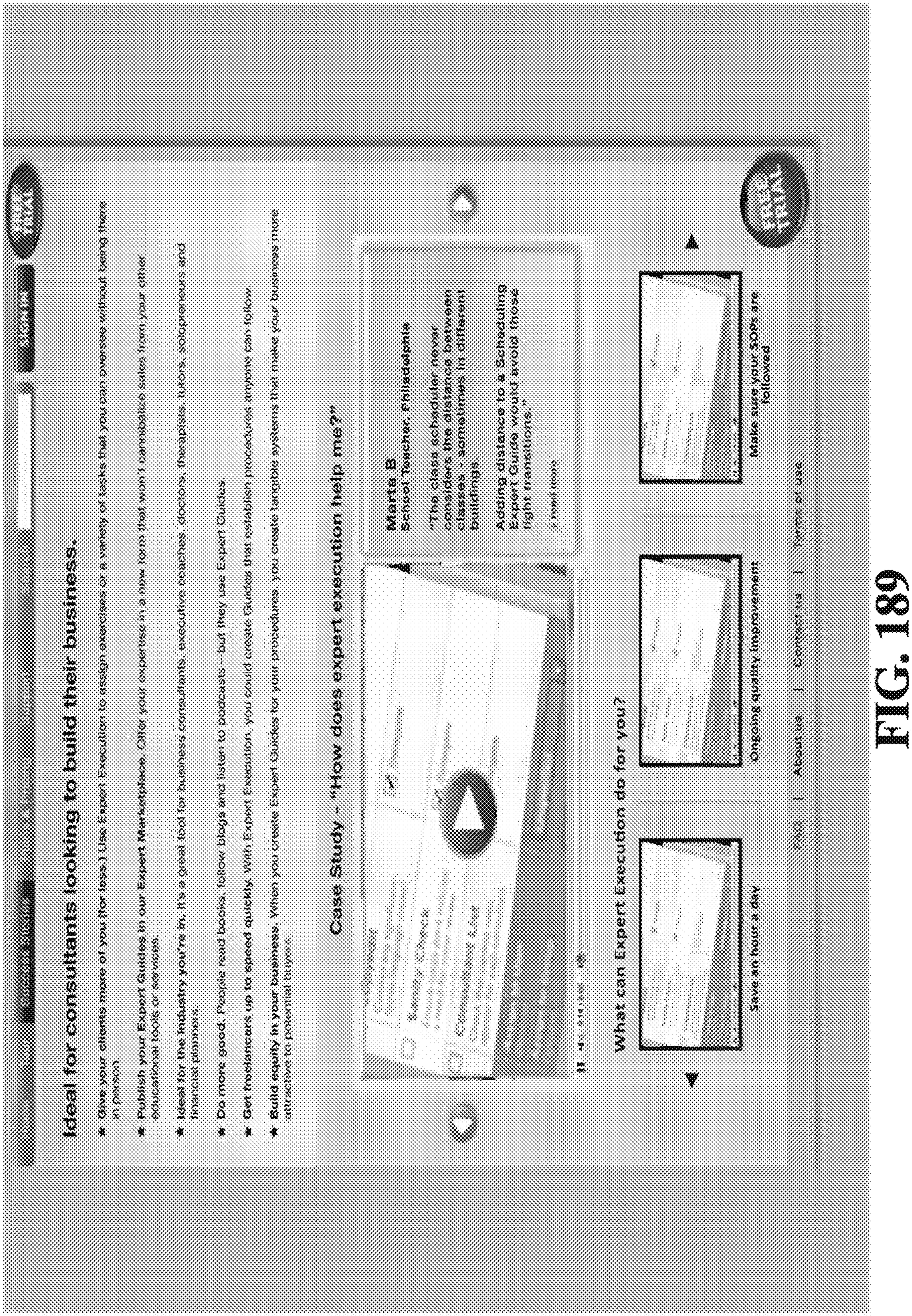
Figure 190:
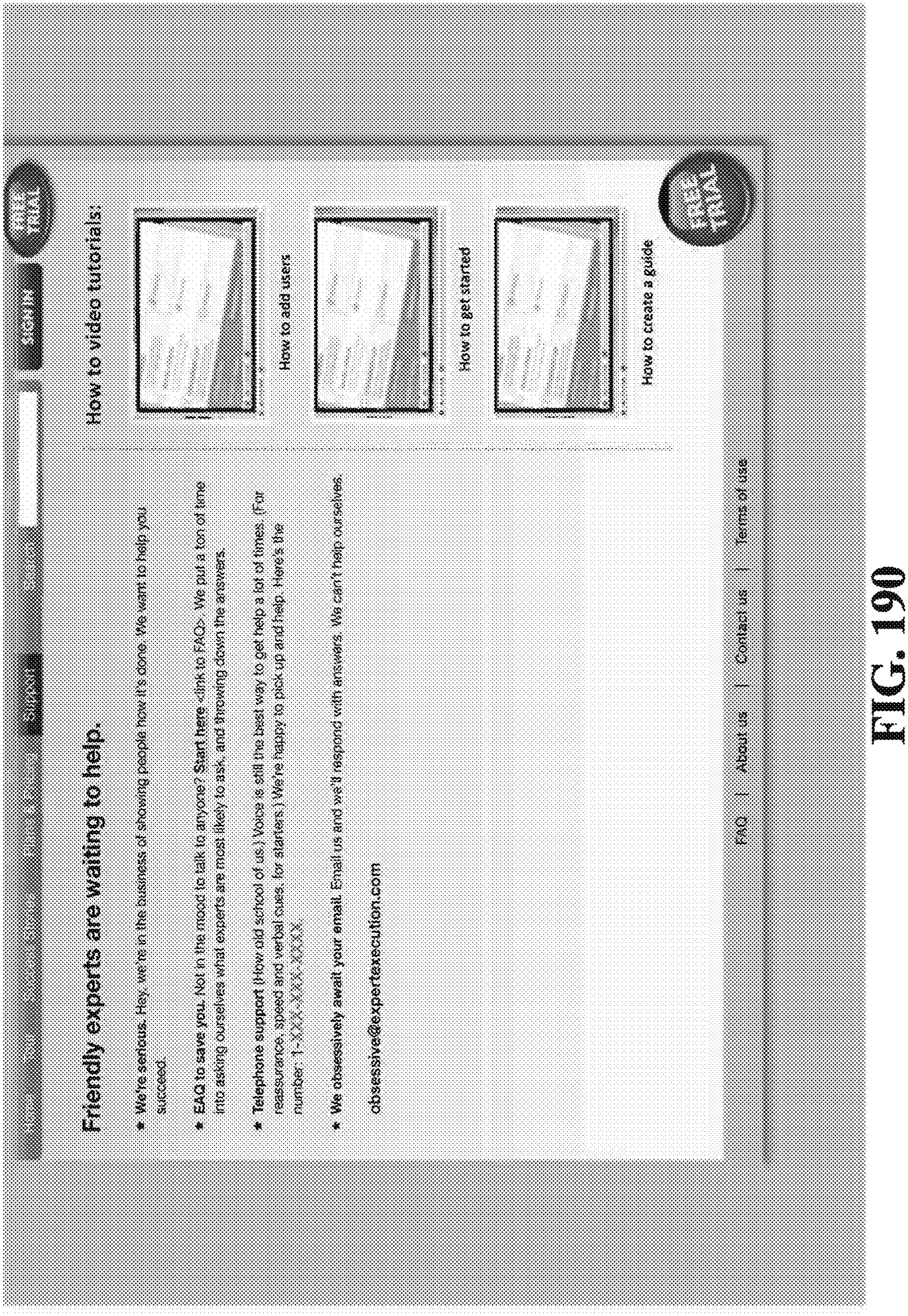
Figure 191:
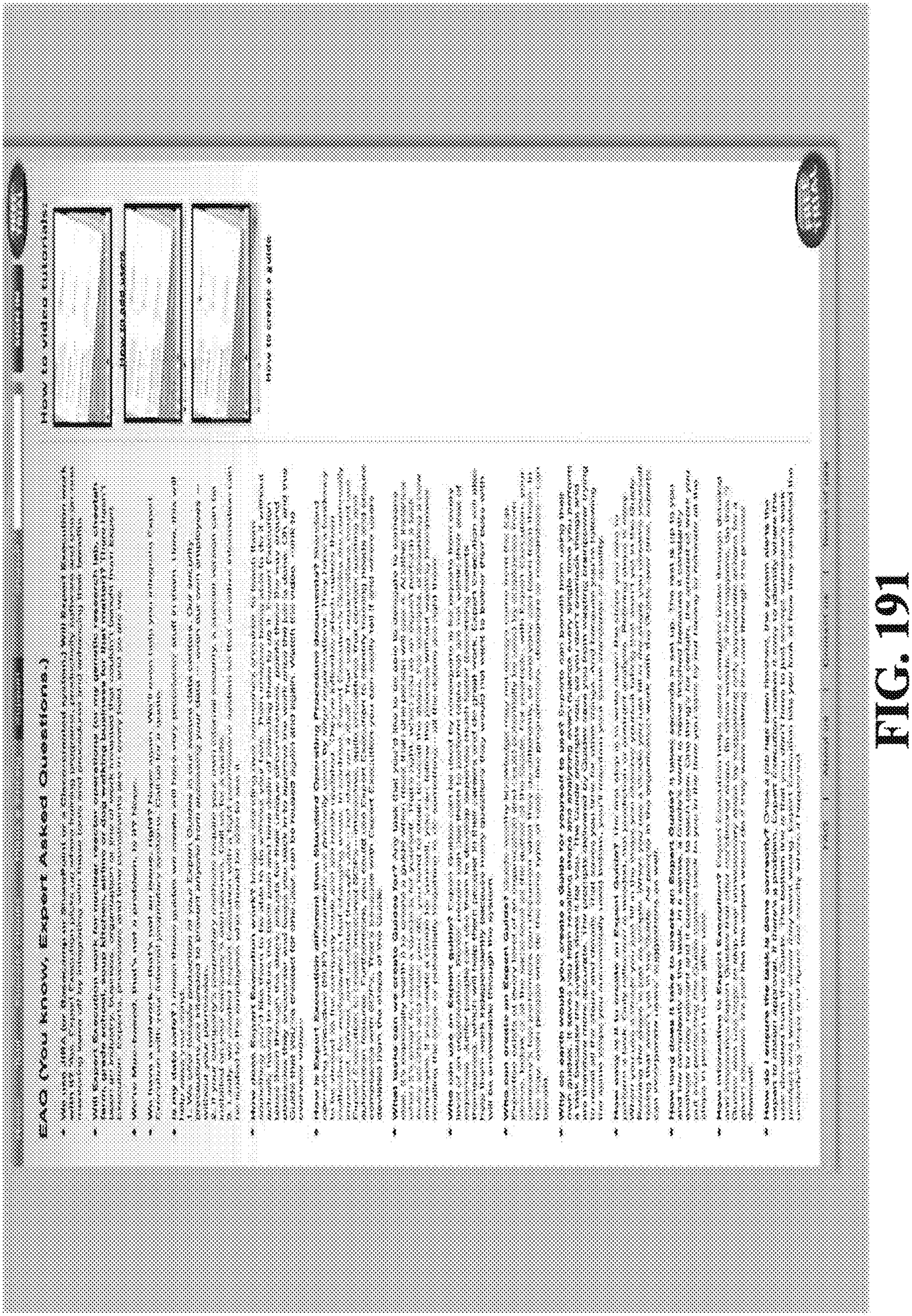
Figure 192:
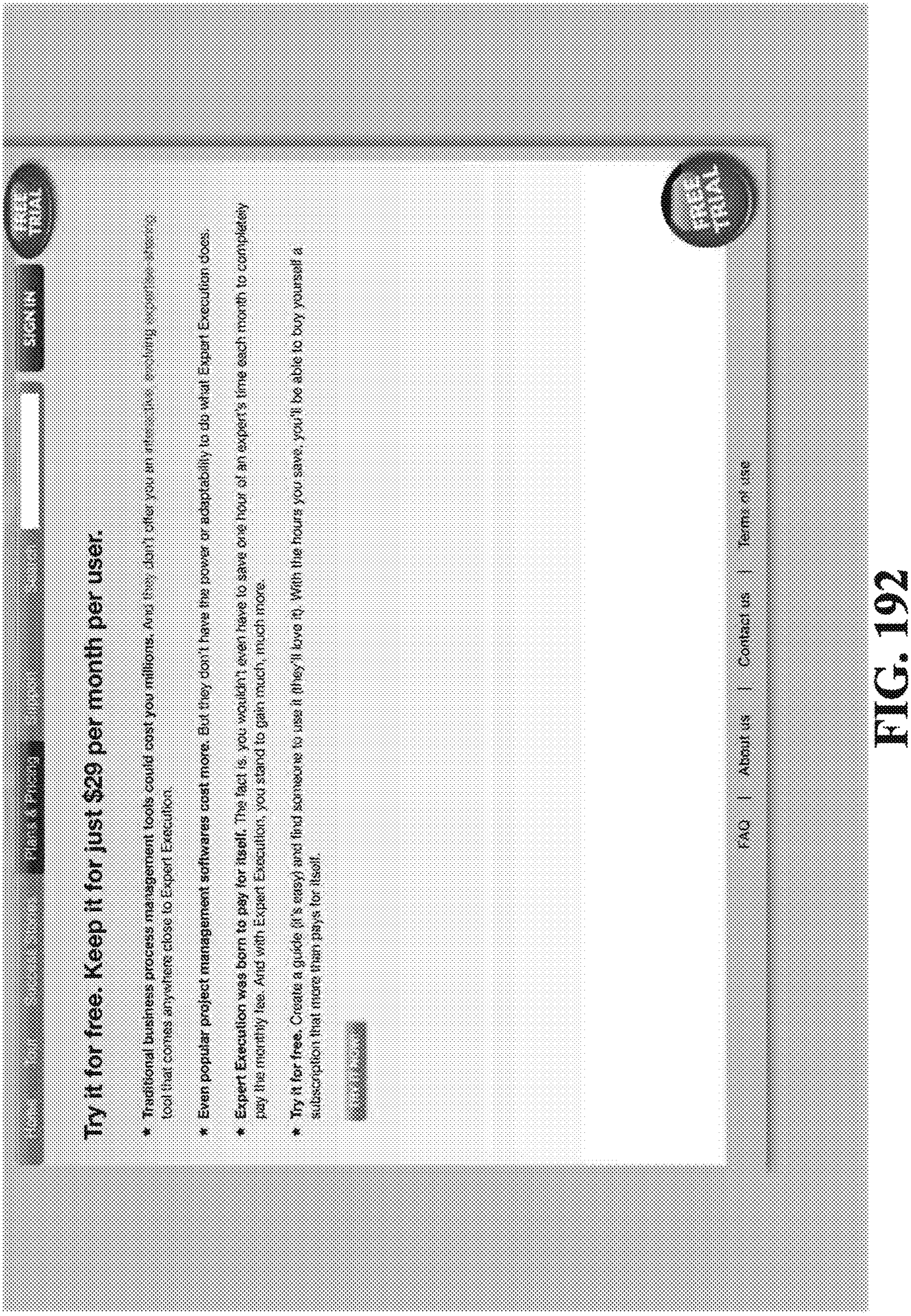

The server and one of the user devices depicted in FIG. 133A are illustrated in more detail in FIG. 133B in accordance with some embodiments. As shown, computing device 13302 may include a hardware processor 13314, a display 13316, an input device 13318, and memory 13320, which may be interconnected.

In some embodiments, memory 13320 can contain a storage device for storing a computer program for controlling processor 13314. In some implementations, processor 13314 can execute the computer program to present on display 13316 user interfaces and data.

Server 13310 may similarly include a hardware processor 13322, a display 13324, an input device 13326, and memory 13328, which may be interconnected. Memory 13328 can contain a storage device for storing data and/or a server program for controlling processor 13322 in some implementations.

In accordance with some embodiments, the interactive checklist may have several additional features. For example, organizations using the interactive checklist can take advantage of a "Remote Installation" option, allowing them to install it on their own infrastructure (in the cloud or on their servers) as an alternative to a SaaS option. It can provide numerous advantages, including ability to accommodate easy upgrades, ability to accommodate a scheduled database backup facility (some sort of intraday backup as well), and/or ability for the interactive checklist staff to troubleshoot. In some embodiments, the system can be used within a SaaS environment with certain particularly confidential interactive checklists and/or interactive checklists components being stored within an internal environment so that the client can be configured to access both environments as needed.

In accordance with some embodiments, a SSL support failover configuration can allow for failover without data loss across Amazon AWS geographies and outside of Amazon and similarly for other cloud providers, as well as database replication and customizable security settings that an administrator can choose from. For example, one may allow or disallow automatic login, or tie the currently logged-in session to the IP address used to log in, to help prevent session hijacking. A user can assign a reminder schedule to alert them (or others) when a particular interactive checklist may require review. This feature can allow a user to automatically receive alerts notifying them that it is time to review the interactive checklist and potentially update it so that it remains relevant and useful.

In accordance with some embodiments, for "Event-Capture" integration, the interactive checklist can monitor/capture user actions in other websites and/or applications and if necessary can interfere with a user's actions on a third-party page. For example, before allowing a user's action (e.g., filing a report in an external system), it can check whether the corresponding activity is complete. If not, it can remind the user to complete it before proceeding and possibly preventing submission until completion is done. A user can also record subsequent actions and attach an interactive checklist to a document (rather than a web interface).

In some embodiments, an API can be provided that can allow interactive checklists to be connected to a web service of interactive checklists, allowing custom user forms to interact with interactive checklists. Email client and calendar integration can suggest and create activities from a user's email on demand or on a schedule.

In some embodiments, "Email Queue Addition" can have the ability to add and configure a new activity for an individual or for a group via email, for example, to a general or interactive checklist-specific email address.

In some embodiments, metadata such as due dates and/or time can be interpreted from the email automatically, and assignees, titles, description, document attachments, other data, and subsequent follow-ups can be extracted and including in the activity.

In some embodiments, security limitations may also be configured to restrict entry to the interactive checklist (e.g., only from certain addresses and/or only with certain email headers).

When assigned to a general email queue rather than an interactive checklist-specific interface, an assignee may be initially prompted to select an appropriate interactive checklist type.

In accordance with some embodiments, a service uptime tracker can offer an uptime indicator. Dashboard widgets can include metrics and other progress indicators that can be added to an interactive checklist dashboard or to another dashboard (such as iGoogle™ or an intranet). The interactive checklist can have advanced performance metrics and analysis.

In accordance with some embodiments, the interactive checklist can be available in a number of world languages. Interfaces can be offered in the user's preferred language and interactive checklists may offer translated versions with translations of steps and other elements managed by the software. Individual interactive checklists or sets or types of interactive checklists can be marked for translation management, with configurable language sets. Automated translation tools can enable supervisors who speak one language to assess compliance with procedures, regardless of the language of a particular activity. Activity and approval routing arrangements can consider languages known and preferred by the users involved, and languages needed. In some embodiments, manual translation management interfaces can be provided to offer better translations of certain text than automatic translations.

In accordance with some embodiments, query steps (e.g., a user's manual querying) can be a knowledge management feature that allows the user to perform database queries on steps across activities and interactive checklists. A user can set additional conditions and parameters to refine initial query.

In some embodiments, automatic publication can allow automatic publishing of content of an Activity to a document management system (e.g., a database or a wiki). For example, one document per Activity can be published to provide easily browseable, indexable, and searchable access through an organization's existing systems. Additionally, certain types of Activities can be omitted (e.g., for reasons of confidentiality). In some embodiments, Activities can be stored in a folder structure that mirrors a hierarchy of the Groups in which they are located, except as configured otherwise. Access permissions can be translated to a corresponding access tagging in the document management system. Other metatags, such as author, approver, time created, can also be translated automatically to the format used by the document management system.

In accordance with some embodiments, a solution finder is a feature that can allow a user to indicate a potential outcome in a particular situation, and then for the interactive checklist to review past activities using the same interactive checklist, to indicate which inputs can influence that (or other) outcomes.

In some embodiments, a "Guide Import Tool" can allow users to quickly turn existing checklists and Standard Operating Procedures (SOPs) into interactive checklists based on formatting and language-based heuristics and analysis. For example, bullets may generally indicate separate steps, and text such as "If [XYZ]" or "When [XYZ]" may indicate the basis for "When to Show" criteria.

In accordance with some embodiments, audio prompts for interactive checklists can have "Text to Speech" (TTS) prompts which can read various parts of the interactive checklist.

In some embodiments, "Likely Usefulness" allows for indicators which can show the user how often certain steps and suggestions have been useful to past users of the interactive checklist. Indicators can be nuanced providing the user information such as the conditional probability of helpfulness.

In some embodiments, co-branding or white labeling can enable an organization to use style elements such as their own logo and color scheme to customize the interactive checklist.

In some embodiments, a location-based assignment which can allow for scheduling of recurring activities based on physical location of the user or physical device(s) may also be available.

In some embodiments, keyboard shortcuts for frequent actions within an interactive checklist may be an additional feature, as well as an expansion of internal messaging tool to include social networking and social sharing capabilities (e.g., sharing a completed or not completed interactive checklist with a user that may benefit from it).

In some embodiments, an audit feature can allow for a setup and management of an audit policy. A hardware processor may, for example, monitor usage of particular individuals or groups, or on particular interactive checklists. Individual audit data can be consolidated and analyzed using reporting features.

Attaching an interactive checklist to desktop software or a desktop software item can be provided in some embodiments. For example, the interactive checklist can be attached to a database (e.g., a Microsoft Access database) that handles entry of purchase orders. For example, a submission workflow is included at launching and when needed in creating an interactive checklist.

External database integration which can allow for syncing (e.g., partial or complete) of data into databases and supporting popular database formats can also be provided.

In accordance with some embodiments, organizations, new users (free trial or subscribers, etc.) can start an Interactive Tour when they first log into the interactive checklist. They can pause and resume the tour at any point. The tour can help them set up their organization in the interactive checklist (if first user) and then orient them as to the available features. The tour can feature an interactive checklist wizard. FIGS. 134-180 show some examples of tour interfaces. Additionally, FIGS. 181-192 show examples of a public website for an interactive checklist. In some embodiments, a more detailed Interactive Tour sections can be presented by a hardware processor of computing device only at a particular time. For example, the hardware processor can present the detailed Interactive Tour when a user first visits the Guide Marketplace or when a user first begins to author an Interactive Checklist.

Figure 193:
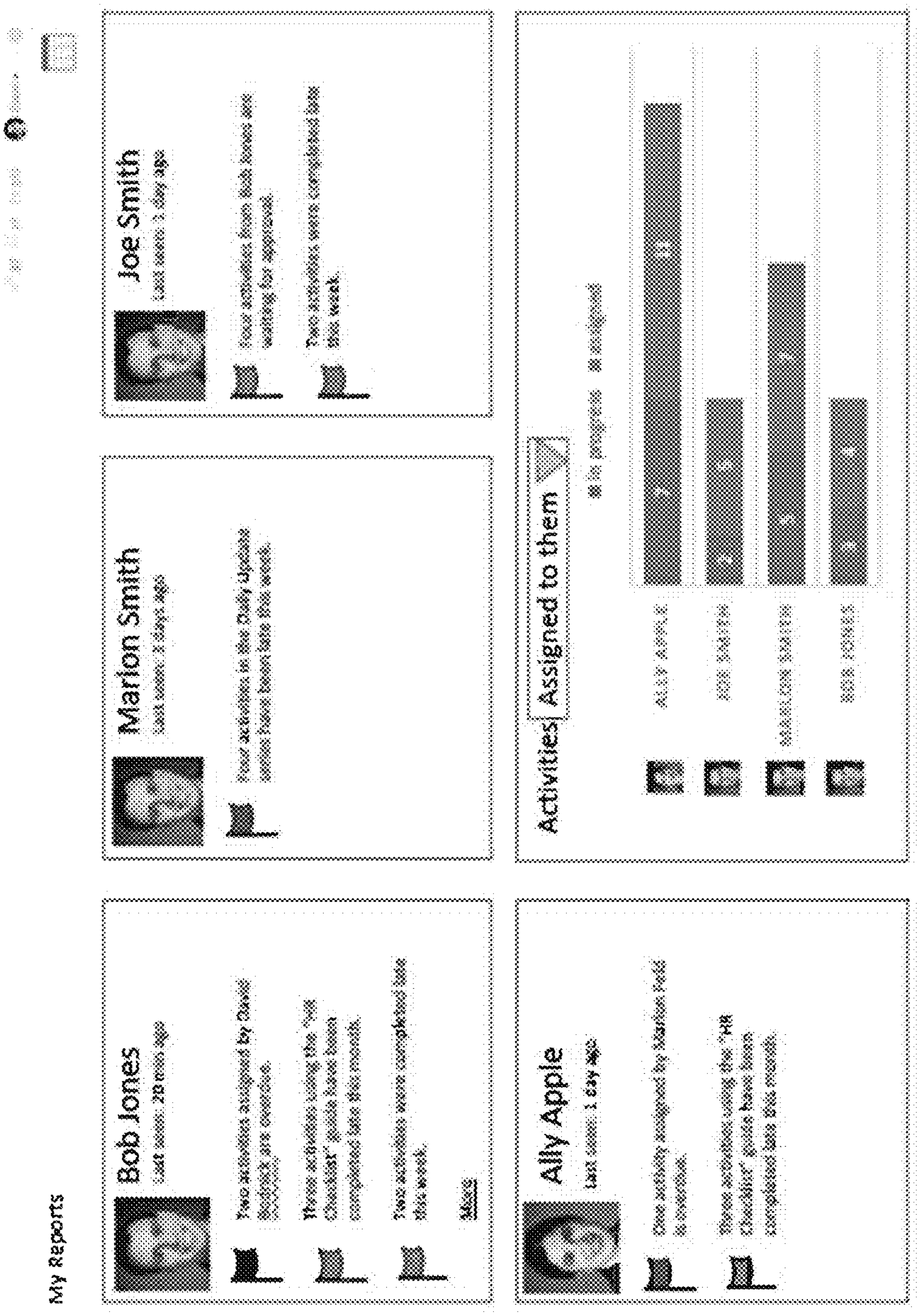
FIGS. 193, 194, and 195 shows examples of user interfaces for presenting reports for activities assigned to different users in accordance with some embodiments of the disclosed subject matter.
Figure 194:
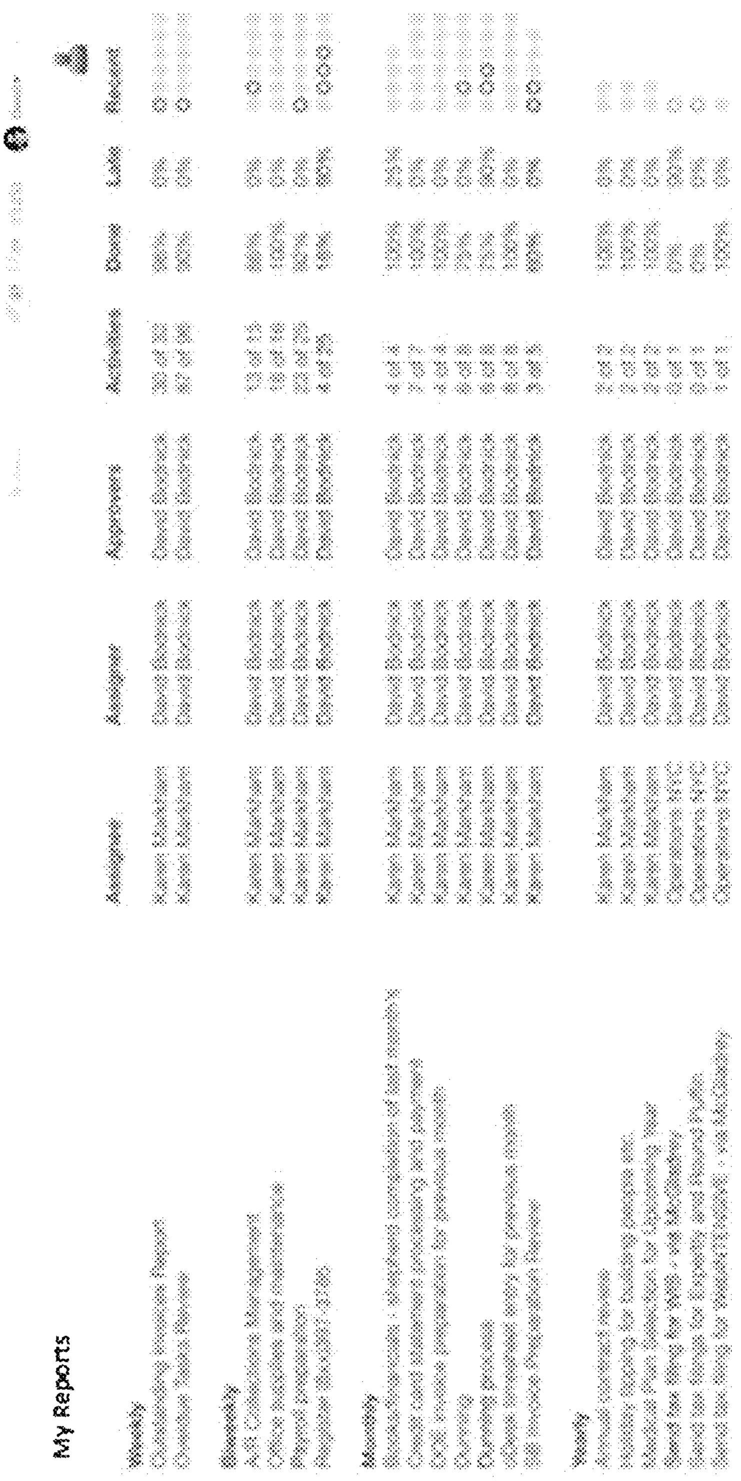
Figure 195:
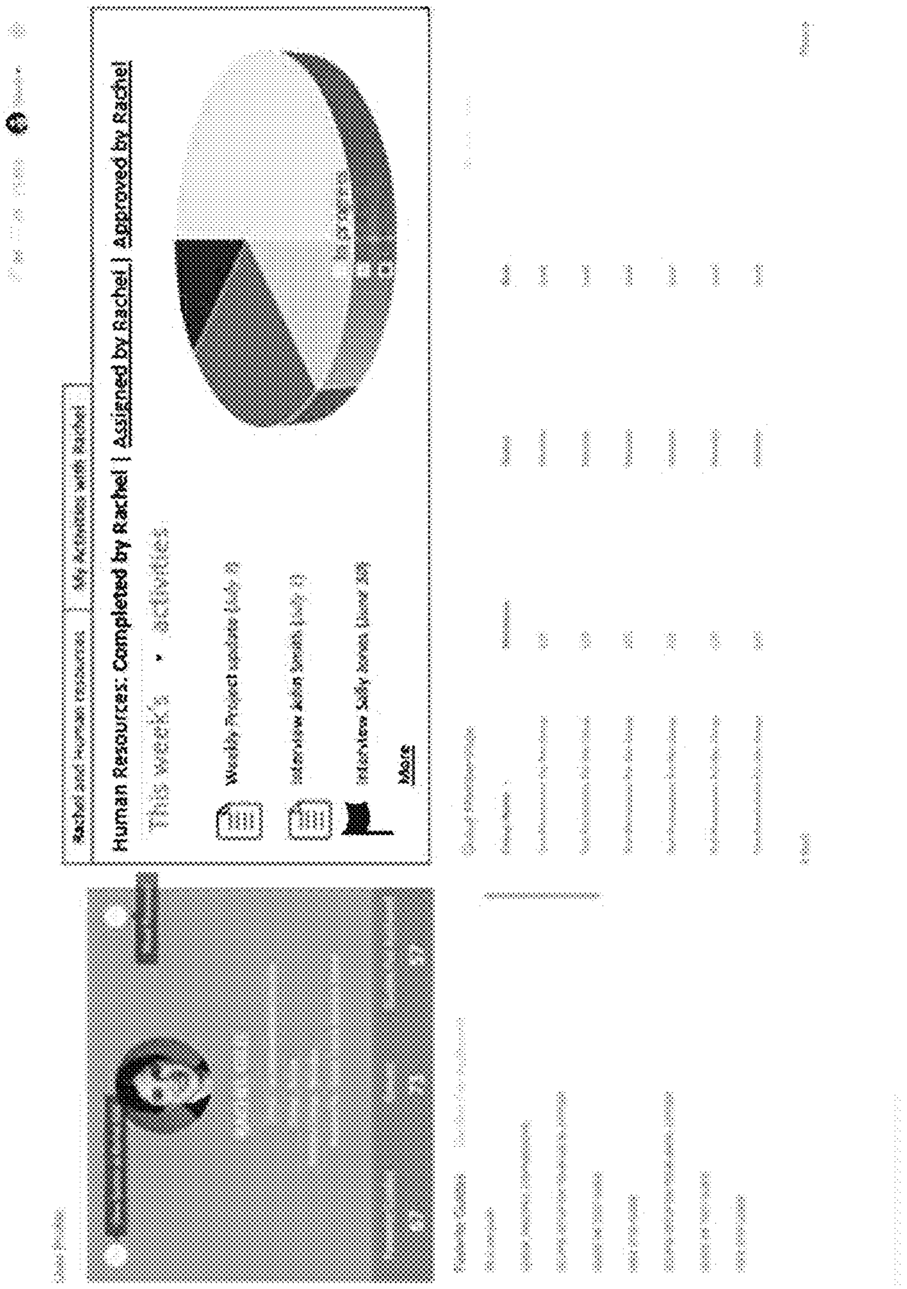

In accordance with some embodiments, user interfaces corresponding to each of a manager's reports can be created which indicate progress on one or more activities assigned to each report. For example, as shown in FIG. 193, the user interfaces can indicate a number of activities assigned to the report, a name of a person who assigned the activity to the report, a number of activities completed by the report over any suitable time period (e.g., in the last day, in the last week, in the last month, and/or over any other suitable time period). Additionally or alternatively, in some embodiments, a user interface indicating progress on activities for multiple reports (e.g., one or more people on a particular team) can be created, for example, indicating a number of activities assigned to each report and a number of assigned activities that have been completed by the report, as shown in FIG. 193. Furthermore, as shown in FIG. 194, a user interface showing a number of activities assigned, a number of activities completed, a percentage of activities completed late, and/or any other suitable metrics can be created and presented over any suitable time period and for any suitable number of reports. In some embodiments, such user interfaces can allow a manager to view trends over any suitable time period for reports on their team. Additionally or alternatively, as shown in FIG. 195, a profile page corresponding to a particular report can be generated and presented. In some such embodiments, the profile page can include any suitable user interface controls to filter data about the report's activities in any suitable manner (e.g., by type of activity, by date, by percentage completed, and/or any other suitable metric(s)). Additionally, in some embodiments, user interface controls to set customizable alerts relating to the report's activities can be included. For example, in some embodiments, such alerts can include an alert when the report has completed an activity, an alert when the report has started an activity, an alert a predetermined amount of time before a due date associated with an activity, and/or any other suitable alerts.

In accordance with some embodiments, a user's activities can be organized and presented in an Operations Dashboard. In some embodiments, the Dashboard can indicate information such as a number of activities due, a number of activities completed, an average time spent per activity, a calendar indicating due dates of activities, and/or any other suitable information. Additionally or alternatively, in some embodiments, a Dashboard can be presented which collates activity information for multiple users, for example, multiple users on a particular team, multiple users at an organization, and/or any other suitable group of users. In some embodiments, a widget can be included in a user's Dashboard that can allow the user to easily take actions related to particular items included in the Dashboard. For example, a Dashboard widget on a manager's Dashboard can highlight problems with users who report to the manager (e.g., missed deadlines, upcoming deadlines, and/or any other suitable information) and/or queues associated with one or more groups associated with the manager. The Dashboard widget can then allow the user to send reminders to users with upcoming deadlines or missed deadlines, delete one or more activities, and/or take any other suitable actions.

Figure 196:
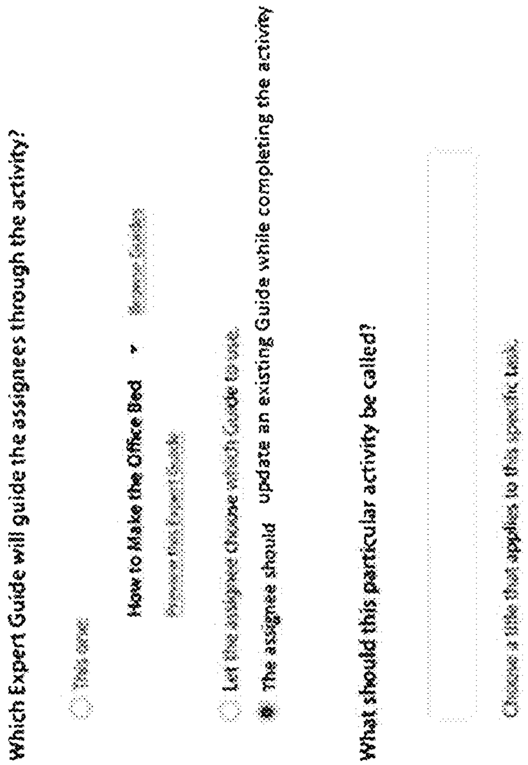
FIG. 196 shows an example of a user interface for selecting a Guide in accordance with some embodiments of the disclosed subject matter.

In accordance with some embodiments, a user can assign a second user to update an existing Guide. For example, as shown in FIG. 196, a user interface can be presented which can allow the user to identify the existing Guide to be updated, provide additional details related to the activity (e.g., how the Guide is to be updated, and/or any other suitable information), identify the second user, and/or provide any other suitable information (e.g., a date by which the activity is to be completed, and/or any other suitable information). Additionally or alternatively, in some embodiments, a user can assign a second user to create a new Guide. For example, in some embodiments, the user can assign and/or create an activity and can associate a Guide that has not yet been created to the second user for completion. In some such embodiments, the assigned and/or created activity can be completed using the new Guide.

Figure 197:
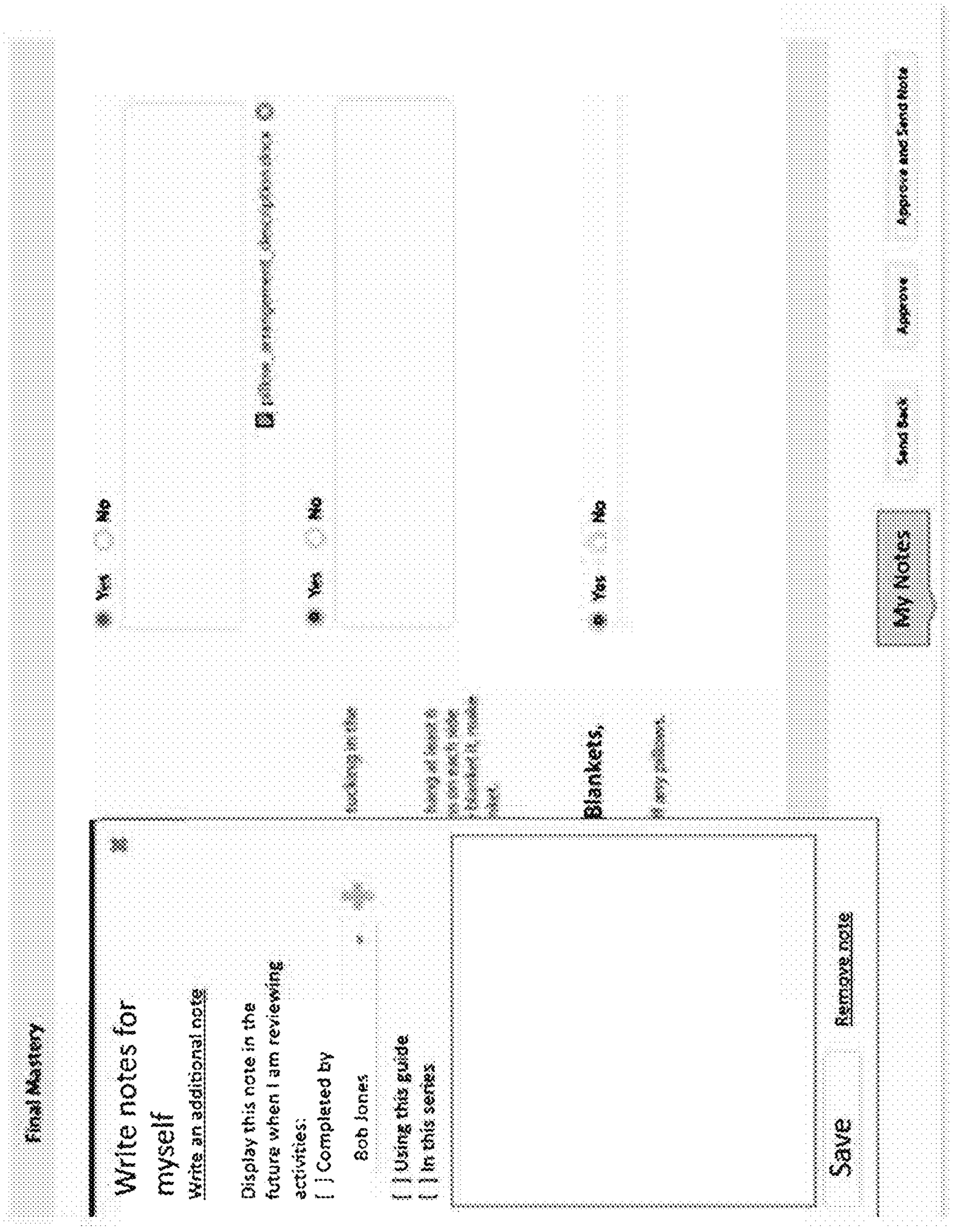
FIGS. 197 and 198 show examples of user interfaces for receiving and presenting notes in connection with an activity in accordance with some embodiments of the disclosed subject matter.
Figure 198:
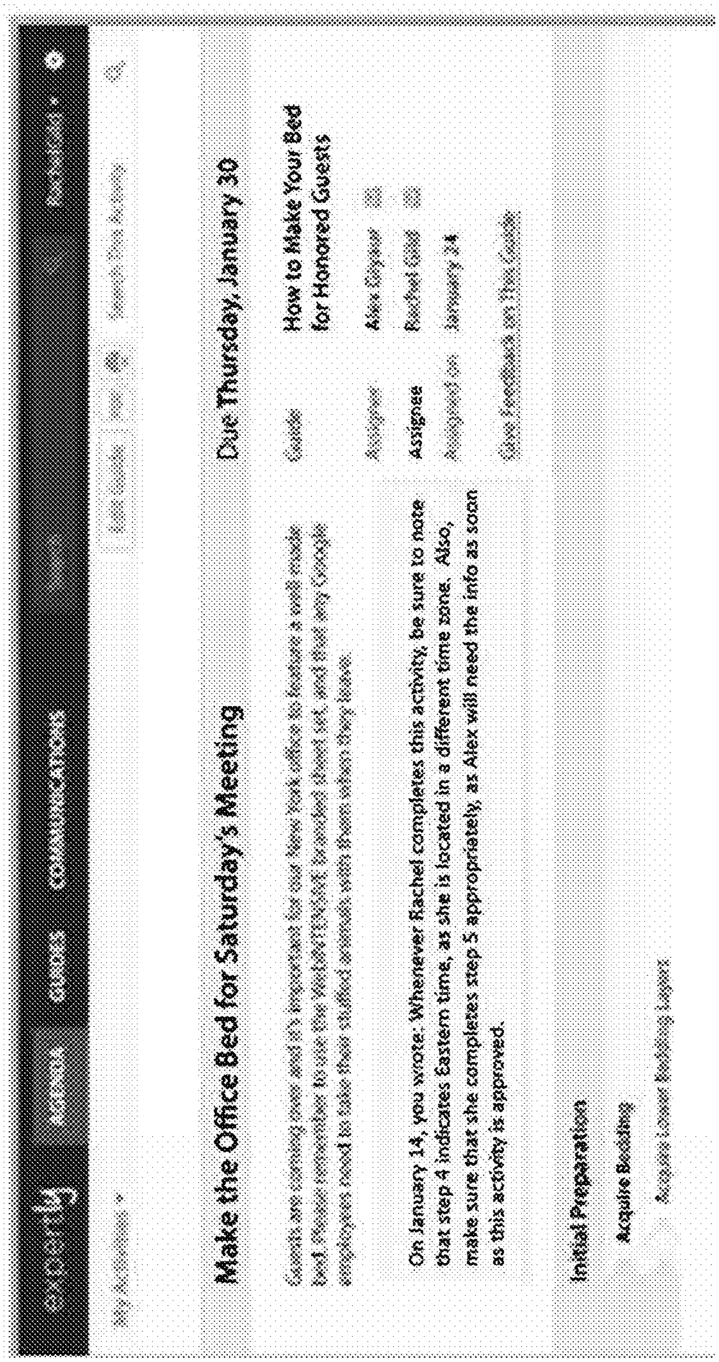

In some embodiments, a user interface for receiving notes from a user relating to one or more tasks and/or activities can be presented, as shown in FIG. 197. For example, in some embodiments, the user interface can be used to receive preferences indicating conditions in which the note is to be displayed (e.g., in connection with one or more Guides, in connection with activities completed and/or assigned to one or more particular people, and/or any other suitable criteria). In some embodiments, the notes received by the user interface can be shared with any suitable people in any suitable manner. For example, in some embodiments, the notes can be displayed in connection with pages relating to a particular activity, as shown in FIG. 198. Additionally or alternatively, in some embodiments, text associated with the notes can be inserted into emails. In some embodiments, the user interface can additionally or alternatively be used for allowing an author of the note to perform any suitable actions, such as reviewing the note, removing the note, promoting and/or sharing the note with other users, and/or any other suitable actions.

Figure 199:
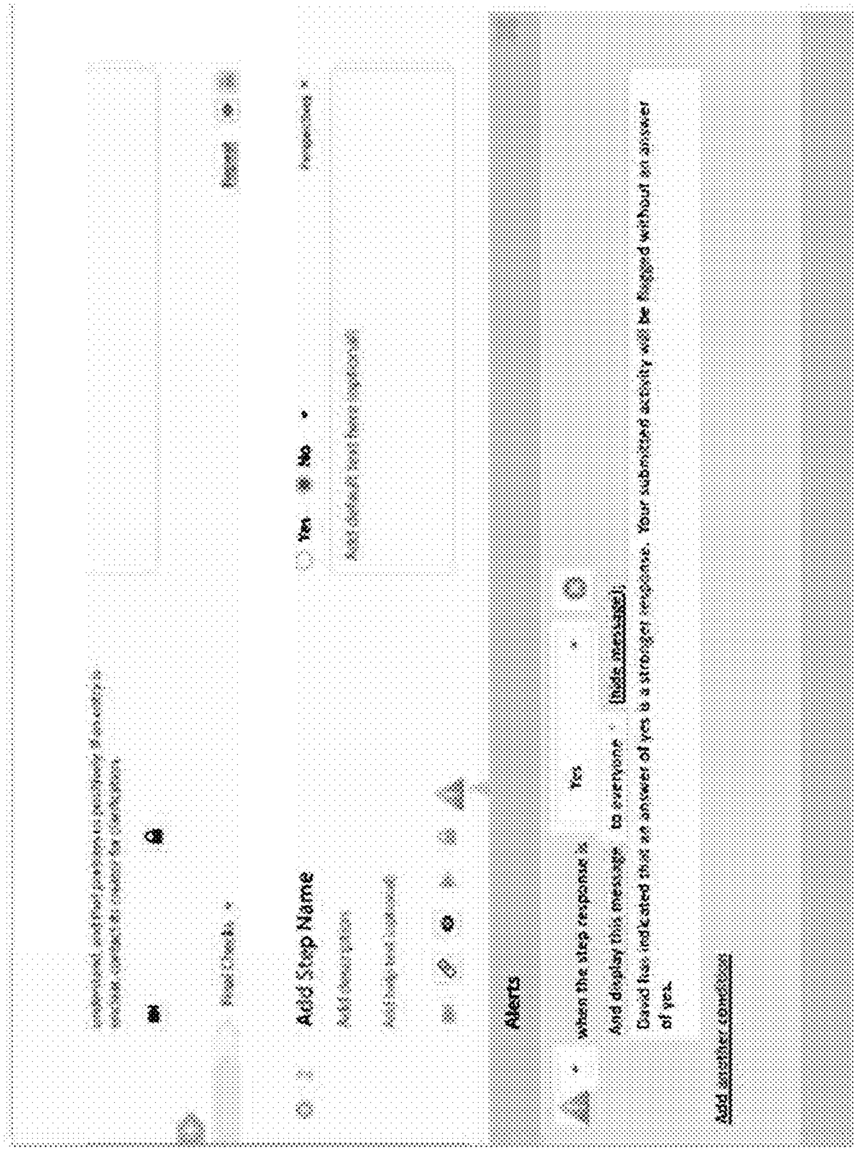
FIGS. 199, 200, and 201 show examples of user interfaces for configuring and presenting alerts in connection with an activity in accordance with some embodiments of the disclosed subject matter.
Figure 200:
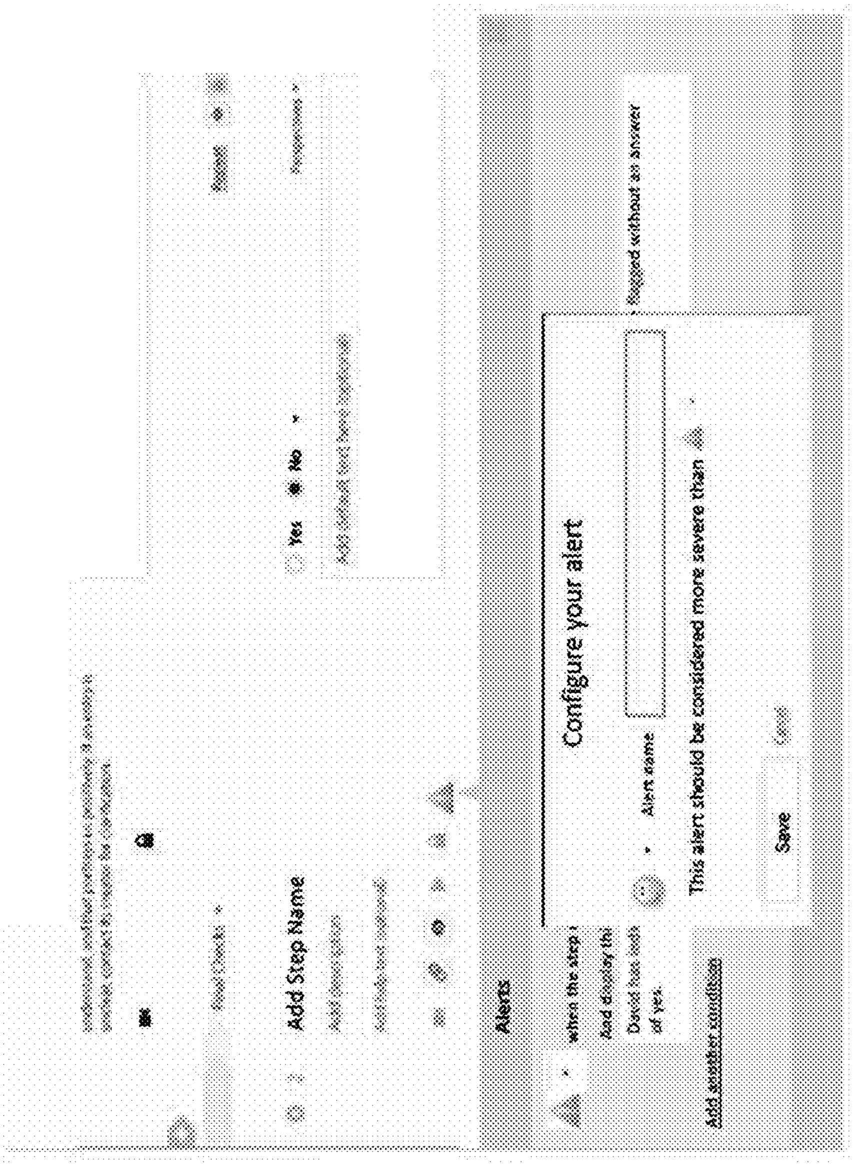
Figure 201:
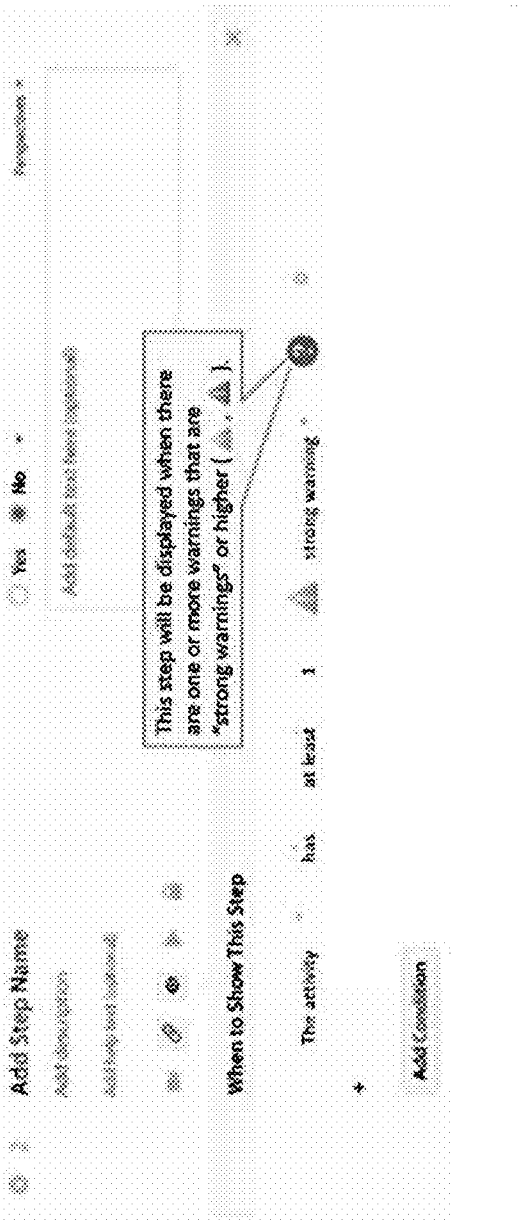

In accordance with some embodiments, user interfaces to set alerts can be generated and/or presented, as shown in FIG. 199. In some embodiments, the alerts can be set to be conditional on various criteria, which can be set via the user interface. For example, in some embodiments, an alert can be set to be conditional on receiving a particular answer to a question (e.g., a question posed to a group, a question posed to an individual, and/or any other suitable answer). As another example, in some embodiments, an alert can be set to be conditional on reaching a particular milestone in an activity completion process (e.g., a particular step in a flowchart, and/or any other suitable step). As yet another example, in some embodiments, an alert can be set to be conditional on an approaching deadline (e.g., when fewer than a predetermined number of days remains before a deadline, and/or any other suitable metric). As shown in FIG. 199, the user interface can be used to indicate one or more users to receive the alert and any message(s) associated with the alert. Additionally, as shown in FIGS. 200 and 201, alerts can be associated with any suitable levels (e.g., "strong," "urgent," "not urgent," and/or any other suitable levels).

Figure 202:
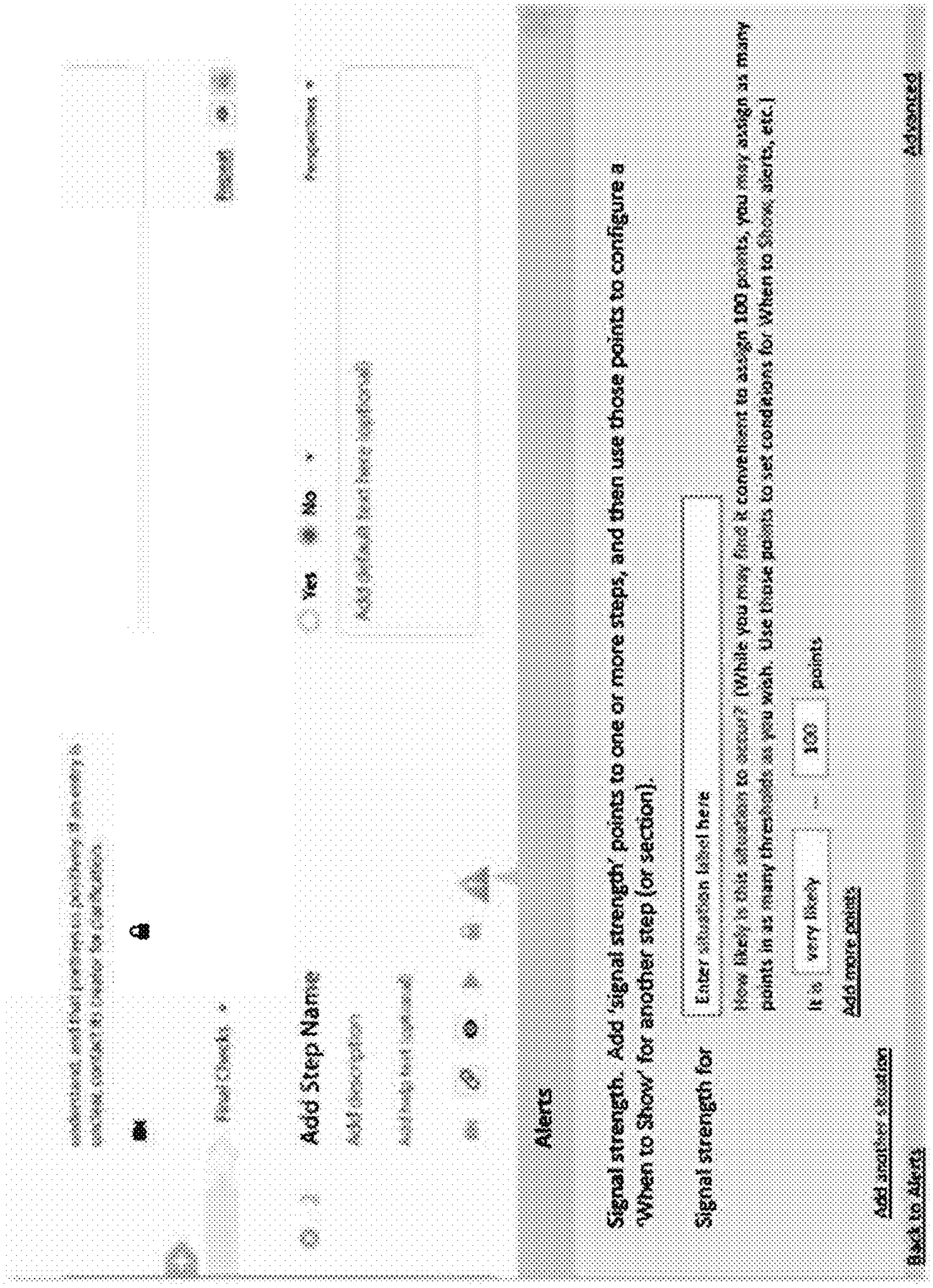
FIGS. 202, 203, and 204 show examples of user interfaces for assigning point values to steps in a Guide and configuring steps based on the point values in accordance with some embodiments of the disclosed subject matter.
Figure 203:
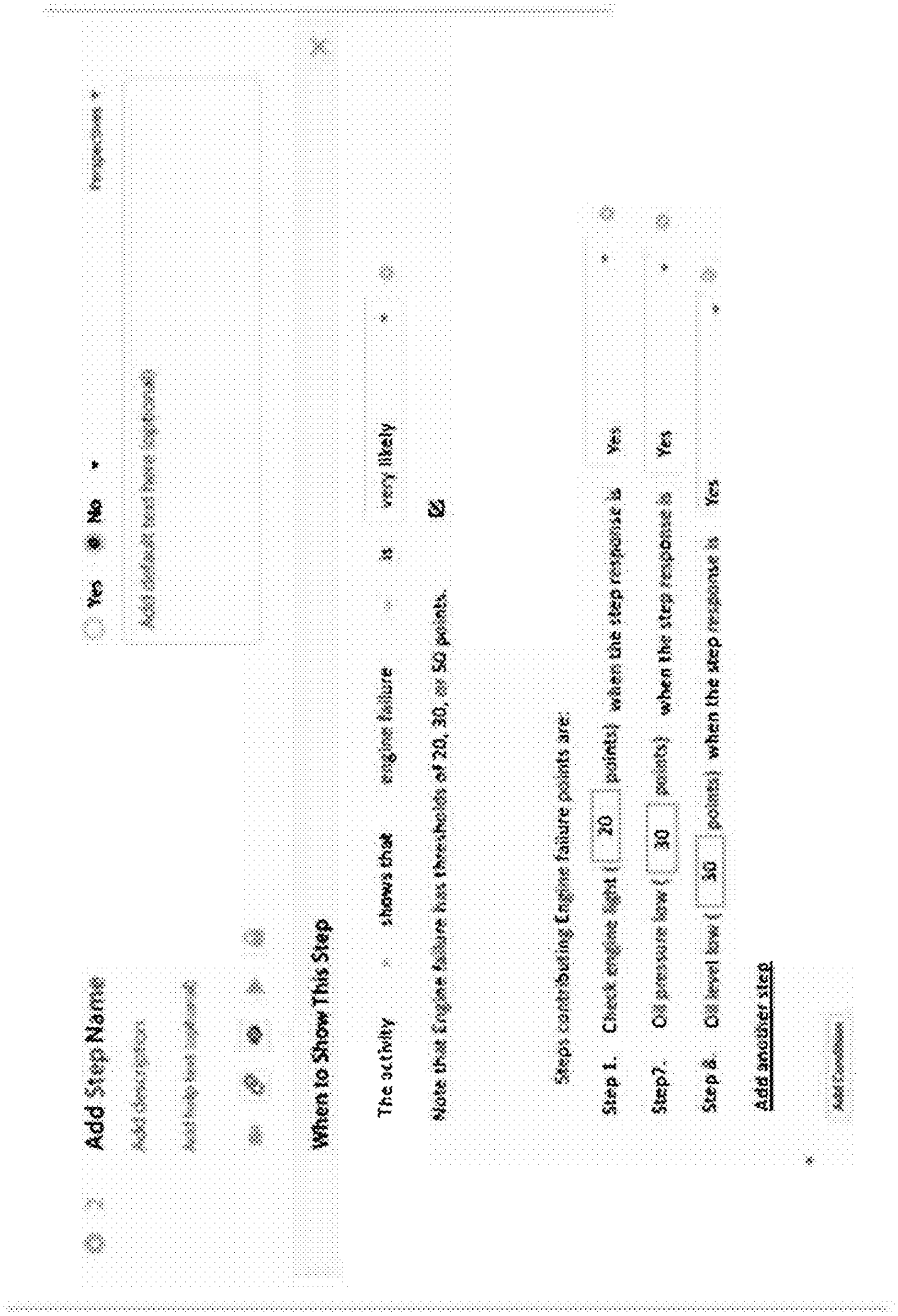
Figure 204:
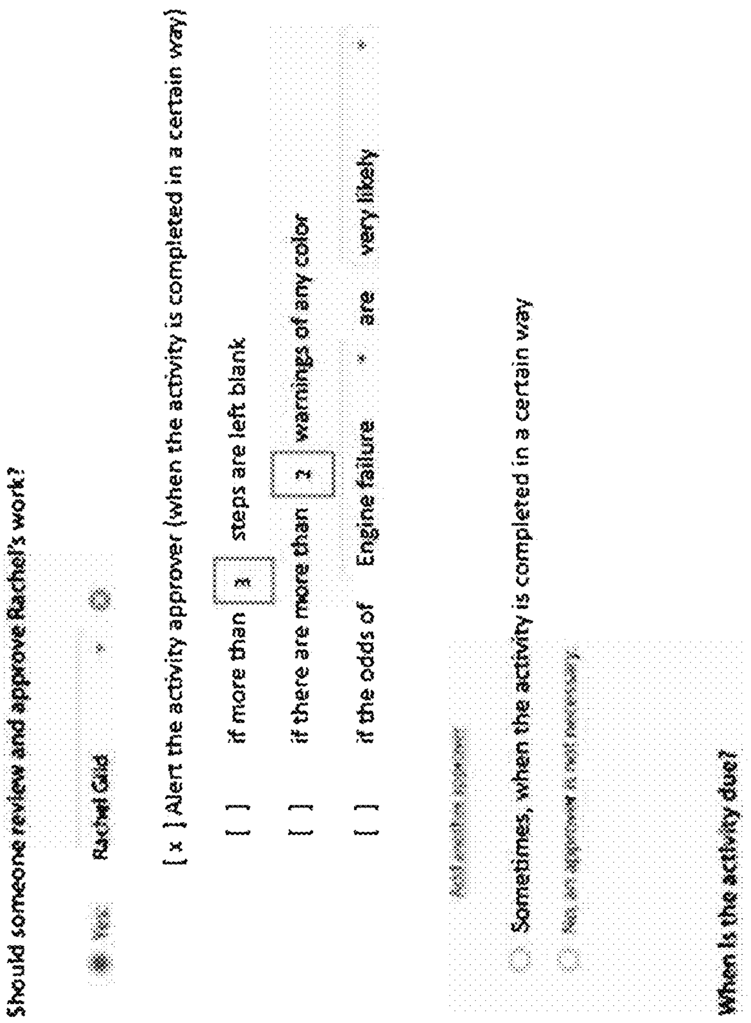
Figure 218:
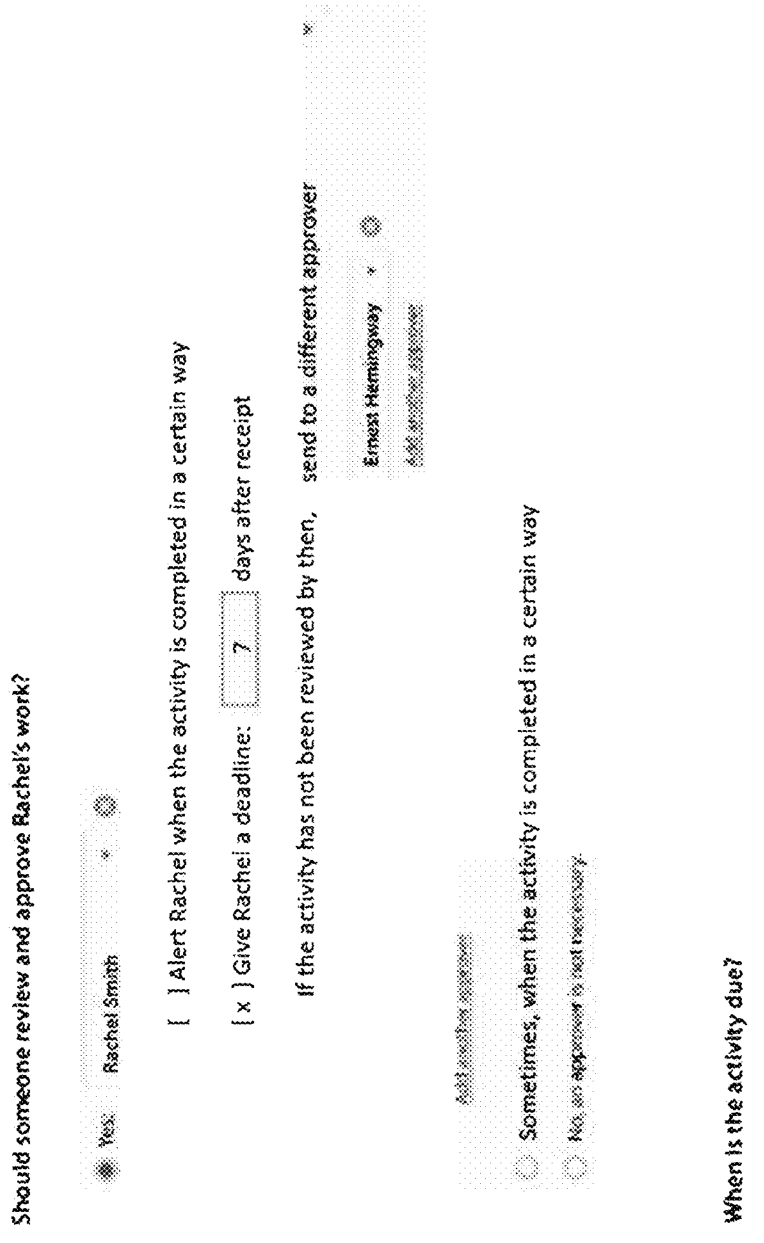
FIG. 218 shows an example of a user interface for indicating a deadline for a reviewer to review an activity in accordance with some embodiments of the disclosed subject matter.

In accordance with some embodiments, users can assign point values to steps in an existing Guide. For example, as shown in FIG. 202, a user interface can be generated and/or presented, which can receive any suitable information, such as a name of a step, a label associated with the points, and/or a points value associated with the step. As shown in FIG. 203, the point values can be used as criteria for when to show a particular step in a checklist. For example, as shown in FIG. 203, a step can be presented in a checklist when points values associated with other steps exceed a predetermined threshold. Additionally, the points values can be used to determine a likelihood of a particular outcome. Furthermore, in some embodiments, the points values can be used to show an alert and/or route an activity to a particular user. For example, as shown in FIG. 204, a user interface can be presented which can receive an indication to route an activity to a particular user and/or reviewer if particular criteria are met, such as if a particular outcome is likely (e.g., based on points values), if more than a predetermined number of steps are blank and/or incomplete, if more than a predetermined number of warnings are issued, and/or any other suitable criteria. Note that, in some embodiments, a deadline can be set for the particular user and/or the reviewer to finish an activity and/or finish reviewing an activity, as shown in FIG. 218. Additionally, as shown in FIG. 218, one or more automatic actions can be specified if the review is not completed by the deadline, such as sending it to a different reviewer, sending a reminder about the deadline, removing it from the reviewer's queue of activities, and/or any other suitable actions.

In accordance with some embodiments, various other tools can be implemented for assigning one or more activities and/or modifying assignments of activities. For example, in some embodiments, an assigner of an activity can request a particular assignee or search for a group of potential assignees using any suitable filtering criteria or rules. In some embodiments, multiple assignees can be selected and prioritized with customizable rules or timing (e.g., requesting a particular assignee based on due dates for an activity and a potential assignee's schedule, and/or any other suitable timing information). As another example, in some embodiments, an assigner can assign an activity to a group of users. In some such embodiments, one or more users within a group of users can be excluded from the assignment of the activity, for example, based on the roles of the excluded users. As yet another example, in some embodiments, multiple activities can be canceled simultaneously (e.g., a series of activities in a checklist, and/or any other suitable group of activities). In some embodiments, an assigner of an activity can automatically be presented with a message and/or receive a message when an activity is assigned and/or canceled.

In accordance with some embodiments, a list and/or sections of a Guide can be automatically populated based on user responses. For example if the user interface receives a response indicating that a list is to be entered (e.g., a list of clients, a list of reviewers, a list of steps, and/or any other suitable list), a section of the user interface can be populated with suitable entries for the list (e.g., suitable clients, suitable reviewers, suitable steps in a process, and/or any other suitable entries). In some embodiments, the suitable entries can be determined in any suitable manner and based on any suitable information, for example, by accessing a database indicating previously used entries for the type of list to be entered.

Figure 209:
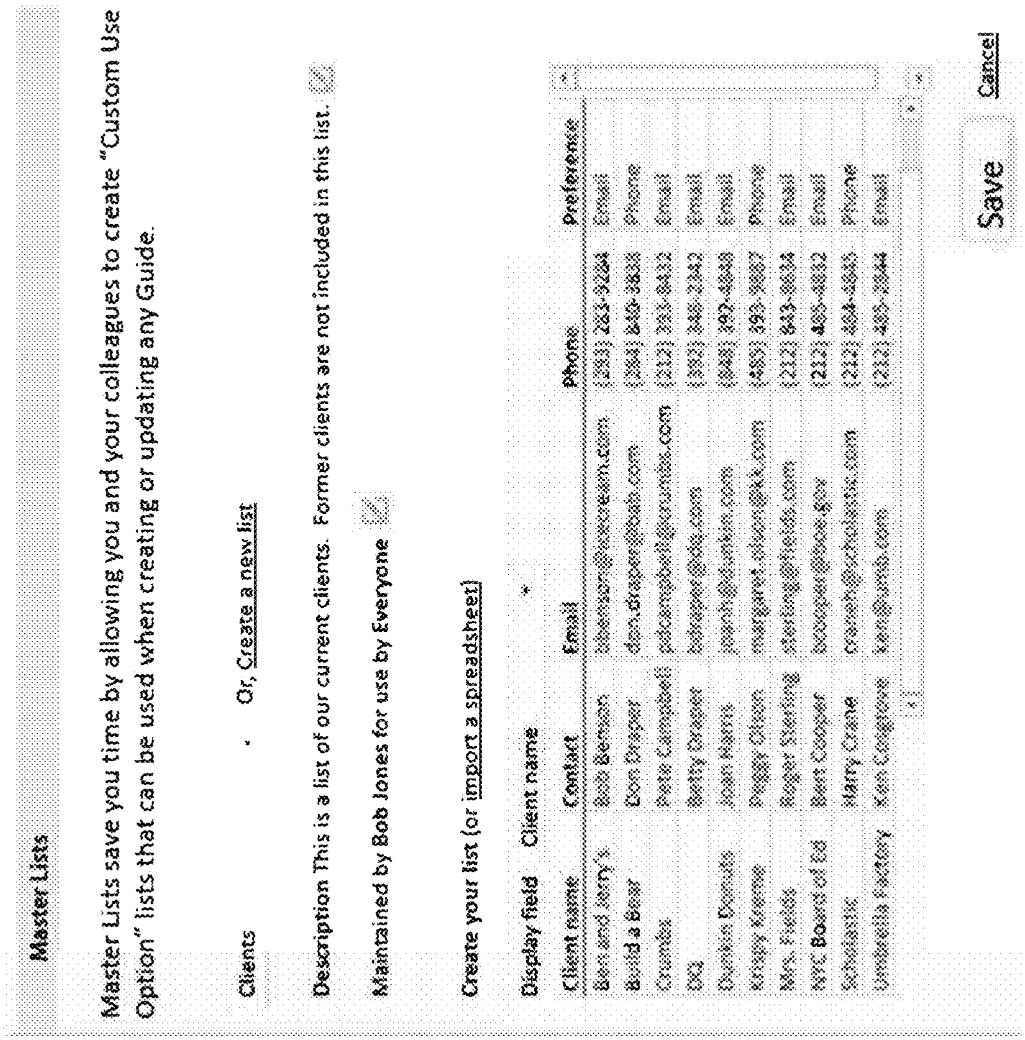
FIGS. 209 and 210 show examples of user interfaces for creating one or more Master Lists in accordance with some embodiments of the disclosed subject matter.
Figure 210:
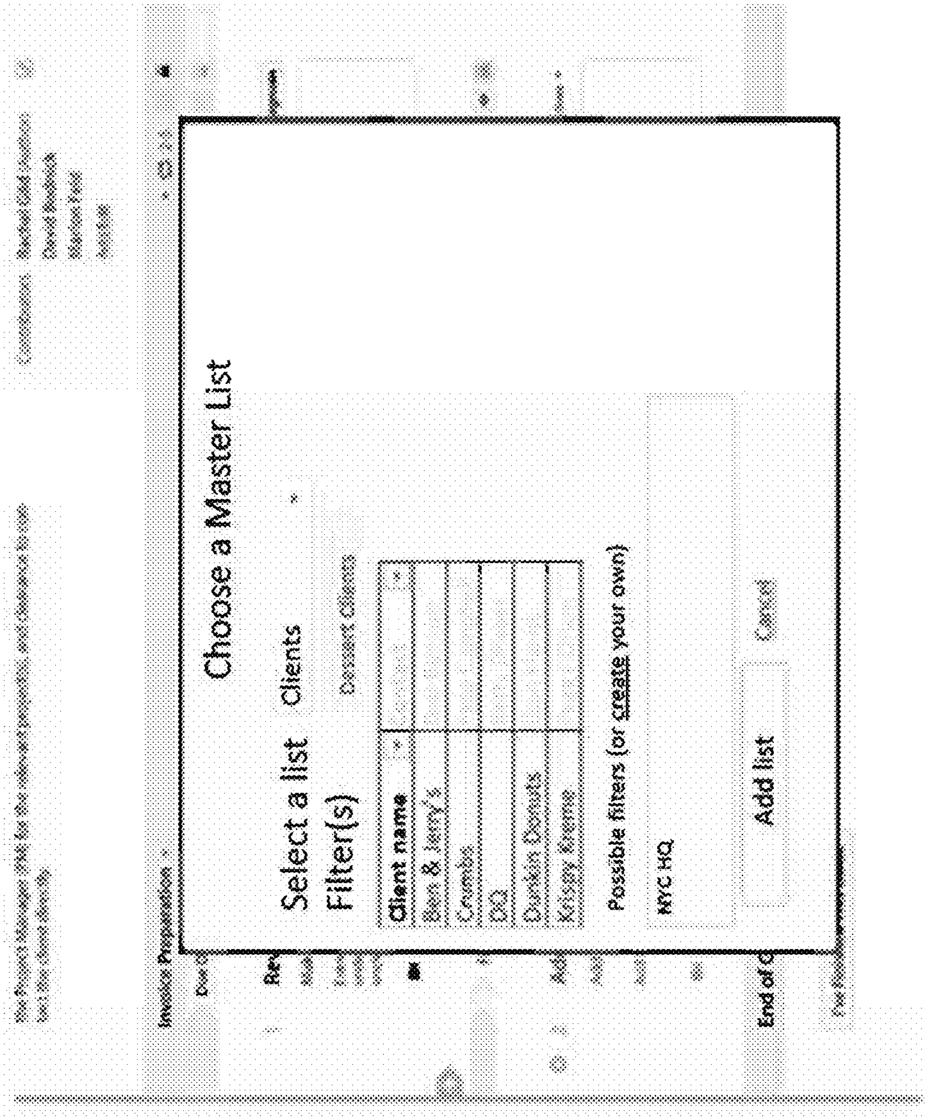

In accordance with some embodiments, a Master List (e.g., a list of clients, a list of users, and/or any other suitable type of list) can be used in multiple Guides, as shown in FIGS. 208 and 209. For example, in some embodiments, a created Master List can be stored in any suitable location (e.g., a server) and can be used by other users during the creation and/or updates of any suitable Guide. In some such embodiments, a creator of the Master List can indicate users who are allowed to use and/or access the Master List (e.g., by specifying users who belong to a particular team, users who belong to a particular organization, and/or any other suitable group of users). Additionally or alternatively, in some embodiments, the Master List can include any other suitable information, such as a name, a description of the contents of the Master List, permissions indicating users who are allowed to user and/or edit the Master List, items corresponding to one or more data fields, and/or any other suitable information. In some embodiments, a Master List can be used to populate a list of choices, for example, by specifying values for different field entries, using filters and/or sorts, and/or in any other suitable manner. In some embodiments, a Master List can be created in any suitable manner. For example, a Master List can be manually created by a user, uploaded to a server from an external spreadsheet or database, automatically created from a database and/or other suitable source, dynamically generated through a query of a database (for example through SQL calls or transactions containing multiple calls), dynamically generated from an external system (for example through a REST API call), and/or created in any other suitable manner. As another example, in some embodiments, a list entry widget can be used to add and remove items from a Master List. Furthermore, in some embodiments, any suitable functions can be performed on a Master List, such as using filters on the list, using the Master List as a response in connection with a Guide, using a Master List to interact with external data sources, and/or any other suitable functions, as shown in FIG. 210.

Note that, in some embodiments, any suitable datatypes can be supported by a Master List, including Boolean data, text, binary data, numeric data, dates, times, etc. In some embodiments, data in a Master List can be modified in any suitable manner and based on any suitable information. For example, in some embodiments, data in a Master List can be altered through an activity. For example, in some embodiments, a Guide and/or an activity in a Guide can present items in a Master List in connection with an option to add an item to the Master List. In some embodiments, items added to the Master List will update the underlying data source, even when located within an external database or system. In some embodiments, a Master List can be associated with a Guide that can be used to edit or delete an item in the Master List. In some embodiments, a Master List can be associated with permissions indicating users who are authorized to modify the Master List.

In accordance with some embodiments, various tools for allowing users to easily create, publish, and edit Guides can be implemented. For example, in some embodiments, an author of a Guide can edit a Guide after it has been published, and the Guide can be updated accordingly. As another example, in some embodiments, one or more authors of a Guide can be notified when a Guide is changed, either before or after publication. As yet another example, in some embodiments, tools can be implemented to allow a Guide to be quickly edited. As a more particular example, in some embodiments, a Guide author can move multiple steps within a Guide simultaneously, for example, by selecting multiple steps in the Guide. As another more particular example, in some embodiments, tools can be implemented to allow a Guide author to edit sections, such as by moving a section, adding a section description, deleting a section, and/or modifying sections of a Guide in any other suitable manner. As still another example, in some embodiments, authorship of a Guide can be transferred to another user. Additionally, in some embodiments, a user of a Guide (e.g., a Guide author and/or any other suitable user of the Guide) can modify an indication and/or an identifier of an organization and/or group that they are a part of, and, in some embodiments, this change can be reflected across multiple Guides and/or checklists. Note that, in some embodiments, a user editing a Guide (or viewing a Guide) can be presented with a list of one or more activities that have been assigned through the Guide. In some such embodiments, permissions indicating users that are allowed to view different activities may be checked prior to presentation of the related activities.

Figure 211:
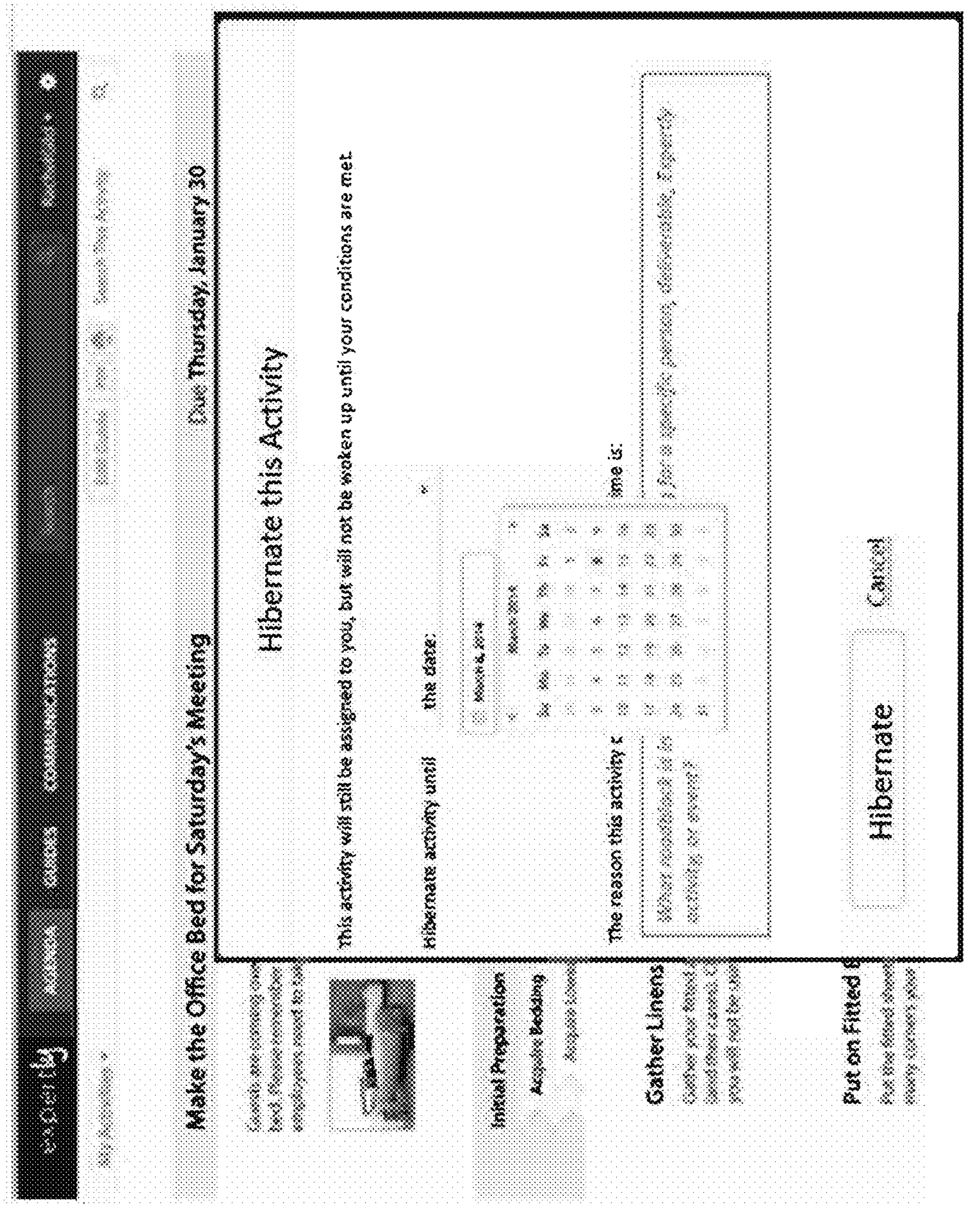
FIG. 211 shows an example of a user interface for setting an activity to hibernate mode in accordance with some embodiments of the disclosed subject matter.

In some embodiments, an activity can be set in a hibernate mode, as shown in FIG. 211. For example, in some embodiments, setting an active activity to hibernate mode can cause any notifications about the activity to not be presented. In some embodiments, the activity can be set in hibernate mode until a particular condition is met (e.g., until a particular date in time, until another activity is completed, and/or any other suitable condition). In some embodiments, a user can set an activity assigned to themselves to hibernate mode. Additionally or alternatively, in some embodiments, a manager can set an activity that is assigned to a user who is on their team to hibernate mode.

Figure 212:
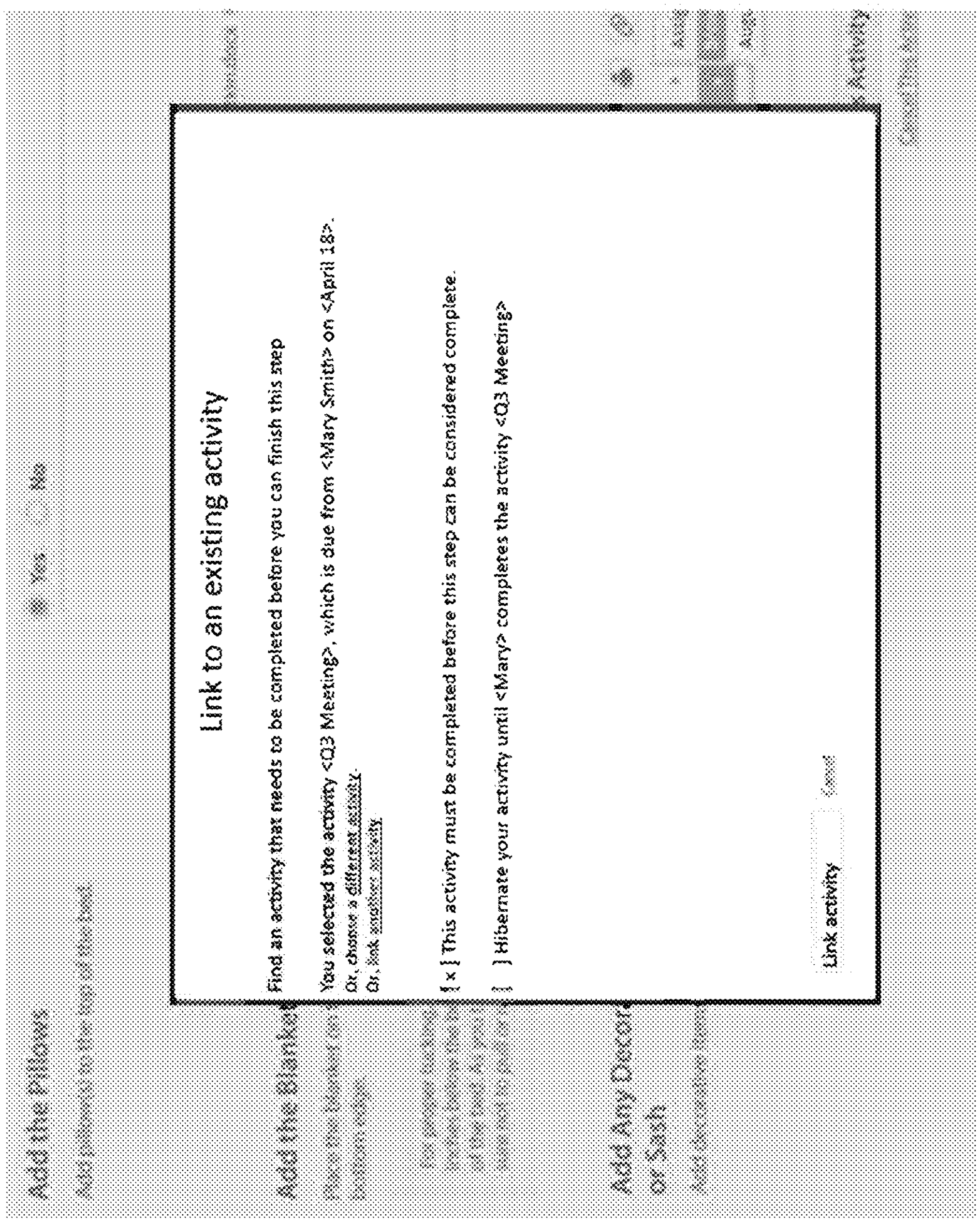
FIG. 212 shows an example of a user interface for linking two activities in accordance with some embodiments of the disclosed subject matter.

In accordance with some embodiments, multiple activities can be linked to each other. For example, in an instance where a user realizes that completion of a first activity depends on another activity (either an activity assigned to the user or to another user), the user can indicate that the two activities are dependent on each other by linking the first activity to the second activity, as shown in FIG. 212. In some such instances, the first activity can be considered a "stuck activity," where steps of the first activity cannot be considered complete until the second activity is completed, as shown in FIG. 212. Furthermore, in some embodiments, the user can additionally or alternatively set any suitable notifications (e.g., to notify the user when the second activity is completed, and/or any other suitable notifications). Additionally, the user can set the first activity to be in hibernate mode until the second activity is completed. For example, in instances where the first activity is set to hibernate mode, the system may determine that one or more messages related to the first activity are not to be presented until the second activity is completed. Note that, in some embodiments, the second activity that is linked to the first activity may already exist in the system. Alternatively, in some embodiments, the second activity can be created when the dependency between the first activity and the second activity is indicated.

Figure 213:
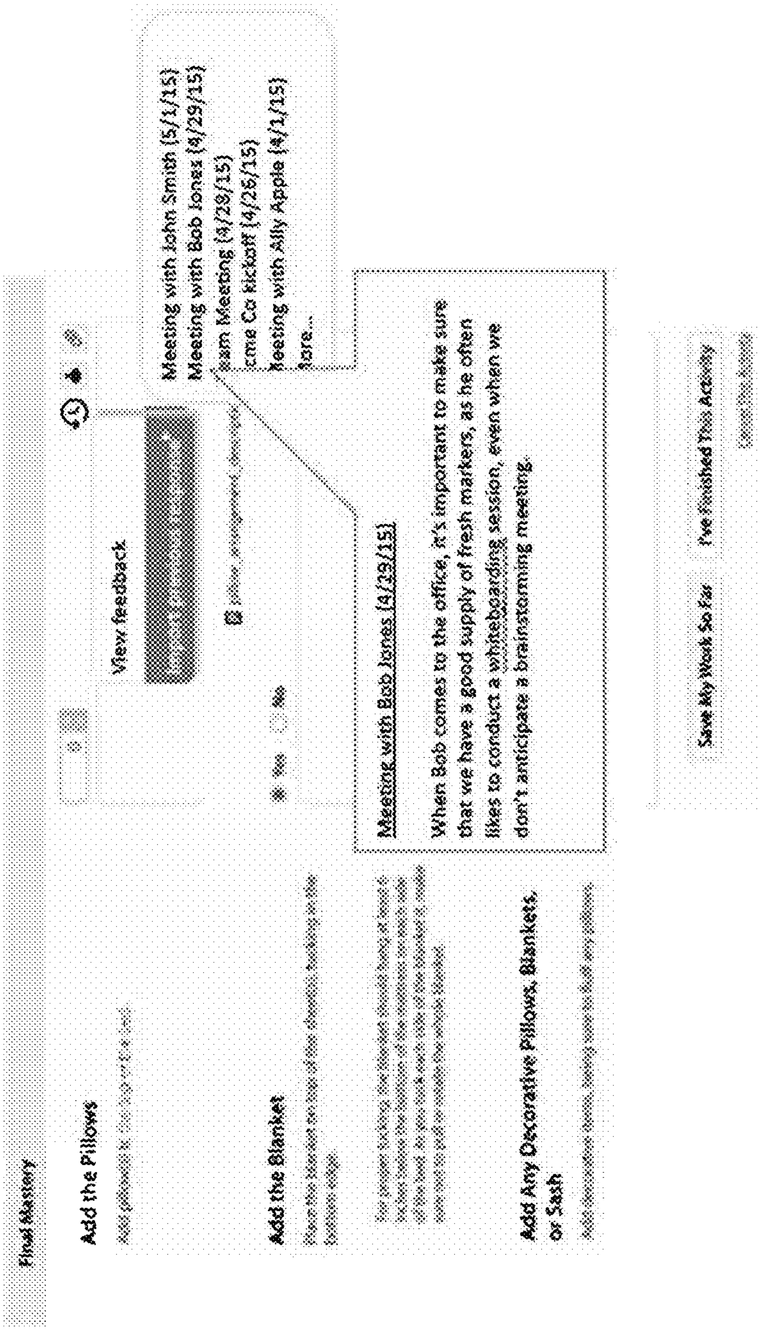
FIG. 213 shows an example of a user interface for importing a previously entered response in accordance with some embodiments of the disclosed subject matter.

In accordance with some embodiments, responses from one activity can be copied as a response to a step in a second activity. For example, in some embodiments, a user interface such as the one shown in FIG. 213 can be presented, which can allow a user to import a response entered in connection with a step in a previously completed activity, and the previously entered response can be entered as a response in a current activity. In some such embodiments, the previously entered response can be edited in any suitable manner. Additionally, in some embodiments, changes between the original response and a response that has been imported and subsequently modified can be made visible, for example, by highlighting the differences in any suitable manner. In some such embodiments, the differences can be made visible to any suitable users, such as the original activity assignee, a manager of the activity assignee, and/or any other suitable user.

Figure 214:
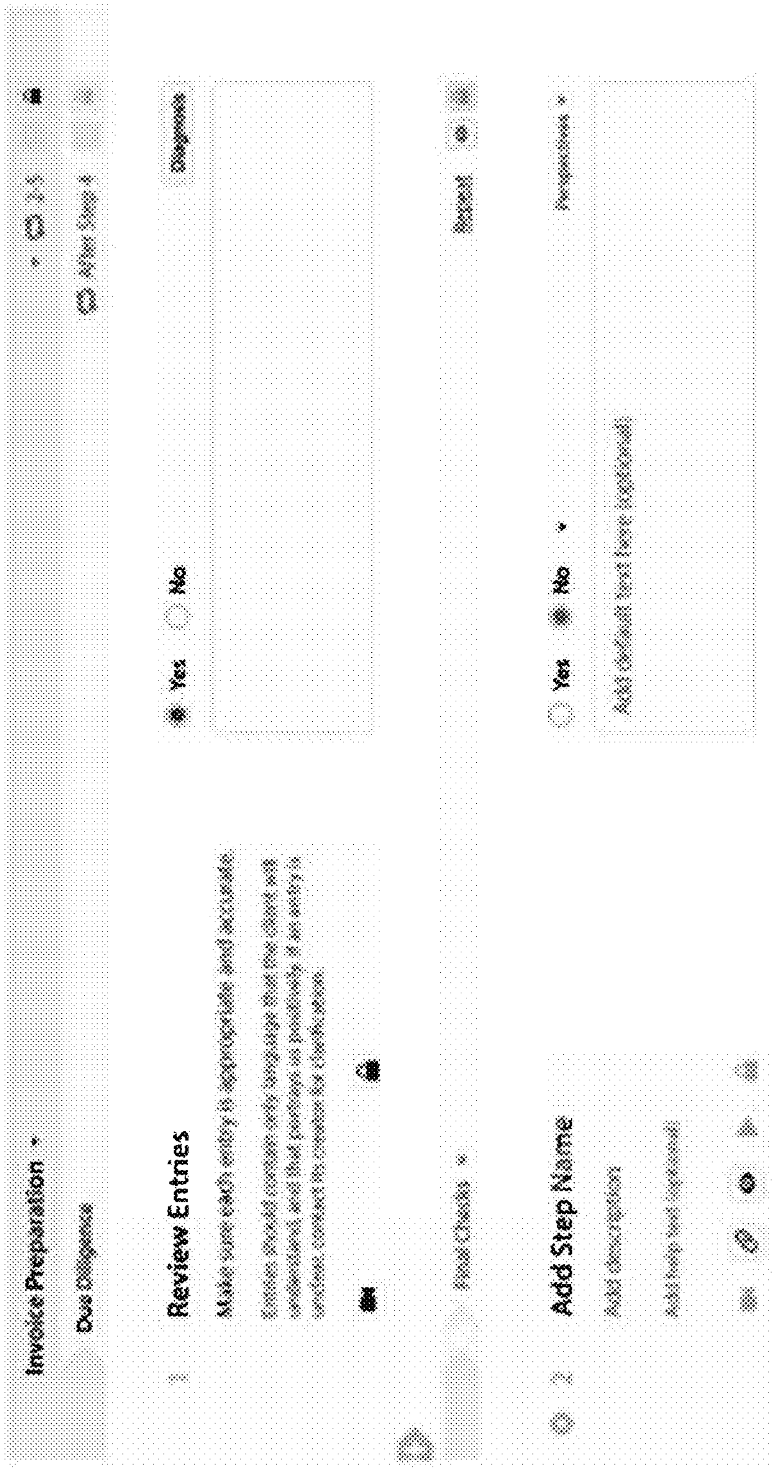
FIG. 214 shows an example of a user interface for interacting with a Guide in accordance with some embodiments of the disclosed subject matter.
Figure 215:
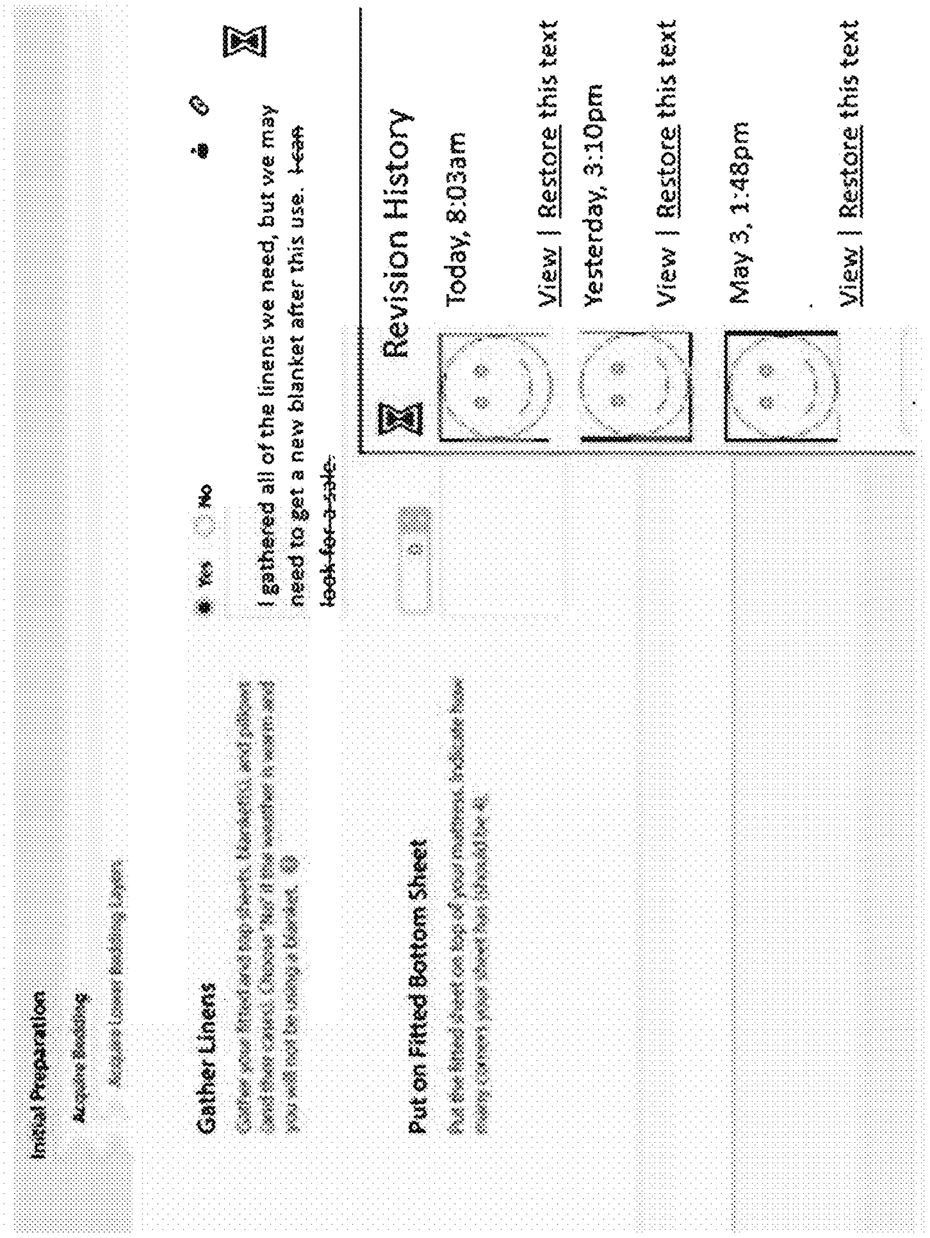
FIG. 215 shows an example of a user interface for presenting changes made to a Guide in accordance with some embodiments of the disclosed subject matter.

In accordance with some embodiments, a Guide can be edited by a user from any user interface that displays and/or uses the Guide. For example, in some embodiments, a user interface can be presented that allows a user to add steps, edit and/or modify existing steps, and/or edit a Guide in any other suitable manner, as shown in FIG. 214. Additionally, in some embodiments, an existing Guide may be edited by any suitable number (e.g., one, two, four, and/or any other suitable number) of users. In instances where multiple users edit a Guide, changes can be highlighted in any suitable manner, for example, as shown in FIG. 215. For example, in some embodiments, changes can be highlighted in a manner that indicates an identifier of a user that made the change, a time the change was made, a previous version of that portion of the Guide, and/or in any other suitable manner. Additionally or alternatively, in some embodiments, previous versions of the Guide can be made accessible. In some embodiments, users may be required to have particular permissions to be allowed to edit a Guide. Note that, in some embodiments, push notifications can be provided to any suitable users when a Guide is updated. For example, in some embodiments, users who have recently used a Guide, users who currently have the Guide open, and/or any other suitable users can receive push notifications when the Guide is edited.

In accordance with some embodiments, automatic list population can be used in creation of various Guides. For example, in instances where a Guide author adds a response type that includes multiple response types, subsections for each response type can be automatically added to the Guide, thereby allowing the Guide author to enter different steps for each response type. Additionally or alternatively, in some embodiments, when items or subsections that appear in one section are added and/or removed, corresponding items and/or subsections in other sections of the Guide can be automatically flagged for addition or removal.

Figure 216:
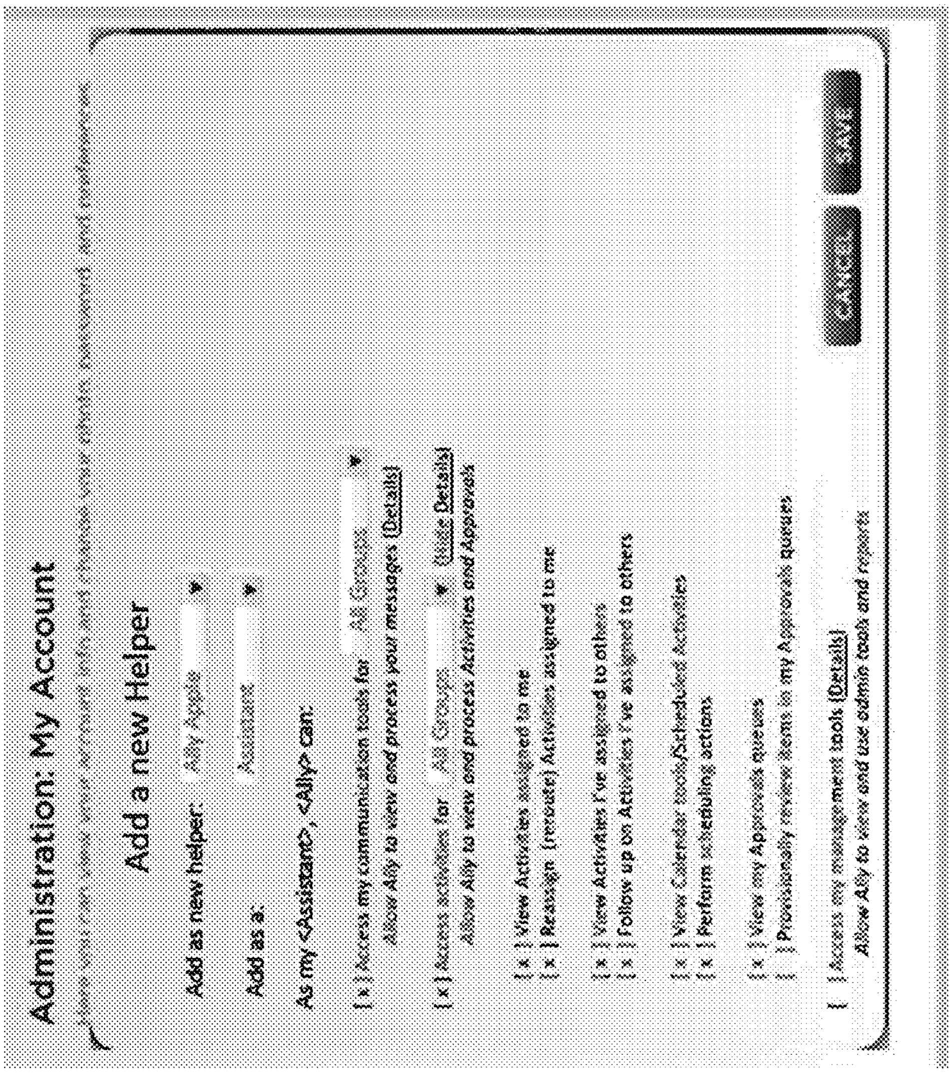
FIG. 216 shows an example of a user interface for designating a user as an assistant in accordance with some embodiments of the disclosed subject matter.

In accordance with some embodiments, a first user can designate a second user as a helper or an assistant. In some such embodiments, the first user can indicate permissions for the second user (e.g., activities and/or pages the second user is allowed to access, and/or any other suitable types of permissions, as shown in FIG. 216. Based on the permissions indicated, the second user can then be permitted to access particular pages and/or perform particular functions. Additionally or alternatively, in some embodiments, the first user can designate the second user as a stakeholder in an activity. In some such embodiments, the stakeholder may be asked to review and/or approve the activity, and/or perform any other suitable actions.

Figure 217:
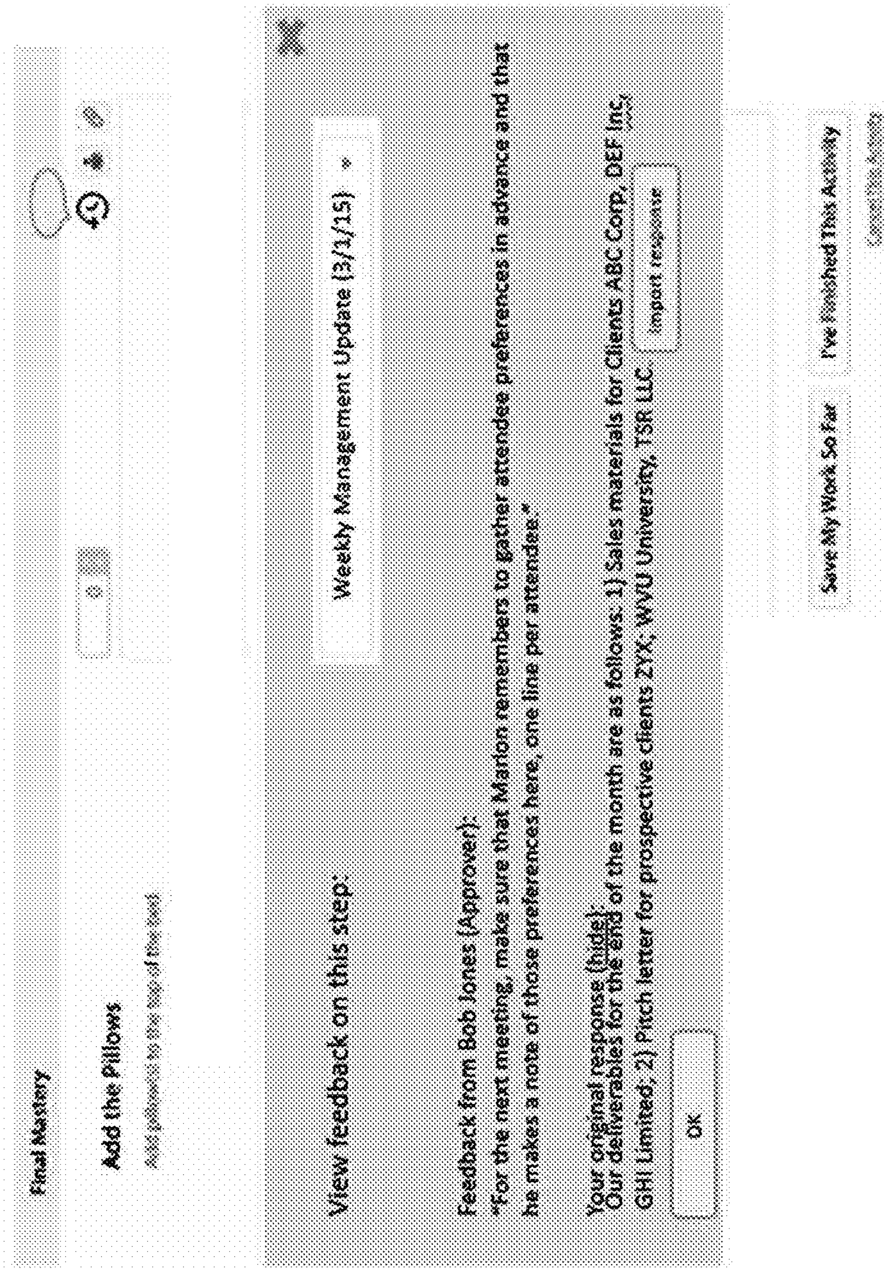
FIG. 217 shows an example of a user interface for receiving and presenting feedback from multiple users in connection with a particular step and/or activity in accordance with some embodiments of the disclosed subject matter.

In accordance with some embodiments, feedback can be stored and/or viewed from previous completions of a particular activity. For example, in some embodiments, a first user can view feedback received by a second user when performing and/or completing a particular activity. In some such embodiments, the second user can review received feedback and can indicate that the feedback is to be stored as a permanent note in association with the particular activity and/or a particular step of the activity and is to be made available for viewing by other users completing the activity. A user interface for viewing previously received feedback is shown in FIG. 217 in accordance with some embodiments.

In accordance with some embodiments, various tools for managing workflow can be implemented. For example, in some embodiments, various user interfaces (not shown) can be automatically generated and presented which can provide reminders to a user about previously scheduled activities, activities with upcoming due dates, activities that are past due, and/or any other suitable indications. In some such embodiments, the activities can be assigned to the user and/or activities the user has assigned to other users. As another example, in some embodiments, user interfaces (not shown) can be generated and presented which indicate incomplete activities that are past due. In some such embodiments, the indications can be filtered in any suitable manner, for example, by team and/or group, by number of days past a due date, and/or using any other suitable filtering criteria. As yet another example, in some embodiments, a user interface can be presented which can allow a first user to nudge and/or remind a second user of an activity the second user is to complete, thereby allowing the first user to remind the second user of the activity. As still another example, in some embodiments, instances in which a user has more than a predetermined number of activities (e.g., more than a total number of activities, more than a number of activities due within a particular time period, and/or any other suitable metric) can be automatically identified, and a warning and/or alert can be triggered and presented. In some such embodiments, a user interface can subsequently be presented that allows a user to reassign one or more activities to a second user.

Figure 220:
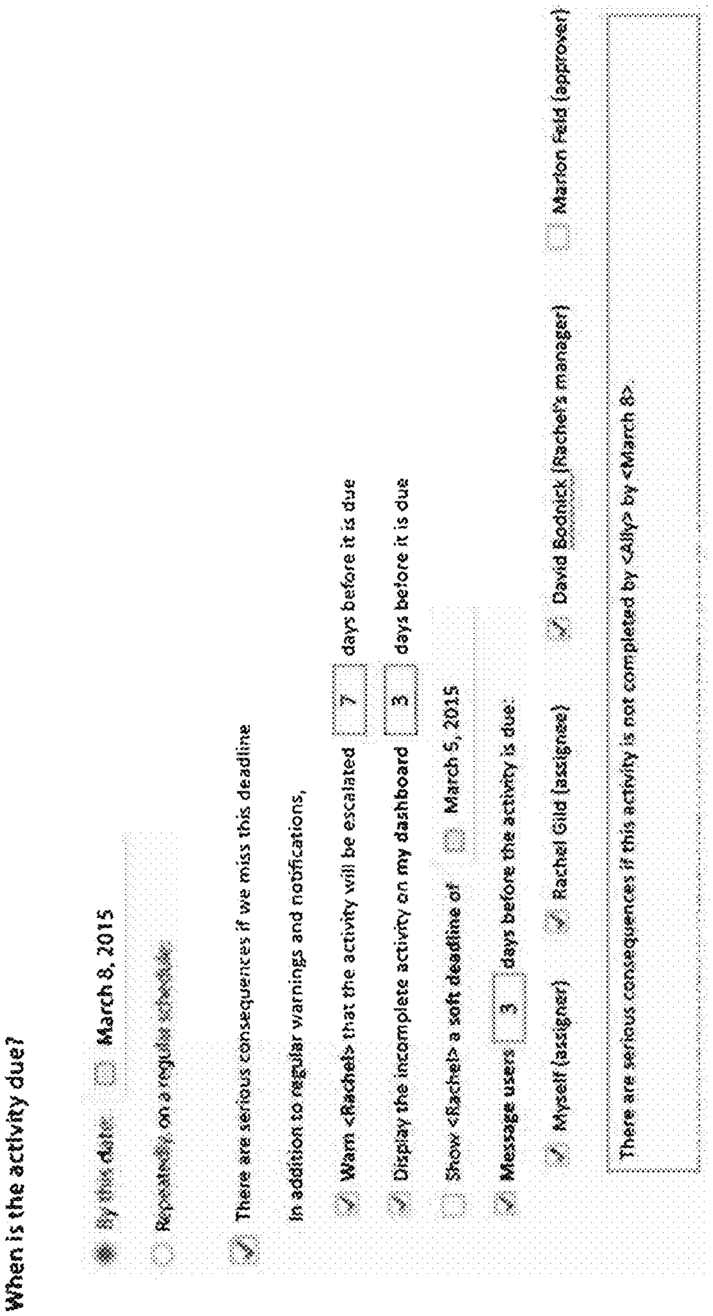
FIGS. 220 and 221 show examples of user interfaces for configuring escalated activities in accordance with some embodiments of the disclosed subject matter.
Figure 221:
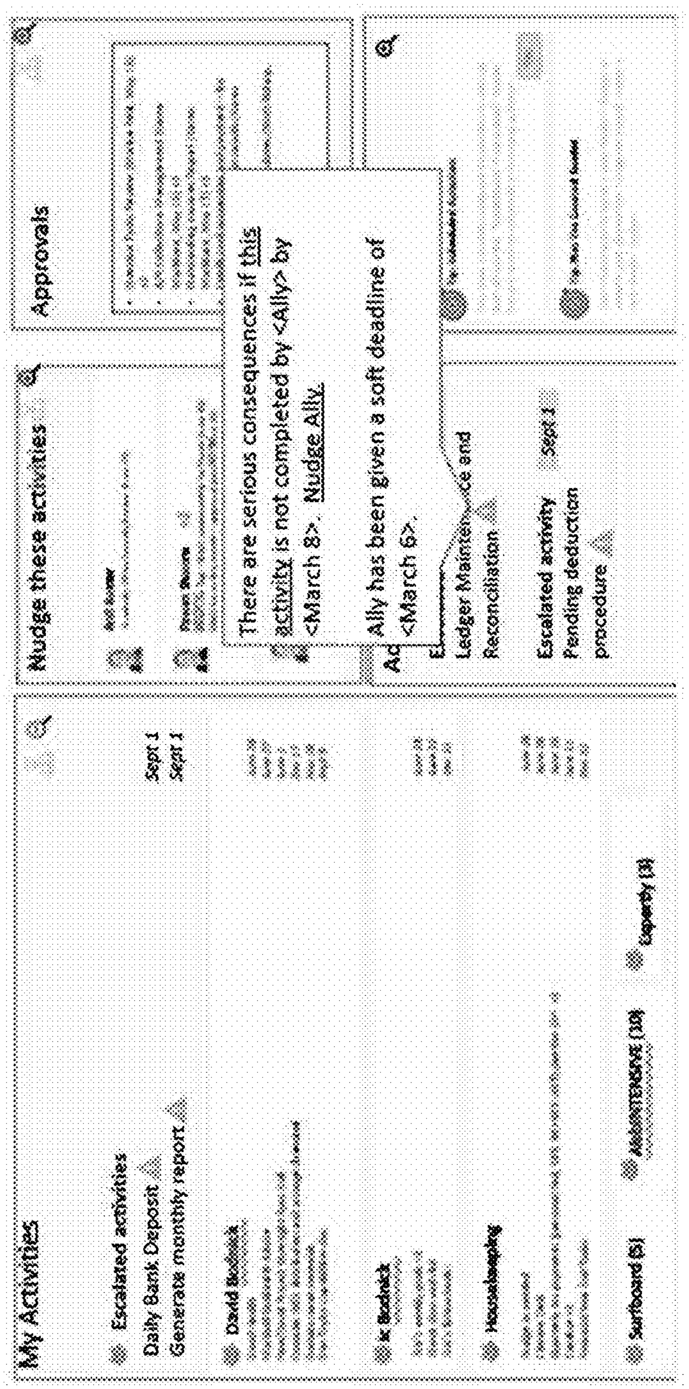

In accordance with some embodiments, the tools for managing workflow can additionally include a feature for presenting escalated warnings and soft deadlines in connection with a particular activity to ensure the activity is completed. For example, as shown in FIGS. 220 and 221, a user interface to configure parameters associated with an escalated activity can allow a user to specify a soft deadline prior to a hard deadline, show warnings and/or present messages a predetermined number of days before the soft deadline and/or the hard deadline, and/or present any other suitable warnings or indicators. Additionally, as shown in FIG. 221, in some embodiments, an escalated activity can be presented in a visual manner that is different than other activities (e.g., highlighted, presented with particular visual indicators, presented with larger font sizes, and/or any other suitable visual manner), for example, to indicate their importance. In some embodiments, activities can be automatically escalated based on criteria set by a user. Additionally, in some embodiments, multiple activities can be escalated simultaneously. For example, in instances where multiple activities are assigned to a particular user and are activities in a series (e.g., a series of steps in a checklist), the multiple activities can all be escalated in conjunction with each other.

In accordance with some embodiments, various tools can be implemented to allow activity approvers to more easily manage workflow. For example, in some embodiments, when an approver completes review of and/or approval of a first activity, similar activities and/or other activities from that series or Guide that are in the approver's queue can be presented (e.g., in a list), thereby allowing the approver to complete related activities at one time. As another example, in some embodiments, an approver can remove themselves as an approver, and can suggest another user as a replacement approver of a particular activity. As yet another example, in some embodiments, a user can be designated as an "Activity Reviewer." In some embodiments, the "Activity Reviewer" can review a completed activity without having the authority to approve or reject the completed activity. As yet another example, in some embodiments, an approver can be designated as a conditional approver. As a more particular example, in some embodiments, an activity can be assigned to a particular approver in response to a determination that particular criteria (e.g., criteria set by an assignee of the activity, and/or any other suitable criteria) have been met. As a specific example, in some embodiments, the criteria can include any particular alerts (e.g., an alert that a value entered as a response to a step exceeds a predetermined threshold, an alert that a value entered as a response to a step is within a particular numeric range, and/or any other suitable alert) being triggered during completion of a step of the activity, and/or any other suitable alert. Note that alerts associated with steps of activities are described in more detail below.

In accordance with some embodiments, game-like elements can be implemented. In some embodiments, these "gamification" options can be used to increase users' engagement with the system. For example, in some embodiments, completion of activities can be associated with points and/or any other suitable scoring system, and users can earn a predetermined number of points for completing an activity. Additionally or alternatively, users can earn points based on completing actions in any other suitable categories (e.g., reviewing another user's work, reading messages, commenting on messages, and/or any other suitable categories). In some embodiments, earning a predetermined threshold number of points can cause a user to receive an achievement badge and/or reward. Additionally or alternatively, in some embodiments, users can be ranked based on points earned. In some such embodiments, a ranking of users can be presented in any suitable manner. Note that, in some embodiments, points can be cumulative over any suitable time period (e.g., a week, a month, a year, and/or any other suitable time period). Additionally, in some embodiments, an indication of a user's current points total and/or currently awarded badges can be presented in any suitable manner, such as in a user's Dashboard and/or home page, and/or in any other suitable manner.

In accordance with some embodiments, one or more goals for users, groups, and/or an organization can be specified and/or indicated (e.g., in a user's Dashboard, and/or in any other suitable manner), and Guides and activities related to the goals can be indicated. Additionally, in some embodiments, any suitable metrics and/or reports related to the goals can be presented.

In accordance with some embodiments, any suitable metrics associated with a particular user and/or associated with a group can be presented. For example, in some embodiments, metrics relating to a group can be presented to a manager of the group in a leadership dashboard. In some embodiments, a leadership dashboard for a particular user can have any suitable tabs, for example a first tab corresponding to a team the user belongs to, a second tab corresponding to a group the user leads, and/or any other suitable tabs. In some embodiments, within a particular tab, one or more selectable interfaces can be presented. For example, within a tab that represents a team led by the user, multiple tiles can be presented, each representing a user on the team. As another example, within a tab that represents groups led by the user, multiple tiles can be presented, each representing a group.

In some embodiments, a tile can include any suitable information, such as a name of a user or a group represented by the tile, a profile picture corresponding to a user or a group represented by the tile, a graph that represents recent activity of a user or a group represented by the tile (e.g., a pie chart that shows a percentage of activities completed on time versus late, a pie chart that shows a percentage of activities that have been approved on a first submission versus not approved, a line chart that shows a number of open or incomplete activities over any period of time, and/or any other suitable graphs), and/or any other suitable information. In some embodiments, selection of a tile can cause additional selectable parameters that can be used to further analyze activity of the user or group associated with the selected tile to be presented. For example, in some embodiments, selection of a tile corresponding to a user or group can cause one or more parameters to be presented that can be used to filter activity associated with the user or group. As a more particular example, selection of a tile corresponding to a user can cause parameters corresponding to filtering the user's activity based on Guides the user worked on, based on assigners of the user's activities, and/or based on any other suitable filtering parameters to be presented. As another more particular example, selection of a tile corresponding to a group of users can cause parameters corresponding to filtering the group's activities to be presented, such as filtering based on members of the group, based on Guides users of the group have worked on, based on assigners of activities to members of the group, and/or based on any other suitable filtering parameters. In some embodiments, in response to a particular parameter being selected, metrics associated with the selected parameter can be presented. For example, in an instance in which a tile corresponds to a user, and in which a selected parameter corresponds to a particular Guide the user has worked on, metrics corresponding to the user's performance on the selected particular Guide can be presented (e.g., time the user has spent on different activities of the Guide, a number of times one or more steps in the Guide have been approved, and/or any other suitable metrics).

In some embodiments, the metrics can be presented in any suitable manner, such as in one or more graphs, in one or more tables, and/or in any other suitable format. For example, in an instance in which a table is presented, each row can represent a name of a Guide, a name of an assigner of a Guide or activity, and/or any other suitable information corresponding to a selected filtering parameter. In some embodiments, information presented can be restricted to a particular time range (e.g., within the past week, within the past month, and/or any other suitable time range). Additionally or alternatively, in some embodiments, a selectable toggle can be presented that allows a viewer of the metrics to filter the metrics in any other suitable manner. For example, in some embodiments, the selectable toggle can cause metrics associated with only activities that were completed late to be presented or to present metrics associated with both on-time and late activities, metrics associated with only approved activities to be presented or to present metrics associated with both approved and rejected activities, and/or any other suitable additional filtering of metrics. Note that, in some embodiments, rather than being selectable, the toggle can be activated by mousing over a particular icon. In some embodiments, the metrics can be presented in any suitable position, for example, below a selected tile, by expanding the tile and presenting the metrics within an expanded portion associated with the tile, and/or in any other suitable position.

In accordance with some embodiments, additional tools for creation of Guides can be implemented. For example, in some embodiments, recently used and/or created Guides can be listed, for example, in a Dashboard. In some embodiments, previously created Guides can be used to create new Guides, for example, by importing steps, sections, activities, repeating steps and/or sections, and/or any other suitable information from previously created Guides. In some embodiments, recently used and/or created Guides can be listed in a user interface for selection for use in creating a new Guide. As another example, in some embodiments, a user interface can be presented which can receive an indication of a document from which an activity and/or a Guide is to be based on. As a more particular example, in some embodiments, an icon representative of the document can be dragged to and/or into the user interface. As yet another example, in some embodiments, keywords can be searched across a system of activities and Guides to allow for easier creation of Guides. As a more particular example, in some embodiments, keywords can be search across any suitable fields (e.g., a title of a Guide, a title of an activity, words used within descriptions of steps, words used in notes associated with a particular activity, and/or in any other suitable contexts), and resulting matches can be used in creation of and/or in modification a Guide or activity. In some embodiments, a search for keywords can be weighted in any suitable manner. As still another example, in some embodiments, a schedule for an activity (e.g., dates for checkpoints, due dates, and/or any other suitable scheduling information) can be modified after a schedule has been initially set, for example, through a user interface associated with the activity.

Additionally, in accordance with some embodiments, a Guide can be assigned and/or edited using a Universal Resource Locator (URL). For example, in some embodiments, a Guide assignment interface with partially prepopulated fields can be associated with a URL, and selection of the URL can take a user to the Guide assignment, where the user can complete the Guide assignment user interface and/or modify values in the prepopulated fields. Additionally or alternatively, in some embodiments, a Guide assignment can be associated with a short URL where fields of the user interface are not prepopulated.

Additionally, in accordance with some embodiments, a Guide author can be presented with analytics relating to a particular Guide. For example, in some embodiments, the analytics can indicate a frequency with which a particular response is selected, a frequency with which a particular response is selected conditionally with another response is also selected (e.g., a Bayesian analysis), and/or any other suitable metrics.

Figure 228:
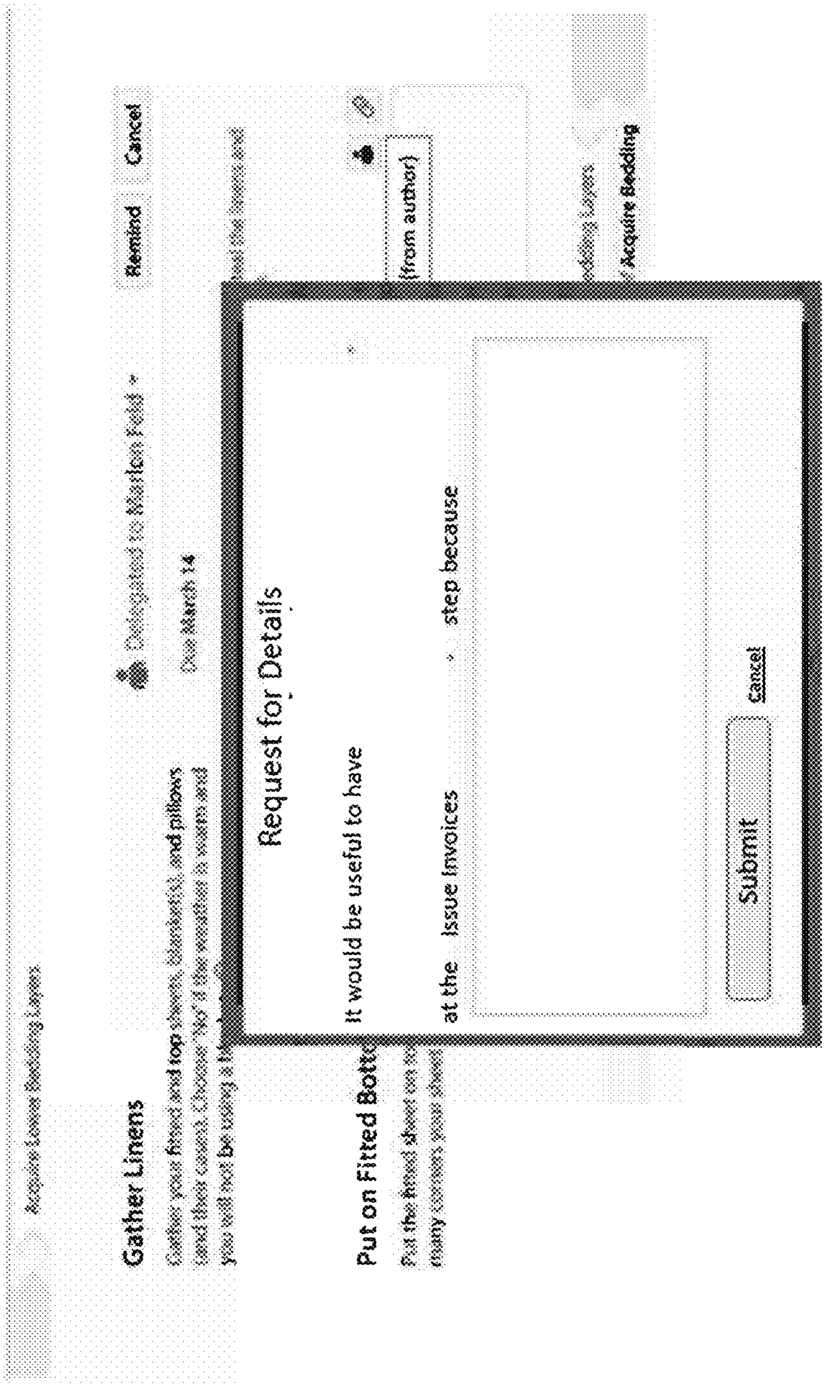
FIG. 228 shows an example of a user interface for requesting feedback in accordance with some embodiments of the disclosed subject matter.

In accordance with some embodiments, various tools can be implemented for collaboration during authorship of a Guide. For example, in some embodiments, real-time invitations can be sent to one or more users inviting the one or more users to participate in authorship of the Guide. As another example, in some embodiments, a Guide author can include a particular icon in a Guide that indicates that the Guide author is seeking a request for ideas from other users. Additionally or alternatively, in some embodiments, feedback can be solicited from other users such as an assignee of an activity who has used the Guide. For example, in some embodiments, the system can automatically solicit feedback from the assignee through a feedback form or other user interface. As another example, in some embodiments, feedback can be transmitted to an author of a Guide using a "Request for Details" user interface, as shown in FIG. 228. As a more particular example, in some embodiments, the feedback can be used to tell an author of a Guide of additional details or information that would be helpful for completing an activity. As yet another example, in some embodiments, a step in a Guide can be edited by a user (e.g., by the user entering comments associated with the step), and any edits can be transmitted to an author of the Guide.

In accordance with some embodiments, various additional tools can be implemented for approval of a Guide. For example, in some embodiments, a deadline can be set for approval of a Guide. In some embodiments, one or more reminders can be sent and/or presented to an indicated reviewer at any suitable time periods prior to the deadline. As another example, in some embodiments, one or more user interfaces (not shown) can be presented which can allow a user to route an activity and/or step to a particular user for review. As a more particular example, in some embodiments, a response can be highlighted and sent to a particular user for review. In some such embodiments, criteria can be set indicating that particular responses are to be reviewed.

In accordance with some embodiments, the functions and/or actions described herein for generating and/or interacting with Guides can be triggered via any suitable external web page, application, system, and/or device. In some embodiments, the functions and/or actions can be triggered by registered users of a service for providing Guides and/or by users who are not registered with the service (e.g., anonymous users, visitors, guests, and/or any other suitable unregistered user). In some embodiments, users who are not registered with a service that provides Guides can be registered with any other suitable web-based service (e.g., a social networking service, and/or any other suitable service), and users can use credentials associated with the web-based service for triggering the mechanisms described herein.

In some embodiments, the functions and techniques described herein can be triggered via an external system in any suitable manner. For example, in some embodiments, any suitable actions relating to Guides (e.g., creation of a Guide, creation of an activity within a Guide, configuration of steps of an activity of a Guide, assigning particular activities to particular users, configuring alerts related to activities that are to be presented when particular conditions are met, and/or any other suitable actions) can be performed using an Application Programming Interface (API) that provides access to any suitable commands or interactions associated with the system described herein.

As another example, in some embodiments, any suitable actions can be performed using an embedded web page (e.g., as a web page rendered within an external web page, a web page rendered with an application executing on a device, and/or any other suitable type of embedded web page). As a more particular example, in some embodiments, an embedded web page can be rendered using any suitable browser plugin or web extension.

As yet another example, in some embodiments, any suitable actions can be triggered using a Representational State Transfer (REST) interface that can be integrated into HTML forms, including HTML forms that are hosted externally (e.g., on a server not associated with a service that provides Guides or functionality for Guides). In some embodiments, an HTML form can be configured to submit information included in the form to the system, for example, using an "action" field that indicates a corresponding Guide. In some embodiments, fields of the HTML form, including any hidden parameters, can indicate any elements related to details of an assignment. For example, in some embodiments, one or more form fields can be used to hold an authorization to conduct a transaction. As another example, in some embodiments, one or more form fields can indicate information indicating a user who has authorized a particular transaction. As yet another example, in some embodiments, a "redirect" parameter can be used to indicate a user or a location where the submission should be directed in response to submission of the form. As a more particular example, in some embodiments, a first redirection URL can be specified indicating a redirection URL in response to successful submission of the form, and a second redirection URL can be specified indicating a redirection URL in response to unsuccessful submission of the form.

Note that, in some embodiments, a Javascript file can be provided to a web page author (e.g., an external web page through which a user can access functionality associated with a Guide). In some embodiments, the Javascript file can be included via a reference in the web page, or embedded directly in the web page, and the Javascript file can include one or more commands that indicate forms and/or buttons that correspond to a particular function. In some embodiments, in response to submission of a form (and/or in response to selection of a submission button within the web page), the Javascript file can cause the request to be intercepted and can cause code associated with the Javascript file to be executed. In some such embodiments, the Javascript code can cause an asynchronous Javascript call to the system described herein for creating and interacting with Guides, and can thereby submit the form to the system to process any requests associated with the submitted form, to retrieve any suitable results and/or indicators, present any suitable messages, and/or perform any other suitable actions.

Note that, in some embodiments, an external submission via an API, an HTML form, and/or an external webpage can use any suitable parameters to transmit information from the external submission to the system. For example, in some embodiments, an external submission can be associated with any suitable fields corresponding to parameters transmitted to the system, such as fields that correspond to a title of an assignment, a name of an assignee or approver, a due date, and/or any other suitable field or parameter. In some embodiments, parameters can be specified and configured by a user or administrator associated with the external submission using any suitable configuration or group of configuration settings.

In some embodiments, users who make external submissions can be restricted in any suitable manner. For example, in some embodiments, only users who have an account with a particular service may make submissions. As another example, in some embodiments, criteria associated with a device through which the external submission is made can be used, such as criteria indicating allowed IP ranges, criteria indicating particular browser information, criteria associated with geographical information (e.g., criteria that indicate blocked geographic regions, criteria that indicate allowed geographic regions, and/or any other suitable geographical information), criteria indicating allowed domain names, and/or any other suitable criteria.

In accordance with some embodiments, an activity or a step can be triggered in response to detection of a particular event occurring outside or inside the system. For example, in some embodiments, the particular event can include receipt by the system or by a particular recipient of an email, detection of a new entry on a particular RSS feed, detection of a news article that includes a particular keyword being published, detection of a social networking post that includes a particular keyword, receipt of an email sent via a particular form, receipt of an email that includes a particular subject line, and/or any other suitable event. As another example, in some embodiments, the activity can include activation of a particular Guide or assignment. As a more particular example, in some embodiments, detection of publication of a news article that includes a keyword related to a competitor or a competitor's product can cause a Guide, activity, or step related to "competitor research" to be assigned. Note that, in some embodiments, a triggered activity or a triggered step can be assigned to a particular user and/or group of users. Additionally, note that, in some embodiments, in response to detecting that a particular event has occurred, a new activity or a new step associated with a configured event can be generated. In some such embodiments, generation of a new activity or a new step can include: assigning the new activity or the new step to a particular user, generating any suitable information to be included in connection with the new activity or the new step, adding the new activity or the new step to a checklist, etc.

Figure 233:
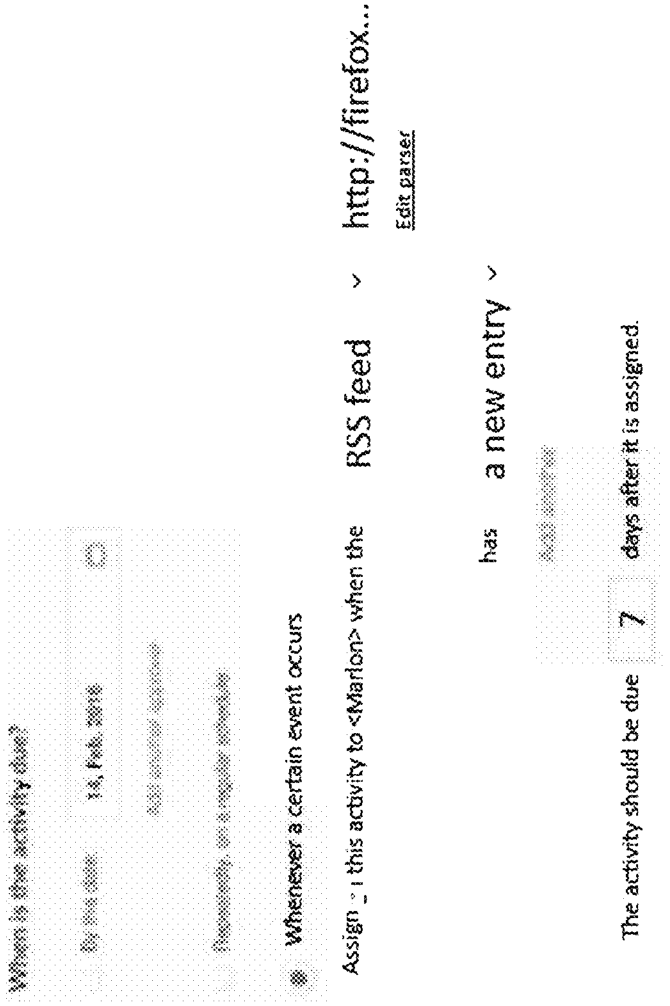

In some embodiments, an activity or a step that is triggered based on detection of an event can be configured using a user interface, as shown in FIG. 233. For example, as illustrated in FIG. 233, a user interface to configure an event-triggered activity or step can indicate an event that is to trigger the activity. As a more particular example, in some embodiments, the event can be associated with one or more criteria that are to be met to determine that the event has occurred, such as a new entry published to a particular RSS feed, a new article published to a particular source, receipt of a message (e.g., an email, a chat message, and/or any other suitable message) by a particular recipient and/or that includes particular keywords, and/or any other suitable criteria that can be used to determine that an event has occurred. For example, as illustrated in FIG. 233, the user interface can include a drop-down menu that includes types of events (e.g., events related to RSS feeds, events related to emails, etc.) and a drop-down menu that includes particular criteria that are to be met to determine that a particular event has occurred (e.g., a new entry, receipt of an email, etc.). As another example, as illustrated in FIG. 233, the user interface can include a due date for the activity or step, an assignee of the activity or step, and/or any other suitable information.

Note that, in an instance in which an event is configured to trigger a new activity, step, or Guide, in some embodiments, the newly generated activity, step, or Guide can be saved in any suitable manner. For example, in some embodiments, in an instance in which a new step is generated as part of an existing activity, the new step can be added such that the new step is included in all steps associated with the activity for all future presentations of steps of the activity. Additionally or alternatively, in some embodiments, the new step can be inhibited from inclusion in steps associated with future instances of the activity. As a more particular example, in an instance in which an activity includes a plurality of steps for generating a document, and in which an event is configured that causes a new step to be added to the plurality of steps corresponding to adding a section to the document in response to detecting that a new article has recently been published, the new step can inhibited from inclusion in the plurality of steps for future instances of the activity. That is, in some embodiments, the new step can be added in response to detection of the event, and can be inhibited from inclusion in future instances of a checklist associated with the activity in cases where the event has not occurred.

In some embodiments, events that trigger activities or steps can be detected in any suitable manner. For example, in some embodiments, the system can use one or more software tools that can be configured to monitor any suitable sources (e.g., RSS feeds, email inboxes, and/or any other suitable sources) for potential events, and can trigger corresponding activities, as described above. In some embodiments, the software tools can include any suitable type of tools, such as server-side monitoring software, client-side monitoring software, any suitable applications, browser plugins, Javascript libraries, etc. In some embodiments, the tools can continuously monitor for events. Conversely, in some embodiments, the tools can periodically pull information from a source or have a source push information to the system. In some embodiments, multiple software tools can be used to detect events. In some such embodiments, a particular monitoring tool can monitor a particular type of event, such as monitoring a particular RSS feed for new posts or articles, and can be used to trigger a specific Guide, activity, or assignment. Additionally or alternatively, in some embodiments, a monitoring tool can be used to monitor multiple types of events, and can be used to trigger many different Guides, activities, or assignments.

In some embodiments, a monitoring tool can detect an event by detecting a match between a keyword in a source (e.g., a keyword in a published article, a keyword in a received email, etc.) and a keyword associated with a particular Guide or activity. In some embodiments, the monitoring tool can detect matches of any suitable number of keywords or phrases. In some embodiments, keyword matches can be based on more complex syntax, such as Boolean logic (e.g., "[A] OR [B]," "[A] NOT [B]," etc.), stemming, wildcards, and/or any other suitable more complex expression syntax. In some embodiments, the monitoring tool can identify relationships between words or phrases using any suitable database (e.g., Wordnet, and/or any other suitable database).

Note that, in some embodiments, keyword selection used for matching by a monitoring tool can be manually indicated or automatically selected. In instances in which a keyword is automatically selected, the system can automatically identify keywords using any suitable technique or combination of techniques. For example, in some embodiments, the system can identify unique words associated with a particular Guide or assignment. As another example, in some embodiments, the system can use any suitable machine learning techniques to identify particular suggested Guides that are selected by a user in response to a suggestion. In some such embodiments, the system can refine keywords based on user activity. For example, in some embodiments, the system can determine, over any suitable time period, which suggestions of Guides or assignments are accepted by users. As a more particular example, in an instance in which the system determines that a suggestion of a Guide for performing "Task A" is accepted by users with a particular frequency (e.g., 70% of the time, and/or any other suitable frequency), the system can determine that "Task A" is a suitable keyword to be associated with the Guide.

Note that, suggestions of Guides or assignments can be presented in any suitable manner (e.g., as a popup notification in a browser, as a popup notification on a user device, as a message in a messaging application, in an email as a selectable link, and/or any other suitable manner). In some embodiments, the system can record accepted and/or rejected suggestions for individual users in any suitable manner and can modify a frequency and/or a manner in which notifications are presented to a user based on how frequently a user accepts particular types of notifications.

In some embodiments, an activity, assignment, step, or Guide that is triggered (e.g., launched or initiated in any suitable manner) based on a detected event can be customized in any suitable manner. For example, in some embodiments, a field associated with a triggered activity or step can be generated or customized to indicate information associated with the detected event. As a more particular example, in an instance where the event corresponds to a new item in a particular feed, an assignment that is generated based on the new item can indicate information associated with the new item, such as a title of the new item, a date and/or time the new item was published to the feed, a geographical location associated with the new item, and/or any other suitable information. As a specific example, in an instance where the event is a new item in a US-CERT security vulnerability feed, a generated assignment can include one or more fields that indicate a severity of a threat indicated in the new item, a geographic location associated with the threat, and/or any other suitable information. Continuing with this example, an assignment or a task can be generated that includes any suitable text or description of the assignment or task associated with the detected event, such as "Evaluate potential SEVERE browser vulnerability [XYZ]," and/or any other suitable information associated with a new item in the feed. Note that, in some embodiments, a generated assignment can include any suitable content (e.g., text, images, hyperlinks, etc.) that were included in or associated with the detected event (e.g., content included in a new post of a feed, content included in a newly published article, etc.). In some such embodiments, fields associated with the generated assignment can be automatically populated based on content associated with the detected event. For example, in some embodiments, a title of an assignment can be generated based on a title of a corresponding post in an RSS feed. Note that, in some embodiments, any suitable content or description of a generated assignment, step, and/or Guide that is generated based on detection of the event can be modified in any suitable manner. For example, in some embodiments, an initial description can be generated automatically based on information associated with the detected event (e.g., indicating a title associated with a detected newly published article, as described above), and can subsequently be modified by a user to generate a modified description. In some embodiments, the modified description can then be saved in any suitable manner. For example, in some embodiments, a description of a triggered assignment, activity, step, or Guide can modified, and the modified description can then be presented during any subsequent presentations of the assignment, activity, step, or Guide. Additionally or alternatively, in an instance in which a new step is generated based on a detected event, any suitable user (e.g., a user assigned the newly generated step) can determine whether the new step is to be included in future instances of an activity or a Guide to which the newly generated step belongs.

Note that, in some embodiments, the monitoring tools can detect events that occur in any suitable system (e.g., a third-party application unrelated to the system for providing Guides as described herein). Furthermore, in some embodiments, detected events can be used to trigger activities in a third-party application. For example, in some embodiments, a software tool for monitoring and detecting events (as described above) can detect any suitable event associated with any suitable application and can trigger an event associated with a different application. As a more particular example, in some embodiments, a monitoring tool can be used to detect an event such as new item in an RSS feed and can cause an action to occur, such as transmitting a message using a messaging application or e-mail client. In some such embodiments, the event configuration settings described above can be used with any suitable third-party applications. In some embodiments, any suitable APIs can be used to monitor events associated with, for example, a first third-party application and to trigger events or activities associated with a second third-party application.

In some embodiments, external systems and/or third-party service or application can be integrated with the system described herein in any suitable manner. For example, in some embodiments, a syntax of a third-party service can be read in using any suitable syntax, such as an OpenAPI syntax, a WSDL syntax, a gRPC syntax, and/or any other suitable syntax. Additionally, in some embodiments, an overrides file associated with the third-party syntax can be retrieved and can be used to adjust a standard syntax of the third-party service. For example, in some embodiments, the overrides file can be used to expose particular methods and/or parameters (e.g., methods or parameters identified as useful), to use different labels and/or descriptions that are particularly understandable, and/or to choose particular parameter values that can be determined without user intervention. In some embodiments, any other suitable information can be included in the overrides file, such as whitelisted methods (e.g., API functions that are offered for direct use within the service), blacklisted methods (e.g., API functions that are not offered for direct use within the service), whitelisted method parameters (e.g., parameters of a method that are offered for use), blacklisted method parameters (e.g., parameters of a method that are not offered for use), mandatory or optional method parameters (an indication of whether a particular parameter is mandatory or optional), datatype (an indication of a type of data that is required or shared), datatype display format, choices (e.g., options that can be offered for a parameter value), default values for particular parameters, method names and descriptions, validation criteria, method variants (e.g., indications of alternative method names), composite or custom methods (e.g., additional methods that may invoke multiple methods from multiple services), and/or any other suitable information.

In accordance with some embodiments, techniques for transforming documents can be provided and/or used. For example, in some embodiments, the techniques can automatically customize a document and/or extract information from a document that is formatted in a variety of file types. In some embodiments, the variety of file types can include any suitable types of text documents, spreadsheet documents, presentation documents, multi-media file formats, and/or any other suitable type of file.

In some embodiments, a transformation or data extraction can be performed in any suitable manner. For example, in some embodiments, a sequence of commands can be received in any suitable manner (e.g., through a web service or other integration mechanism). In some embodiments, the sequence of commands can indicate transformations or other actions to be performed and/or data that is to be extracted. In some embodiments, the system can return an output associated with the sequence of commands, such as a modified document, a newly created document, and/or extracted data. In some embodiments, the sequence of commands can be passed in any suitable manner and using any suitable syntax (e.g., JSON-RPC 2.0, Javascript-like syntax, and/or any other suitable syntax). In some embodiments, two or more commands in the sequence of commands can be indicated as to be performed in parallel. In some embodiments, files can be provided as inputs and included as outputs in any suitable manner. For example, in some embodiments, a file's content can be base-64 encoded and can be rendered as any other parameter value would be rendered within a JSON-RPC 2.0 file of commands. As another example, a URI to a file can be provided. As yet another example, in some embodiments, a base-64 encoded or binary-encoded file can be provided as a separate parameter, which can then be referenced within a JSON-RPC 2.0 file of commands.

An example of a sequence of commands that can be used is shown in FIG. 234. As illustrated, in some embodiments, any suitable commands related to adding or deleting content in a document (e.g., copying, pasting, creating a new document, inserting images, inserting text, selecting text, inserting or deleting a formula, inserting a value in a spreadsheet, etc.), formatting (e.g., creating bullets, numbering lines or paragraphs, changing or selecting a particular font or font color, etc.), navigation within a document (e.g., navigating to a next slide in a slideshow, navigating to a next section in a word document, etc.), manipulating images in a document (e.g., adjusting colors of an image, adjusting a transparency of an image, analyzing an image, formatting a size or aspect ratio of an image, etc.) can be used in any suitable combination.

In some embodiments, any suitable device can receive commands to transform a document. For example, in some embodiments, a server that is run in conjunction with an installation of LibreOffice or other software project can be used. In instances in which the software project in not customized in any manner, a different program can receive the commands and can perform any suitable manipulations to the commands. In some embodiments, a server that receives the commands can process multiple document transformation requests concurrently in any suitable manner (e.g., by enabling multiple requests to the same installation of the software project, by installing multiple installations of the software project on the server, by distributing multiple installations of the software project across different virtual machines on one or more hypervisors, by auto-scaling the instances of the software project, and/or by queuing requests when needed).

In some embodiments, any suitable security measures can be implemented to prevent a document transformation request from a first user from compromising document transformation requests from other users. For example, in some embodiments, the security measures can include limiting macros that can be run, limiting internal or external network connections that can be initiated by scripted commands, limiting concurrent document transformation requests that take place in an installation, limiting a document macro's ability to access portions of the instance or the device executing the instance, and/or causing the program to exit and then restart between some or all executions.

In some embodiments, aggregate functions can be used, where each aggregate function corresponds to a standardized sequence of commands. In some such embodiments, input variables supplied to a command in the command sequence can be changed by changing input parameters to the function. In some embodiments, particular variables can be indicated in any suitable manner as optional or mandatory. In some embodiments, a command sequence can support conditional logic based on the presence or absence of a particular variable. In some embodiments, each aggregate function can then be exposed and/or accessed as a standard API, and documentation can then be auto-generated that indicates the syntax required to call it (e.g., using Open API 2.0 and/or any other suitable standard). In some embodiments, a log can be maintained that indicates a number of times a particular command, sequence of commands, or aggregate function is used. In some such embodiments, the log can be used to present alerts to particular users that can indicate problems or errors associated with particular commands or functions.

Figure 235:
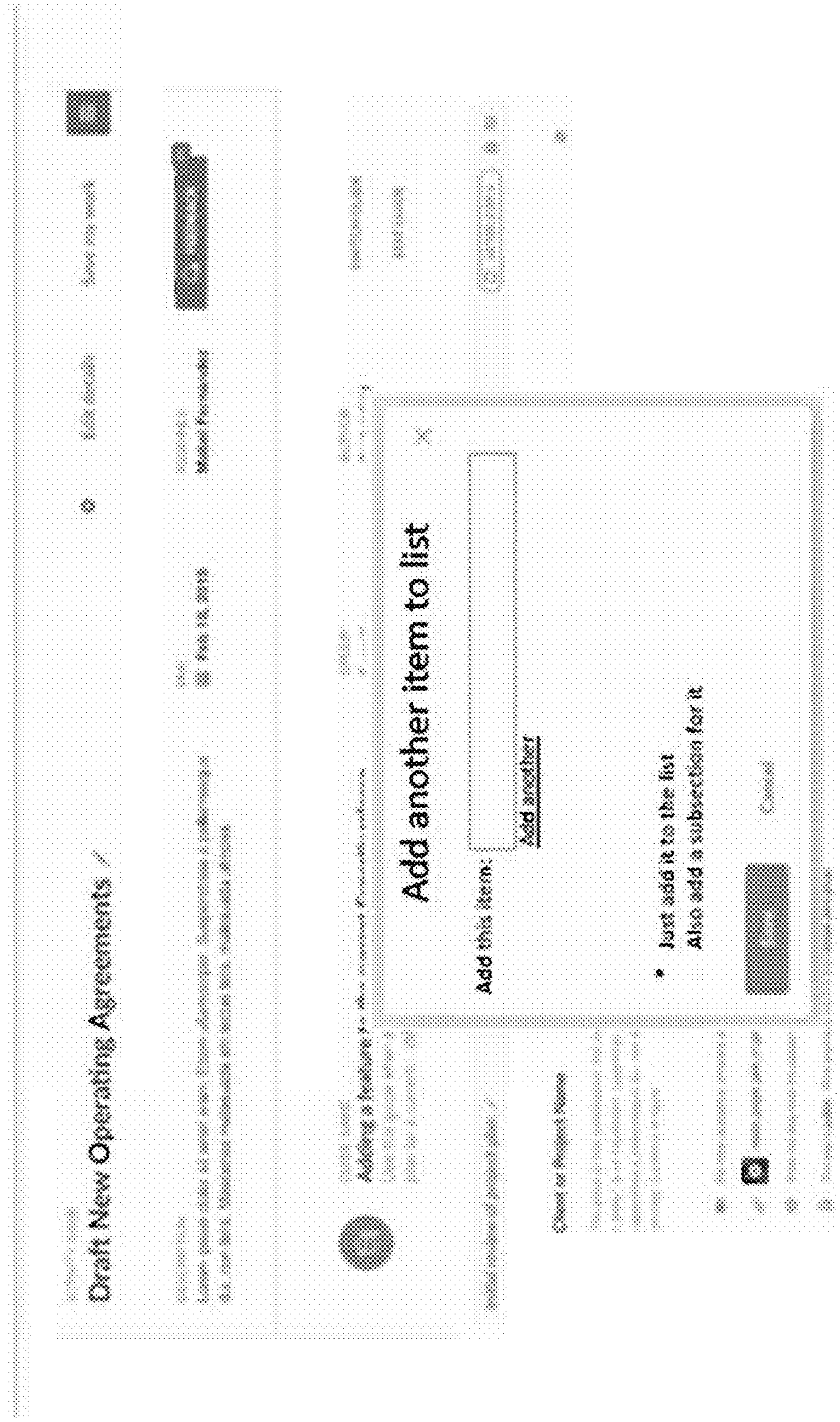
FIG. 235 shows an example of a user interface for configuring a list in accordance with some embodiments of the disclosed subject matter.

In accordance with some embodiments, lists can be automatically generated. For example, in some embodiments, a list can be automatically generated that includes a generated subsection for each item in the list. As a more particular example, in some embodiments, each subsection can be configured to only be presented when the corresponding list item is selected. As a specific example, each subsection can include guidance (e.g., a tutorial, associated information, and/or any other suitable information) corresponding to the selected list item. In some embodiments, subsections can be automatically removed in response to a list item being removed from the list. Note that, in some embodiments, subsections can be added in any suitable manner. For example, in some embodiments, an author of a list can indicate whether a subsection is to be added for each item added to the list, as shown in FIG. 235. As another example, in some embodiments, a subsection can be automatically added.

In some embodiments, a Guide can include a response type for a step, and, in some embodiments, the response type can include an "assignee list." In some embodiments, an "assignee list" can be used by an assignee of a Guide or assignment (that is, a user other than the author of the Guide or assignment) to enter a list of items. In some embodiments, one or more parameters associated with the "assignee list" (e.g., a number of items in the list) can be specified by an author of the Guide or assignment. In some embodiments, a Guide can be configured such that an "assignee list" is used with the same features available with any lists provided by an author of the Guide, such as having repeating sections, using content in the "assignee list" in other steps of the Guide, and/or any other suitable features.

In accordance with some embodiments, a response type for a Guide can include a table response, in which an assignee of the Guide can enter data in a spreadsheet-like grid. In some embodiments, the table can be prepopulated with column headers, row headers, and/or default values in particular cells. In some embodiments, an author of the Guide can configure formulas in particular table cells that, in some embodiments, can refer to other cell values. In some such embodiments, the Guide can use the formulas to automatically calculate cell values, which can then be populated within the Table. In some embodiments, an author of the Guide can use conditional formatting that can cause values presented in cells of the table to be formatted based on the value (e.g., a negative number can be presented in red, numbers within particular ranges can be presented with parentheses around the number, etc.).

Figure 236:
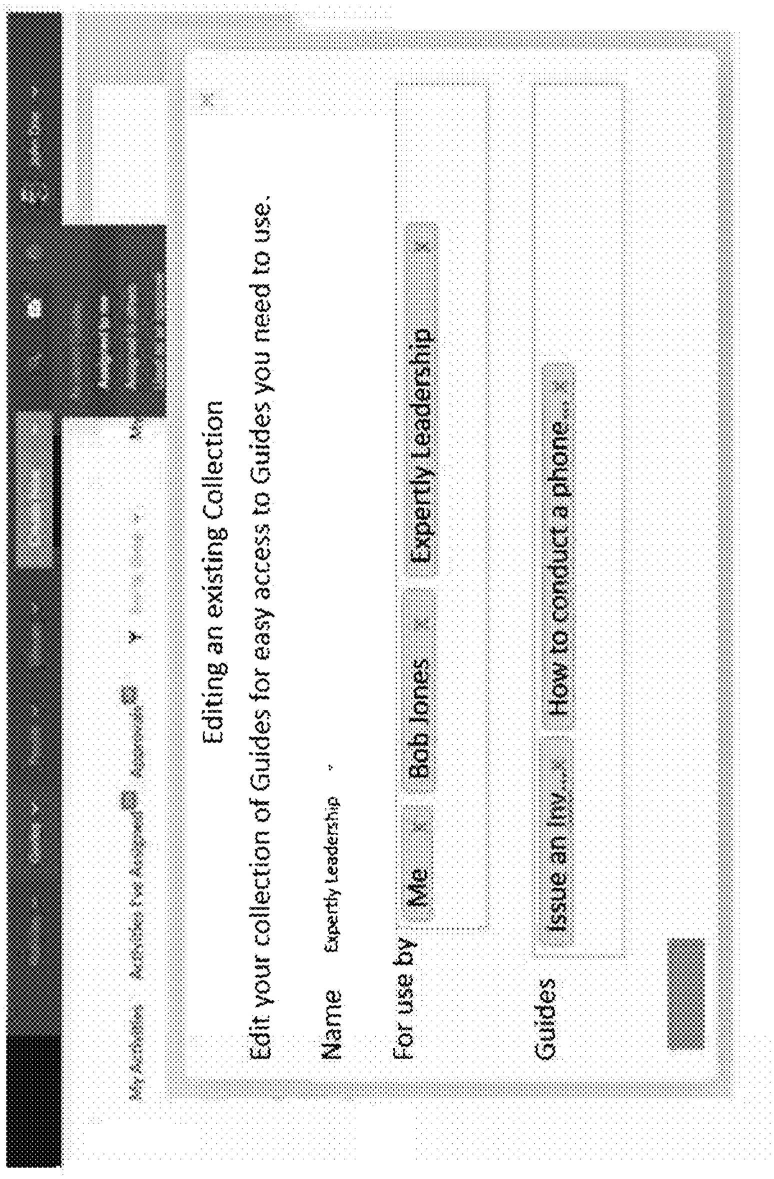
FIG. 236 shows an example of a user interface for creating a collection of Guides in accordance with some embodiments of the disclosed subject matter.

In accordance with some embodiments, multiple Guides can be grouped together by a user into a collection of Guides. In some such embodiments, a user who indicates the multiple Guides to be grouped together can indicate users who are authorized to access the collection of Guides. An example of a user interface for creating a collection of Guides is shown in FIG. 236 in accordance with some embodiments of the disclosed subject matter. In some embodiments, a collection of Guides can be accessed in any suitable manner, for example, via a shortcut icon, via a selection from a menu in a header of a user interface, and/or in any other suitable manner.

Figure 237:
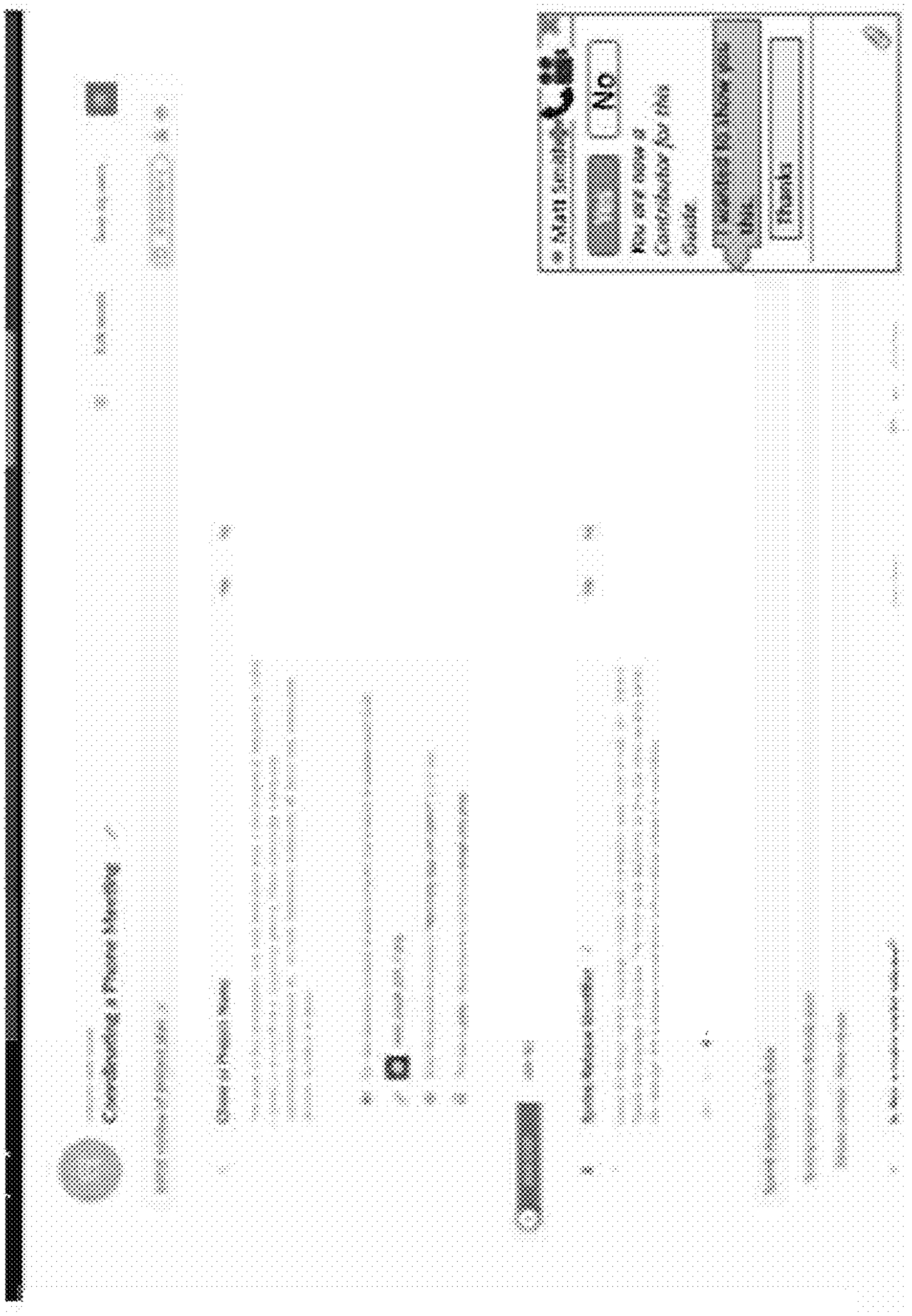
FIG. 237 shows an example of a user interface for inviting a user to collaborate on authorship of a Guide in accordance with some embodiments of the disclosed subject matter.

In some embodiments, an author of a Guide can invite a second user to collaborate on creation of or modification of a Guide. In some embodiments, an invitation can be transmitted via a user interface presented to the author that indicates that the second user is currently online, as shown in FIG. 237 in accordance with some embodiments of the disclosed subject matter.

In accordance with some embodiments, a Project can be created that can be used to coordinate multiple efforts, where each effort can be completed using a Guide. That is, in some embodiments, a Project can coordinate the use of multiple Guides that are typically used in an intertwined manner. For example, in some embodiments, information, analyses, and computations prepared in connection with a first Guide can be used by a second Guide within a Project.

Figure 238:
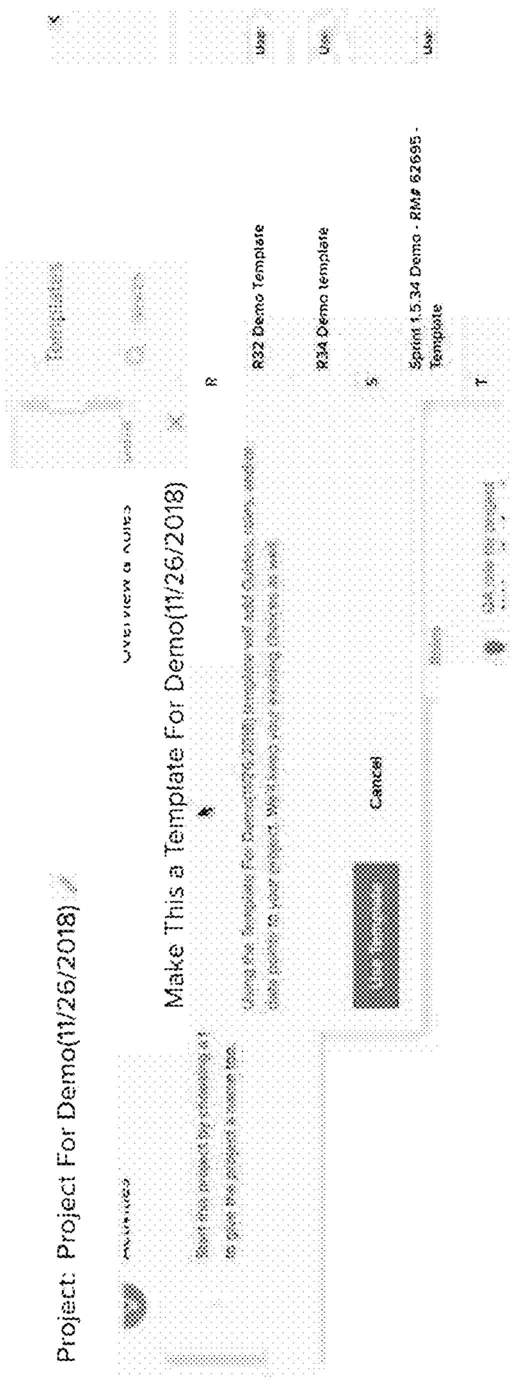
FIGS. 238 and 239 show examples of user interfaces for creating Projects using project templates in accordance with some embodiments of the disclosed subject matter.
Figure 239:
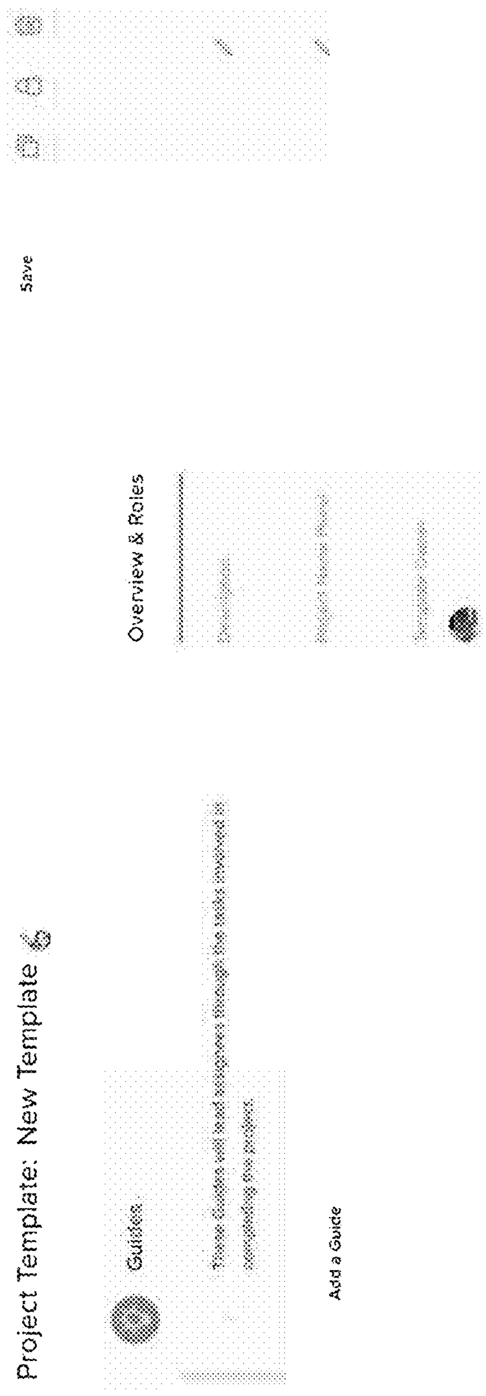

In some embodiments, a new Project can be created using an existing project template, as shown in FIG. 238 or created by creating a new project template, as shown in FIG. 239. In some embodiments, a project template can indicate any suitable number of Guides, permissions for different Guides in the Project, roles of users within the Project, and/or any other suitable information. In some embodiments, within a Project template, a user can add any suitable Guides, and any number of Guides, to the Project. Note that, in some embodiments, a new Project can be created without using any template.

Figure 240:
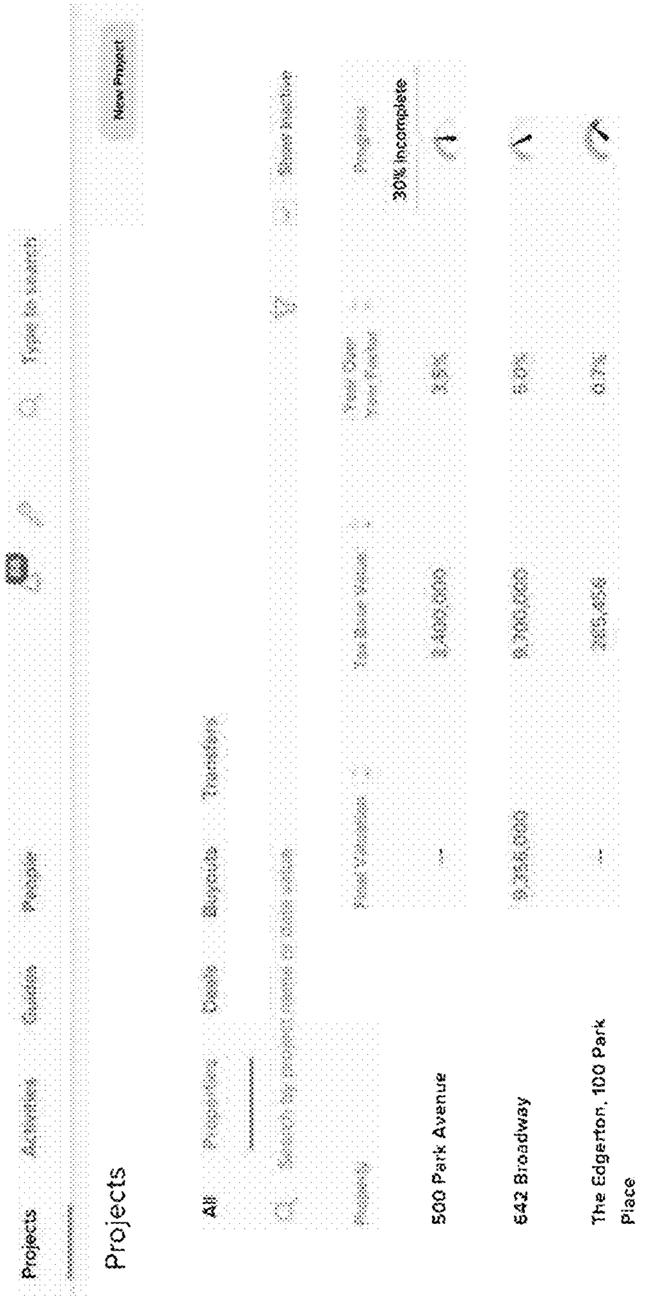
FIG. 240 shows an example of a user interface for indicating a group of Projects associated with a user in accordance with some embodiments of the disclosed subject matter.

In some embodiments, each Project that is based on the same project template can be conducted using the same procedures. In some embodiments, each Project associated with a user that is associated with the same project template can be grouped together in a user interface, as shown in FIG. 240. As illustrated in FIG. 240, multiple projects associated with a "Properties" project template can be listed.

Figure 241:
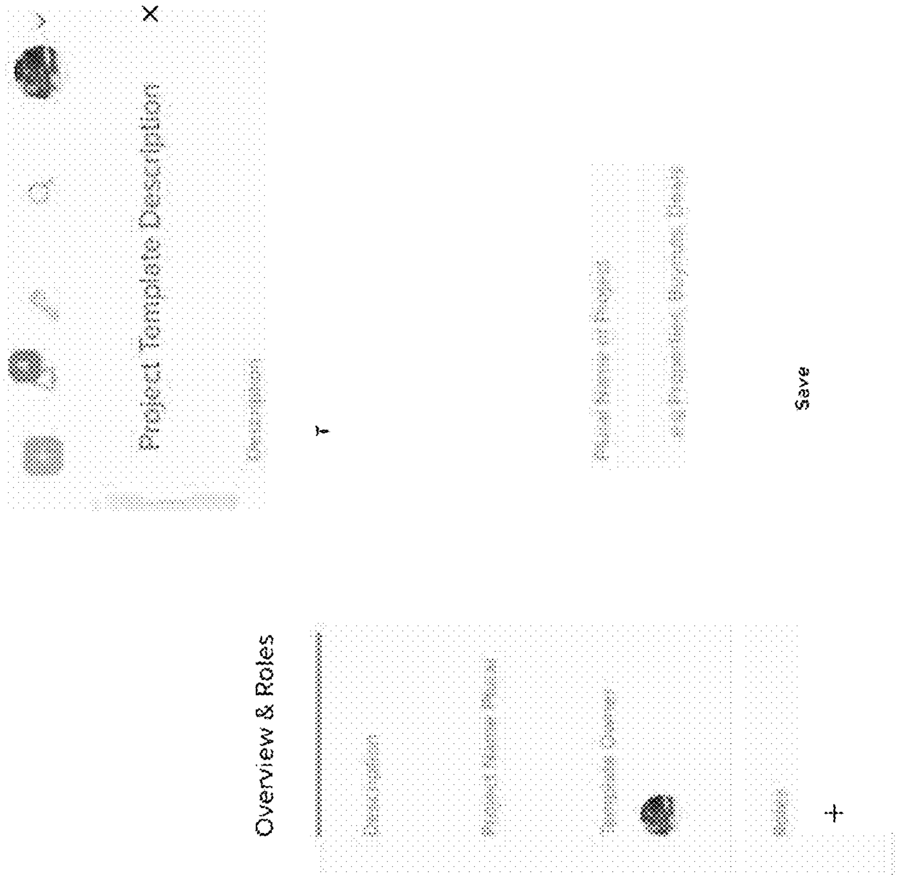
FIG. 241 shows an example of a user interface for configuring attributes associated with a Project in accordance with some embodiments of the disclosed subject matter.

In some embodiments, a project template can include any suitable number of attributes, such as a description of the project, an owner of the project, roles for multiple users participating in the Project, and/or any other suitable attributes. A user interface for configuring attributes within a project template is shown in FIG. 241 in accordance with some embodiments of the disclosed subject matter.

Figure 242:
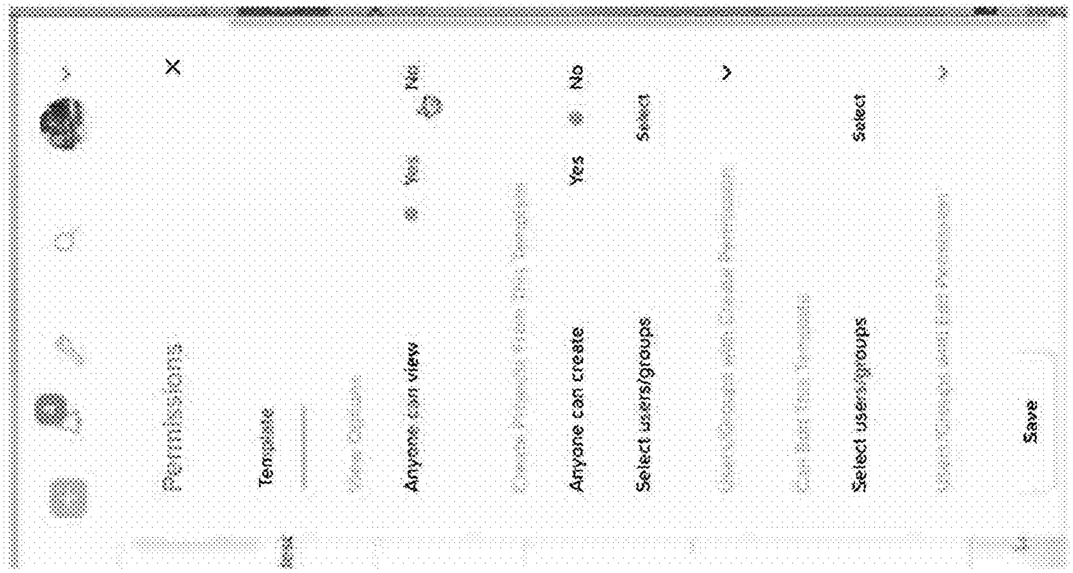
FIG. 242 shows an example of a user interface for setting permissions within a project template in accordance with some embodiments of the disclosed subject matter.

In some embodiments, any suitable permissions can be configured within a project template. In some embodiments, the permissions can include indications of users who are authorized to view the template, users who can create Projects using the template, and/or any other suitable permissions. An example of a user interface for setting permissions within a project template is shown in FIG. 242 in accordance with some embodiments of the disclosed subject matter.

Figure 243:
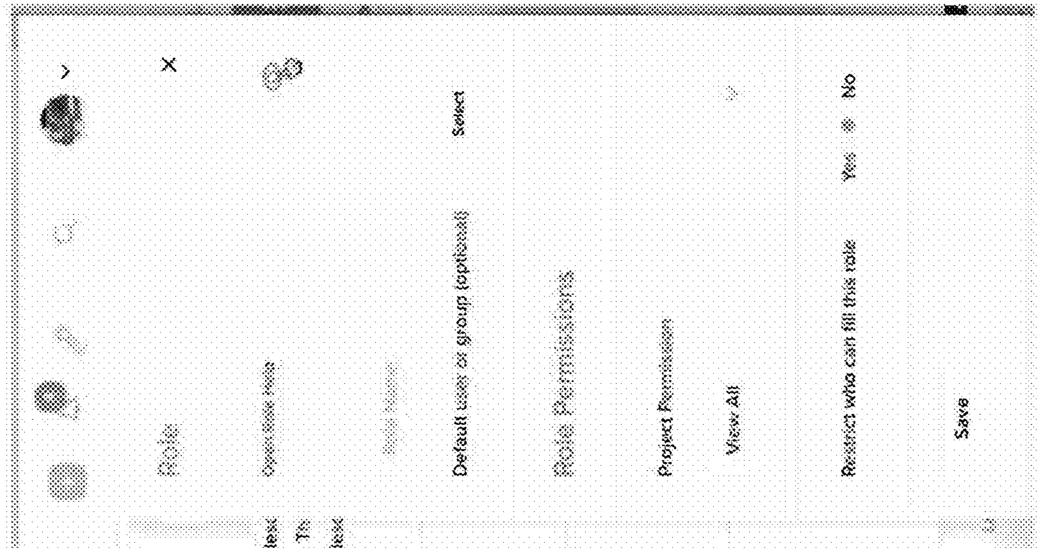
FIG. 243 shows an example of a user interface for adding and/or editing roles associated with a Project in accordance with some embodiments of the disclosed subject matter.

In some embodiments, a project template can include any suitable roles for a corresponding Project. In some embodiments, a user who is a manager of a Project can add and/or edit roles and associated permissions. For example, in some embodiments, a manager of a Project can add and/or edit roles and associated permissions using a user interface, as shown in FIG. 243 in accordance with some embodiments of the disclosed subject matter.

Figure 244:
FIG. 244 shows an example of a user interface for presenting information associated with a Project in accordance with some embodiments of the disclosed subject matter.

An example of a user interface corresponding to a Project is shown in FIG. 244 in accordance with some embodiments of the disclosed subject matter. As illustrated, in some embodiments, a Project can include multiple activities, roles, and/or data points. In some embodiments, each activity can correspond to an effort that can correspond to a single role in a project plan. In some embodiments, resources, sequences, and/or timing associated with an activity can be indicated within the Project. In some embodiments, each activity can correspond to a Guide that guides a user through completion of a procedure corresponding to the activity. In some embodiments, customizations can be made to a Project instance that is created based on a project template in any suitable manner. In some embodiments, an Activity can be required to belong to or be associated with a Project. In some such embodiments, a Project can be created in response to determining that an Activity that does not yet have an associated Project has been created. In some embodiments, a Project can be required to belong to or be associated with one Group. Additionally or alternatively, in some embodiments, a Project can belong to multiple Groups. In some embodiments, a Project Template can be associated with one or multiple Groups.

As described above, a Project can include multiple activities, each associated with a Guide. In some embodiments, a Guide included in a Project can have any suitable number of attributes that can be customized, such as associated users (e.g., an assignee or an approver), when the Guide is due, and/or when it should be assigned. Note that, in some embodiments, assignment of each Guide in a Project can be triggered automatically or manually. For example, in some embodiments, a Guide can be triggered automatically in response to detection of a particular event and/or based on a particular date in time. In some embodiments, due dates for each Guide in a Project can be determined in any suitable manner. For example, in some embodiments, a due date can be set manually by a user. As another example, in some embodiments, a due date can be determined based on a date of assignment of the Guide (e.g., a predetermined number of days after the Guide is assigned). As a more particular example, a due date can be configured to be "one day after assignment." As another more particular example, a due date can be configured to be "every Tuesday, one day after assignment." As another example, in some embodiments, a Guide can be due at multiple times (e.g., every Tuesday, and/or at any other suitable times). In some embodiments, a Guide can be due on a schedule, which can be set by a user.

Figure 245:
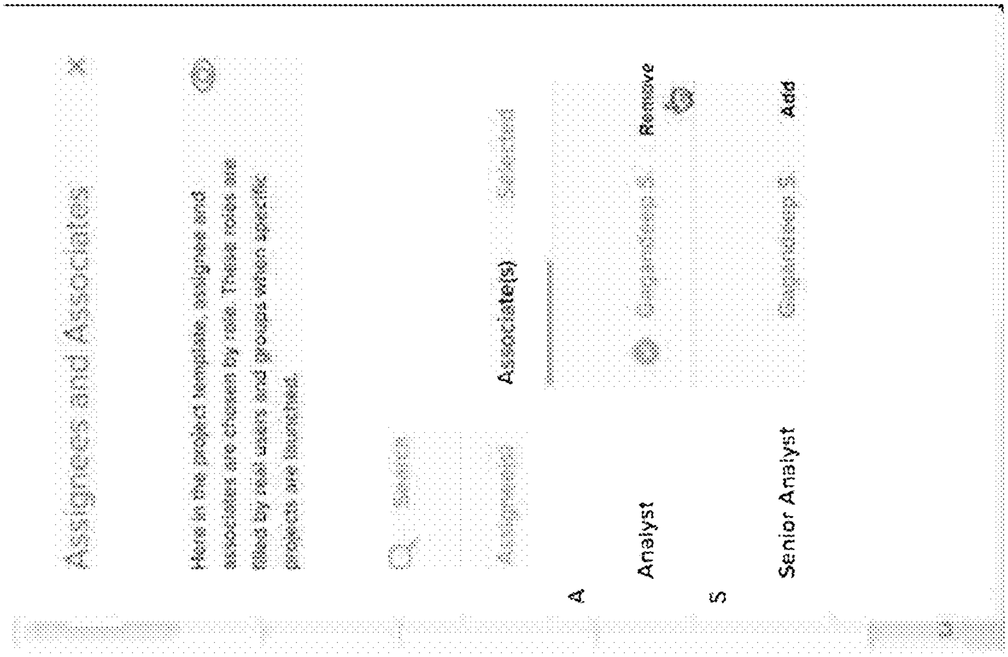
FIG. 245 shows an example of a user interface for assigning roles in accordance with some embodiments of the disclosed subject matter.

In some embodiments, individual users can be assigned to each role associated with a Project. In some embodiments, a user who is assigned to a role can then be assigned to the efforts corresponding to the role. For example, in some embodiments, a user can be assigned to be an assignee of an activity, an approver of an activity, an associate of an activity, and/or any other suitable effort. An example of a user interface for assigning roles is shown in FIG. 245 in accordance with some embodiments of the disclosed subject matter.

Figure 246:
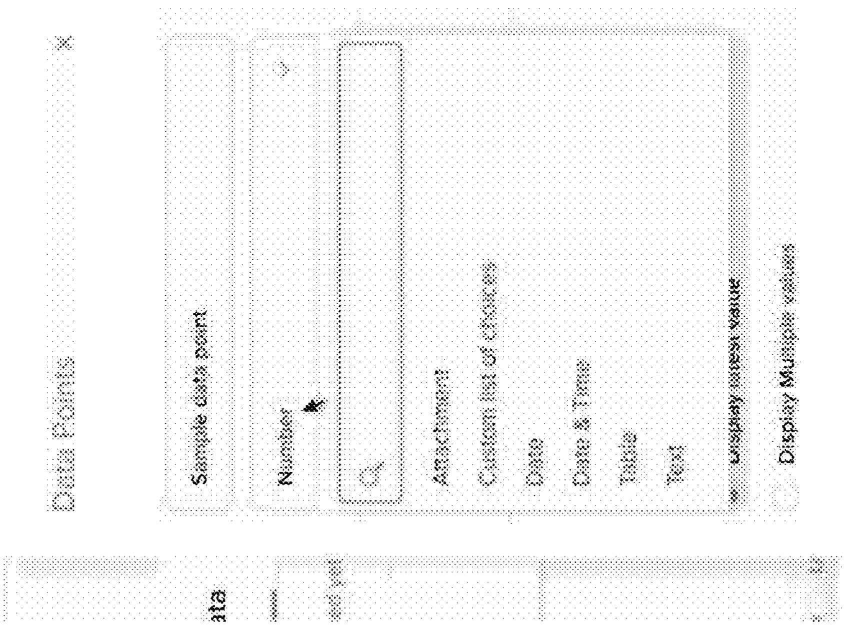
FIG. 246 shows an example of a user interface for configuring a data point in accordance with some embodiments of the disclosed subject matter.

In some embodiments, information can be shared between Guides, Projects, and/or external software using data points. In some embodiments, each data point can be property fields. In some embodiments, a user can configure any suitable number of data points for an individual Project or for a project template. In some embodiments, data points can additionally or alternatively be configured for an individual Guide. An example of a user interface for configuring a data point is shown in FIG. 246 in accordance with some embodiments of the disclosed subject matter. In some embodiments, particular information residing in the system can be expressed as a data point that is stored in association with some system entity, whether the same entity where that information resides, or a different entity. For example, quantitative information summarizing the number of Activities a user has completed on time, or has completed late, or has been assigned, can be exposed as a Data Point. In some embodiments, this can enable such information to be incorporated within components, reports, conditions, triggers, etc., in a unified and/or consistent manner.

In some embodiments, each data point can have a name that is associated with a value. In some embodiments, a data point can store any suitable data, such as text, a simple numerical value, a JSON structure, an array, an associative array, etc. Note that, in instances where data points are stored using a JSON structure, in some embodiments, data points can be stored and/or retrieved by referencing a hierarchical trail of JSON nodes. In some embodiments, a data point can be associated with any suitable type of object, such as an activity, a step, a project template, a Project, an assignment, a user, a group, etc. In some embodiments, metadata associated with a data point can be retrieved and/or set in any suitable manner. For example, within an activity, a data point can be added to a step response object, which can be configured in any suitable manner (e.g., hidden or visible, editable, and/or any other suitable parameters). In some embodiments, the data point can be used store any suitable information. For example, in some embodiments, the data point can be manually set by an assignee of the activity. As another example, in some embodiments, the data point can be automatically set as an output of an automation procedure associated with the field. In some embodiments, data points can be automatically populated when importing or synchronizing any suitable data. For example, in some embodiments, data points associated with a "Department" field can be automatically populated as a direction of an organization is imported.

Note that, in some embodiments, an activity that is included in a Project can store, retrieve, and use data points that are associated with other activities included in the Project. Additionally, in some embodiments, a document can be stored as a data point (e.g., a document that is generated as part of an activity, and/or any other suitable document), which can then be accessed by other activities included in the same Project. In some embodiments, any other suitable data structure can also be stored in a data point associated with a first activity of a Project and used by other activities within the Project, such as spreadsheets, lists, time series, references (e.g., references to other activities, Guides, or Projects), etc. In some embodiments, data points that exist within another system entity (for example, a Group, or the organization's settings) can be accessed by an Activity, Project, or other system object that is permitted such access.

Additionally, note that, in some embodiments, data points can be shared across any suitable group, for example, across departments of an organization, across an entire organization, and/or with any other suitable users or groups. In some embodiments, shared data points can be used by multiple Guides and/or Projects. In some embodiments, a first Guide that is part of a first Project can use shared data points with a second Guide that is part of a different, second Project. In some embodiments, a shared data point can exist within a namespace and can have permissions associated with the shared data point indicating circumstances in which a shared data point can be updated or modified. For example, in some embodiments, a permission associated with a shared data point can indicate that members of a group can access and/or modify the shared data point but that users who are not members of the group are prohibited from accessing and/or modifying the shared data point. As another example, in some embodiments, the permissions associated with a shared data point can indicate users who are allowed to view a history of the shared data point.

In some embodiments, a history of a data point's values can be stored in connection with the data point, for example, within the Project. For example, in some embodiments, previous values can be retrieved. As another example, in some embodiments, dates or times at which a value of a data point was modified can be accessed. As yet another example, in some embodiments, indications of movement of values or documents stored in a data point can be recorded and/or retrieved.

In some embodiments, a data point can refer to external data or an externally located document. For example, in some embodiments, a data point can indicate a current interest rate, and can point to a current interest rate that is accessible through a website associated with a financial service or other entity. As another example, in some embodiments, a data point can store a document that is stored on a server of a third party. In some embodiments, data points that refer to external data or externally located documents can be accessed in any suitable manner. For example, in some embodiments, a data connector can be used to retrieve data or documents from external databases (for example through a SQL query or stored procedure), external servers or services (for example through a REST API), or from external websites. In some embodiments, an external source can be configured to provide a callback such that when an external data point changes, the data point can be updated dynamically. Additionally, in some embodiments, data associated with an external data point can be cached. Additionally, in some embodiments, data associated with an external data point can be retrieved dynamically each time it is needed. In some embodiments, new data connectors can be configured using a configuration syntax, thereby allowing external data of different types to be accessed from external sources. In some embodiments, in response to detecting that a data point has been updated by the system, a corresponding external source can be updated as well.

Note that, in some embodiments, a data point can store multiple values or multiple documents. In some such embodiments, multiple values or multiple documents can each be considered valid and/or current.

In some embodiments, within a Project, an assignment or multiple assignments can be triggered or activated in response to particular criteria being met. In some embodiments, an indication of the criteria can be stored using one or more data points. For example, in some embodiments, a particular assignment can be triggered or activated in response to a determination that a value of a data point has exceeded a predetermined threshold. As a more particular example, in some embodiments, an assignment of "risk analysis" can be triggered or activated in response to a determination that one or more data points have exceeded a predetermined warning threshold. In some embodiments, criteria can include multiple conditions which can be indicated in any suitable manner, such as using Boolean logic.

Figure 247:
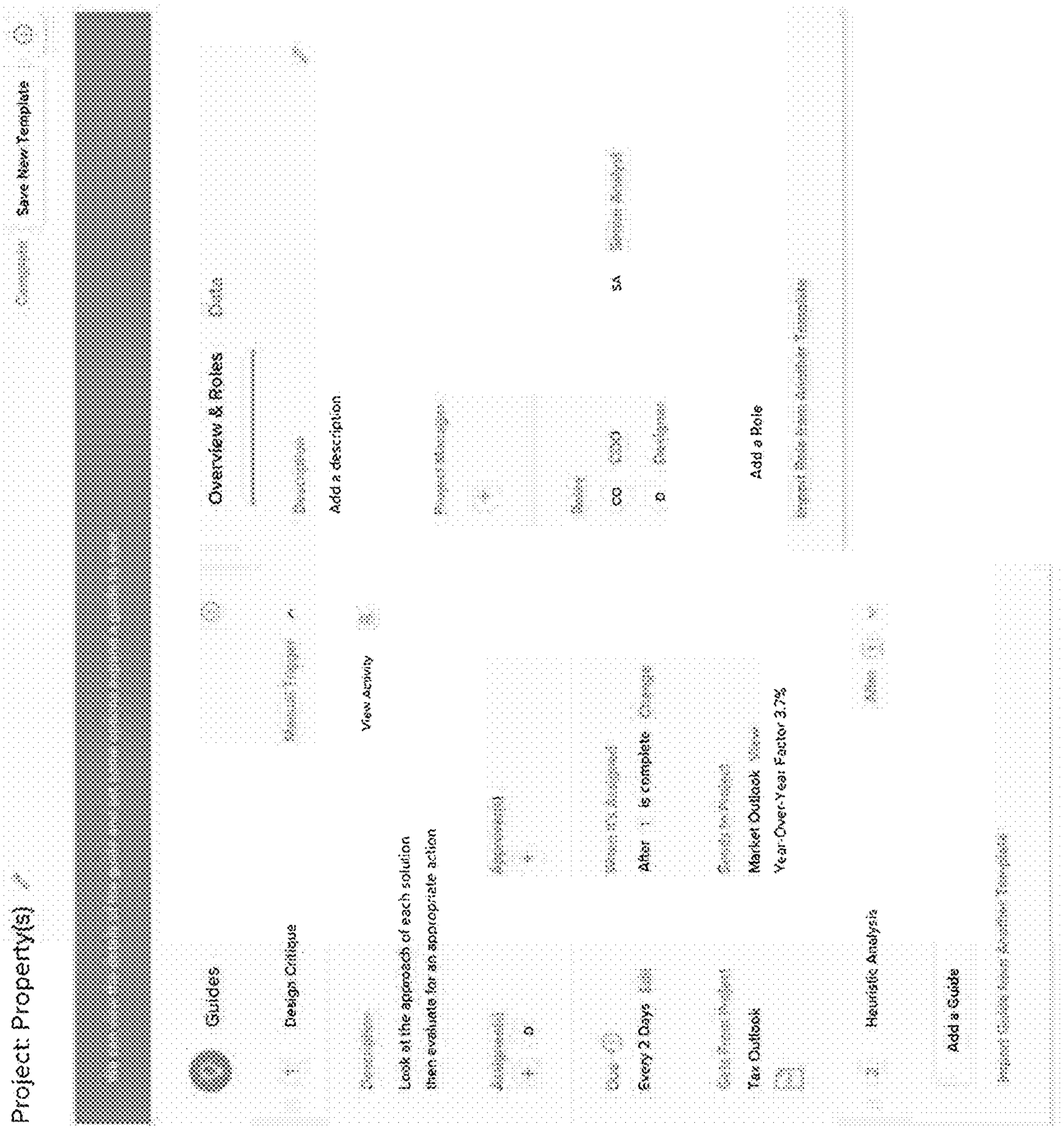
FIG. 247 shows an example of a user interface for configuring a Project in accordance with some embodiments of the disclosed subject matter.

Turning to FIG. 247, an example of a user interface for configuring a Project using a project template is shown in accordance with some embodiments of the disclosed subject matter. As illustrated, in some embodiments, a set of procedures can be configured within the template that can be used within the Project as well as within other Projects. In some embodiments, other elements of a Project can be configured within the template, such as the types of Guides, a sequence in which Guides are to be assigned (e.g., in parallel, sequentially, based on data point updates, and/or in any other suitable manner), the duration of each activity, an interval used for repeated activities, any prefilled steps or instructions to be used, roles to be assigned within the Project, etc. In some embodiments, the template can be edited or modified at any suitable manner, for example, to assign a Guide to a particular user or to add or modify an indicated Guide. Note that, in some embodiments, a Project can be created without using a template. Alternatively, in some embodiments, multiple templates can be used to create a Project. In some such embodiments, deduplication can be used to deduplicate identical roles, assignments, and/or data points across multiple templates that are used for a single Project.

In some embodiments, a project template can automatically identify data points that are used by Guides that are included in a project template. In some such embodiments, a data point can then automatically be included in the project template. Alternatively, in some embodiments, a data point can be directly added into a Project. Note that, in some embodiments, two data points (e.g., two data points used in two different guides) can have the same name but can be of different data types. In some such embodiments, a Project can include two data points with the same name. Alternatively, in some embodiments, the system can prompt a user to change a name of one of two data points with the same name. Note that, in some embodiments, the system can cast values assigned to a data point with a first data type to a second data type, for example, based on any suitable criteria indicated in a project template.

In some embodiments, one or more permissions can be assigned in connection with portions of a Project. In some embodiments, different types of permissions can be assigned. For example, in some embodiments, a "limited view" permission can allow a user assigned a particular role to see activities and information the user is associated with, but not allowed to see details unrelated to activities and information the user is not associated with. As another example, in some embodiments, a "view all" permission can allow a user to see any or all details associated with a Project. As yet another example, in some embodiments, an "edit Project" permission can allow a user to adjust or modify aspects of the Project (e.g., by adding or changing an assignment or a role). In some embodiments, permissions associated with a Project can be granted to an individual user, members of a group, a group role within a group, a holder of a Project role, etc. Note that, in some embodiments, a Project can be configured to dynamically inherit roles and/or permissions from a project template used to create the Project. In some such embodiments, inherited permissions can be modified at any suitable time.

As described above, activities can be automated, for example, automatically initiated or triggered in response to detection of particular events occurring (e.g., a news article being published, a new item published to a particular RSS feed, etc.). In some embodiments, automations can be configured to occur at a Project level. For example, in some embodiments, any suitable criteria can be set that cause a notification to be presented, an assignment of a Guide or activity, a generation of report, and/or any other suitable Project-level action to occur. In some embodiments, the criteria can be based on any suitable information. For example, in some embodiments, the criteria can be based on data points associated with the Project (e.g., that a value of a data point changes, etc.). As another example, in some embodiments, the criteria can be based on roles or activities within the Project changing in any suitable manner.

In accordance with some embodiments, an indicator can be used that graphically or textually displays one or more values or statuses based on any suitable information. In some embodiments, an indicator can be pinned to a particular user interface, for example, a Project dashboard or a user interface associated with a particular activity. In some embodiments, an indicator can be included in a template, such as a project template or a Guide. An indicator can include any suitable type of content, such as a value, a metric, a chart, a gauge, an image, a table, text, etc. In some embodiments, an indicator can be presented in response to a determination that particular criteria have been met. For example, in some embodiments, an indicator can be presented in response to a determination that a particular data point or other value has exceeded a predetermined threshold. As another example, in some embodiments, a visual appearance of an indicator can change based on particular criteria. For example, in some embodiments, an indicator can be presented in red in response to a determination that a particular value has exceeded a particular predetermined threshold. In some embodiments, an indicator can be presented to a particular subset of users. For example, in some embodiments, an indicator can be configured to be presented to a user who is indicated as an assignee of a particular activity. As another example, in some embodiments, an indicator can be configured to be presented to a user who is indicated as a manager of a particular activity.

In accordance with some embodiments, a report can be generated based on any suitable information. For example, in some embodiments, a report can be generated based on a report template, which can indicate blocks of content and/or any suitable formatting to be used in the report. In some embodiments, a block of content can include data, data queries, indicators, and/or any other suitable content. In some embodiments, a block of content can be indicated as to be included based on any suitable criteria being met, for example, based on values of any suitable data points, based on a current date or time, based on permissions associated with any suitable activities, and/or any other suitable criteria. In some embodiments, content included in a report can be retrieved from an internal source and/or from an external source (e.g., an external source associated with any suitable third-party entity or organization). In some embodiments, a report can be in any suitable format, such as a JSON, an XML data structure, a word document, a slideshow, a spreadsheet, and/or any other suitable format. In some embodiments, a widget can be used by a user to incorporate any suitable filters during creation of a report, for example, to filter data included in the report, to tailor a visual appearance of the report, and/or in any other suitable manner. In some embodiments, a report can be associated with any suitable access controls that indicate users who are allowed to access the report and/or users who are allowed to edit a report. In some embodiments, a report can be configured to be generated, updated, saved, presented, and/or transmitted manually and/or automatically (e.g., in response to a particular event being detected, based on a calendar, based on a scheduled interval, and/o in any other suitable manner). In some embodiments, a report can be transmitted to a user in any suitable manner, such as via e-mail, via an instant message, and/or in any other suitable manner. In some embodiments, a report can be stored within or linked to from a data point. In some embodiments, reports of different types can be generated. In some embodiments, different types of reports can be presented to different users (e.g., a report indicating performance of team members can be presented to a manager, etc.). In some embodiments, a user can configure data and/or parameters on which a report is based. In some embodiments, a user can additionally or alternatively indicate a format of a report, for example, that data is to be presented in a list view, a table view, in a graph, and/or any other suitable format.

In accordance with some embodiments, a Guide can include a scoring feature. For example, in some embodiments, after an assignee completes an activity, a user interface can be presented to the assignee that includes any suitable number of questions. The answers to the questions can then be used to present the assignee with a particular section that is selected based on the answers to the questions. For example, in some embodiments, the questions can include any suitable diagnostic questions (e.g., "is a check engine light on?"), and one or more sections can be presented based on the answers to the diagnostic questions (e.g., "what to do when the check engine light is on," etc.). In some embodiments, a creator of the Guide can indicate which questions are to be asked and which sections are to be presented based on answers to the questions. For example, in some embodiments, a creator of a Guide can assign points to each answer to a question and can configure the Guide to show particular sections based on a number of points accrued from the questions. As a more particular example, in an instance in which the questions are diagnostic questions, each "yes" answer can be associated with one or more points. The Guide can be configured to sum the number of points over any subset of over all of the diagnostic questions, and a particular diagnosis can then be identified based on the summed number of points. Continuing with this example, in some embodiments the Guide can be configured to present one or more sections based on a number of points associated with answers from the answered questions, and to inhibit presentation of one or more sections based on the number of points. In some embodiments, the scoring feature can thereby cause a likely diagnosis and information associated with a likely diagnosis to be presented and can cause unlikely diagnoses and information associated with unlikely diagnoses to be inhibited from presentation.

In accordance with some embodiments, a video that simulates completion of an activity or authorship of a Guide can be created. In some embodiments, the video can be created without having recorded a user completing the activity. For example, in some embodiments, a simulation can be generated based on a history of previous user actions, such as examples of one or more users completing different actions, moving from one step to another, responding to a step, etc. In some embodiments, the simulation can be generated based on any or all actions that were performed (e.g., edits to a form or a Guide, and/or any other suitable actions) during completion of an activity or authorship of a Guide. In some embodiments, the simulation can show entry of text or data into any suitable form fields. In some such embodiments, the simulation can show entry at a typing speed typical of a user or at a simulated typing speed selected based on readability. In some embodiments, the simulation can include entries of data or text that generated errors or warning. Conversely, in some embodiments, the simulation can be configured to omit entries of data or text that generated warnings. In some embodiments, a video of a generated simulation can be rendered in any suitable manner, such as a screen capture video, within a utility that renders the video as a webpage that is altered over time, and/or in any other suitable manner. In some embodiments, a video of the simulation can be suggested or recommended in any suitable manner. For example, in some embodiments, the video of the simulation can be recommended to a user who is completing a particular activity related to an activity depicted in the simulation.

In accordance with some embodiments, a user of a Guide can add or edit private comments in connection with a Guide or an activity. In some embodiments, the private comments can be comments that are stored in association with the Guide or the activity that are visible to the user (e.g., that are notes for the user, for example, when the user uses the Guide in the future). In some embodiments, a private comment can be visible only to the user who enters the private comment. Additionally or alternatively, in some embodiments, a private comment can be visible to an author of the Guide, for example, to share feedback from a user who writes a private comment to the author of the Guide.

In accordance with some embodiments, a dual mode can be implemented where a user can view and take actions within an activity and a Guide associated with the activity at the same time. For example, in some embodiments, a user can complete an activity while authoring improvements to a Guide associated with the activity within the same view (e.g., within different portions of the same user interface). As a more particular example, in some embodiments, a section of steps can be presented as inactive in an activity (e.g., because display conditions required to present the steps as active have not yet been met, and/or for any other suitable reason), but the section of steps can be visible because they can be editable within the Guide associated with the activity.

In accordance with some embodiments, a Javascript-based scripting function can be provided, for example, through a Web interface, to provide access to advanced logic and functionality. In some embodiments, the scripting function can be provided to selected users, for example, users in particular roles within an organization, and/or any other suitable users. In some embodiments, the scripting function can be used to provide conditional logic or calculations that can be applied to various values (e.g., within an activity, within a Guide, within a Project, and/or any other suitable values). For example, in some embodiments, the scripting function can be used to configure any suitable logic or calculations applied to values to perform any suitable function, such as assign an activity, change a status of an activity, trigger an automation, present an alert, ask a user for an input, adjust an interface, and/or any other suitable action. As another example, within a project template, the scripting function can be used to generate more advanced logic to be applied to assign new activities when a particular event occurs or a particular condition is met, to adjust data points, to send a report, etc.

In some embodiments, a block of code can include a reusable function that can be invoked by another block of code. In some embodiments, a reusable script can be shared with other users. In some embodiments, user-generated scripts can be processed client-side (e.g., within a browser or an application) and/or server-side (e.g., using NodeJS or any similar technology). In some embodiments, some Javascript capabilities can be inhibited or limited (e.g., processing AJAX calls to external websites). In some embodiments, a group of built-in scripts using the scripting function can be provided to any suitable users.

In accordance with some embodiments, one or more comments can be entered in association with a particular step response of an activity. In some embodiments, within a particular step, comments can be organized within a single thread. Alternatively, in some embodiments, comments within a step can be organized in a multithreaded manner. In some embodiments, a comment can be marked as private, and, in some embodiments, a private comment can be viewed by only a subset of users (e.g., a user who wrote the comment, an assignee of the activity associated with the comment, etc.). In some embodiments, responses to a private comment can also be made private. In some embodiments, a first user can mark a comment left by a second user as private. Note that, in some embodiments, comments can be entered in association with a step of an activity before the activity is completed or submitted, thereby allowing feedback during the activity. In some embodiments, a comment can be entered by an approver of a step or of an activity. In some embodiments, a comment can be marked in response to a determination that the comment has been viewed by a particular user. For example, in some embodiments, a comment can be marked to indicate that an assignee of an activity has viewed a comment that was entered by an approver of the activity. Note that, in instances where a comment is entered in connection with a step response of an activity, and the step response is subsequently changed, the comment can automatically be marked as an older comment or as a comment related to an older version of the step response. In some embodiments, an availability of comments can be marked in any suitable manner, for example, using an icon that indicates a number of available comments (e.g., new comments that have not yet been moved), and/or in any other suitable manner.

In some embodiments, comments can be presented in any suitable manner, for example, in a comments portion of a user interface. For example, in some embodiments, in response to a particular step of an activity being selected within a user interface, comments associated with the selected step can be presented within a portion of the user interface (e.g., within a column on a right portion of the user interface, and/or in any other suitable portion). In some embodiments, comments can be arranged in any suitable manner, for example, based on a date and/or time comments were entered (e.g., with oldest comments first, with newest comments first, and/or in any other suitable manner). In some embodiments, a comment can include an indication of a stage of a corresponding activity the comment was entered. For example, in an instance in which a comment was entered after a step of an activity was completed, the comment can be presented in connection with an indication that the comment was entered after completion of the step. As another example, in an instance in which a comment was entered after approval of a step of an activity, the comment can be presented with an indication that the comment was entered after approval. In some embodiments, a comment can be presented in connection with information about a user who entered the comment (e.g., in connection with a name of the user, a role of the user, a profile picture of the user, and/or any other suitable information).

Note that, in some embodiments, a particular user can receive a notification of a new comment. For example, in some embodiments, an assignee of an activity can receive a notification of a new comment that is entered in connection with the activity. In some embodiments, the notification can be transmitted and/or presented in any suitable manner, for example, in a dashboard view of the user receiving the notification, as an email, as an instant message, and/or in any other suitable manner.

In some embodiments, one or more comments can be entered in association with a Guide, for example, to provide feedback to an author of the Guide. In some embodiments, similar to comments entered in connection with an activity, comments associated with a Guide can be single-threaded or multi-threaded. In some embodiments, comments can be presented to a selected subset of users, such as users who authored a Guide. In some embodiments, a comment entered in connection with a Guide can be marked as "resolved," thereby causing the comment to be deleted or to be inhibited from presentation.

In accordance with some embodiments, previous responses to a step of an activity can be presented during completion of the same step at a different time or during completion of a similar step at a different time. For example, in some embodiments, in an instance in which an assignee is completing a step of an activity, a previous step response to the same step of the activity that was previously completed (e.g., previously completed by the assignee, previously completed by another user, and/or previously completed in any other suitable manner) can be presented. In some embodiments, a previous response can be presented in any suitable manner. For example, in some embodiments, a popup notification can be presented that indicates that previous responses are available for viewing. In some embodiments, a previous response can include any suitable text, comments, feedback, attachments, a date the previous response was submitted, a date an activity associated with the previous response was due, and/or any other suitable content. In some embodiments, previous responses can be presented only in response to a determination that the previous response was successfully approved. Note that, in some embodiments, in an instance in which a user is to be presented with one or more previous responses, any suitable permissions can be required before the user is presented with previous responses that were entered by other users. In some embodiments, a user can only have permission to view previous responses that the user entered.

In accordance with some embodiments, one or more alerts can be configured in connection with a particular step of an activity. For example, in some embodiments, an alert can be configured such that the alert is presented to an assignee of the step or of the activity in response to any suitable criteria being met. In some embodiments, the criteria can include any suitable criteria, such as a response entered by the assignee having a particular value or being within a particular range, a response including particular text, a response being entered during a particular date or time range, and/or any other suitable criteria. Note that, in some embodiments, criteria can be configured using any suitable logical syntax or commands (e.g., "AND," "OR," etc.) such that the criteria include any suitable combination of different factors or conditions.

Note that, in some embodiments, two or more alerts can be configured for a particular step of an activity. For example, in some embodiments, a first alert can be configured with a first condition, and a second alert can be configured with a second condition. Continuing with this example, in some embodiments, the first condition can be stronger than the second condition, such that meeting the first condition implies that the second condition is also met. As a more particular example, in some embodiments, a first condition can be that a response to a step is a value less than 5, and a second condition can be that the response to the step is a value less than 10. In this example, the first condition can be stronger than the second condition, because a value less than 5 is automatically less than 10. In some embodiments, in an instance in which two or more alerts are configured, an alert that satisfies a stronger condition or the strongest condition can be triggered, and other alerts can be inhibited. Referring to the previous example, in an instance in which a response to a step is entered which is, for example, 3 (that is, a response that satisfies both the first condition and the second condition), a first alert that corresponds to the stronger first condition can be presented, and a second alert that corresponds to the weaker second condition can be inhibited.

In some embodiments, an alert can be configured by any suitable user, such as an author of a Guide that includes the activity associated with the alert. In some embodiments, an alert can be configured in any suitable manner. For example, in some embodiments, a user interface can be presented to an author of a Guide, and an alert can be configured using the user interface. As a more particular example, in some embodiments, any suitable information associated with the alert can be entered by an author of a Guide via the user interface, such as an icon associated with the alert, text associated with the alert, one or more conditions associated with the alert, and/or any other suitable information.

In accordance with some embodiments, a Guide can be used as an API method and as a Bot. For example, in some embodiments, any standard API calling syntax can be used, such as a RESTful syntax, a Remote Procedure Call (RPC) procedure (e.g., gRPC, and/or any other suitable procedure), and/or any other suitable syntax. In some embodiments, when a call is made to a Guide, an activity is created based on the Guide. In some embodiments, because a Guide can be configured with automations, logic, scripts, etc., in some embodiments, the system can be used to control external systems and/or to implement any suitable API functionality. In some embodiments, assignment parameters and/or any pre-fillable steps associated with the Guide can correspond to input parameters of a corresponding API method. In some embodiments, a step value can correspond to an output parameter.

In some embodiments, an activity can be created through an API call associated with a Guide. In some such embodiments, the activity can be assigned for manual processing. Alternatively, in some embodiments, the activity can be initiated and processed automatically. In some such embodiments, any resulting step values generated from an automatically processed activity can be output as output parameters from the API method. In some embodiments, an identifier of an in-process activity can be returned, for example, when a timeout is reached during automatic processing of an activity or when a step that requires manual processing is reached. In some embodiments, the identifier can be returned in connection with any suitable metadata or other values. In some embodiments, a function that calls an API can register a callback, for example, by generating a URL provided by a caller function. In some embodiments, the callback can be used in response to any suitable event, for example, when an activity has been completed, when a status associated with the activity has changed, etc.

In some embodiments, any suitable calling syntax can be used for APIs. For example, in some embodiments, a syntax can use a Group hierarchy associated with a Guide corresponding to the API. For example, in some embodiments, all Guides that are visible in a "marketing" group can be exposed as methods of the "marketing" group (e.g., "marketing.new-inquiry," "marketing.management-update," etc.). As another example, Guides can be exposed using a full group path, such as "busdev.marketing.new-inquiry." Alternatively, in some embodiments, Guides can be exposed without group information (e.g., "new-inquiry") or by using an alias for the group or Guide (e.g., "mktg.new-inquiry," "inquire," etc.).

Note that, in some embodiments, API documentation can be automatically output, for example, using versions of OpenAPI syntax, WSDL, and/or any other suitable documentation format. In some embodiments, the system can determine whether a Guide is idempotent. In some embodiments, the documentation can be provided using a GET or POST method in response to the determination. In some embodiments, API syntaxes can be generated and/or offered for any other suitable type of system object, such as Projects, data items, etc. In some embodiments, data items, for example, can be exposed to Create, Read, Update, and Delete (CRUD) database operations with their names or variants of their names.

In accordance with some embodiments, a table that is included as an entry or an output as a response type can include any suitable advanced capabilities. For example, in some embodiments, the capabilities can include: automatically extending a height and/or a width of the table, pre-populating items in a list in a table, generating summary rows at the bottom of a table, including multiple table sections (e.g., including a configurable header and footer rows), access to spreadsheet equations in cells, access to spreadsheet formatting options in cells, import and/or export items from third-party spreadsheet software, use of tables with master lists, etc.

In accordance with some embodiments, a Guide can be automatically updated for all users across a system, thereby allowing all users to access and user a most recent version of the Guide.

In accordance with some embodiments, an activity can be offered to multiple assignees. In some embodiments, the multiple assignees can be specified individually, as users who belong to a particular group or department, as users who have a particular role in an organization, and/or in any other suitable manner. In some embodiments, an assignee of the multiple assignees can claim the activity. In some such embodiments, the activity can then be marked in any suitable manner indicating the assignee who has claimed the activity.

In accordance with some embodiments, names or titles of a series of activities can be configured. For example, in an instance where a series of activities corresponds to activities that are repeated (e.g., monthly invoices, and/or any other suitable activities), a title for each activity in the series can be generated that includes information indicating a date associated with the activity. As a more particular example, a series of activities with titles such as "issue invoices for January," "issue invoices for February," etc. can be generated by a user assigning the activities using a user interface.

In accordance with some embodiments, an overview of a group of users that correspond to a team can be provided. For example, in some embodiments, the team can be associated with reports to a particular manager, users in a particular group, etc. In some embodiments, any suitable information about users on the team can be provided, for example, in a "My Team" user interface. As a more particular example, in some embodiments, the information can include any suitable metrics, any suitable Guide or activity history, participation in different activities or Projects, and/or any other suitable information. In some embodiments, an overview of a team can be presented to a particular user, such as a manager, as a dashboard user interface. In some such embodiments, a widget on the dashboard can present information about the team, such as a status update for members of the team, indications of items that are urgent and/or due soon, patterns of activity for particular members of a team, indications of recent activity of team members, and/or any other suitable information.

In accordance with some embodiments, Guides or activities can be automatically assigned. For example, in some embodiments, an activity assigned to a group can be placed in a queue associated with the group. In some embodiments, a leader of the group can configure any suitable rules that can be used to automate assignment of activities in the queue associated with the group. For example, in some embodiments, the rules can indicate that particular types of Guides or activities are to be assigned to particular members of the group. As another example, in some embodiments, the rules can indicate a manner in which availability of particular members of the group is to affect assignment of particular Guides or activities. As a more particular example, in some embodiments, a rule can indicate that a particular type of Guide is to be assigned to a particular first user, and that if the first user is unavailable (e.g., the first user has indicated that the first user is on vacation, etc.), the particular type of Guide is to be assigned to a particular second user. As yet another example, in some embodiments, a rule can indicate that tasks are to be preferentially assigned to users based on an amount of work currently assigned to the user (e.g., that users with the least remaining work are to be assigned new tasks). As still another example, in some embodiments, a rule can indicate one or more conditions in which an activity is to be reassigned from a first user to a second user (e.g., if the first user has not completed an activity by a particular time, etc.).

Note that, in some embodiments, a queue associated with a group can be configured to sequence activities assigned to the group in any suitable manner. For example, in some embodiments, any suitable sort criteria can be configured. As a more particular example, in some embodiments, the sort criteria can indicate that activities in the queue are to be sorted based on when an activity is due, when an activity was created, which Guide an activity is based on, which Project type an activity is associated with, an assignee associated with an activity, a value associated with a step of an activity, and/or any other suitable information. As another more particular example, in some embodiments, the sort criteria can be based on a value of a data point or other metadata value associated with an activity. As a specific example, in some embodiments, a priority metadata field can be created in association with an activity and can be used in the sort criteria associated with a queue of a group. Continuing with this example, in some embodiments, any suitable custom calculations can be configured to update a priority metadata field that take any suitable inputs (e.g., other data point values associated with a Project) and perform any suitable calculations on the inputs. As another example, in some embodiments, a custom Javascript calculation can be configured that updates a priority metadata field. In some such embodiments, a calculation can be connected to a trigger, for example, to recalculate whenever an activity is first created and/or when it changes.

In accordance with some embodiments, changes and/or modifications to a Guide can be presented on a draft version of the Guide, for example, to highlight new items or changed items. In some embodiments, a user (e.g., an author of a Guide) can select any suitable previous version of a Guide, and differences between the selected previous version of the Guide and a current version of the Guide can be highlighted in any suitable manner.

In accordance with some embodiments, a page can be generated and updated for each person or user in a group or organization. In some embodiments, the page can be a profile page that indicates any suitable information, such as personal information associated with the user (e.g., contact information, role, etc.), Guides the user has authored, activities the user has been assigned, activities the user has assigned to others, incomplete activities, activities the user needs to approve, information indicating relationships between the user and other users in the organization (e.g., a relationship between the user associated with the page and a user viewing the page, activities the user associated with the page and the user viewing the page have worked on together, and/or any other suitable relationship information), and/or any other suitable information.

In accordance with some embodiments, a series of activities can be configured with a customized schedule. For example, in some embodiments, a custom schedule option can be provided via any suitable user interface that can allow an assigner of the series of activities to select one or more options for dates activities are to be assigned (e.g., on the $20^{th}$ of the month, the third Tuesday of every month, etc.).

In accordance with some embodiments, Guides can be reorganized using a drag and drop mechanism. For example, in some embodiments, a group of Guides can be associated with a particular group (e.g., a particular department in an organization, and/or any other suitable group), and Guides can be reorganized by dragging additional Guides into the group of Guides, rearranging an order of Guides in the group of Guides, and/or in any other suitable manner. In some embodiments, multiple Guides can be selected and dragged simultaneously.

In accordance with some embodiments, the system can store multiple indications of multiple organizations that a single user works with. In some such embodiments, a user account associated with the user can be linked to each of the multiple organizations. In some embodiments, the user can switch between organizations, for example, by selecting an organization from a group of organizations the user is linked to within a drop-down menu.

In accordance with some embodiments, a framework can be provided that can allow an organization or other entity to generate any suitable interfaces or pages described herein. For example, in some embodiments, the framework can be used to generate a portal that can be used by users of a particular entity or organization to generate Projects or Guides, interact with Projects or Guides, configure alerts or other notifications, configure conditions used to trigger particular actions or activities, and/or perform any other suitable functions. As a more particular example, in some embodiments, the framework can be used to configure a page that corresponds to a Guide. As another more particular example, the framework can be used to configure a form that is used within a particular activity of a Guide. Note that the examples described herein are merely examples, and, in some embodiments, the framework can be used to generate any suitable interface or page. Additionally or alternatively, in some embodiments, the framework described below can be used to configure interfaces to collect data, display data, navigate through pages, etc.

In some embodiments, the framework can include a page template that can be used to design and/or generate any suitable type of page or interface. In some embodiments, a page template can include any suitable content, such as HTML, CSS, and/or any other suitable type of content. In some embodiments, a page template can include one or more markers that can each indicate positions within the page where content is to be inserted.

Figure 248:
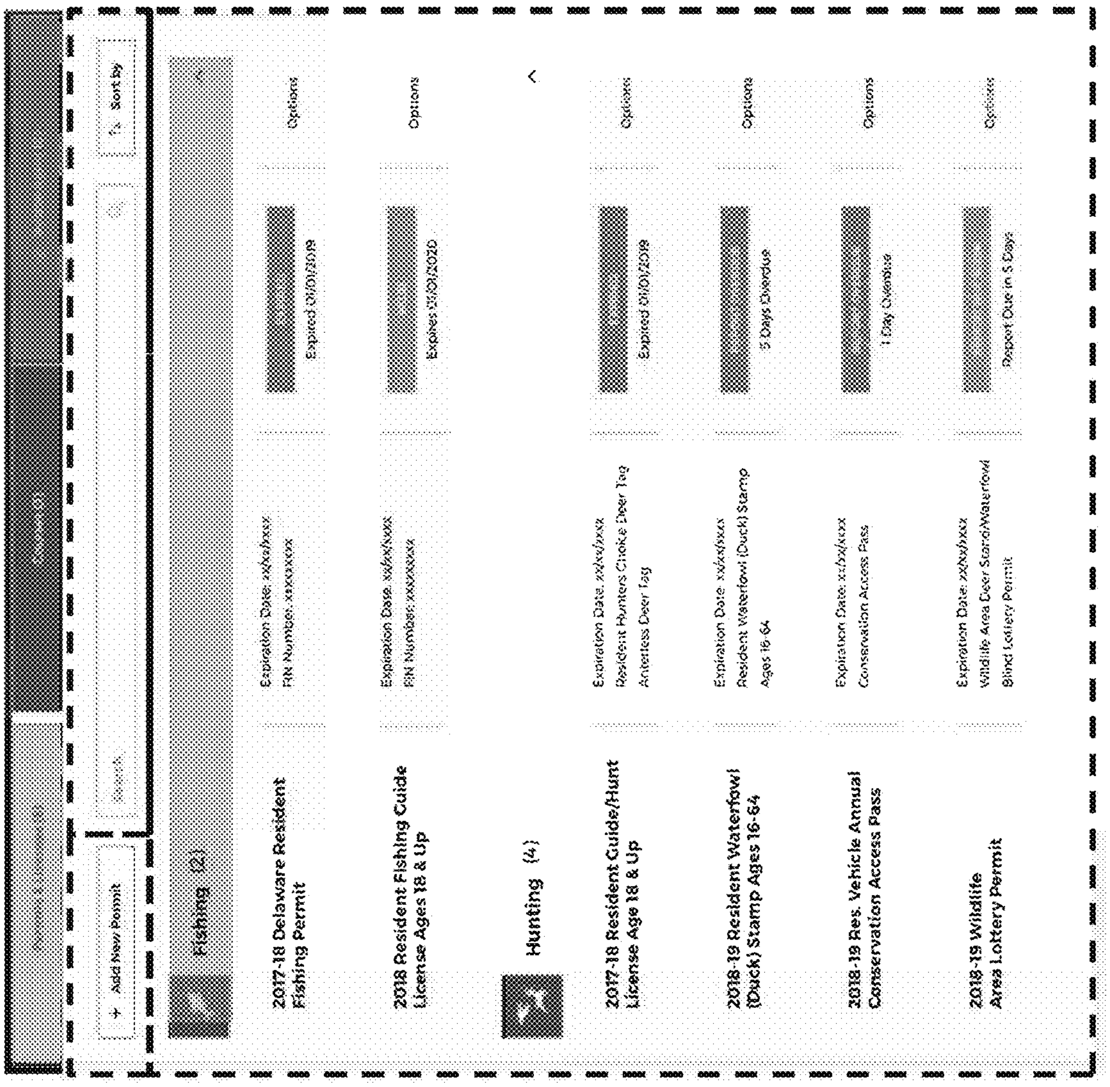
FIG. 248 shows an example of a page that includes components in accordance with some embodiments of the disclosed subject matter.

In some embodiments, the framework can include one or more data components. In some embodiments, the data components can be inserted into a page. In some embodiments, data (e.g., text data, image data, video data, and/or any other suitable type of data) associated with each data component of a page can be grouped or packaged separately and can be transmitted from a server to a display device separately. FIG. 248 shows an example of a page with components of the page indicated (in dashed boxes) in accordance with some embodiments of the disclosed subject matter.

In some embodiments, a data component can be a core component. In some embodiments, a core component can be generated or customized in any suitable manner. For example, in some embodiments, a customizable component can be created in a front-end development framework (e.g., React, Angular, Vue, and/or any other suitable framework). In some embodiments, any suitable configuration parameters can be used to change a manner in which data associated with a core component is presented (e.g., a visual appearance of the component, content such as images or icons included in a component, etc.) and/or content that is presented in connection with the core component. In some embodiments, a stylesheet can be used to change an appearance of data presented within a core component.

In some embodiments, a core component can include any suitable components, such as a data list, one or more tabs presented on a page, a page template, a form, an HTML container, a progress indicator presented across a group of pages or forms, and/or any other suitable components.

For example, a data list component can display any suitable data records or other data. As a more particular example, in some embodiments, a data list component can retrieve data records from any suitable database and can present the retrieved data records on a user device. In some embodiments, a data list component can be configured to display data records in any suitable manner. For example, in some embodiments, a data list component can be configured to sort, group, filter, or aggregate retrieved data records based on any suitable criteria. As another example, in some embodiments, a data list component can be configured to group one or more subsets of retrieved data records into any suitable categories, and the data records can then be presented based on the categories. Continuing with this example, in some embodiments, the data list component can be configured to allow a user to expand or contract any of the categories, for example, to show or hide any suitable records assigned to a particular category.

In some embodiments, a data list component can be configured using any suitable syntax. For example, in some embodiments, the syntax can indicate information associated with data records that are to be retrieved by the data list component, such as keys of a database corresponding to the records to be retrieved (e.g., as particular record columns, as particular category columns, etc.), an identifier of a database from which records are to be retrieved, and/or any other suitable information. As another example, in some embodiments, the syntax can indicate information indicating a manner in which data records are to be sorted or filtered, such as sorted by a particular key, sorted in an ascending or descending order in connection with a particular key, and/or in any other suitable manner. As yet another example, in some embodiments, the syntax can indicate that data records are to be presented within a table. As a more particular example, in some embodiments, the syntax can indicate information associated with a visual appearance associated with a table, such as a number of rows or columns of a table, formatting of different cells within the table, an indication of one or more stylesheets to be used to format the table, indications of HTML to be used to render a particular row or column of the table, and/or any other suitable table information.

Note that other examples of components are described below in more detail below.

Note that, in some embodiments, a core component can be configured in any suitable manner. For example, in some embodiments, configurations associated with a core component can be set when a page that includes the core component is rendered. In some embodiments, configuration parameters can be set in any suitable manner. In some embodiments, current values associated with configuration parameters can be retrieved in any suitable manner. For example, in some embodiments, a core component can be associated with any suitable methods that, when called, allow configuration parameters to be set to particular values, return current values of configuration parameters, and/or return information describing configuration parameters associated with the core component. As a more particular example, in some embodiments, the methods can include: describe_configurations( )(e.g., a method that returns a JSON that describes each configuration parameter, such as data types associated with different values, descriptions of each value, and/or any other suitable information); configurations( )(e.g., a method that returns one or more JSON key/value pairs for each configuration parameter that was previously set and an associated value); configuration(key) (e.g., a method that returns a JSON array that indicates configuration parameter names); set_configuration(key, value) (e.g., a method that sets a configuration parameter corresponding to the key to the indicated value); and/or set_configurations(key, isReplaceAll) (e.g., a method that sets configuration values for configuration parameters corresponding to the indicated keys). Note that the methods and the method names described above are given merely as examples. In some embodiments, methods associated with a core component can have any suitable names and can take any suitable input parameters.

In some embodiments, configuration parameters associated with a core component can indicate any suitable information. For example, in some embodiments, the configuration parameters can indicate a context component (described in more detail below) that indicates data that is to be presented in connection with the core component. As another example, in some embodiments, the configuration parameters can indicate a visual manner in which content associated with the core component is to be presented. As a more particular example, in an instance in which the core component corresponds to a list or table that is to be presented within a page, the configuration parameters can indicate a number of rows and/or a number of columns associated with the table, any suitable style information associated with content presented in each cell of the table, any suitable style information associated with headings of the table, any suitable sorting information indicating a manner in which data presented in the table is to be sorted, information indicating titles of rows and/or columns of the table, information indicating any suitable categories associated with the table, and/or any other suitable information. Note that, in some embodiments, style information can be presented in any suitable manner, such as using HTML, CSS, and/or in any other suitable manner.

In some embodiments, values of a particular configuration parameter can be set or indicated in any suitable manner. For example, in some embodiments, a configuration value can be an explicit literal value. As a more particular example, in an instance in which a core component is a table that is to be presented within a page, a configuration value corresponding to a number of rows or columns of the table can be set as an explicit value (e.g., 3 rows, 2 columns, and/or any other suitable value).

As another example, in some embodiments, a value for a particular parameter can be retrieved from any suitable location. As a more particular example, in some embodiments, a configuration parameter can be retrieved from a context component (described in more detail below) associated with a page. As a specific example, in some embodiments, a configuration parameter can reference a JSON element included in a context component associated with the page, and the configuration parameter can retrieve a value stored in the referenced JSON element. In some such embodiments, the core component can retrieve the configuration parameter from the information stored in the context component at run-time, that is, when the page is rendered.

Additionally, note that, in some embodiments, a component can be added to a Guide. For example, in some embodiments, a component or a group of components can be added to a Guide instead of a step. In some such embodiments, a component can access any suitable data points associated with the Guide and/or any suitable data points associated with a Project that includes the Guide.

In some embodiments, a page that is generated by a particular page template can be associated with any suitable information. For example, in some embodiments, the information can include a URL associated with the page, components that are positioned on the page, permissions that indicate users or devices that are authorized to access the page, and/or any other suitable information.

In some embodiments, each page can additionally be associated with a context component. In some embodiments, the context component can include data or information that is relevant to the page but that is not presented on the page. For example, in some embodiments, as described above, a context component can include any suitable values that can be retrieved by configuration parameters associated with components of the page. As a more particular example, as described above, in some embodiments, a context component can include an element that indicates a number of rows or columns of a table that is to be presented on the page, which can then be retrieved by a component corresponding to the table. As another example, in some embodiments, the context can indicate content that is to be presented on the page (e.g., a report that is to be displayed, etc.). As a more particular example, in some embodiments, the context component can indicate content that is to be presented within different components of the page. In some embodiments, information associated with the context component can be stored in any suitable manner. For example, in some embodiments, the information can be stored as JSON key/value pairs. As a more particular example, JSON key/value pairs can store a URL associated with a page, input parameters associated with data to be retrieved for display on the page, permissions for users or groups of users authorized to access the page, information indicating components to be presented on the page, and/or any other suitable information. In some embodiments, in response to detection of a change in the context component, different content can be retrieved from a web service server, and the different content can then be presented on the page. In some embodiments, a context component can be configured to provide access to information in virtually any portion of the system or another system—for example, a step value, or an organization setting, or a data point that exists within the system, or data that exists within an external system (perhaps through a data connector). In some embodiments, data can be retrieved through the context component, or stored in the context component (possibly also updating a corresponding external system). In some embodiments, data can be retrieved through direct addressing (for example, Settings.Organization_Name) and/or through relative addressing, (for example, thisActivity.Activity_Name). Note that, in some embodiments, a page can be associated with a default context component. Furthermore, in some embodiments, a page can have any suitable number of context components (e.g., one, two, three, five, and/or any other suitable number), for example, each relating to a different portion of the page.

In some embodiments, a component can retrieve data from any suitable database or web service. In some embodiments, the database can be any suitable third-party database. In some embodiments, a component can use a web service framework that can include any suitable methods that can be called by a component to access data from a web service. For example, in some embodiments, a component can call a method that performs an indicated query (e.g., a query to retrieve particular data from a database, and/or any other suitable query). In some embodiments, a database query can use any suitable syntax (e.g., direct coding in NodeJS, and/or any other suitable syntax). In some embodiments, any suitable filtering and/or sorting can be applied to a database query to construct a query that retrieves particular data and/or particular fields from a database. In some embodiments, a database query can correspond to a particular database account. In some embodiments, a method can be associated with any suitable permissions or access restrictions that can indicate users or groups that can call the method.

Note that, in some embodiments, a database can be generated and/or maintained for a particular organization. In some such embodiments, the database can store any suitable data or information associated with the organization that can be used by pages created by the organization, used to generate pages presented within a portal or website associated with the organization, used to generate or maintain Guides associated with the organization, and/or any other suitable data or information.

In some embodiments, a component can be configured using a user interface. For example, in some embodiments, a user interface can be used to indicate a manner in which content associated with a component (e.g., a table, a form, an image, and/or any other suitable content) is to be presented within a page. As a more particular example, in some embodiments, a component can be figured by dragging and dropping elements of the component into a visual representation of the component. In some such embodiments, elements can be further customized within the user interface, for example, by specifying names or identifiers for each element, indicating a size of an element, a color in which an element is to be presented, etc.

Figure 249:
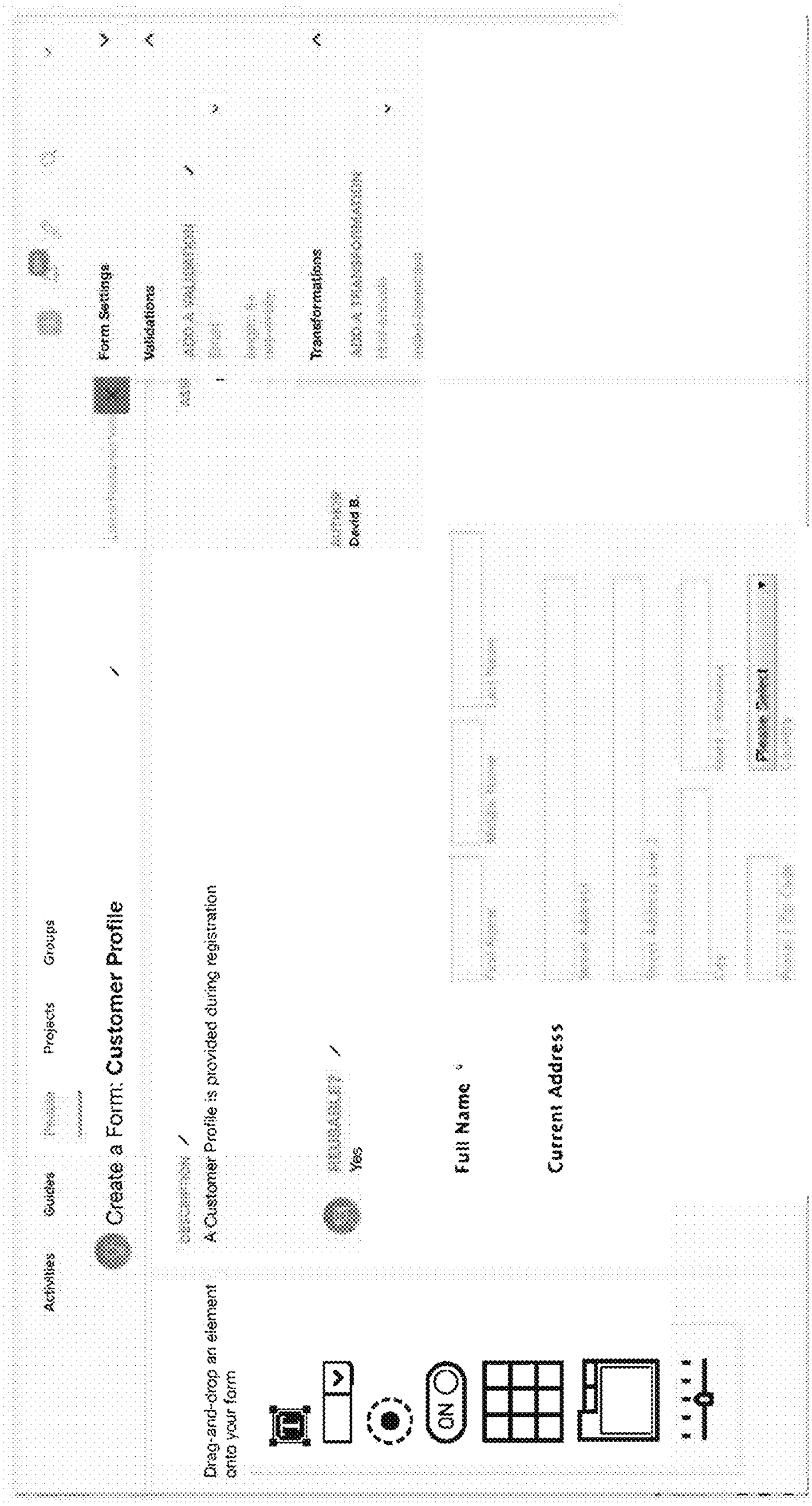
FIGS. 249 and 250 show examples of user interfaces for configuring content presented within a page in accordance with some embodiments of the disclosed subject matter.

Turning to FIG. 249, an example of a user interface for designing a form is shown in accordance with some embodiments of the discloser subject matter. As illustrated, in some embodiments, elements of a form can be indicated and laid out within the form by dragging and dropping the elements (e.g., one or more text boxes, one or more drop-down menus, etc.) into a main portion of a screen that represents the form that is being created. Additionally, in some embodiments, each element can be further configured in any suitable manner. For example, in some embodiments, a text box can be assigned a name or identifier that can be later used to transmit data entered in the text box, a text box or a drop-down menu can be given a default value, etc.

Figure 250:
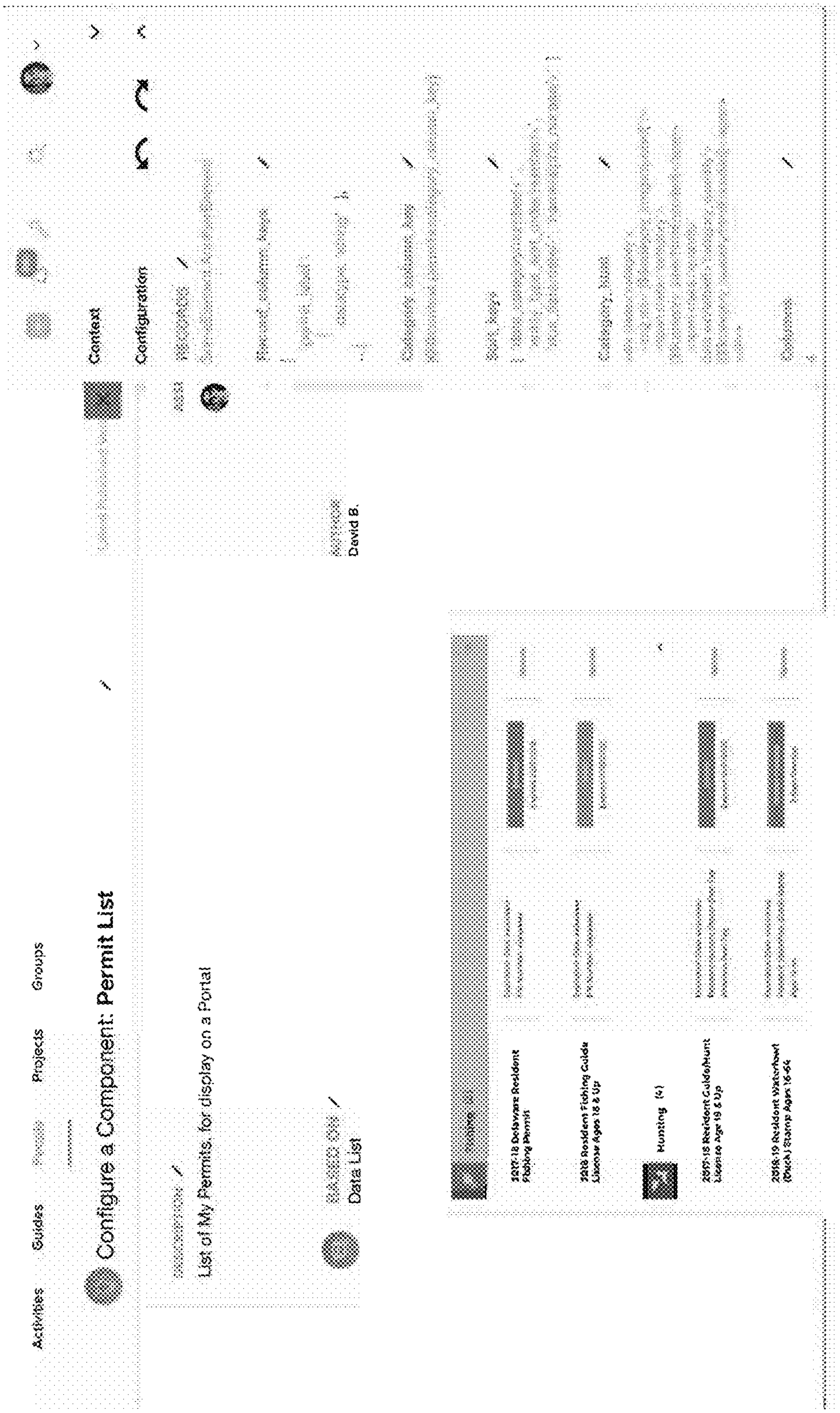

Turning to FIG. 250, an example of a user interface for configuring a table that is presented within a page is shown in accordance with some embodiments of the disclosed subject matter. As illustrated, in some embodiments, the user interface can be used to provide a description of the table. In some embodiments, as illustrated, the user interface can be used to indicate the data that is to be presented in the table (e.g., a type of data to be presented in each cell, a location of data that is to be retrieved for presentation within the table, a manner in which data is to be sorted within the table, and/or any other suitable information).

Turning to FIG. 251, an example of a user interface for configuring an automation is shown in accordance with some embodiments of the disclosed subject matter. As illustrated, in some embodiments, the user interface can be used to assign a name to an automation, any suitable inputs to be used in the automation, an indication of a service (e.g., a software service, and/or any other suitable service) to be used in the automation, any suitable outputs of the automation, and/or any other suitable information. In some embodiments, any other suitable automation content can be configured, such as an indication of a particular NodeJS function, an indication of a database query that is to be performed, an indication of a web service that is to be connected to (e.g., using a particular API method, and/or in any other suitable manner), and/or any other suitable information.

In some embodiments, a data component can be a configured component. In some embodiments, a configured component can be a data component that is paired with and/or associated with any suitable configuration parameters. For example, in an instance where a component is configured and/or customized to have a particular formatting, the component along with any associated configuration settings can be stored as a configured component. In some such embodiments, the configured component, and any associated configurations or settings, can later be reused in any suitable page or interface. As a more particular example, in some embodiments, a table component can be configured in any suitable manner (e.g., to have particular table headings, to have a particular size, to format entries in the table in a particular manner, to present table headings in a particular font or color, and/or in any other suitable manner). Continuing with this example, in some embodiments, the configured table component that uses the configurations can be inserted into a page. As a specific example, in some embodiments, a configured component, such as the table component described above, can be associated with any suitable HTML styling or other styling information that is then applied to any specific instances of the configured component.

As another more particular example, in some embodiments, a configured component can include a tab component that includes, for example, one or more tabs or drop-down menus that can be presented on a page (e.g., at a top of a page, at a side portion of a page, and/or in any other suitable location). In some embodiments, a tab component can be configured in any suitable manner, for example, to indicate titles of menus presented within a group of tabs corresponding to the tab component (e.g., to include any suitable menus such as "my activities," "activities I have assigned," "activities I have been assigned," etc.), to indicate formatting of tabs presented within the tab component (e.g., background colors of each tab, fonts or font colors associated with each tab, etc.), icons to be presented in particular tabs, an identifier of a context component from which data is to be retrieved to present within a particular tab, a tab of a group of tabs that is to be selected by default as a page is rendered, whether particular information (e.g., a number of new notifications associated with a tab) is to be presented, whether tabs are to be sorted in any particular order prior to presentation, whether tabs with unavailable content are to be presented, and/or any other suitable information.

As yet another more particular example, in some embodiments, a configured component can include a form. In some embodiments, a form can be configured to include particular fields (e.g., a name of a user, an address of a user, an email address of a user, a selection mechanism to select a profile picture, and/or any other suitable fields) as well as a submission action. In some embodiments, the form can be configured to have any particular formatting (e.g., to use particular fonts or colors, to have form fields of a particular size, and/or in any other suitable manner). In some embodiments, the configured form can then be stored in any suitable manner (e.g., as a JSON definition, and/or in any other suitable manner). In some embodiments, the form can be used or reused in any suitable manner. For example, in some embodiments, a configured form can be available as a step response within a Guide. Note that, within a Guide, form fields can be represented as a table, for example, with a first column of the table indicating form field identifiers (e.g., "name," "address," etc.), and a second column of the table indicating entered values from the form corresponding to each field. In some such embodiments, other steps of a Guide can then access form values by accessing entries of a corresponding table.

Note that, in some embodiments, a form component can use any suitable syntax to configure a form and/or to provide functionality associated with the form. For example, in some embodiments, any suitable syntax can be used to configure visual features associated with the form, such as spacing between fields, a CSS style sheet to be used to set visual features associated with the form, font sizes or colors, a manner in which form fields are to vertically wrap based on one or more components of a form, etc. As another example, in some embodiments, any suitable syntax can be used to configure fields of the form, such as to set field names for components of a form (e.g., for each text box of the form, for each drop-down menu, etc.), to label components of a form, to set a default value of a component of a form, to provide a hint or explanation of a form field to a user of a form, etc. As a more particular example, in some embodiments, a form component can be configured such that initial field values for any suitable components of a form are initially populated with default values that are retrieved from JSON key/value pairs (e.g., that are stored in connection with a context element associated with a page corresponding to the form, and/or that are retrieved in any other suitable manner). As yet another example, in some embodiments, any suitable syntax can be used to indicate a manner in which an error message associated with a form is to be presented, such as a component of the form that is to present the error message, visual features associated with the error message, and/or any other suitable information. As still another example, in some embodiments, any suitable syntax can be used to indicate whether particular buttons associated with the form are to be presented in connection with presentation of the form. As still another example, in some embodiments, any suitable syntax can be used to indicate validation criteria that are to be checked to determine if a form was correctly filled out, such as that particular fields are required to have text, that a particular field cannot be left empty, that a particular field must include only numerical characters, that a particular field must include a particular number of numbers (e.g., a number of digits corresponding to a phone number, etc.), and/or any other suitable validation criteria. As still another example, in some embodiments, any suitable syntax can be used to indicate a manner in which text entered in a component of a form is to be masked as it is entered (e.g., with asterisks replacing each entered character, and/or in any other suitable manner). As still another example, in some embodiments, any suitable syntax can be used to configure a form to be dynamically updated as a user fills out a form. As a more particular example, in some embodiments, the form can be configured to add new sections dynamically in response to particular buttons being selected within the form (e.g., a new section corresponding to a new family member can be added in response to determining that a "add new family member" button has been selected). As another more particular example, in some embodiments, the form can be configured to perform any suitable calculations based on entries in one or more form components and automatically update another form component (e.g., to perform a calculation based on entries in two components of a form and automatically update a value presented in a third component of the form). As still another example, in some embodiments, any suitable syntax can be used to configure a manner in which a form can receive uploads from a user. As a more particular example, in some embodiments, the syntax can indicate types of files that can be uploaded (e.g., particular file extensions), size information (e.g., a maximum file size that can be uploaded, a total number of files that can be uploaded, and/or any other suitable size information), whether files can be dragged and dropped, whether a preview of a file that is selected for upload is to be presented prior to upload, whether size information about a selected file is to be displayed, and/or any other suitable upload information.

As still another more particular example, in some embodiments, a configured component can include an HTML container. In some embodiments, an HTML container can be configured to include any suitable content. For example, in some embodiments, an HTML container can be configured to render static HTML content. As a more particular example, in some embodiments, the container can be configured with a field such as "content HTML" that indicates HTML to be rendered within the component, a title field that indicates a title to be displayed, a width and/or a height field that indicates size information of the container, and/or any other suitable configuration information. As another example, in some embodiments, an HTML container can be configured to render content indicated in a context component, as described above. As yet another example, in some embodiments, an HTML container can be configured to include any suitable embedded sub-components that are nested within the container.

Note that, in some embodiments, an HTML container can be configured to render content dynamically. For example, in some embodiments, an HTML container can be configured to present a variable and/or HTML content that includes a variable. As a more particular example, in some embodiments, the HTML container can be configured to present a variable that is referenced in a context component associated with a page that includes the HTML container. In some such embodiments, the value of the variable can be retrieved when the page is rendered, and the HTML container can then be rendered using the retrieved variable value. In some embodiments, a placeholder can be used to indicate the dynamic content that is to be inserted. For example, in some embodiments, a "<span>" tag can be used that has a template attribute. In some embodiments, the template attribute can indicate substitutions that are to be made. As a more particular example, the template attribute can indicate variable names whose values are to be retrieved from the context component when rendering the HTML container. A specific example of using a template attribute to reference variables is: "<span id='something data-ex.template="<a href='/action?t=[$$ex.trackingID/htmlEncoded]&c=[$$ex.caseID/htmlEncoded]'>[$$ex.caseName] </a>">Default Value</span>." Continuing with this example, in an instance where a context component of the page indicates that "$_ex.trackingID=4," "$_ex.caseID=101," and "$_ex.caseName=EntityName," the span's HTML can be set to: "<a href='/action?t=4&c=101'>EntityName</a>."

Note that, in some embodiments, an HTML block can be configured such that the block is only presented based on particular criteria being met. For example, in some embodiments, the HTML block can be configured to be presented if particular relevant information is present. In some embodiments, criteria for visibility of an HTML block can be set using an attribute that indicates particular variables that are to have non-empty values. For example, in some embodiments, an attribute such as "data-ex.showWhenPopulated" can store a group of variables included in a context component associated with a page that are to have non-empty values, and, if it is determined that each variable in the group of variables includes a non-empty value, causes the HTML block to be presented.

As still another example, in some embodiments, a configured component can be a page template. In some embodiments, a page template component can be configured to have any suitable appearance. Additionally or alternatively, in some embodiments, a page template component can include any suitable placeholders that can indicate content that is to be inserted into a page rendered using the page template. For example, in some embodiments, a page template component can include an array of component names that indicate one or more components to be inserted as page content. In some embodiments, a page template component can additionally include any other suitable information, such as a page title, breadcrumb HTML to be presented, and/or any other suitable information. Note that, in some embodiments, any information indicated in the page template component can be configured using a substitution variable such that a value of the variable can be dynamically set.

Figure 252:
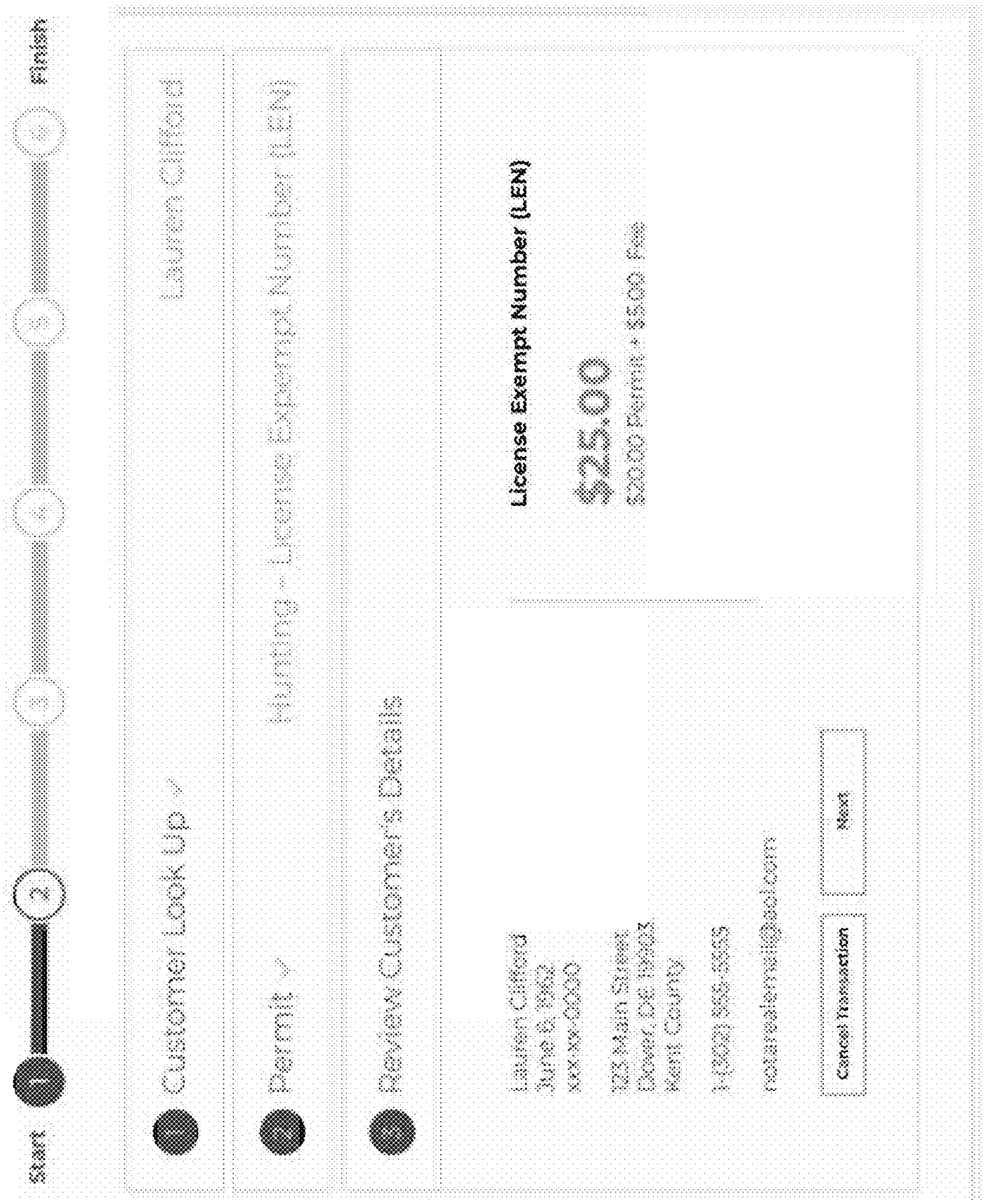
FIG. 252 shows an example of a user interface with a progress indicator in accordance with some embodiments of the disclosed subject matter.

As still another example, in some embodiments, a configured component can include a progress indicator. Turning to FIG. 252, an example of a user interface that includes a progress indicator is shown in accordance with some embodiments of the disclosed subject matter. As illustrated, in some embodiments, a progress indicator can indicate a number of steps of a particular task (e.g., buying an item, and/or any other suitable task) that have been completed. In some embodiments, a progress indicator can be configured in any suitable manner. For example, in some embodiments, a progress indicator component can be configured with any suitable parameters, such as a number of steps, whether or not a progress bar is to be shown, when a current step number is to be shown, whether future steps are to be shown, size information corresponding to a progress bar, indications of components corresponding to different steps (e.g., a reference to a first form corresponding to a first step of a task, a reference to a second form corresponding to a second step of a task, and/or any other suitable components), titles corresponding to each step of a task, and/or any other suitable configuration parameters.

In some embodiments, a configured component can be associated with a name and/or any other suitable identifier. In some embodiments, a configured component can be based on a core component or on a different configured component (e.g., a different configured component that is associated with the configuration parameters used to configure the configured component). In some embodiments, configuration parameters can be modified. For example, in some embodiments, original configuration parameters used to initialize a configured component can be overridden at any suitable time and in any suitable manner.

In accordance with some embodiments, a portal can be used to transmit messages to an internal system. For example, in some embodiments, a portal can be used to receive any suitable messages or requests, such as a request to assign a new Guide to a particular user, a request to retrieve information relating to a particular user, and/or any other suitable requests.

In some embodiments, the portal can communicate with an internal system indirectly. For example, in some embodiments, the portal can receive a request, and can place a received request in a queue associated with the internal system using any suitable web service. In some embodiments, the web service can store a received request in a standardized format (e.g., using JSON, and/or any other suitable syntax), and the stored request can include any suitable information, such as an identifier of a transmitter of the request, an identifier of a recipient of the request, a date or time the request was received, a method associated with the request (e.g., whether the request is to create a new activity, to assign a new Guide, and/or any other suitable method), any suitable identifiers associated with the request (e.g., an identifier of a new activity that is to be assigned, an identifier of a new Guide to be assigned, and/or any other suitable identifiers), and/or any other suitable information. In some embodiments, any suitable encryption protocol (e.g., Public Key encryption, and/or any other suitable protocol(s)) can be used to encrypt any suitable fieldnames or values associated with a stored request. In some such embodiments, a user who has been authorized as allowed to view the request can be then decrypt the stored request in any suitable manner.

In some embodiments, a "receptionist" can be configured to receive requests from the portal. In some embodiments, a receptionist can be configured to route received requests in any suitable manner. In some embodiments, a mapping can be used by a receptionist to determine an action that is to be triggered in response to receiving a particular type of request. For example, in some embodiments, the mapping can indicate that a particular type of request is to cause a particular Guide to be assigned. Note that, in some embodiments, the mapping can indicate any other suitable information, such as a queue that an assignment is to be placed in (e.g., a queue corresponding to a particular department of an organization, a queue of a particular user in an organization, and/or any other suitable queue), and/or any other suitable information.

As described above, in some embodiments, a receptionist can store information associated with a received request in a JSON structure. For example, in some embodiments, information relating to an activity that is to be assigned can be stored in assignment data key/value pairs in a JSON structure. In some such embodiments, a step associated with the activity can then access any suitable values stored in the assignment data key/value pairs. In some such embodiments, the assignment data can be read-only. Additionally or alternatively, in some embodiments, one or more fields in the assignment data can be editable, for example, during completion of the activity. For example, in some embodiments, one or more fields of the assignment data can be updated with new values during completion of the activity, either manually or automatically.

In accordance with some embodiments, a portal can be used to provide information stored by an internal system. For example, in some embodiments, a portal can be used to provide information about users associated with an organization corresponding to an internal system (e.g., a user profile of a user, current authorizations of a user, permits currently assigned to a user, and/or any other suitable user information). In some embodiments, a portal can access a directory structure that can be used to provide information about one or more users. In some embodiments, a portal can store a read-only version of a directory structure.

In some embodiments, one or more JSON files can be used to indicate files associated with a user and/or information associated with a user (e.g., a user profile, licenses assigned to a user, downloadable documents, etc.) In some embodiments, a portal can use any suitable web service to request a particular file associated with a request received by the portal. For example, in some embodiments, the portal can retrieve a JSON file associated with the request. In some embodiments, the portal can then cause information included in the JSON file to be rendered in response to the request.

In some embodiments, user information that can be accessed using a portal can be encrypted in any suitable manner. For example, in some embodiments, a copy of a directory structure stored by a portal can be encrypted in any suitable manner (e.g., PGP encrypted, and/or in any other suitable manner). In some embodiments, a different private key can be used for each public user. In some embodiments, the private key can be re-encrypted at any suitable times (e.g., every day, and/or at any other suitable times) and in any suitable manner. For example, in some embodiments, an authentication server can generate a random symmetric encryption key, and the private key can be re-encrypted using the symmetric encryption key. In some embodiments, the private key can be stored within the directory. In some embodiments, when a user logs in, the symmetric encryption key can be shared with the user (e.g., an authentication server can transmit the symmetric encryption key via a session cookie, and/or in any other suitable manner). In some embodiments, the PGP files can then be decrypted in response to a user request using the transmitted symmetric encryption key. In some embodiments, an authentication server can implement any other suitable safety precautions. For example, in some embodiments, the authentication server can limit access from particular IP ranges or geographical ranges, block any suitable requests (e.g., requests that are received too quickly, and/or any other suitable requests), and/or implement any other suitable safety precautions.

Note that, in some embodiments, user information can be protected using any other suitable technique or combination of techniques. For example, in some embodiments, a user password can be hashed or otherwise transformed in any suitable manner, for example through a key derivation function. In some embodiments, a user password can be hashed by a user device used by the user. In some embodiments, a passphrase can be mixed with key material that is resident in a secure enclave, for example to provide greater security against remote attackers. In some embodiments, an authentication server can configure a private key associated with the user (as described above) to use the hashed password as a passphrase. In some embodiments, in response to a user logging in, the user device can compute a hash of the password, and can store the hashed password in a session-only cookie. In some embodiments, the hashed password can be transmitted from the user device to the portal, for example, in every user request. In some such embodiments, the portal can then use the hashed password to decrypt PGP-encrypted files, as described above.

In some implementations, a Secure Enclave can be used to hold private keys and perform certain encryption operations, for example to reduce the threat from remote attackers.

In some implementations, any suitable computer readable media can be used for storing instructions for performing the functions and/or processes described herein. For example, in some implementations, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for presenting interactive checklists are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for presenting interactive checklists, the method comprising:

automatically selecting, using a hardware processor, one or more keywords to be used in determining that a first instance of an interactive checklist is to be created;

monitoring a system for a presence of content containing the one or more keywords, wherein the monitoring of the system includes adjusting a syntax of the system based on an identification of at least one whitelisted API function that is offered for direct use within the system and an identification of at least one blacklisted API function that is not offered for direct use within the system;

detecting the presence of the content containing the one or more keywords in the system;

in response to detecting the presence of the content containing the one or more keywords, creating the first instance of the interactive checklist using the hardware processor, wherein the first instance of the interactive checklist includes a plurality of steps to be performed in connection with completing a task, wherein each of the plurality of steps has a description corresponding to the step;

adding to the plurality of steps, using the hardware processor, a new step, wherein the new step includes an initial description of the new step that is generated based on information related to the event and wherein the new step is inhibited from being included in future instances of the interactive checklist;

determining to present a popup notification to a user suggesting that the user perform the first instance of the interactive checklist based on at least one criterion;

generating the popup notification to a user suggesting that the user perform the first instance of the interactive checklist;

receiving a response to the popup notification from the user; and modifying the at least one criterion based on the response.

2. The method of claim 1, wherein the content is a publication.

3. The method of claim 1, wherein the content is a message.

4. The method of claim 1, further comprising:

identifying another user that is to be assigned the new step; and assigning the new step to the other user.

5. The method of claim 1, wherein the content is derived by periodically polling a source.

6. The method of claim 1, wherein the one or more keywords are selected using machine learning.

7. The method of claim 1, wherein the initial description of the new step includes a link to the information.

8. A system for presenting interactive checklists, the system comprising:

a memory; and a hardware processor that, when executing computer-executable instructions stored in the memory, is configured to at least:

automatically select one or more keywords to be used in determining that a first instance of an interactive checklist is to be created;

monitor a system for a presence of content containing the one or more keywords, wherein the monitoring of the system includes adjusting a syntax of the system based on an identification of at least one whitelisted API function that is offered for direct use within the system and an identification of at least one blacklisted API function that is not offered for direct use within the system;

detect the presence of the content containing the one or more keywords in the system;

in response to detecting the presence of the content containing the one or more keywords, create the first instance of the interactive checklist, wherein the first instance of the interactive checklist includes a plurality of steps to be performed in connection with completing a task, wherein each of the plurality of steps has a description corresponding to the step;

add to the plurality of steps a new step, wherein the new step includes an initial description of the new step that is generated based on information related to the event and wherein the new step is inhibited from being included in future instances of the interactive checklist;

determine to present a popup notification to a user suggesting that the user perform the first instance of the interactive checklist based on at least one criterion;

generate the popup notification to a user suggesting that the user perform the first instance of the interactive checklist;

receive a response to the popup notification from the user; and modify the at least one criterion based on the response.

9. The system of claim 8, wherein the content is a publication.

10. The system of claim 8, wherein the content is a message.

11. The system of claim 8, wherein the hardware processor is further configured to:

identify another user that is to be assigned the new step; and assign the new step to the other user.

12. The system of claim 8, wherein the content is derived by periodically polling a source.

13. The system of claim 8, wherein the one or more keywords are selected using machine learning.

14. The system of claim 8, wherein the initial description of the new step includes a link to the information.

15. A non-transitory computer-readable medium containing computer executable instructions that, when executed by a hardware processor of a server, cause the processor to perform a method for presenting interactive checklists, the method comprising:

automatically selecting one or more keywords to be used in determining that a first instance of an interactive checklist is to be created;

monitoring a system for a presence of content containing the one or more keywords, wherein the monitoring of the system includes adjusting a syntax of the system based on an identification of at least one whitelisted API function that is offered for direct use within the system and an identification of at least one blacklisted API function that is not offered for direct use within the system;

detecting the presence of the content containing the one or more keywords in the system;

in response to detecting the presence of the content containing the one or more keywords, creating the first instance of the interactive checklist, wherein the first instance of the interactive checklist includes a plurality of steps to be performed in connection with completing a task, wherein each of the plurality of steps has a description corresponding to the step;

adding to the plurality of steps a new step, wherein the new step includes an initial description of the new step that is generated based on information related to the event and wherein the new step is inhibited from being included in future instances of the interactive checklist;

determining to present a popup notification to a user suggesting that the user perform the first instance of the interactive checklist based on at least one criterion;

generating the popup notification to a user suggesting that the user perform the first instance of the interactive checklist;

receiving a response to the popup notification from the user; and modifying the at least one criterion based on the response.

16. The non-transitory computer-readable medium of claim 15, wherein the content is a publication.

17. The non-transitory computer-readable medium of claim 15, wherein the content is a message.

18. The non-transitory computer-readable medium of claim 15, wherein the method further comprises:

identifying another user that is to be assigned the new step; and assigning the new step to the other user.

19. The non-transitory computer-readable medium of claim 15, wherein the content is derived by periodically polling a source.

20. The non-transitory computer-readable medium of claim 15, wherein the one or more keywords are selected using machine learning.

21. The non-transitory computer-readable medium of claim 15, wherein the initial description of the new step includes a link to the information.

* * * * *